Figure 1:
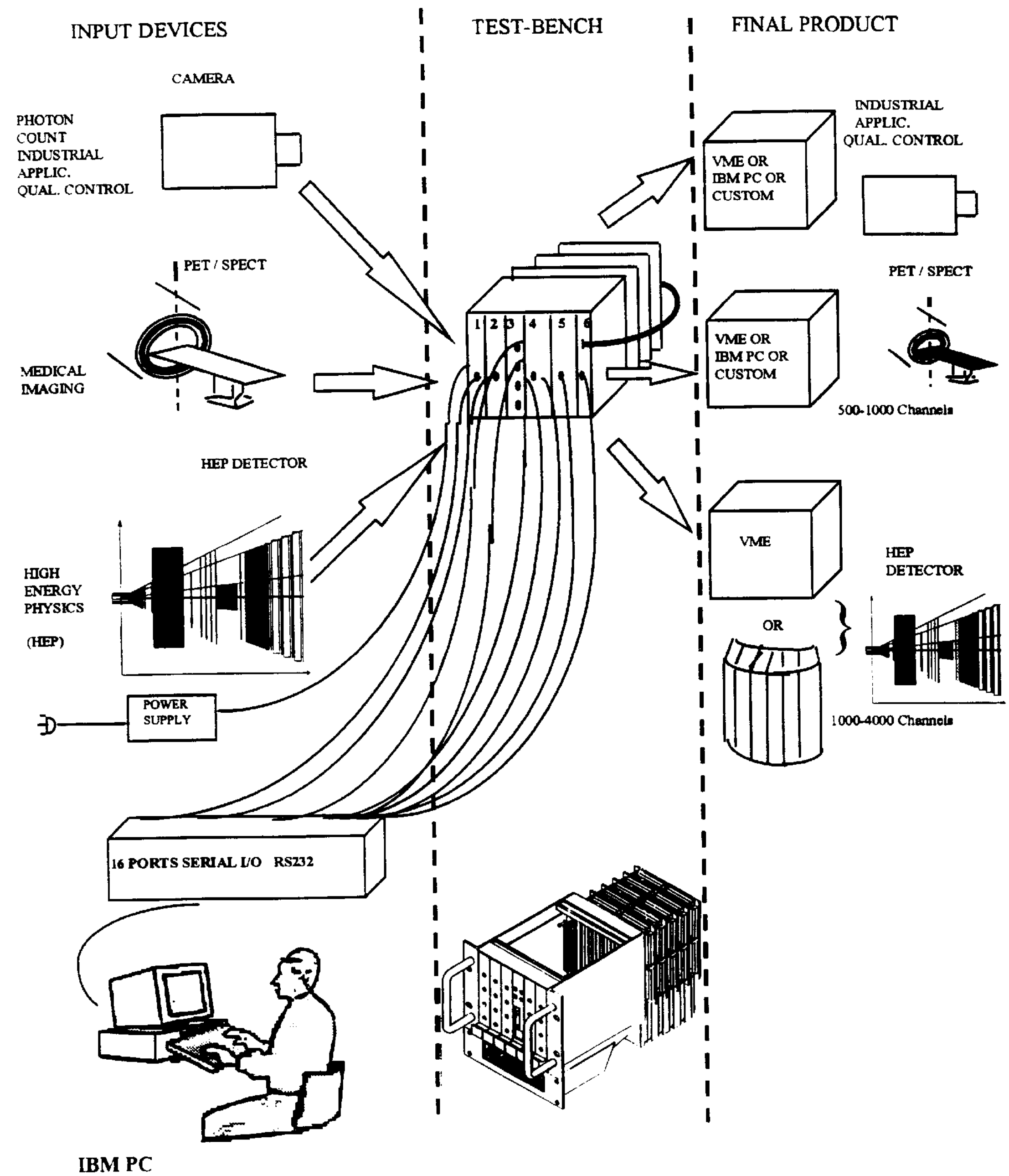

US005937202A

United States Patent [19]
Crosetto

[11] Patent Number: 5,937,202

[45] Date of Patent: Aug. 10, 1999

[54] HIGH-SPEED, PARALLEL, PROCESSOR ARCHITECTURE FOR FRONT-END ELECTRONICS, BASED ON A SINGLE TYPE OF ASIC, AND METHOD USE THEREOF

[75] Inventor: Dario B. Crosetto, DeSoto, Tex.

[73] Assignee: 3-D Computing, Inc., DeSoto, Tex.

[21] Appl. No.: 08/602,132

[22] Filed: Feb. 15, 1996

Related U.S. Application Data

[63] Continuation-in-part of application No. 08/101,489, Aug. 2, 1993, abandoned, and application No. 07/993,383, Feb. 11, 1993, abandoned.

[51] Int. Cl.$^{6}$ .............................. G06F 15/16; G06F 9/44

[52] U.S. Cl. ................................. 395/800.19; 395/800.11

[58] Field of Search ......................... 364/736.01, DIG. 1, 364/715.011, DIG. 2, 735, 551.01, 715.02; 395/800.29, 800.19, 674, 284, 800.18, 800.11, 898; 128/653.3; 370/406, 432; 340/825.5; 382/232

[56] References Cited

U.S. PATENT DOCUMENTS

| | | | |
|---|---|---|---|
| 3,916,383 | 10/1975 | Malcolm | 395/674 |
| 4,727,503 | 2/1988 | McWhirter | 364/715.011 |
| 4,933,936 | 6/1990 | Rasmussen et al. | 370/406 |
| 4,969,469 | 11/1990 | Mills | 128/653.3 |
| 5,119,323 | 6/1992 | Nickerson et al. | 364/735 |
| 5,179,714 | 1/1993 | Grabill | 395/800.19 |
| 5,291,422 | 3/1994 | Esztergar | 364/551.01 |

OTHER PUBLICATIONS

"Technical Proposal for a General–Purpose pp Experiment at the Large Hadron Collider at CERN", *Atlas*, CERN/LHCC/94–43, LHCC/P2, pp. 47–59 and 148–176, Dec. 15, 1994.

"The Compact Muon Solenoid", *CMS* Collaboration, Cern European Laboratory for Particle Physics, CERN/LHCC 94–38, LHCC/P1, Sections 4.4–4.7.5 and reference to Section 4, Dec. 15, 1994. Section 9—Trigger and Data Acquisition and Section 10—Software, 38 pages and references to Sections 9 and 10.

"First Tests of a Liquid Xenon Multiwire Drift Chamber for PET", Chepel, et al., Nuclear Science Symposium & Medical Imaging Conference, 1994 IEEE Conference Record, pp. 1155–1173, Oct. 30–Nov. 5, 1994, Norfolk, Virginia, USA.

"Event by Event 3–D PET Reconstruction Algorithm for a Dedicated Hardware Architecture: Preliminary Results", Di Sciascio, et al., 1995 IEEE, pp. 1192–1197.

"Reducing the Computational Load of Iterative Spect Reconstruction", Glick, et al., 1995, IEEE, pp. 1219–1223.

"Joint Estimation for Incorporating MRI Anatomic Images into SPECT Reconstruction", Zhang, et al., 1995 IEEE, pp. 1256–1260.

"Image Reconstruction for a Novel SPECT System with Rotating Slant–Hole Collimators", Clack, et al., 1994 IEEE Conference Record, pp. 1948–1952, Oct. 30–Nov. 5, 1994 Norfolk, Virginia, USA.

"A Demonstrator Programme for the Atlas Level–1 Calorimeter Trigger", Brawn, et al., Atlas Internal Note, RD27 Note 38, DAQ–NO–031, 11 pages, Jan. 17, 1995.

"An R&D Programme for Alternative Technologies for the Atlas Level 1 Calorimeter Trigger", Appelquist, et al., Atlas DAQ–NO–32, RD27 Note 36, pp. 1–25, Jan. 16, 1995.

(List continued on next page.)

*Primary Examiner*—Daniel H. Pan
*Attorney, Agent, or Firm*—Sidley & Austin

[57] ABSTRACT

An array of processors, each having a data input for receiving raw data, and other data input ports for receiving data for other processors of the plurality. Each processor processes data according to an algorithm programmed therein, and either passes the processed data or raw data to the other processors. By using a three dimensional array of processors, data from a large number of inputs can be processed in a high speed manner and funneled to a smaller number of outputs. An efficient microcode and processor architecture allows high speed processing of data using very few clock cycles, and can pass raw data to another processor in a single clock cycle.

39 Claims, 79 Drawing Sheets

OTHER PUBLICATIONS

"A Bit Serial First Level Calorimeter Trigger for an LHC Detector", Bohm, et al., University of Stockholm, Sweden and Ellis, University of Birmingham, UK (undated).

"First Results from a Protype Level–1 Calorimeter Trigger System for LHC", Brawn, et al., IV International Conference on Calorimetry in High Energy Physics, La Biodola, Isola d'Elba Italy, Sep. 19–25, 1993.

"MEC3—A Pipedline Zero Suppression and Trigger Matching Chip", Mota, et al., 4 pages (undated).

"The Level–1 Calorimeter Trigger for the CMS Detector", Dasu, et al., Slac Library WISC–EX–94–336, 6 pages, May 5, 1994.

"Recent Recent from the CCFR Neutrino Experiment at the Tevatron", Smith, et al., Slac Library, WISC–EX–94–338, 5 pages, Oct. 7, 1994.

Layer 5

| | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| K | L | M | N | K | L | M | N | K | L | M | N | K | L | M | N | . | . | K | L | M | N | K | L | M | N | K | L | M | N |
| P | Q | R | S | P | Q | R | S | P | Q | R | S | P | Q | R | S | . | . | P | Q | R | S | P | Q | R | S | P | Q | R | S |
| T | U | V | W | T | U | V | W | T | U | V | W | T | U | V | W | . | . | T | U | V | W | T | U | V | W | T | U | V | W |
| X | Y | Z | 2 | X | Y | Z | 2 | X | Y | Z | 2 | X | Y | Z | 2 | . | . | X | Y | Z | 2 | X | Y | Z | 2 | X | Y | Z | 2 |
| K | L | M | N | K | L | M | N | K | L | M | N | K | L | M | N | . | . | K | L | M | N | K | L | M | N | K | L | M | N |
| P | Q | R | S | P | Q | R | S | P | Q | R | S | P | Q | R | S | . | . | P | Q | R | S | P | Q | R | S | P | Q | R | S |
| T | U | V | W | T | U | V | W | T | U | V | W | T | U | V | W | . | . | T | U | V | W | T | U | V | W | T | U | V | W |
| X | Y | Z | 2 | X | Y | Z | 2 | X | Y | Z | 2 | X | Y | Z | 2 | . | . | X | Y | Z | 2 | X | Y | Z | 2 | X | Y | Z | 2 |
| K | L | M | N | K | L | M | N | K | L | M | N | K | L | M | N | . | . | K | L | M | N | K | L | M | N | K | L | M | N |
| P | Q | R | S | P | Q | R | S | P | Q | R | S | P | Q | R | S | . | . | P | Q | R | S | P | Q | R | S | P | Q | R | S |
| T | U | V | W | T | U | V | W | T | U | V | W | T | U | V | W | . | . | T | U | V | W | T | U | V | W | T | U | V | W |
| X | Y | Z | 2 | X | Y | Z | 2 | X | Y | Z | 2 | X | Y | Z | 2 | . | . | X | Y | Z | 2 | X | Y | Z | 2 | X | Y | Z | 2 |
| K | L | M | N | K | L | M | N | K | L | M | N | K | L | M | N | . | . | K | L | M | N | K | L | M | N | K | L | M | N |
| P | Q | R | S | P | Q | R | S | P | Q | R | S | P | Q | R | S | . | . | P | Q | R | S | P | Q | R | S | P | Q | R | S |
| T | U | V | W | T | U | V | W | T | U | V | W | T | U | V | W | . | . | T | U | V | W | T | U | V | W | T | U | V | W |
| X | Y | Z | 2 | X | Y | Z | 2 | X | Y | Z | 2 | X | Y | Z | 2 | . | . | X | Y | Z | 2 | X | Y | Z | 2 | X | Y | Z | 2 |
| . | . | . | . | . | . | . | . | . | . | . | . | . | . | . | . | . | . | . | . | . | . | . | . | . | . | . | . | . | . |
| . | . | . | . | . | . | . | . | . | . | . | . | . | . | . | . | . | . | . | . | . | . | . | . | . | . | . | . | . | . |
| K | L | M | N | K | L | M | N | K | L | M | N | K | L | M | N | . | . | K | L | M | N | K | L | M | N | K | L | M | N |
| P | Q | R | S | P | Q | R | S | P | Q | R | S | P | Q | R | S | . | . | P | Q | R | S | P | Q | R | S | P | Q | R | S |
| T | U | V | W | T | U | V | W | T | U | V | W | T | U | V | W | . | . | T | U | V | W | T | U | V | W | T | U | V | W |
| X | Y | Z | 2 | X | Y | Z | 2 | X | Y | Z | 2 | X | Y | Z | 2 | . | . | X | Y | Z | 2 | X | Y | Z | 2 | X | Y | Z | 2 |
| K | L | M | N | K | L | M | N | K | L | M | N | K | L | M | N | . | . | K | L | M | N | K | L | M | N | K | L | M | N |
| P | Q | R | S | P | Q | R | S | P | Q | R | S | P | Q | R | S | . | . | P | Q | R | S | P | Q | R | S | P | Q | R | S |
| T | U | V | W | T | U | V | W | T | U | V | W | T | U | V | W | . | . | T | U | V | W | T | U | V | W | T | U | V | W |
| X | Y | Z | 2 | X | Y | Z | 2 | X | Y | Z | 2 | X | Y | Z | 2 | . | . | X | Y | Z | 2 | X | Y | Z | 2 | X | Y | Z | 2 |
| K | L | M | N | K | L | M | N | K | L | M | N | K | L | M | N | . | . | K | L | M | N | K | L | M | N | K | L | M | N |
| P | Q | R | S | P | Q | R | S | P | Q | R | S | P | Q | R | S | . | . | P | Q | R | S | P | Q | R | S | P | Q | R | S |
| T | U | V | W | T | U | V | W | T | U | V | W | T | U | V | W | . | . | T | U | V | W | T | U | V | W | T | U | V | W |
| X | Y | Z | 2 | X | Y | Z | 2 | X | Y | Z | 2 | X | Y | Z | 2 | . | . | X | Y | Z | 2 | X | Y | Z | 2 | X | Y | Z | 2 |

FIG. 17

Layer 6

| | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| + | + | + | + | + | + | + | + | + | + | + | + | + | + | + | + | . | . | + | + | + | + | + | + | + | + | + | + | + | + |
| + | + | + | + | + | + | + | + | + | + | + | + | + | + | + | + | . | . | + | + | + | + | + | + | + | + | + | + | + | + |
| + | + | k | l | + | + | m | n | + | + | k | l | + | + | m | n | . | . | + | + | m | n | + | + | k | l | + | + | m | n |
| + | + | p | q | + | + | r | s | + | + | p | q | + | + | r | s | . | . | + | + | r | s | + | + | p | q | + | + | r | s |
| + | + | + | + | + | + | + | + | + | + | + | + | + | + | + | + | . | . | + | + | + | + | + | + | + | + | + | + | + | + |
| + | + | + | + | + | + | + | + | + | + | + | + | + | + | + | + | . | . | + | + | + | + | + | + | + | + | + | + | + | + |
| + | + | t | u | + | + | v | w | + | + | t | u | + | + | v | w | . | . | + | + | v | w | + | + | t | u | + | + | v | w |
| + | + | x | y | + | + | z | @ | + | + | x | y | + | + | z | @ | . | . | + | + | z | @ | + | + | x | y | + | + | z | @ |
| + | + | + | + | + | + | + | + | + | + | + | + | + | + | + | + | . | . | + | + | + | + | + | + | + | + | + | + | + | + |
| + | + | + | + | + | + | + | + | + | + | + | + | + | + | + | + | . | . | + | + | + | + | + | + | + | + | + | + | + | + |
| + | + | k | l | + | + | m | n | + | + | k | l | + | + | m | n | . | . | + | + | m | n | + | + | k | l | + | + | m | n |
| + | + | p | q | + | + | r | s | + | + | p | q | + | + | r | s | . | . | + | + | r | s | + | + | p | q | + | + | r | s |
| + | + | + | + | + | + | + | + | + | + | + | + | + | + | + | + | . | . | + | + | + | + | + | + | + | + | + | + | + | + |
| + | + | + | + | + | + | + | + | + | + | + | + | + | + | + | + | . | . | + | + | + | + | + | + | + | + | + | + | + | + |
| + | + | t | u | + | + | v | w | + | + | t | u | + | + | v | w | . | . | + | + | v | w | + | + | t | u | + | + | v | w |
| + | + | x | y | + | + | z | @ | + | + | x | y | + | + | z | @ | . | . | + | + | z | @ | + | + | x | y | + | + | z | @ |
| . | . | . | . | . | . | . | . | . | . | . | . | . | . | . | . | . | . | . | . | . | . | . | . | . | . | . | . | . | . |
| . | . | . | . | . | . | . | . | . | . | . | . | . | . | . | . | . | . | . | . | . | . | . | . | . | . | . | . | . | . |
| + | + | + | + | + | + | + | + | + | + | + | + | + | + | + | + | . | . | + | + | + | + | + | + | + | + | + | + | + | + |
| + | + | + | + | + | + | + | + | + | + | + | + | + | + | + | + | . | . | + | + | + | + | + | + | + | + | + | + | + | + |
| + | + | t | u | + | + | v | w | + | + | t | u | + | + | v | w | . | . | + | + | v | w | + | + | t | u | + | + | v | w |
| + | + | x | y | + | + | z | @ | + | + | x | y | + | + | z | @ | . | . | + | + | z | @ | + | + | x | y | + | + | z | @ |
| + | + | + | + | + | + | + | + | + | + | + | + | + | + | + | + | . | . | + | + | + | + | + | + | + | + | + | + | + | + |
| + | + | + | + | + | + | + | + | + | + | + | + | + | + | + | + | . | . | + | + | + | + | + | + | + | + | + | + | + | + |
| + | + | k | l | + | + | m | n | + | + | k | l | + | + | m | n | . | . | + | + | m | n | + | + | k | l | + | + | m | n |
| + | + | p | q | + | + | r | s | + | + | p | q | + | + | r | s | . | . | + | + | r | s | + | + | p | q | + | + | r | s |
| + | + | + | + | + | + | + | + | + | + | + | + | + | + | + | + | . | . | + | + | + | + | + | + | + | + | + | + | + | + |
| + | + | + | + | + | + | + | + | + | + | + | + | + | + | + | + | . | . | + | + | + | + | + | + | + | + | + | + | + | + |
| + | + | t | u | + | + | v | w | + | + | t | u | + | + | v | w | . | . | + | + | v | w | + | + | t | u | + | + | v | w |
| + | + | x | y | + | + | z | @ | + | + | x | y | + | + | z | @ | . | . | + | + | z | @ | + | + | x | y | + | + | z | @ |

FIG. 18

Figure 26:
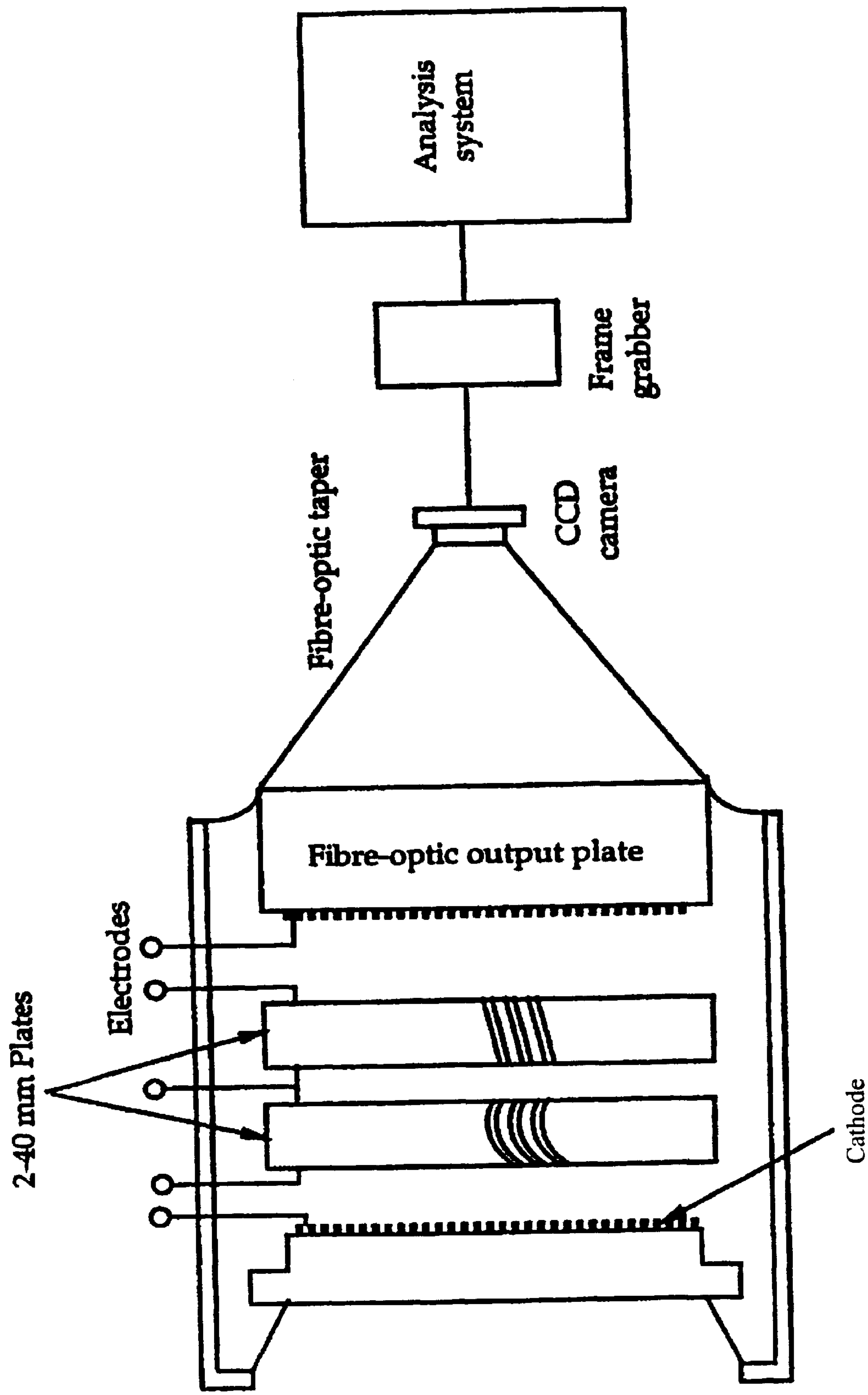

FIG. 26 The PHOCA system layout

TWO QUADRANT = 150 3D-FLOW chips

INSTRUCTION

1. Get Word1 (ADCi, PS1i and PS2i). Convert ADCi to Energy (Ei). Calculate (Ei*Const1) (used in line 10)
2. Sum1 = Ei. Increment TimeStamp
   Send Ei to north, east, west and south neighbours
3. Sum2 = 0. Get P1 from detector. Extract PS2i from Word1
4. Get Energy En and Es from north and south. Send En and Es to east and west. Sum1 = Sum1+En, Sum2 = Sum2+Es
5. Get Energy Ew and Ee from west and east. Send Ew and Ee to north and south. Sum1 = Sum1+Ew, Sum2 = Sum2+Ee
6. Get energy Ewn and Ees from north west and south east (via west and east)
7. Get energy Ene and Esw from north east and south west (via north and south)
8. E9Sum = Sum1+Sum2
   Compute (PS2i-Thresh1)
9. IF (PS1i = 0) OR ((PS2i-Thresh1) < 0) GOTO 23
10. Compute[(Ei*Const1) - E9Sum] and (Ei - Eimin)
11. IF [(Ei*Const1) - E9Sum] < 0 OR
    (Ei - Eimin) < 0 GOTO 23
12. Calculate (Ei-En) and (Ei-Es)
13. Lookup P1Mask corresponding to E9Sum
    IF (Ei-En) < 0 OR (Ei-Es) < 0 GOTO 23
14. Calculate (Ei-Ee) and (Ei-Ew)
15. IF (Ei-Ee) < 0 OR (Ei-Ew) < 0 GOTO 23
16. Calculate (Ei-Ewn) and (Ei-Ees)
    AND P1 with P1Mask
17. IF (Ei-Ewn) < 0 OR (Ei-Ees) < 0 GOTO 23
18. Calculate (Ei-Ene) and (Ei-Esw)
19. IF (Ei-Ene) < 0 OR (Ei-Esw) < 0 GOTO 23
20. IF (P1 AND P1Mask) = 0 GOTO 23
21. ACCEPT EVENT: Send TimeStamp to Bottom
    Store TimeStamp for next event
22. Send E9Sum to Bottom
    GOTO 1
23. REJECT EVENT: Send REJECT EVENT to Bottom
    Store TimeStamp for next event
24. GOTO 1

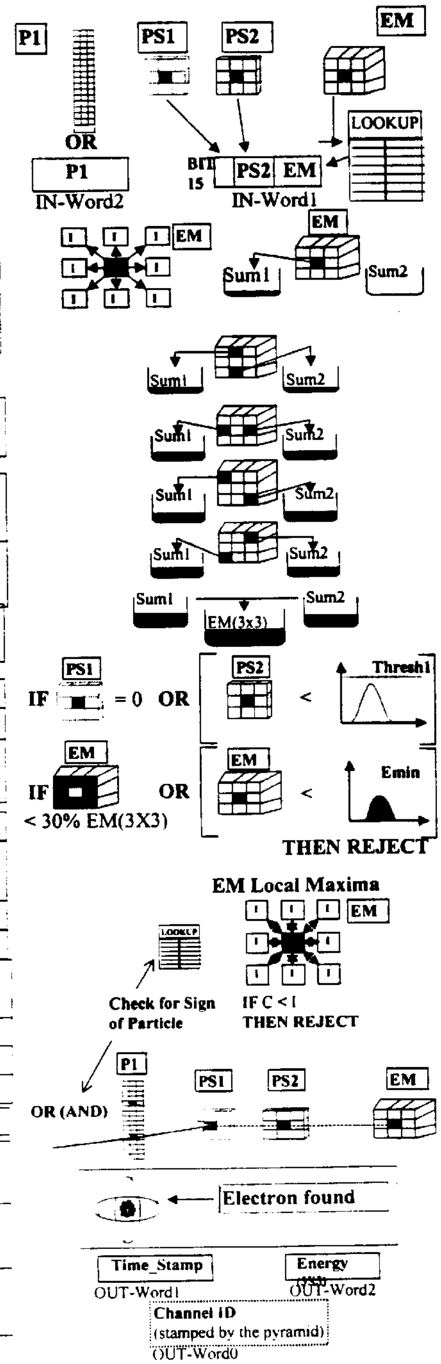

Figure 48A:
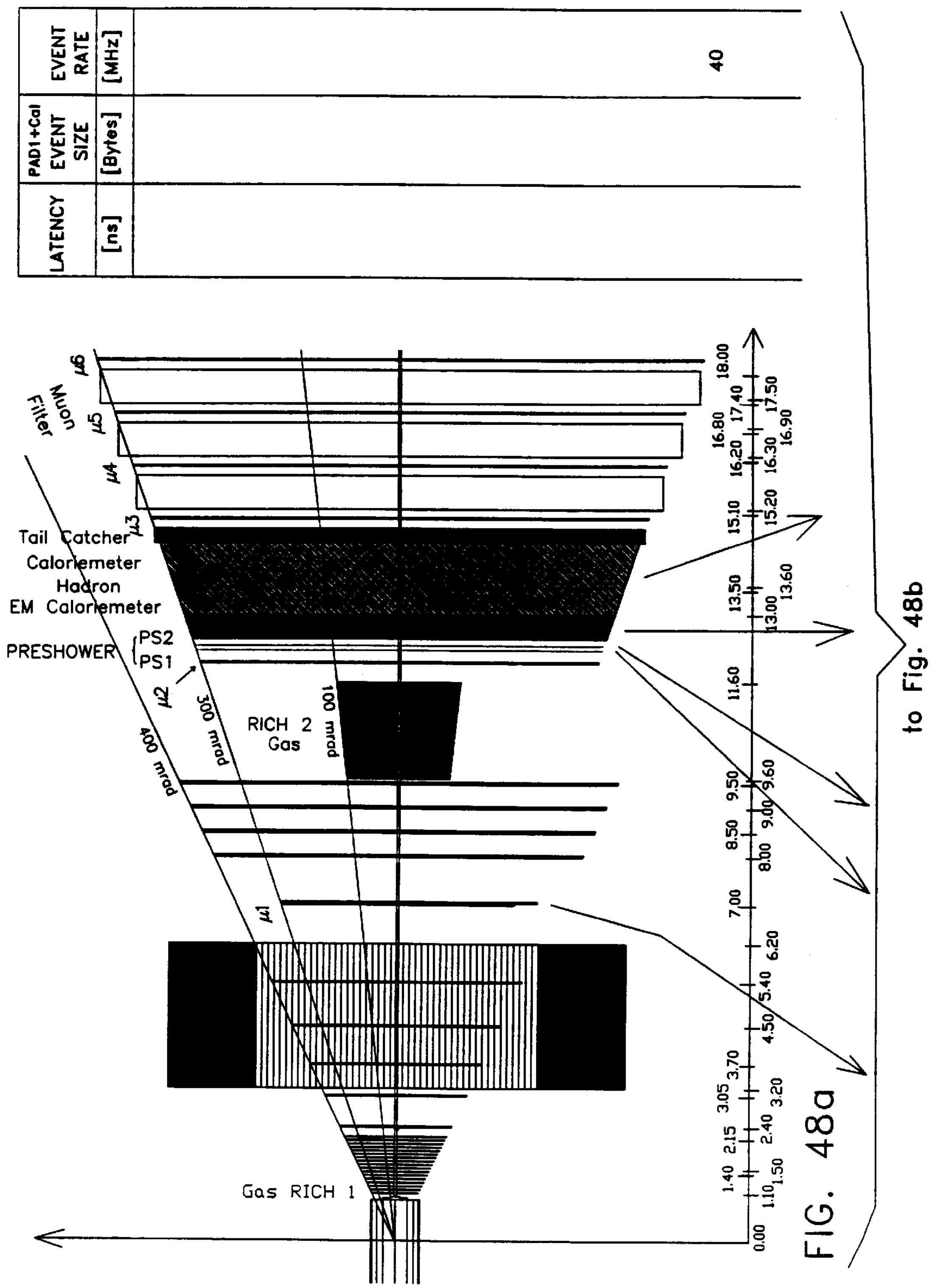
Figure 48B:
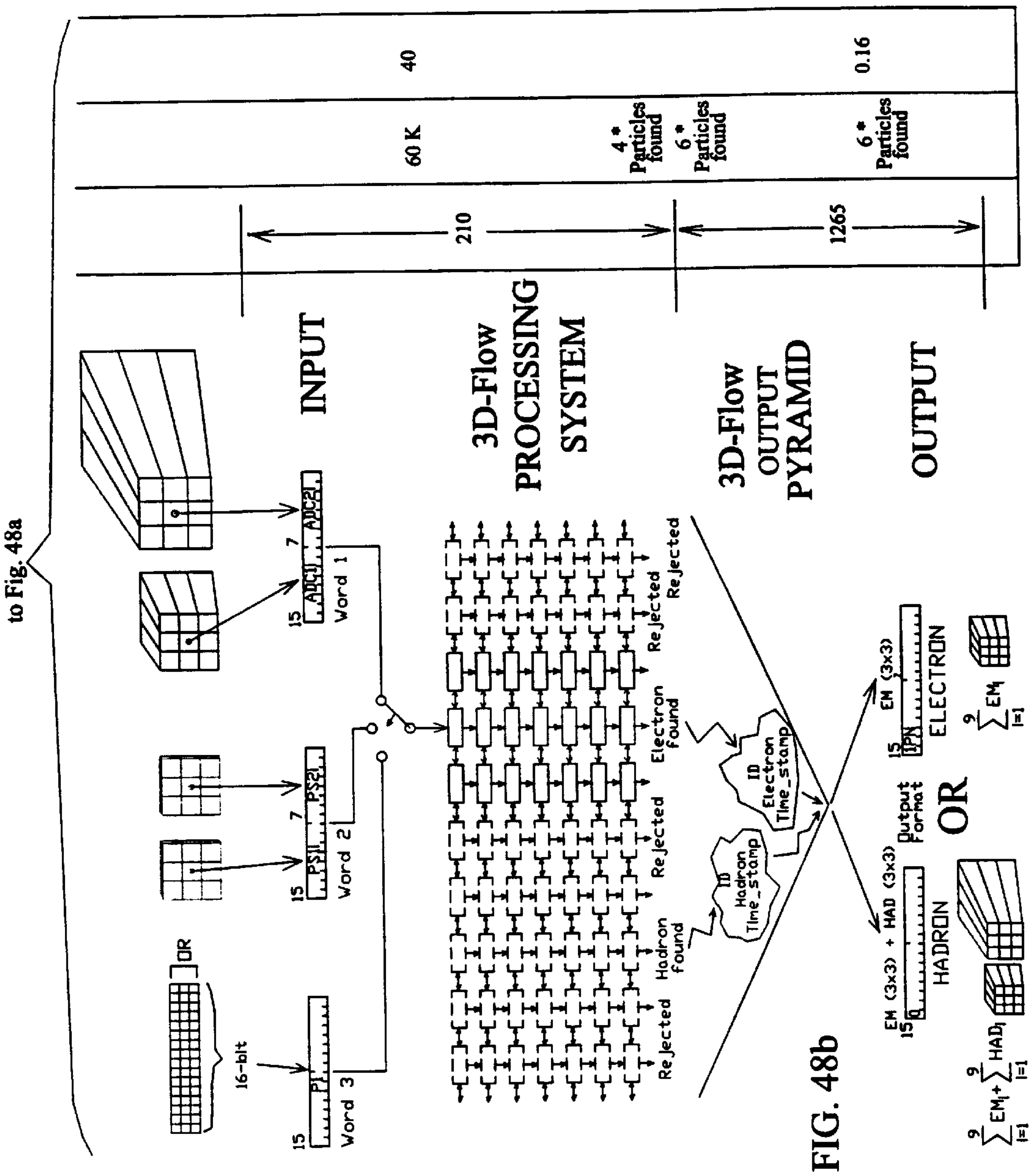

FIG. 47 to Fig. 48b

INSTRUCTION

1. Get Word1 (ADC1i, ADC2i). Convert ADCi to Energy (Ei). Subtract pedestal from ADC2i
2. Get Word2 (ADC3i, ADC4i). Increment Time_Stamp. Subtract pedestal from ADC3I. Send EMi to north, east, west and south (NEWS). Sum1 = EMi
3. Get Word3 (P1). HADi = HADi * Const_2. Sum2 = 0
4. Get Energy En and Es from north and south. Send En and Es to east and west. Sum1 = Sum1+En, Sum2 = Sum2+Es
5. Get Energy Ew and Ee from west and east. Send Ew and Ee to north and south. Sum1 = Sum1+Ew, Sum2 = Sum2+Ee
6. Get energy Ewn and Ees from north west and south east (via west and east)
7. Get energy Ene and Esw from north east and south west (via north and south). Sum1 = Sum1+Ene, Sum2 = Sum2+Esw
8. EM(3x3) = Sum1 + Sum2. Sum1 = Eti. Send ETi to North, East, West and South (NEWS)
9. Subtract Pedestal from ADC4i
10. Get Energy En and Es from north and south Send En and Es to east and west
11. Get Energy Ew and Ee from west and east Send Ew and Ee to north and south
12. Get energy Ewn and Ees from north west and south east (via west and east)
13. Get energy Ene and Esw from north east and south west (via north and south) Sum1 = Sum1+Ene, Sum2 = Sum2+Esw
14. ET(3X3) = Sum1 + Sum2
15. PS2i = ADC4i*Const_4
16. Calculate (Ei-En) and (Ei-Es)
17. IF (Ei-En) < 0 OR (Ei-Es) < 0 REJECT EVENT Select Lookup Mask corresponding to EM(3X3)
18. Calculate (Ei-Ee) and (Ei-Ew)
19. IF (Ei-Ee) < 0 OR (Ei-Ew) < 0 REJECT EVENT
20. Calculate (Ei-Ewn) and (Ei-Ees) Select value from P1 Pads
21. IF (Ei-Ewn) < 0 OR (Ei-Ees) < 0 REJECT EVENT Compare[PS1i, HADi, PS2i, ET(3X3)]

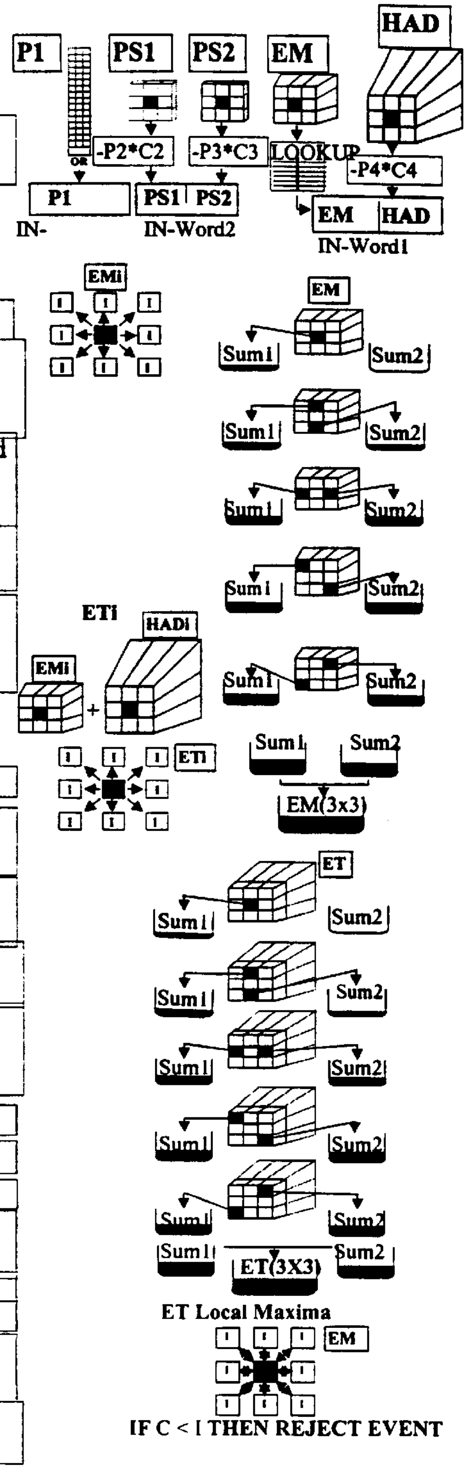

FIG. 49

22. Calculate (Ei-Ene) and (Ei-Esw)
AND P1 value with mask from the Lookup Table 23. IF (Ei-Ene) < 0 OR (Ei-Esw) < 0 REJECT EVENT

24. Load results of comparisons into the Condition Code Status Register

25. IF (PS1i<T1) OR (PS1i>T2) REJECT EVENT

26. IF (PS2i<T5) GOTO HADRON

CHECK FOR ELECTRON

27. IF (HADi>T6) REJECT EVENT

28. Calculate (EMi-EM9T)
Check mask on P1 for Positive or Negative Particle

29. IF (EMi<60%EM(3X3)) OR Veto on P1, no Positive or Negative Particle found REJECT EVENT

30. Initialize "Result" = EM(3X3)

31 IF Positive particle not found GOTO NEGATIVE

32 Set Positive particle in "Result"

NEGATIVE

33. IF Negative particle not found fetch next data

34. Set Negative particle in "Result"
Fetch next data

CHECK FOR HADRON

27. IF (ET(3X3)<T7) REJECT EVENT

28. IF (PS2i<T3) OR (PS2i>T4) REJECT EVENT

29 Initialize "Result" = ET(3X3)
Exit from Hadron Found
Fetch next data

REJECT EVENT

30 Store zero in Result
Fetch next data

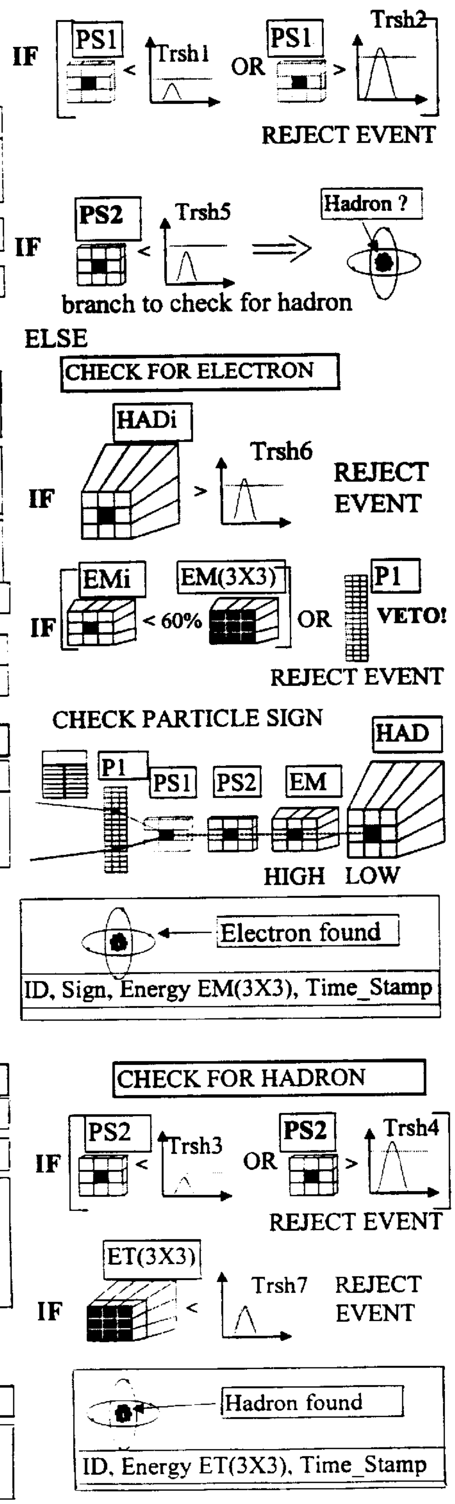

FIG. 50

Figure 56A:
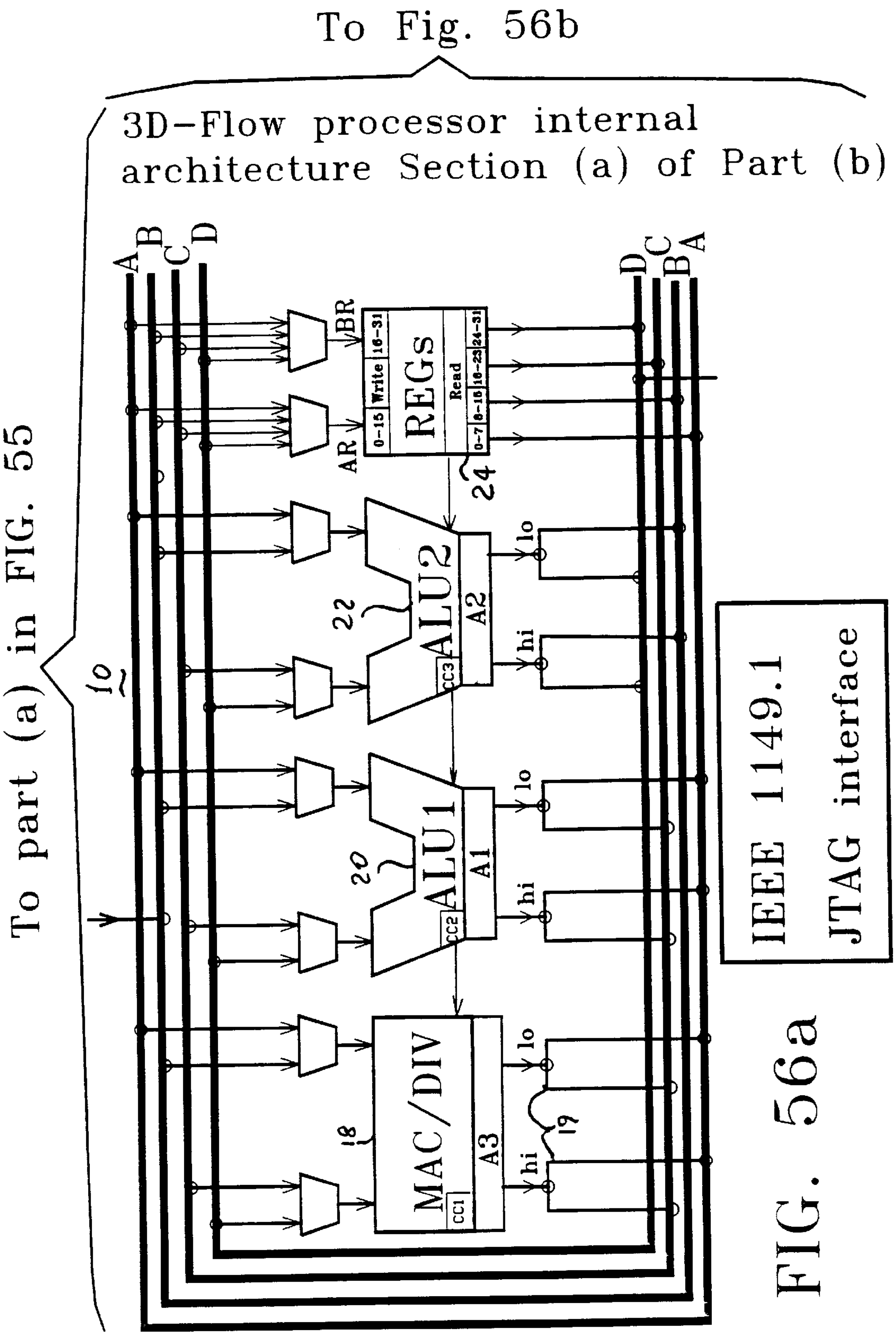
Figure 56B:
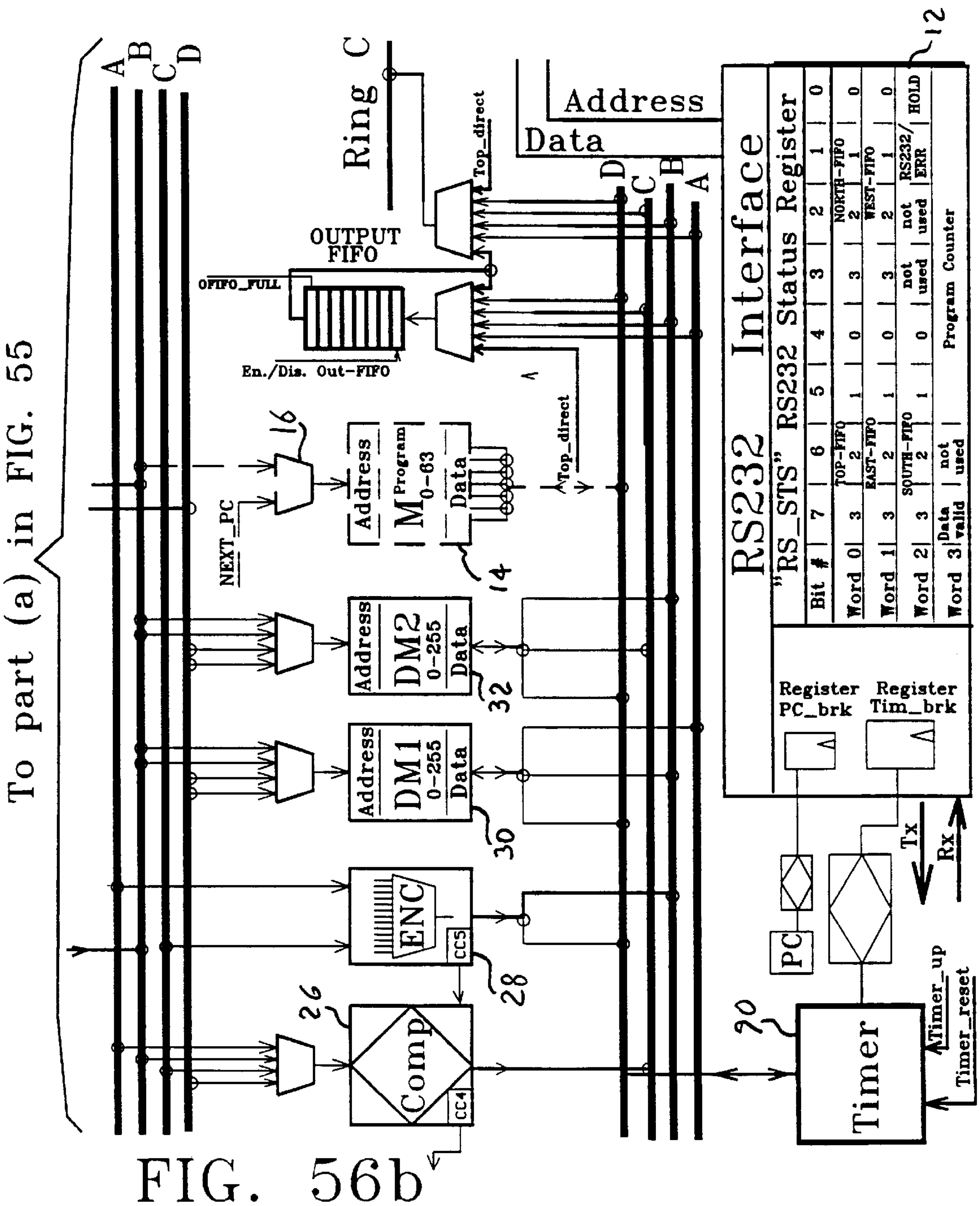
Figure 56C:
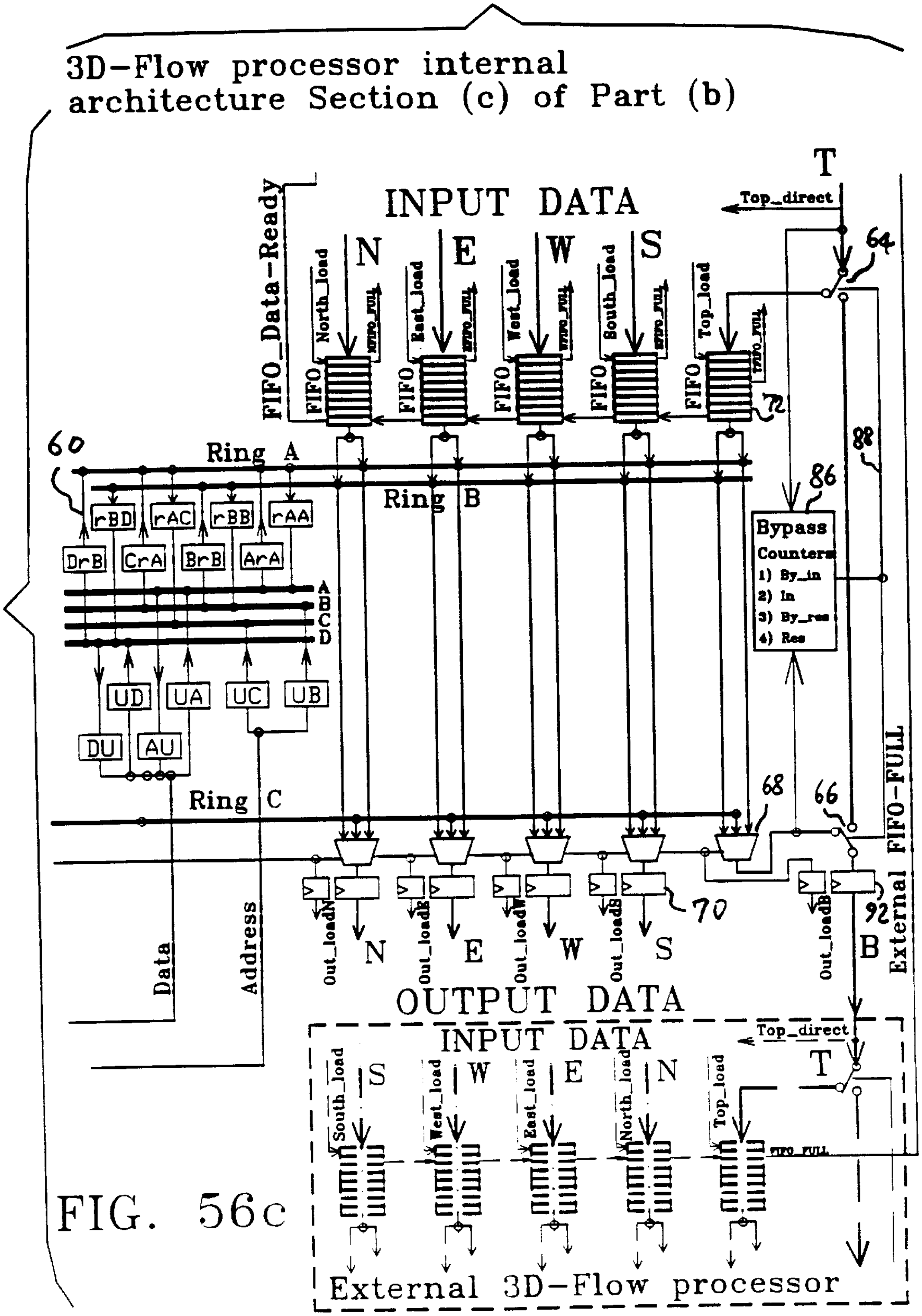

To Fig. 56c

3D–Flow processor internal architecture Section (b) of Part (b)

To Fig. 56a

Figure 55:
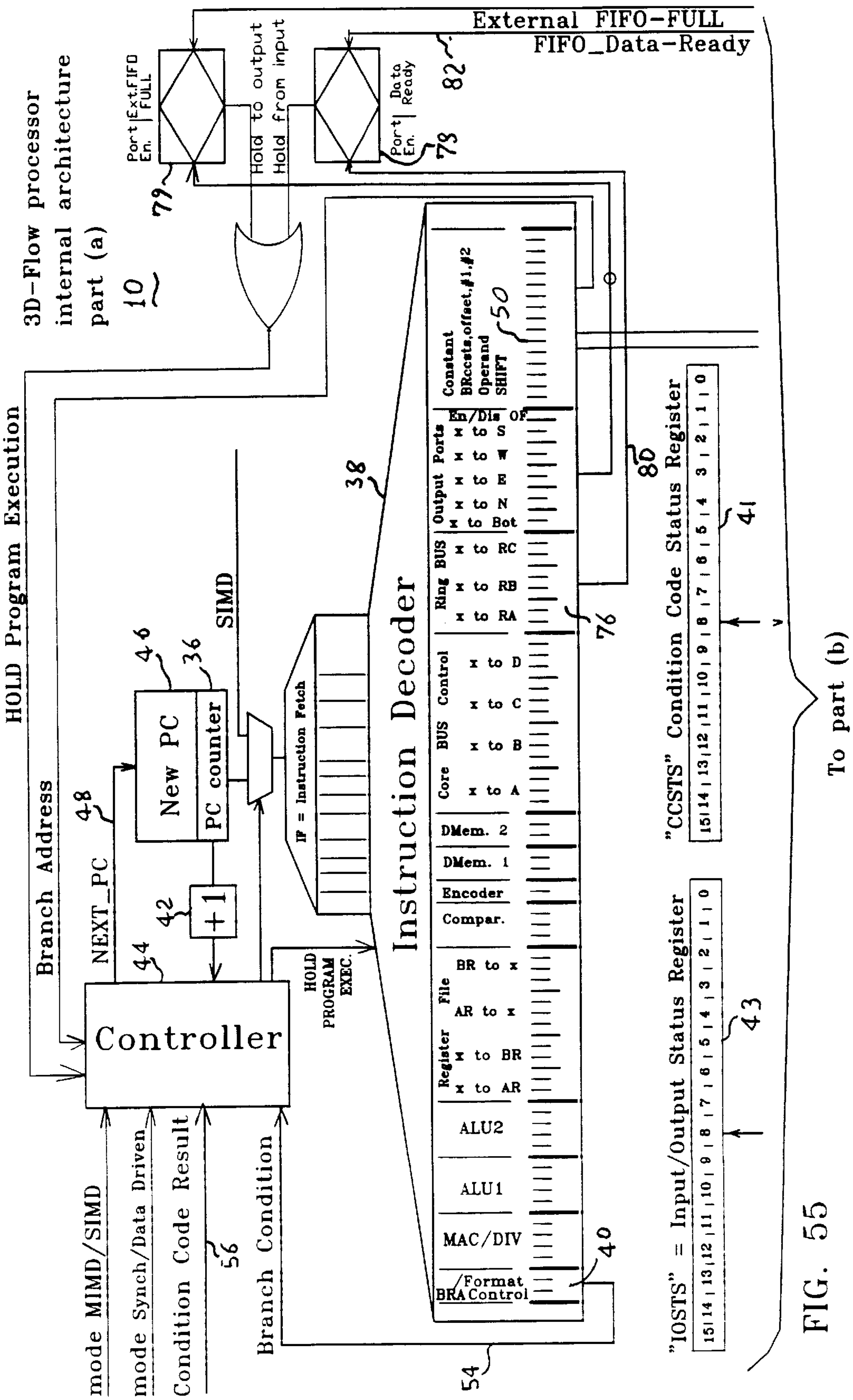

To part (a) in FIG. 55

3D-Flow processor internal architecture Section (c) of Part (b)

To Fig. 56b

Figure 65:
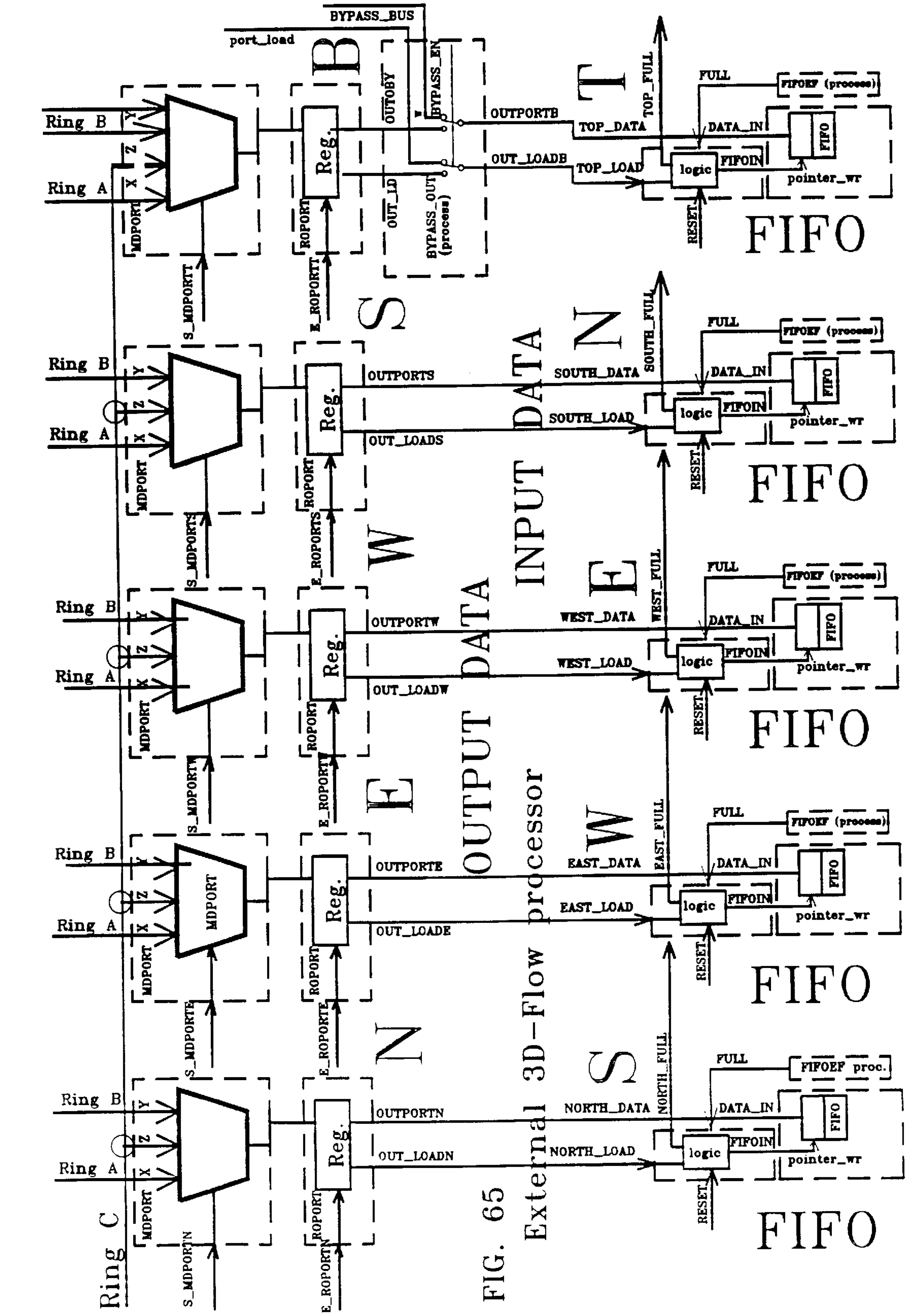
Figure 92A:
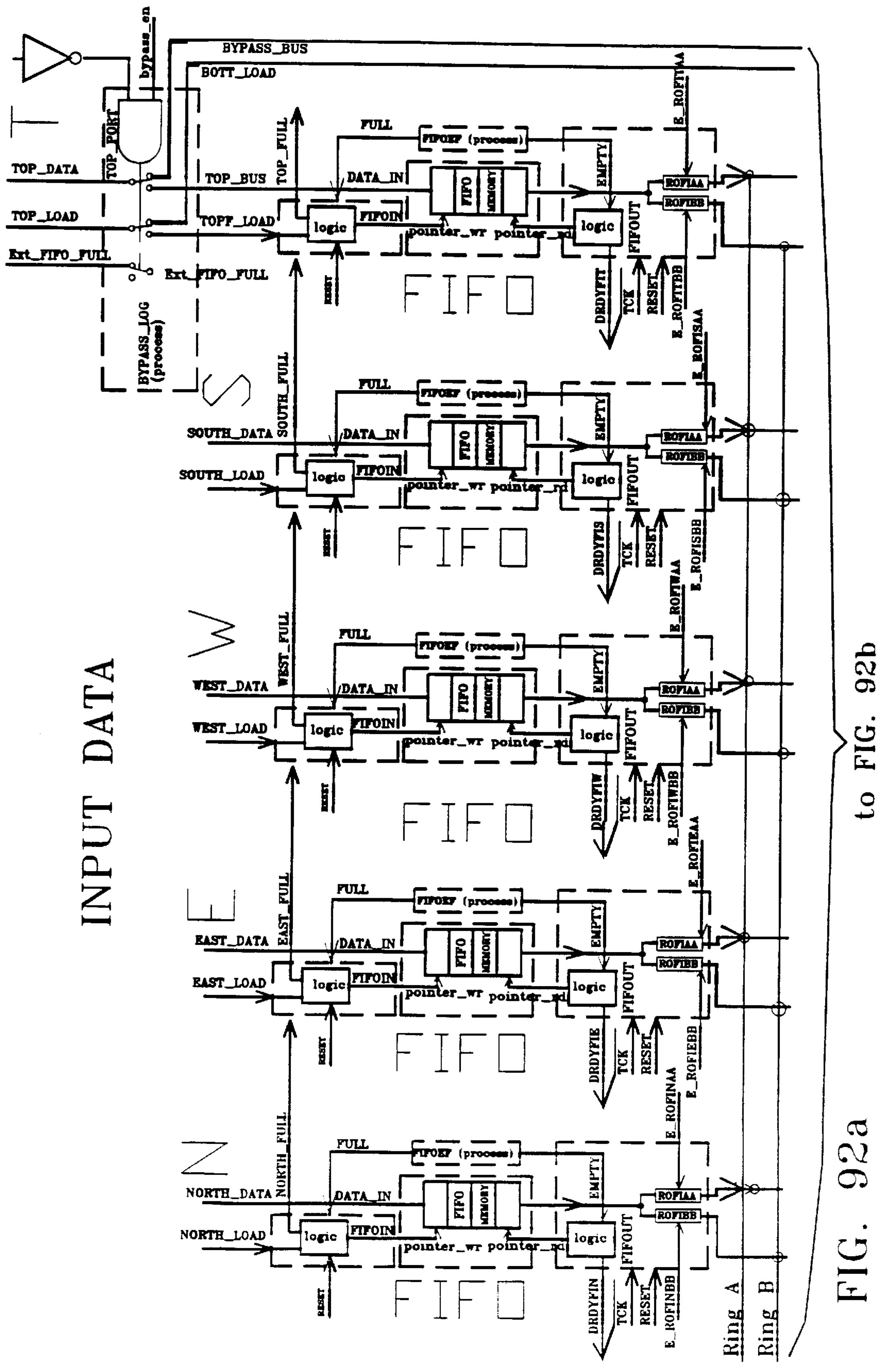
Figure 92B:
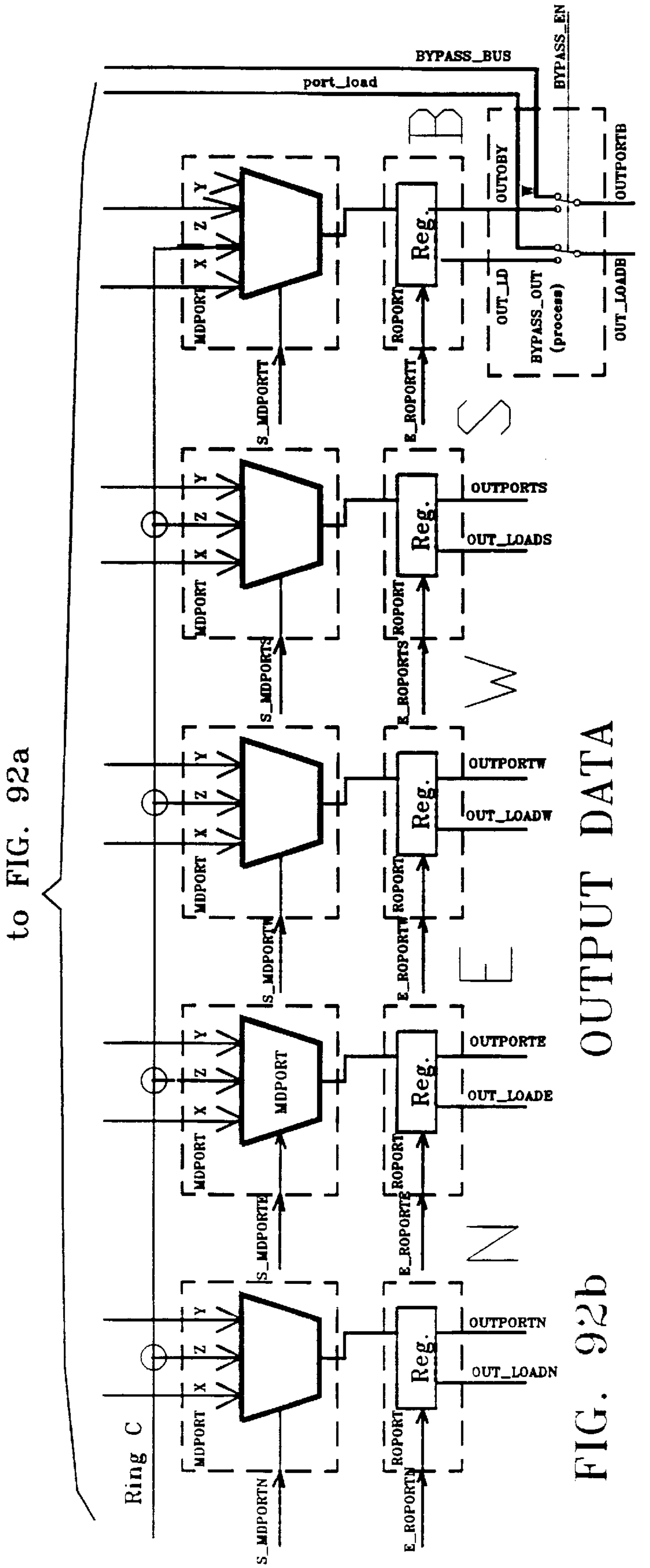

FIG. 65 External 3D-Flow processor to FIG. 92b

HIGH-SPEED, PARALLEL, PROCESSOR ARCHITECTURE FOR FRONT-END ELECTRONICS, BASED ON A SINGLE TYPE OF ASIC, AND METHOD USE THEREOF

1. RELATED APPLICATIONS

This patent application claim the benefit of prior provisional patent application filed Feb. 1, 1996, Ser. No. 60/010,952, entitled HIGH SPEED, PARALLEL PIPELINED PROCESSOR ARCHITECTURE FOR FRONT END ELECTRONICS AND METHOD OF USE THEREOF, by Dario Crosetto, the entire disclosure thereof being incorporated herein by the reference.

This patent application claim the benefit of prior provisional patent application filed Nov. 9, 1995, Ser. No. 60/006,515, entitled HIGH SPEED, PARALLEL, PIPELINED PROCESSOR ARCHITECTURE AND METHOD OF USE THEREOF, by Dario Crosetto, the entire disclosure thereof being incorporated herein by the reference.

This patent application claim the benefit of prior provisional patent application filed Oct. 16, 1995, Ser. No. 60/005,873, entitled 3D-FLOW AS A PROGRAMMABLE SYSTEM FOR MOVING AND REDUCING DATA IN DAQ APPLICATIONS, by Dario Crosetto, the disclosure of which is incorporated herein in its entirety by reference thereto.

This patent application is a continuation-in-part of prior U.S. patent application Ser. No. 08/101,489 filed Aug. 2, 1993, now abandoned, entitled PARALLEL PROCESSING ARCHITECTURE, by Dario Crosetto, the disclosure of which is incorporated herein in its entirety by reference thereto.

This patent application is a continuation-in-part of prior U.S. patent application Ser. No. 07/993,383 filed Feb. 11, 1993, now abandoned, entitled THREE DIMENSIONAL FLOW PROCESSOR, by Dario Crosetto, the disclosure of which is incorporated herein in its entirety by reference thereto.

This invention was made with Government support under contract No. DE-FG03-95ER81905/A000 between 3D-Computing, Inc. and the U.S. Department of Energy.

TECHNICAL FIELD OF THE INVENTION

The present invention relates in general to parallel and/or pipelined processors, and arrangements of a number of processors for providing high speed processing and transferal of data.

2. BACKGROUND OF THE INVENTION

Currently, systems of comparable speed are custom-built with Application Specific Integrated Circuits (ASICs) that implement fixed algorithms, rendering them inflexible.

There are several ASICs developed for front-end electronics. In the recent past, front-end electronics were built with analog techniques using discrete components. Later, with the rapid advances in digital technology, Digital Signal Processors (DSPs) replaced analog circuitry up to certain speeds. However, in many applications the user still had to design a specific hardware to implement an algorithm on the front-end signal from a detector (or sensors) because the DSPs were not fast enough or feasible.

2.1 Existing ASICs for front-end electronics

Several examples of different ASICs already built or currently under development can be found in the literature. For medical instruments, large companies such as Siemens, Philips, General Electric, Picker, and Positron have their own specific front-end circuits. A large variety of front-end ASICs are also under development in the HEP community, where there is a high demand for performance in speed and discernment of particular signals, coincidences, and pattern recognition among a large number of channels. These ASICs are built by several institutes, universities, and national and international laboratories. A partial list of experiments using ASICs at the front end includes:

- At the European Center for Nuclear Research, ASICs have been developed or are under development for DELPHI, OPAL, L3, ALEPH, NA48, CMS, and ATLAS experiments. In the context of the research and development program at CERN, several ASICs are under development, such as RD27 and RD16 (digital front-end readout microsystem for calorimetry at LHC, Fermi, etc.).
- At Fermilab for the D0, CDF, experiments, etc.
- At Brookhaven National Laboratory for the experiment at RHIC, i.e., STAR and FENIX.
- Most of these experiments have built or are building ASICs for first-level trigger or data reduction from several sub-detectors. Not all the circuits or ASICs provided in the references could be replaced by the 3D-Flow system.

2.2 Parallel processing in general

Some applications require concurrent processing because no available processor has sufficient speed to sustain the high demand of computing power in the allowed time using a sequential approach.

Parallelism increases the execution speed of a task and is in some cases more cost-effective; however, it raises a new set of complex and challenging problems.

Parallel processing comprises algorithms, computer architecture, programming, and performance analysis. There is a strong interaction between these aspects, and only global understanding allows designers to make the proper trade-offs in order to increase overall efficiency.

2.3 Pipelined systems in general, and well-known techniques

Pipelining is an implementation technique to make faster CPUs in which multiple instructions are overlapped in execution.

An instruction can be divided into small steps, each one taking a fraction of the time to complete the entire instruction. Each of these steps is called a pipe stage or a pipe segment. The stages are connected to one another to form a pipe. The instruction enters one end of the pipe and exits from the other. The throughput of a pipeline is determined by how often an instruction exits the pipeline. At each step, all stages are executing their fraction of the task, passing on the result to the next stage and receiving from the previous stage. As the stages of the pipeline are connected, they need to process at the same time, because they need to send and receive data to/from different stages simultaneously.

2.4 Existing combination of parallel processing and pipelining

The combination of parallel processing and pipeline implementation techniques increases the throughput performance of a system when the algorithm to be executed is divisible into several tasks that can be executed concurrently.

This technique is used in commercially available systems, but it is limited in its capacity to distribute processes to several processors while keeping the communication protocol efficient and minimizing overall task execution time.

Commercial systems such as Hypercube are suitable for solving general-purpose problems using a large number of standard micro-processors. These systems certainly have advantages in the execution of some algorithms that can be programmed for concurrent operations. However, they are limited in speed due to the system protocol overhead and by the fact that they address general-purpose problems, which have obligatory serial sections.

3. SUMMARY OF THE INVENTION

The 3D-Flow processor system is a new concept in very fast, real-time system architecture.

The throughput of this system can reach up to several million frames/sec, yet unlike currently available systems of comparable speed, it is fully programmable and extremely flexible. Applications requiring very high data throughput can easily be implemented on a 3D-Flow system to achieve a real-time processing system with a very short lag time.[22-23-24-25-26-27-28-29]

The programmability of the 3D-Flow system makes it suitable for real-time data processing applications required in a wide range of fields. The system is also highly modular and incrementally upgradeable.

The main characteristics of the 3D-Flow system architectures based on a single 3D-Flow ASIC are the following:

3.1 System level

Objective

Oriented toward data acquisition, data movement, pattern recognition, data coding and reduction.

Design considerations

- Quick and flexible acquisition and exchange of data, but not necessarily in fully bi-directional manner.
- Possibility of dedicating small area to program memory in favor of multiple processors per chip and multiple execution units per processor, data-driven components (FIFOs, buffers), and internal data memory. (Most algorithms that this system aims to solve are short and highly repetitive, thus requiring little program memory.)
- Balance of data processing and data movement with very few external components.
- Programmability and flexibility provided by enabling downloading of different algorithms into a program RAM memory.
- High priority of modularity and scalability, permitting solutions for many different types and sizes of applications using regular connections and repeated components.

The various applications of the 3D-Flow ASIC are:

i) Several applications are described, ranging from medical imaging (PET/SPECT), to high energy physics (LHC-B electron and hadron identification from preshowers, electromagnetic, hadronic and pads detector compartment, and identification of muons from five pad-projective chambers), to industrial control in applications using video cameras such as the example of the iterative search algorithm in an area of 5×5 pixels for photon counting.

ii) Three different algorithms (LHC-B electrons, LHC-B electrons and hadrons, and iterative search on a 5×5 pixel area) have been simulated on the 3D-Flow simulator system for which no programmable solution currently exists and the details are reported herein at Sections 5.9.2, 5.9.3, and 5.9.4.

iii) Functional simulation at the transistor level providing to the input of the VHDL (the VHDL V-System Windows simulation system purchased from Model Technologies, provides a full VHDL environment on IBM PC (or compatible) running Windows '95 or Windows NT) processor model compiled in CMOS 0.5 μm gate array, the 96-bit instruction word string and exercising all the decoding, multiplexing and instruction executions as described in Appendix A.

Described below are algorithms for recognizing an object (particle or the path of a particle) from thousands of input channels at a rate up to 80 MHz, to the system architecture, processor architecture, interfacing, data flow, algorithm execution on a single processor and on a multiprocessor system, object identification, data reduction and channel reduction. Any phase of the process, or step, or path can be simulated in detail.

It can be further appreciated that the three different applications are not limited to providing a common solution to those three applications. This demonstrates that there is no need to develop three different ASICs, and, more importantly, that the detailed description of the architecture, interface, and the single steps of the algorithms provide to the user a powerful tool to modify the present solution and to envisage the use of the 3D-Flow for other applications.

The techniques implements zero suppression from thousands of input channels at a rate of several MHz, based on pattern recognition algorithms on nearest neighbors and subsequently to route, in a few cycles, any of the non zero data (which were accepted by the pattern recognition algorithm), together with its associated ID and time stamp, to a single output channel.

The pyramidal technique used to funnel the data after zero suppression to a single (or a fewer number of channels) is applied to the described 3D-Flow processor which is limited, in the current implementation to input only two data every clock cycle. However, a further upgrade of the system could allow input data from the four (or eight neighbors if one considers the processors at the corner of the array) inputs in a single clock cycle. In this latter case, the concept of routing the data to a single (or to a second array of processors with a fewer number of channels) output channel will be the same, but it will be accomplished in even a fewer number of steps.

3.2 System architecture

To maintain scalability with regular connections in real time, a three-dimensional architecture is utilized, with one dimension essentially reserved for the unidirectional time axis and the other two dimensions as bi-directional spatial axes. A schematic view of the system is presented in FIG. 5, (see FIG. 2 for the processor internal architecture and FIG. 3 for its I/O) where the input data from the external sensing device are connected to the first stage of the 3D-Flow processor array.

The program execution at stage 1 must not only route the new incoming data from the sensor to the next stage in the pipeline (stage #2), but must also execute its own algorithm. Thus, in the pipelined 3D-Flow parallel-processing architecture, each processor of the stack executes an algorithm on a set of data from beginning to end (e.g., the event in High Energy Physics—HEP experiments or the picture in graphic applications).

Figure 7:
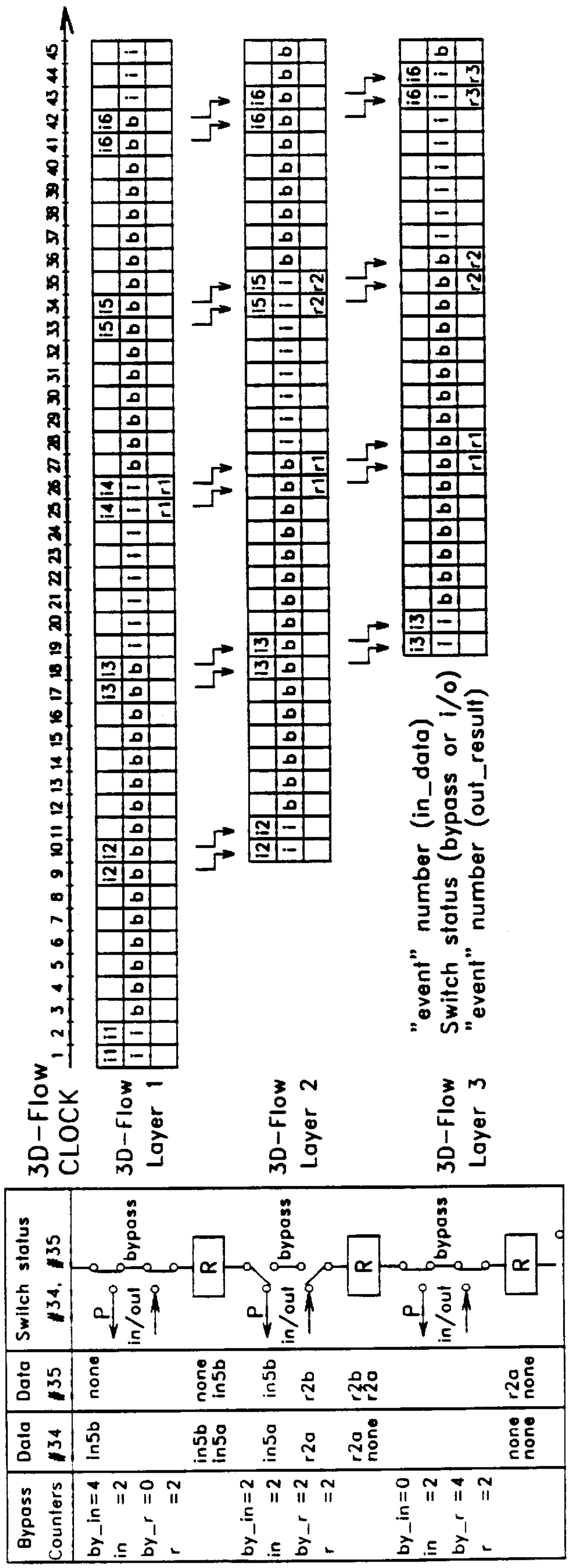

Input data flows from "Top layer" to the appropriate subsequent "layer" where it is processed. Results from this processing flow to the "bottom layer" of the 3D-Flow system. Four counters in each processor arbitrate the position of the bypass/in-out switches in order to achieve the proper routing of data. FIG. 7 also shows the control by the 3D-Flow internal counters of the bypass/in-out switches position for a 3D-Flow system made of three layers and with the following configuration: maximum input data rate of ⅛ of the 3D-Flow processor clock frequency, algorithm length of 24 steps, and two input and two output values at each processor for each algorithm execution (event in HEP, frame in graphics).

This architecture implies that applications are mapped onto conceptual two-dimensional grids normal to the time axis. The extensions of these grids depend upon the amount of flow and processing at each point in the acquisition and reduction procedure.

An image-processing application fits this architecture quite closely. When new data arrive or the reduction possible with the program executing in one plane is considered, the intermediate data is transferred to the next plane, which has a number of processing elements compatible with the new data extension.

Figure 8:
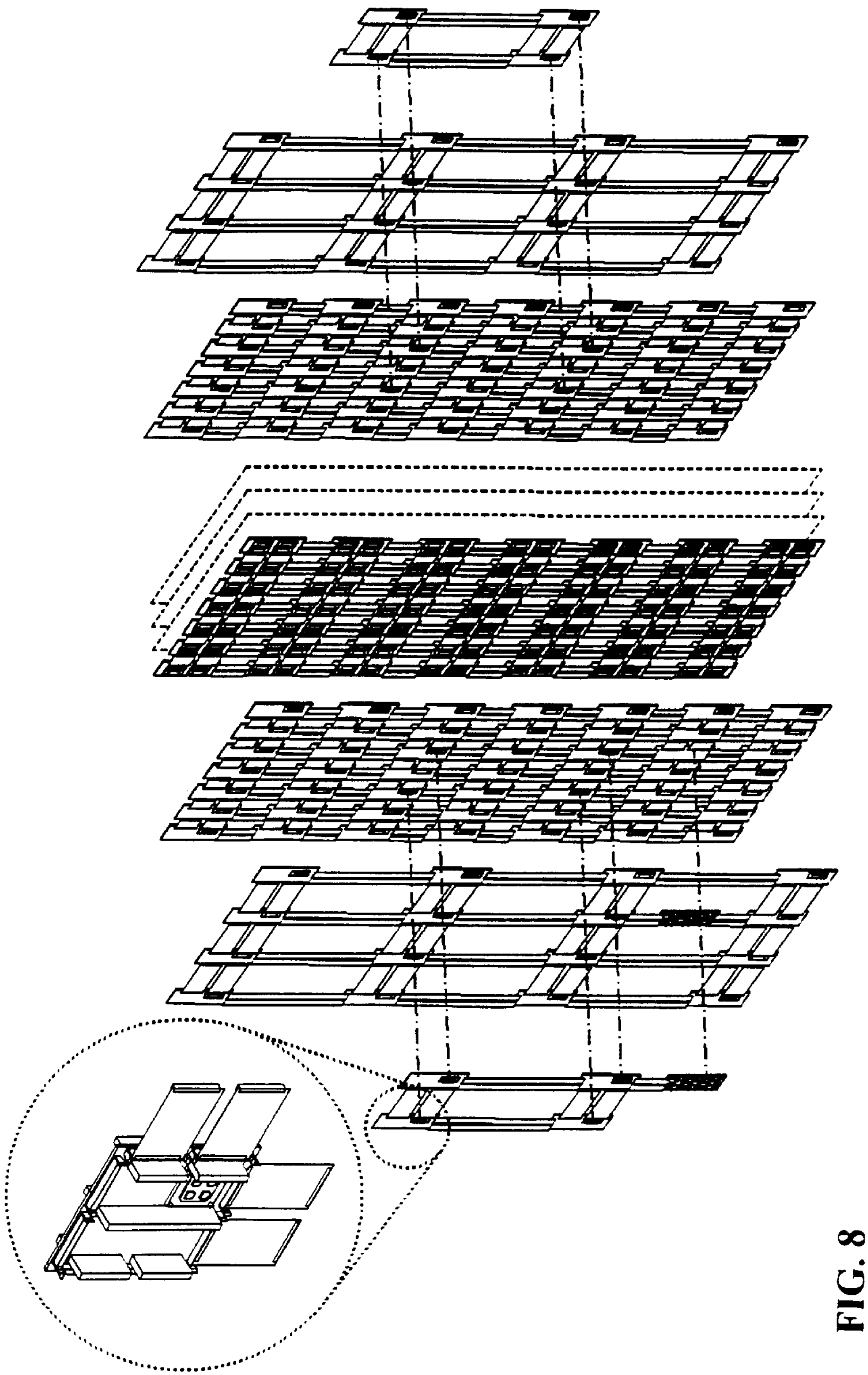

FIG. 8 shows a possible system configuration in which the same processor and connectors have been used to distribute a pixel stream arriving from a television scanning (or CCD) sensor to the reduction stack for processing and then to final summarizing. This double pyramid has been defined with two types of printed circuit boards (PCB) and short connecting cables of only slightly different lengths. Short in this context means that no other geometrical configuration can obtain shorter length in a scaleable manner. Two types of PCBs can be used, one with four processor chips and the other with one.

In high-energy physics applications, only the processing stack and summarizing planes are necessary in current event detectors.

3.3 Processor architecture

To meet the real-time and system objectives at a reasonable cost, a 16-bit processor (see FIG. 2 and FIG. 3) architecture layout combines multiple execution units, four internal buses, three external buses, six communication channels, and three memory banks.

Operation modes of the processor are determined by two external input mode pins (MIMD/SIMD and SYNC/Data Driven).

The SIMD mode causes the processor to accept as its next instruction two 48-bit instruction words through a single 48-bit input port valid for all four processors on the chip. In the MIMD mode, each processor executes the instruction sequence stored in its own 64-word, 96-bit-wide program memory.

SYNC mode implies that instruction execution proceeds with each clock pulse, while the Data Driven mode implies that an instruction is executed only when all its inputs are satisfied.

The execution unit consists of a multiply-accumulate/divider (MAC/DIV), two identical ALUs, four comparator banks, an event counter, an encoder, and three shifters.

As a multiplier, the first unit multiplies two 16-bit operands to yield a 32-bit product that is then added to the accumulator (signed or unsigned). As a divider, it divides 16-bit by 16-bit (signed or unsigned) words to yield a variable precision quotient and 16-bit remainder.

The ALUs have 16-bit operands and 32-bit accumulators. All three accumulators can perform logical and shift operations independently.

There is a multiple comparator and a single comparator. The multiple version produces the result of comparing the 16-bit data on each internal bus with its respective bank of eight monotonic 16-bit levels. Each such comparison produces an encoded 4-bit value. The four encoded results are available in the multiple comparator output register. The single comparator determines the result of comparing any two sources and leaves it in the condition code register.

The encoder initially provides the total number of zero-to-one transitions starting on the right, and for each furnishes the position and the subsequent number of ones as an output sequence of 16-bit words.

The event counter simply counts the number of external pulses from a selectable source and can be preloaded and read by the processor. It is useful to tag data streams such as events in HEP experiments.

Internal memory is arranged according to a Harvard model in one instruction memory bank and two data memory banks. In MIMD mode the usual program counter serves as pointer into the first, while for each data memory bank there is a programmable memory address and output register. Semiconductor area is reserved for these internal memory banks to facilitate the configuration of systems with an absolute minimum of component types. The dimension of the data memory banks is 256 16-bit-wide words.

The set of programmable registers is substantial rich for such a compact processor. Besides the 32 16-bit general registers, there is a 32-bit accumulator associated with the MAC/DIV and with each ALU (for a total of three), an encoder result register (16-bit), two data memory address (8-bit) and output (16-bit) registers, five output port registers (16-bit), five input FIFOs, an I/O status register, the event counter (16-bit), and the condition code (16-bit). The latter contains conditions from both ALUs, from the single comparator, from the MAC/DIV, and from the encoder. The I/O status register provides five "EMPTY" bits from the input FIFOs and the five "FULL" bits from the input FIFO of the adjacent 3D-Flow processors.

Serial I/O according to the well-known RS232 standard is used to load MIMD programs, the four sets of 8-bit monotonic levels that initialize the multiple comparator, and the set of in/out/bypass counters noted above.

The six communication channels reflect the real-time orientation of the system. Four bi-directional channels (North, East, West, and South) provide nearest neighbor connections in a planar grid. Time progression is reflected in the Top input channel and Bottom output channel. Since raw data may arrive faster than it can be processed in one processor plane, there is a Top-to-Bottom bypass switch mechanism 64 and 66 (implemented as two multiplexer with two inputs and one output, controlled by one bit which is the result of the bypass counters 86) controllable through two bypass counters (input and result), an input counter, and a result counter (86). All input channels have FIFO buffers to optimize inter-processor synchronization and permit data-driven operation.

Since the performance of the processor is very high and the design is simple and fast, it is controlled by a very long instruction word (96 bits) rather than a superscalar microprocessor dispatching several instructions per clock cycle. Thus the programming style is essentially that of microprogramming. This choice is reasonable given the highly optimized programs necessary in dedicated, highly repetitive, low-level data acquisition, movement and processing for which the system is intended.

In accordance with the principles and concepts of the present invention, there is disclosed a multi-processor architecture, and method of programming thereof, for overcoming or substantially reducing the problems and shortcomings of present processing systems. In accordance with a preferred embodiment of the invention, there is disclosed a pyramidal processing architecture for funneling high speed data from a large number of parallel inputs to a single serial output. The architecture includes a number of cascade layers of processors arranged for pyramiding plural inputs from the base of the pyramid architecture to a single serial output of the apex of the pyramid. The base layer of the pyramid is formed with many processors, the apex of the pyramid includes a single processor, and the intermediate layers include an intermediate number of processors. The various processors of the pyramid are substantially identical in construction and may be programmed somewhat differently from the other neighbor processors of the pyramid. However, various processors of the pyramid may include the same basic funneling program for routing data and funneling the same from the pyramid base to the apex.

In accordance with an important feature of the invention, each processor of the pyramid is programmed to receive and buffer data from any of a plurality of input ports and transfer the data to one or more output ports, or to pass data received from an input port via a side output port to a neighboring processor in the layer, or pass data directly to a processor in a subsequent layer of the pyramid hierarchy via a bottom port, or both. Each processor further includes a number of ports for receiving data from a neighbor processor. As a result, an extremely high speed funneling of data can be realized.

According to a preferred form of the invention, when utilized in conjunction with high energy physics applications, medical applications, etc., a layered stack or array of the same general type of processors can be programmed to receive the plural data inputs, process the data according to an algorithm, and then pass the parallel processed data to the base of the processor pyramid for funneling purposes. Each data word (representing, for example, a value) processed by a processor in the stack, is associated with a time parameter during processing. When the processed value and time parameters are passed to the pyramid base layer from the processor stack, a spatial location parameter is appended to the information so that its location information is not lost during the funneling process. Other processors down line from the pyramid architecture can be programmed to correlate or further process the high speed data as to time, location, event characteristic or a combination of the same. Further, the processed data can then be presented as a visual image either in two dimensional or three dimensional form. The pyramidal architecture of processors utilizes substantially the same hardware for each layer or stage of the pyramid and is programmed to generally route data rather than process data. Preferably, each processor of the pyramid has five input ports and five output ports, and can pass input data via an internal bus arrangement of the processor to any of the output ports. Further, each processor has the capability to pass data directly from an input top port to an output bottom port in one clock cycles without involvement of the processor internal bus arrangement.

In accordance with another feature of the invention, the processor architectures according to the invention can be programmed to efficiently detect objects (with pattern recognition) at high speed (up to 100 Mhz or the upper limits inherently placed by the technology on microprocessor speed) and detect the path of high speed particles, energy, radiation, and fast moving objects such as airplanes, missiles, etc. A dual processor stack-pyramid arrangement is operated in one example in conjunction with a multiple plane muon particle detector. A first processor stack has a first layer with fewer processors than the number of sensor pads in a single detector plane. Each processor of the first stack layer received sensor data from a number of sensor pads in each muon detector plane. The processing algorithm of each processor of the first stack merely determines if there is a muon hit in a detector pad of a reference plane ($\mu$4 detector plane) and if so, determines if there is at least one muon hit in a specified group of sensor pads in the two subsequent detector planes ($\mu$5 and $\mu$6 plane). If muon hits are detected in the $\mu$4 reference pad in a sensor pad in the selected group of pads in each of the $\mu$5 and $\mu$6 planes, then a larger group of sensor pad data surrounding the seed of the track candidate which has a hit in the $\mu$4 plane, is collected by the processor and sent to the processor pyramid for funneling the data to a second stack-pyramid arrangement. However, since the group of sensor pad data sent to the second stack-pyramid arrangement is larger than input to the processor from the muon multi-plane detector, the processor received data directly from those neighbor processors that received the pertinent sensor pad data from the muon multi-plane detector. In addition, the processor also transmits data of a number of pads to other neighbor processors, thereby sharing the sensor pad data so that the other processors can process data to find candidate muon hits using sensor data from pads of the muon detector other than that received directly from muon detector planes. In the preferred form of the invention, each processor of the first layer of the first stack receives data directly from the planes of the muon multi-plane detector, transmits and receives sensor pad data to/from its neighbor processors, and then passes the processed data to a subsequent processor layer via a bottom output port.

The processed and funneled data from the first stack-pyramid structure is received by a second stack processor arrangement and further processed as to the relevant sensor pads in all muon detector planes to determine if a true muon path has been detected. The results of the second processor stack are then funneled by a second processor pyramid to a single output stream of data used in the scientific analysis of the particles.

The methods of the invention include processing data generated by particles, energy, etc., in both high energy physics, medical applications, and many other applications. A processor stack-pyramid arrangement can be utilized to collect high speed data from a sensory matrix, process the data in the stack with little or no dead time, and then pass the parallel data from the stack processors to the pyramid to funnel the data to a fewer number of outputs.

Different arrangements of different number of stack-layers of different sizes can be built to optimize the cost (number of processors) for each application. The information on how to select the number of stacks-layers and sizes, is given by simulating the entire system before construction. In the case of the example mentioned above, it is known from simulation that among the signals from 6000×5 planes received by the 3D-Flow system every 25 nanosecond, only 3 to 4 signals on plane 4 out of 6000 pass the first criteria of having a coincidence on plane 5 and 6 as described above. Furthermore, it is estimated that only one out of 100 input sampling have such valid signals. Given the total algorithm length to validate a track estimated to be of 85 steps and the check of the first criteria (coincidence of planes 4, 5, and 6) be less then 15 cycles, than it is optimized to have the first short part of the algorithm executed in the large processor array (80×12 processors) and the longer part of the algorithm in a smaller array of (4×4 processors).

For each application, given the input data rate, the reduction factor at different phases of the algorithm, and the number of data needed to be transferred from one phase to the next phase, then the dimension of the system can be defined and checked against bottlenecks.

4. BRIEF DESCRIPTION OF THE DRAWINGS

Figure 2:
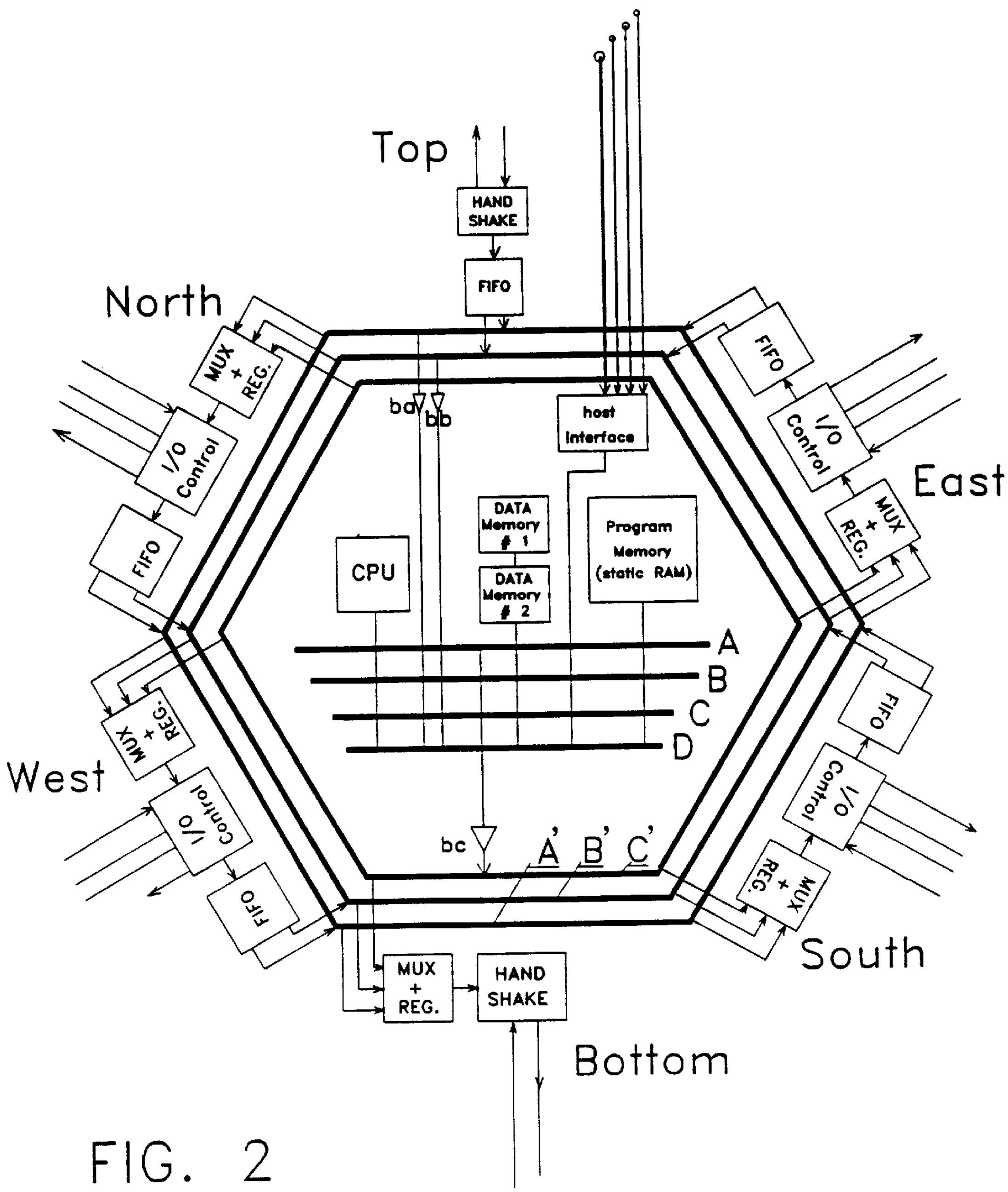
Figure 3:
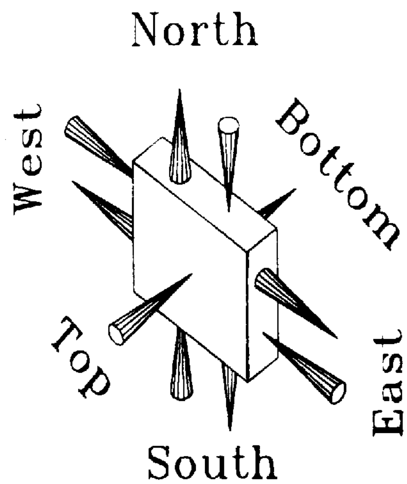
Figure 4:
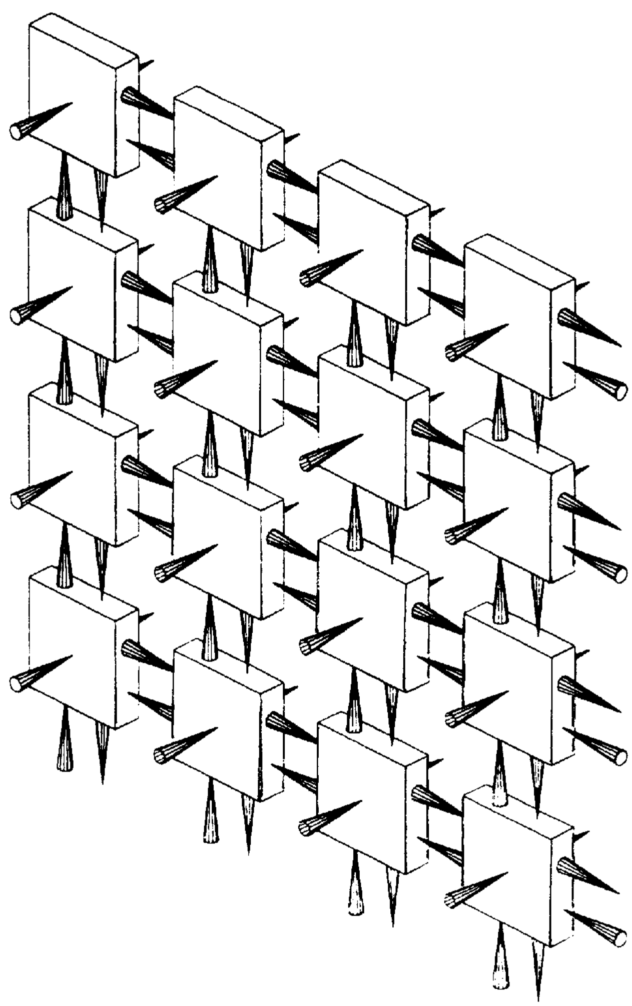
Figure 5:
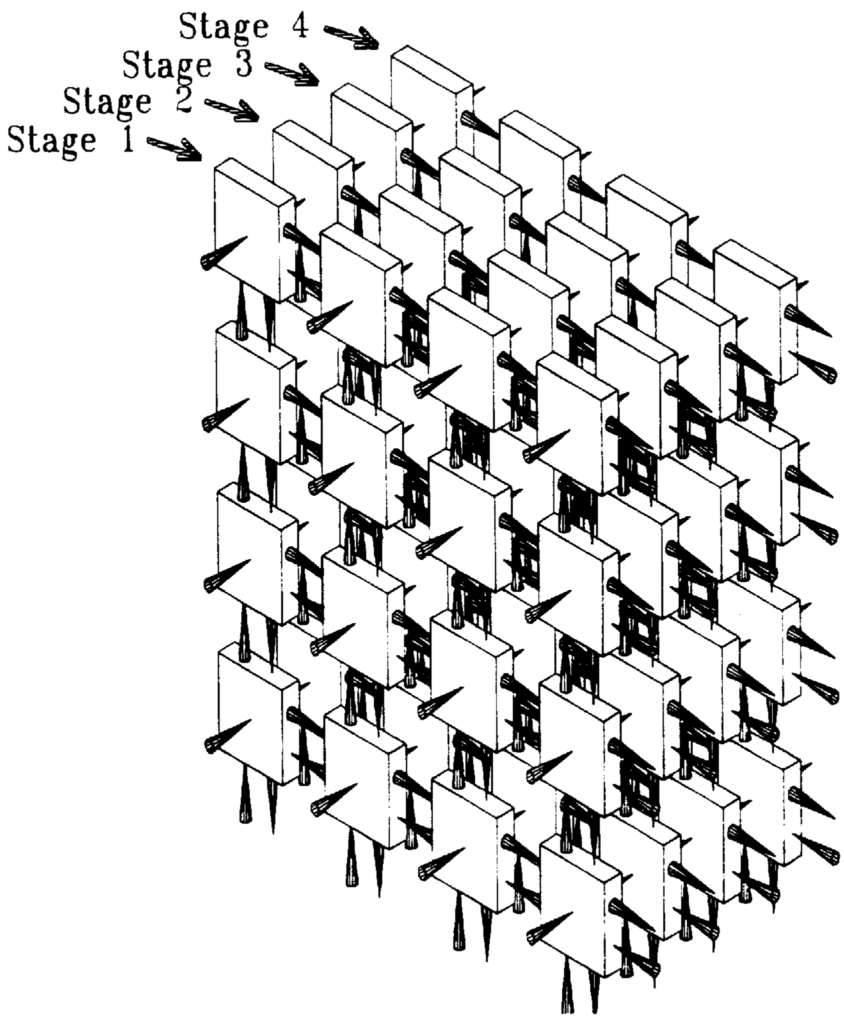

Further features and advantages will become apparent from the following and more particular description of the preferred and other embodiments of the invention, as illustrated in the accompanying drawings in which like reference characters generally refer to the same parts, elements or functions throughout the views, and in which:

FIG. 1. Described is a technique to build a test-bench that includes 20 3D-Flow ASICs, 12 small boards, an assembler, enhancements to the simulator, system integration software and application software. This platform enables the test of different applications in real-time;

FIG. 2. Is a generalized block diagram of the processor utilized with the invention;

FIG. 3. 3D-is an isometric view of a processor shown in block form, illustrating the various input and output ports;

FIG. 4. Is an isometric view of plural stages of the processor of FIG. 3;

FIG. 5. General scheme of the 3D-Flow pipeline parallel-processing architecture.

Figure 6:
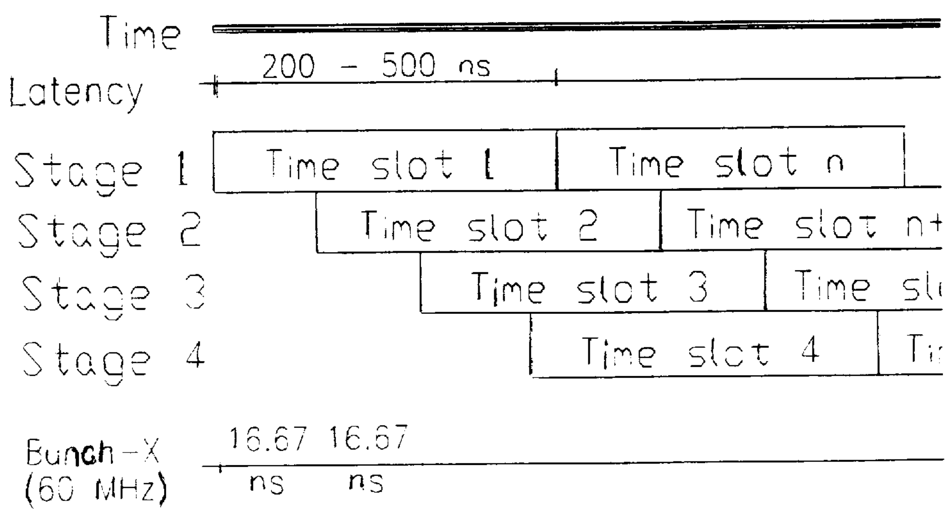

FIG. 6. Timing diagram of four 3D Flow pipelined stages.

FIG. 7. Position of the bypass switches for the data flow (Input/Output) from "Top layer" to "Bottom layer" of the 3D-Flow system.

FIG. 8. Example of an interface using the 3D-Flow system, with single-source input and output.

Figure 9:
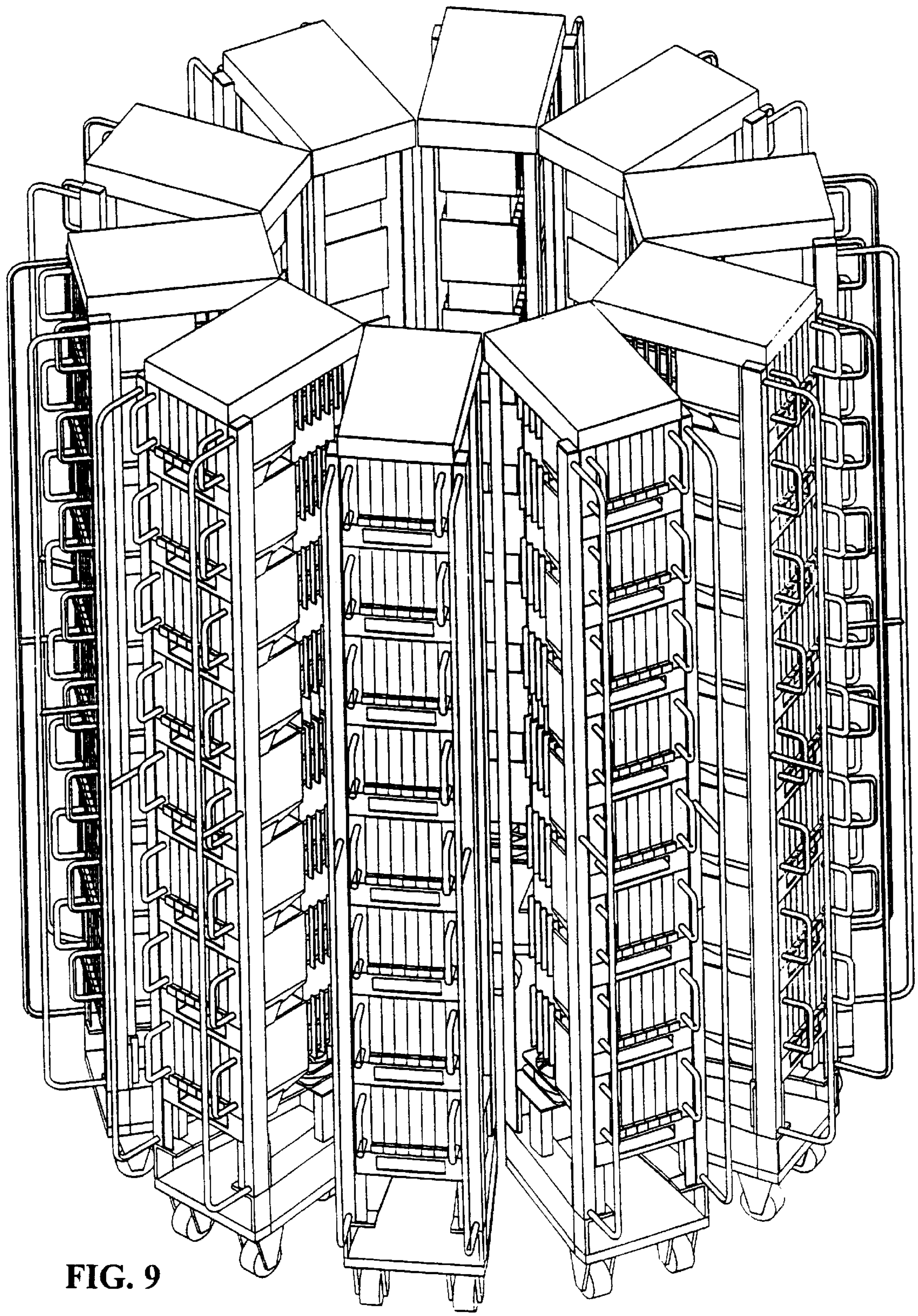

FIG. 9. 3D-Flow system in a cylindrical assembly with 1280 parallel input channels.

Figure 10:
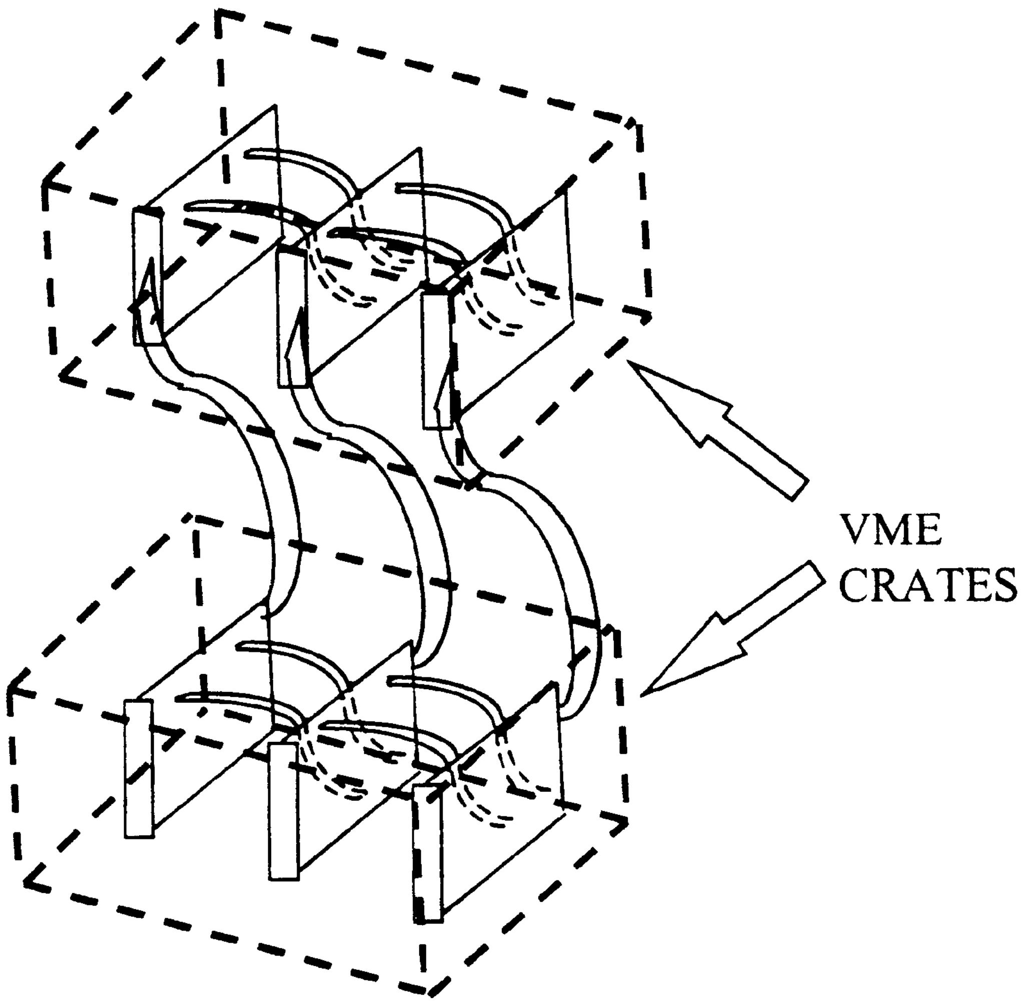

FIG. 10. Example of assembling a 3D-Flow system with standard enclosure.

Figure 11:
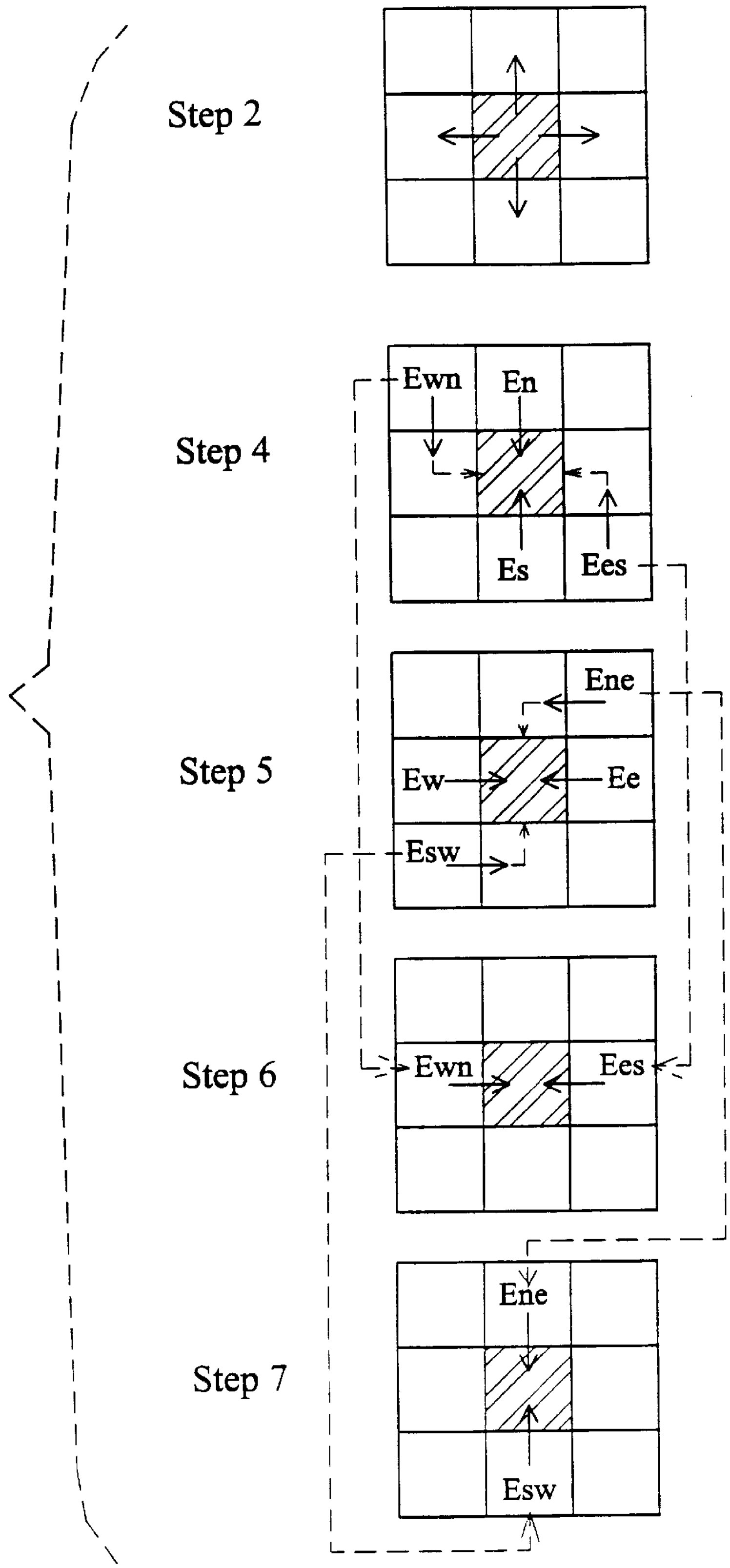

FIG. 11. Routing 3×3 information to each processor in seven steps. Each data sent from one processor to adjacent processor takes two clock cycles to be fetched by the adjacent processor.

Figure 12:
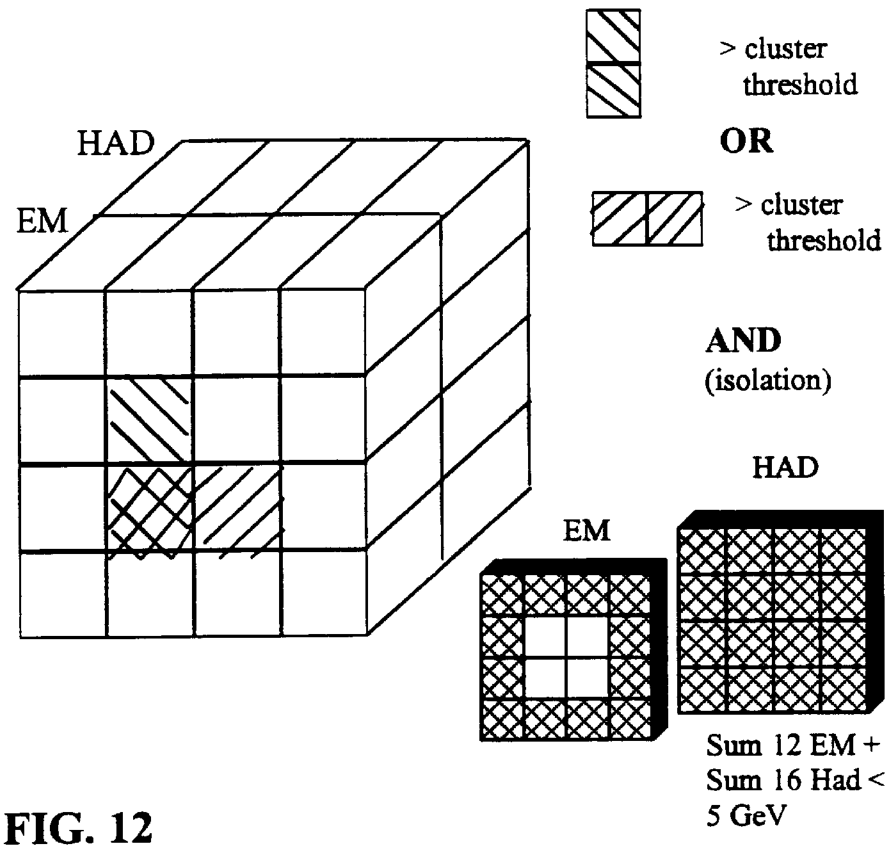

FIG. 12. Technique of pattern recognition on a 4×4 input data from sensors.

Figure 13:
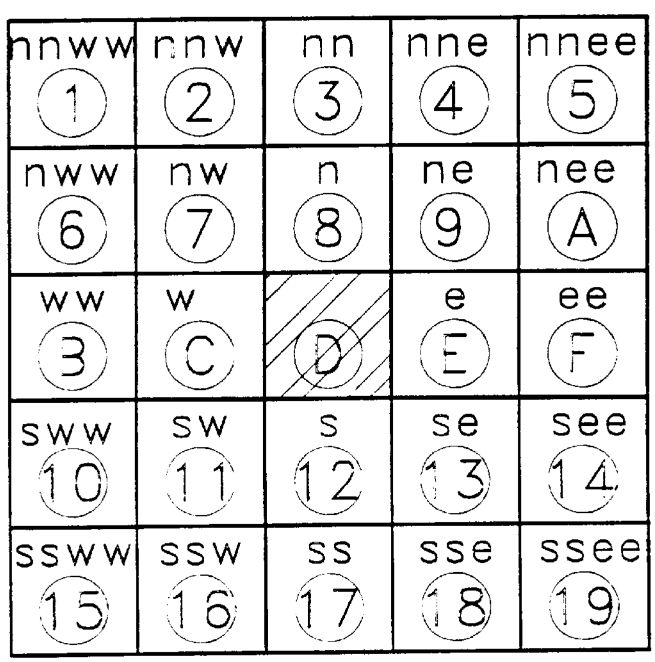

FIG. 13. Layout and names of the 24 cells of a 5×5 pixels area surrounding the seed element. It must be read north-west-west (nww), south-south-east-east (ssee), etc.

Figure 14:
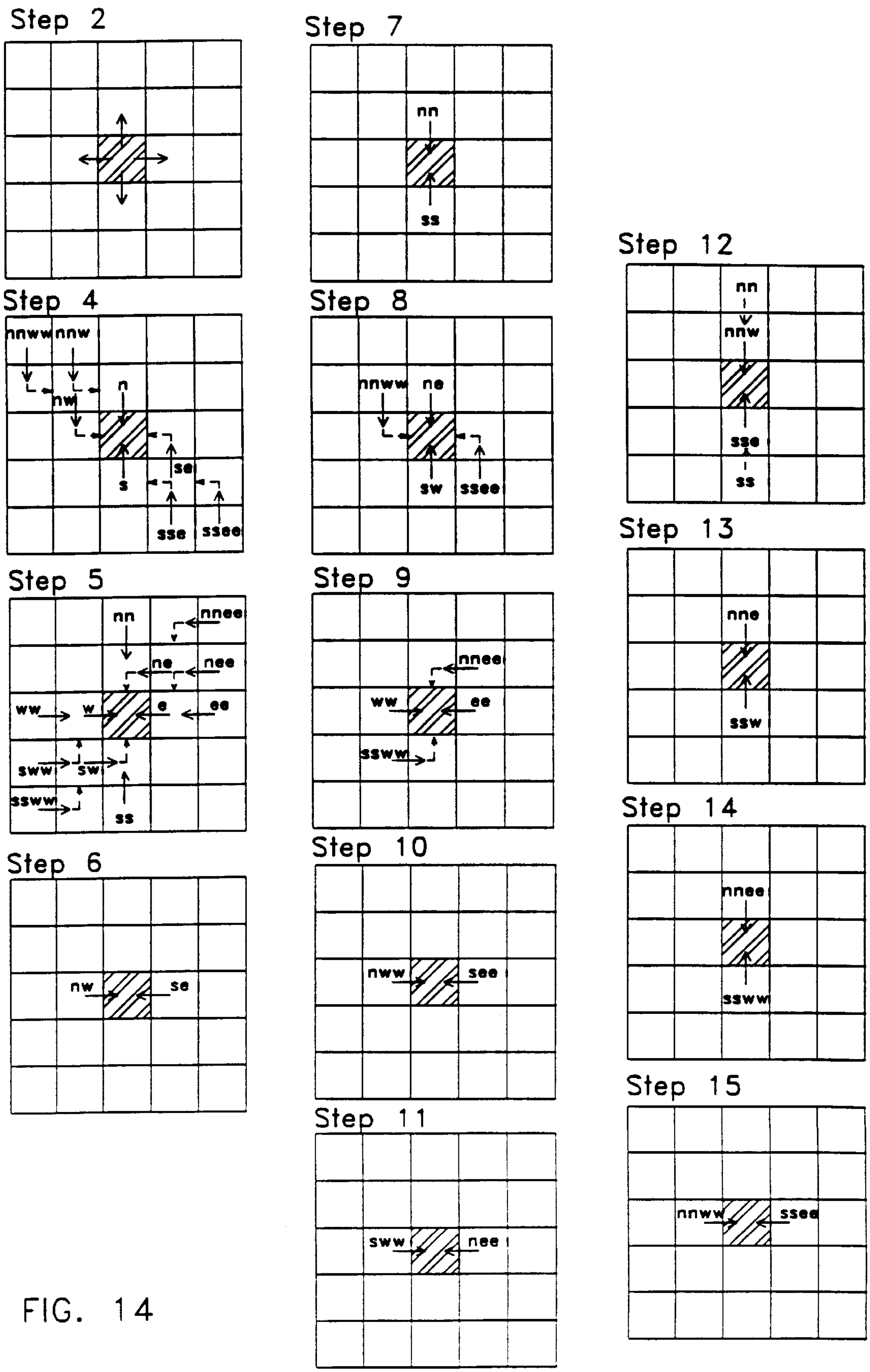

FIG. 14. 3D-Flow steps required to route 5×5 neighboring information to the central pixel.

Figure 15:
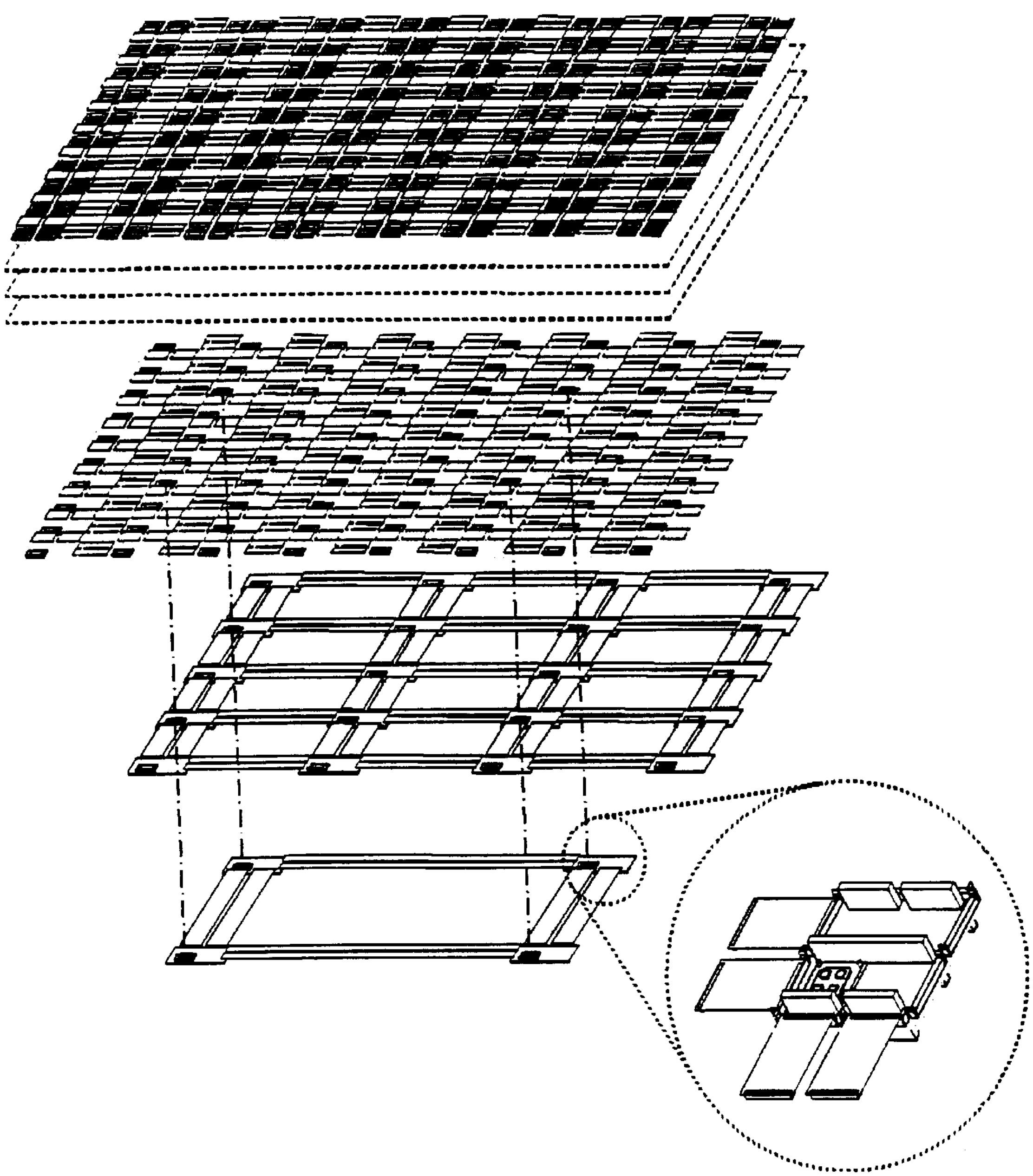

FIG. 15. Pyramidal interconnection scheme of 3D-Flow daughterboards for DAQ and trigger channel reduction.

Figure 16:
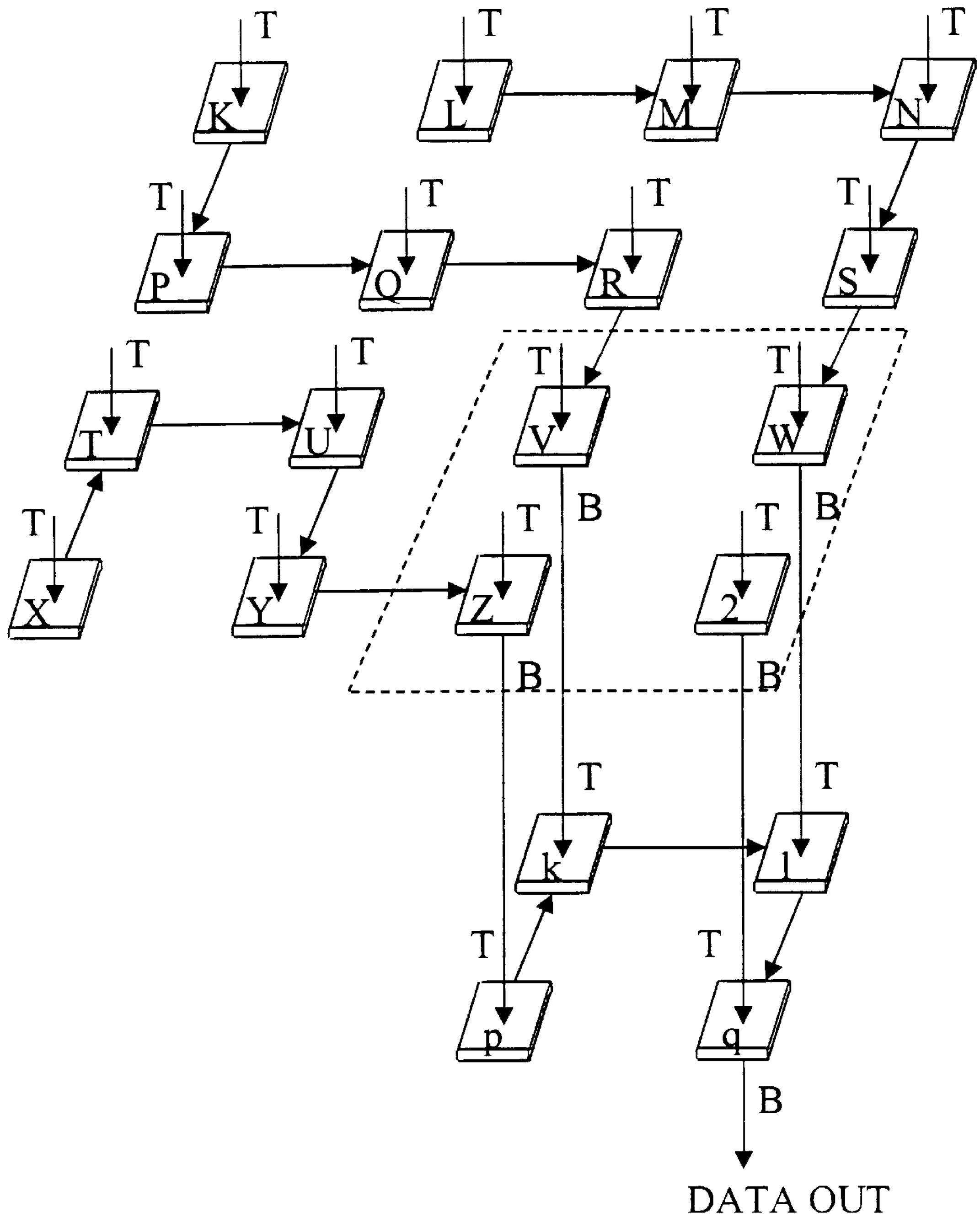

FIG. 16. Data flow from 16 processors in one layer to 4 in the next layer.

FIG. 17. The different 3D-Flow programs in the first layer of the processor, which receives results from the processor stack. Each distinct program is represented by a different character. This layer filters null results and routes valid event information to the next layer. The 3D-Flow program codes are listed in Appendix B.

FIG. 18. Distribution of programs for the second and all subsequent layers of the pyramid. These programs only route the data to the next layer, since all filtering is completed by the first layer. The 3D-Flow program codes are listed in Appendix B.

Figure 19:
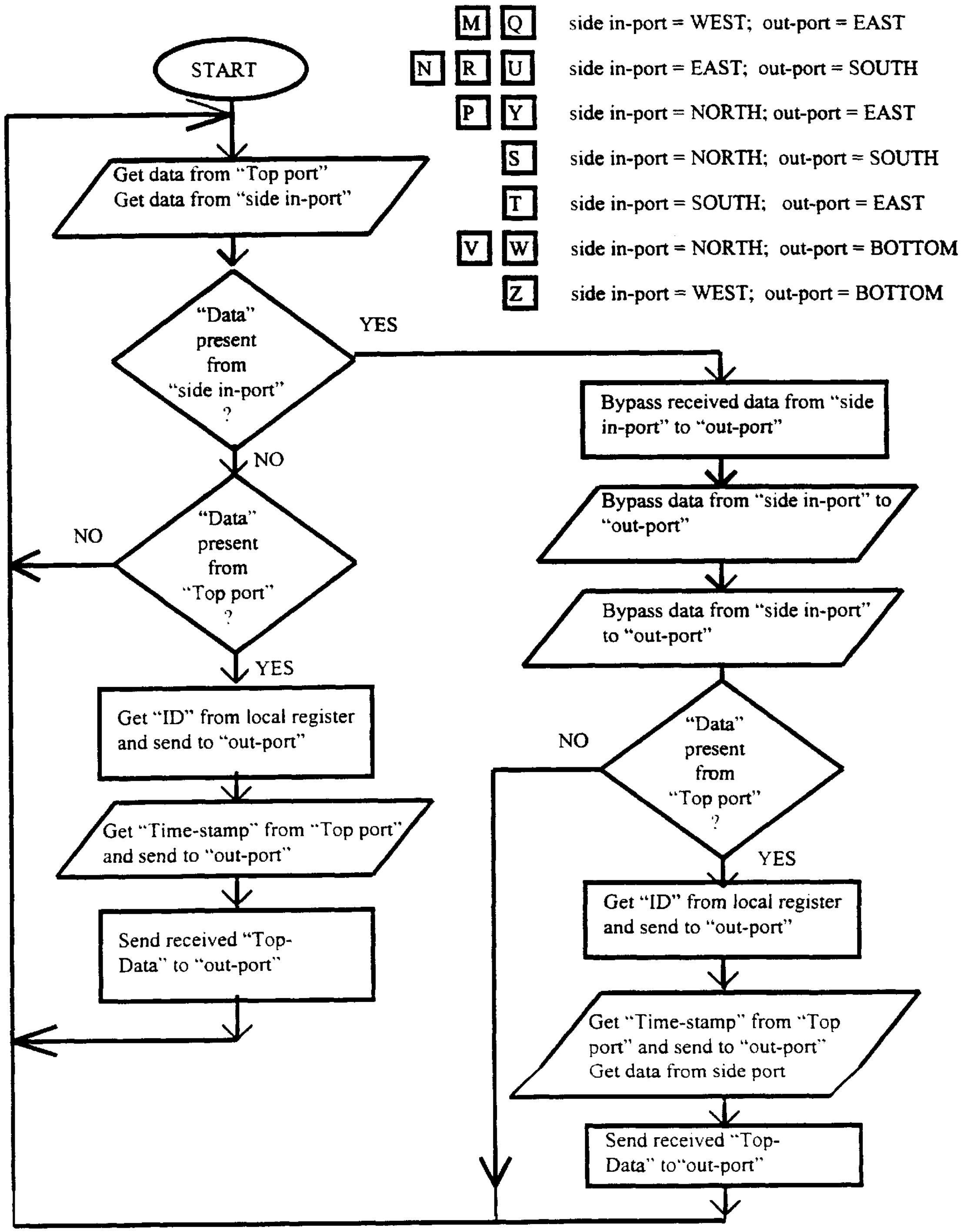

FIG. 19. Flow chart of the program loaded into processors M, N, P, Q, R, S, T, U, V, W, Y, and Z of FIG. 17. The 3D-Flow program code is listed in Appendix B.

Figure 20:
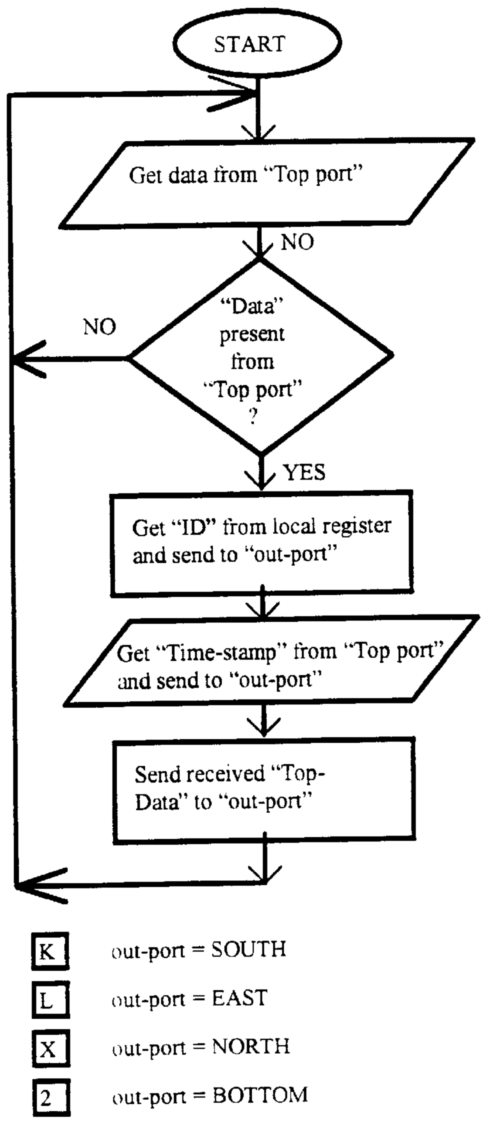

FIG. 20. Flow chart of the program loaded in the processor of FIG. 18. The 3D-Flow program code is listed in Appendix B.

Figure 21:
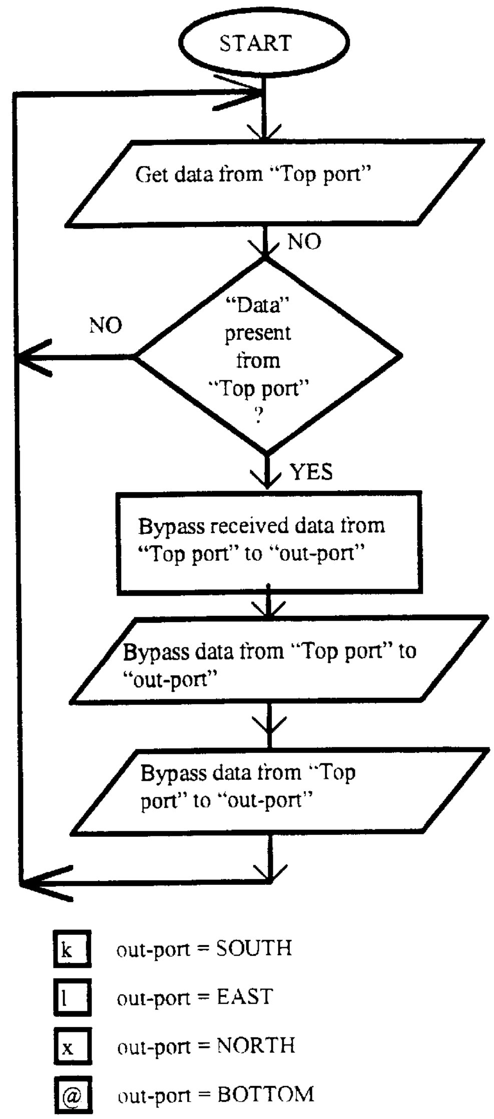

FIG. 21. Flow chart of the program loaded into processor k, l, x, and @ of FIG. 18. The 3D-Flow program code is listed in Appendix B.

Figure 22:
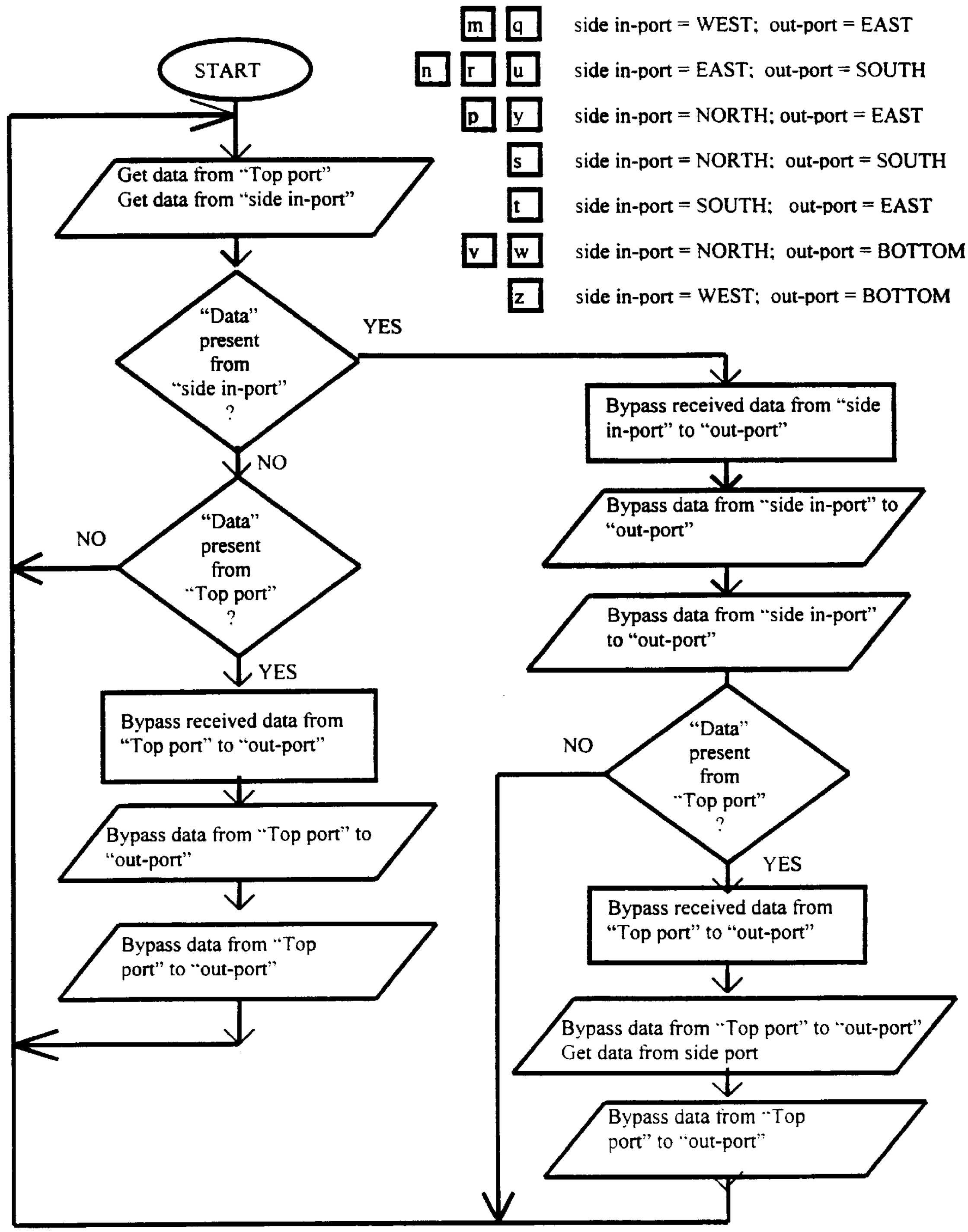

FIG. 22. Flow chart of the program loaded into processors: m, n, p, q, r, s, t, u, v, w, y, and z of FIG. 18. The 3D-Flow program code is listed in Appendix B.

Figure 23:
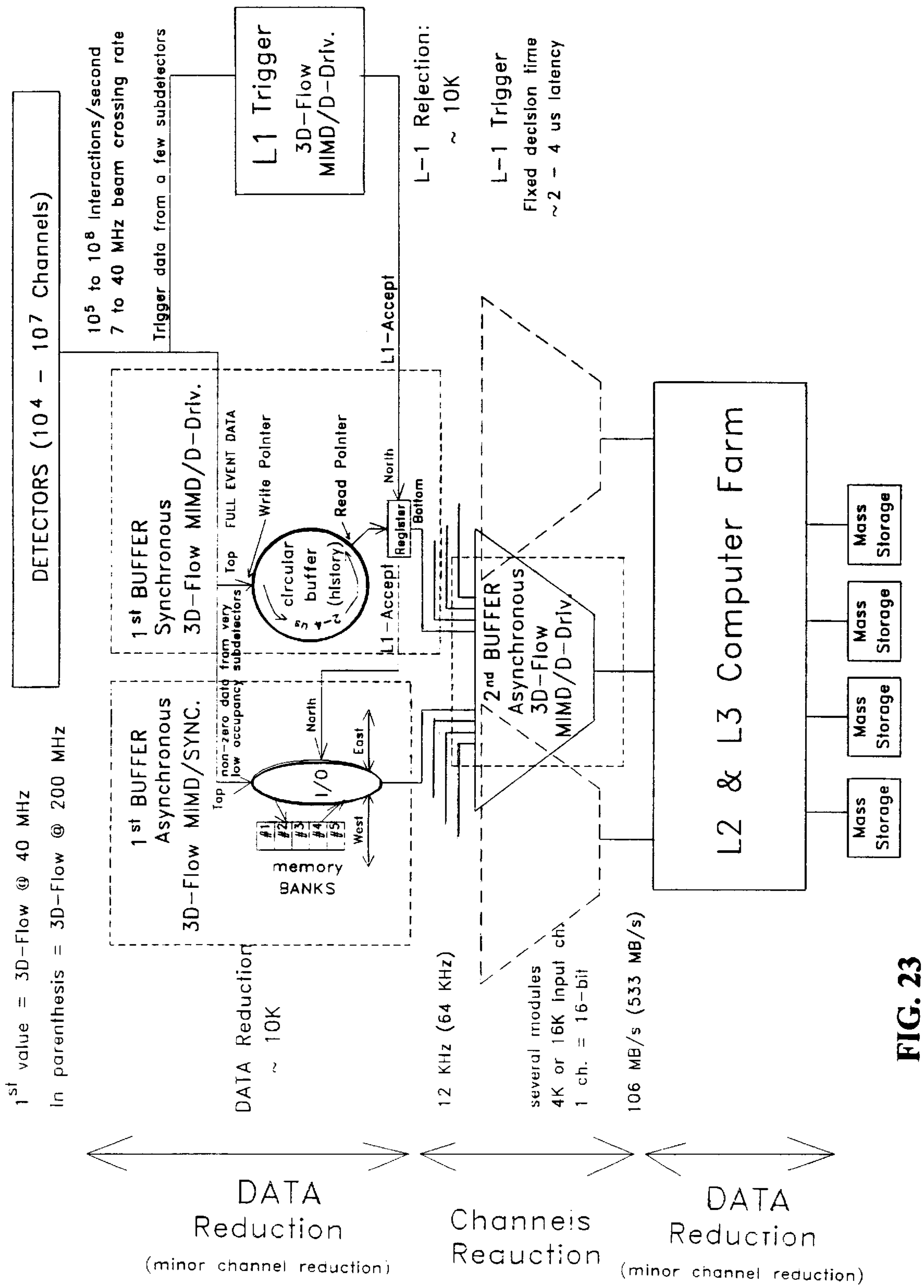

FIG. 23. Main components of a typical trigger and data acquisition system.

Figure 24:
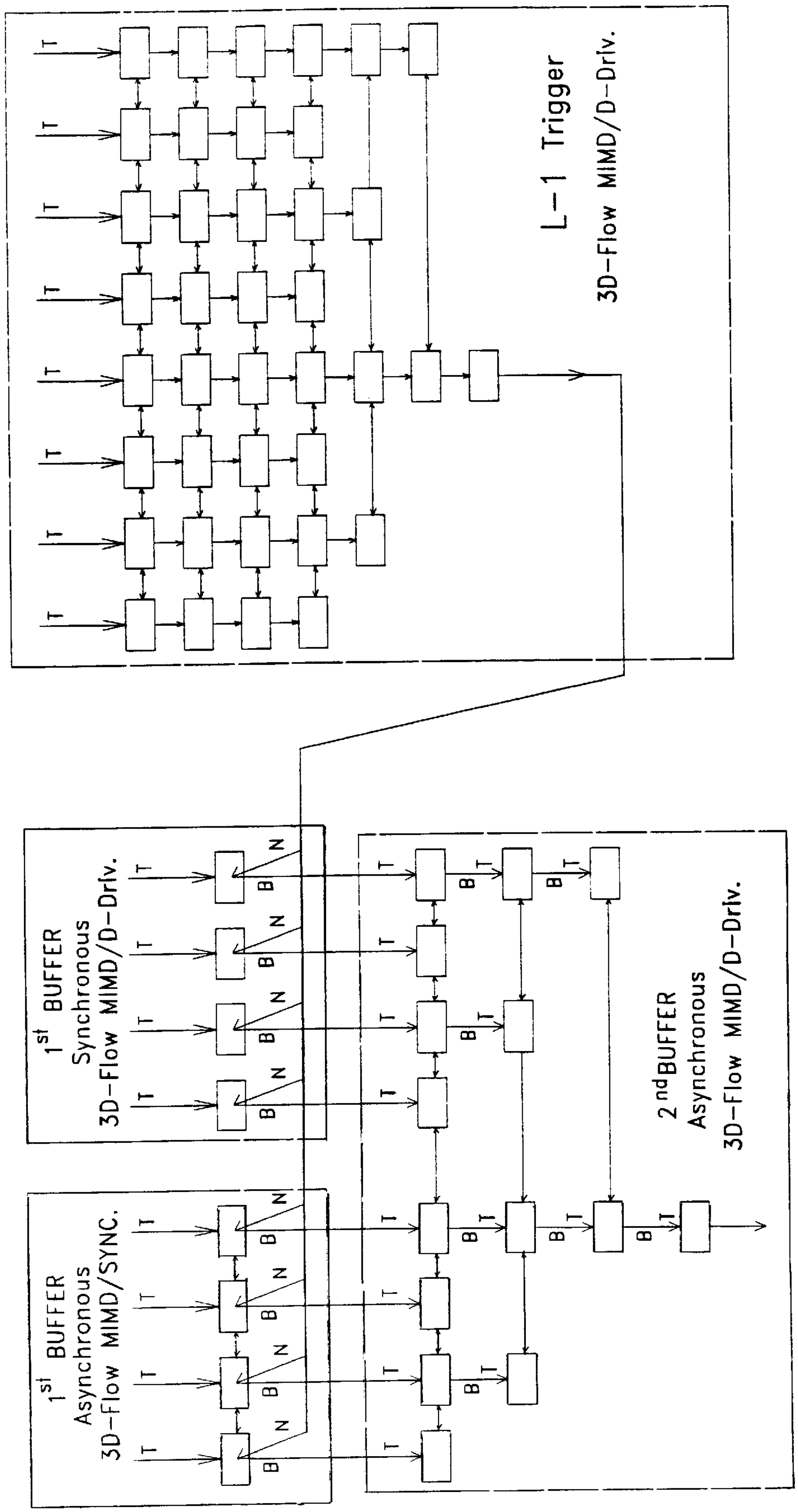

FIG. 24. Event flow diagram in a 3D-Flow system.

Figure 25:
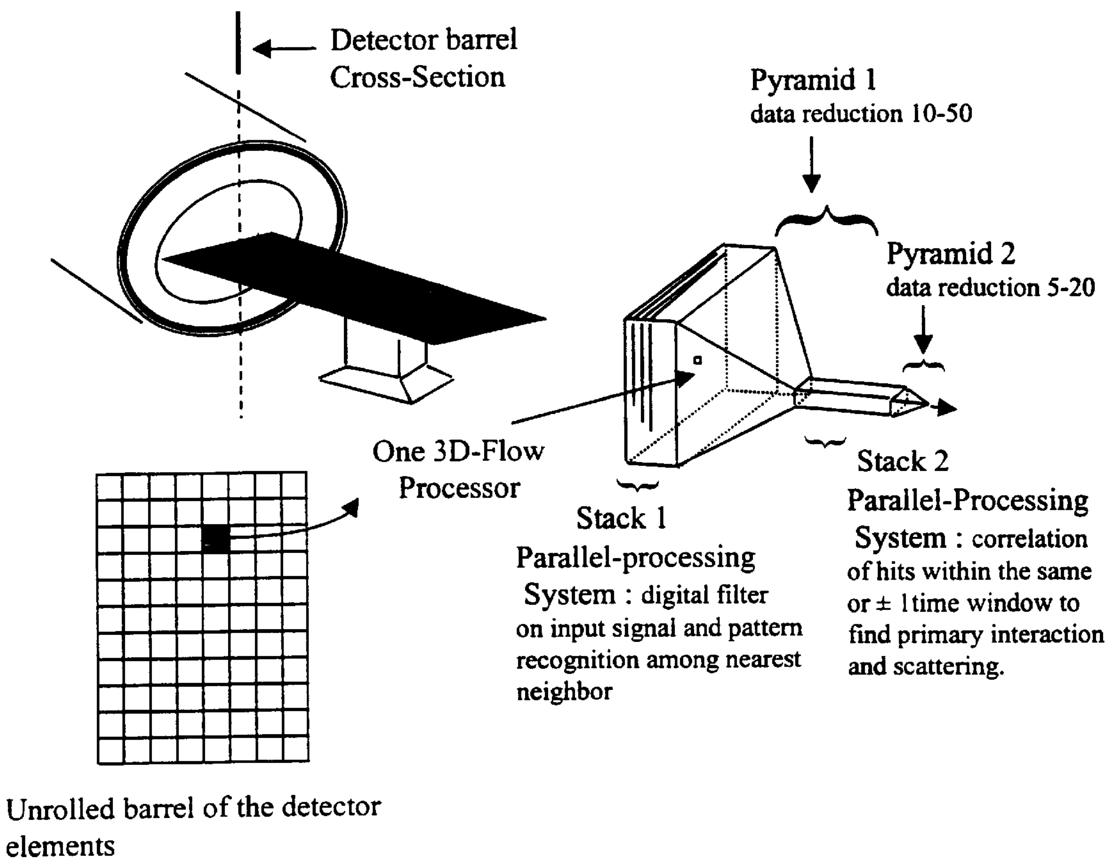

FIG. 25 PET/SPECT signals from the detector elements interfaced to the 3D-Flow system.

FIG. 26. The Photon counting system layout.

Figure 27:
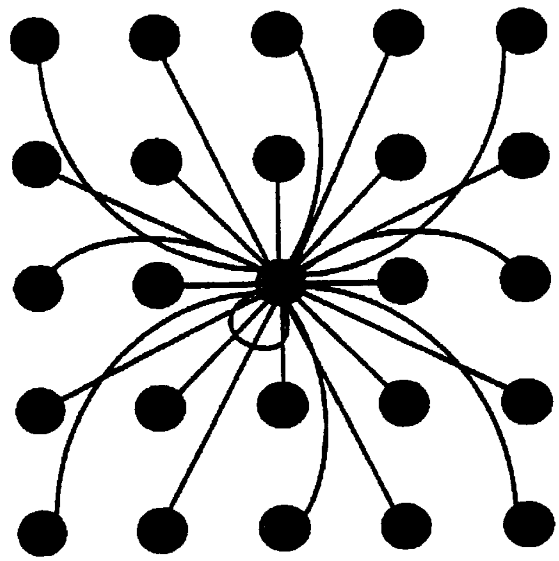

FIG. 27. SIREN feedback network. Each neuron is viewed as the central pixel of a 5×5 area and is connected to the other 24 neighbors and itself. Only the connections of the central pixel are reported. All the other neurons have the same connections.

Figure 28:
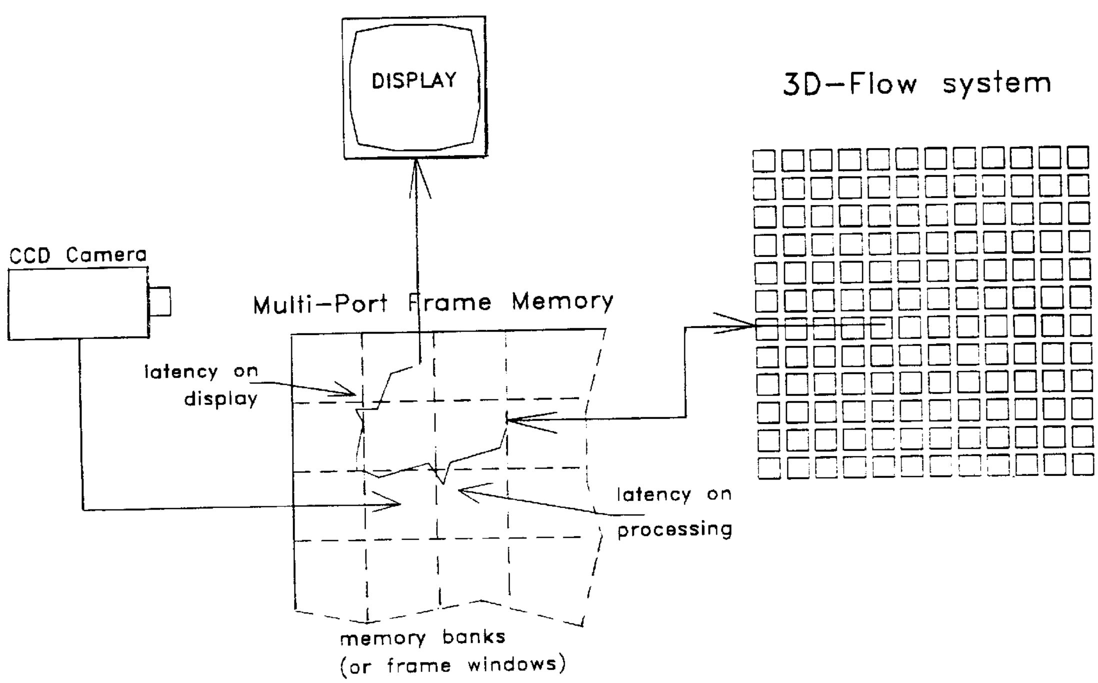

FIG. 28. Interface scheme between the 3D-Flow system and CCD camera using the multi-port frame memory with bank-switching technique.

Figure 29:
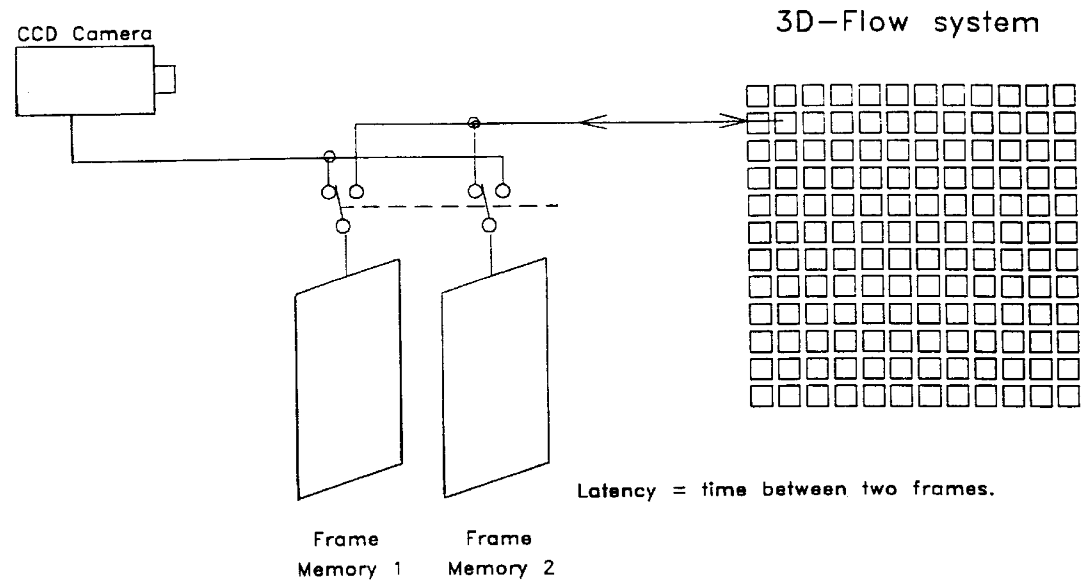

FIG. 29. Interface scheme between the 3D-Flow system and the CCD camera using two memories the size of the entire frame.

Figure 30:
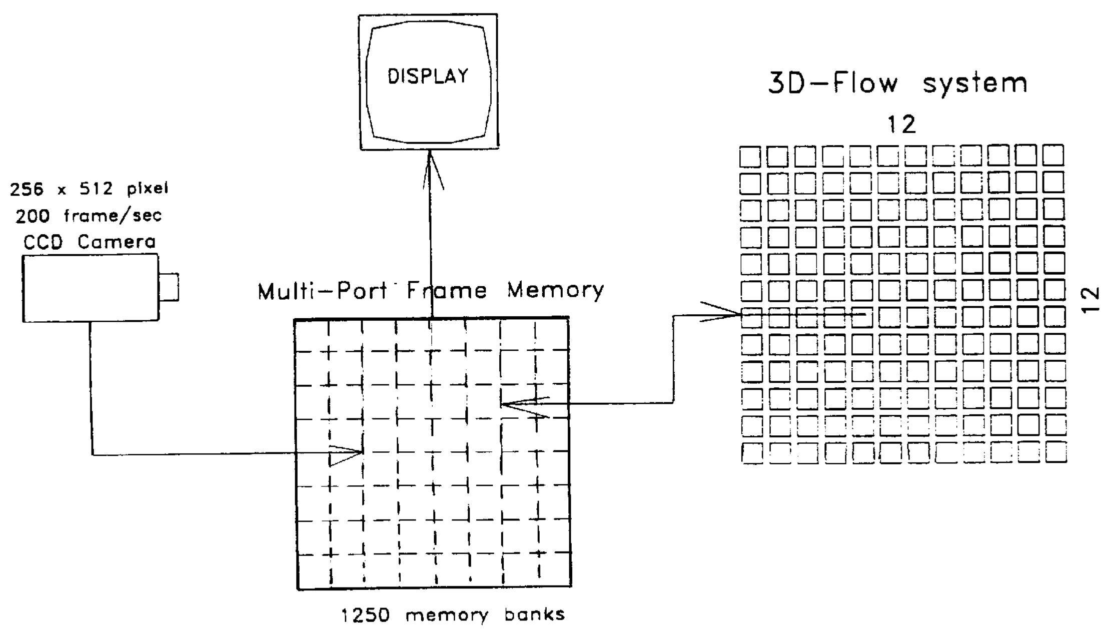

FIG. 30. Block scheme of a 3D-Flow system processing 256×512 pixel images at 200 frames/sec.

Figure 31:
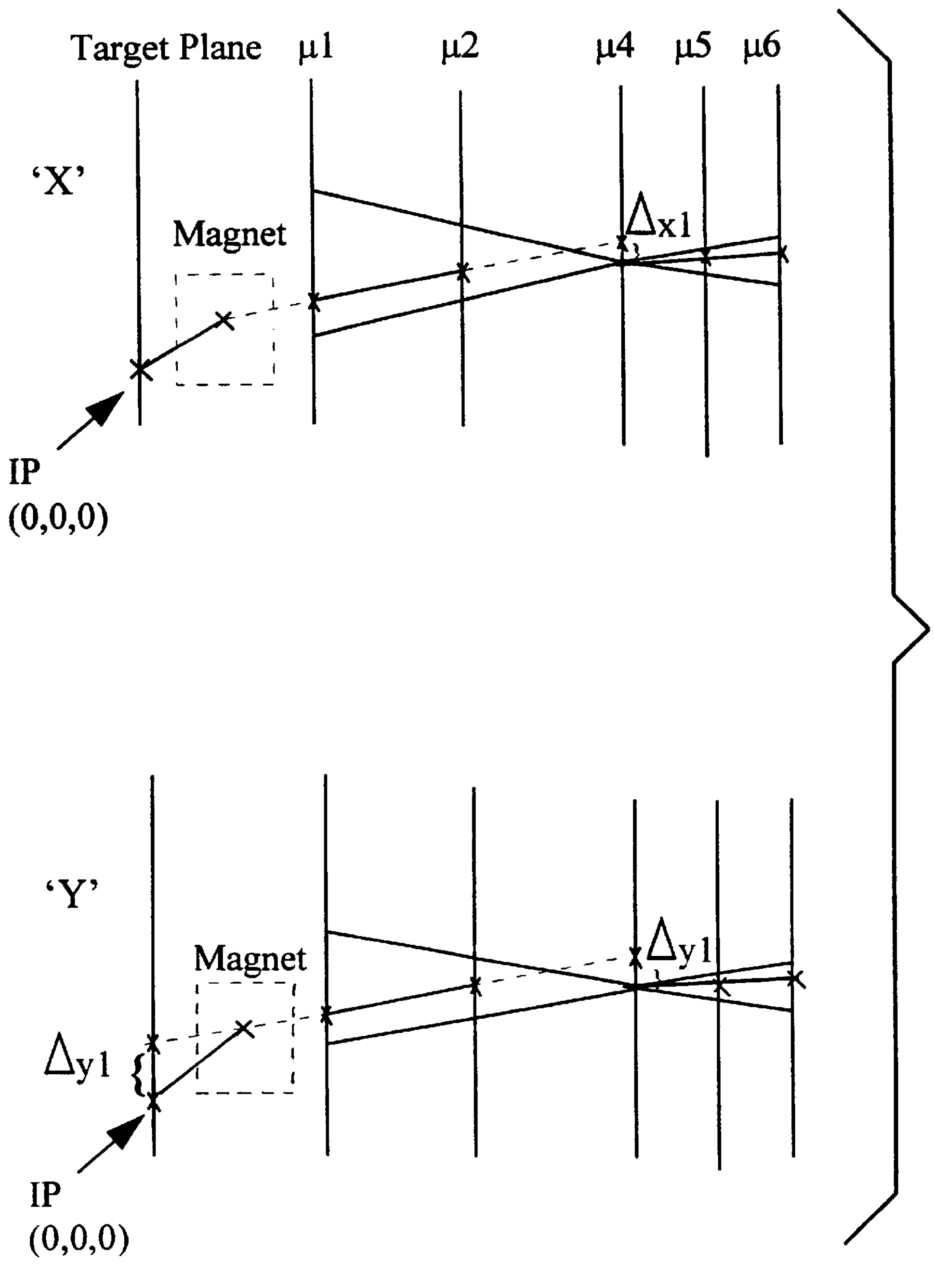

FIG. 31. LHC-B muon trigger algorithm for the calculation of IP. (Detail 1.).

Figure 32:
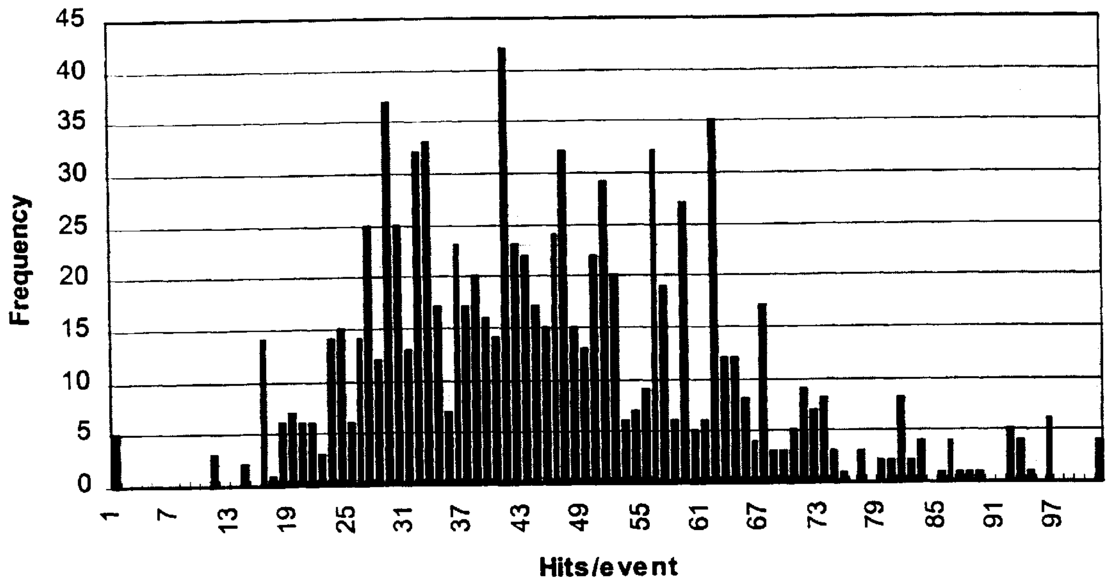

FIG. 32. Number of hits/event on plane $\mu$1.

Figure 33:
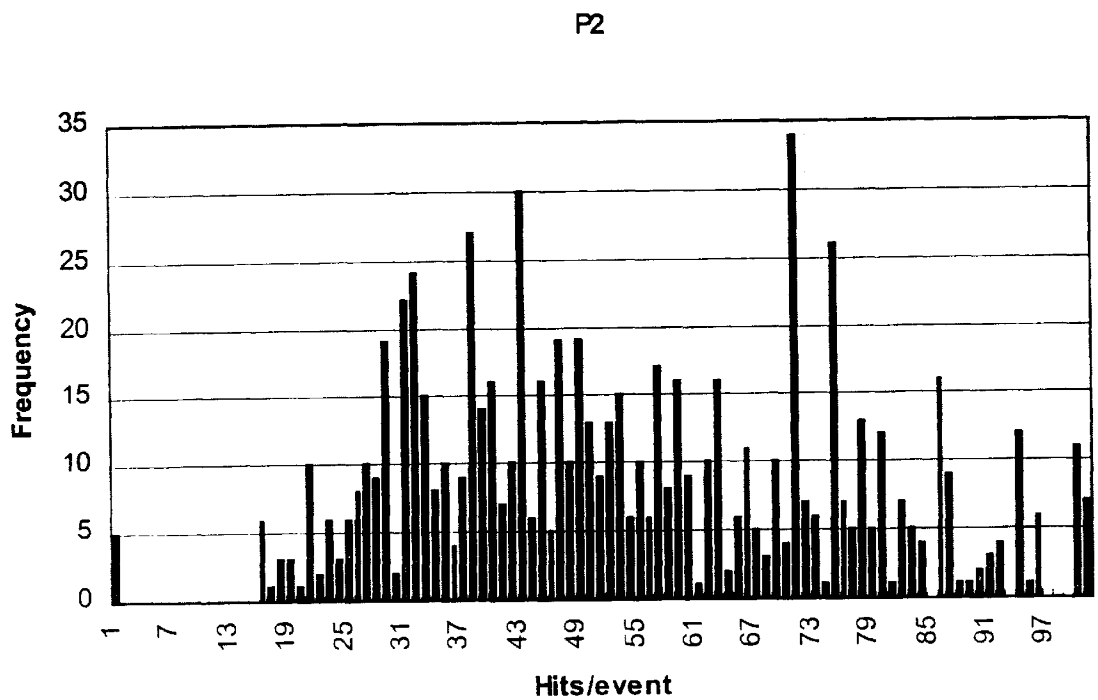

FIG. 33. Number of hits/event on plane $\mu$2.

Figure 34:
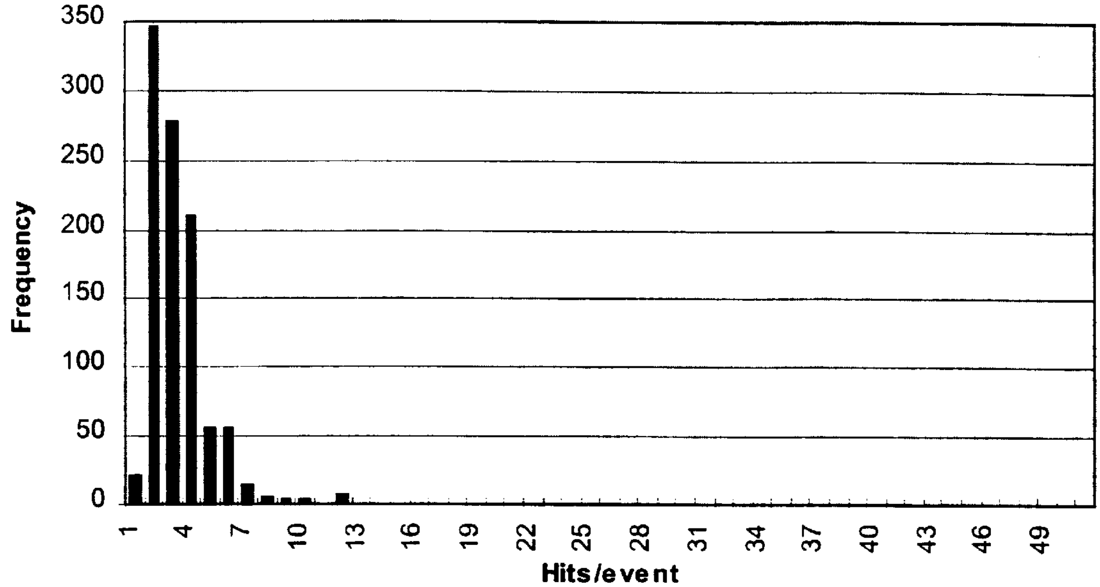

FIG. 34. Number of hits/event on plane $\mu$4. The maximum number of hits/event is 11.

Figure 35:
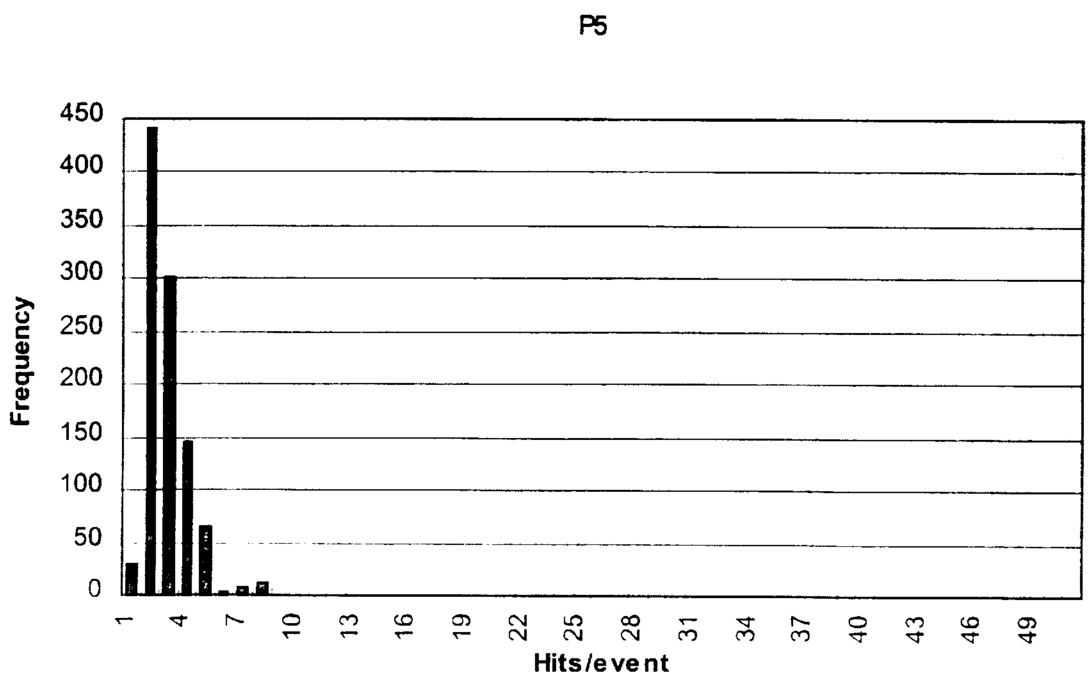

FIG. 35. Number of hits/event in plane $\mu$5.

Figure 36:
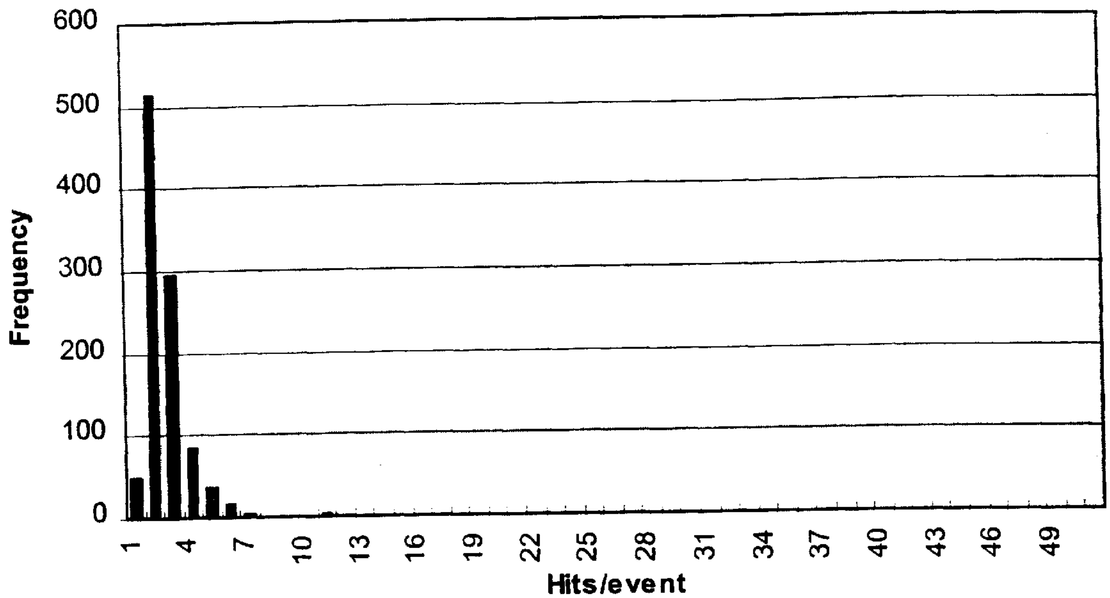

FIG. 36. Number of hits/event on plane $\mu$6.

Figure 37:
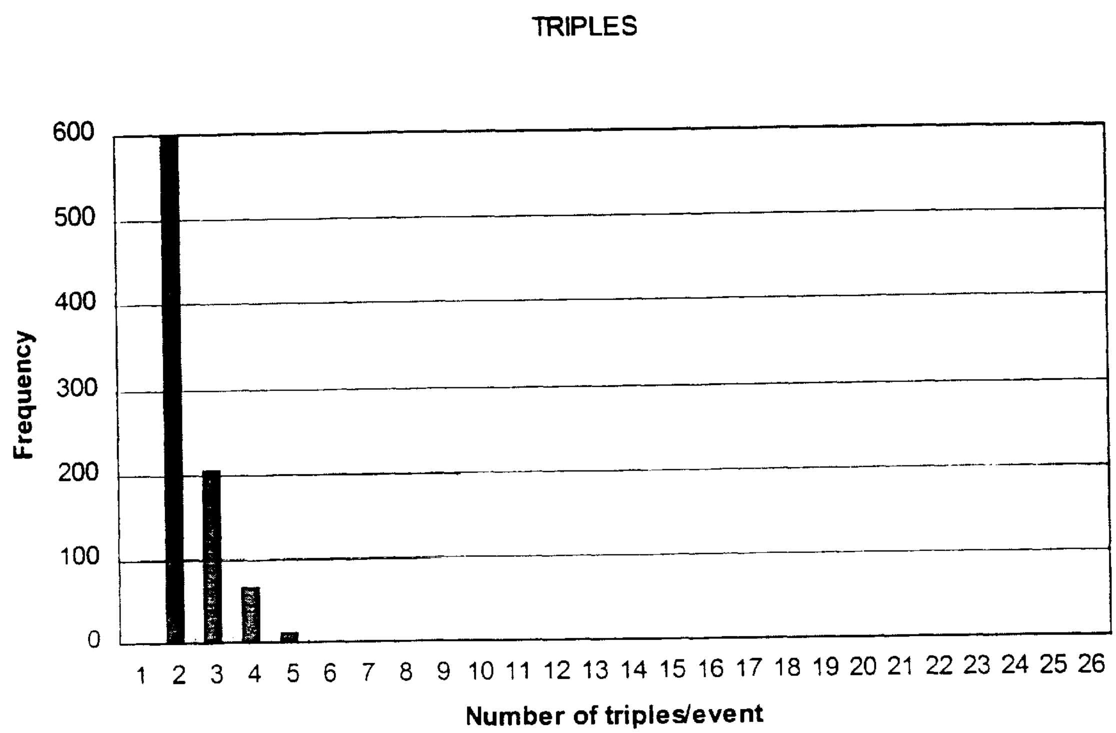

FIG. 37. Shows the number of triples/event found.

Figure 38:
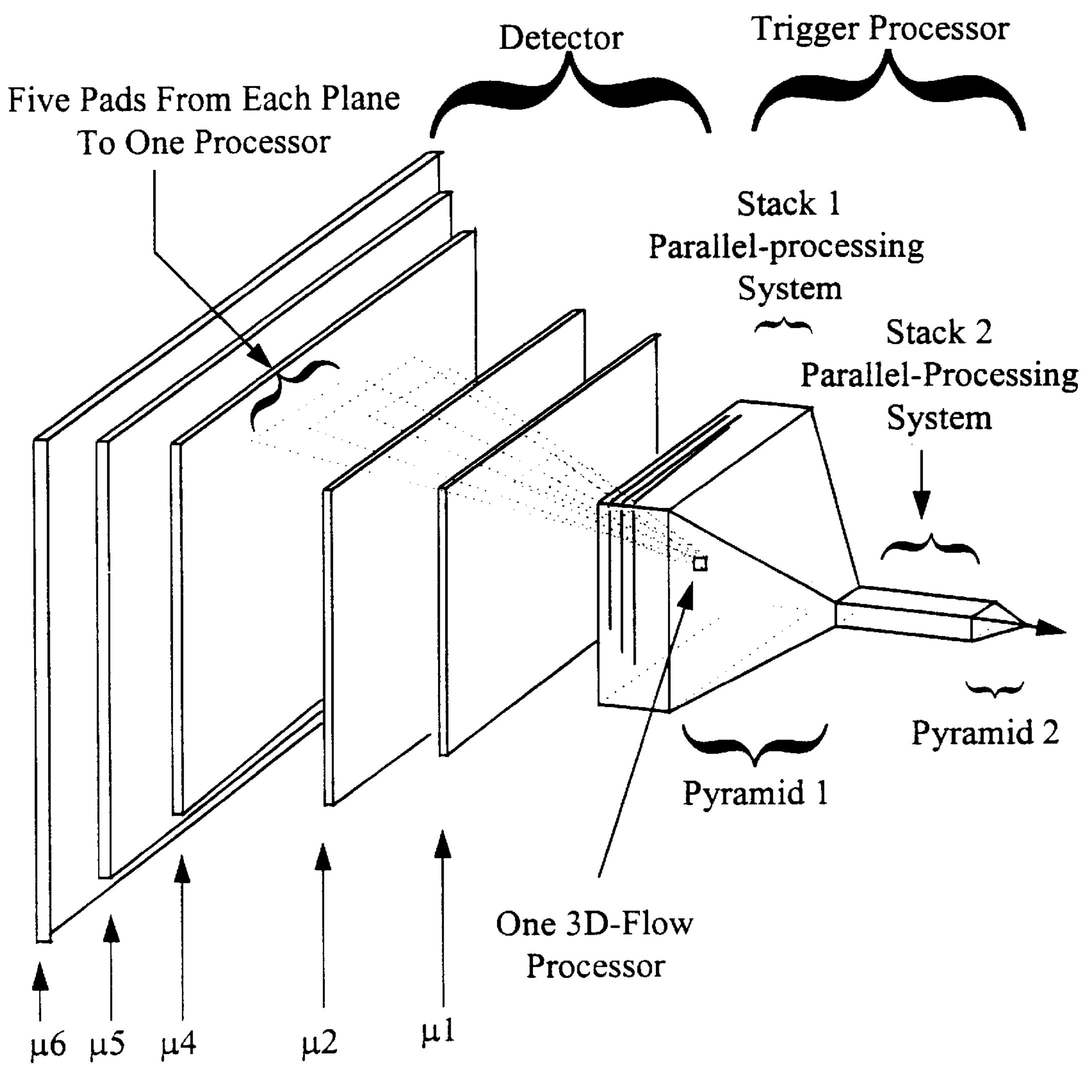

FIG. 38. Interfacing the muon detector to the 3D-Flow system. Each processor of the first layer of the stack receives signals from a set of five pads of each plane from all five planes.

Figure 39:
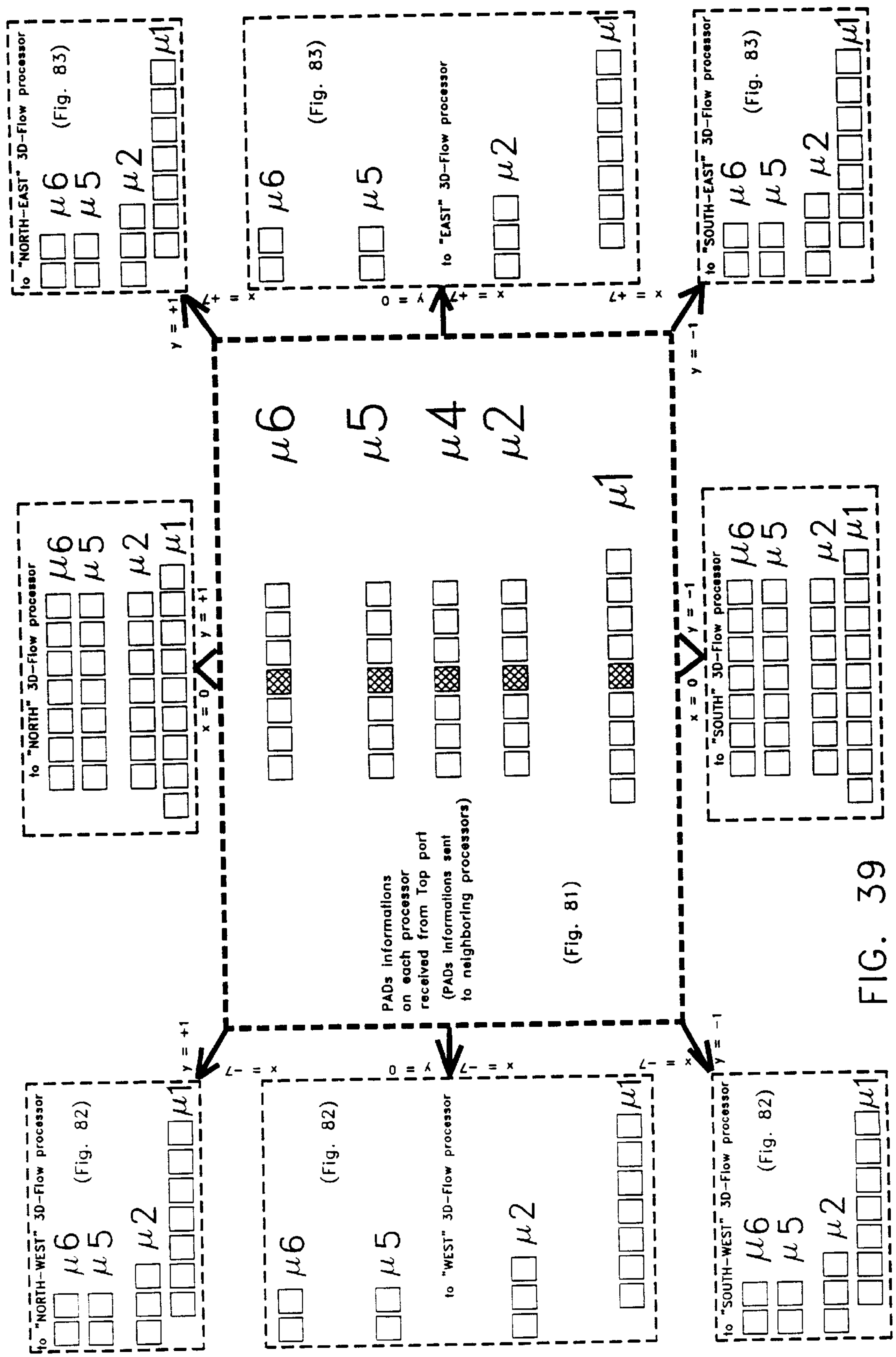

FIG. 39. The set of data received from the top port by each processor is shown in the dotted rectangle at the center. This data is sent to the neighboring processors, which are shown in rectangles surrounding the processor being described. A magnified view of the neighboring processors is given in the Appendix C.

Figure 40:
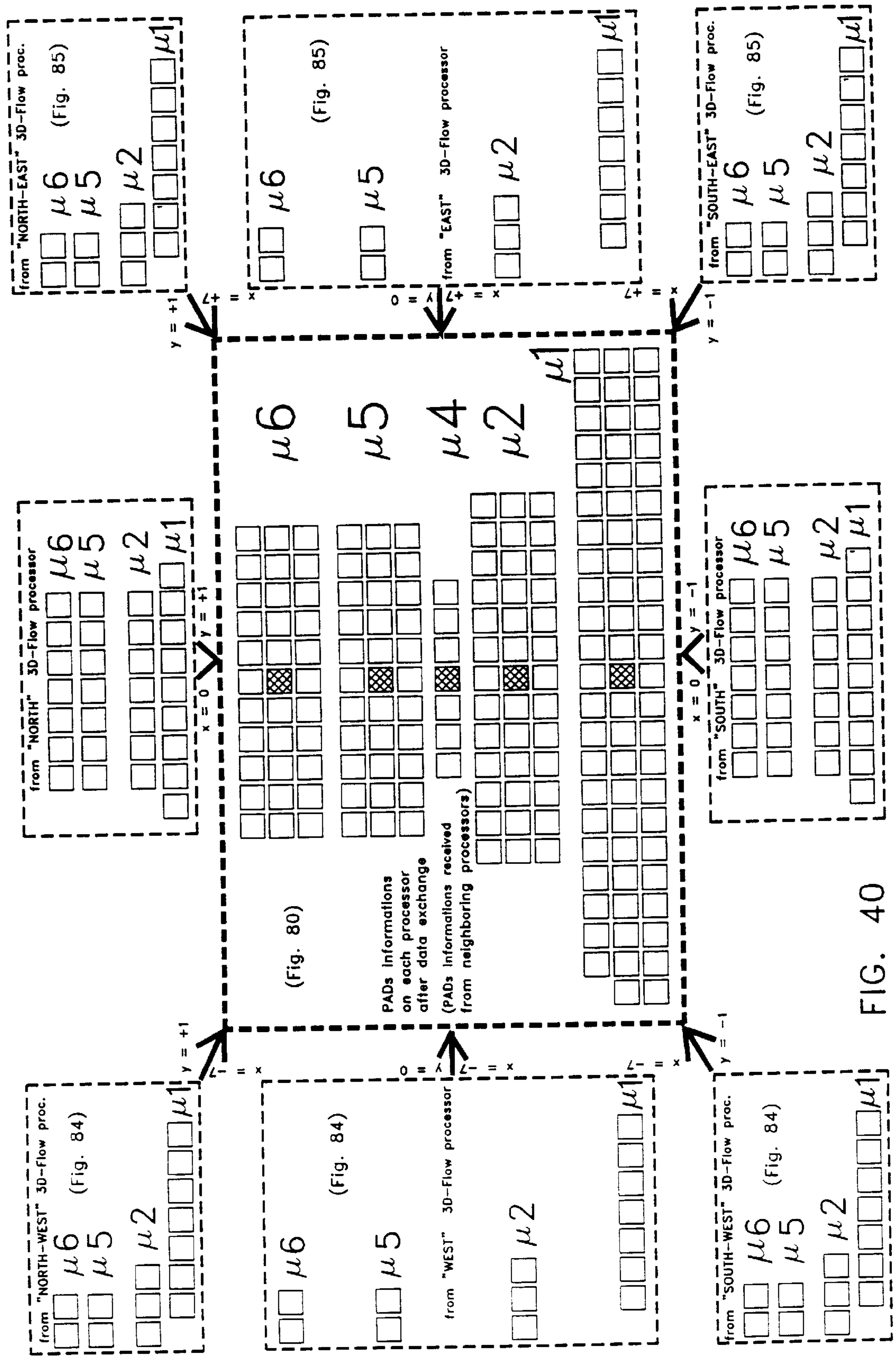

FIG. 40. The data shown within the dotted rectangle at the center are those received by the top port of the processor, and from all its neighbors. The neighboring processors are shown in rectangles surrounding the processor being described. A magnified view of the neighboring processors is given in the Appendix C.

Figure 41:
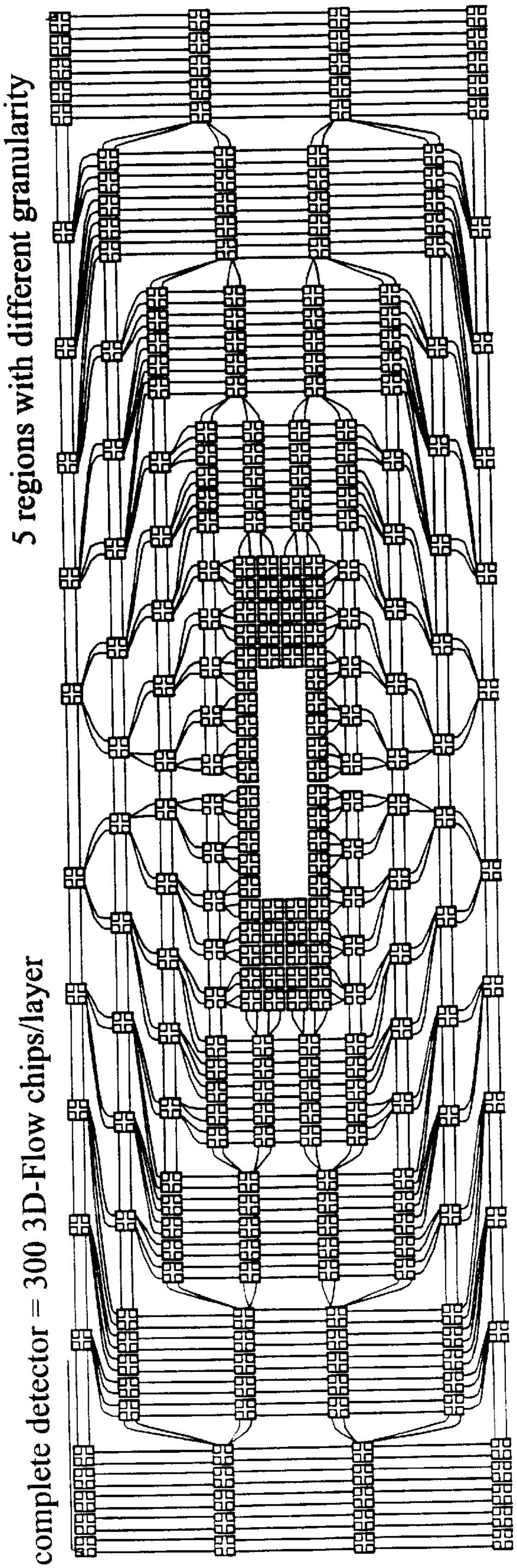

FIG. 41. First layer of the 3D-Flow processor array interfaced to the muon detector showing 300 3D-Flow ASICs/layer (Detail 1). Each square represent 1 processor.

Figure 42:
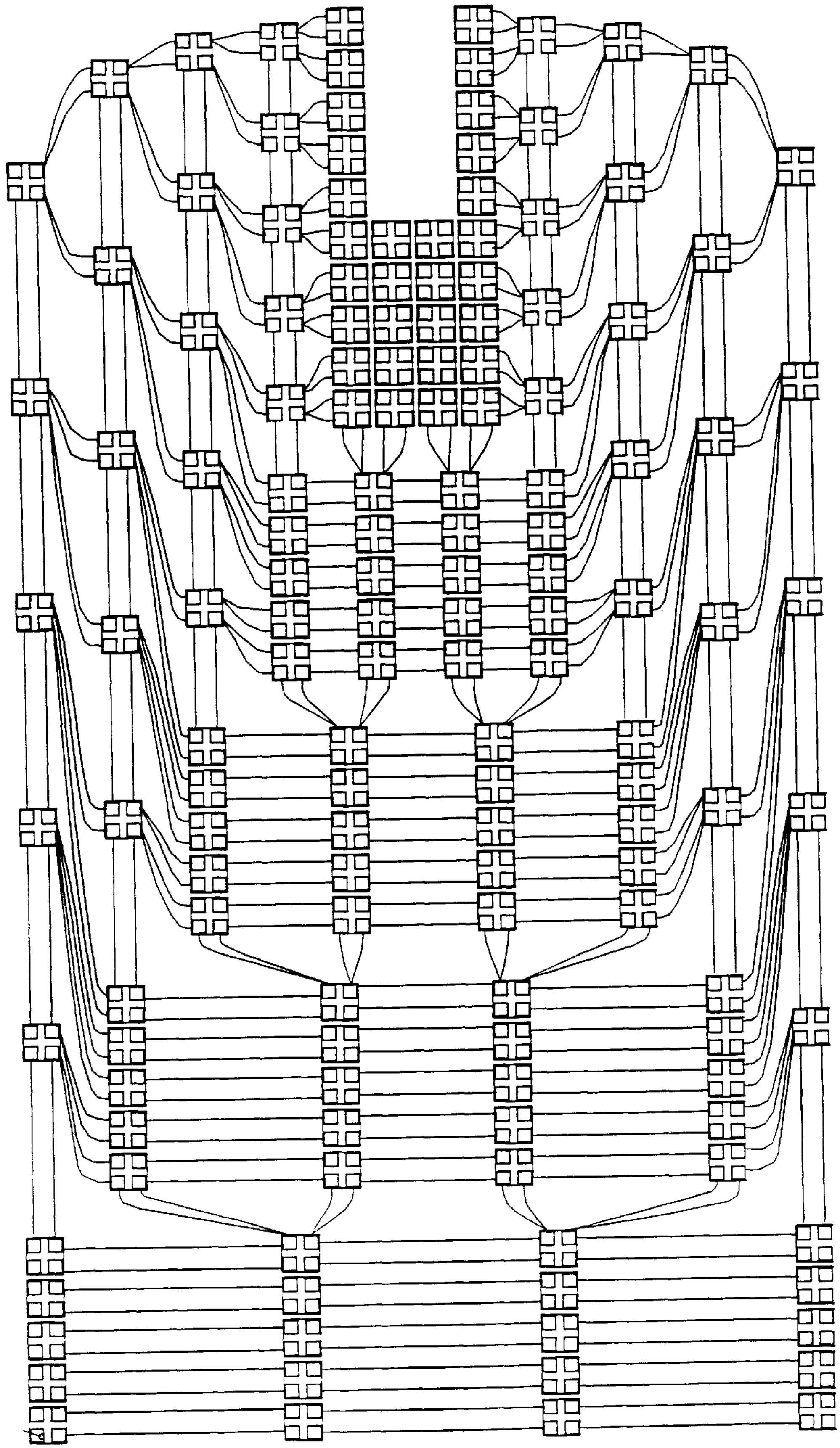

FIG. 42. Magnification of quadrants 2 and 3 of the first layer of the 3D-Flow processor array interface to the muon detector. (Detail 2.).

Figure 43:
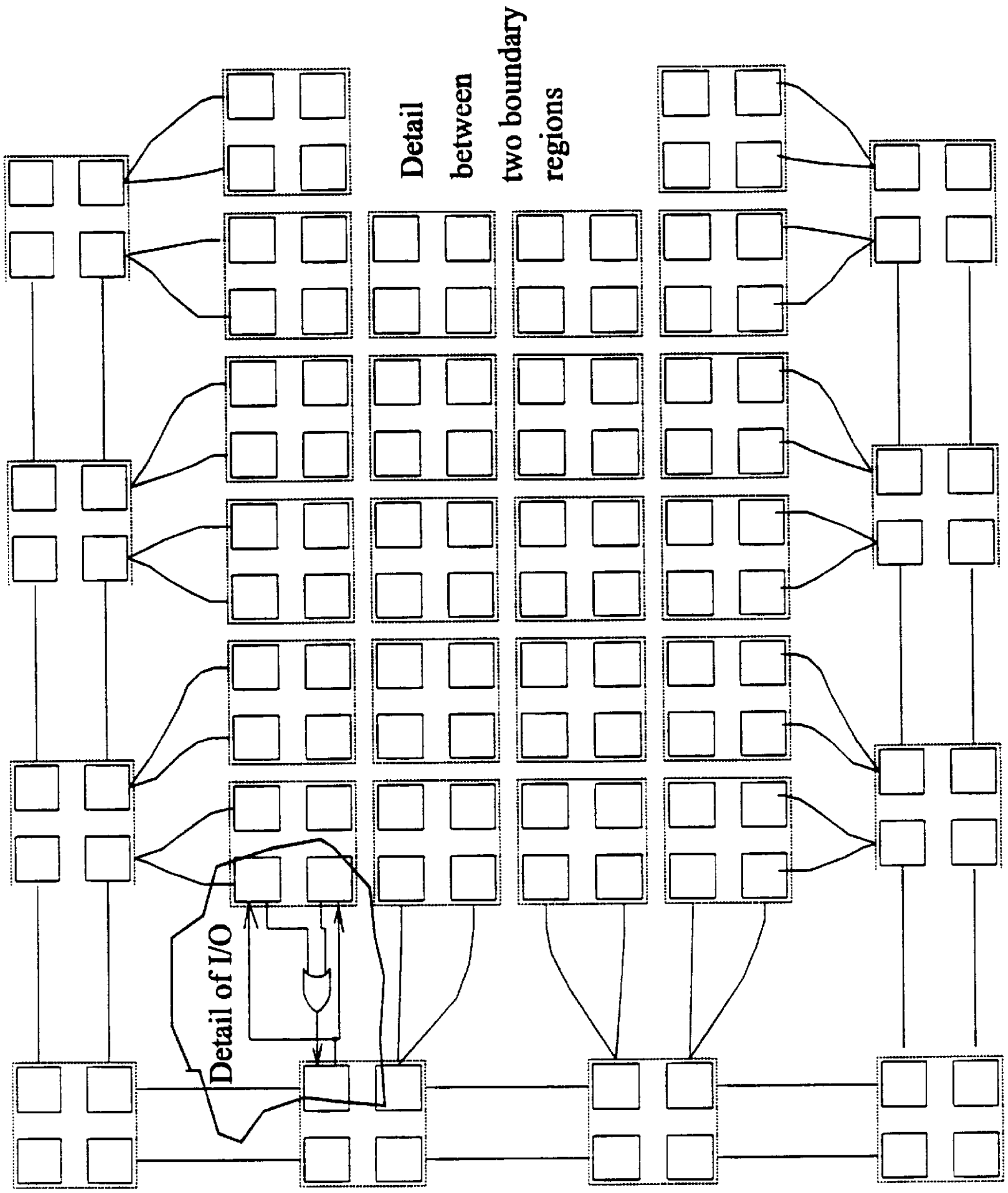

FIG. 43. Magnification of the first layer of the 3D-Flow processor array interface to the muon detector showing the inner region, with details of processor communication between two different regions. (Detail 3.).

Figure 44A:
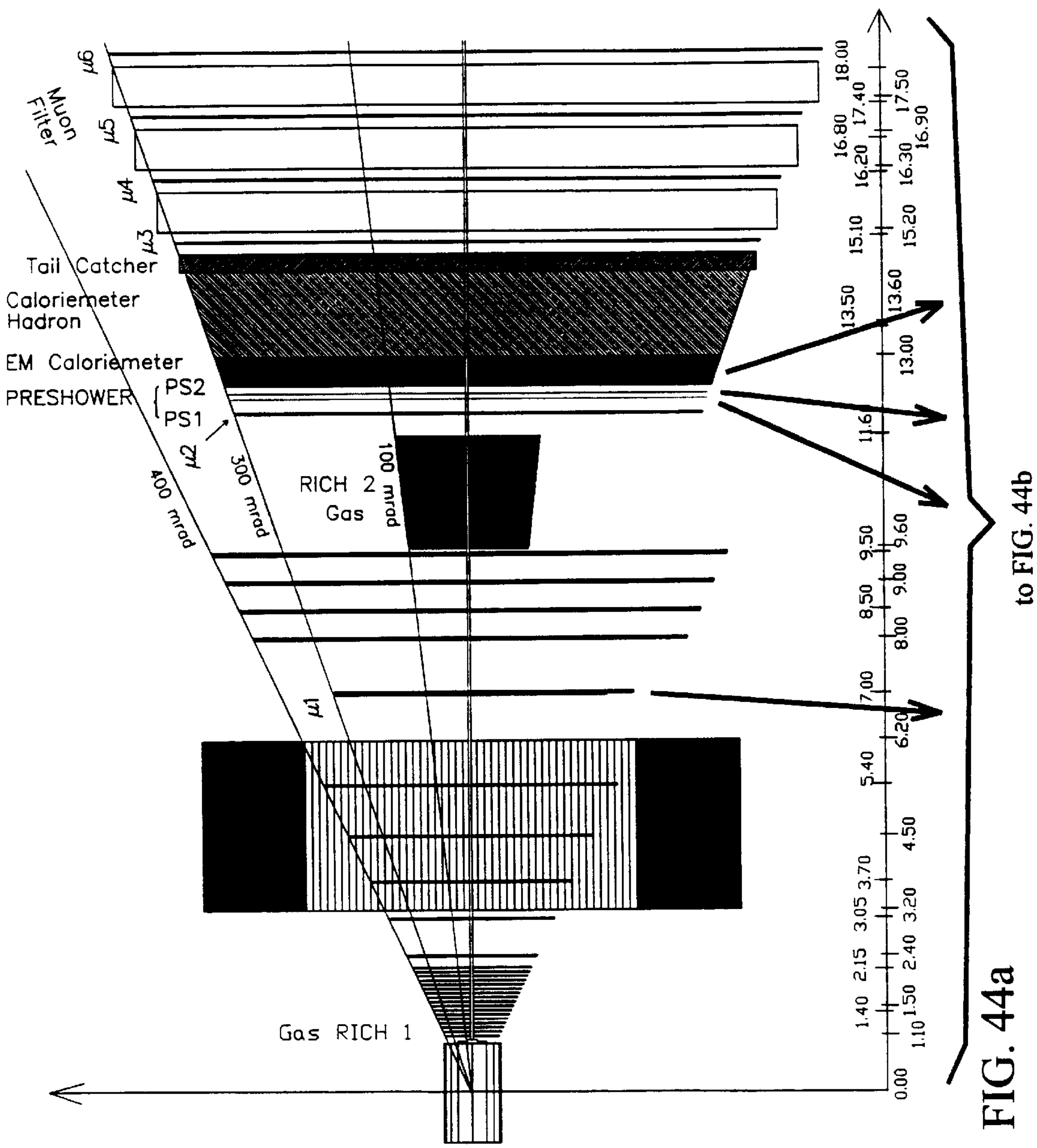
Figure 44B:
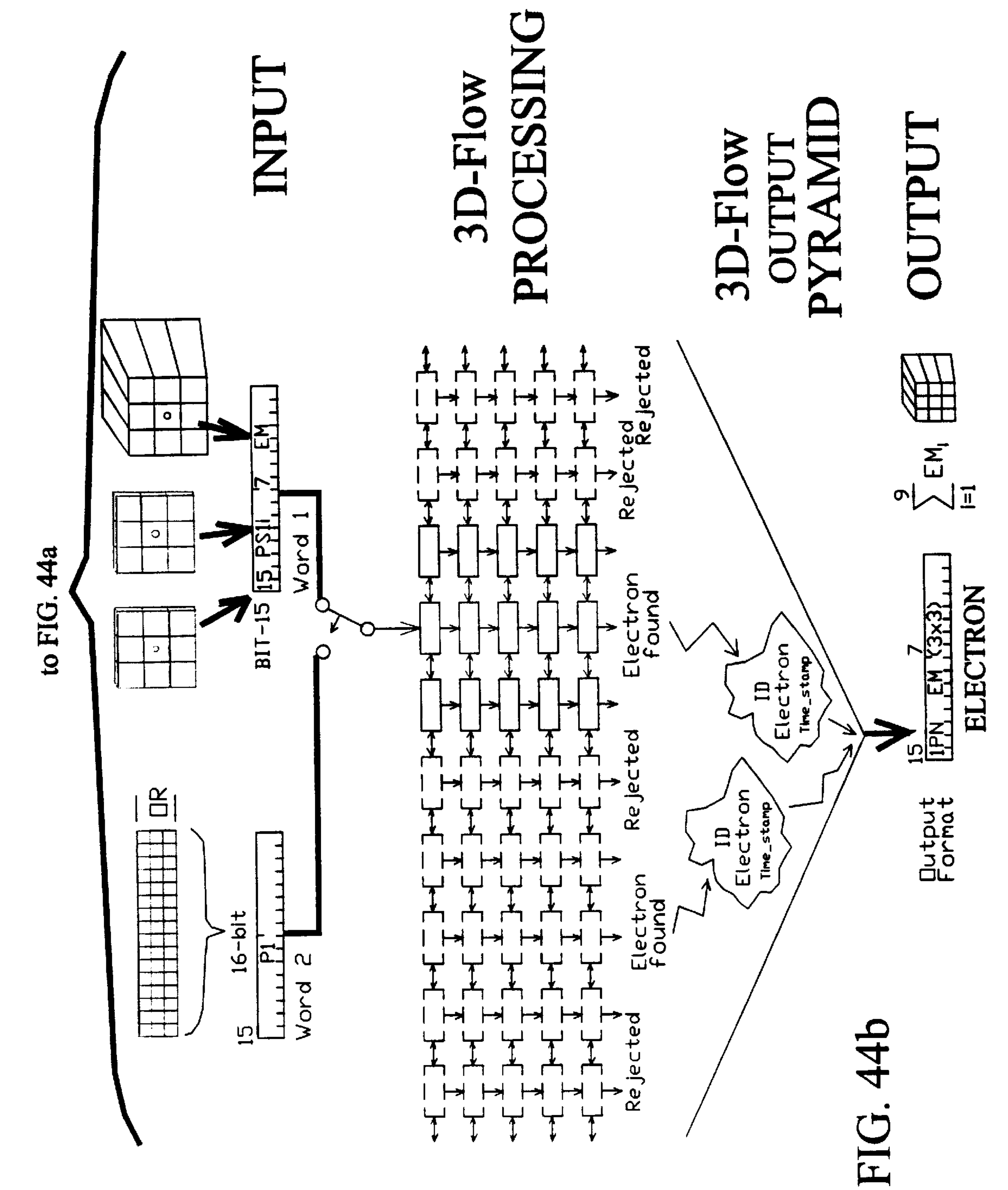

FIG. 44. Interface between LHC-B detector and 3D-Flow system for electron identification.

Figure 45:
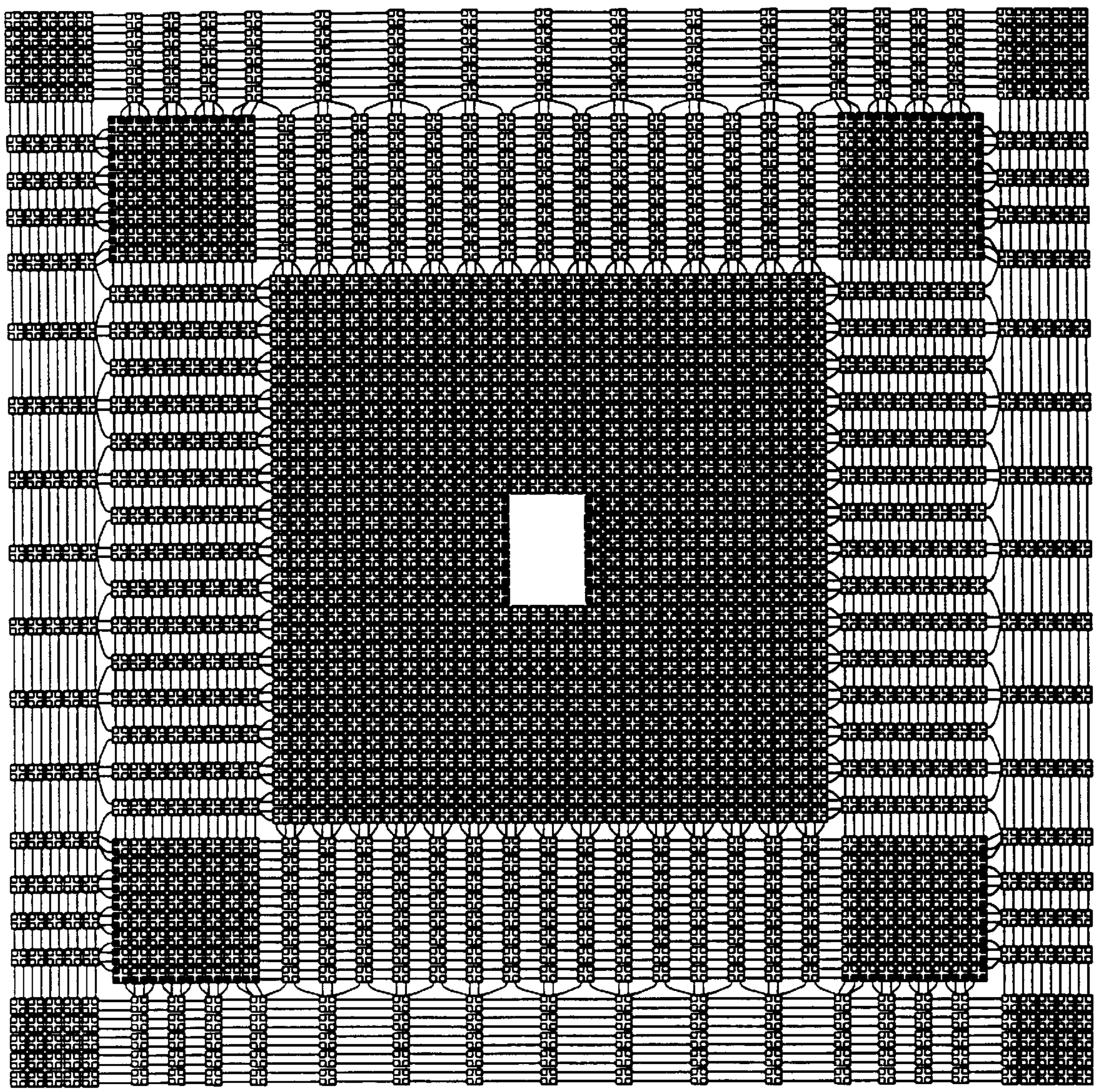

FIG. 45. First layer of the 3D-Flow system interface to the LHC-B spectrometer for electron and hadron detection (Detail-1) Each square represents one processor, which has a 1-to-1 mapping to $\Delta\Phi$=0.1 and $\Delta\eta$=0.1 detector elements as shown in FIG. 44.

Figure 46:
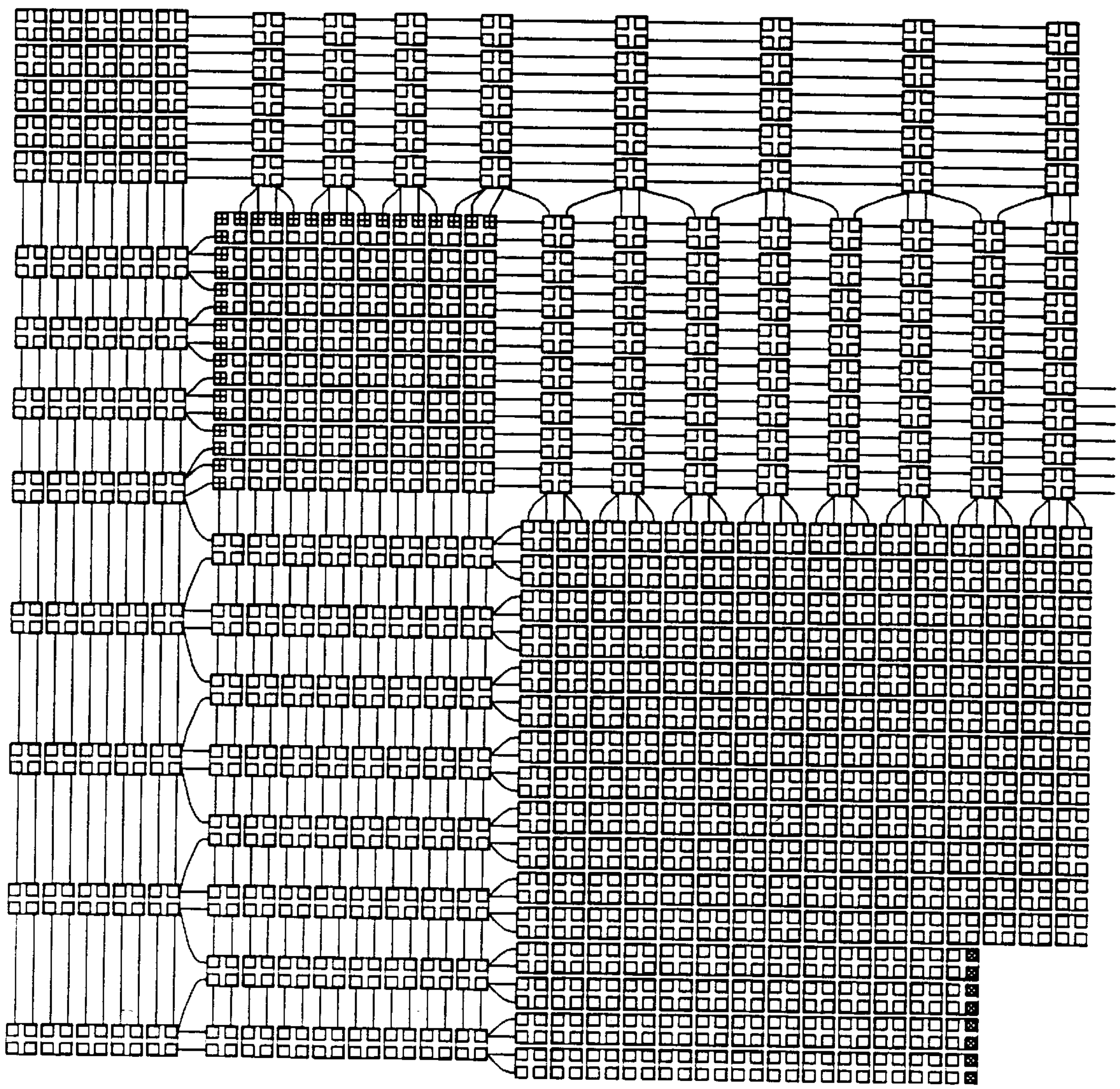

FIG. 46 Magnification of first layer (quadrant) of the 3D-flow system interface to the LHC-B spectrometer (Detail-2).

FIG. 47. LHC-B electron trigger algorithm (detail-2).

FIG. 48. Interface between LHC-B detector and the 3D-Flow system for electron and hadron identification.

FIG. 49. LHC-B electron+hadron trigger algorithm (part a).

FIG. 50. LHC-B electron plus hadron trigger algorithm (part b).

Figure 51:
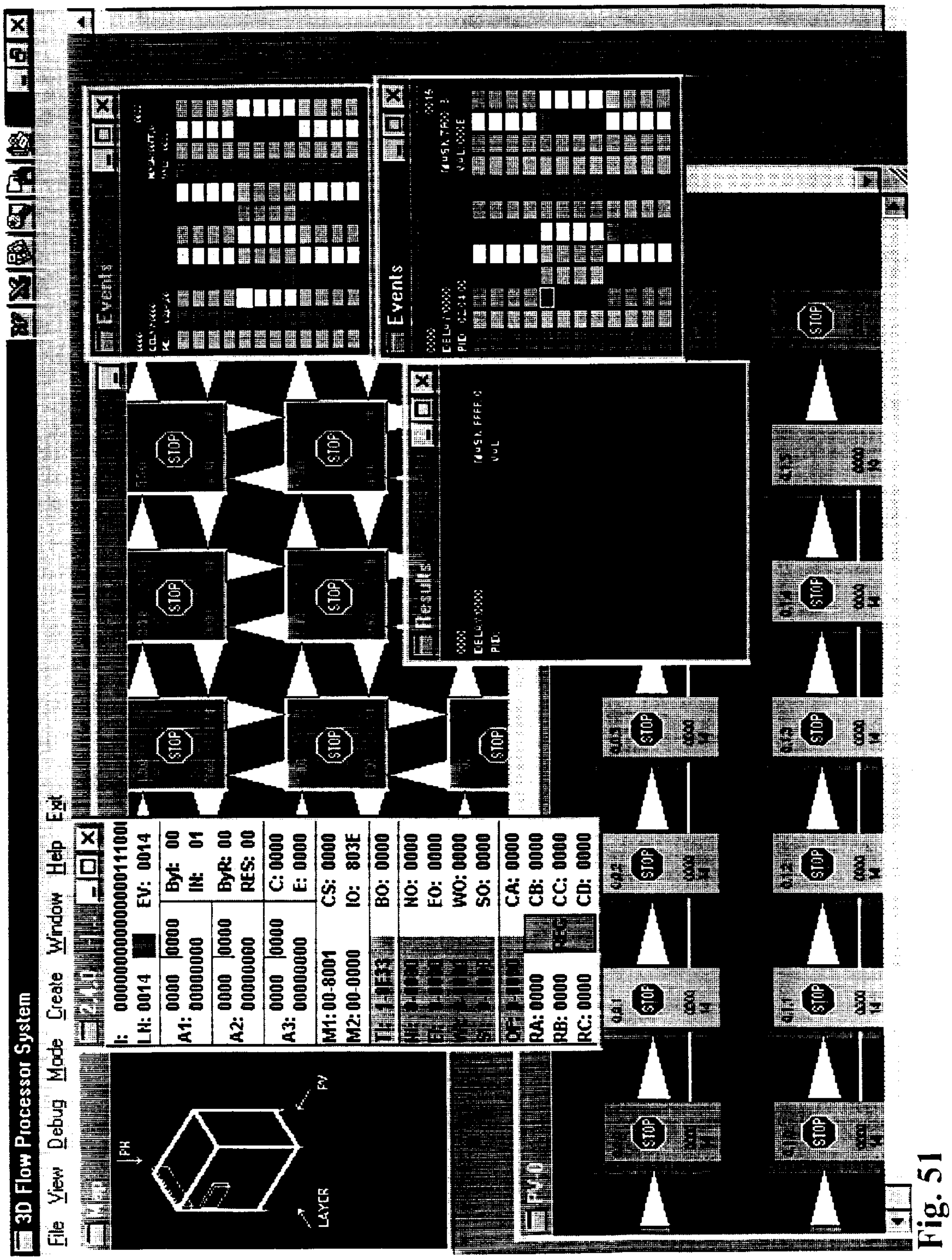

FIG. 51. Step one execution of Electron+hadron algorithm.

Figure 52:
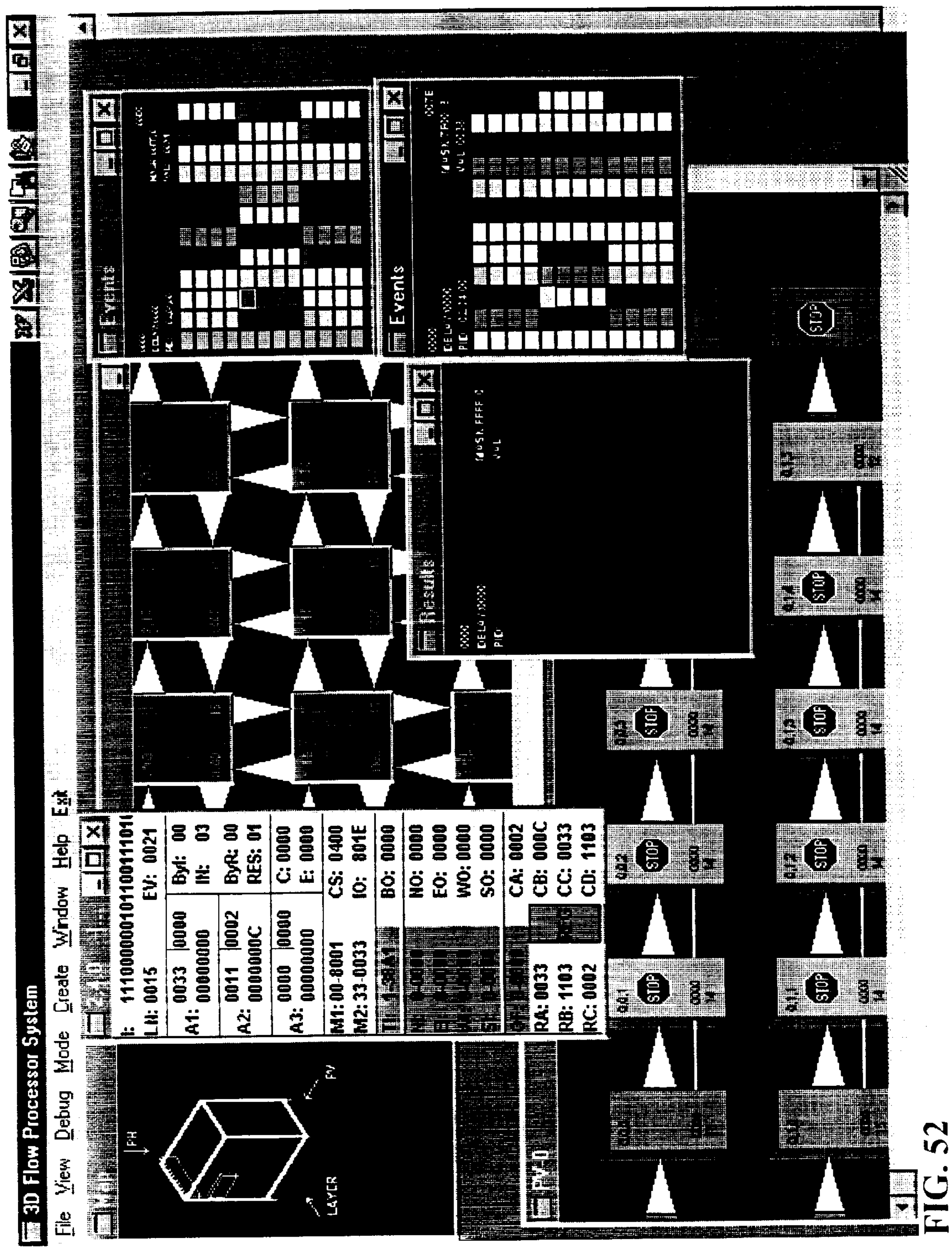

FIG. 52. Step 2 execution of electron+hadron algorithm.

Figure 53:
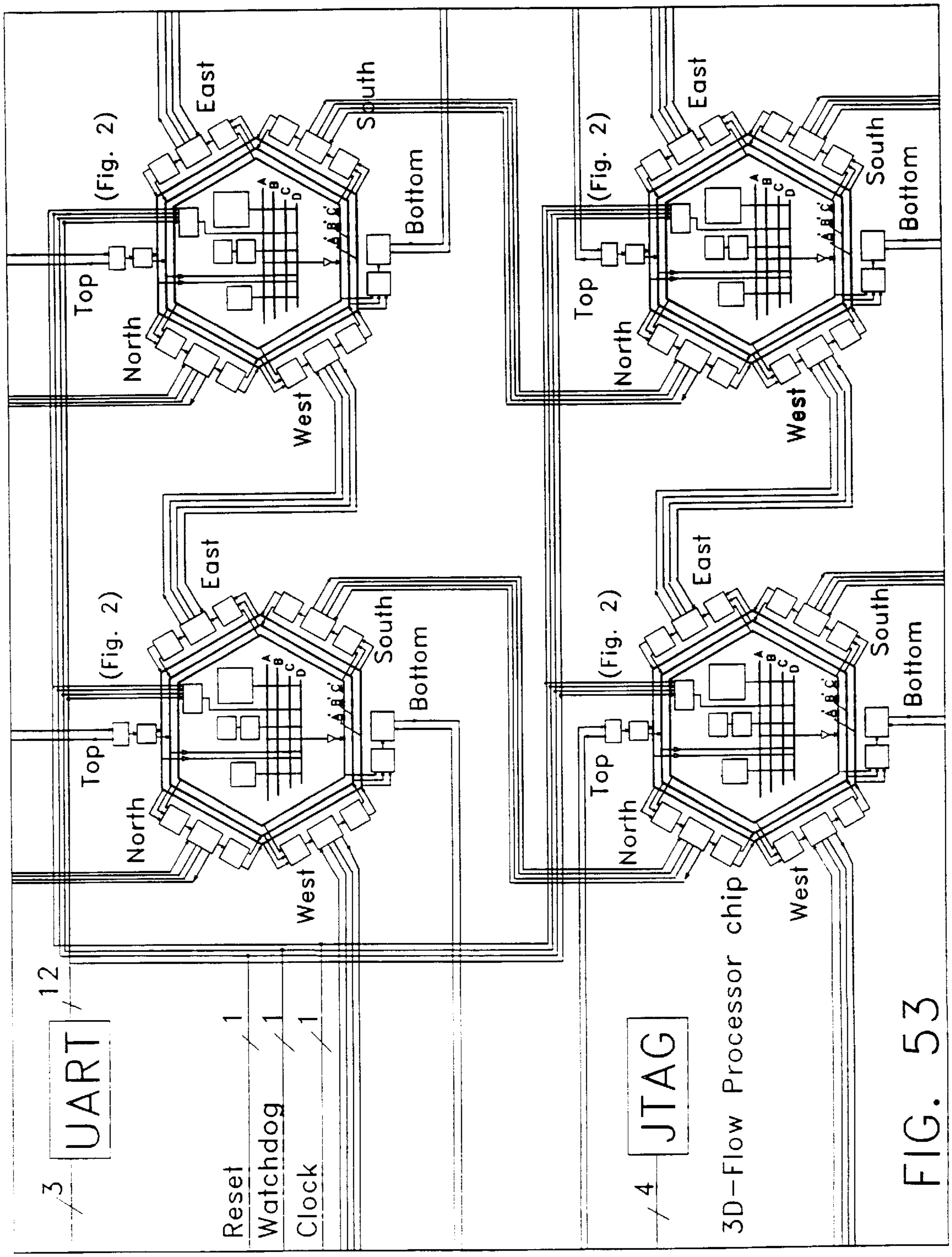

FIG. 53. The 3D-Flow ASIC. Each ASIC contains four identical 3D-Flow processors or PE.

Figure 54:
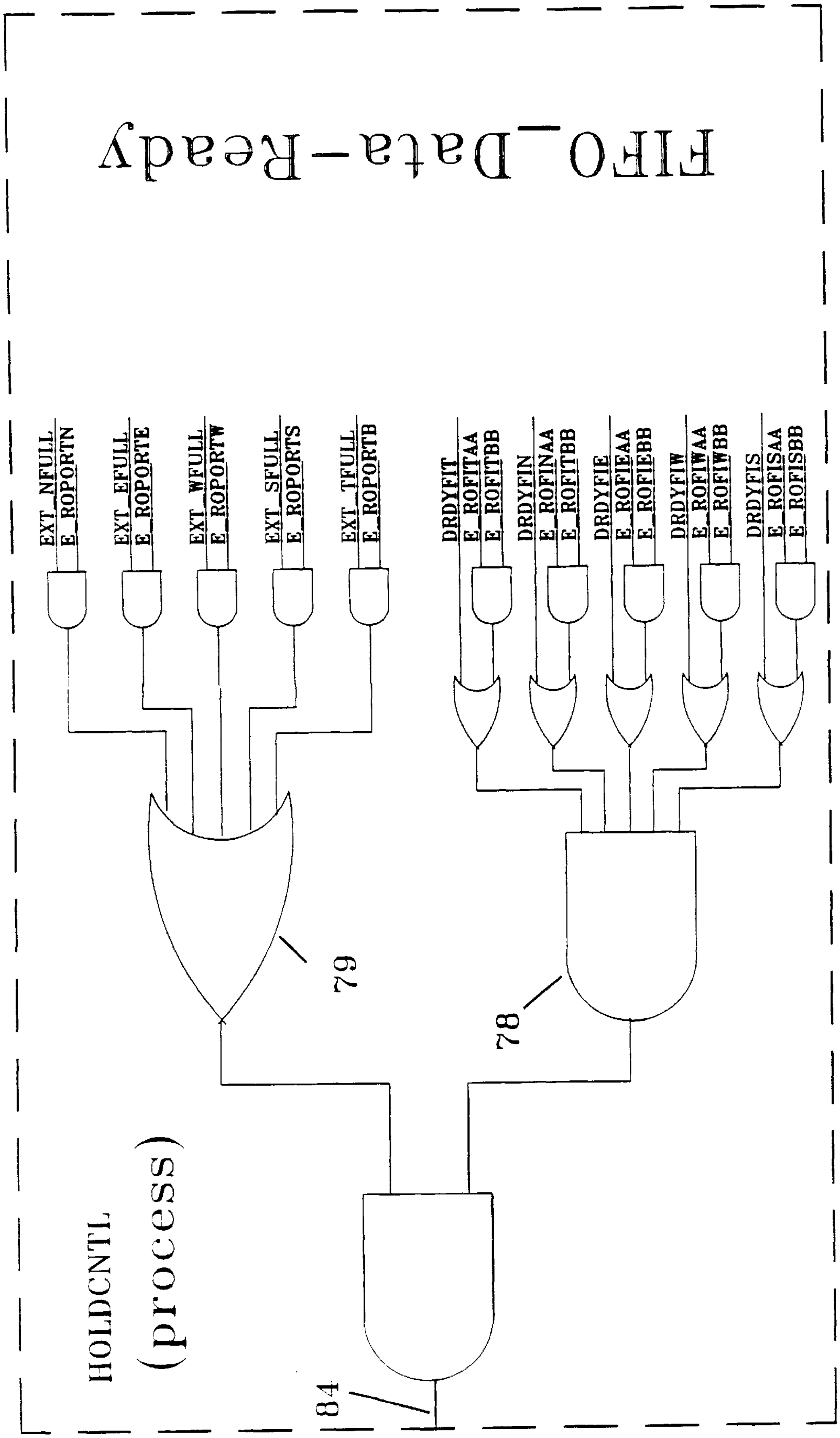

FIG. 54. is detail of FIG. 55 showing how the processor is put in hold state by the FIFOs full of next processor and Data not ready at the Input FIFOs.

FIG. 55. Internal architecture (part a).

FIG. 56. 3-D Flow processor internal architecture (part b).

Figure 57:
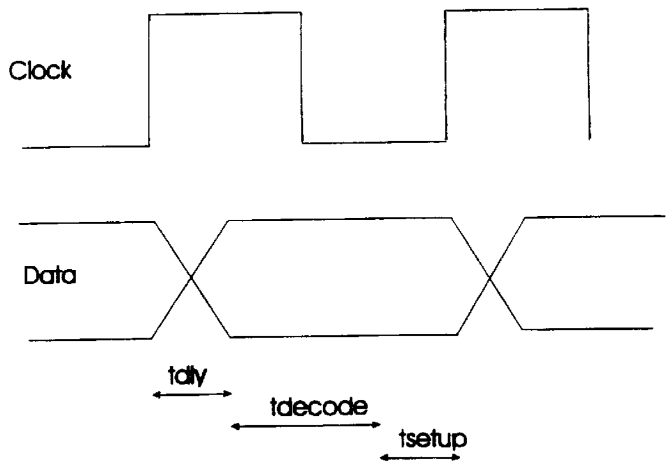

FIG. 57. Timing of the drivers of the 3D-Flow internal_ buses.

Figure 58:
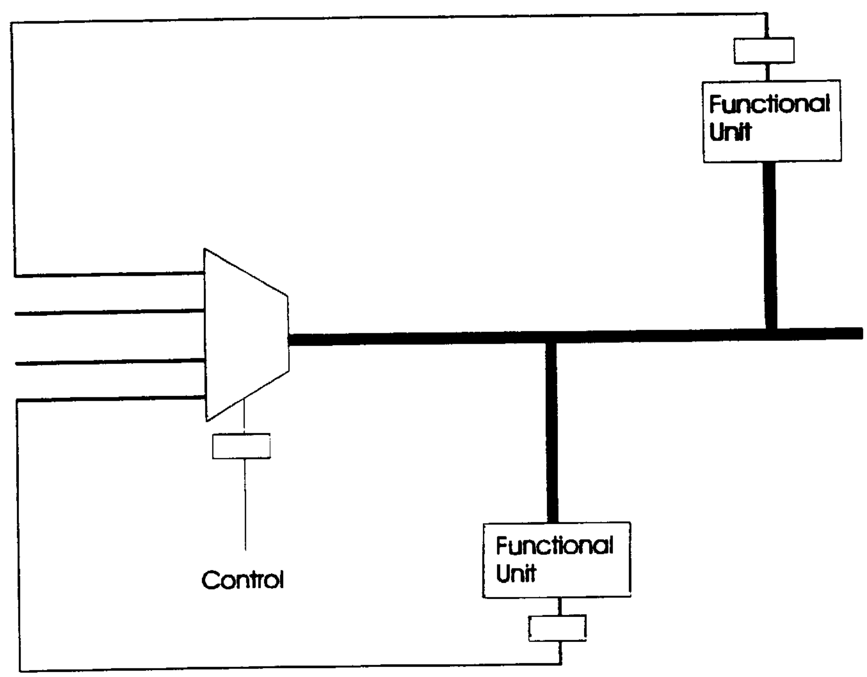

FIG. 58. Layout of the driving of the 3D-Flow internal buses.

Figure 59:
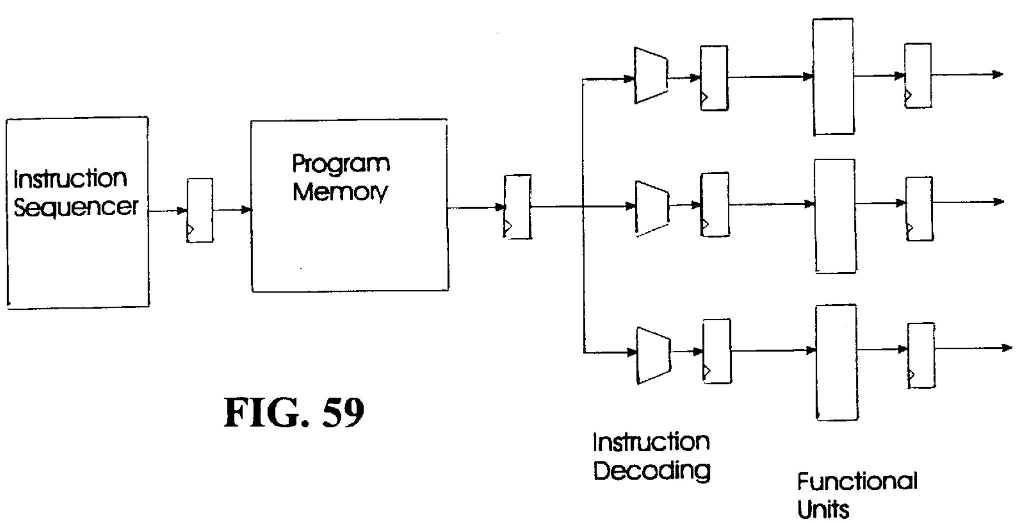

FIG. 59. General layout of the 3D-Flow internal pipelining.

Figure 60:
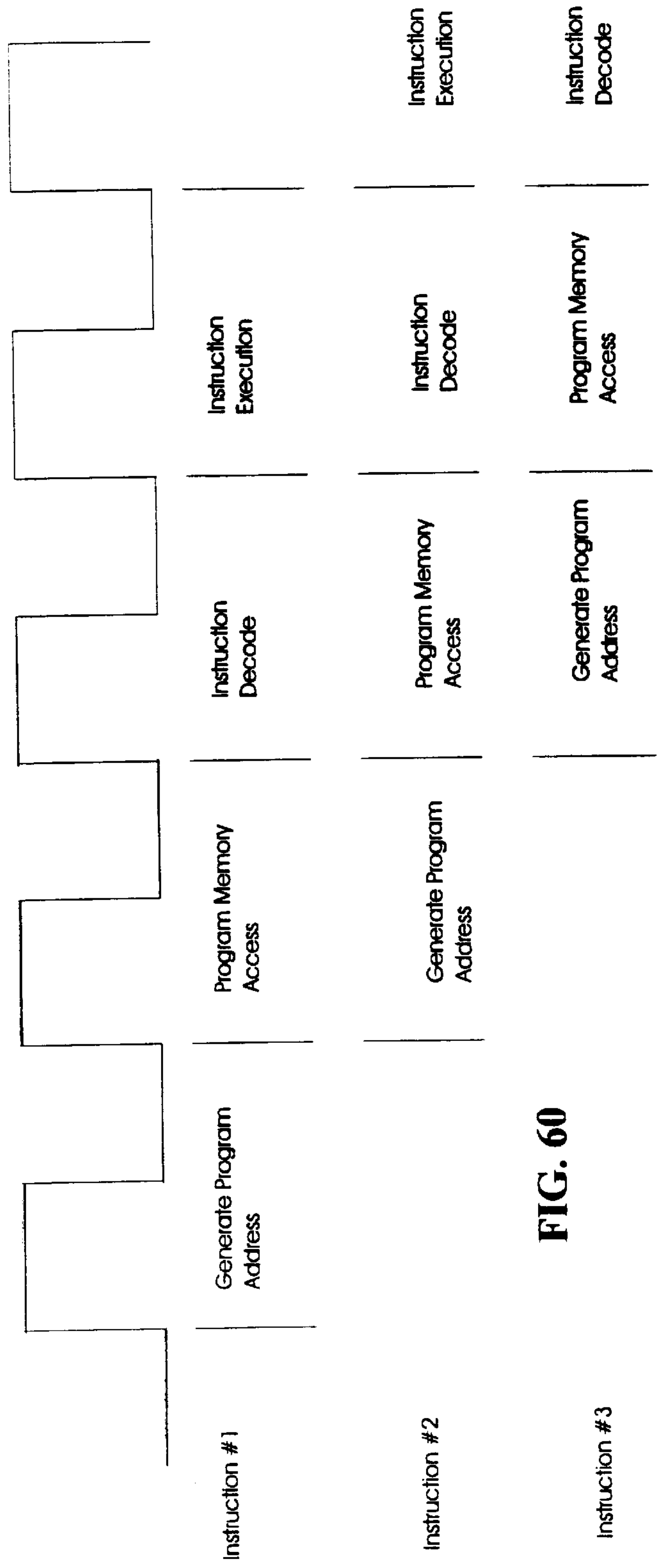

FIG. 60. Internal timing diagram of the 3D-Flow processor. (During sequential operations with no branches).

Figure 61:
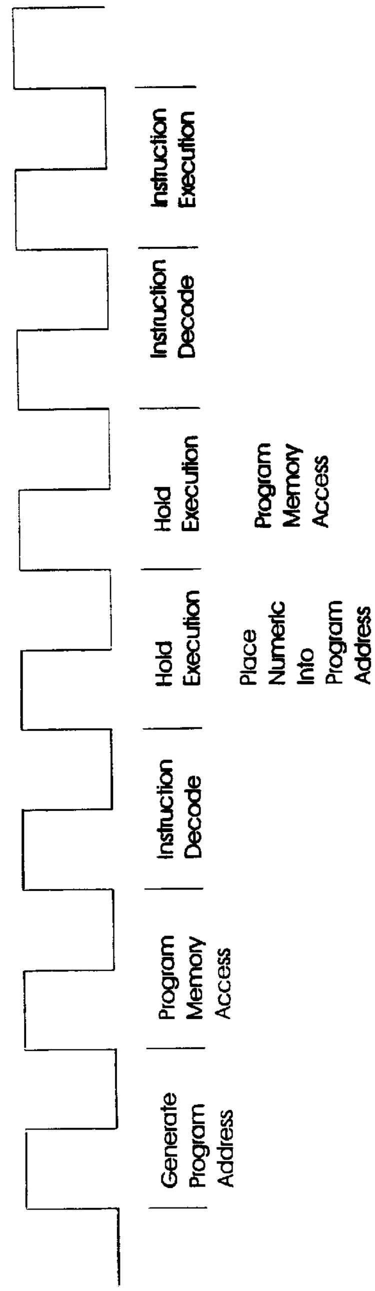

FIG. 61. Timing diagram of the 3D-Flow processor internal pipelining. (During branch operation).

Figure 62:
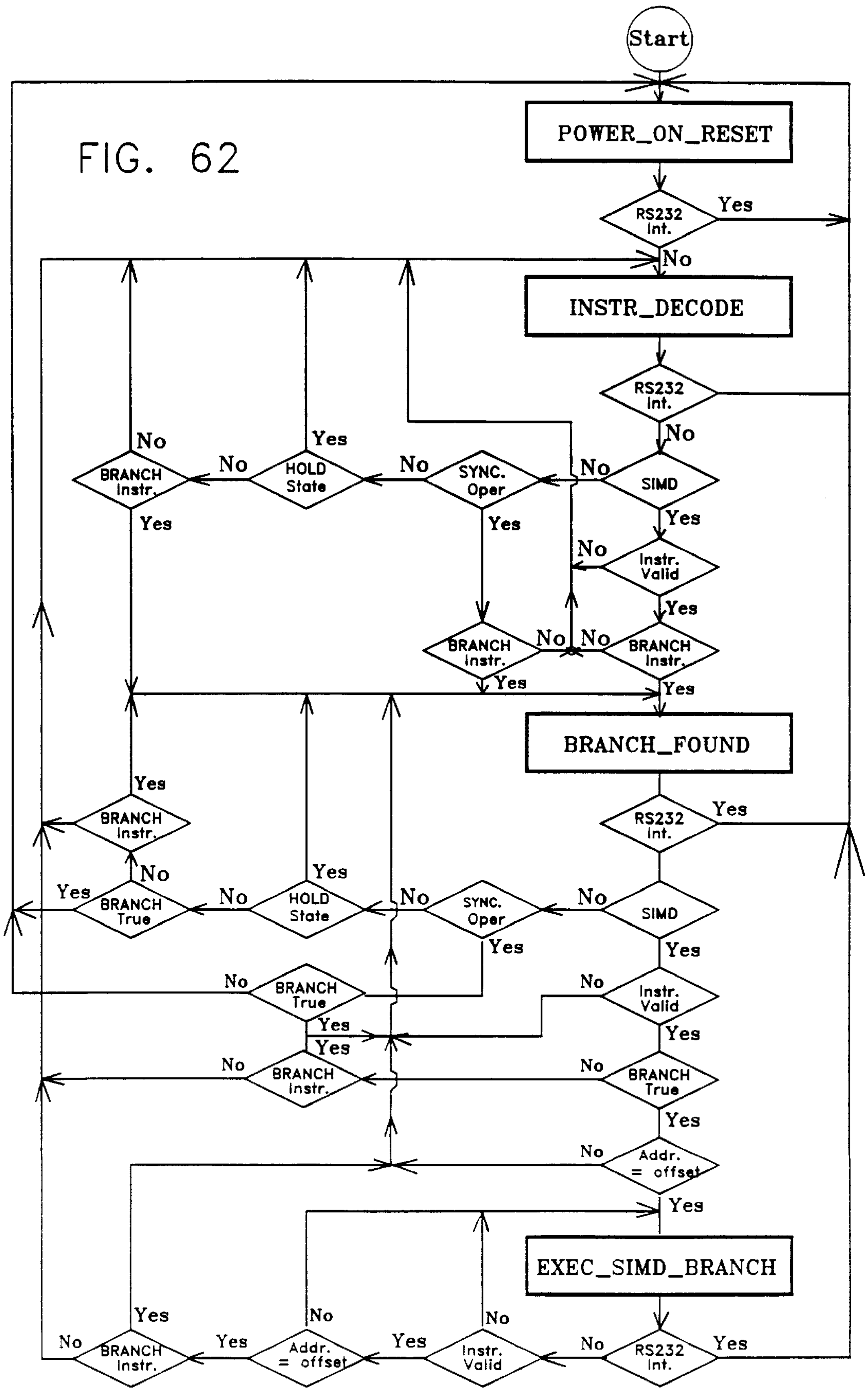

FIG. 62. Shows the instruction sequencer state diagram.

Figure 63:
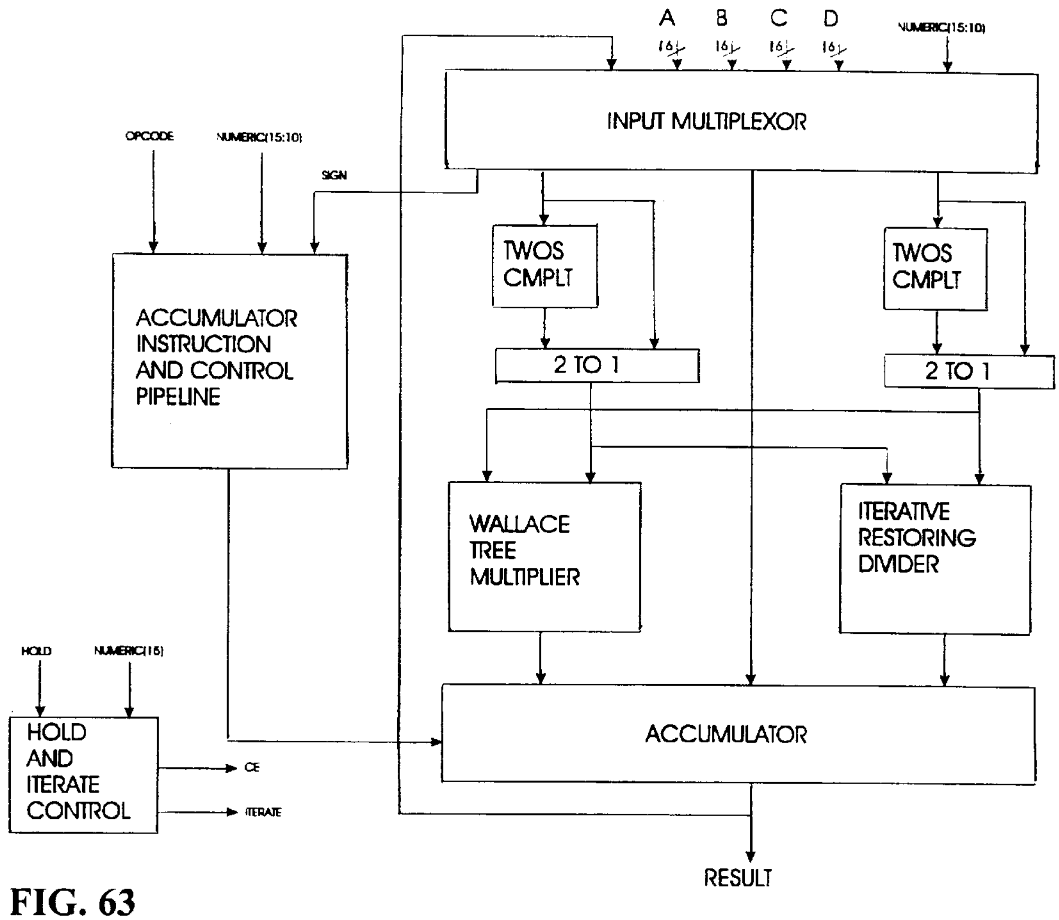

FIG. 63. Multiply Accumulate and Divide Unit.

Figure 64:
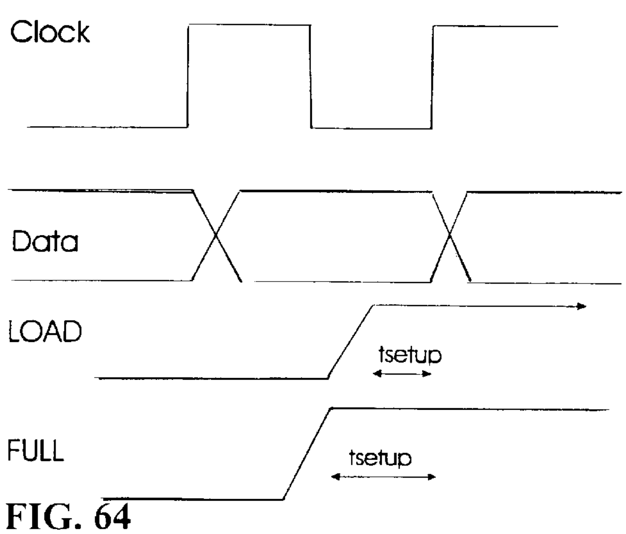

FIG. 64. Timing of the external bus interface.

FIG. 65. Processor output and input I/O port bus structure.

Figure 66:
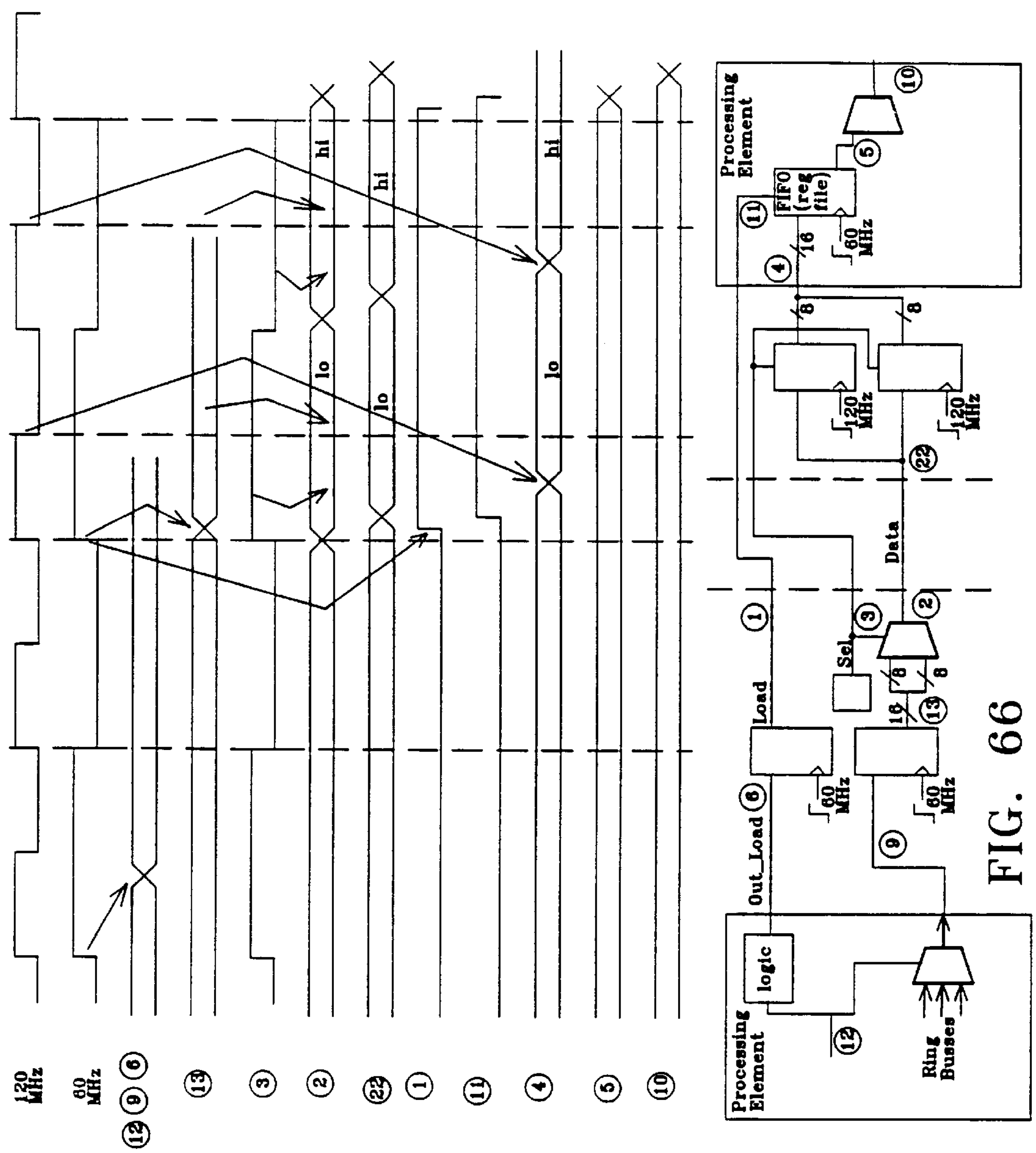

FIG. 66. Interface signals between two ASICs adjacent ports.

Figure 67:
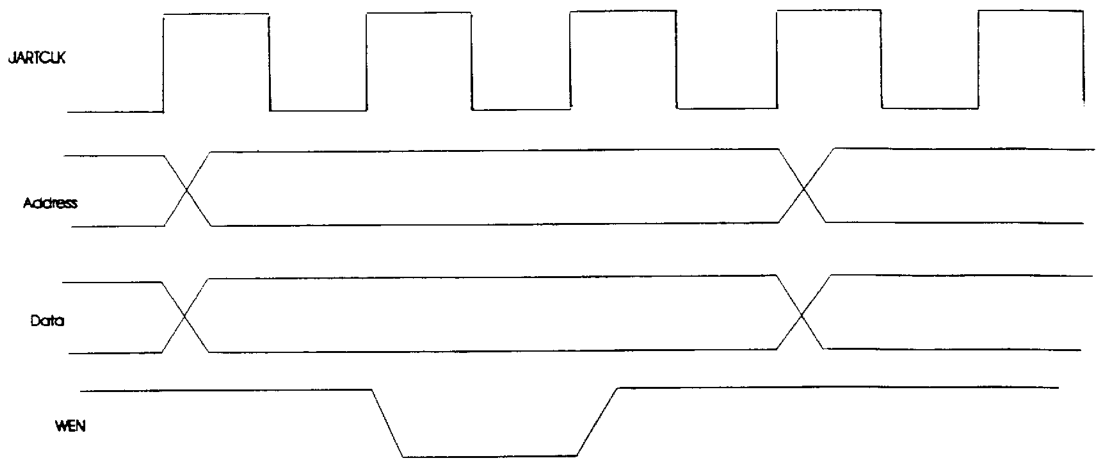

FIG. 67. Timing of the RS232C signals driving the data, address, and write enable buses.

Figure 68:
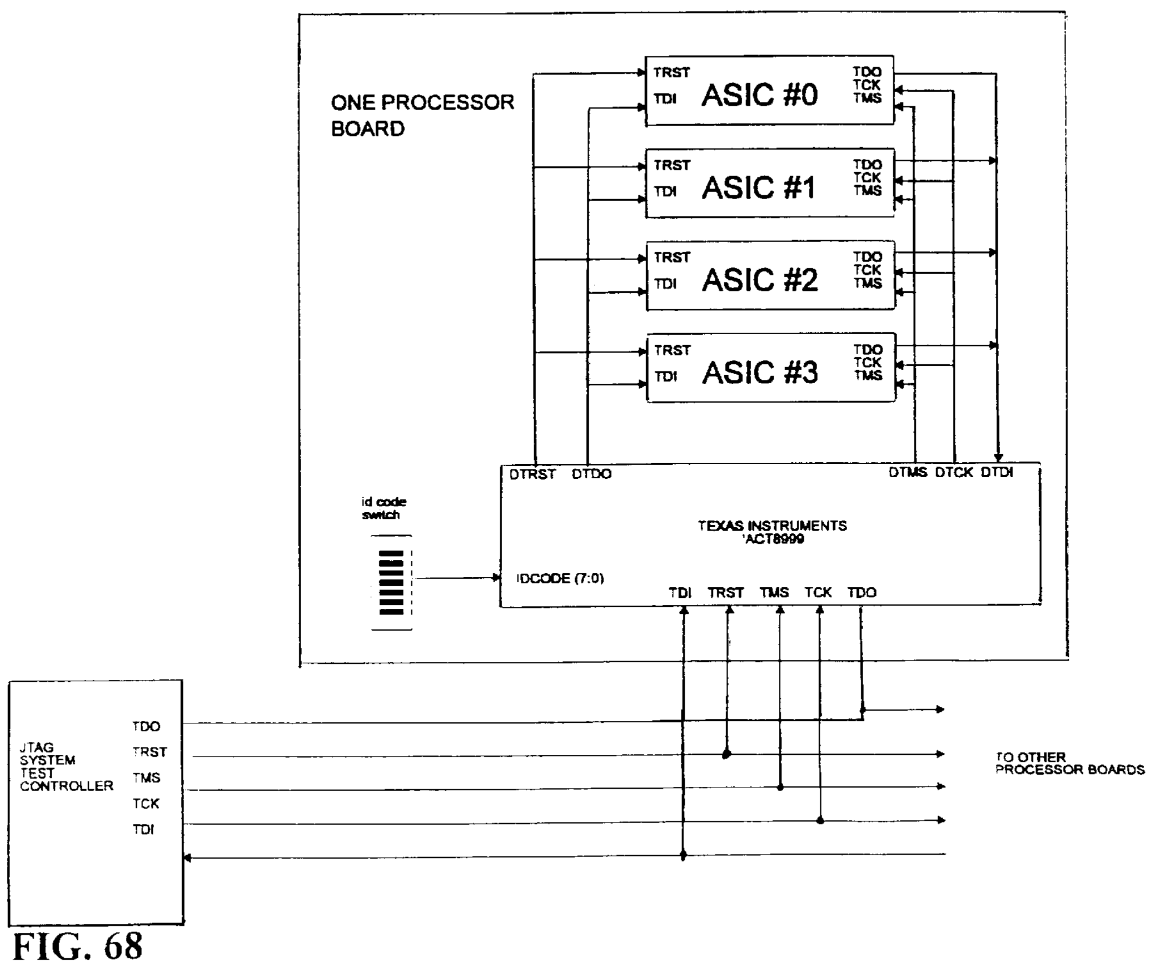

FIG. 68. Daisy-chain of the JTAG signals between several 3D-Flow chips.

Figure 69:
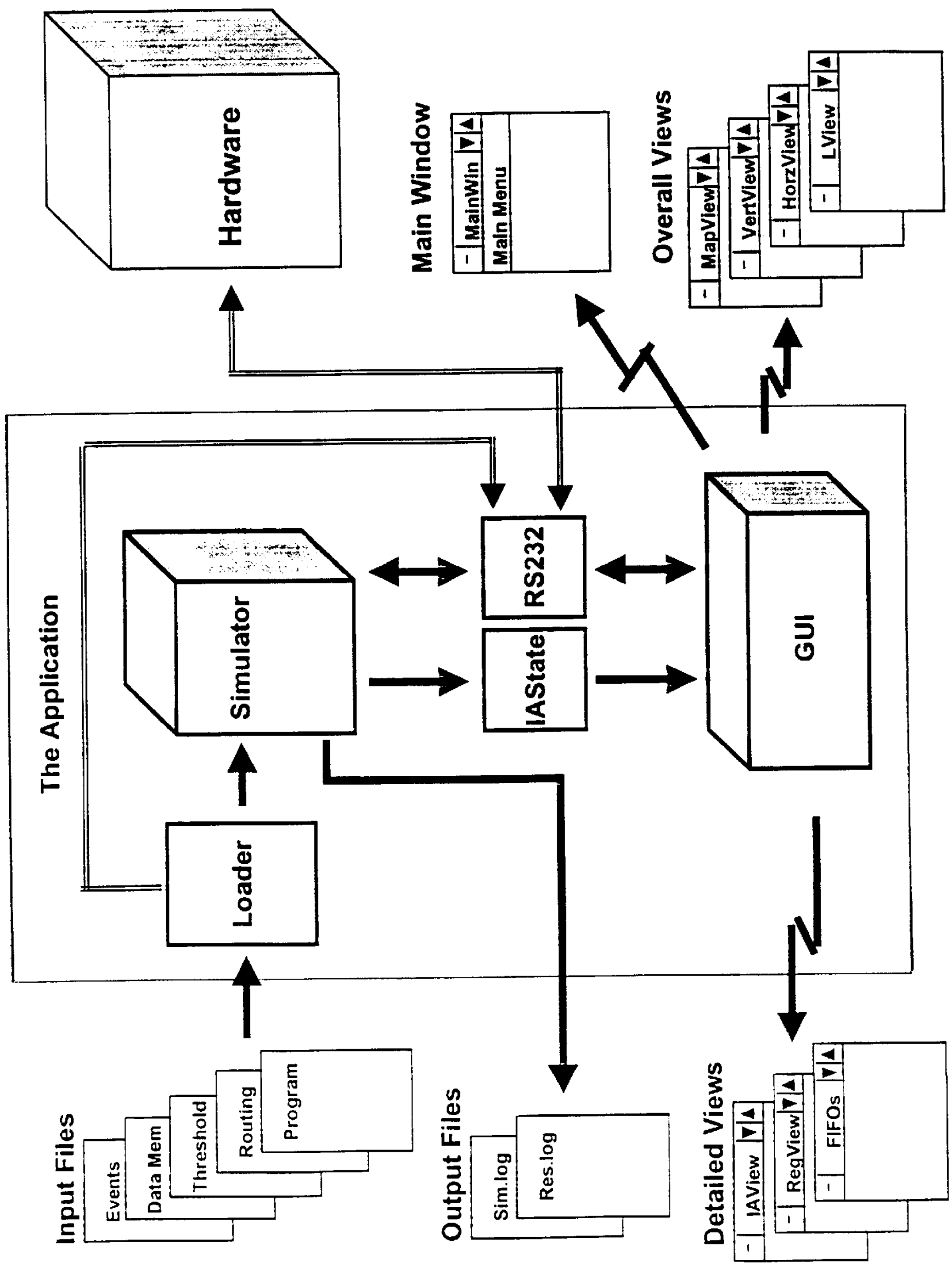

FIG. 69. The overall design of the components of the software development tools.

Figure 70:
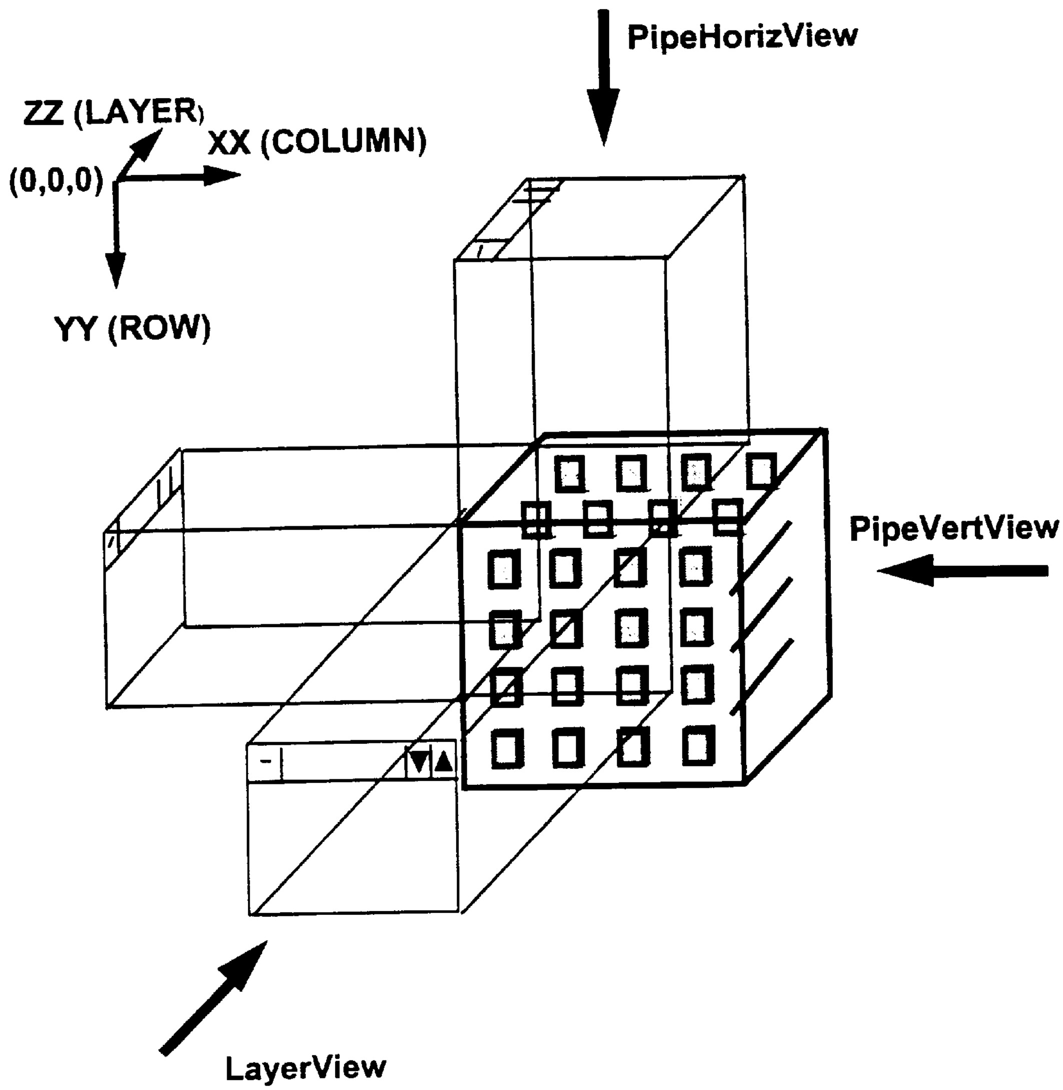

FIG. 70. The orientation of the overall views of the 3D-Flow simulator.

Figure 71:
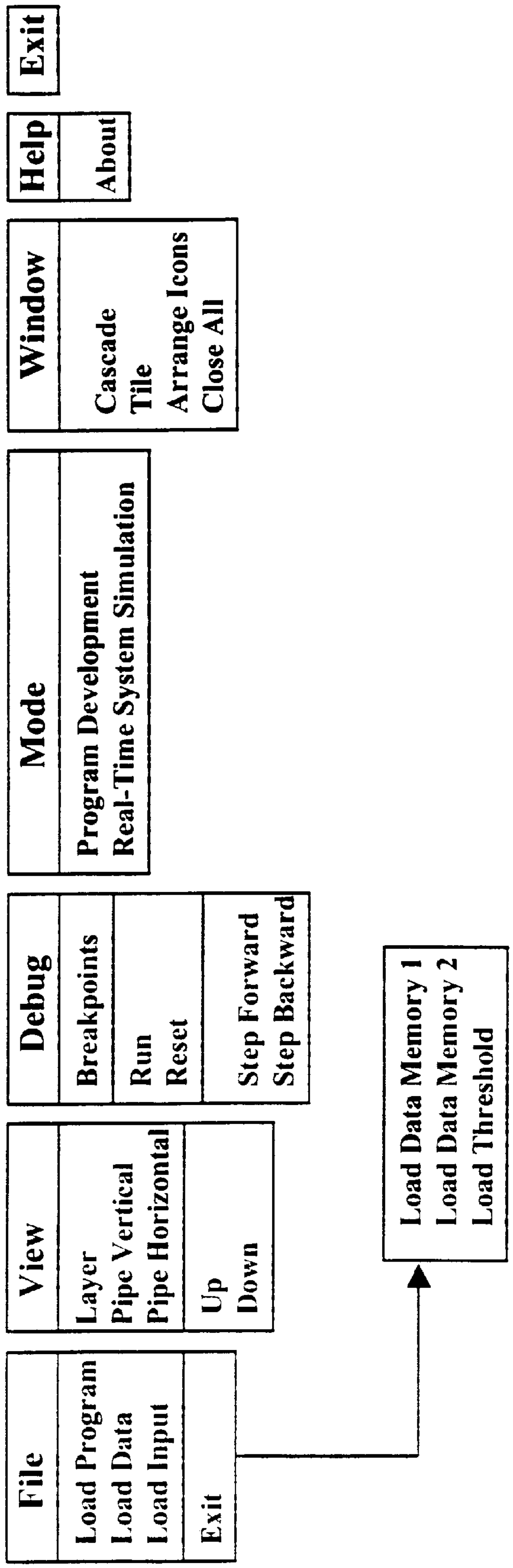

FIG. 71. The main menu of the 3D-Flow simulator.

Figure 72:
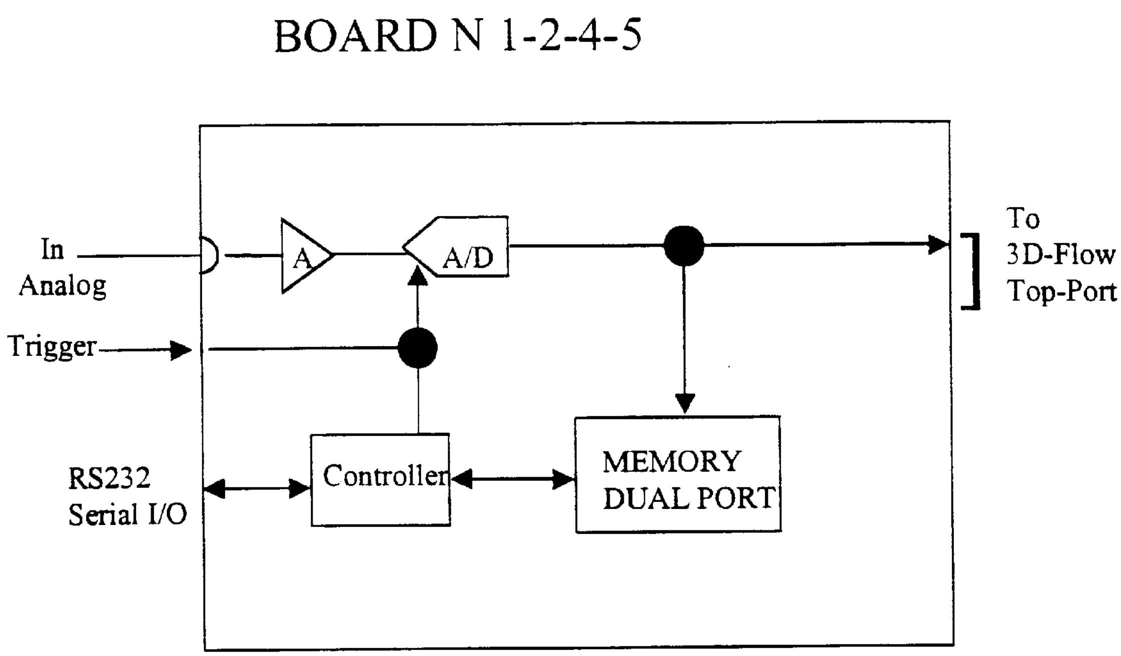

FIG. 72. Layout of the 4 receivers board to interface the analog input signal to the digital input to the 3D-Flow top port.

Figure 73:
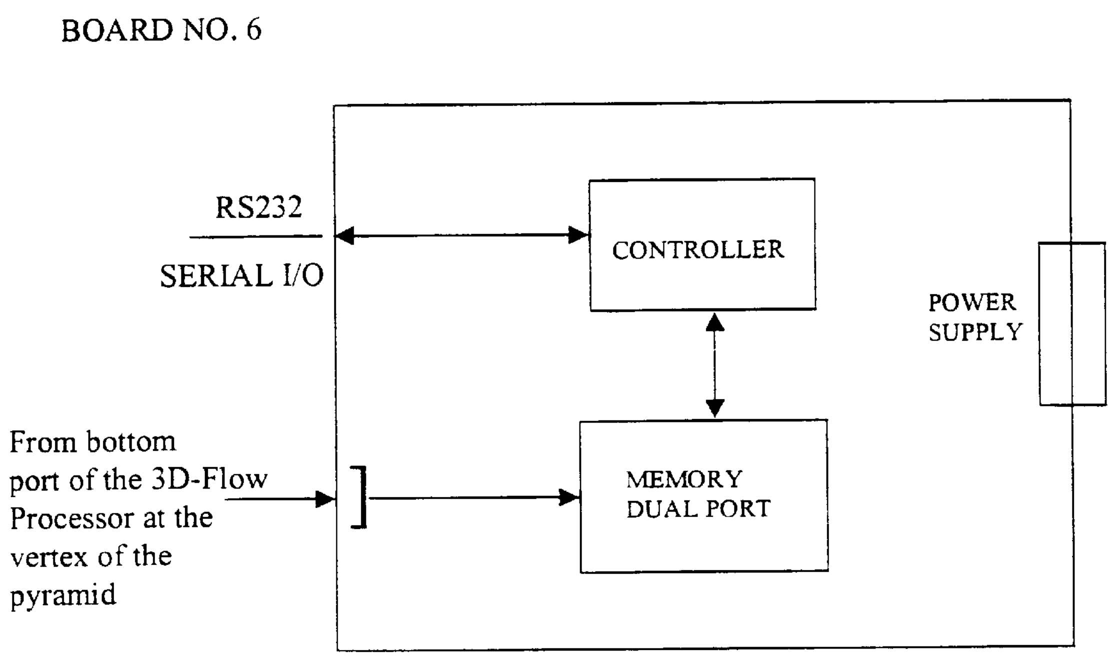

FIG. 73. Layout of the interface between the IBM-PC and results provided by the 3D-Flow system.

Figure 74:
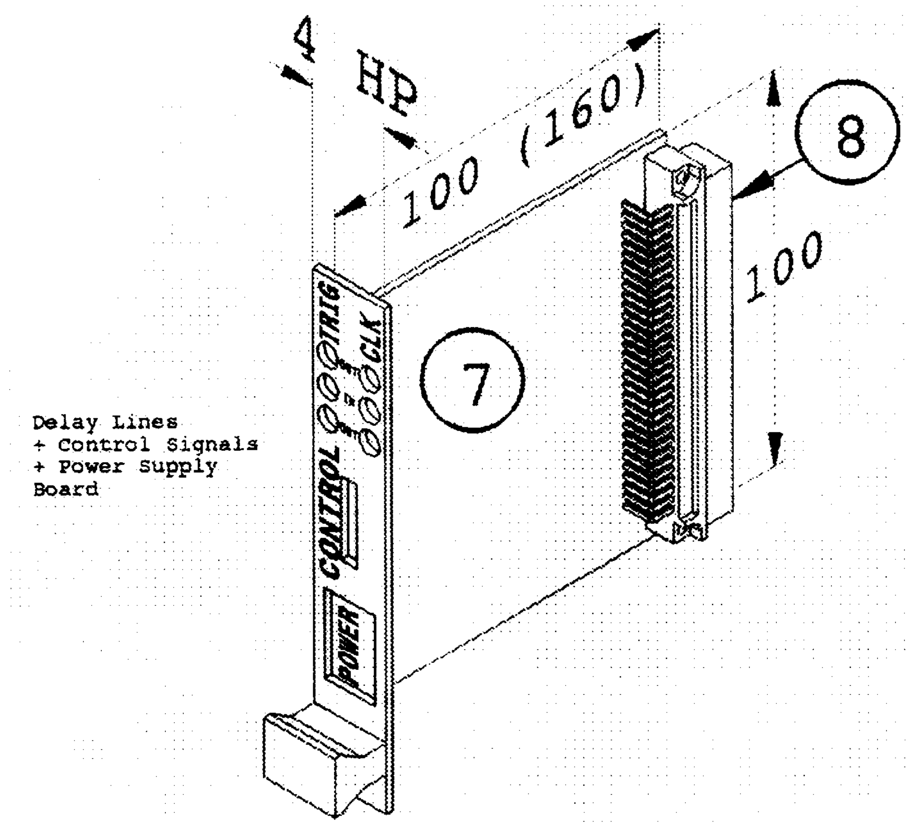

FIG. 74. Control lines and power supply board.

Figure 75:
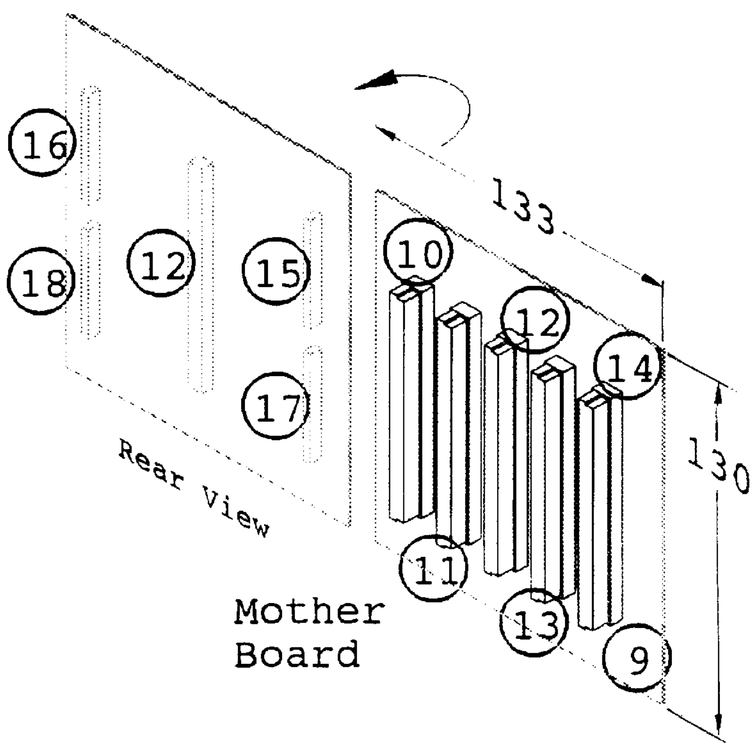

FIG. 75. The back-plane board (or motherboard).

Figure 76:
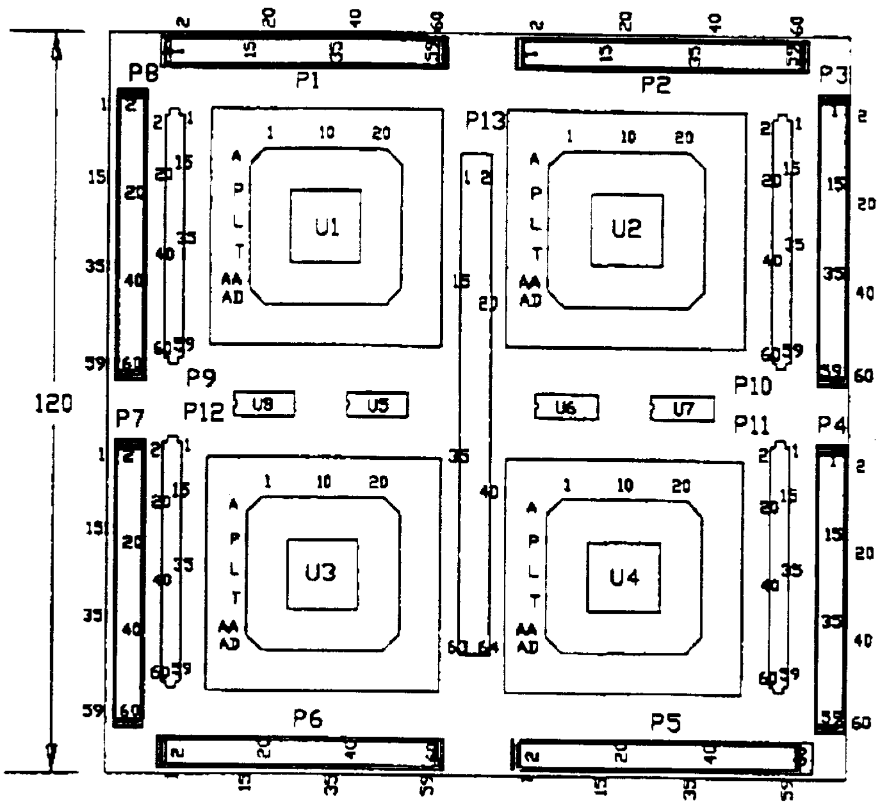

FIG. 76. The 3D-Flow board (front-view).

Figure 77:
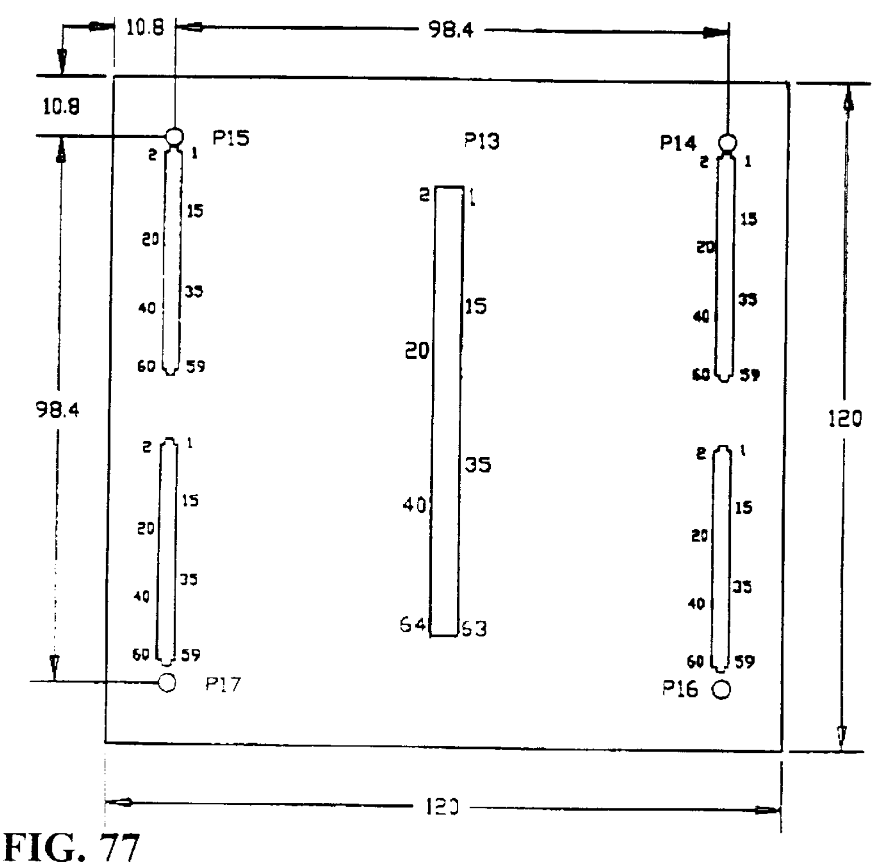

FIG. 77. The 3D-Flow board (rear-view).

Figure 78:
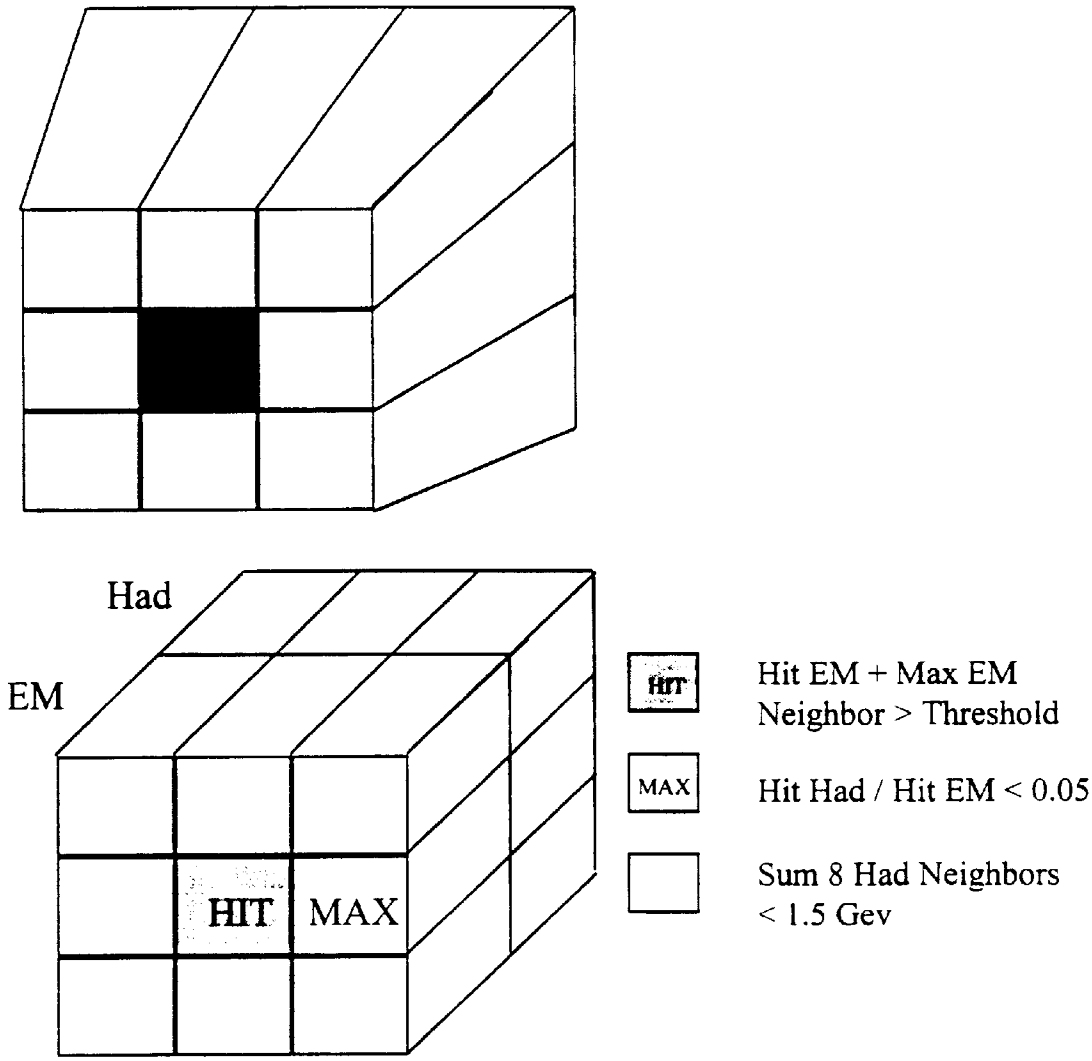

FIG. 78. Technique of pattern recognition on a 3×3 Input data from sensors.

Figure 79:
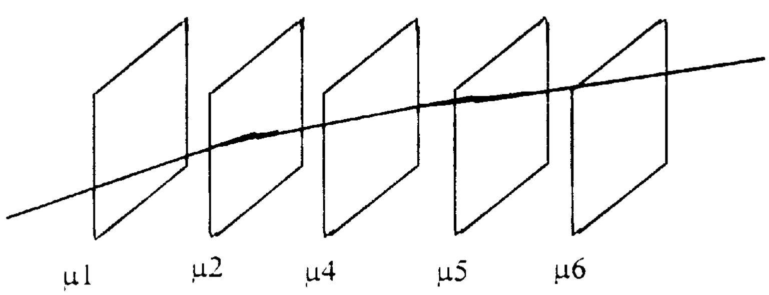

FIG. 79. Technique of path finding from input data from sensors on different planes.

Figure 80:
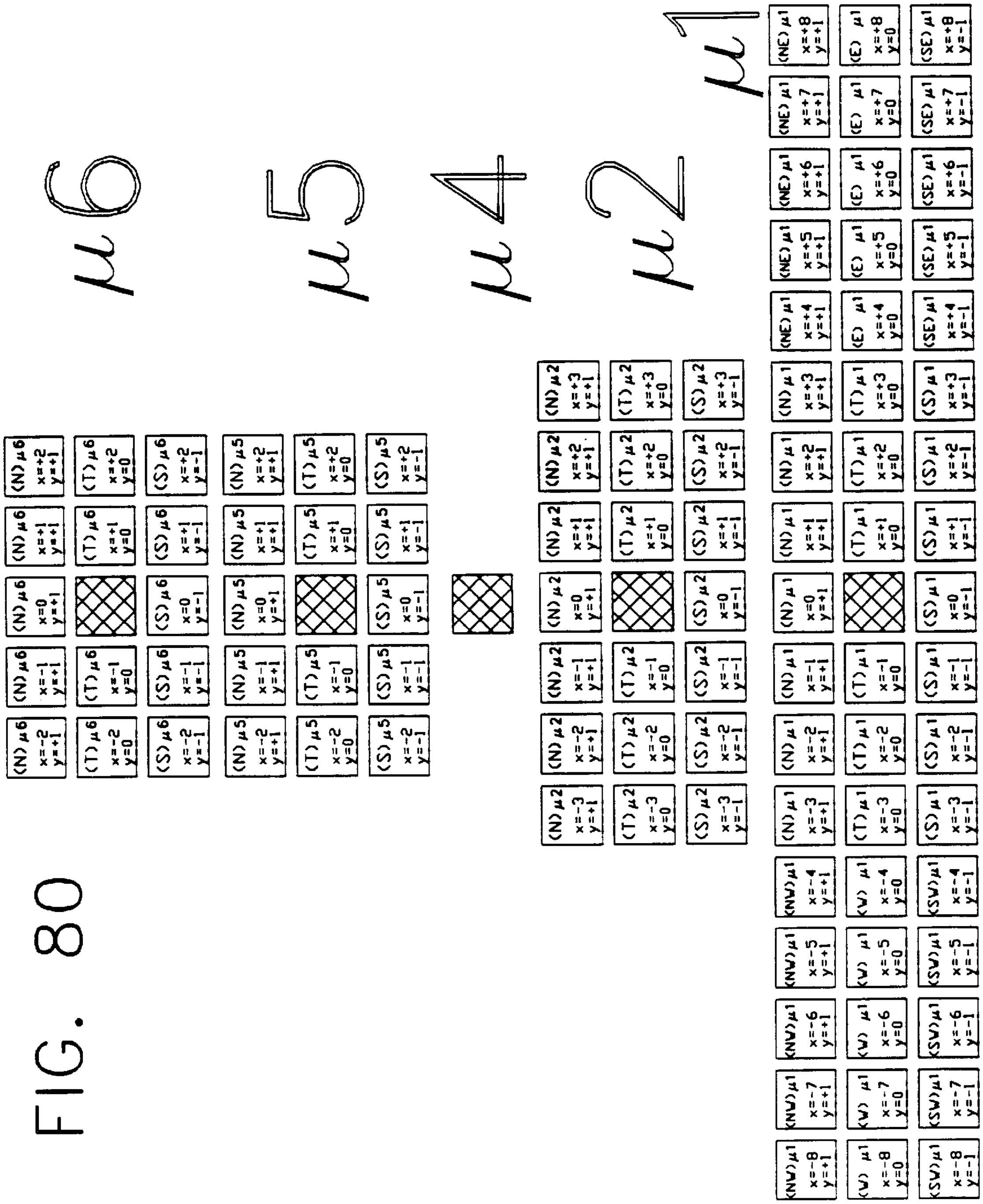

FIG. 80. Pad information, from the LHC-B spectrometer, needed by each processor in order to find all possible tracks (considering the maximum bending).

Figure 81:
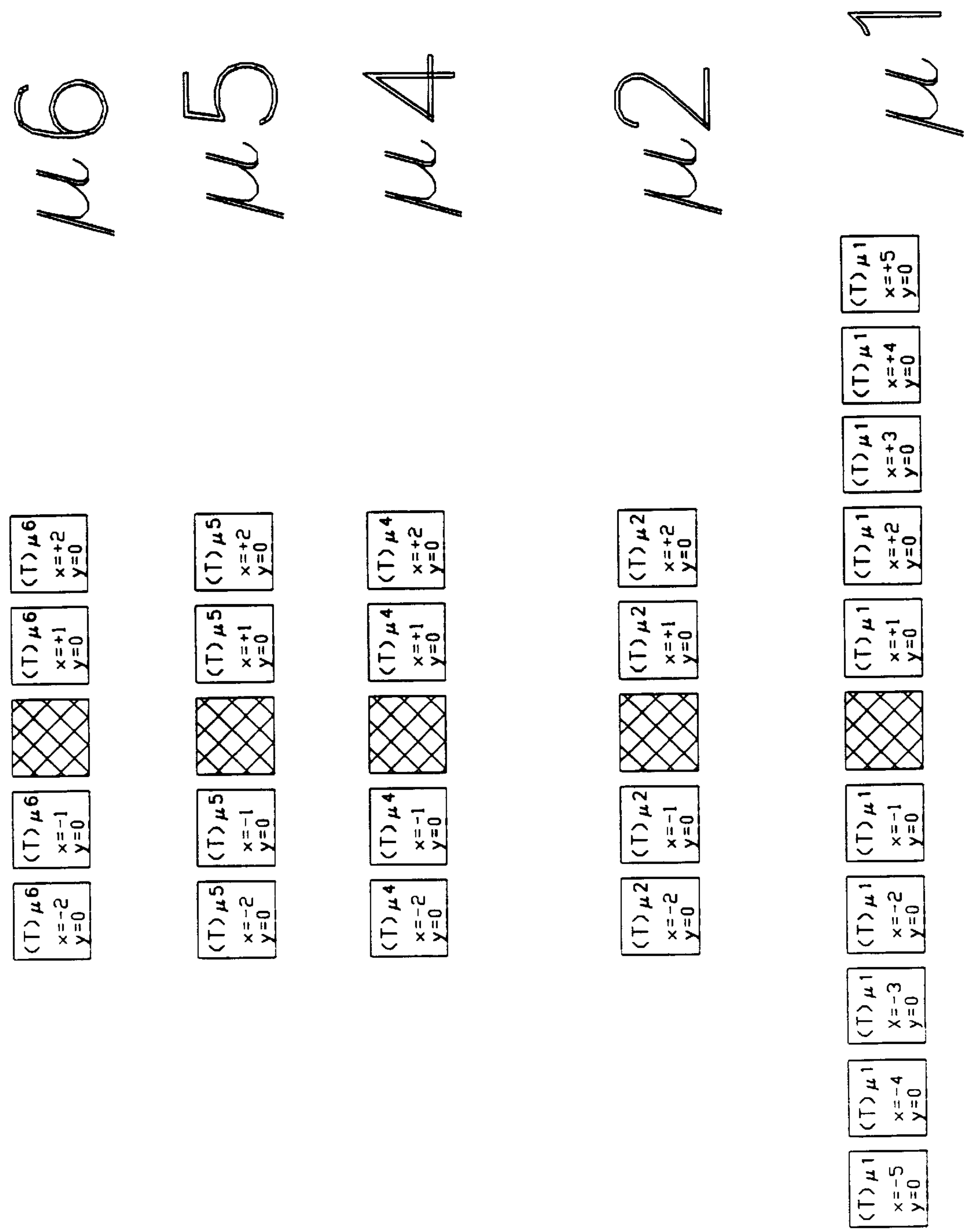

FIG. 81. Pad information received by each processor from the LHC-B detector.

Figure 82:
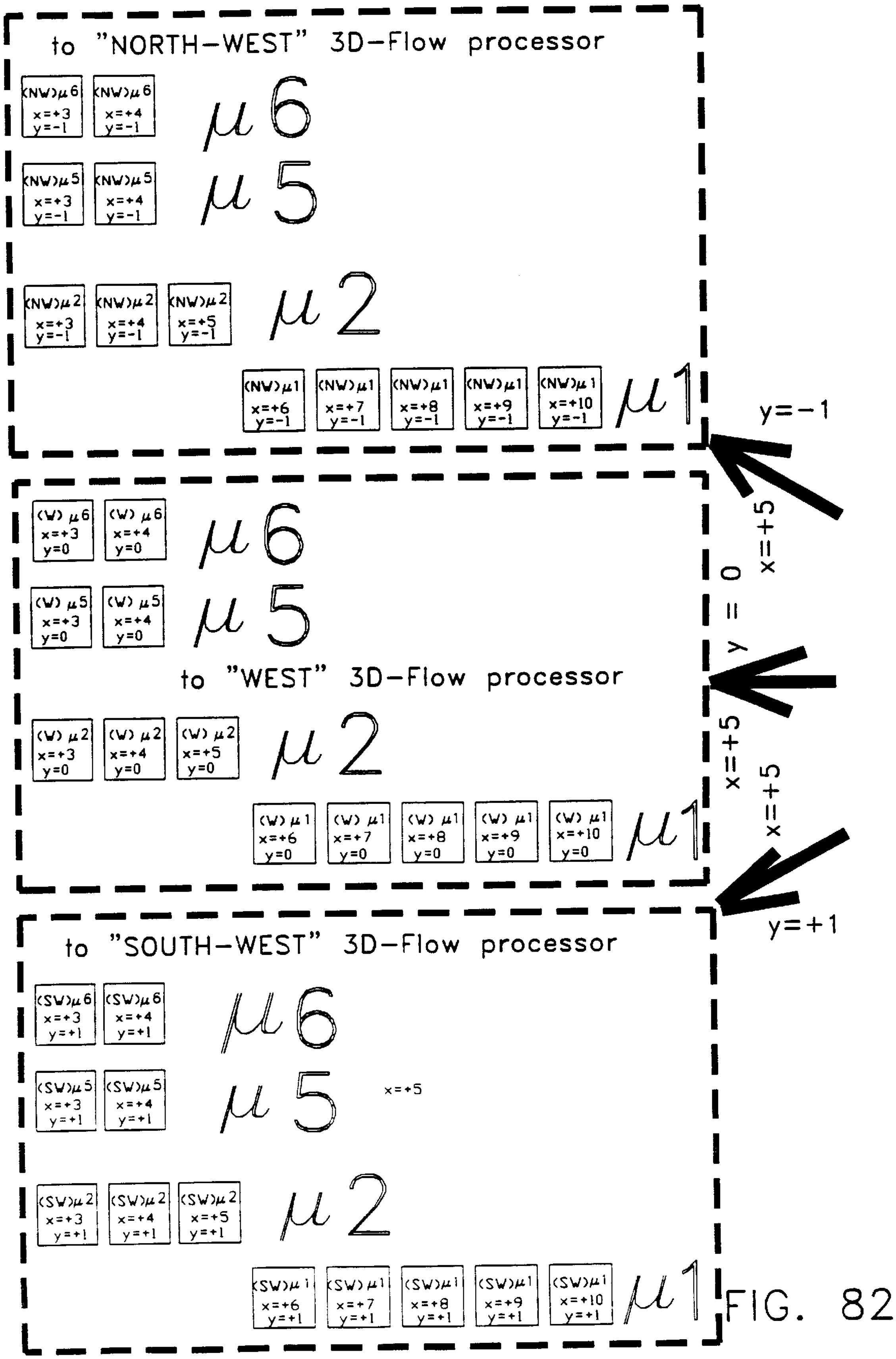

FIG. 82. Pad information sent to the left neighboring processor.

Figure 83:
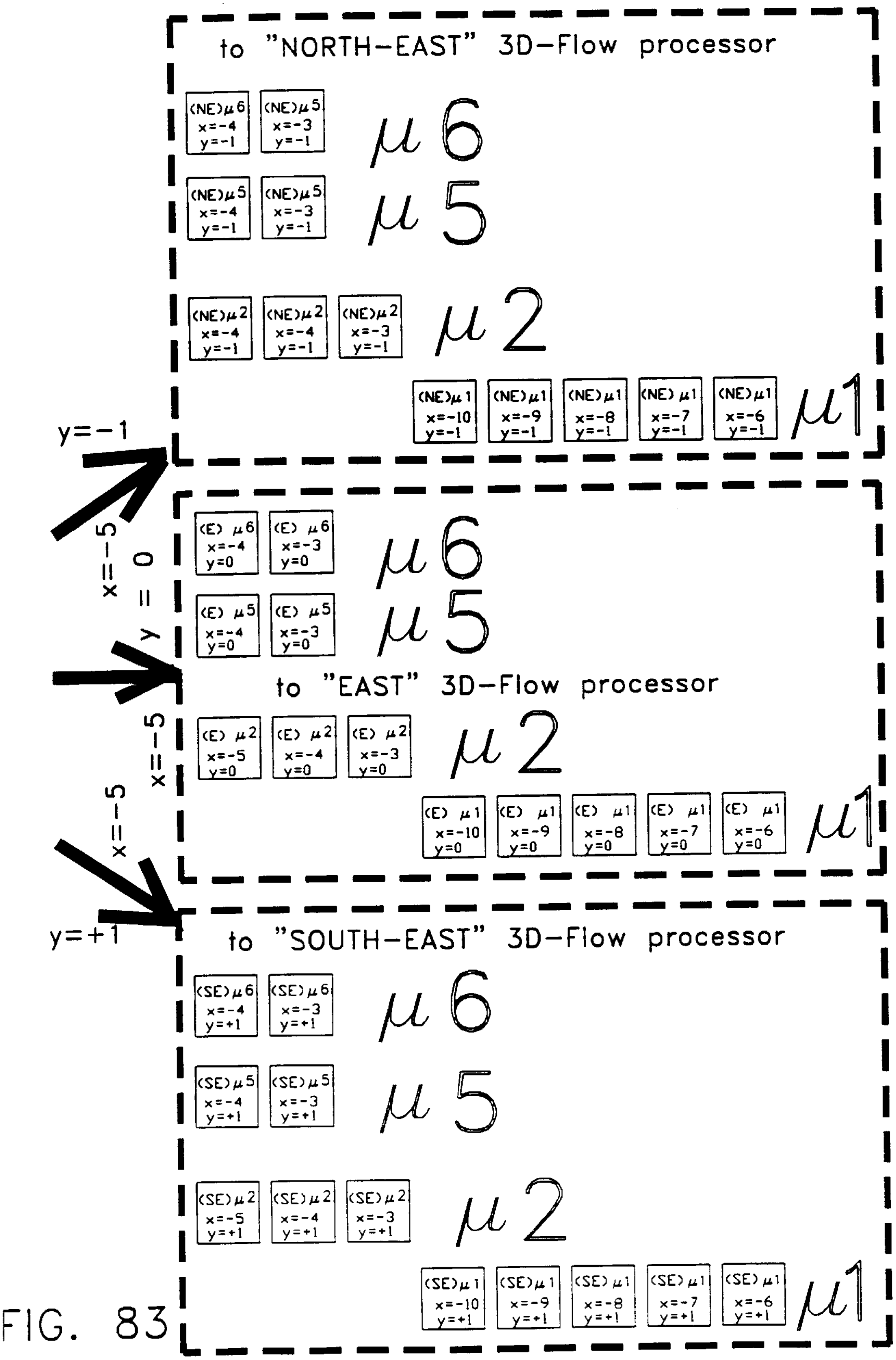

FIG. 83. Pads information sent to the right neighboring processor.

Figure 84:
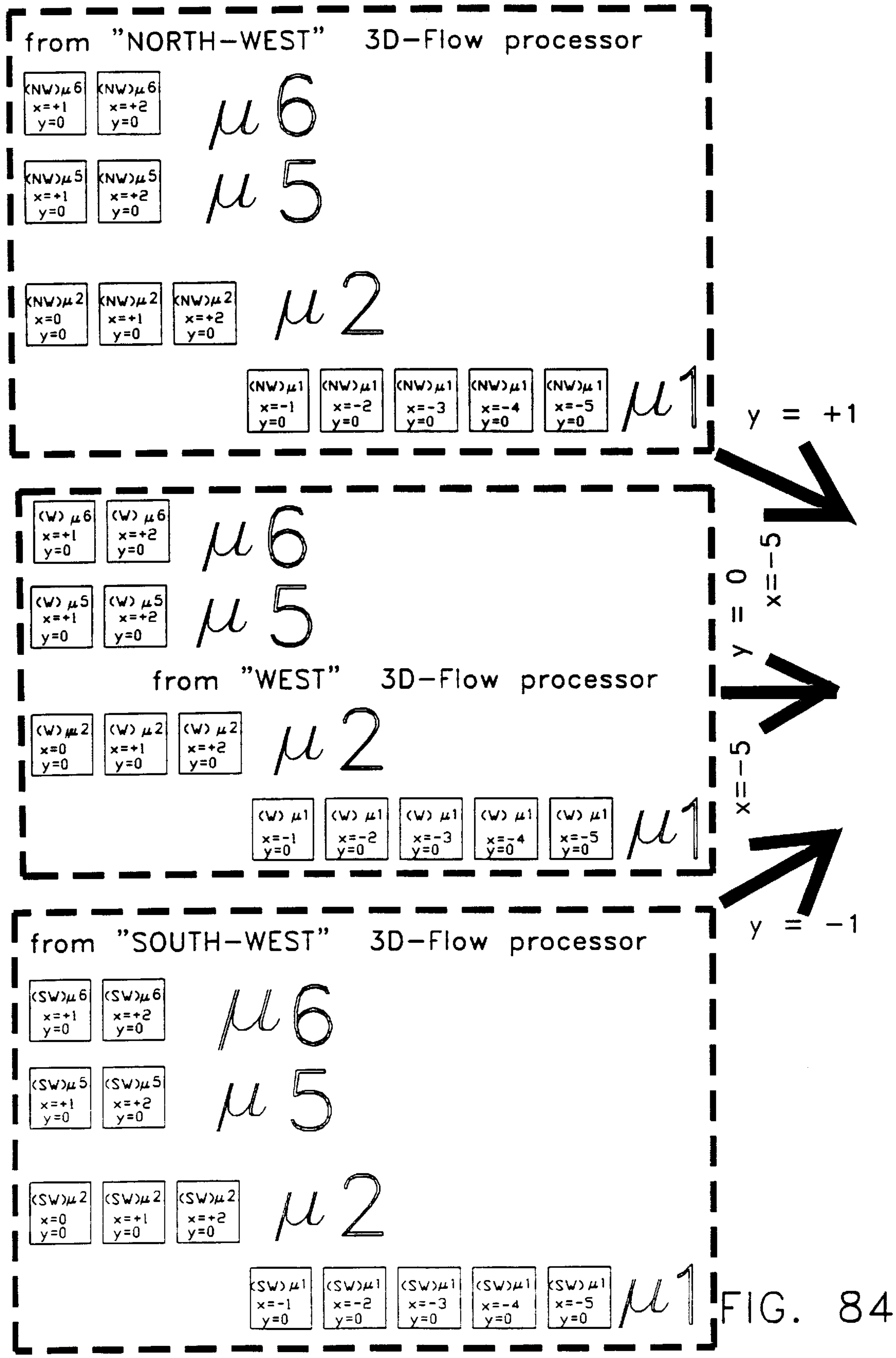

FIG. 84. Pad information sent to the left neighboring processor.

Figure 85:
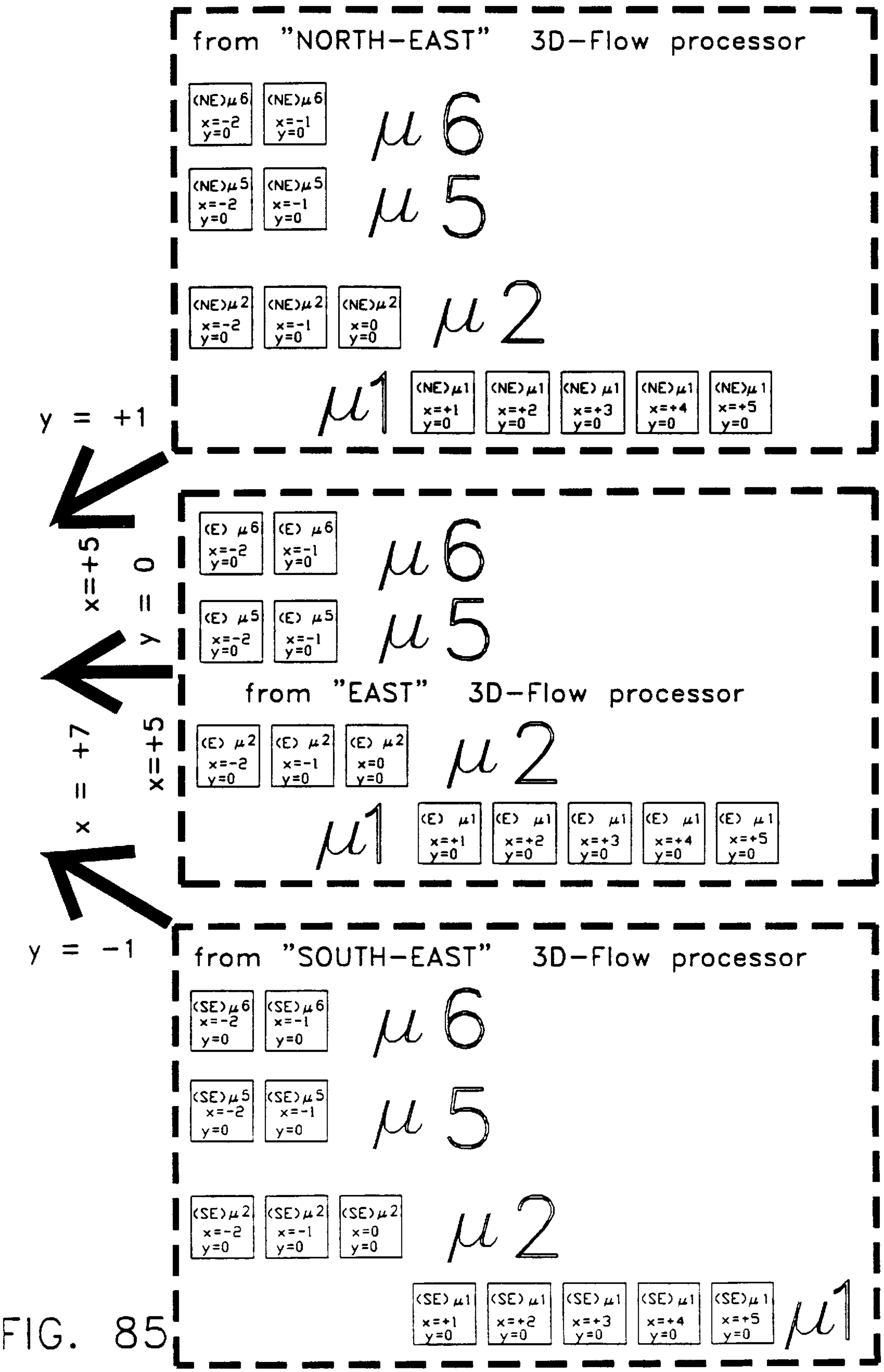

FIG. 85. Pad information sent to the right neighboring processor.

Figure 86:
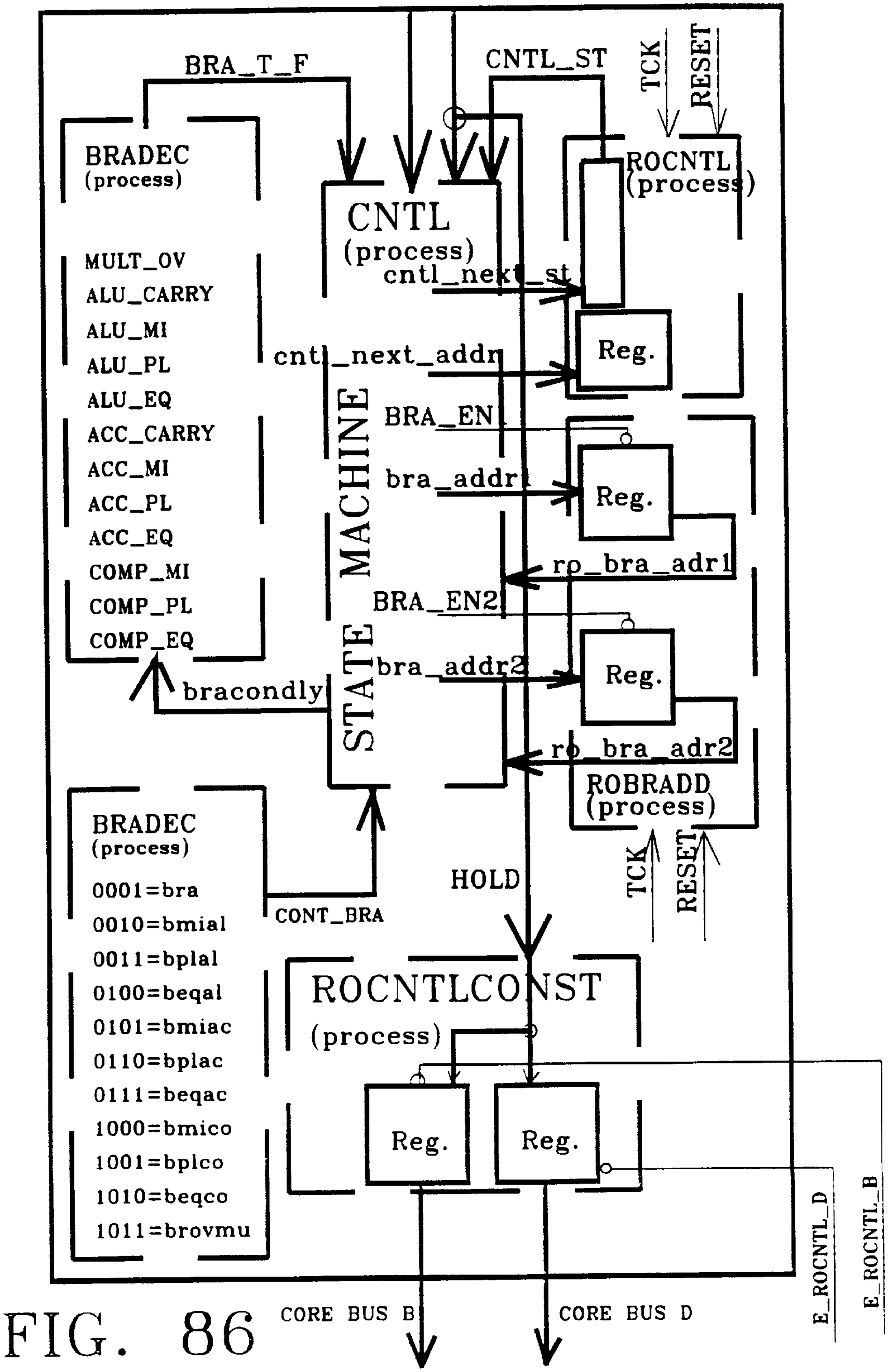

FIG. 86. Processor controller unit.

Figure 87:
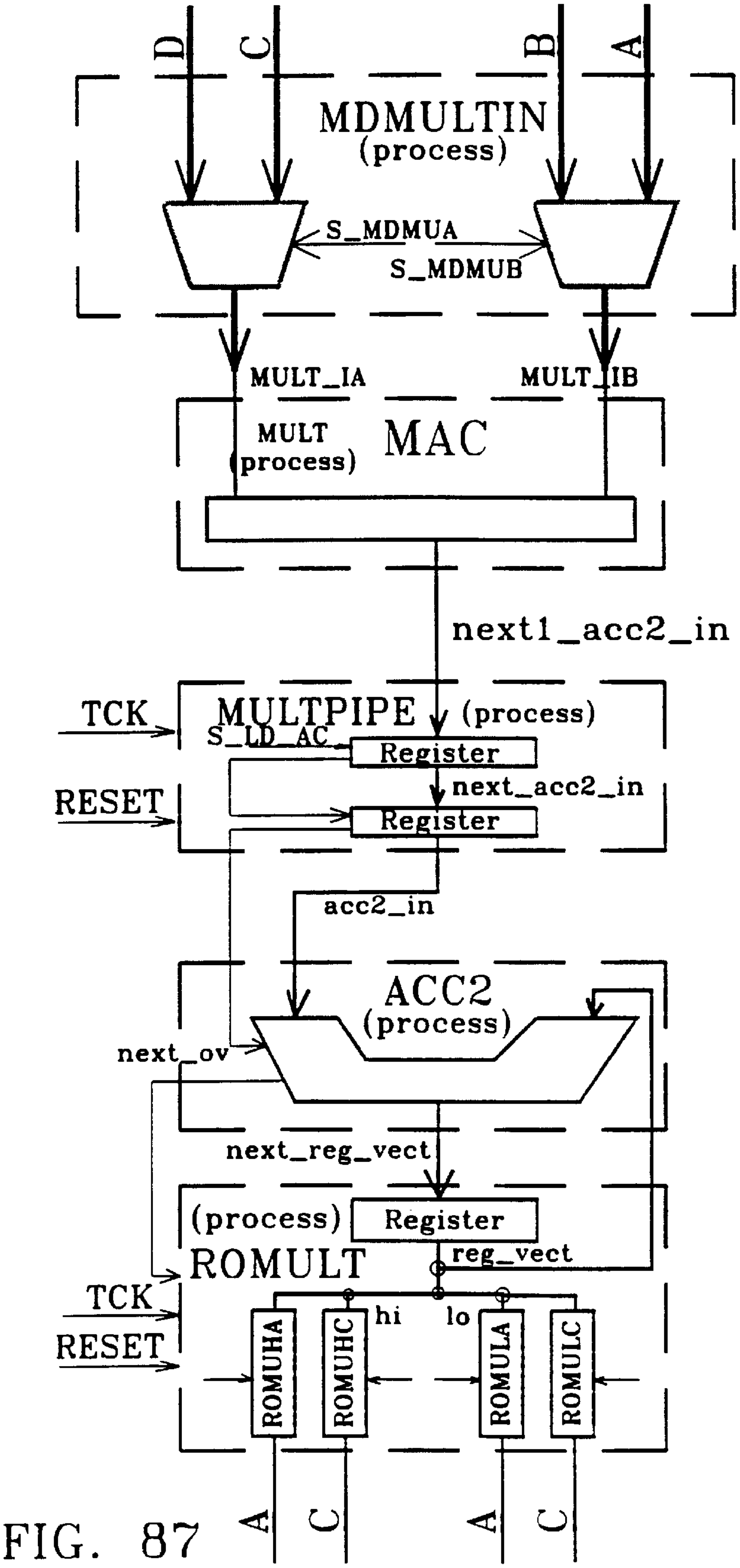

FIG. 87. Processor multiplier unit.

Figure 88:
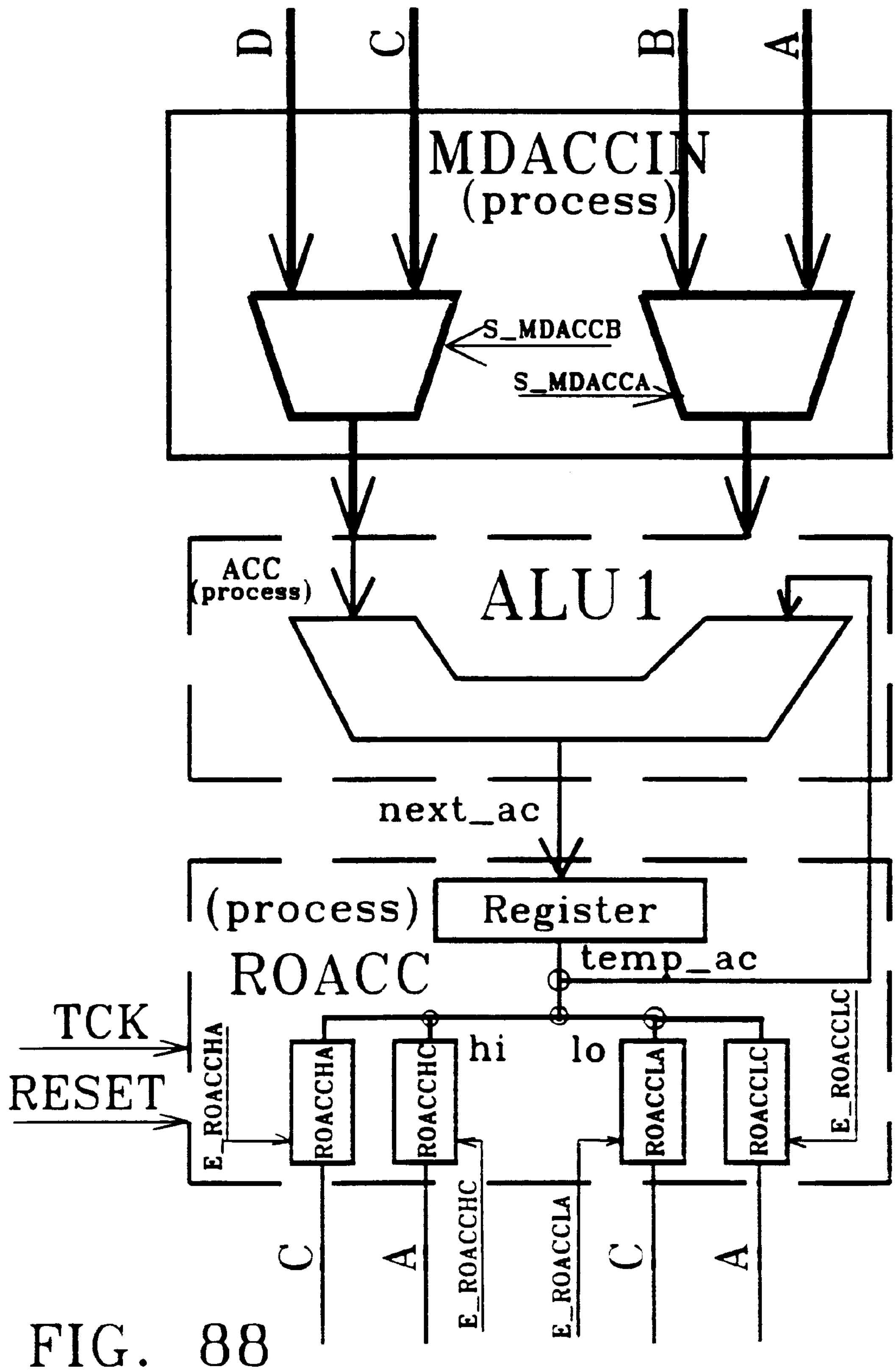

FIG. 88. Processor ALUs.

Figure 89:
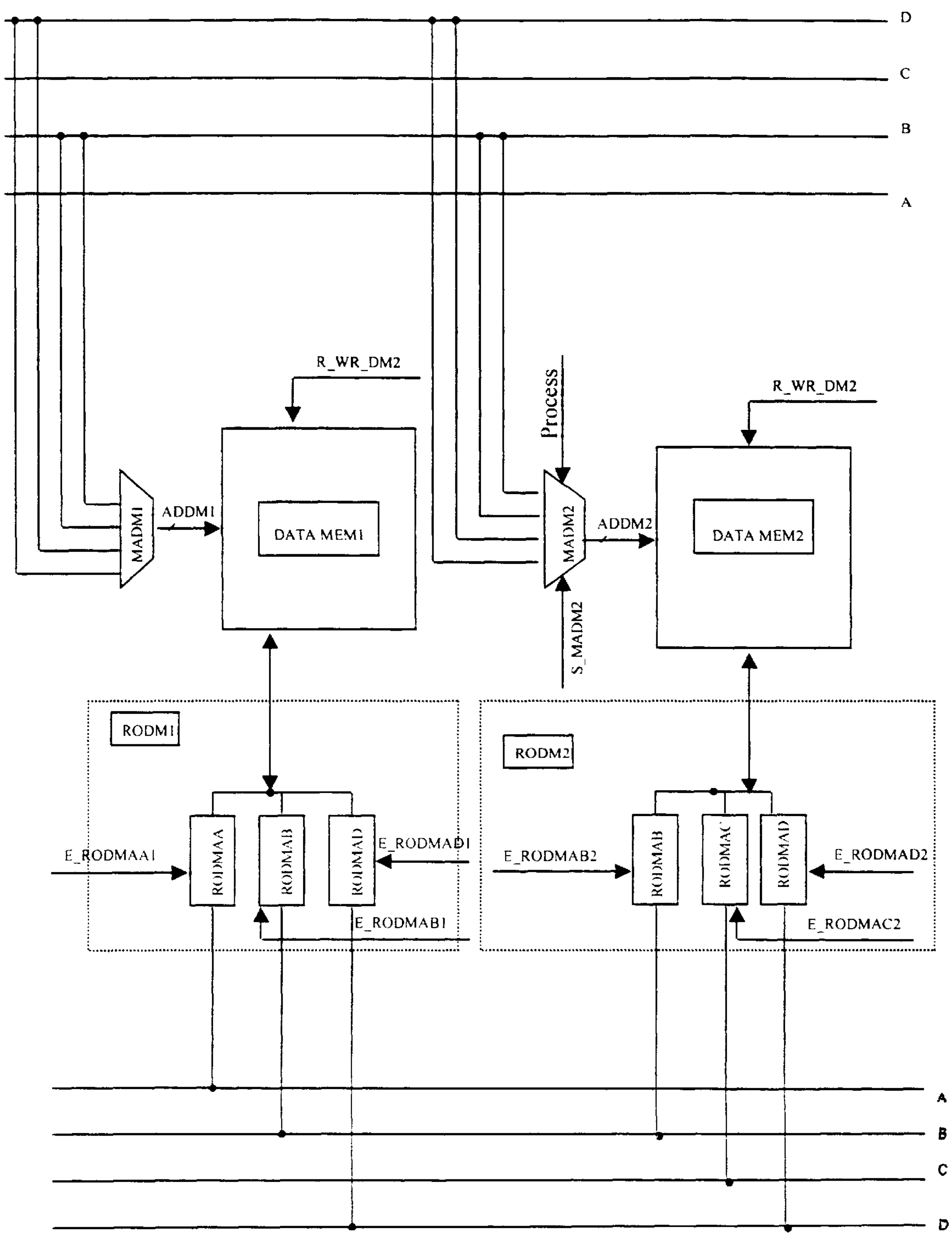

FIG. 89. Processor Data memory 1 and Data memory 2 interface to the core buses A, B, C, and D.

Figure 90:
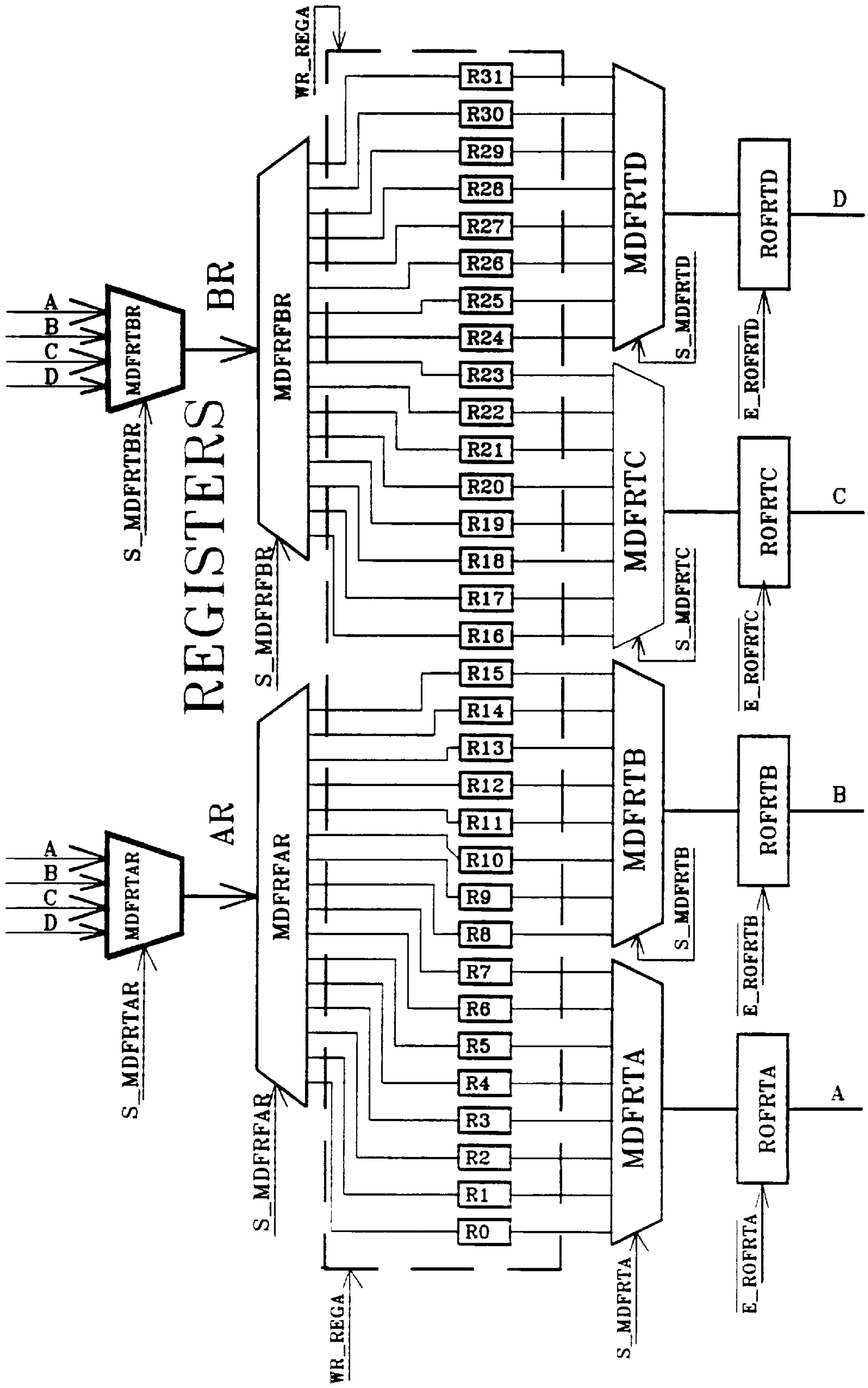

FIG. 90. Processor register file.

Figure 91:
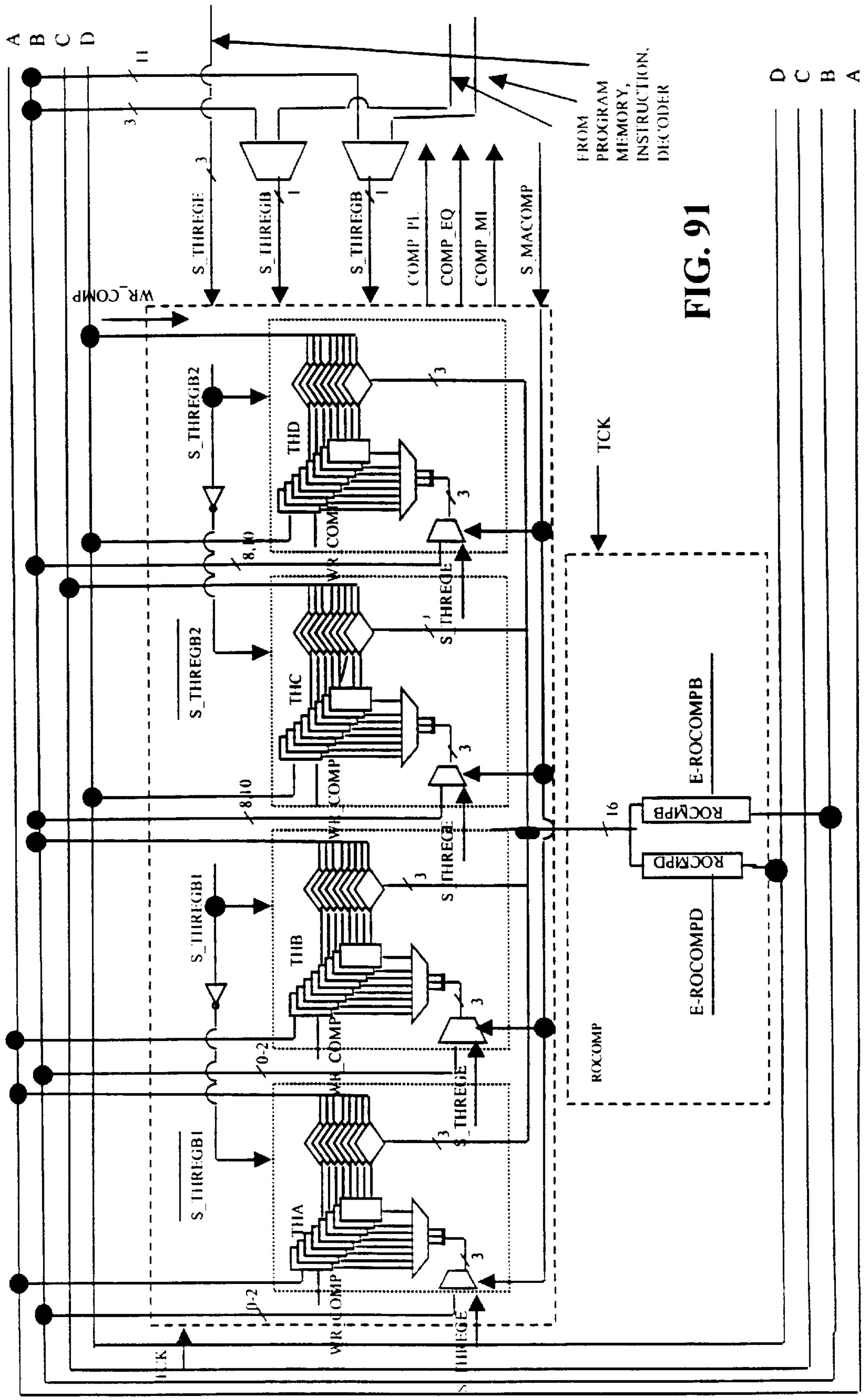

FIG. 91. Processor comparator unit.

FIG. 92. Coupling of Ring Buses A, B, and C to the input port and output port circuit.

5. DETAILED DESCRIPTION OF THE INVENTION

5.1 The 3D-Flow system

The 3D-Flow parallel-processing system is a new concept in processor architecture, system architecture, and assembly architecture. Compared to the electronics used in present systems, this approach reduces the cost and complexity of the hardware and allows easy assembly, disassembly, incremental upgrading, and maintenance of different interconnection topologies.

The 3D-Flow parallel-processing system benefits are:

fast real-time industrial applications, real-time medical imaging where monitoring of functional, biological and metabolic processes is required high energy physics (HEP) by allowing: (1) common, less costly hardware to be used in different experiments, (2) new uses of existing installations, (3) tuning of the trigger based on the first analyzed data, and (4) selection of desired events directly from raw data.

Because of advances in technology, the world of signal processing has been migrating from analog to digital methods, yielding improvements in programmability, stability, and uniformity, and raising the possibility of exploiting certain functions not possible in analog, such as adaptive filters used in the spread-spectrum techniques at the base of tomorrow's secure digital mobile communication systems.

A priori one would surmise that the useful high energy physics DAQ problem cited herein could not be solved by digital means since 25 ns is about the time taken to carry out two instructions in today's leading workstations. These difficulties, known for many years, have stimulated extensive research and experimentation in parallel processing.

There are even parallel processors available commercially, although programming them is much more difficult than programming a conventional sequential processor, and the success of a given programming effort is often strongly dependent on the parallel architecture employed. In fact the original advice to choose first the algorithm (or class of algorithms) before fixing the architecture is still the basis of today's most successful parallel solutions.

The goal of this parallel-processing architecture is to acquire multiple data in parallel (up to 80 million frames per second) and to process the data at high speed, accomplishing digital filtering on the input data, pattern recognition, data moving, and data formatting. The system is suitable for "particle identification" applications in HEP (calorimeter data filtering, processing and data reduction, track finding and rejection), pattern recognition in radar systems, biological molecular studies, graphics processing, and other uses. The main features of the system are its programmability, scaleability, high-speed communication, and low cost. The compactness of the 3D-Flow parallel-processing system in concert with the processor architecture allows processor interconnections to be mapped into the geometry of sensors (detectors in HEP) without large interconnection signal delay, enabling real-time pattern recognition.

5.1.1 Architecture of the 3D-Flow processor

The 3D-Flow processor is a programmable, data stream pipelined device that allows fast data movements in six directions with digital signal-processing capability. Its cell architecture is shown in FIG. 2, the input/output in FIG. 3.

The 3D-Flow operates on a data-driven principle. Program execution is controlled by the presence of the data at five ports (North, East, West, South, and Top) according to the instructions being executed. A clock synchronizes the operation of the cells. With the same hardware one can build low-cost, programmable Level-1 triggers for a small and low-event-rate calorimeter, or high-performance, programmable Level-1 triggers for a large calorimeter capable of sustaining up to one event per clock.

At each input port of the 3D-Flow processor there is a FIFO that de-randomizes the data from the calorimeter to the processor array. North, East, West, and South ports are 16-bit parallel bi-directional on separate lines for input and output, while the top port is 16-bit parallel input only, and the Bottom port is 16-bit parallel output only. North, East, West, and South ports are used to exchange data between adjacent processors belonging to the same 3D-Flow array (stage) while top and bottom ports are used to route input data and output results between stages under program control. Each 3D-Flow cell consists of a Multiply Accumulate unit (MAC); arithmetic logic units (ALUs); comparator units; encoder units; a register file; an interface to the Universal Asynchronous Receiver and Transmitter (UART), used to preload programs and to debug and monitor during their execution; data memories to be used also as a look-up table to linearize the compressed signal, to remove pedestals, and to apply calibration constants; and a program storage surrounded by a system of three-ring buses. At each clock, a three-ring bus system allows input data from a maximum of two ports and output to a maximum of five ports. During the same cycle, results from the internal units (ALUs, etc.) may be sent through the internal ring bus to a maximum of five ports. Several 3D-Flow processing elements, shown in FIG. 3, can be assembled to build a parallel processing system, as shown in FIG. 4.

Based on efforts carried out at the SDC, GEM, D0, CDF, and CERN detectors, the Level-1 trigger should be simple and should reduce the event rate by a factor of $10^2$ or $10^3$ with simple logic (mainly discriminators). However, better efficiency in event rejection is desired. From a variety of experiments (SDC, GEM, CDF, D0, etc.) have demonstrated that by running different Monte Carlo simulations, generating plots by applying different thresholds, vetoing on the basis of hadronic energy content, checking for isolation, finding clusters, calculating cluster energy, counting particles, combining with muon and tracking information, etc., a substantial increase in efficiency is possible.

The flexibility of having a programmable Level-1 trigger offers the advantage of allowing one to experiment with different algorithms in the future that one may not even think of today. Such a trigger can also check the efficiency, in a real-time environment, of the different algorithms tested with Monte Carlo simulation. By allowing selection of the best algorithm at a later time, it saves cost in the development of many different large boards for different experiments through the alternative implementation of a single 12 cm×12 cm board for the core of the parallel-processing system. Only the interface boards may change to connect (input/output) signals from different experiments. Behavioral model in VHDL-compiled gate version of the 3D-Flow processor has been developed and timing performance has been checked at 40 MHz.

5.1.2 Architectural description of 3D-Flow system

The 3D-Flow architecture is suitable for several applications, and it can be upgraded with advancements in technology. As noted above, the main features of the system are its programmability, scaleability, high-speed communication, and low cost. The 3D-Flow architecture makes possible the construction of a parallel-processing system with six-directional communication links between neighboring processors.

The overall assembly uses standard, commercially available components (except for the 3D-Flow chip), thus minimizing cost. It is suitable for the mapping of detector elements to processing elements, a solution that guarantees fast timing. Different detector element interconnection schemes can be efficiently implemented with the 3D-Flow parallel-processing system in one-dimensional, two-dimensional, and three-dimensional interconnection topologies by arranging the system in a planar, cylindrical, or spherical assembly, respectively. The interconnection length is kept to a minimum, and the interconnection topology ensures short cable length and, therefore, fast data movement (from 1 to 2.5 ns using BiCMOS drivers), compared to the greater delay variations that can exist in conventional systems. High speed and low power consumption are, therefore, achieved.

One of the most challenging problems that the high energy physics community has proposed for itself and its outside-technology supporters is that of useful data acquisition (DAQ) from beams crossing every 25 ns, as foreseen in the Large Hadron Collider.

The goal is to implement a new, programmable Level-1 trigger by using a "3D-Flow" processor system. This will simplify the hardware and reduce the cost of Level-1 trigger systems. It can be used in current experiments and is intended to open doors to new ways of doing triggering in experimental high energy physics. This new, more powerful tool will allow implementation of different first-level trigger algorithms, enabling researchers to find interesting events with much greater flexibility than existing approaches offer.

The concept is rather simple. The user translates any digital filter and/or pattern recognition, and/or data moving algorithm (from Monte Carlo simulation) into a real-time program of the type described in Table 2 of Report SSCL-607. The user's effort is minimal and typically requires writing only a few pages of code.

Currently, different experiments use different electronics hardware that is not applicable to other experiments. The 3D-Flow architecture is very flexible and uses only one small electronic board (12 cm×12 cm) that includes four 3D-Flow processor chips.

The way in which the 3D-Flow parallel-processing system maps the processing elements to the detector elements guarantees fast timing. An important parameter in the performance of a Level-1 trigger system is not only the processing capability, but also fast data communication between elements. The 3D-Flow system allows arrangement of processing elements in the same relative positions as the detector elements, allowing implementation of different topologies. In a parallel-processing system, where results of a calculation of pattern recognition may be dependent on the data coming from the neighboring elements, the overall communication speed will obviously be determined by the longest cable. Thus it is important to keep cables short and approximately the same length. Input FIFOs to the processor compensate for the small differences in cable length. The 3D configuration permits this.

5.1.3 Introducing the third dimension in the system

In applications where the processor algorithm execution time is greater than the time interval between two consecutive data inputs, one stage (or layer) of 3D-Flow processor is not sufficient. The problem can be solved by introducing the third dimension in the 3D-Flow parallel-processing system, as shown in FIG. 5.

In the pipelined 3D-Flow parallel-processing architecture, each processor executes an algorithm on a set of data from beginning to end (e.g., the event in HEP experiments, or the picture in graphic applications). Data distribution of the information sent by the calorimeter as well as the flow of results to the output are controlled by a sequence of instructions residing in the program memory of each processor.

Each 3D-Flow processor in the parallel-processing system can analyze its own set of data (a portion of an event or a portion of a picture), or it can forward its input to the next layer of processors without disturbing the internal execution of the algorithm on its set of data (and on its neighboring data set at North, East, West, and South that belongs to the same event or picture).

The programming of each 3D-Flow processor determines how processor resources (data moving and computing) are divided between the two tasks or how they are executed concurrently.

A schematic view of the system is presented in FIG. 5, where the input data from the external sensing device are connected to the first stage of the 3D-Flow processor array. The program execution at stage 1 must not only route the new incoming data from the sensor to the next stage in the pipeline (stage 2), but must also execute its own algorithm. It then sends its results to the stage 2 processor array, which passes them on to the processor of the next layer. At this point the stage 1 processor begins to re-execute its algorithm, receiving the new data from the sensor device and processing those values. The output results from all processors flow (like the input data) through the different processor stages. The last processor outputs the results from all processor layers. Several operations can be executed in one 3D-Flow instruction cycle.

The main functions that can be accomplished by the 3D-Flow parallel-processing system are:

- Operation of digital filtering on the incoming data related to a single channel;
- Operation of pattern recognition to identify particles; and
- Operations of data tagging, counting, adding, and moving data between processor cells to gather information from an area of processors into a single cell, thereby reducing the number of output lines to the next electronic stage.

In calorimeter trigger applications, the 3D-Flow parallel-processing system can identify particles on the basis of a more or less complex pattern recognition algorithm and can reduce the input data rate and the number of input data channels.

In real-time tracking applications, the system calculates tracks slopes, momentum, $P_t$, and the extrapolated coordinate of a hit in the next plane.

FIG. 6 shows the timing (at the bunch crossing rate) of the input data to each stage (or layer) and the algorithm execution time (latency) in the 3D-Flow pipelined architecture.

FIG. 7 shows the timed processing and bypass functions of a three-layered array of processors. The figure illustrates the programmed nature and timing of the, four counters that are preprogrammed by a host system through RS232 during the initialization phase to achieve a coordinated processing and bypass of data. Thus, a 24 clock cycle algorithm (or fewer clocks) for example can be carried out on each incoming data word, and where the data rate is eight clock cycles. Corresponding to the description of FIG. 7, the data transferred and either processed or bypassed by each processor 10 includes two 16-bit words.

In this example, the input data rate is ⅛ the processor clock frequency, and the processed data result or bypassed data also includes two 16-bit words. The first input pair of data words is identified as I1, I1, the second pair of input data words is I2,I2, and so on. When a pair of data words is input and processed according to the 24-clock cycle algorithm (or less), a pair of 16-bit results is produced, identified as r1,r1. The second data word (I2,I2) process results in a corresponding result data word, r2,r2. With specific reference to FIG. 7, it is noted that during the first two clock cycles, the first data word (I1,I1) is input into the processor of layer 1 and transferred by way of the FIFO buffers to the ring buses and core buses to be processed by the various internal units of the processor. Layer 1 is busy processing input 1 until time 25. Layer 1 cannot take any more inputs until that time. The next two data words received during the 9th and 10th processor cycles and 17th and 18th processor cycles are not input for processing by the processors in the first layer but rather are bypassed via a Bottom port to the Top port of a processor in the subsequent layer, layer 2. The layer 2 processor receives the bypassed data word I2,I2 and inputs it for processing. However, the third data word (I3,I3) bypassed through the processor in layer 1 is also bypassed in the processor of layer 2 to a subsequent processor in layer 3, where such data word is input and processed.

With reference to the processor in layer 1, at the end of 24 clock cycles, the initial data words input (I1,I1) have completed processing and are provided as output results (r1,r1).

The results r1,r1 are transferred via the Bottom port of the processor of layer I to the Top port of the processor in layer 2. However, since the processor in layer 2 is busy processing the second data word (I2,I2), the processor in layer 2 bypasses the result (r1,r1) through to the Bottom port and to the Top port of the processor in layer 3. Again, the processor in layer 3 is busy processing the third data word (I3,I3) and thus also bypasses the result data word (r1,r1) through.

It is noted that result words are not processed again even if the processor receiving the result words is not busy.

It can be seen that although the initial processing of the first input data word (r1,r1) takes only 24 clock cycles, two additional clock cycles are required to bypass the results through layer 2 and two additional clocks are required on layer 3 of the processor stack.

Note that the two clock cycles used to send out the results from layer 1 are also used to input the new data for calculation on layer 1.

Eight clock cycles after the initial data results (r1,r1) are available at the Bottom port of the processor of layer 3, the second data results (r2,r2) are also available.

Thereafter, data results become available every eight clock cycles in correspondence with the eight clock cycle data rate of words input to layer 1 of the processor stack.

The latency time between input of a data word to the stack and output of the data result from the stack of three layers is the algorithm execution time (24 cycles) plus the time to propagate the results through the processor layers, or 28 clock cycles. The propagation time for data transfer between layers is one clock cycle. An advantage of the 3D-Flow system is that bypassing of the raw data or data results requires zero processing time, and subsequently no decoded instructions or corresponding processor time is required to bypass data.

Stated another way, the data bypass function is transparent to the instruction sequencing of the processor; thus, bypassing of the data does not interfere with algorithm execution.

One clock cycle is required to bypass data from Top to Bottom ports, since in each clock cycle a new data is input from the Top port to the register while the previous data is taken from the register and sent to the Bottom port.

This type of passage of data through registers allows one to build a large number of stacks because the only criterion to satisfy is that the connector, cable and register delay should not exceed one clock cycle between two adjacent layers. The section on assembly gives a complete description of the packaging of processors on printed circuit boards housed together to form a stack of processor arrays. The processors are arranged together in an adjacent manner as the sensors in a detector are arranged.

This arrangement facilitates the processing of high speed data received as the result of particle collisions and the execution of pattern recognition on the data.

In the left column of the table in FIG. 7 is the preset count or modulus of each of the four bypass counters. Importantly, counters count the number of 16-bit words that appear at the Top input port and the Bottom output port thereof. Also, the counter settings for each of the processor layers are different, as noted in the table.

In all layers, the four counters are arranged to cause the bypass switches to be switched to route data into the processor for processing, or to route data directly to the Top port of the processor in the next layer of the array.

With regard to layer 1 of FIG. 7, the data in (IN) counter is programmed with a count of "2". The position of the switches is shown as either "i" for input/output or "b" for bypass, as noted in the second row of the figure, which illustrates the layer 2 processor timing.

The counter labeled "by-in" has a count of four, indicating the number of data words to be bypassed. The counter "by-r" indicates the number of data results to be bypassed in layer 1. Because layer 1 is the first layer in the stack, it does not receive any data results from preceding processors. Rather, the first layer of the processor stack receives only raw data from a sensoring device. Lastly, the counter "r" is programmed with the number 2, indicating that the switch at the Bottom port must be set so that the internal data units of the processor can transfer data results to the Bottom port for further transfer to a processor in layer 2.

In the example, two data words are input into the processor of layer 1 and two data results are produced and output. It can be noted that the number of data words input, processed, and bypassed will be a function of the specific application; thus, the counters can be programmed accordingly.

Indeed, certain applications may require that three data words be input, with only one data word resulting, or vice versa. Many other combinations of input, output and bypass will invariably exist, based on the particular situation.

In operation, after the first two 16-bit data words are input during clock cycles one and two, the bypass switches are switched to the bypass position (at clock cycle three) so that data can be passed directly from the Top input port to the Bottom output port. Thus, the four data words I2,I2 and I3,I3, received during the 9th and 10th clock cycles and the 17th and 18th clock cycles, respectively are transferred directly through the processor of layer 1 without being processed.

Since four 16-bit data words have been bypassed, the end of the count of the by-in counter causes the bypass switches to switch to the "i" position, so that the Top port thereafter transfers the succeeding two data words to the internal units of the processor, and the data results of the previous algorithm execution in layer 1 are transferred from the internal units of the processor to the Bottom port. Accordingly, during clock cycles 25 and 26, the input data words I4,I4 are input into the processor and the result words r1,r1 are output from the processor to the Bottom port. Starting at clock cycle 25, the four counters control the switches in a manner identical to that shown in clock cycles 1–24.

With regard to layer 2, the counters are each set to a count of two. This is because two data words bypassed to the input of layer two are input for processing, two data words are bypassed through the processor of layer 2 to layer 3, and lastly, two data words are input for processing at the same time as two result words are output for transfer to layer 3.

In layer 3 of the processor array shown in FIG. 7, the four counters have yet a different configuration. In layer 3, the counter by-in is set to zero, as no raw data are bypassed through the processor to a subsequent processor. Since only three processor layers are involved, any output from the third processor layer must necessarily be a result, meaning that it had previously been processed in one of the three processor layers. In layer 3, the third data word I3,I3 bypassed thereto is input for processing. The next two words input to the Top port of layer 3 during clock cycles 27 and 28 are result words that are bypassed through and appear as the first data result output of the three-layer stack. Next, during clock cycles 35 and 36, the third layer processor bypasses the second data result r2,r2 processed by layer 2.

During clock cycles 43 and 44, the sixth data word I6,I6 bypassed to layer 3 is input for processing, and the third result word r3,r3 processed by the layer 3 processor is output. Accordingly, a new data word is input to the processor array of FIG. 7 every eight clock cycles and a data result is output every eight clock cycles with a latency time between input and output of 28 clock cycles.

It can be appreciated that no input data is lost, and the system can be designed to accommodate different input data rate and algorithm execution time just by adding or subtracting stages. In the example, since the processing algorithm of each processor of each layer requires 24 clock cycles, and data are input every eight clock cycles, a minimum of three processor layers is required.

5.2 The 3D-Flow ASIC

The 3D-Flow Processor is a special-purpose, digital signal-processing ASIC designed to be a part of a massively parallel processing system. An entire system is composed of some multiple of four to many processing elements connected together in a 3D matrix. Each element processes the data that has been passed to it, then sends it to the next processing element. Each element is connected to six other elements, called North, South, East, West, Top, and Bottom. Each processor can input from or output to each of the North, South, East, and West ports. The Top port is input only, the Bottom port is output only. A processor's North port is connected to the adjacent processor's South port, the East port is connected to an adjacent West port, North to South, South to North, Top to Bottom, and Bottom to Top.

The 3D-Flow ASIC consists (see FIG. 53) of four identical processing elements arranged in a plane and connected together internally within the ASIC, with the unconnected ports being the I/O of the ASIC. In addition, the 3D-Flow ASIC has a single RS232C interface for program downloading and diagnostics.

While it is preferable to develop the ASIC with four interconnected 3D-Flow processors, based primarily on economics and simplicity of use in many applications, those skilled in the art may prefer to employ a single 3D-Flow processor alone in an integrated circuit, or with other support circuits.

5.3 The 3D-Flow processor Internal Architecture

The following paragraphs describe the circuits of the individual processors or processing elements (PE) in the ASIC. There are four processing elements per ASIC as shown in FIG. 53.

Each PE is a processor capable of running a program stored in its internal program memory and performing operations on data in any of its internal units. Each of the units can perform operations in parallel. Data is transferred between processing elements on a number of internal buses.

Each 3D-Flow PE consists of a Multiply Accumulate unit (MAC); arithmetic logic units (ALUs); comparator units; encoder units; a register file; an interface to the Universal Asynchronous Receiver and Transmitter (UART) used to preload programs and to debug and monitor during their execution; data memories to be used also as a look-up table on the input data; and a program storage surrounded by a system of three-ring buses. At each clock, a three-ring bus system allows input data from a maximum of two ports and output to a maximum of five ports. During the same cycle, results from the internal units (MAC, ALUs, etc.) may be sent through the internal ring bus to a maximum of five output ports.

FIG. 55 and FIG. 56 show detailed internal architecture of the 3D-Flow processor with all the internal units and how they are interconnected.

By viewing FIG. 55, and FIG. 56, it is noted that the comparator and encoder are not normally found in commercial microprocessors[30, 31, 32, 33, 34, 35]. The reason for having implemented these two additional units is because in the type of calculation required to accelerate a pattern recognition algorithm, the comparator unit as described in the following sections, saves considerable steps in the typical algorithm execution and to the encoder unit which encodes the zero to one transitions in an input word or in a sequence of input words, also turned out to save considerable steps of the algorithm execution.

The processor executes at each step or clock cycle a 96-bit instruction word. The long instruction word is subdivided in fields of which the detailed meaning is described in Appendix A.

In this Section the summary of the microcode is set forth for quick reference in programming. Since typically the effort for a new application is to compose a few lines of 96-bit code (all algorithms of the presented applications have been programmed with 20 to 34 lines of code), it is feasible to write those lines of code manually. Compared to the time it would take in developing a new ASIC as is currently done by different applications, the time required to write a few lines of 96-bit microcode is advantageous and introduces flexibility. However, to facilitate the task of the programmer, an assembler interpreting the mnemonic as listed in Section 5.4.

The fourth row of the summary table indicates which bits of the 96-bit instruction word belong to a specific field.

The typical operation of a programmer is that of choosing the paths of input data and output results by selecting the field of Register File, and/or Data Memory, and/or Core Bus Control, and/or Ring Bus Control, and/or output bus control. The selection of an operation for an unit (e.g. ALU1) indicates which type of operands are allowed for that particular operation (e.g. SUBC_A2_y indicates that only operands the letter "y" in the instruction word field bits 15-0 shown in Table 5-4 are allowed). From the Table 5-4, the user can select which core_bus and which bits (high_byte, low_byte, or 16-bit word) are desired as an input operand.

5.3.1 Processor Characteristics (Summary)

1. Registers seen by the user
   - 32×16-bit general registers (Rx)
   - 2 memory address registers (MARx) (8-bit)
   - 3 arithmetic result registers (ACC1, ACC2, MACC) (32-bit)
   - 32×16-bit threshold registers (TRx)
   - 1 condition code status register "ccsts" (16-bit)
   - 1 input/output status register "iosts" (16-bit)
2. Buses
   - 4 internal buses (A, B, C, and D)
   - 3 ring buses (Ring A, Ring B, and Ring C)
   - 2 register file buses (AR and BR)
3. Communication links buffered with input FIFOs
   - one input link (top)
   - one output link (Bottom)
   - 4 bi-directional links (North, East, West, and South)
4. Functional units (operating in parallel)
   - one multiplier-accumulator (MAC)
   - two ALUs (ALU1 and ALU2)
   - one multi-hit encoder
   - one parallel comparator
   - two data memory spaces
   - one Timer (16-bit)
5. Instruction format (very long word)
   - operations of calculation and data movement
   - immediate fields can contain Constants, Branch Addresses, or Memory Addresses, operand field, position to shift, bits to test.

Referring now to FIG. 55, and FIG. 56, there is illustrated a detailed schematic block diagram of a high speed processor 10 utilized in accordance with the present invention.

As noted above, the processor 10 includes an RS232 interface 12 for loading into a program memory 14 the algorithm to be executed by processor 10 and otherwise initializing the various counters and registers of the processor. Program address information is loaded in the program memory 14 either by the RS232 interface 12 via buffer UB and core bus B, or from an algorithm instruction word via the MAPMCTL (Multiplexer Address Program Memory Control) signal that controls the multiplexer 16. Program data information from the host computer is supplied to the memory 14 by the RS232 interface 12 via buffer UD and core bus D. In the preferred embodiment, the program memory 14 stores data processing algorithms up to 128 instructions of 96 bits each.

One set of internal buses of the processor 10, termed "core buses", includes core bus A, B, C and D. The core buses are each 16-bits and function to provide data flow between the various logic units, arithmetic units and other circuits shown in FIG. 56. Further, the logic and arithmetic units and other circuits have outputs also connected to one or more of the core buses A-D. A multiplier-accumulator/divider 18 can process and store two 16-bit data words, and provide an output 16-bit word separately switched to the A or C core bus. The switched connections shown by reference character 19 comprise logic circuits for coupling the 16-bit output data words to either the core bus A or core bus C. Moreover, the multiplier/divider 18 has a pair of multiplexed inputs, one input associated with the A or B core bus and the other associated with the C or D core bus.

The processor 10 is also provided with a first 16-bit accumulator (A1) 20 and a second 16-bit accumulator 22, each having similar input and output connections to the core buses as noted above in connection with the multiplier/divider 18. However, the accumulator 22 provides output switched connections to the core buses B and D, rather than A and C. A register circuit 24 includes thirty-two 16-bit programmable registers with four outputs, each connected to one of the four core buses. The register circuit 24 has two multiplexed input register file buses (AR, BR), each connected via a respective 4-input multiplexer to the four core buses A–D.

A 16-bit comparator 26 is connected for providing multiplexed core bus A–D connections to the input of the comparator, and a switched output to either core bus B or D. A multi-bit encoder 28 can receive 16-bit data words from either core bus A and C, and provide a switched output to either core bus B or D. A pair of 256 word (16-bit) data memories 30 and 32 provide temporary storage of data. Data memory 30 can receive data words from either core bus C or D and provide a switched output to either core bus A or B. On the other hand, data memory 32 can receive data words from either core bus A or B and provide a switched output to either core bus C or D.

Program execution of the processor 10 is controlled by a program counter 36 of FIG. 55 which stores the address of the current instruction executed from the program memory 14. The current instruction is fetched from memory 14 and sent to an instruction decoder 38 which initiates various processor operations based upon the instruction word bit pattern, as is well known in the art. The 96-bit parallel output of the instruction decoder 38 can simultaneously control many of the logic and arithmetic units of the processor 10 to provide high speed processing of data in a single clock cycle. An important feature of the processor 10 is the decoded branch control portion 40 of the instruction decoder output. Normally, the next instruction of an algorithm is fetched from memory 14 by incrementing the program counter 36 with a unity incrementer 42 and sending the resulting new address to a controller 44. The controller is shown in block diagram form in FIG. 86. The controller 44 then sends the new address to the new program counter 46 via the MAPMCTL control line. However, when a branch instruction is executed, the algorithm does not continue at the next sequential program memory location, whereby the controller 44 ignores the incremented program address from incrementer 42. If the instruction being executed is an unconditional branch to another memory address, that next address will be found at the branch address portion 50 of the decoded instruction word and transmitted to the controller 44 via branch address line 52. This then constitutes the new address that is coupled to the program counter 36 over the MAPMCTL control line 48.

If branch control portion 40 of the decoded instruction requires a conditional branch, this situation is indicated on the branch condition line 54 of the output of the instruction decoder 38. Branch control portion 40 indicates what condition code register will be examined to determine if a branch is executed. A condition code register CC1 is constructed as part of the multiplier/divider 18. There is also a code condition register CC2 in the first accumulator 20, a code condition register CC3 in the second accumulator 22, a code condition register CC4 in the comparator 26, and a code condition register CC5 in the multi-bit encoder 28. The bits of each of the code condition registers 41 are shown in FIG. 55 the block "CCSTS." Each code produced by the internal units signals the controller 44 to deviate or branch from the normal instruction execution. The contents of the selected condition code registers are transmitted to the controller 44 via condition code result bus 56. The branch control portion 40 of the decoded instruction indicates what value must be contained in the selected condition code register in order for the program branch to be executed. Otherwise, the next sequential program address is provided by the program counter incrementer 42.

The three ring buses of FIG. 55, designated Ring A, Ring B and Ring C provide data interconnections to the four core buses A–D via input buffer registers 60 and output multiplexer 62. FIG. 2 more clearly depicts the architecture of the ring buses for providing bus interconnections between the five I/O ports of the processor 10. The input ports are identified as the top (T), north (N), east (E), south (S) and west (W). The output ports are identified as bottom (B), north (N), east (E), south (S) and west (W). As noted above, the top port is only an input port, the bottom port is only an output port, while the north, east, south and west ports are duplicated as input ports and output ports. In the preferred embodiment, the top input port can be switched to pass data directly to the bottom output port via logic indicated by switches 64 and 66. Each of the five input ports can be switched to transfer data directly to a respective multiplexer 68 and register 70 associated with a respective output port. Each input and output data port of the preferred embodiment of the processor 10 is 16 bits wide.

Each input port that provides input data functions has an eight word (16-bit) FIFO buffer 72 to temporarily store data in the event that data is then available and the internal bus structure of the processor 10 is busy.

As to the three ring buses, e.g., A, B and C, Ring bus A and Ring bus B provide transferal of data from the respective input port FIFO buffers 72 to the four internal core buses A, B, C and D, via buffers BD, AC, BB and AA designated generally by 60. The Ring C bus functions to couple data from any one of the four internal core buses A, B, C or D via multiplexer 62 to the output ports N, E, S, W and B. If the output port of the processor is not connected to the top port of the next processor due to the possible connection of the top and bottom port in the bypass mode, the partial results may be saved temporarily (if bit 16 of the word in the program memory is set) in the output FIFO and sent at a later time.

Bits 30–39 of the decoded instruction word select the path of the data from the input ports. When an instruction is decoded that requires input data, one or more bits 30–39 are active and are applied to the comparator 78. When the bit associated, for example, with the North port is decoded, and when data has been loaded into the North input port, then the comparator 78 signals to controller 44 to proceed and process the data.

The other input of data ready comparators 78 (a set of five comparators, each one connected to the data ready status line of the input FIFO) is a 5-bit line comprising the data ready status lines 82 from the five input port FIFO buffers 72 which indicate whether data has been received by the associated input data port. The comparators are shown in more detail in FIG. 54. Data ready comparators 78 will activate the hold program execution line 84 until data has been received. This function is important when the processor is operated in a data-driven mode. Once the hold program execution line 84 is deactivated, the program counter 36 can fetch the next instruction, otherwise the processor remains idle. The two comparator circuits of FIG. 54 produce the Hold Program Execution signal to control execution of various instructions. For example, when the processor 10 is operating in a data driven mode, the processor carries out program instructions based on the input of data to the input ports. The data input to the input ports is stored in the input FIFOs 72. When any input FIFO is loaded with data by a neighbor or top processor, the data ready signal from the FIFO is applied to the comparator 78, together with decoded signals from the instruction decoder 38. When the decoded signal is present at the comparator 78, the processor will not continue execution until there is data loaded in the input FIFO 72. After the data is loaded at one or more input ports, the processor continues execution of the stored program.

The FIFO-FULL signals applied to the comparator 79 also affects the sequencing of instructions. The FIFO-FULL signals are from the five input ports of a neighbor processor and signal the data transmitting processor as to the status of the input port buffers. If any input port buffer is full, then the corresponding signal to the comparator 79 prohibits the transmitting processor from attempting to transmit a data word to the full input port FIFO.

Each comparator bank of the unit 26 contains eight individual comparators. A bank of eight threshold registers supplies one of the inputs to each of the eight comparators in each comparator bank. For example, eight threshold registers supply one input to each respective comparator in comparator bank, and so on. Individual threshold registers in the banks are selected for loading by a 3-bit register enable signal on bus B through respective multiplexers upon application of proper multiplexer select signal. The 3-bit enable signal from bus B selects which of the eight threshold registers in each threshold register bank will be loaded with data appearing on bus A. The second input to the comparators is provided by buses A–D, respectively. Each comparator in a comparator bank receives the same second input from the same bus A–D as every other comparator in the same comparator bank. The output of each of the comparators is a 4-bit number that indicates the encoded value (4 bits) of the highest of the eight threshold registers in the associated threshold register bank that was surpassed in value by the input from the data bus. These 4-bit signals from each of the comparators are combined into a 16-bit output signal. During program execution, individual comparisons can be made by selecting a single threshold register out of the 32 available. The selected comparator will effect the condition code available to the next program instruction. This is accomplished by selecting one set of the eight comparators by an appropriate value on a line, and then selecting an individual threshold register by means of a 3-bit signal on a line which is applied to the threshold register bank through multiplexers under the control of the signal select multiplexer address comparator on a line. The result of the comparison with the selected threshold register is indicated on three output lines which indicate, respectively, whether the comparison resulted is a plus, equal or minus condition. These outputs coupled via the condition code result lines are used as inputs to the controllers 44.

Comparator 26 can be used by the processor 10 to perform a one-cycle comparison in which four numbers can each be compared with eight numbers, two numbers can each be compared with sixteen numbers, or a single number can be compared with thirty-two numbers. To compare four different numbers, such numbers are loaded onto data core buses A–D. Threshold values are then loaded into each of the eight registers in each of the threshold register banks. The 16-bit comparison result will indicate the results of each of the four comparisons.

If the same number is loaded onto all data buses A–D, the comparator 26 can be used to perform a coarse division operation. Such a division is very useful in many applications where the exact result of the division operation is not needed, but only the approximate magnitude. For example, if it is desired to calculate (a=c/d), and it is expected that (c/d) will have the ratio of (10/a), then cross multiplication gives (c=D * 10). A comparison of (c) with (d * 10) will indicate if (c–(d * 10)) is plus, minus or equal. Therefore by loading the value of (c) onto each of the data buses A–D, and then loading each of the threshold registers with values such as (D * 8.4), (D * 8.5), . . . (D * 11.6), examination of the 16-bit output will indicate which of the threshold registers was closest to (c) without being greater than (c), therefore indicating the approximate ratio of (c/d).

Another important feature of the processor 10 of the present invention is the capability of not only processing data received from one or more input ports, but also of passing data directly between the top input port and the bottom output port. Because the processor 10 can be easily configured in an array of processors for pipelined processing, it is important that each processor 10 be able to pass data down the pipeline from its top input port (T) to its bottom output (B) port without requiring a substantial number of clock cycles of the processor 10. For instance, the algorithm being executed by the processor 10 may only need to receive and process every sixteenth input data word, and pass the next fifteen input data words directly from the top input port to the bottom output port. In practice, the data is buffered in the output register 92 before being clocked to the neighbor processor. At each processor clock when new data is present, it is stored in the output register q2 and previous data is transmitted from the register to the destination port. A novel feature of the present invention allows this to occur automatically without reducing the computational speed of the processor 10.

For example, consider that input data is received at the top input port. If the processor 10 only processes every sixteenth input word, the switch 64 would be closed (as shown) and the switch 66 would also be closed (as shown) in order to receive and store the first data word into the top port input FIFO buffer 72. Then, switches 64 and 66 would be switched in order to bypass the next fifteen data words directly from the top input port to the bottom output port. The bypass switches 64 and 66 are shown diagrammatically in FIG. 7 where the bypass function is more thoroughly described. It should be noted that the bypass switches 64 and 66 are controlled by four counters, all collectively shown as reference character 86. When switch 64 is closed, the first input data word is routed to top port buffer FIFO 72 from where it may be loaded onto either ring bus A or B or to the bottom port multiplexer 68 and register 70. When switches 64 and 66 are opened, the input data word appearing at top input port bypasses the internal processor units completely (without interferring with CPU internal execution) and it is stored into internal register 92. During next clock cycle, this information is sent out and the new incoming information is stored into register 92. In order to accomplish this switching without using any processing time, counters 86 are programmable to count the number of data words to be input into the processor or bypassed therethrough. As will be described below, the four counters 86 are each programmed with a different count modulus, depending on whether the processor 10 is in the first, second, etc., processor layer. It should be noted that the input data words applied to the top input port can be raw input data or data results that has already been processed by processors in previous layers of the hierarchy. Data that has undergone processing according to an algorithm is sometimes referred herein as "result" data words. The programmable counters 86 are loaded by a host computer (not shown) via the RS232 interface 12 at the beginning of the algorithm being executed by processor 10 with the number of data words to be received at the top port FIFO 72 or bypassed in a cycle of the algorithm. The data-in counter is decremented upon receipt of each data word switched to the top input port (both input data and output results produced from processors in the array located above the present processor 10 flow from the top to the bottom of the stack or pyramid). As long as the data-in counter and the data-result counter are non-zero, the control line 88 keeps switches 64 and 66 open, causing the top input port data words to be loaded in the top port FIFO 72, and the output bottom port result words being output to the next processor, or sent to the exit if the processor was in the last layer. Additionally, a data bypass counter for bypass input data and a bypass counter for results, are loaded by the RS232 interface 12 at the beginning of the algorithm being executed by processor 10 with the number of data words to be bypassed from the top input port to the bottom output port after the processor 10 has received a predefined number of data words via the top input port. When the data-in counter and data-result counter reaches zero, the two switches are commuted, the bypass counter is activated and decremented upon receipt of each data word at top input port. When both bypass counters reaches zero, the control line 88 keeps switches 66 and 68 closed. When the bypass counters reaches zero, all counters are reset to their initial values and the process repeats. In this manner, the desired data word is received and internally processed by the processor 10, while the unprocessed data word(s) is bypassed, without incurring any processor 10 overhead with respect to the operation of the algorithm being carried out.

The internal core buses A–D also provide interconnections between the five input ports and a register file 24, two data memories 30 and 32, and the program memory 14. The details of the arithmetic logic units 20 and 22, multiplier/divider 18, and the memory structure are set forth in more detail below.

The distribution of the clock and trigger signals can be similar between the various processors of either a stack or a pyramid. Timing signals of a processor stack are disclosed in detail in the publication entitled Digital Programmable Level-1 Trigger with 3D-Flow Assembly, by D. Crosetto, page 30, dated August 1993 and published in the paper identified by SSCL-PP-445, the entire disclosure of which is incorporated herein by Digital Programmable Level-1 Trigger with 3D-Flow Assembly, by D. Crosetto, page 30, dated August 1993 Essentially, a master clock is generated and driven by multiple buffers and fanned out to multiple programmable delay lines to each processor in either a stack or layered architecture. Moreover, such clock and timing can be utilized in conjunction with the processor pyramid structure disclosed herein.

5.3.2 Microcode Summary

The following tables summarize the 96-bit instruction microcode subdivided in functional fields.

TABLE 5-1

Microcode Summary Table for bits 95-64

| | | | | Register File | | | |
|---|---|---|---|---|---|---|---|
| CNTL /FMT | MAC/DIV | ALU1 | ALU2 | x=Bus x to AR | x=Bus x to BR | x=Reg. AR to x | x=Reg. BR to x |
| 95, 94, 93 | 92, 91, 90, 89, 88 | 87, 86, 85, 84, 83 | 82, 81, 80, 79, 78 | 77, 76, 75 | 74, 73, 72 | 71, 70, 69, 68 | 67, 66, 65, 64 |
| 000=nop | 00000=nop | 00000=nop | 00000=nop | 000=nop | 000=nop | 0000=AR to R0 | 0000=BR to R16 |
| 001=BRA offset | 00001=MPYU_u | 00001=ADDU_A1_x | 001=A | 001=A to AR | 0001=AR to BR | 0001=BR to R1 | to R17 |
| 010=BRccSET offset,#bit1,#bit2 | 00010=MPYS_u | 00010=ADDS_A1_x | 00010=ADDS_A2_x | 010=B to AR | 010=B to BR | 0010=AR to R2 | 0010=BR to R18 |
| 011=BRccCLR offset,#bit1,#bit2 | 00011=MACU_u | 00011=ADDC_A1_x | 00011=ADDC_A2_x | 011=C to AR | 011=C to BR | 0011=AR to R3 | 0011=BR to R19 |
| 100=SETsts_B | 00100=MACS_u | 00100=ADDI_A1_B | 00100=ADDI_A2_B | 100=D to AR | 100=D to BR | 0100=AR to R4 | 0100=BR to R20 |
| 101=CLRsts_B | 00101=MPYMU_z | 00101=ADDI_A1_D | 00101=ADDI_A2_D | 101=nop | 101=nop | 0101=AR to R5 | 0101=BR to R21 |
| 110=CLRFIFO_B | 00110=MPYMS_z | 00110=SUBU_A1_y | 00110=SUBU_A2_y | 110=nop | 110=nop | 0110=AR to R6 | 0110=BR to R22 |
| 111=WR Timer_D | 00111=DIVU_v | 00111=SUBS_A1_y | 00111=SUBS_A2_y | 111=nop | 111=nop | 0111=AR to R7 | 0111=BR to R23 |
| | 01000=DIVS_v/ 01000= SUBC_A1_y | 01000=SUBC_A2_y | | | 1000=AR | 1000=BR to R8 | to R24 |
| | 01001=ADDU_A3_x | 01001=SUBI_A1_B | 01001=SUBI_A2_B | | | 1001=AR to R9 | 1001=BR to R25 |
| | 01010=ADDS_A3_x | 01010=SUBI_A1_D | 01010=SUBI_A2_D | | | 1010=AR to R10 | 1010=BR to R26 |
| | 01011=ST_A3_y | 01011=ST_A1_y | 01011=ST_A2_y | | | 1011=AR to R11 | 1011=BR to R27 |
| | 01100=AND_A3_y | 01100=AND_A1_y | 01100=AND_A2_y | | | 1100=AR to R12 | 1100=BR to R28 |
| | 01101=OR_A3_y | 01101=OR_A1_y | 01101=OR_A2_y | | | 1101=AR to R13 | 1101=BR to R29 |

TABLE 5-1-continued

Microcode Summary Table for bits 95-64

| CNTL /FMT | MAC/DIV | ALU1 | ALU2 | Register File x=Bus x to AR | x=Bus x to BR | x=Reg. AR to x | x=Reg. BR to x |
|---|---|---|---|---|---|---|---|
| | 01110=EXO_A3_y | 01110=EXO_A1_y | 01110=EXO_A2_y | | | 1110=AR to R14 | 1110=BR to R30 |
| | 01111=NEG_A3 | 01111=NEG_A1 | 01111=NEG_A2 | | | 1111=AR to R15 | 1111=BR to R31 |
| | 10000=EXTB_A3 | 10000=EXTB_A1 | 10000=EXTB_A2 | | | | |
| | 10001=EXTW_A3 | 10001=EXTW_A1 | 10001=EXTW_A2 | | | | |
| | 10010=ASR_A3 | 10010=ASR_A1 | 10010=ASR_A2 | | | | |
| | 10011=ASL_A3 | 10011=ASL_A1 | 10011=ASL_A2 | | | | |
| | 10100=LSR_A3 | 10100=LSR_A1 | 10100=LSR_A2 | | | | |
| | 10101=LSL_A3 | 10101=LSL_A1 | 10101=LSL_A2 | | | | |
| | 10110=ROR_A3 | 10110=ROR_A1 | 10110=ROR_A2 | | | | |
| | 10111=ROL_A3 | 10111=ROL_A1 | 10111=ROL_A2 | | | | |
| | 11000=CLR_A3 | 11000=CLR_A1 | 11000=CLR_A2 | | | | |
| | 11001=CLR24_A3 | 11001=CLR24_A1 | 11001=CLR24_A2 | | | | |
| | 11010=ABS_A3_y | 11010=ABS_A1_y | 11010=ABS_A2_y | | | | |
| | 11011=ABS_A3 | 11011=ABS_A1 | 11011=ABS_A2 | | | | |
| | 11100=DEC_A3 | 11100=DEC_A1 | 11100=DEC_A2 | | | | |
| | 11101=INC_A3 | 11101=INC_A1 | 11101=INC_A2 | | | | |
| | 11110=ADDC_A3_x | 11110=TST_A1_bit | 11110=TST_A2_bit | | | | |
| | 11111=NOT_A3 | 11111=NOT_A1 | 11111=NOT_A2 | | | | |

TABLE 5-2

Microcode summary table for bits 63-36

| Comparator ThRegCC x=enab. CC | Encoder ENC | Data Memory DMI | DM2 | coreBus control x to BUS A | x to Bus B | x to Bus C | x to Bus D |
|---|---|---|---|---|---|---|---|
| 63, 62, 61, 60 | 59, 58 | 57, 56, 55 | 54, 53, 52 | 51, 50, 49, 48 | 47, 46, 45, 44 | 43, 42, 41, 40 | 39, 38, 37, 36 |
| 0000=nop | 00=nop | 000=nop | 000=nop | 0000=R0 to A | 0000=R8 to B | 0000=R16 to C | 0000=R24 to D |
| 0001=SETcmp_A | 01=encode A | 001=RD DM1; Blo=Addr (Data A–B) | 001=RD DM2; Blo=Addr (Data C–D) | 0001=R1 to A | 0001=R9 to B | 0001=R17 to C | 0001=R25 to D |
| 0010=SETcmp_B | 10=encode C | 010=RD DM1; Bhi=Addr (Data A–B) | 010=RD DM2; Bhi=Addr (Data C–D) | 0010=R2 to A | 0010=R10 to B | 0010=R18 to C | 0010=R26 to D |
| 0011=SETcmp_C | 11=Read Result | 011=RD DM1; Dlo=Addr (Data A–B) | 011=RD DM2; Dlo=Addr (Data C–D) | 0011=R3 to A | 0011=R11 to B | 0011=R19 to C | 0011=R27 to D |
| 0100=SETcmp_D | | 100=RD DM1; Dhi=Addr (Data A–B) | 100=RD DM2; Dhi=Addr (Data C–D) | 0100=R4 to A | 0100=R12 to B | 0100=R20 to C | 0100=R28 to D |
| 0101=CMPU_TRx0 | | 101=WR DM1; B=Addr; A=data | 101=WR DM2; B=Addr; C=data | 0101=R5 to A | 0101=R13 to B | 0101=R21 to C | 0101=R29 to D |
| 0110=CMPU_TRx1 | | 110=WR DM1; B=Addr; D=data | 110=WR DM2; B=Addr; D=data | 0110=R6 to A | 0110=R14 to B | 0110=R22 to C | 0110=R30 to D |
| 0111=CMPU_TRx2 | | 111=WR DM1; D=Addr; B=data | 111=WR DM2; D=Addr; B=data | 0111=R7 to A | 0111=R15 to B | 0111=R23 to C | 0111=R31 to D |
| 1000=CMPU_TRx3 | | | | 1000=A1hi to A | 1000=A2hi to B | 1000=A1hi to C | 1000=A2hi to D |
| 1001=CMPU_TRx4 | | | | 1001=A1lo to A | 1001=A2lo to B | 1001=A1lo to C | 1001=A2lo to D |
| 1010=CMPU_TRx5 | | | | 1010=A3hi to A | 1010=iosts to B | 1010=A3hi to C | 1010=Ring C to D |
| 1011=CMP_TRx6 | | | | 1011=A3lo to A | 1011=Constant to B | 1011=A3lo to C | 1011=Constant to D |
| 1100=CMPU_TRx7 | | | | 1100=DM1-data to A | 1100=DM1-data to B | 1100=DM2-data to C | 1100=DM2-data to D |
| 1101=CMP_BC | | | A to A | 1101=Ring B to B | 1101=Ring A to C | 1101=Ring B to D | 1101=Ring |
| 1110=CMPU_BD | | | | 1110=Out-Comp to A | 1110=ccsts to B | 1110=Out-Comp to C | 1110=Timer to D |
| 1111=CMPU_AD | | | | 1111=ENC. to A | 1111=DM2 to B | 1111=iosts to C | 1111=DM1 to D |

TABLE 5-3

Microcode summary table for bits 35-0

| Ring BUS Control | | | Output Port Control | | | | | En/Dis | NUMERIC 1st option Const./BRAddr |
|---|---|---|---|---|---|---|---|---|---|
| x to Ring A | x to Ring B | x to Ring C | x to Bottom | x to North | x to East | x to West | x to South | OutFIFO | Memory Addr. |
| 35, 34, 33 | 32, 31, 30 | 29, 28, 27 | 26, 25 | 24, 23 | 22, 21 | 20, 19 | 18, 17 | 16 | 15, 14, 13, 12, 11, 10, 9, 8 7, 6, 5, 4, 3, 2, 1, 0 |
| 000=Tdir to Ring A | 000=Tdir to Ring B | 000=Tdir to Ring C | 00=disabled | 00=disabled | 00=disabled | 00=disabled | 00=disabled | 0=disabled | 0000000000000000 |
| 001=T to Ring A | 001=T to Ring B | 001=A to Ring C | 01=Ring A to B | 01=Ring A to N | 01=Ring A to E | 01=Ring A to W | 01=Ring A to S | 1=enabled | 0000000000000000 |
| 010=N to Ring A | 010=N to Ring B | 010=B to Ring C | 10=Ring B to B | 10=Ring B to N | 10=Ring B to E | 10=Ring B to W | 10=Ring B to S | | |
| 011=E to Ring A | 011=E to Ring B | 011=C to Ring C | 11=Ring C to B | 11=Ring C to N | 11=Ring C to E | 11=Ring C to W | 11=Ring C to S | | |
| 100=W to Ring A | 100=W to Ring B | 100=D to Ring C | | | | | | | |
| 101=S to Ring A | 101=S to Ring B | 101=OutFIFO to Ring C | | | | | | | |
| 110=A to Ring A | 110=B to Ring B | 110=no select | | | | | | | |
| 111=C to Ring A | 111=D to Ring B | 111=no select | | | | | | | |

TABLE 5-4

Microcode summary table for Numeric Option 2 and 3

| NUMERIC 2nd option | | | | NUMERIC 3rd option MAC | ALU1 | ALU2 |
|---|---|---|---|---|---|---|
| MAC/DIV iter/oper | MAC op. sel. oper.=Bus | ALU1 op. sel. oper.=Bus | ALU2 op. sel. oper.=Bus | Shift A3 #pos. | Shift A2 #pos. | Shift A1 #pos. |
| 15 | 14, 13, 12 11, 10 | 9, 8, 7, 6, 5 | 4, 3, 2, 1, 0 | 14, 13, 12 11, 10 | 9, 8, 7, 6, 5 | 4, 3, 2, 1, 0 |
| 0=operand | 00000=A (z,x,y) | 00000=A (z,x,y) | 00000=no shift | 00000=no shift | 00000=no shift | |
| 1=iteration | 00001=B (z,x,y) | 00001=B (z,x,y) | 00001=B (z,x,y) | 00001=SH_A3_1 | 00001=SH_A2_1 | 00001=SH_A1_1 |
| | 00010=C (z,x,y) | 00010=C (z,x,y) | 00010=C (z,x,y) | 00010=SH_A3_2 | 00010=SH_A2_2 | 00010=SH_A1_2 |
| | 00011=D (z,x,y) | 00011=D (z,x,y) | 00011=D (z,x,y) | 00011=SH_A3_3 | 00011=SH_A2_3 | 00011=SH_A1_3 |
| | 00100=Alo (z,x,y) | 00100=Alo (z,x,y) | 00100=Alo (z,x,y) | 00100=SH_A3_4 | 00100=SH_A2_4 | 00100=SH_A1_4 |
| | 00101=Blo (z,x,y) | 00101=Blo (z,x,y) | 00101=Blo (z,x,y) | 00101=SH_A3_5 | 00101=SH_A2_5 | 00101=SH_A1_5 |
| | 00110=Clo (z,x,y) | 00110=Clo (z,x,y) | 00110=Clo (z,x,y) | 00110=SH_A3_6 | 00110=SH_A2_6 | 00110=SH_A1_6 |
| | 00111=Dlo (z,x,y) | 00111=Dlo (z,x,y) | 00111=Dlo (z,x,y) | 00111=SH_A3_7 | 00111=SH_A2_7 | 00111=SH_A1_7 |
| | 01000=Ahi (z,x,y) | 01000=Ahi (z,x,y) | 01000=Ahi (z,x,y) | 01000=SH_A3_8 | 01000=SH_A2_8 | 01000=SH_A1_8 |
| | 01001=Bhi (z,x,y) | 01001=Bhi (z,x,y) | 01001=Bhi (z,x,y) | 01001=SH_A3_9 | 01001=SH_A2_9 | 01001=SH_A1_9 |
| | 01010=Chi (z,x,y) | 01010=Chi (z,x,y) | 01010=Chi (z,x,y) | 01010=SH_A3_10 | 01010=SH_A2_10 | 01010=SH_A1_10 |
| | 01011=Dhi (z,x,y) | 01011=Dhi (z,x,y) | 01011=Dhi (z,x,y) | 01011=SH_A3_11 | 01011=SH_A2_11 | 01011=SH_A1_11 |
| | 01100=Alo Clo (x,y,u,v) | 01100=Alo Clo (x,y,u,v) | 01100=Alo Clo (x,y,u,v) | 01100=SH_A3_12 | 01100=SH_A2_$_{1}$12 | 01100=SH_A1_12 |
| | 01101=Alo Dlo (x,y,u,v) | 01101=Alo Dlo (x,y,u,v) | 01101=Alo Dlo (x,y,u,v) | 01101=SH_A3_13 | 01101=SH_A2_$_{1}$13 | 01101=SH_A1_13 |
| | 01110=Blo Clo (x,y,u,v) | 01110=Blo Clo (x,y,u,v) | 01110=Blo Clo (x,y,u,v) | 01110=SH_A3_14 | 01110=SH_A2_$_{1}$14 | 01110=SH_A1_14 |
| | 01111=Blo Dlo (x,y,u,v) | 01111=Blo Dlo (x,y,u,v) | 01111=Blo Dlo (x,y,u,v) | 01111=SH_A3_15 | 01111=SH_A2_$_{1}$15 | 01111=SH_A1_15 |
| | 10000=Ahi Dlo (x,y,u,v) | 10000=Ahi Dlo (x,y,u,v) | 10000=Ahi Dlo (x,y,u,v) | 10000=SH_A3_16 | 10000=SH_A2_$_{1}$16 | 10000=SH_A1_16 |
| | 10001=Bhi Clo (x,y,u,v) | 10001=Bhi Clo (x,y,u,v) | 10001=Bhi Clo (x,y,u,v) | 10001=SH_A3_17 | 10001=SH_A2_$_{1}$17 | 10001=SH_A1_17 |
| | 10010=Dhi Alo (x,y,u,v) | 10010=Dhi Alo (x,y,u,v) | 10010=Dhi Alo (x,y,u,v) | 10010=SH_A3_18 | 10010=SH_A2_$_{1}$18 | 10010=SH_A1_18 |
| | 10011=Chi Blo (x,y,u,v) | 10011=Chi Blo (x,y,u,v) | 10011=Chi Blo (x,y,u,v) | 10011=SH_A3_19 | 10011=SH_A2_$_{1}$19 | 10011=SH_A1_19 |
| | 10100=A C (x,y,u,v) | 10100=A C (x,y,u,v) | 10100=A C (x,y,u,v) | 10100=SH_A3_20 | 10100=SH_A2_$_{1}$20 | 10100=SH_A1_20 |
| | 10101=A D (x,y,u,v) | 10101=A D (x,y,u,v) | 10101=A D (x,y,u,v) | 10101=SH_A3_21 | 10101=SH_A2_$_{1}$21 | 10101=SH_A1_21 |
| | 10110=B C (x,y,u,v) | 10110=B C (x,y,u,v) | 10110=B C (x,y,u,v) | 10110=SH_A3_22 | 10110=SH_A2_$_{1}$22 | 10110=SH_A1_22 |
| | 10111=B D (x,y,u,v) | 10111=B D (x,y,u,v) | 10111=B D (x,y,u,v) | 10111=SH_A3_23 | 10111=SH_A2_$_{1}$23 | 10111=SH_A1_23 |
| | 11000=Clo Alo (y,v) | 11000=Clo Alo (y,v) | 11000=Clo Alo (y,v) | 11000=SH_A3_24 | 11000=SH_A2_$_{1}$24 | 11000=SH_A1_24 |

TABLE 5-4-continued

Microcode summary table for Numeric Option 2 and 3

| | NUMERIC 2nd option | | | NUMERIC 3rd option MAC | ALU1 | ALU2 |
|---|---|---|---|---|---|---|
| MAC/DIV iter/oper | MAC op. sel. oper.=Bus | ALU1 op. sel. oper.=Bus | ALU2 op. sel. oper.=Bus | Shift A3 #pos. | Shift A2 #pos. | Shift A1 #pos. |
| | 11001=Dlo Alo (y,v) | 11001=Dlo Alo (y,v) | 11001=Dlo Alo (y,v) | 11001=SH_A3_25 | 11001=SH_A2_25 | 11001=SH_A1_25 |
| | 11010=Clo Blo (y,v) | 11010=Clo Blo (y,v) | 11010=Clo Blo (y,v) | 11010=SH_A3_26 | 11010=SH_A2_26 | 11010=SH_A1_26 |
| | 11011=Dlo Blo (y,v) | 11011=Dlo Blo (y,v) | 11011=Dlo Blo (y,v) | 11011=SH_A3_27 | 11011=SH_A2_27 | 11011=SH_A1_27 |
| | 11100=C A (y,v) | 11100=C A (y,v) | 11100=C A (y,v) | 11100=SH_A3_28 | 11100=SH_A2_28 | 11100=SH_A1_28 |
| | 11101=D A (y,v) | 11101=D A (y,v) | 11101=D A (y,v) | 11101=SH_A3_29 | 11101=SH_A2_29 | 11101=SH_A1_29 |
| | 11110=C B (y,v) | 11110=C B (y,v) | 11110=C B (y,v) | 11110=SH_A3_30 | 11110=SH_A2_30 | 11110=SH_A1_30 |
| | 11111=D B (y,v) | 11111=D B (y,v) | 11111=D B (y,v) | 11111=SH_A3_31 | 11111=SH_A2_31 | 11111=SH_A1_31 |

TABLE 5-5

Microcode summary table for Numeric Option 4 and 5

| Numeric 4th option | | | NUMERIC 5th option | | |
|---|---|---|---|---|---|
| test ccsts #bit_1 | test ccsts #bit_2 | BRA offset | MAC op. sel oper.=Bus | ALU1 Bit test | ALU2 Bit test |
| 15, 14, 13, 12 | 11, 10, 9, 8 | 7, 6, 5, 4, | 14, 13, 12 | | |
| | | 3, 2, 1, 0 | 11, 10 | 5, 6, 7, 8 | 3, 2, 1, 0 |
| 0000=ccsts bit 0 | 0000=ccsts bit 0 | 00000000 | 00000=A (z,x,y) | 0000=test bit 0 | 0000=test bit 0 |
| 0001=ccsts bit 1 | 0001=ccsts bit 1 | offset= | 00001=B (z,x,y) | 0001=test bit 1 | 0001=test bit 1 |
| 0010=ccsts bit 2 | 0010=ccsts bit 2 | from −64 | 00010=C (z,x,y) | 0010=test bit 2 | 0010=test bit 2 |
| 0011=ccsts bit 3 | 0011=ccsts bit 3 | to +64 | 00011=D (z,x,y) | 0011=test bit 3 | 0011=test bit 3 |
| 0100=ccsts bit 4 | 0100=ccsts bit 4 | | 00100=Alo (z,x,y) | 0100=test bit 4 | 0100=test bit 4 |
| 0101=ccsts bit 5 | 0101=ccsts bit 5 | | 00101=Blo (z,x,y) | 0101=test bit 5 | 0101=test bit 5 |
| 0110=ccsts bit 6 | 0110=ccsts bit 6 | | 00110=Clo (z,x,y) | 0110=test bit 6 | 0110=test bit 6 |
| 0111=ccsts bit 7 | 0111=ccsts bit 7 | | 00111=Dlo (z,x,y) | 0111=test bit 7 | 0111=test bit 7 |
| 1000=ccsts bit 8 | 1000=ccsts bit 8 | | 01000=Ahi (z,x,y) | 1000=test bit 8 | 1000=test bit 8 |
| 1001=ccsts bit 9 | 1001=ccsts bit 9 | | 01001=Bhi (z,x,y) | 1001=test bit 9 | 1001=test bit 9 |
| 1010=ccsts bit 10 | 1010=ccsts bit 10 | | 01010=Chi (z,x,y) | 1010=test bit 10 | 1010=test bit 10 |
| 1011=ccsts bit 11 | 1011=ccsts bit 11 | | 01011=Dhi (z,x,y) | 1011=test bit 11 | 1011=test bit 11 |
| 1100=ccsts bit 12 | 1100=ccsts bit 12 | | 01100=Alo Clo (x,y,u,v) | 1100=test bit 12 | 1100=test bit 12 |
| 1101=ccsts bit 13 | 1101=ccsts bit 13 | | 01101=Alo Dlo (x,y,u,v) | 1101=test bit 13 | 1101=test bit 13 |
| 1110=ccsts bit 14 | 1110=ccsts bit 14 | | 01110=Blo Clo (x,y,u,v) | 1110=test bit 14 | 1110=test bit 14 |
| 1111=ccsts bit 15 | 1111=ccsts bit 15 | | 01111=Blo Dlo (x,y,u,v) | 1111=test bit 15 | 1111=test bit 15 |
| | | | 10000=Ahi Dlo (x,y,u,v) | | |
| | | | 10001=Bhi Clo (x,y,u,v) | | |
| | | | 10010=Dhi Alo (x,y,u,v) | | |
| | | | 10011=Chi Blo (x,y,u,v) | | |
| | | | 10100=A C (x,y,u,v) | | |
| | | | 10101=A D (x,y,u,v) | | |
| | | | 10110=B C (x,y,u,v) | | |
| | | | 10111=B D (x,y,u,v) | | |
| | | | 11000=Clo Alo (y,v) | | |
| | | | 11001=Dlo Alo (y,v) | | |
| | | | 11010=Clo Blo (y,v) | | |
| | | | 11011=Dlo Blo (y,v) | | |
| | | | 11100=C A (y,v) | | |
| | | | 11101=D A (y,v) | | |
| | | | 11110=C B (y,v) | | |
| | | | 11111=D B (y,v) | | |

5.3.3 Example of 3D-Flow mnemonic Assembler notation of the instruction set

The 3D-Flow instruction set supports numerically intensive signal-processing operations, bit manipulation capabilities, as well as general-purpose applications, such as multiprocessing, high speed control through its 5 Input and 5 output ports.

Each individual instruction is described in alphabetical listing of the 3D-Flow's instructions by mnemonic. It is also described the instruction format and notation.

The following are examples of 3D-Flow instructions. Their development is part of Phase II proposal

ABS_A?

Absolute Value of Accumulator 1, (2), (3)

Syntax [label] ABS_A1
[label] ABS_A2
[label] ABS_A3

Operands None

Description Take the value of the specified Accumulator (A1, or A2, or A3) and store its absolute value in the same destination. If the contents of the Accumulator (A1, or A2, or A3) are greater than or equal zero, the accumulator is unchanged by the execution of ABS. If the contents of the accumulator are less than zero, the accumulator is replaced by its 2's-complement value.

Opcode

| 92 | 91 | 90 | 89 | 88 | 87 | 86 | 85 | 84 | 83 | 82 | 81 | 80 | 79 | 78 |
|---|---|---|---|---|---|---|---|---|---|---|---|---|---|---|
| 1 | 1 | 0 | 1 | 1 | 1 | 1 | 0 | 1 | 1 | 1 | 1 | 0 | 1 | 1 |
| A3 | | | | | A1 | | | | | A2 | | | | |
| MAC/DIV | | | | | ALU1 | | | | | ALU2 | | | | |

Execution (PC) + 1 > PC
|(A?)| > A?; 0 > C

Condition Codes Affected

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Z | OV | C | OV | C | P | Z | N | GT | EQ | LT | OV | C | P | Z | N |
| ENC | MAC/DIV | | ALU2 | | | | | COMP | | | ALU1 | | | | |

Z_??? Set if A? result equal zero
C_??? Reset to zero always by the execution of this instruction.
OV_??? Set if overflow has occurred in A?
Cycles 1

Example 1

ABS_A1

| | Before Execution | | | After Execution |
|---|---|---|---|---|
| A1 | X | 3425h | A1 | 0 | 3425h |
| | C_ALU1 | | | C_ALU1 | |

Example 2

ABS_A2

| | Before Execution | | | After Execution |
|---|---|---|---|---|
| A2 | X | 0FFFFh | A2 | 0 | 1h |
| | C_ALU2 | | | C_ALU2 | |

Example 3

ABS_A3

| | Before Execution | | | After Execution |
|---|---|---|---|---|
| A3 | X | 80000000h | A3 | 0 | 7FFFFFFFh |
| | C_MAC | | | C_MAC | |
| | X | | | 1 | |
| | OV_MAC | | | OV_MAC | |

Example 4

ABS_A2

-continued

ABS_A?

| | Before Execution | | | After Execution |
|---|---|---|---|---|
| A2 | X | 00000000h | A2 | 0 | 00000000h |
| | C_ALU2 | | | C_ALU2 |
| | X | | | 1 |
| | Z_ALU2 | | | Z_ALU2 |

ABS_A?_y

Absolute Value of the "y" operand(s) stored into the Accumulator 1, (2), (3)

Syntax [label] ABS_A1_y
[label] ABS_A2_y
[label] ABS_A3_y

Operands y = S_32, S_16, S_8lo, S_8hi. (See Note 1)
S_16 = r0 to r31, A1_hi, A1_lo, A2_hi, A2_lo, A3_hi, A3_lo, DM1, DM2, Out_Comp, ENC., IOSTS, 16-bit Constant, STS, Out_FIFO, Timer, T, N, E, W, S. (See Note 1)

Description Take the value from the unit specified by "y" and store its absolute value into the specified Accumulator (A1, or A2, or A3). If the contents of the input operand(s) are greater than or equal zero, its value is unchanged by the execution of ABS. If the contents of the input operand(s) are less than zero, its value is replaced by its 2's-complement value. This instruction is similar to the previous, but it allows to fetch an operand and calculate its absolute value in a single cycle at the place of two cycles.

Opcode

| 92 | 91 | 90 | 89 | 88 | 87 | 86 | 85 | 84 | 83 | 82 | 81 | 80 | 79 | 78 |
|---|---|---|---|---|---|---|---|---|---|---|---|---|---|---|
| 1 | 1 | 0 | 1 | 0 | 1 | 1 | 0 | 1 | 0 | 1 | 1 | 0 | 1 | 0 |
| A3 | | | | | A1 | | | | | A2 | | | | |
| MAC/DIV | | | | | ALU1 | | | | | ALU2 | | | | |

Execution (PC) + 1 > PC
|(y)| > A?; 0 > C

Condition Codes Affected

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Z | OV | C | OV | C | P | Z | N | GT | EQ | LT | OV | C | P | Z | N |
| ENC | MAC/DIV | | ALU2 | | | | | COMP | | | ALU1 | | | | |

Z_??? Set if A? result equal zero
C_??? Reset to zero always by the execution of this instruction.
OV_??? Set if overflow has occurred in A?
Cycles 1
Note 1 The input operands to this instruction can be of the "y" format, that means with different word width. The S_16 (read: Source with 16-bit word) operands are fetched from the units listed below either: partially in 8-bit (low and high part) or in conjuction of two 16-bit word, to make a 32-bit word. Restrictions on all possible combinations of the byte order that can be fetch is applied according to Section 5.3.1 and Table 5-4.

Example 1

ABS_A1_r13,T

| | Before Execution | | | After Execution |
|---|---|---|---|---|
| r13,T | X | 3425h | A1 | 0 | 3425h |
| | C_ALU1 | | | C_ALU1 |

Example 2

ABS_A2_N,r27

-continued

ABS_A?_y

| | | Before Execution | | | After Execution |
|---|---|---|---|---|---|
| N,r27 | X | 0FFFFh | A2 | 0 | 1h |
| | C_ALU2 | | | C_ALU2 | |

Example 3

ABS_Tlo,Nhi

| | | Before Execution | | | After Execution |
|---|---|---|---|---|---|
| Tlo,Nhi | X | 80000000h | A3 | 0 | 7FFFFFFFh |
| | C_MAC | | | C_MAC | |
| | X | | | 1 | |
| | OV_MAC | | | OV_MAC | |

Example 4

ABS_A2_DM1

| | | Before Execution | | | After Execution |
|---|---|---|---|---|---|
| DM1 | X | 00000000h | A2 | 0 | 00000000h |
| | C_ALU2 | | | C_ALU2 | |
| | X | | | 1 | |
| | Z_ALU2 | | | Z_ALU2 | |

DIVS_v_i

Signed Division. Divide operands specified by "v" with the precision specified by the iterations "i"

Syntax [label] DIVS_S1,S2_i

Operands v = S1,S2 = S1_16 - S2_16, S1_8 - S2_8. (See Note 1)

S_16 = r0 to r31, A1_hi, A1_lo, A2_hi, A2_lo, A3_hi, A3_lo, DM1, DM2, Out_Comp, ENC., IOSTS, 16-bit Constant, STS, Out_FIFO, Timer, T, N, E, W, S. (See Note 1)

D = A (Destination. The result of the division is stored in A3)

Description The iterative divider provides division with variable accuracy. A load instruction is used to initialize the dividend and the divisor. Next a separate divide iteration instruction initiates a single divider iteration. Each iteration calculates a single bit of the quotient. Variable accuracy is achieved by varying the number of divide iteration instructions issued. The divider causes the overflow flag of the accumulator to be set if the divisor is larger than the dividend (an underflow condition). The divider causes both the overflow and carry flag of the accumulator to be set if the divisor is zero (a divide by zero condition).

Opcode

| 92 | 91 | 90 | 89 | 88 |
|---|---|---|---|---|
| 0 | 0 | 0 | 1 | 0 |

A3

MAC/DIV

Execution (PC) + 1 > PC

D = S1/S2 condition Codes Affected

-continued

DIVS_v_i

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Z | OV | C | OV | C | P | Z | N | GT | EQ | LT | OV | C | P | Z | N |
| ENC | MAC/DIV | | ALU2 | | | | | COMP | | | ALU1 | | | | |

Z_??? Set if A? result equal zero

C_??? Reset to zero always by the execution of this instruction.

OV_??? Set if overflow has occurred in A?

Cycles 1

Note 1 The input operands to this instruction can be of the "v" format, that means with different word width. The S_16 (read: Source with 16-bit word) operands are fetched from the units listed below either: partially in 8-bit (low or high part) or as two 16-bit word: a dividend and a divisor. Restrictions on all possible combinations of the byte order that can be fetch is applied according to Section 5.3 and Table 5-4.

Example 1

DIVS_A3_r13,T

| | Before Execution | | | After Execution |
|---|---|---|---|---|
| r13,T | X | 3425h | A1 | 0 | 3425h |
| | C_ALU1 | | | C_ALU1 | |

Example 2

DIVS_A3_N,r27

| | Before Execution | | | After Execution |
|---|---|---|---|---|
| N,r27 | X | 0FFFFh | A2 | 0 | 1h |
| | C_ALU2 | | | C_ALU2 | |

Example 3

DIVS_A3_Tlo,Nhi

| | Before Execution | | | After Execution |
|---|---|---|---|---|
| Tlo,Nhi | X | 80000000h | A3 | 0 | 7FFFFFFFh |
| | C_MAC | | | C_MAC | |
| | X | | | 1 | |
| | OV_MAC | | | OV_MAC | |

Example 4

DIVS_A3_DM1,T

| | Before Execution | | | After Execution |
|---|---|---|---|---|
| DM1 | X | 00000000h | A2 | 0 | 00000000h |
| | C_ALU2 | | | C_ALU2 | |
| | X | | | 1 | |
| | Z_ALU2 | | | Z_ALU2 | |

LookupMove D1-10 = DM&P < S1

Lookup-table & Move. Convert data through a lookup-table (DM1 or DM2) and move the result to another unit.

Syntax [label] LookupMove D1, D2, D3, D4, D5, D6, D7, D8, D9, D10 = DM1P < S1
[label] LookupMove D1, D2, D3, D4, D5, D6, D7, D8, D9, D10 = DM2P < S1

Operands S1 = S_8. (Input is 8-bit, either high or low part of a 16-bit word. See Note
S_16 = r0 to r31, A1_hi, Al_lo, A2_hi, A2_lo, A3_hi, A3_lo, DM1, DM2, Out_Comp, ENC., IOSTS, 16-bit Constant, STS, Out_FIFO, Timer, T, N, E, W, S. (See Note 1)
D1-10 = D_16 (The output can be written to maximum ten different units in the same cycle. See Note 2)
D_16 = B, N, E, W, S, Out-FIFO, DM1, DM2, DM1P, DM2P, r1-15, r16-31 (See note 2)
DM1P = Data Memory 1 Pointer.
DM2P = Data Memory 2 Pointer.

Description The iterative divider provides division with variable accuracy. A load instruction is used to initialize the dividend and the divisor. Next a separate divide iteration instruction initiates a single divider iteration. Each iteration calculates a single bit of the quotient. Variable accuracy is achieved by varying the number of divide iteration instructions issued. The divider causes the overflow flag of the accumulator to be set if the divisor is larger than the dividend (an underflow condition). The divider causes both the overflow and carry flag of the accumulator to be set if the divisor is zero (a divide by zero condition).

Opcode

| 92 | 91 | 90 | 89 | 88 |
|---|---|---|---|---|
| 0 | 0 | 0 | 1 | 0 |

A3

MAC/DIV

Execution (PC) + 1 > PC
D = S1/S2

Condition Codes Affected

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Z | OV | C | OV | C | P | Z | N | GT | EQ | LT | OV | C | P | Z | N |
| ENC | MAC/DIV | | ALU2 | | | | | COMP | | | ALU1 | | | | |

Z_??? Set if A? result equal zero
C_??? Reset to zero always by the execution of this instruction.
OV_??? Set if overflow has occurred in A?
Cycles 1

Note 1 The input operands to this instruction can be of the "v" format, that means with different word width. The S_16 (read: Source with 16-bit word) operands are fetched from the units listed below either: partially in 8-bit (low or high part) or as two 16-bit word: a dividend and a divisor. Restrictions on all possible combinations of the byte order that can be fetch is applied according to Section 5.3 and Table 5.4.

Example 1

DIVS_A3_r13,T

| | Before Execution | | | | After Execution |
|---|---|---|---|---|---|
| r13,T | X | 3425h | A1 | 0 | 3425h |
| | C_ALU1 | | | C_ALU1 | |

Example 2

DIVS_A3_N,r27

| | Before Execution | | | | After Execution |
|---|---|---|---|---|---|
| N,r27 | X | 0FFFFh | A2 | 0 | 1h |
| | C_ALU2 | | | C_ALU2 | |

Example 3

DIVS_A3_Tlo,Nhi

-continued

LookupMove D1-10 = DM&P < S1

| | | Before Execution | | | After Execution |
|---|---|---|---|---|---|
| Tlo,Nhi | X | 80000000h | A3 | 0 | 7FFFFFFFh |
| | C_MAC | | | C_MAC | |
| | X | | | 1 | |
| | OV_MAC | | | OV_MAC | |

Example 4

DIVS__A3__DM1,T

| | | Before Execution | | | After Execution |
|---|---|---|---|---|---|
| DM1 | X | 00000000h | A2 | 0 | 00000000h |
| | C_ALU2 | | | C_ALU2 | |
| | X | | | 1 | |
| | Z_ALU2 | | | Z_ALU2 | |

MultiMove D1-10 = S1-6

Move data between two units. In one cycle move maximum 6 sources to 10 destinations.

Syntax
[label] MultiMove D1, D2, D3, D4, D5, D6, D7, D8, D9, D10 = S1
[label] MultiMove D1, D2, D3, D4, D5, D6, D7, D8, D9, D10 = S2
[label] MultiMove D1, D2, D3, D4, D5, D6, D7, D8, D9, D10 = S3
[label] MultiMove D1, D2, D3, D4, D5, D6, D7, D8, D9, D10 = S4
[label] MultiMove D1, D2, D3, D4, D5, D6, D7, D8, D9, D10 = S5
[label] MultiMove D1, D2, D3, D4, D5, D6, D7, D8, D9, D10 = S6

(During the same cycle, the user cannot issue a command to move different sources to the same destination)

Operands
S1-6 = S__8, S__16. (Source is 8-bit, either high or low part of a 16-bit word, or a 16-bit word. See Note 1)
S__16 = r0 to r31, A1__hi, A1__lo, A2__hi, A2__lo, A3__hi, A3__lo, DM1, DM2, Out__Comp, ENC., IOSTS, 16-bit Constant, STS, Out__FIFO, Timer, T, N, E, W, S. (See Note 1)
D1-10 = D__16 (The output can be written to maximum ten different units in the same cycle, but cannot move different sources to the same destination. See Note 2)
D__16 = B, N, E, W, S, Out-FIFO, DM1, DM2, DM1P, DM2P, r1-15, r16-31 (See note 2)

Description
The iterative divider provides division with variable accuracy. A load instruction is used to initialize the dividend and the divisor. Next a separate divide iteration instruction initiates a single divider iteration. Each iteration calculates a single bit of the quotient. Variable accuracy is achieved by varying the number of divide iteration instructions issued. The divider causes the overflow flag of the accumulator to be set if the divisor is larger than the dividend (an underflow condition). The divider causes both the overflow and carry flag of the accumulator to be set if the divisor is zero (a divide by zero condition).

Opcode

| 92 | 91 | 90 | 89 | 88 |
|---|---|---|---|---|
| 0 | 0 | 0 | 1 | 0 |

A3

MAC/DIV

Execution
(PC) + 1 > PC
D = S1/S2

Condition Codes Affected

-continued

MultiMove D1-10 = S1-6

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Z | OV | C | OV | C | P | Z | N | GT | EQ | LT | OV | C | P | Z | N |
| ENC | MAC/DIV | | ALU2 | | | | | COMP | | | ALU1 | | | | |

Z_??? Set if A? result equal zero
C_??? Reset to zero always by the execution of this instruction.
OV_??? Set if overflow has occurred in A?
Cycles 1
Note 1 The input operands to this instruction can be of the "v" format, that means with different word width. The S_16 (read: Source with 16-bit word) operands are fetched from the units listed below either: partially in 8-bit (low or high part) or as two 16-bit word: a dividend and a divisor. Restrictions on all possible combinations of the byte order that can be fetch is applied according to Section 5.3 and Table 5.4.

Example 1

DIVS_A3_r13,T

| | Before Execution | | | After Execution |
|---|---|---|---|---|
| r13,T | X | 3425h | A1 | 0 | 3425h |
| | C_ALU1 | | | C_ALU1 | |

Example 2

DIVS_A3_N,r27

| | Before Execution | | | After Execution |
|---|---|---|---|---|
| N,r27 | X | 0FFFFh | A2 | 0 | 1h |
| | C_ALU2 | | | C_ALU2 | |

Example 3

DIVS_A3_Tlo,Nhi

| | Before Execution | | | After Execution |
|---|---|---|---|---|
| Tlo,Nhi | X | 80000000h | A3 | 0 | 7FFFFFFFh |
| | C_MAC | | | C_MAC | |
| | X | | | 1 | |
| | OV_MAC | | | OV_MAC | |

Example 4

DIVS_A3_DM1,T

| | Before Execution | | | After Execution |
|---|---|---|---|---|
| DM1 | X | 00000000h | A2 | 0 | 00000000h |
| | C_ALU2 | | | C_ALU2 | |
| | X | | | 1 | |
| | Z_ALU2 | | | Z_ALU2 | |

5.3.4 Functional description of each internal unit 5.3.4.1 Internal Bus Structure The processor is adapted as a processing node of a large 3D system array. All of the processing nodes have an internal structure of seven buses: four internal core buses and three ring buses (see FIG. 55) connected to parallel ports (5 for input and 5 for output). The seven buses are identical in terms of width and timing. The three ring buses (ring A, ring B, ring C) are used as I/O device transfer buses. They carry either data to be output via the output ports (NEWSB)

or input from the input ports (TNEWS). The ring buses can be connected to the core buses so that data transfer can take place between processing units and I/O devices. Core buses are used to transfer data between processing units (MAC, ALUs, etc.). The details of the data transfer among buses is described in connection with the register file, the core bus control, the ring bus control, and the output port control.

The bus structures of this processor are very simple. No handshaking occurs as the decoding determines which devices drive which buses. Every functional unit drives buses from a register. No high-impedance drivers are used. Each bus, then, has a multiplexer that takes input from all the possible drivers of the bus, uses the proper segment from the instruction set to decode which input is routed to the output, and drives the bus.

The timing can be segmented into three sections (see FIG. 57). The first, "tdly", is the time from the rising edge of the clock until the data is available on the bus for the functional units. This time includes (1) the clock to output of the functional unit register, (2) the time the bus multiplexer takes to decode, and (3) the time for the bus to become stable. This time should be approximately equal for each bus cycle and each bus. The second timing segment is "tdecode". This is the time each functional unit takes to process the data after it has become stable on the bus. "Tsetup", the last segment, is the setup time required on the functional unit register. Each functional unit must make sure that the delays through the unit meet the clock timing requirements given the longest "tdly" in the system.

The method of driving the buses is shown in FIG. 58. A particular functional unit drives the bus through a multiplexer.

5.3.4.2 Instruction Sequencer

The instruction sequencer (IS), or state machine, shown in detail in FIG. 62, is responsible for generating the addresses for Program Memory 14. The control of the address uses the following general rules:

1. The default condition is to increment the program memory address. This happens if none of the other conditions occur.
2. The instruction sequencer will halt all action when the processing element expects input from an input FIFO, but the data is not yet present. Under these circumstances, the sequencer will simply keep everything in the current state.
3. The instruction sequencer will use the branch instruction segment (CNTL/FMT) (see Appendix A) and condition codes from the processing units to determine whether to load the program memory address with the current address added (or subtracted) to the offset specified in the Numeric field of the instruction (see Appendix A). If the condition code matches the instruction, the IS will load the program memory address with the numeric instruction segment. Otherwise it will increment the program memory address.

The instruction sequencer assumes a pipelined decode of the instruction. It will take three clock cycles from the time the instruction sequencer issues an address to the time the instruction decoder actually issues the decoded signals from that instruction. However, the instruction sequencer processes one instruction per clock cycle, pipelining the instruction processing. The general pipelining approach is shown in FIG. 59. FIG. 60 shows the timing of the pipeline during program execution with no branches. FIG. 61 shows the pipeline timing when a branch instruction is executed.

When a branch instruction is encountered, the instruction sequencer assumes that the branch will not take place when filling the pipeline. That is, the sequencer will continue to increment the address rather than placing the numeric into the address. If the branch condition is true, it will then take two clock cycles to fill the pipe, just as if powering up.

5.3.4.3 Program Memory

The program memory 14 stores the microcode that is processed by the processor 10. The program memory 14 has a memory width of 96 bits and a memory depth of 64 words. The program memory receives a 7-bit address from the instruction sequencer and then decodes the address and places the data onto the output of the memory section. On the next rising clock edge, the data is latched into a register. This registered data is the instruction, and is read by instruction decoder.

5.3.4.4 Instruction Decoding

Instruction decoding of the processor is distributed throughout the design. Each functional unit is responsible for decoding its section of the instruction, as shown in Table 5-6. The individual units must provide a register stage for the instruction segment to be decoded as shown in FIG. 59. Each functional unit should perform as much of the decoding as possible before the register to maximize performance.

TABLE 5-6

Functional units of the 3D-Flow processor responsible for decoding

| Mnemonic | Instruction Bits | Functional Unit Responsible for Decode |
|---|---|---|
| CNTL/FMT | 93–95 | Instruction Sequencer |
| MAC/DIV | 88–92 | Multiply Accumulate and Divide |
| ALU1 | 83–87 | Arithmetic Logic Unit 1 |
| ALU2 | 78–82 | Arithmetic Logic Unit 2 |
| Register File | 64–77 | Register File |
| Comp | 60–63 | Comparator |
| Multi-hit Encoder | 58–59 | Multi-hit Encoder |
| Data Mem | 52–57 | Data Memory |
| core Bus | 36–51 | core Bus logic |
| Ring Bus | 27–35 | Ring Bus Logic |
| Output Port | 17–26 | Output Port Control |
| En/Dis OutFIFO | 16 | OutFIFO |
| Numeric | 0–15 | Instruction Sequencer |

5.3.4.5 Multiply/Divide/Accumulate Unit

Multiplier/Divider Unit (MDU) 18, illustrated in FIG. 63, is actually three separate arithmetic units sharing common input multiplexing circuits and a common output bus. The MDU consists of a Wallace Tree Multiplier, a restoring iterative divider, and an accumulator controlled by the Multiplier/Divider Control (MDC). Each of these units has a different pipeline delay. The multiplier has three pipeline stages and the divider has one. The results of the multiplier and divider are sent to Accumulator A3, where they may be stored or accumulated depending upon the instruction originally issued to the MDU that is interpreted by the MDC. Additionally, data from the input multiplexer may be sent directly to the accumulator, where a variety of arithmetic or logical operations may be performed, depending upon the instruction to the accumulator. What follows is an example of interlaced instructions to optimize performance that can be issued, taking into account the different pipeline cycles of the different operations. When a multiply A*B instruction is issued to the MDU, the accumulator is expected to store the results 3 cycles later. If a divide A/B instruction is issued, the store occurs after only one clock cycle delay. However, if a store instruction is issued to the accumulator, the operation must take place on the very next clock cycle.

A block diagram of the MDU is depicted in FIG. 63. Note that accumulator A3 has three inputs, one each from the input multiplexer, the multiplier, and the divider. The accumulator must operate upon the appropriate data on the appropriate clock cycle. To accomplish this control, a variable length accumulator instruction pipeline is used. The pipeline is three stages long; however, an instruction is not always written into the first stage. For instance, a multiply instruction is always written to stage 1 to match the 3-cycle delay of the multiplier. Divide instructions are written to stage 3, thus matching the 1-cycle delay of the divider. At the same time a NOP is written to stage one so that the divider instruction will not be repeated. Accumulator instructions are not pipelined but are issued directly to the accumulator. At the same time a NOP is written to stage one so that the accumulator instruction will not be repeated. It is important to note that data collisions at the accumulator are possible in this scheme. It is a task of the programmer (assembler) to make the best use of this flexibility to optimize code execution. Theoretically, valid data from the input multiplexer, the multiplier and the divider could be available to the accumulator on the same cycle. In an effort to provide predictable behavior from the MDU, a priority scheme has been established. The last instruction issued will be executed. For instance, if a multiply instruction is issued, followed two cycles later by a divide instruction, data from the divider will be stored in the accumulator. However, if an accumulator instruction is issued one cycle after the divide, it is the data from the input multiplexer upon which the accumulator will operate.

Finally, there is an additional level of control for the MDU. The Hold and Iteration Control provides the appropriate iteration and clock enable controls to each unit. Iteration control is dependent upon the opcode and iteration bit from the numeric field. Clock enables are dependent upon the HOLD signal issued by the instruction sequencer. The MDC interprets the incoming instruction, controls the appropriate multiplexing, and initiates the selected operation for a given opcode.

5.3.4.6 Wallace Tree Multiplier

The Wallace Tree Multiplier (WTM) can handle signed and unsigned multiplication. The WTM utilizes 2-input AND gates to obtain partial products. Column compression of partial product is achieved using seven levels of fall and half adders until only two partial products remain. The contributions of the partial products are summed using a 32-bit carry-lookahead adder to determine the final product. The final product is 32 bits wide; therefore, no carry or overflow signal is produced by the WTM. The multiplier is also used to perform a 32×16 multiply. This is accomplished by passing the lower 16 bits of the accumulator to one input port of the multiplier. On the next clock cycle, the upper 16 bits are passed. The results are shifted appropriately and then accumulated. The user is responsible for providing the operand and instruction inputs while this two-cycle operation takes place.

5.3.4.7 Iterative Divider

The iterative divider provides division with variable accuracy. The divide instruction loads the operands and iterates for the selected number of times. A load instruction is used to initialize the dividend and the divisor. Each iteration calculates a single bit of the quotient. Variable accuracy is achieved by specifying the number of divide iteration instructions "i" issued. The divider causes the overflow flag of the accumulator to be set if the divisor is larger than the dividend (an underflow condition). The divider causes both the overflow and carry flag of the accumulator to be set if the divisor is zero (a divide by zero condition).

To compute a/b use the following steps:

1. Store "divisor" into the divisor register; Store "dividend" into the lower 16-bits of the remainder register and zeros in the upper 17-bits
2. Shift remainder register 1 bit left (shift data in [sdin]← not result (17)).
3. If result (17)=1 then
   shift remainder register 1 bit left (sdin ← not result (17)) ELSE
   remainder (32:17) ← result (15:0)
   shift remainder (16:0) 1 bit left (sdin ← not result (17))
   remainder (16) goes into the bucket.
4. If another iteration go to (3) ELSE
   remainder is in remainder register (32:17)
   quotient is in register (15:0)

5.3.4.8 Accumulator

The 32-bit accumulator accepts inputs from both the divider and the multiplier. Accumulator operation is dependent upon the opcode that produced the data. Operations include shift, store, negate (2's complement), and accumulate. Both overflow and carry are possible in the accumulator. Condition code flags are provided to indicate overflow and carry.

5.3.4.9 Condition Code Status Register

The condition code status register 41 carries the information of the flags set by the different processor units. It can also be read on core_bus B by issuing the code 1110 for bits 47–44 of the instruction register. Branch instructions take place according to the status of the bits of this register as described on Section 5.3.4.2 Instruction Sequencer.

The assignment of the condition code status register bits is the following:

bit 0 is set to 1 when a result from the ALU1 is negative bit 1 is set to 1 when a result from the ALU1 is zero bit 2 is set to 1 when a result from the ALU1 is positive bit 3 is set to 1 when a result from the ALU1 sets the carry bit 4 is set to 1 when a result from the ALU1 sets the overflow bit 5 is set to 1 when a result from the comparator is greater then bit 6 is set to 1 when a result from the comparator is zero bit 7 is set to 1 when a result from the comparator is lower then bit 8 is set to 1 when a result from the ALU2 is negative bit 9 is set to 1 when a result from the ALU2 is zero bit 10 is set to 1 when a result from the ALU2 is positive bit 11 is set to 1 when a result from the ALU2 sets the carry bit 12 is set to 1 when a result from the ALU2 sets the overflow bit 13 is set to 1 when a result from the Multiply-Accumulate-Divide unit sets the carry bit 14 is set to 1 when a result from the Multiply-Accumulate-Divide unit sets overflow bit 15 is set to 1 when a result from the encoder unit is zero 5.3.4.10 input-Output Status register.

The input/output status register 43 carries the information of the flags set by the different FIFOs. It can also be read on core_bus C by issuing the code 1111 for bits 43–40 of the instruction register.

The assignment of the condition code status register bits is the following:

bit 0 is not used bit 1 is set when there are no data present on the south input port FIFO.

bit 2 is set when there are no data present on the west input port FIFO.

bit 3 is set when there are no data present on the east input port FIFO.

bit 4 is set when there are no data present on the north input port FIFO.

bit 5 is set when there are no data present on the top input port FIFO.

bit 6 is not used bit 7 is not used bit 8 is set when the outFIFO is full.

bit 9 is set when the south FIFO is full.

bit 10 is set when the west FIFO is full.

bit 11 is set when the east FIFO is full.

bit 12 is set when the north FIFO is full.

bit 13 is set when the top FIFO is full.

bit 14 not used.

bit 15 is set when there are no data present on the outFIFO.

5.3.4.11 Arithmetic Logic Units (ALU1 and ALU2)

The two arithmetic logic units ALU1 and ALU2 are identical in construction and are shown in FIG. 88. The ALUs are 16 bit input circuits with a 32-bit output and are of conventional design. Importantly, all operations of the units 20 and 21 are stored in respective 32-bit registers, identified as A1 for ALU1 and A2 for ALU2. Accumulation of input with previous 32-bit result is also available. The complete list of operations is shown in Appendix A, Table A-3.

5.3.4.12 Comparator

The processor 10 has a thresholding comparator whose purpose is to determine the relative magnitude of data on the buses. It has four banks of 8 registers each of which can be downloaded through the RS232 12 port. Each register is connected to a comparator which compares the value in the register with a value on the bus connected to it. Each bank receives its input for comparison from a different input bus. Bank A receives its data from bus A, Bank B receives its data from bus B, Bank C receives its data from bus C, and Bank D receives its data from bus D. The comparator performs two distinct functions with the comparators: thresholding and ranging.

The thresholding function simply sets flags for use by the instruction sequencer. The comparator sends three flags (set in the condition code status register) to the sequencer: comparator greater than, comparator less than, and comparator equal. Comparator greater than is set when the input value is greater than the value in the selected threshold register. Comparator less than is set when the input value is less than the value in the selected threshold register. Comparator equal is set when the input value is equal to the value in the selected threshold register. Any of the 32 comparators can set the flags, depending on the instruction received. To set the specific register (out of 32 possible) two steps must be taken. First, select the register bank with one of the bank select instructions. Second, select the register with one of the compare instructions. Subsequent comparisons that will be made within the bank that is currently selected may be made without the bank select instruction. The instruction set is shown in Appendix A, Table A-8 and Table 5-8. During a bank select instruction, the comparator does not set any of the flags or prepare an output data word. During a register select instruction the flags are set using the selected register, and an output word is prepared from the ranging function.

The ranging function uses the eight thresholding registers within a bank for any one input data word. The data loaded into the thresholding registers will be loaded in an increasing series. That is the value in register 7 is greater than the value in register 6, which is greater than the value in register 5, etc. The incoming data is compared simultaneously to all eight registers. The format of the output data word is shown in Table 5-7. The result of the comparison is encoded into a 4-bit value that shows which register contains the first value which is greater than the input data. This is shown in Table 5-8. This comparison is performed on four input words at a time. The 4-bit outputs from each bank are concatenated to form a single 16-bit word that can be read by either Bus B or Bus D as selected by the core bus instruction.

5.3.4.13 Multi-hit encoder

The processor has a multi-hit encoder that is responsible for encoding the positions of transitions from "0" to "1" in the 16-bit input data string. The input data to be encoded comes in 16-bit fields.

TABLE 5-7

Format of the output data word from the comparator unit

| Bits 12–15 | Bits 8–11 | Bits 4–7 | Bits 0–3 |
|---|---|---|---|
| Bank D Range | Bank C Range | Bank B Range | Bank A Range |

TABLE 5-8

Output of the 3-bit encoded value from the comparator unit

| Bank Range Value | Meaning |
|---|---|
| 0000 | Input Value is less than the value in Threshold Register 0 |
| 0001 | Input Value is less than the value in Threshold Register 1, but greater than or equal to the value in Threshold Register 0. |
| 0010 | Input Value is less than the value in Threshold Register 2, but greater than or equal to the value in Threshold Register 1. |
| 0011 | Input Value is less than the value in Threshold Register 3, but greater than or equal to the value in Threshold Register 2. |
| 0100 | Input Value is less than the value in Threshold Register 4, but greater than or equal to the value in Threshold Register 3. |
| 0101 | Input Value is less than the value in Threshold Register 5, but greater than or equal to the value in Threshold Register 4. |
| 0110 | Input Value is less than the value in Threshold Register 6, but greater than or equal to the value in Threshold Register 5. |
| 0111 | Input Value is less than the value in Threshold Register 7, but greater than or equal to the value in Threshold Register 6. |
| 1000 | Input Value is greater than or equal to the value in Threshold Register 7. |

TABLE 5-9

Format of the output from multi-hit encoder

| | Bits 8–15 | Bits 4–7 | Bits 0–3 |
|---|---|---|---|
| Word 0 | not used (0) | not used (0) | Transition Count |
| Word 1 | not used (0) | Length 1 | Position 1 |
| Word 2 | not used (0) | Length 2 | Position 2 |
| . . . | not used (0) | . . . | |
| Word N | not used (0) | Length N | Position N |

The multi-hit encoder takes in a 16-bit binary word over the selected core bus and outputs data in the format of Table 5-9 where:

Transition Count is total Number of transitions from 0 to 1;

Length n is length of run between transitions;

Position n is position of first bit after transition.

The position and length are calculated on a 16-bit word using 33-bit data. Position is calculated using the low-order bit as bit-0 and the high-order bit as bit-15. The edges are all found using 17 of the 33 bits. The highest-order bit from the previous word is placed to the right of the 16-bit word being processed (bit position-1). It is used to determine if there is an edge at position 0. If bit-1 is a zero and bit-0 is a one, then there is an edge at position zero. For bits 1 through 11, there is an edge if the bit in question is a 1 and the previous bit is 0. Bits are processed in order from 0 to 15.

Length is calculated using 32 bits. The low-order 16-bits are the 16 bits being processed, while the high-order bits are processed in the next cycle. The high-order 16 bits are used to determine whether consecutive hits cross the boundary between 16-bit words used subsequently by the encoder unit. The length of the set of consecutive hits is calculated using all 32 bits.

For example, given the input word shown on Table 5-10 the Multi-Hit Encoder will produce the output shown in Table 5-11.

There are three transitions from 0 to 1, thus the transition count is 3.

The first transition starts at bit 2, thus position 1 is 2.

The number of ones after the first transition is three, thus length 1 is 3, etc.

The first word (Word 0, the transition count) is available the next clock cycle after multi-hit encoder 28 receives the data input and encode word instruction (as described in the Instruction Set section). The following words (position and length) are available starting one clock cycle after Word 0, and can be placed 1 word per clock cycle as long as the proper instruction is received. The encoded words will be available until the next encode word instruction is received.

TABLE 5-10

Example of an input to the multi-hit unit

| Bit Pos | 15 | 14 | 13 | 12 | 11 | 10 | 9 | 8 | 7 | 6 | 5 | 4 | 3 | 2 | 1 | 0 | −1 |
|---|---|---|---|---|---|---|---|---|---|---|---|---|---|---|---|---|---|
| Bit Value | 0 | 0 | 0 | 0 | 1 | 1 | 0 | 0 | 1 | 0 | 0 | 1 | 1 | 1 | 0 | 0 | 0 |
| Next word | 0 | 0 | 0 | 0 | 0 | 0 | 0 | 0 | 0 | 0 | 0 | 0 | 0 | 0 | 0 | 0 | 0 |

TABLE 5-11

Output generated by multi-hit unit on the input data of Table 5-10

| | Bits 8–15 | Bits 4–7 | Bits 0–3 |
|---|---|---|---|
| Word 0 | not used (0) | not used (0) | 0011 |
| Word 1 | not used (0) | 0011 | 0010 |
| Word 2 | not used (0) | 0001 | 0111 |
| Word 3 | not used (0) | 0010 | 1010 |

5.3.4.14 Register File

Two registers can be written and four registers can be read during the same clock cycle (see FIG. 90). Two selections of the input multiplexers (MDFRTAR and MDFRTBR) are made through the signals S_MDFRTAR and S_MDFRTBR. During the same clock cycle both internal buses (16-bit) AR and BR can carry the information of any of the four core buses A, B, C, or D. The information carried on the AR bus can be sent to any of the 16 registers (R0-R15) by means of the selection of the MDFRAR decoder through the S_MDFRAR signal. At the same time an equivalent operation can be made on the information carried on the internal bus BR through the MDFRBR decoder.

The 32 registers (16-bit) from R0 to R15, shown in FIG. 90 can store the information present at the input lines if a write signal WR_REG is active and can provide the content of the register on the output lines if the read RD_REG is active.

Four multiplexer multiplex the output of the 32 registers to four different buses from four groups of 8 registers: From R0 to R7 through multiplexer MDFRTA to bus B by means of a single selection S. NIDFRTA; from R8 to R15 through multiplexer MDFRTB by means of selecting signal—NIDFRTB; from R16 to R23 through multiplexer MDFRTC to bus C by means of the selection signal S_MDFRTC; and from R24 to R31 through multiplexer MDFRTD to bus D by means of the selection signal S_MDFRTD.

Four registers connected to the output of the four multiplexers, store the information by means of MDFROUT and enable the data on the four core buses A, B, C, and D by means of the signal E_ROFRTX.

5.3.4.15 Data Memory

FIG. 89 shows the two blocks of data memory 1 data memory 2, each with a multiplexer to the left multiplexing the address lines from the buses Blo, Bhi, Dlo and Dhi. On the bottom part of the blocks two registers for each block are present to buffer the data on the core buses A, B, and D.

5.3.4.16 Input FIFOs

Input FIFOs 72 (see FIG. 92) are connected to the input port to buffer the incoming data to the processor 10. There is one input FIFO for each input port; that is, there is a separate input FIFO for North, East, West, South, and Top input ports. The FIFOs will hold the data until the processor 10 is ready to read it. The FIFOs output data are connected to ring bus A and ring bus B as described above.

Each input FIFO is 8 words deep; each word is 16 bits wide.

The FIFO powers up in an empty state. When the FIFO is empty, the data ready signal is not asserted; when the FIFO is not empty, the data ready signal is asserted. The instruction sequencer uses the data ready signals to determine whether or not to hold sequencing. When an instruction is trying to read from a particular FIFO but the data ready signal from that FIFO is not asserted, the instruction sequencer will halt all processing until that data ready is asserted. This action results in a data driven processor mode of operation.

When the LOAD signal is asserted on the input bus interface, the FIFO receives the data on the input bus on the rising edge of the clock. If the FIFO was previously empty, the data ready signal is then asserted. If it was not empty, data ready stays asserted. If the FIFO becomes full during that read operation, the FULL signal is immediately asserted.

5.3.4.17 Output FIFO

When the output FIFO 61 is enabled, bit -16 of the long instruction word (see Appendix A, Table A-24) can capture data from the core buses for a data burst transfer to an output port at a later time. The output port control instruction determines whether the input to the FIFO is from core bus A, B, C, or D, or no operation. The data is made available on the bus during the same clock cycle that the instruction is valid. On the rising clock edge when the instruction is valid, the data is selected from the proper bus and is written into the FIFO.

Output FIFO 61 is read when the instruction for ring bus C specifies the output FIFO. The ring C instruction decode will send a read signal to the Output FIFO when it decodes that instruction. The first word is made available to the bus immediately after being written into the FIFO. The FIFO pointer is incremented when the read signal from the ring C decoder is valid on a rising clock edge. Thus if there are sequential reads to be performed, the output FIFO will output a word per clock cycle.

Each output FIFO is 8 words deep; each word is 16 bits wide.

5.3.4.18 Timer

The processor 10 has a timer unit 90 shown in the bottom part of FIG. 56. This unit may be used 1) as a normal timer counting external pulses with the ability to read-modify-write by the program and to be reset from an external signal at any time; 2) as a snapshot of the processor status. The snapshot of eight consecutive 3D-Flow processor status registers are memorized in the 8×32-bit "RS_STS" (see bottom of FIG. 56) status register file when the timer count is incremented from zero to the preset value when a second counter, enabled by this first condition, also reaches the preset value. The second counter is compared only by RS232 interface and is counting the 3D-Flow clock cycles starting from the end of counting of the timer described above. The snap shot consists of the program counter, FIFO status, and other status as described below. This status is taken eight clock cycles in succession and stored in the register file "RS_STS" for the RS-232 interface 12 to read.

This timer can be reset by the master reset and synchronously reset with an external signal. The timer has a 16-bit resolution.

The count of the timer is compared to a value in a register (see FIG. 56 time-brk req) that has been previously loaded by the RS-232 interface 12. The loading of this value will not affect the normal operation of the chip.

The second counter (with 8-bit resolution), counting the clock cycles from the end-count of the previous timer, is compared to a value in a register the RS-232 interface 12 will loads. The loading of this value will not affect the normal operation of the chip.

When the end-of-count of these two counters is reached, then the snapshot occurs and places the values in the "RS_STS" register file. The snapshot is 32 bits long, as shown in RS232 interface. Each FIFO (TNEWS) has four bits associated with it. The lower three bits represent the difference between the input pointer and the output pointer. The upper bit is the FIFO Full flag. Seven bits contain the value of the program counter when the snapshot is registered. The HOLD signal indicates that the processor is in HOLD mode. The RS232/ERR flag indicates whether an error occurred during RS232 transmission, and a "Data valid" bit indicates whether the trigger condition has been reached and there are valid data in the "RS_STS" file register. This bit is automatically reset when the data are read by the RS232 interface.

The trigger at the end-of-count of the two counters takes the snapshot for 8 consecutive clock cycles, and places the 8×32-bit words into a dual-ported "RS_STS" register file 24. This dual-ported register file 24 (shown in FIG. 56) has one write-only port connected to the various status signals of the processor 10; the other read-only port is connected to the RS232 interface 12. A trigger condition will write data into the register file 24 whether it has been read or not. It will also overwrite data even if RS232 interface 12 is in the process of reading it out, if the enable signal is active.

The 16-bit timer can also be loaded by the processor 10 over core bus D. This is enabled by a code in the controller portion of the instruction word. The event counter can also be read on Bus D by the processing element. This is controlled by the corebus control instruction.

5.3.4.19 Top to bottom ports data-flow (bypass)

In applications where the input data rate of the processor 10 is higher than the algorithm execution time, then a multi-layer processor array system that bypasses sets of input data and of output results is required. The top input port can be directly connected to bottom output port register 92. That is, there is an input multiplexer 68 (see FIG. 65) connected to the bottom output port register 92, with the connected bus multiplexed with the top input port. The top input FIFO 72 receives data when the top port is not connected to the bottom port output register 92. Otherwise it does receive the data. In other words, the top input port data will either go to the top input FIFO 72 or to the bottom output port register 92.

Control of the top and bottom port multiplexing bypass switches 64 and 66 is through a set of four counters 86 which commute both switches 64 and 66 at the same time in the position: both closed, or both open. The top port of processor 10 can receive a fixed number of inputs that will be multiplexed according to that number (See FIG. 56). The first n input words will be transferred to the top FIFO 72. At the same time (with more or less clock cycles depending upon whether the number of input data and the number of output results are equal, or if not, the processor will wait to switch the two bypass switches until all input data or results are transferred) the counter "result" is counting the number of results (m words) sent out from processor 10. When both counting conditions are satisfied, the two bypass switches 64 and 66 are commutated to the bypass position until both counters "by-in" and "by-result" satisfy the condition of counting k words and j words, respectively. This pattern of n input, m result, k by-in, j by-results is repeated. The designations m, n, k, and j are parameters that are downloaded by RS232 interface 12 at power up, and will differ for each processor belonging to different layers, but will be the same for processors belonging to the same layer in the system. Note that m, n, k, and j can be zero in a processor system that is made of only one layer.

5.3.5 Processor interface signals

When the processor is operating on a data driven mode as employed in a stack architecture, program execution is controlled by the presence of the data at five ports (North, East, West, South, and Top) according to the instructions being executed. When an input (or output) instruction is issued and data are not present (or external FIFOs are full), then processor holds execution until data becomes available (or external FIFOs are not full) A clock synchronizes the operation of the cells. When the processor is operating in "synchronous" mode, (see FIG. 62) then the processor 10 executes the next instruction in the program sequence regardless of the presence of data at the input port.

At each input port of processor 10 the input FIFO 72 derandomizes the data from the input device to the processor array. North, East, West, and South ports are 16-bit parallel bi-directional on separate lines for input and output, while the Top port is 16-bit parallel input only, and the Bottom port is 16-bit parallel output only. North, East, West, and South ports are used to exchange data between adjacent processors belonging to the same 3D-Flow array (stage).

The Processor interface consists mainly of one (point-to-point) bus type at every I/O port. The bus is a very simple synchronous bus, whose timing is shown in FIG. 64

The bus is used to transfer data between processors. The output port structure of one processor is shown in top part of FIG. 65 and the input port structure of another processor is shown in bottom part of FIG. 65. Thus the input and output buses are identical, with the output of one processor sending data to the input of the other. The data width of the bus is 8-bit lines carrying 16-bits in two steps (lower byte first and higher byte next).

The processor sending data out changes the data on the rising edge of the clock. There are two handshake signals, LOAD and FULL. LOAD is an output from the processor that is driving the data bus. It is a data valid signal to the processor that is reading the data bus. If the LOAD signal is active (high) at the rising edge of the clock, the processor reading the data will latch the data on the data bus at the same rising clock edge. Otherwise, the data is assumed to be invalid, and no transfer takes place.

The FULL signal is an output of the processor that is reading the data. It signals to the processor driving the bus that the input FIFO cannot accept more data (the FIFO is full). This signal is asserted after the rising edge of the clock when the data is read that fills the final word in the FIFO. It is deasserted on the rising edge after the FIFO is no longer full, i.e., after a word has been read out of the FIFO by the processor. When the FULL signal is asserted, the processor driving the bus will not change the data on the bus, or deassert the LOAD signal. It will keep them at the current state until the reading processor signals that it has latched the data in by deasserting the FULL flag. The writing processor assumes the data has been read off the bus if the FULL flag is not asserted at the rising clock edge.

Note that there are two places where the buses are connected: between processors on the same chip and between processors on different chips. Therefore, the bus timing must be able to work in both cases, the best case being intra-chip, and the worst case being inter chip.

5.3.6 ASIC parallel 110 interface signals

In the preferred embodiment of the invention, one ASIC accommodates four 3D-Flow processors. The communication parallel port between internal processors are 16-bit wide, while the parallel I/O ports which communicate with another ASIC are 8-bit wide. Each communication between processors takes place in two steps by multiplexing the 16-bit word onto 8 data lines.

FIG. 66 shows the timing of the signals carrying the 16-bit information between two ASICs 5.3.7 RS232C 3D-Flow ASIC interface Each 3D-Flow chip (which has internally four 3D-Flow processors) has a serial RS232 interface to connect to the system controller. In case the 3D-Flow parallel-processing system is made of several arrays (layers connected from top-to-bottom), a serial port RS232 from the system controller controls the 3D-Flow chip in the first layer and all the ones beyond it.

Depending on the number of 3D-Flow processor array layers (or stages), each RS232 controller in the “system crate controller” (e.g., VME) will handle communication with one 3D-Flow chip and the ones associated to it in the other layers (or stages). This fine distribution of RS232C signals is very important and convenient for monitoring the entire 3D-Flow parallel-processing system during run-time. It will also provide the capability of parallel loading of all programs and constants during initialization phase of the system (power up).

The RS232C from the host computer on the “system crate controller” thus has a:

Transmitter, transmitting the information to up to n×3D-Flow RS232Cs receivers. This implies that during a broadcast operation up to n×3D-Flow RS232Cs will receive the information. (The number “n” of the 3D-Flow chip stack will determine the type of driver to be used.)

Receiver, sending information to the RS232C in the “system crate controller”. The receiver is receiving information from up to n×3D-Flow RS232Cs transmitters. (An SN75174 quad line drivers with nand enabled three-state outputs could be used to buffer the signal from the 3D-Flow chip to the RS232C in the “system crate controller”. This driver meets EIA-485, EIA-422A Standard, and CCITT recommendations V.11 and X.27. They are designed for multipoint transmission and long bus lines in noisy environments.

Depending on the dimension of the overall 3D-Flow parallel-processing system that has to be implemented, these control lines should have a fanout ranging from 1 to 48 loads. Communication to the 3D-Flow chips through the serial RS232C lines will be as follows.

The broadcast message information can be a broadcast talk to all 3D-Flow chips, or a message to a specific 3D-Flow chip (among the set of 3D-Flow processors in a stack) in either listening or talking mode. In the case of talking, the message contains the ID number of the 3D-Flow chip under control. (Note that each 3D-Flow chip has four 3D-Flow processors.) At each 3D-Flow chip the following operation takes place in order to understand whether the message was addressed to itself. At each 3D-Flow processor, the message is fetched and compared with its ID number (determined by comparing 6-bit to a switch set on its specific 3D-Flow board and depending on its physical position in the board itself). When a particular 3D-Flow chip recognizes the message for itself, it prepares itself to listen and to load the program or constants into its memories, or it prepares to talk and to send the requested information by enabling the signals on the common (to the other 16×3D-Flow chips) transmitting line.

5.3.7.1 RS-232 serial port

The 3D-Flow chip contains a RS-232 serial interface at the top level. There is one RS-232 port for four processing elements. The RS-232 port is used at power-up to download the program of each 3D-Flow processing element.

The 3D-Flow RS-232C port is compatible with the industry standard RS-232C communications. It is a special purpose, hard-wired device with no programmability. It has the following features:

No of Data Bits: 8

Parity: Even

Stop Bits: 1

Baud Rate: 1/clock period

The RS-232 port internal to the 3D-Flow chip is configured as a Data Communications Equipment (DCE) device. This means that TxD on the RS232C port of the chip is connected to TxD on the Data Terminal Equipment (DTE) at the system controller site, and the RxD on the RS232C port of the system controller is connected to the RxD of the 3D-Flow RS232C chip interface.

5.3.7.2 Off-chip interface to the system controller

The RS-232 port connects to the system controller interface through the following signals:

RS232CTS

RS232RxD

RS232TxD

RS232RTS

RS232CLK

The RS-232 port on the 3D-Flow chip uses these signals as described in RS232C specifications.

The RS-232C port on the system controller sends control and data byte to the 3D-Flow processor (DTE to DCE). The RS232C serial interface from the system controller is shared by multiple RS-232 ports of several 3D-Flow chips. Therefore, each RS-232 port on each 3D-Flow chip must listen to the serial line until it is selected. Each character (data bytes) is sent lsb first, follow by parity and then the stop bit. The RS-232C port controller at the 3D-Flow chip sends the packet of data listed in Table. The system is self-synchronizing. A more detailed description of how the synchronization takes place is found in the next section on "byte count."

TABLE 5-12

| Format of the packet of data sent by the system controller to the 3D-Flow Synchronization Word |
|---|
| RS-232 Port_ID |
| BYTE COUNT BYTE 0 |
| BYTE COUNT BYTE 1 |
| DESTINATION |
| DATA BYTE 1 |
| DATA BYTE 2 |
| . . . |
| DATA BYTE N |

A detailed description of the packet of data listed in Table 5-13 follows:

1. Synchronization word

Sync Word Value: CC hex.

This word instructs the RS-232 Port that the next word is an ID word.

2. ID word

TABLE 5-13

Bit Format of the ID Word

| Bits 7–2 | Bits 1–0 |
|---|---|
| RS-232 Port_ID | PE_ID |

Where PE_ID is the processing element ID, i.e., which PE inside the ASIC is selected.

| PE_ID | PE Selected |
|---|---|
| 00 | 0 |
| 01 | 1 |
| 10 | 2 |
| 11 | 3 |

RS-232 Port_ID is the chip identification number. This is compared to the 6-bit CHIP_ID input from the ASIC I/O. That input is unique for every ASIC in the system, and is hard-wired at the board level. If the CHIP_ID is equal to RS-232 Port_ID, and the word follows the synchronization word, then this RS-232 Port is selected, and the next two words are the total data byte count in the package. Note that an RS-232 PORT_ID of all ones is a broadcast ID. The broadcast ID is recognized by all RS-232 ports as valid regardless of CHIP_ID. The broadcast ID is ignored if the destination word points to the status register. Broadcast is only for write functions.

3. Byte Count

The byte count information informs the RS-232 Port of the number of data bytes that follow the destination word. The byte count can be any value from 0 to 65535. The byte count is used to determine when a packet transmission has been completed. If a given RS-232 port's CHIP_ID matches the transmitted RS-232 port_ID, the RS-232 port acts upon the data received and then awaits the next synchronization word. If the ID's do not match, no action is taken, but the RS-232 port waits until the transmission is completed (as determined by byte count) and then looks for the next synchronization word. This scheme is self-synchronizing. In order to recover any unpredictable hardware failure and ensure that all listening ports are synchronized, one simply waits, in the worst case, for 65,535 RS232C clock cycles. This will ensure that any out-of-sync ports will have exhausted any potential erroneous byte counts and are listening for a new synchronization word.

All other words are undefined and will produce an error condition. Note that if the destination word points to the status register, there is no data associated with the transmission. Instead the RS-232 Port will send the status register contents for all four PE's back to the controller. The protocol for the transmission is shown in Table 5-14.

4. Destination

The Destination tells the RS-232 port which memory to download into.

| DEST_ID | Memory |
|---|---|
| 00000000 | Program Memory |
| 00000001 | Data Memory 1 |
| 00000010 | Data Memory 2 |
| 00000011 | Comparator |
| 00000100 | Counter 1 |
| 00000101 | Counter 2 |
| 00000110 | Counter 3 |
| 00000111 | Counter 4 |
| 00001000 | Status Register |
| 00001001 | Timer PC |
| 00001010 | Event Counter |

TABLE 5-14

| 3D-Flow status register protocol transmission over RS232C serial interface Synchronization Word |
|---|
| PE 0 STATUS WORD 0 |
| PE 0 STATUS WORD 1 |
| PE 0 STATUS WORD 2 |
| PE 0 STATUS WORD 3 |
| PE 1 STATUS WORD 0 |
| PE 1 STATUS WORD 1 |
| PE 1 STATUS WORD 2 |
| PE 1 STATUS WORD 3 |
| PE 2 STATUS WORD 0 |
| PE 2 STATUS WORD 1 |
| PE 2 STATUS WORD 2 |
| PE 2 STATUS WORD 3 |
| PE 3 STATUS WORD 0 |
| PE 3 STATUS WORD 1 |
| PE 3 STATUS WORD 2 |
| PE 3 STATUS WORD 3 |

5. Data Bytes

Data bytes are sent and received over the RS-232 interface, low byte first, then high byte.

5 5.3.7.3 On-chip interface to the 3D-Flow processor cells

The RS-232 port communicates with the processing elements through a direct memory access approach. The RS-232 port will decode the destination and send an interrupt signal to the selected processing element. This will synchronously reset the instruction sequencer, and hold it reset until the interrupt signal is released. The instruction sequencer will issue an interrupt acknowledge when it has reset. When the instruction sequencer has done this, the RS-232 port will be selected to drive the appropriate buses on the bus multiplexers. When the RS-232 port has completed the download, it will de-assert the interrupt signal. The instruction sequencer will begin its normal operation at that point.

The RS-232 port is responsible for generating memory addresses based upon the destination value. The memory address has a different format for the different destinations. These formats are shown in Table 5-15, Table 5-16 and Table 5-17.

TABLE 5-15

Program memory address format over the RS232C serial interface

Program Memory Address Format

| Bits 15–12 | Bits 11–8 | Bits 7–6 | Bits 5–0 |
|---|---|---|---|
| not used | Selects portion of program word to write.<br>0000 = bits 0–15<br>0001 = bits 16–31<br>0010 = bits 32–47<br>0011 = bits 48–63<br>0100 = bits 64–79<br>0101 = bits 80–95 | not used | Base address of RAM |

TABLE 5-16

Data memory address format over the RS232C serial interface

Data Memory Address Format

| Bits 15–8 | Bits 7–0 |
|---|---|
| Not used | Base address of RAM |

TABLE 5-17

Comparator address format over the RS232C serial interface

Comparator Address Format

| Bits 15–5 | Bits 4–0 |
|---|---|
| Not used | Selects Threshold Register<br>00000 = Register 0<br>00001 = Register 1<br>00010 = Register 2<br>. . .<br>11111 = Register 31 |

The RS-232 port has two 16-bit ports, each tied to a core bus. One port will receive the address, and one port will receive the data as decoded above. When the RS-232 port has valid address and data on the ports, it will send a write enable signal to the processing element. This signal will work as the write strobe into the appropriate memory or an enable into a register. The address and data signals must stay constant during the entire time the write enable is active.

Note that the RS-232 port is asynchronous to the processing elements. The address, data, and write enable signals will be run through a synchronizing register before being driven to the core. It is for this reason that the RS-232 port clock (RS232CLK) must ran no faster than half the speed of the functional clock.

FIG. 67 shows the timing of the RS-232 port driving the data, address and write enable buses.

5.3.7.4 3D-Flow RS232 Status Word

The RS-232 port can read a status word that contains information about the current state of the processor. The 3D-Flow processor I/O status word is a 32-bit word, read in four sections by the RS-232 port. Its format is described in Table 5-18.

Where:

Top_0–3 (North_0–3, East_0–3, West_0–3, South_0–3) are indicating how many values (from 0 to 8) are present in each input FIFO at a given program line number (or PC value, or instruction execution on SIMD mode of operation).

Top-F (North-F, East-F, West-F, South-F) are indicating which of the 5 input FIFOs are Full at a given program line number (or PC value, or Instruction execution on SIMD mode of operation).

FULL is the output port FULL flag, indicating that the FIFO to which the selected output port is tied is full.

HOLD is the instruction sequencer HOLD signal, indicating that the processor is trying to read from empty input FIFO or trying to write to a FULL output port.

RS232ERR shows any errors that have occurred since the last status request. The bit shows a different error in each PE status word:

1. PE0: Frame error (stop bit/missing error)
2. PE1: Parity error
3. PE2: Overun error
4. PE3: unused.

The program counter is the current state of the program memory address as output by the controller, before it is processed by the program memory.

The I/O status word includes signals that are driven by the clock, which is different from the RS-232 port clock. When the status register is read from the RS-232 port, the result in the register will be latched in such a way that spurious results will not be seen by the RS-232 port.

Data valid indicates that the timer reached the breakpoint and has filled the status buffer for the RS232. In addition, the data valid indicates that the RS232 interface has not read the data. When the RS232 interface reads the data, the data valid flag is reset.

TABLE 5-18

3D-Flow "RS_STS" I/O status word format

RS_STS Status Word Format

| Bit # | 7 | 6 | 5 | 4 | 3 | 2 | 1 | 0 |
|---|---|---|---|---|---|---|---|---|
| Word 0 | Top-F 3 | Top 2 | Top 1 | Top 0 | North-F 3 | North 2 | North 1 | North 0 |
| Word 1 | East-F 3 | East 2 | East 1 | East 0 | West-F 3 | West 2 | West 1 | West 0 |
| Word 2 | South-F 3 | South 2 | South 1 | South 0 | not used | not used | RS232 ERR | HOLD |
| Word 3 | Data Valid | not used | Program Counter found in RS_STS | | | | | |

5.3.8 IEEE 1149.1 JTAG interconnection between several 3D-Flow ASICs

In order to carry the minimum number of signals in the 3D-Flow system, the JTAG signals are daisy-chained from one chip to the next in the manner shown in FIG. 68. Considering that the minimum requirements on the JTAG specifications is a clock running at 4.5 MHz and that each 3D-Flow processor has about 4500 registers to scan, then by daisy-chaining 1000 3D-Flow processors, it will take only 1 second to scan a single test vector.

5.4 The of 3D-Flow Development Tools 5.4.1 Simulation of a system on thousands of 3D-Flow processors For the purpose of verifying the parallel execution of several programs on each processor in a processor array, a simulator can be utilized to accept as a program input 96-bit instructions of the 3D-Flow ASIC chip. This is extremely advantageous, since before the construction of the chip, the sequence of 96-bit strings written for the application programs can be used as test vectors during chip fabrication.

All topologies with nearest neighbor connections in six directions could be defined and simulated with the simulator. Obviously, only the topologies that will take into account the physical layout of the 3D-Flow chip with four processors are convenient to simulate.

The user can write programs, data memory contents, set thresholds, and bypass counter values using any text editor program. The routing table for a cube can be generated using a create function, but any connection between processors can be modified manually in the routing table using a text editor. The simulator runs on a Win32 platform (Windows'95 and Windows NT). Several functions are provided, including breakpoint, reset, single step, run, etc. (see FIG. 51).

The entire parallel-processing system is continuously displayed. Detailed views of the system seen from three different projections—front, side, and top—can be opened as new windows at any time. Each window can be modified in size, showing a different number of processors.

These views of the system allow the monitoring of the overall behavior of the parallel-processing system. To trace and debug the details of any program in any processor of the parallel-processing system, the user can open as many windows as desired with an exploded view of a processor showing the content of all internal registers, counters, data memories, internal buses, FIFOs, program counter, program line number currently executed, 96-bit instruction word, input hold and output hold, processor mode, etc.

A complete 3D-Flow system can be simulated with the 3D-Flow Simulator software. The simulator is a Win32 application that has been designed using object-oriented techniques and implemented in C++. The application consists of several modules with the simulator being the major component. The functions of the application are to:

- simulate a 3D-Flow system and the topology
- execute an algorithm on a given set of events (input data) specified in a text file
- enable the user to single step through the algorithm
- enable the user to inspect the state of a processor at any point of time
- give an overall view of the system
- allow a physical system to be monitored in real-time.

The major components of the system designed are i) the Loader, to handle input files, ii) the simulator, which models the 3D-Flow processor iii) the graphical user interface (GUI) and iv) the links between the simulator and the GUI consisting of RS232 (for a physical system) and IAState (for the simulator).

FIG. 69 gives the overall design which shows the dataflow in the system. Input comes in the form of text files and menu choices of the user; output consists of two log files and the windows which give various views of the system.

5.4.2 Modules

The major components are explained in greater detail below.

5.4.2.1 The Loader

Input to the application consists of a set of text files. These files can be created by any text editor or spreadsheet which can save the file in text format. The loader checks the files for any errors or inconsistencies, and prints the messages generated in the simulation log file. It initializes the program and data memories, thresholds, switches and queues the input event data of the processors.

The size of the program and routing files is quite large (about 500 Kbytes for a 1200 node system), but it depends on the algorithm to a very large extent. Hence, it is prone to a large number of errors which makes the error checking function of the loader very important.

5.4.2.2 The Simulator

The simulator consists of a three-dimensional array of processors. Each processor in the array has pointers to its neighbors, which are initialized as per the routing file to replicate the interconnections between the processors. Once the loader has loaded the program and other data into the processors, simulation can start at any time. The results of the algorithm are written to the results log file. Any run time errors detected in the algorithm are written to the simulation log file.

5.4.2.3 The Graphical User Interface (GUI)

The GUI is responsible for managing the views of the system. It creates windows, each of which show the system from a particular view-point. The main window for the application, along with the menu are also created by it. It handles some of the menu selections made by the user by defining a set of callback functions.

The GUI has been designed to show information in a hierarchical fashion. The viewer can obtain overall view of the system in from three different viewpoints. The second level of detail shows the state of an individual processor.

As noted above, the typical system can contain a large number of processors. The GUI is able to show the system from the three principal directions, and gives the user an idea of which part of the system is being viewed. The system state is displayed intuitively, with the processor state (processing/on hold), current line number of the algorithm displayed at all times. The state of the bypass switch and number of items in the FIFO's are updates as the algorithm executes. Further details of the processor are be available in the Internal Architecture (IA) View, should the user require it.

There are two different types of views of the system; overall views and detailed views. The three views from the principal directions are called the LayerView (front), PipeVertView (side) and PipeHorizView (top). The MapView gives the user an idea of which part of the system is being viewed by a particular window relative to the overall system. These make up the overall views. Detailed blow up views of a processor show its state as the algorithm executes. IAView, RegView and FIFOs are detailed views which show the state, registers and FIFO's of a particular processor.

The values at the input for layer 1 and at the output of the last layer can be visualized at any clock-cycle as a color-coded matrix in the Event Frame view and Result Frame view respectively. These values are stored in memory, and the user can examine the state of the inputs and outputs at any previous clock cycle. It is also possible to apply a mask on the input and the output values, in order to enhance the pattern.

A processor is identified by its address given as (xx, yy, zz) or (column, row, layer). Processor (0,0,0) is the one at the top-left corner of the system. FIG. 70 shows the orientation of the views in detail.

5.4.2.4 RS232 and IAState

The communication between the simulator and the GUI is through these interfaces. RS232 is the protocol used in hardware for up-loading data and monitoring the state of the system. In this application, it is used only in communicating the overall state of the system. The loader does not use it when loading data into the simulator in order to reduce setup time, since otherwise it would form a bottleneck.

The GUI also offers detailed views of any processor selected by the user, The data for this information is sent through IAState, an object which stores all registers and values on the bus at any particular clock.

5.4.3 Hardware

The communication to the 3D-Flow processor hardware system.

5.4.4 Data Files 5.4.4.1 Program File

This files contains the programs for the individual 3D-Flow processors in the system. The program lines are the binary instruction code that the processor executes. The file is in ASCII text format. In a large system, many processors can share the program, hence a single program may be specified over a range of processors. Besides the program, the overall system size, the modes of operation and the set of related data files can be specified in the program file.

5.4.4.2 Routing File

The topology of the system can be specified in a routing file. If this filename is given in the program file, the topology is simulated. In the absence of a routing file, the default mesh connection is assumed.

5.4.4.3 Data Memory File

The processor contains two memory banks, and their initial state can be set through the serial interface. The application receives these from data memory files which are in ASCII text format. The content of these files is the binary state in which the memories are initialized.

5.4.4.4 Threshold File

The processor includes a parallel comparator, and the threshold values can be initialized through the serial interface. This input to the application comes from an ASCII text file containing the threshold values in binary.

In addition to the look-up thresholds, the threshold file contains the bypass switch settings. These specify the number of values that make up the data for one event, and the number of output values that processor generates as the result.

5.4.4.5 Input Events File

Input data from the sub-detectors is received by the processors in layer 0 through their top port. For the simulation, these events come from a file, and they are fed into the top port of the processors at the appropriate clock cycle.

5.4.5 The Main Menu

The main menu contains the item as shown in FIG. 71. On startup, the only items that can be selected are Mode, Help and Exit. Each items is explained below, and those marked * have not been implemented yet.

File

It creates a file open dialog box to allows the user to specify program and data files. A Program file has to be specified before the items View and Debug in the main menu items are enabled. The program file may contain the names of its associated data files, in which case the data files are automatically loaded.

View

Allows the user to open overall views Layer, Pipe Vertical or Pipe Horizontal. The fourth overall view, i.e. MapView is opened automatically if it does not exist when one of the other three views is opened. The View menu also allows the user to traverse in the third dimension in the currently active view. For example, the current layer in a layer view may be 0, and the user may go to layers 1, 2, 3, etc. and back by selecting Up and Down in the View menu. Two additional view windows that can be opened are Event Frame view and Result Frame view.

Debug

Allows the user to start the simulation by selecting Run. If Run is selected, the algorithm starts executing, and the menu item changes to Stop. The user can also step Forward or Backwards* by one clock cycle. Breakpoints* is used to set breakpoints in the algorithm and Reset brings the algorithm back to its initial state.

Mode

It is used to specify if the application is being used to debug an algorithm, or as a front end to the hardware. Currently, the selected mode is not important and does not affect the application in any way. However, one of the two choices must be selected in the beginning before one can proceed.

Window

Standard window handling. Allows the user to Tile or Cascade child windows, arrange icons or to activate an open window.

Help*

Help has not been implemented yet.

Exit

To quit the application.

In order to visualize the execution of an algorithm, the 3D-Flow simulator can be used with a set of input data given in a text file called the input data file. The activity in any part of the system can be studied to check the data flow, as well as the internal state of any processor in the system can be monitored 5.5 3D-Flow assembly 5.5.1 Modularity and scalability options using standard dimensions or parts The architecture can be built with racks of different sizes. Table 5-19 shows the dimensions of three systems with different sizes using standard, commercially available material: mini-size, VME-size, and large size. For convenience and because it is more applicable to the described applications, the drawings and descriptions in this report will refer to a system made of Mini-Racks. Analogous systems can be built in VME and large sizes of several 'U' and 'HP' (1 U=44.45 mm, 1 HP=5.08 mm).

Consider, for example, the overall requirements for the implementation of a typical Level-1 trigger algorithm obtained from Monte Carlo simulation (receive data from the calorimeter, convert compressed 8-bit data into linearized 16-bit value, calculate $E_t$, $E_x$, $E_y$, calculate front-to-back [Had/EM], compare each of these calculated values with eight different thresholds) for a detector with 1280 trigger towers, running in an experiment with a 10-MHz bunch crossing rate.

The trigger algorithm will foresee the input of two compressed 8-bit data for each event (one from the hadronic compartment and one from the electromagnetic one), and the total program execution length will be of 12 steps. Considering implementation of the first version of the 3D-Flow processor at 80 MHz, the algorithm execution time will require two layers of 3D-Flow processors.

The overall system will then require 80×Mini-Rack (a) as described in the first row of Table 5-19, with two 3D-Flow daughter boards in the back, as shown in FIG. 9.

This configuration can easily grow to be able to implement future physics by accepting new threshold sets, implementing revised and optimized algorithms (e.g., adding isolation, correlating calorimeter data with other detector information, etc.), and incorporating hardware advances with little effect on the installed system.

The high communication speed allows fast data exchange between neighboring elements. With the described system, one can easily reproduce the detector elements topology onto the processing elements interconnection topology. For the parallel-processing system described above, it is possible to keep very short the length of lines driven by the high-speed components, thus minimizing power consumption without sacrificing high-speed communications. In an overall parallel-processing system, both processor speed and communication speed must be considered for a fast algorithm execution that requires data interchange between processors. If data are exchanged between processors at the same time (but not necessarily synchronously because they are derandomized by the presence of the FIFOs at each input port), and if the condition for each processor to continue its algorithm is that it receive the expected data from the neighboring processor, then the time constraint for all algorithms to advance in the process will be determined by the longest connection (or longest cable).

In a conventional assembly, where racks are housed in conventional cabinets, one cannot avoid having long and short cables if implementation of different topologies is desired. As a consequence, in order to obtain the same performance as the present system, use of high-current drivers capable of driving longer distances is required; but longer cables are equivalent to longer delays, no matter how fast the driving circuit. The result is that more processor pipeline stages are required (at a higher hardware cost) to execute the same algorithm.

assembly, only the data acquisition section was implemented in the standard crates. The processing section was implemented on 3D-Flow boards joined at 90°.

Following there is a list of boards required to build a test-bench system as shown in FIG. 1.

5.5.2.1 Input interface board

The input interface board has a standard 3U VME size. The function implemented on the board are shown in FIG. 72. This board receives 4 analog signals in input with a strobe: START CONVERT. A serial RS232 port is provided to communicate with an host computer.

On board there are 4 Analog-to-digital converter at 100 MHz, 8-bit.

Four blocks of dual port memory bank of 2 Kbytes are interfaced one side to the ADC converter and the other side to the RS232 controller.

The host computer, through the RS232 controller, controls the sampling of the data at the ADC and access the RAM memory banks.

The converted data are sent to through the rear connector of the board to the top port of the 3D-Flow processor. While the data are sent to the 3D-Flow processor system, are also store into the local RAM memory for further processing and comparison of results from the real-time processing on the 3D-Flow system with the off-line processing on the raw data.

5.5.2.2 Output interface board

The output interface board has a parallel input port which receive the data from the 3D-Flow processors at the last stage of the system and stores the results in real-time into a 2 Kbyte buffer memory.

The host processor, through the RS232 serial I/O access the results in the memory for comparison with the off-line results obtained by the host computer processing the raw data.

TABLE 5-19

3D-Flow Assembly Option Using Standard Parts

| Rack name | height | width | depth (mm) | slot/ rack | Receiver board H × W × board thickness (mm) | Mother board H × W × board thickness (mm) | Daughter board H × W × board thickness (mm) |
|---|---|---|---|---|---|---|---|
| Mini-Rack (a) | 3 U | 24 HP | 112.24 | 6 | 100 × 100 × 1.6 | 130 × 133 × 3.2 | 120 × 120 × 1.6 |
| Mini-Rack (b) | 3 U | 24 HP | 172.24 | 6 | 100 × 160 × 1.6 | 130 × 133 × 3.2 | 120 × 120 × 1.6 |
| Med.-Rack (a) | 6 U | 42 HP | 172.24 | 10 | 233.4 × 160 × 1.6 | 263.3 × 214 × 3.2 | 220 × 220 × 1.6 |
| Med.-Rack (b) | 6 U | 42 HP | 232.24 | 10 | 233.4 × 220 × 1.6 | 263.3 × 214 × 3.2 | 220 × 220 × 1.6 |
| Large-Rack (a) | 9 U | 63 HP | 292.24 | 15 | 366.7 × 280 × 1.6 | 396.6 × 316 × 3.2 | 320 × 320 × 1.6 |
| Large-Rack (b) | 9 U | 84 HP | 412.24 | 21 | 366.7 × 400 × 1.6 | 396.6 × 423 × 3.2 | 380 × 380 × 1.6 |

5.5.2 Standard electronic enclosure

The 3D-Flow system assembly can be built using standard electronic enclosures for microprocessor packaging systems that meet the following standards: CERN-Spec. No. 385, IEC 297-1, IEC 297-3, IEC 97.2, IEC 97.3, DIN 41494, and IEEE 1101, compatible with VME enclosures.

FIG. 9 shows the assembly of 80 Mini-Racks in a system that has short connecting cables of only slightly different length. Short in this context means that no other geometrical configuration can obtain shorter length in a scaleable manner. The boards accommodating the 3D-Flow ASICs (see Section 5.5) are stacked together to form the 3D-Flow system and are joined at 90 degrees to a 3U Mini-Rack.

Another possible assembly of the 3D-Flow shown in FIG. 10, does provide the shortest cable interconnection but it has the advantage of using standard crates for data acquisition and processing sections, while in the previous example of 5.5.2.3 Control Signals and Power Supply Board The control and power supply module (FIG. 74) consist of a 3U board 100 mm×160 mm with front panel connectors for power supply, control lines, trigger, and clock and a 64-position rear connector that distributes power supply and control signals. These signals of the 64-pin rear connector are carried from board to board (same signal) through the stack of the 3D-Flow daughterboards.

The power supply is received at the front panel with 6 pins (3 for +5V and 3 for ground), each carrying up to 13.

5.5.2.4 The back-plane (or motherboard)

The back-plane board is routing the signals from the rear connector of the input receiver boards (through connectors 10, 11, 13, and 14) to the top connectors of the 3D-Flow board (through connectors 15, 16, 17, and 18). It also route the control signals to the 3D-Flow boards through connector 12.

5.5.2.5 The 3D-Flow board

The 3D-Flow board (see FIG. 76 and FIG. 77) accommodate four 3D-Flow ASIC, provides control signals distribution to the four ASICs and parallel I/o communication sidewise to the ASICs (among themselves and also to external connectors in order to expand the system to an indefinite array size.). It also provides surface mounted connectors to provide communication between different 3D-Flow boards in order to build a stack system with a pyramid.

5.6 Anticipated benefits

The development of a single programmable ASIC for front-end electronics saves the cost of building several ASICs that are not reusable and that do not permit algorithm modification once developed.

The cost to develop an ASIC depends on the overall ASICs demand, the foundry capability at that point in time, and the complexity of the ASIC. It must also be considered that the 3D-Flow ASIC is preferably made of four identical circuits (processors) in order to reach the most cost-effective price between the printed circuits, connectors, and package cost, and ASIC-die cost. For the same reason most of the ASICs developed for front-end electronics have more than one channel per ASIC.

The fast algorithms of the order of hundreds of nanoseconds for input data rate up to 80 MHz could be applied to:

1. Pattern recognition on a 3×3 (see Section 5.8.1.1 and FIG. 78) Input data from sensors
2. Pattern recognition on a 4×4 (see Section 5.8.1.2 and FIG. 12) Input data from sensor.
3. Pattern recognition on a 5×5 (see Section 5.8.1.3) Input data from sensor.
4. For path finding (see section 5.9.3 and FIG. 79).
5. For channel reduction (see Section 5.8.1.5 and FIG. 16)
6. For signal correlation located in elements far apart in the detector (or sensoring input device) (see Section 5.9.1 and FIG. 25)

5.6.1 The need for high-speed, real-time processing and channel reduction on large data sets In data acquisition, or in high-speed, real-time systems where fast decisions must be taken by digital filtering, and/or pattern recognition, and/or coincidences, very fast real-time processing is required. This process usually also requires data reduction and channel reduction, which implies routing selected valid signals from thousands of input sources to a single exit point. Typical applications include:

Quality control in industrial applications, e.g., by recognizing impurities in a lamination process. At the chain's transfer speed, several video cameras send the information to a system that detects in real time patterns in the surface of the lamination that are considered material impurities.

PET/SPECT and medical imaging instrumentation. Unlike Magnetic Resonance Imaging (MRI) and Computerized Tomography (CT), Positron Emission Tomography (PET) and Single Photon Emission Tomography (SPECT) measures and images functional, biological and metabolic processes. Because PET offers greater specificity than other imaging techniques, it can reduce or eliminate the need for additional tests or invasive procedures. In PET/SPECT, some interactions occurring at the detector must be distinguished from noise and secondary scattering. This interaction occurs in a very short time, and the expected rate is one to two for each time window. (A time window may vary for different experiments but should be of the order of 10 ns.) The system must check when an event is recorded in two consecutive time windows or distinguish double hits in a single time window.

In HEP, where ability to recognize signals from thousands of detector elements at a rate of up to 40 MHz is typically required while performing a data reduction by a factor $10^2$ to $10^3$.

5.6.2 Disadvantage of presently available systems

One disadvantage of the currently available ASICs and parallel-processing computers (such as Hypercube) for high-speed front-end processing is their cost. Non-programmable ASICs execute a single algorithm, while parallel-processing and pipelining with commercially available components do not permit execution of real-time tasks in a sufficiently quick and flexible manner, such as input from hundreds of channels and output to a single channel. (This applies to the Hypercube, the cost of which in any event would be prohibitive for a front-end application.)

5.6.3 Advantages of 3D-Flow system architecture

The applicability of the 3D-Flow system to different experimental setups for real-time applications in the range of hundreds of nanosecond is set forth herein.

Other custom-made ASICs, boards, or systems currently available cannot execute different real-time algorithms in fewer or even in the same number of steps that the 3D-Flow system can. Some of the custom-made ASICs can execute one of the described front-end algorithms in fewer steps; however, they cannot execute several of them.

General-purpose processors such as CISCs or DSPs offer the possibility of executing several of the described algorithms. However, the number of steps is much higher, since there is no integration between processing instructions and I/O operations for exchanging information between one processor and its neighbors in one or two cycles while simultaneously processing internally.

5.6.4 Advantages of 3D-Flow system over existing circuits

Commercially available processors and DSPs such as Pentium, SHARK, etc., are not suitable for this type of front-end electronics. This is demonstrated by the fact that physicists and engineers designing front-end electronics for medical instrumentation continue to develop different ASICs.

An ASIC designed for a specific application implements a fixed algorithm, suitable only for a specific application. It cannot be used for a different one, since the degree of programmability and adaptability is limited.

As demonstrated herein, the novel 3D-Flow architecture can be used to efficiently solve several front-end application problems that no other presently available component can. For HEP, where requirements are very demanding, the 3D-Flow has been considered to be a suitable solution for programmable real-time processing by several eminent scientists.

This novel idea can be translated into an ASIC that is much simpler than most ASICs developed for front-end electronics.

5.7 A Methodology for designing 3D-Flow based systems

While it is necessary to retain maximum flexibility in the system, it is important to avoid over or under-dimensioning the system. This requires a careful study of the application to determine the parameters and invariants.

The methodology used to design an ASIC that could solve different front-end problems not solvable with commercially available components such as CISCs, DSPs processors, Xilinx, etc., involved studying in detail several applications requiring high performance digital filtering, data routing, data processing and channel reduction.

The validation of the design is accomplished by simulating in details all possible cases, verifying the performance for each one and checking that the requirements were met.

The following description show all steps that need to be implemented for each application in order to verify the suitability and advantages of this novel approach with respect to the construction of different ASICs.

Detailed examples made for different applications set forth below. Some of them, such as the "iterative search," or the "LHC-B muon," or the "LHC-B electron" are explained in complete detail showing how each step can be implemented.

The method includes the definition of each problem, description of the algorithms at different levels of detail, analysis of the system to determine the bandwidth, event rates, channel occupancy, channel reduction, and rejection at different stages of the algorithm. After having described the architecture conceptually, a solution to several different problems can be realized using the resulting architecture. This serves as a test to verify its versatility, to verify the level of difficulty in implementation and to check efficiency.

5.7.1 Problem definition

For each case it is necessary to define the problem not only from the point of view of the general requirements, e.g. detect a photon, muon, electron, or a hadron, or an impurity on a quality control process. It is also necessary to define the problem in terms of the number of channels, the event rate, reduction factor, the algorithm's criteria, the detector, and the signals provided by it. These terms are explained further in the following sections.

5.7.2 Algorithm description to distinguish interesting events from noise

It is important to understand the steps of the algorithm, and to foresee any variation from the basics that may be needed thereafter. Flexibility is a key aspect in system design, and an open system that offers the maximum range of parameters is desirable.

Developing an algorithm requires extensive simulation, a very good understanding of the particle signatures, the detector, and the various parameters involved. The aim of this work is to get as close as possible to the final algorithm, and to map it to a system in the most efficient, flexible, and economic manner possible.

Taking the best approximation of the algorithm and providing a flexible system leaves open the possibility of modifying this algorithm when more information is available as a result of trial runs. The best approximation of the algorithm is that which has most consensus in publication, which in general is reported in letters of intent of experiments or in technical design reports. Nevertheless, the system designer should also keep in mind ideas other than the accepted one in order to allow them to be implemented if necessary.

5.7.3 Analysis of the bandwidth, data rates, channel occupancy, channel reduction, and data rejections at different algorithmic stages This is the case, for instance, for the muon, electron, and hadron algorithm for LHC-B at CERN. However, it was necessary for us to repeat the analysis because it is important to know all the steps in the algorithm, and to determine some of the parameters such as channel occupancy that are not available.

The system designer needs a working set of event data and the algorithm to find out the maximum limits in the amount of data generated in any given subregion of the system. The other important parameters for the designer are:

1. bandwidth
2. data rates
3. maximum channel occupancy of each detector element
4. rejection factor at each stage of the algorithm
5. required channel reduction The bandwidth refers to the rate at which the system receives events. (Several bandwidths have to be considered at different algorithm and circuit stages to avoid bottleneck.) The system receives input data from multiple channels in parallel as a series of events, the data for an event at each channel consisting of one or more words. Bandwidth is defined as the number of events per second.

The data rate is the rate at which the system receives input data. This could be much higher than the event rate if each event comprises more than one word.

Maximum channel occupancy refers to local activity in any subregion. While the overall bandwidth reduction can be quite high, leading to a high channel reduction ratio, it is possible that all the activity is concentrated in a small region. Two parameters to be studied are:

1) Maximum number of hits that occurs within a region for any one event in a set of events, and
2) Maximum number of hits accumulated in any region for a set of events within a given window of time.

In such a case, if data generated at the output in these regions are much higher than the input, there can be overloading of the channels in the pyramid. This can be overcome by buffering the data; the size of the buffer depends on the nature of the problem and the cost of the memory needed for the buffers. Events are lost if the buffers overflow.

When the algorithm is implemented in several stages, each one applying a further cut on the input data, we must identify the number of steps each cut requires to execute, along with the rejection factor. In many cases the order in which the cuts are imposed is not important. When this occurs, it is advantageous to order the cuts in such a manner that the simplest cut (in number of steps) that gives the highest rejection factor must come first.

A good example of this is the muon algorithm described in Section 5.9.3. The first cut reduces the input data by a factor of 200, the other algorithm steps reduce much less. One should analyze of different problems for different instruments/experiments and check the degree of flexibility for future changes.

5.7.4 Design of the 3D-Flow system based on the results of analysis of the problem The analysis of the problem and the extensive simulation provides very important information on how to design a hardware system that will not be over- or under-dimensioned.

In most cases the most suitable topology of the electronics is that of replicating the 3D-Flow processor's neighboring connection as the neighboring relative position of the sensor elements. If information from several subdetectors is needed to recognize a particle, then one approach is to send all information relative to a $\Delta\Phi$ and $\Delta\eta$ (all signal information in a given cone seen from the interaction point) to one processor.

The optimal number of processors to estimate for the first layer that is interfaced to the detector, for a given application is the balance between:

1. Number of subdetectors that are required to provide data for a given algorithm of pattern recognition.
2. Number of information each subdetector is generating.
3. Complexity of the algorithm to be executed and the time limit for its execution.
4. Resolution to which the particles must be detected in the detector.

5. Maximum input data rate
6. Data reduction determined at different algorithmic stages
7. Channel reduction required
8. Flexibility that the user requires as result of parameters or possible algorithm modification, which will be known only during the fine-tuning of data-taking.

All this information plays an important role in the design of the hardware system. The change of one of these parameters may require a complete change the hardware design if this is made with cabled logic or ASICs implementing a fix algorithm or by having a fixed not-point-to-point connection between the detector and the electronic system.

The 3D-Flow system permits instead the change of many of these parameters. In the minor changes of algorithm implementation or data rate, resolution, etc., the 3D-Flow system topology can remain the same, and only the program and the size of the system may vary. Even if major changes are required of several of these parameters, there will be no waste of electronics as in the case of the cabled logic, where the user is forced to redesign and build a new system. The 3D-Flow system can be reused and recombined in different topologies, as shown in several examples in this report.

Each case study in this section describes the relevant parameters that have determined a certain 3D-Flow topology rather than another.

5.7.5 Interface of the detector (or input data source) to the 3D-Flow system

An important rule to keep in mind in the design of a hardware system that interfaces several signals from a detector is, whenever possible, to make point-to-point connections from the detector elements to the input channels of the hardware system (in this case to each 3D-Flow processor).

All the data exchange and routing should be preferably done in a flexible manner on the electronic ASIC or board. This approach offers several advantages over having several wires from one detector to several electronic input channels. For instance, in this case the routing is fix-crystallized on the printed circuit layout. Should the user need to change the algorithm that, for example, executes a pattern recognition on 5×5 channels in the place of 3×3 channels or 4×4 channels, all hardware would need to be replaced.

The 3D-Flow system allows a point-to-point connection between the detector and the hardware system. The data exchange is implemented in a flexible way by changing the routing algorithm, on each processor program memory, which routes different area information (3×3 or 4×4 or 5×5, or more) to and from each processor.

Examples of interfacing information from different detectors are set forth below in more detail.

5.7.6 Conversion of the realtime algorithm into 3D-Flow code

The real-time algorithm is broken down into several steps so that each step can be executed by the 3D-Flow processor. This exercise requires detailed knowledge of the architecture of the 3D-Flow processor and the system architecture, as described in Section 3 and Section 5.1.

The main effort of the user is limited to writing one program in 3D-Flow code (up to four for a pyramidal data reduction-routing).

All applications analyzed at this point require from 12 to 34 program steps.

After the first algorithm has been written, it is copied nine times. For each of the nine programs it is assigned a different letter, corresponding to a different position in a 4×4 processor array. The reason only nine different programs are required instead of 16 is that the four inner processors of a 4×4 array share the same program. For the same reason, two processors on each side of the 4×4 array share the same program.

The modification to be made on these nine programs with respect to the original one is minimal. Depending on the position of a different program in the array, the user has to modify the line of program that is sending or receiving data to or from a neighboring processor which does not exist because that particular processor is located in a comer or a side position of the array.

To extend the program to a larger number of processors a in an array, the programmer simply has to write in front of one of the nine programs the cell ID that has to be loaded with that particular program.

Practically, the user does not have to write 4096 ID lines for a 64×64 processor array. Through use of a utility that requires the user to create only a two-dimensional map of '1' and '0' (a '1' is written in the position where a processor exists, a '0' where there is no processor), these ID lines are generated automatically and separated into different groups for the nine different program locations.

The same utility that takes as input the two-dimensional data file with zeros and ones representing the map of the 3D-Flow system array also generates the list of ID for the threshold and bypass counter values for the input data file, and it generates the routing files with the connections between the processors, which will be used by the 3D-Flow simulator when the entire system needs to be simulated.

5.7.7 Design of the pyramid for channel reduction

The pyramid is a series of 3D-Flow processor layers that has a reduced number of processors between the first, or base layer of the pyramid adjacent to the last layer of the 3D-Flow processor stack and the next adjacent layer that carries out the information, between this layer and its next adjacent layer, and so on, until the number of processors per layer reduces to one ASIC (which may be equivalent to four 3D-Flow processors).

The design of the pyramid must respect the rules of the hardware boards and internal ASIC layout.

The examples described herein refer to two types of boards, one with four ASICs, used in the 3D-Flow system stack, and the other with one ASIC on one board, used in the pyramidal sector of the system.

The 3D-Flow systems built with other types of boards will follow different rules in routing the data through the pyramid in the channel reduction process. However, any pyramidal system should preferably provide each ASIC with four processors. Thus all information that has to travel from North to South and vice versa, and from East to West and vice versa, has to pass through two processors.

Depending on the number of processors at the base of the pyramid (that is generally equivalent to the number of processors of the output layer of the stack), the number of layers required is different.

The examples described herein reduce by four the number of processor per layer. The simplest implementations from the software point of view are the systems with a number of processors at the base that have a multiple of four processors per side.

The user has to write only four different types of programs to implement the pyramid: two for the first layer, which needs to do the zero suppression on results arriving from the stack of processors, and the other two for the remaining layers of the pyramid to route the information in the same layer from 16 to 4 and to the next pyramidal layer. (See more details in Section 5.8.1.5.)

Minor changes to the input and the output section of the four programs are required to route the data to a single exit point.

5.7.8 Multi-program execution on the 3D-Flow simulator

The next step in the methodology of designing a 3D-Flow system is that of verifying the overall approach by means of the execution of the task of pattern recognition, data reduction and channel reduction on several processors by means of the 3D-Flow simulator. (A more detailed description of the simulator is described in Section 5.4.)

This phase of design verification allows the designer to verify the feasibility of the concurrency of the program execution, to determine the global latency time of the system, and to verify all timings for the different input conditions.

5.7.9 Analysis of the results

The analysis of the results can be carried out in a graphic mode by looking at the graphical representation of the output data, as shown in FIG. 51, or by looking at the 'log' file generated by the simulator, which generates ASCII text files with the detailed information regarding timing, value and ID of each processor of the last stage of the 3D-Flow system.

These results are then compared with the results obtained from other simulations executed on other places with other tools (e.g., MODSIM, program written on C++, etc.).

5.8 Key features of the system and method of use thereof 5.8.1 Salient feature of the 3D-Flow system: replacement of several front-end electronic circuits The key feature of the 3D-Flow architecture is the correct balance between processing and communication required in front-end electronics. From the key features of its architecture, one can list a few techniques that can be implemented.

- Exchanging information between processors, making it possible to have concurrently in the whole array all processors with the information of a 3×3, 4×4, or 5×5, etc., area for further calculation after a very short number of steps.
- Routing and buffering data at intermediate stages, from thousands of input channels to a single output channel in a short number of steps.
- Fast signal correlation (in time frames less than 1 $\mu$s) of signals located in positions far apart in the detector layout.

Examples follow on how to implement such techniques with the 3D-Flow system.

5.8.1.1 Example of data exchange (3×3 area)

FIG. 11 shows the manner in which information is exchanged between processors in a 3×3 area.

After seven steps, each processor in the array will have the information of its surrounding eight cells. This will be useful for algorithms of pattern recognition on a certain number of adjacent pixels.

Reference should be made to the Section Microcode summary in order to understand the operations at each instruction.

The center processor receives from its north input port data information from the processor located to the north of the center processor. In like manner, the center processor receives on its east input port data that was output by the east processor on its west output port. The exchange of information between the center processor and the south and west processors occurs in a similar manner. With regard to the northeast, southeast, southwest, and northwest processors (comer processors), the information path is somewhat different. As can be appreciated, the comer processors are not coupled directly via I/O ports to the center processor.

FIG. 11 illustrates the data flow path between a center processor of an array and the corner processors, and the associated clock cycles required by the processor I/O to carry out the data exchange. In clock cycle two, each processor transmits data received from its top input port directly from the detector to the N, E, S, and W output ports for sharing with its four (non-corner) connected neighbor processors. During clock cycle two, the other processors are carrying out the same functions. Since lateral communication requires two clock cycles, only at step 4 will each processor have available the data sent at step 2. In clock cycle four, each processor takes the data from the North port, storing the information into its internal register and sending it to east. Similarly during the same clock cycle, each processor takes the data from the South port, stores the information in its internal register, and sends it to the west. In clock cycle five, each processor takes the data from the East port, stores it in its internal register, and sends it to the south port. Similarly, during the same clock cycle each processor takes the data from the west port, stores the information in its internal register, and sends it to the North port. In clock cycle six, each processor is reading from its west port, northwest corner information and southeast corner information. In clock cycle seven, each processor reads from the North port the North-east corner information and from the south port the South-west corner information. Thus in a total of seven clock cycles the center processor can transmit its data and receive all the data from its eight neighbor processors.

The 3D-Flow code program for the 3×3 routing is shown in Appendix B.

It can be appreciated that to increase the overall of information between neighbor processor speed of this routing technique, it may be accomplished with some modification to the 3D-Flow ASIC. Additional Core and Ring buses to the present 3D-Flow design will allow the simultaneous input of four data value from the four neighbors during the same clock cycle (in the present ASIC two possible input data values can be input from any port in one cycle). Additional Core and Ring buses, together with additional four input/output ports from each processor to the corner neighboring processor will allow the further shortening of the total time to exchange data to/from neighboring elements.

5.8.1.2 Pattern recognition on a 4×4 area

The algorithm for the level-1 trigger requested by the Atlas experiment has an approach different from the other experiments (CMS, D0, CDF, etc. Atlas and CMS experiments are carried out at the Large Hadron Collider at CERN, Geneva, Switzerland, while D0 and CDF experiments are carried out at Fermi National Laboratory at Batavia, U.S.), and the ASICs developed for the other experiments are not suitable.

Implementation of such an algorithm on the 3D-Flow system is straightforward with very few steps and within the latency time allocated for processing the level-1 trigger. The implementation of the system itself is not complex; it is scaleable and it provides a large degree of flexibility for future modifications.

FIG. 12 shows the detector area on which the Atlas level-1 trigger operates to identify good events.

The technique of summing two elements on the two axes and comparing this sum to a threshold is particularly useful for detection of hits between two detector elements.

This algorithm has not been implemented and simulated in detail on the 3D-Flow. However, it can be seen how the complexity of the algorithm can be simply solved from the example of the breakdown of the trigger algorithm in 3D-Flow steps.

Each processor receiving information from the electromagnetic and hadronic detector trigger tower implements the level-1 trigger algorithm criteria. The processor that has received input data from the top port and from the neighboring elements that satisfy the trigger criteria will send the data to the output pyramid, which will route them to the exit point The zero channels that this not pass the trigger criteria conditions will be filtered by the first layer of the pyramid.

The steps to perform on the input data from the detector are the following:

1. Obtain energy value of the hadronic compartment from the calorimeter.
2. Obtain energy value of the electromagnetic compartment from the calorimeter.
3. In order to detect the hits at the border of the calorimeter element, add the electromagnetic energy value to the energy value of the North element and compare it with eight different thresholds. Encode the result of the comparison in 4-bit value. Perform the same operations with the element to the East.
4. Add the hadronic energy value and the energy value of the North element. Do likewise for the element to the East.
5. Check the ratio between the energy found in the hadronic compartment divided by the energy found in the electromagnetic compartment. Compare the result of the two divisions with two sets of eight thresholds, and encode the result of the comparison in two sets of 4-bit each. Among all these comparisons, one would also like to set a criterion. For example, if one of the four results is greater than a threshold, then a flag is set to indicate that it is a possible electron candidate; it is passed on to the part of the algorithm that checks for isolation.
6. Add the energy value received from the electromagnetic and hadronic compartments to obtain the total energy calculation and for the successive operations on transverse energy. Multiply the previous result by a second constant in order to find the "x" component of the transverse energy; multiply it by a third constant to find the "y" component.

Send to the neighboring processors of the same array the values of the local $E_t$, $E_x$, and $E_y$ calculated in the previous steps. Send to the output port (Bottom port of the 3D-Flow) the 4×4-bit encoded value of the comparisons.

5.8.1.3 Example of data exchange (5×5 area)

Several pattern recognition schemes can be implemented with the 3D-Flow system. Each time a different program is loaded into the 3D-Flow processor all necessary information is routed to/from each processor to neighboring processors. In the case of a 5×5 area, 24 neighboring values are routed into each processor. Subsequently, each processor will perform calculations on the 5×5 area having as its center the information received from the sensor.

The interface requirements to the detector are always the same: point-to-point connection from a detector element to a 3D-Flow processor. The processor neighboring interconnection can exchange data for performing pattern recognition on different areas. The user needs only to load a different program each time on the 3D-Flow processor system.

The following scheme was used in case study 2 (iterative calculation) for the computation on a 5×5 pixels area. FIG. 13 shows the name of the neighboring elements.

FIG. 14 shows the steps required to route all 5×5 pixel area information to each processor. Each step shows which pair of data each processor is fetching in the overall 3D-Flow array. The data sending and fetching to/from each processor is accomplished in such a way (described in detail in Appendix C) that each processor is ready to fetch at the specified port of a particular step the data shown in the figure.

Appendix C shows the detail of the simulated program that implements the 5×5 routing.

In order to test the routing part of the algorithm, values from 1 to 25 have been used as input of a 5×5 area of the array.

Next, with the help of the 3D-Flow simulator, each step of the program was executed, and at each step it was verified that each processor was receiving a pair of data from its 24 neighbors. The 3D-Flow simulator helped to verify that after 15 steps of 3D-Flow code, each processor had received the values of its 24 neighbors. During the routing of the data other operations such as multiplication, which carried out the SIREN algorithm (described in more details on Section 5.9.2), were also performed.

After the debugging of the algorithm as described above, using test input data to monitor the program execution in the 3D-Flow parallel-processing system, the experimental data were used as described in Section 5.9.2.

For all details regarding the debugging of the programs on the parallel-processing system, refer to Section 5.4.

5.8.1.4 Example of real time digital filtering

There are several digital filter algorithms in the literature that aim to improve the image quality without the need to increase the amount of input data information.

Examples of practical interfaces to CCD camera or single source devices are described in Sections 5.9.2 and Appendix C.

The 3D-Flow can efficiently execute the filter algorithms not only on data received from its direct input channel of the detector element, but also on data from neighboring elements.

For example, a five-tap Finite Impulse Response (FIR) will input from the Top port of a 3D-Flow processor a value every eight clock cycles (pipelined stages of 3D-Flow processors can input new data every cycle) and will output a result to the bottom with a latency of eight clock cycles. An example of a 3D-Flow code for a five step FIR algorithm follows:

| | |
|---|---|
| 1. FIR: | Receive Input data from Top port; save data on r12; sum1 = in data * r1 |
| 2. | sum1 = sum1 + r2 * r12, r13 = r12 |
| 3. | sum1 = sum1 + r3 * r13, r14 = r13 |
| 4. | sum1 = sum1 + r4 * r14, r15 = r14 |
| 5. | sum1 = sum1 + r5 * r15 |
| 6. | nop |
| 7. | nop |
| 8 | BRA FIR, Output sum1 to the Bottom port. |

Recursive filters can also be efficiently implemented. Infinite Impulse Response (IIR), image contrast increase, etc.

| | |
|---|---|
| 1. IIR: | Receive Input data from Top port, sum1 = in data |
| 2. | sum1 = sum1 + r2 * r12 |
| 3. | r11 = sum1 + r1 * r11 |
| 4. | r12 = r11 |
| 5. | nop |
| 6. | BRA IIR, Output r11 to the Bottom port |

5.8.1.5 Example of reduction from n to one channel (reduction by a factor of 4 in each layer)

The direct synchronization between instructions and I/O ports allows efficient routing of data in an array. It is possible to efficiently route data from n to m channels by a 3D-Flow layout arranged in set layers with a gradual reduction in the number of processors in each successive layer. This arrangement can be visualized as a pyramid, and an example with one output channel is shown in FIG. 15 and FIG. 16. This layout can be used for data routing from several channels to one channel.

It is important to calculate the data rates and make sure that data reduction matches the reduction in the number of channels. Most of the data reduction by zero suppression is accomplished at the first layer of the pyramid, which is attached to the output of the stack of processors that execute the digital filter and pattern recognition algorithm. Each processor in the first layer of the pyramid checks if there is a data at the top port (from the last layer of the 3D-Flow stack that has executed the digital filter and pattern recognition algorithm) and forwards it toward the exit. Only valid information along with their ID and time stamp are forwarded. All zero values that are received are suppressed, thus reducing the amount of data.

Another important point is that all the processors in the pyramidal layer work in the synchronous mode (i.e., instructions are executed independently of data present at the input). The 3D-Flow processors in the stack work in data-driven mode.

FIG. 16 and FIG. 18 show how the channel reduction is achieved for a large array. Each letter indicates the presence of a processor. All processors represented by the same alphabet share the same program. Data in this case flows from 16 processors of one layer to four processors of the next layer in the pyramid. The flow chart of the programs loaded into the processors of the first layer of the pyramid is shown in FIG. 19 and FIG. 20.

All the programs from the second layer until the last layer, which has only four processors, are different from the ones in the first layer because they do not have to insert the time stamp and ID information to the data coming from the top port. They simply have to route valid data to the processor to which it is connected in the next layer. FIG. 21 and FIG. 22 show the flow charts of the programs loaded on all subsequent layers of the pyramid. Appendix B shows the 3D-Flow assembly code that implements the routing.

The overall two-layer pyramid shown in FIG. 16 accomplishes a 4:1 reduction or funneling of the data from sixteen inputs to four outputs in the first layer, and four inputs in the second layer to a single output from the second pyramid layer. Of course, other configurations of processors can be utilized to accomplish many other ratios of digital inputs funneled to a fewer number of digital outputs. In order to identify the data flow in the processor pyramid as described herein, each processor in the base layer is labeled with an uppercase letter or a number, and the processors of the subsequent layers are labeled with lowercase letters. As noted above, each processor of the base layer includes an active top input port for receiving data from a preceding stack layer of processors.

In FIG. 16 data from processors K, P, Q, R, and V in layer n is sent to processor k in layer n+1. Similarly, data from processors L, M, N, S and W goes to 1; from X, T, U, Y and Z to p; and from 2 to q. The data in layer (n+1) are further routed from p, k and 1 to the single output channel at q.

With regard to processor K located in the upper left corner of the base layer in FIG. 16, data is routed to the south port and received via a north input port of processor P. Processor P, in turn, passes data received from both the top input port and its north input port to the west output port, which data is received by way of the east input port of processor Q. In processor Q, data is received on the east input port and the top input port, and transferred via its west output port to the east input port of processor R. Likewise, processor R receives data from its top input port and east input port and transfers data via its south output port to a north input port of processor V. Processor V receives data from its top input port and north input port, and transfers such data to its bottom output port. The data transmitted from the bottom output port of processor V in the base layer is received via the top input port of processor K of the pyramid second layer. As can be seen, the data from the five respective top input ports of processors K, P, Q, R and V are funneled to a single data stream from the bottom output port of processor V of the base layer to the top input port of processor k of the subsequent pyramid layer. In like manner, the five top input ports of processors X, T, U, Y and Z are funneled to a single data stream flow to the top input port of processor p located in the second layer of the pyramid. Similarly, the six top input ports of processors L, M, N, S and W are funneled in a single data flow to the input of the top port of processor L. Lastly, processor 2 of the base layer receives only data from its top input port and bypasses the data to the bottom output port to be received via the top input port of processor q of the subsequent pyramid layer.

With regard to the second pyramid layer of the example shown in FIG. 16 with four processors, data is received from the top input port of processor p and transferred via its north output port to the south input port of processor k. Processor k receives data from its top input port and south input port and transfers such data via its west output port to the east input port of processor 1. Processor 1 receives data from its top input port and east input port and transfers data via its south output port to the north input port of processor q. Lastly, processor q receives data from its top input port and north input port, and transfers data from the pyramid via its bottom output port.

As such, 16 high speed data inputs of the base layer have been funneled to a single data output in the apex processor q. Importantly, each processor of the pyramid is preferably of the same type, and the programs thereof differ only in regard to the exchange of data between the various input and output ports. However, although there are twenty processors in the pyramid of FIG. 16, eighteen different routing programs or algorithms are not necessary. Further, in the example of FIG. 16, the processors of the pyramid preferably do not process data words internally, but rather only funnel the data words unchanged from one or more inputs to a single output. Besides routing the data from several input channels to fewer output channels, each processor in the pyramid has 1K bytes of memory that can be used during the data flow through the pyramid to buffer high bursts of data for a short period of time or in case there is a concentration of input data in a restricted area The number of programs required for the routing of the data can be minimized in the following manner. In FIG. 16, the processors can be grouped on the basis of similar input/output data transfer functions. Thus the processors U, R and N, that have the same configuration with respect to their data transfer functions (each receiver receives data from top input port and an east input port and transfers data to the south output port) could be grouped together and only one routing program could be used for each of the processors. Likewise V, W and P, Y could form two more groups. Following the above grouping technique, it is seen that only 11 programs are required for 16 processors of the base layer of the pyramid. It is shown later that the number of different routing algorithms needed in this type of architecture is independent of the number of processors in a base layer. The maximum number of different data-routing algorithms is four.

It should also be noted that various of the processors in the pyramid can receive data at two input ports in coincidence; thus, buffering of the data internal to the processor is required so that the data from both inputs can be pipelined and transferred to an output port of the processor.

It is also important to realize that because of the repetitive nature of the high-speed inputs, the groups of data must not be mingled together and thus lose their time relationship. However, because each processor in the first layer of the stack transmits and receives data information with respect to its neighbor processors, the time information of the data can be lost unless additional measures are taken. To that end, when the processors in the first layer of the stack in FIG. 16 receive the "value" information representative of amplitude, intensity, energy, etc., the data words thereof are appended with a time identity, e.g., "a time tag". Thus, as the value data words are processed and transferred through the stack, the time information appended thereto follows each data word. In this manner, each data word input into the stack maintains its time relationship information by virtue of the appended time tag. The time tag comprises an additional 16-bit word associated with the 16-bit value word input into the processor stack by the element detecting a response input. The time tag is obtained from the timer shown in FIG. 56. It is not necessary that the time tag comprise an entire additional word. Rather, depending upon the number of bits in the value word and the number of separate sensing elements utilized, the time tag can often simply be additional bits that form a part of the value word. Such bits of the single value word would be set aside for indicating the position of the sensor.

After the value data, together with the appended time word, is transferred from the processor stack to the processor pyramid, it can be seen that the data is routed laterally between numerous processors in the same pyramid layer. Accordingly, this routing pattern destroys the position information inherent in the data word processed through the stack. As a result, each processor in the base layer of the pyramid appends yet another tag to the value word when received via the top input port. Each processor in the base layer of the pyramid appends a position identification tag, e.g., an ID tag, to each value word received from the stack, via its top input port. Thereafter, even though the value word is routed between various processors in the same pyramid layer, the position information, or ID tag, follows both the value word and the time parameter throughout the processor pyramid. From the foregoing, for each value word input to the processor stack, three words are output in a sequence from the apex processor of the pyramid, namely a time word, then a value word, and lastly a position identification word.

FIG. 18 illustrates the base layer of a processor pyramid. In the upper left corner of the base layer, the sixteen processors are identified with corresponding programs in a manner substantially identical to that shown in the base layer of the two-layer processor pyramid of FIG. 16. Further, the particular pattern of programs of each of the sixteen processors is repeated throughout the entire base layer. Although each processor is labeled as having a different program many of the routing programs of the sixteen processors are identical in that some processors input data from only an east input port and a top input port, and output data only via a south output port. The processors N, R and U are examples where the identical routing algorithm is stored therein. As noted above, at most eleven different routing programs are required for the sixteen processors. The data routing programs of the second layer of the processor pyramid are shown in FIG. 17, and FIG. 18. As can be seen, there is one-fourth the number of processors in FIG. 18 compared to base layer 5 of FIG. 17. The locations in the second layer not having processors are shown with a "+". Much like the data flow described above in connection with FIG. 16, the data flow in all of the layers of the processor pyramid of the preferred embodiment shown in FIG. 16 flow toward a southeast direction, where a processor outputs the routed data via a bottom output port to the subsequent pyramid layer. Moreover, the data is routed in the second layer (FIG. 18) of a quadrant toward the v, w, z and @ processor chip. The apex of the processor pyramid is one of the processors because an integrated circuit chip cannot be cut into four individual processors; the least common denominator in the preferred embodiment includes four processors, which is a single integrated circuit chip. As can be seen from FIG. 15, the same basic chips and printed circuit boards, one accommodating four ASICs and the other only one, are generally required for a physical or mechanical realization of the processor pyramid.

FIG. 15 illustrates an exploded view of the printed circuit boards of the processor pyramid removed from the bottom layer of a four-layer processor stack. The base layer of the three layer pyramid is fully populated with ASIC processor chips, again each having four processors. Shown also is the flexible cabling that extends between the various 1/O ports of a processor and its neighboring processors of the layer. The intermediate pyramid layer is shown to have one-fourth the number of processor chips as the base layer. The subsequent layer has one-fourth the number of processors as the intermediate layer, while the apex layer of the pyramid is not shown. Each printed circuit board of each pyramid layer is the same size, the only difference being the number of processor chips utilized therein and the length of the cabling between the neighboring processors. The broken vertical lines of FIG. 15 illustrate the interconnection between the layers to connect the top input and bottom output ports of the respective processors.

FIG. 19, FIG. 20, FIG. 21, and FIG. 22, are software flowcharts of the various routing algorithms required for routing or funneling data through a processor pyramid, according to the particular processor of the pyramid identified therewith. With reference to FIG. 20, the general software operation depicted therein applies to the pyramid base layer processors identified as K, L, X and 2. It should be noted at the outset that each processor of the pyramid base layer includes a register file that stores a different ID tag for each processor, depending upon its relative X, Y coordinate position in the base layer. The ID tag in the base layer of the pyramid processor is much like the storage of the time tag in the processors of the first level of the processor stack. The flowchart of FIG. 20 and FIG. 19 assume that each processor of the pyramid has been initiated by the host computer with the appropriate ID tag stored in the register file. The operations of the flowchart are synchronous rather than data-driven, whereby the respective input ports of the processors are systematically polled, and data appearing thereon is transferred according to the programmed algorithm. In the program flow block diagram of FIG. 20, the processor polls the top input port to determine if a data word is present. Processing then proceeds to the decision block where it is determined whether there is data present at the top input port. If no data is present, processing branches back to the input of program flow block. If data is present at the top input port, the processor proceeds to the program flow block, where the ID tag is obtained from the register file and sent as a word to the out-port. As noted above with regard to processor K, the out-port is the south output port, whereas in processors L, X and 2, the out-ports are respectively the east, north and bottom ports. Next, the processor obtains the "time-stamp" tag word from the top input port thereof and forwards such word to the out-port. As noted above, the first word delivered to the base layer of the pyramid from the processor stack is a time parameter word, followed by a value word.

According to the next program flow block of FIG. 20, the processor sends the value word, or "top-data", from the top input port and transfers it to the out-port. From the process flow, the processors K, L, X and 2 send out three words from the out-port in the following sequence: first word—ID word; second word—time word; and third word—value word (top-data). After sending the three words via the out-port, the processor returns to the beginning of the routing to repeat the algorithm and transfer another value word and its associate ID and time words. The entire software code for carrying out the routing algorithm of FIG. 20 includes only five instructions, as set forth below:

```
/* Line 8 DATA:    ST_A1_T
/* Step 1
/* Line 9              BrccSET#1#1DATA
/* Step 2
/* Line 10         N = r12
/* Step 3
/* Line 11         N = T
/* Step 4
/* Line 11             BRA DATA, N = A11o
/* Step 5
```

Appendix B illustrates the 96-bit instruction words for carrying out the various software instructions noted above, along with the microcode that controls the various processor internal units that are enabled to carry out the instructions. Each instruction requires only one clock cycle, and for a 200 MHz processor, only 25 ns is required to complete the entire flow chart functions of FIG. 20 in moving a data word and its word tags to an output port and making it available to a neighbor processor.

The software flowchart of FIG. 19 illustrates the routing algorithm of a processor receiving data from a top input port and a side port, and transmits data via a bottom output port and a side output port.

The processors and the specific input/output port designations are shown in FIG. 16. For example, processors M and Q carry out the software routine, where the side input port is the west port and the output port is the east port.

The processor (such as M) carries out the algorithm of FIG. 19 by obtaining data from both the top port and the side in-port, as noted in the program flow block diagram. The processor then branches to the decision block, where it is determined whether data is then present from a side input port. If not, processing branches to another decision block, where it is determined whether data is present at the top input port. If the determination of the decision block is negative, processing returns to the start of the routing algorithm. If data is present from the top input port, processing branches from the decision block to the block where the ID tag is obtained from the register file and sent as a word to the out-port. Then, the time-stamp word is obtained from the top input port and sent to the out-port. Next, the top-data word is obtained and sent to the out-port, whereupon processing branches to the start of the data-routing algorithm.

With regard to an affirmative decision from the decision block where data is present at the side in-port, processing branches to the block where data received from the side in-port is bypassed to the out-port. Next, data is bypassed from the side in-port to the out-port, which is repeated in the program flow block diagram. The decision block is then encountered, where it is determined whether data is present at the top-port. The decision block and the program flow blocks are substantially similar as those described above, and thus operate in the same manner.

From the flowchart of FIG. 19, note that data of a base layer pyramid is received from two input ports and delivered to two output ports.

FIG. 21, and FIG. 22 illustrate the routing algorithms of processors associated with subsequent layers of the pyramid. As can be seen from the flowcharts in FIG. 21, and FIG. 22, the subsequent layers of a pyramid do not require ID stamping of a data word, as the base layer of the pyramid has already accomplished such spatial identification stamping. Stated another way, by the time the data words reach the pyramid layer subsequent to the base layer, each data word already has associated with it an ID tag and a time tag. The major functions of the processors carrying out the routing algorithms of FIG. 21, and FIG. 22, primarily determine if data is present at one or more of the input ports, and thereafter bypass the data to an output port.

Appendix B illustrates the processor instructions and the corresponding microcode and associated processor unit that carries out the functions of the flowchart of FIG. 22. In this instance, data is received from both a top port and a side port (N, E, S, W) and is transferred to the outport.

5.8.1.6 Example of detecting particles on opposite sides of the detector that are far apart and correlating them using multiple stacks and pyramidal structures The 3D-Flow system is particular suitable in applications where it is necessary to identify particular patterns (particles in HEP, objects in commercial applications) that are far apart in the detector position and to correlate them in a very short time.

Several such applications exist in different fields. The applications are: Positron Emission Tomography in medical applications (Section 5.9.1), and track finding (Section 5.9.3). Other useful applications are those typically solved at the second-level trigger in HEP to find and correlate the region of interest (ROI) in a short time.

The approach to solve this problem with the 3D-Flow system is simple and makes use of the techniques described above.

The user can implement a combination of stacks of layers of processors with a set of pyramidal structures. Depending on the reduction factor needed in data reduction and channel reduction, the user can build a first stack of processors working in data-driven mode, followed by a first pyramidal structure that routes the data that passed the first algorithm cut executed in the first processor stack. In case a single processor cannot handle the data rate as a result of the first algorithm cut, a second stack of processors is used to implement a further algorithm cut. The alternate stages can be repeated until the reduced data can be sorted by time stamp at the exit point of the pyramid. The time stamp is the information that allows to identify a set of input data. It is added by the processor at the time is receiving input data and is carried on during all routing through the processors stack and pyramid. The ID is the information that allow to identify the geographical position of a processor (corresponding to a sensor element). It is added to the valid data by the first layer of the pyramid as it is explained in the section describing the pyramid.

At the end of the process and of the routing, each processor (which may be a single or still a few processors) having the data of a given time stamp executes the criteria correlation algorithm among the data and finds the matching ones.

5.8.2 Use of key features in different applications

There is a vast field of applications of these key features that can solve the problems not solvable by commercially available processors or DSPs.

The modularity and flexibility of the system can be applied to small and large systems requiring different performance in speed and algorithm complexity.

The right side of FIG. 23 shows the path of partial data (typically from a calorimeter and/or muon subdetector) digitized at lower resolution and sent to the trigger system. The handling of the event data (DAQ) is also represented schematically, and two possible ways of handling the inputs from the detector are also indicated. For high-to-medium occupancy detectors, the first buffer operates in a synchronous mode, and it records for each event the whole data information from a fixed number of input channels. When dealing with very-low-occupancy detectors instead, it is possible in principle to perform zero-suppression and address encoding "on the fly," as accomplished by the first buffer operating in asynchronous mode. These two modes of operation are described in more detail in the following.

Nevertheless it is important to realize how intrinsic flexibility and programmability of the 3D-Flow system allow one to choose the appropriate mode of data handling according to the requirements of any specific experiment and/or detector. Using existing approaches will not lead to any solution, no matter how one would use a large number of workstations or a parallel-processing computer, because the speed requirements cannot be met. The high input data handling rate is derived not just from the processor clock speed, but from the processor, overall system architecture, and interconnection scheme, which combines data-processing and data-moving operations.

A key technical barrier that this system overcomes is the ability to sustain a high input data rate even though the algorithm execution time is longer than the time interval between two consecutive input data. This is possible through the design of a processor capable of being pipelined with other such processors, so that data distribution within the system and the routing of results is very efficient, giving the system the ability to sustain such speed. Flexibility and programmability provide a cost-effective solution that will eliminate the need to develop different ASICs for different applications and for different experiments.

5.8.2.1 Implementation of the synchronous first-stage buffer with 3D-Flow

The synchronous (to the particle bunch crossing in HEP, or to the trigger clock of external sensors in other applications) first-stage buffer can be implemented with the 3D-Flow processor by using its internal "data memory" and by writing a short, four-line program loop to handle the "read and write pointers."

At each particle bunch crossing in a collider, new data from the detector is written to the "top" port of the processor (the fixed number of data, in a fixed sequence, that are transmitted synchronously with the bunch crossing, allowing the user to identify each channel without the need to transmit its address.)

The accept/reject information arriving from the trigger system is sent to the processor "North" port. If the data from the "North" port (trigger "Accept") is not zero, then the data value that was recorded "x" cycles before will be sent out (the offset from write-to-read data is programmable by the user); if the data from the "North" port is zero, then the next data will be input without being read.

The flexibility of the architecture in the described first layer of processors propagates directly into the second, asynchronous layer, where a large number of input channels is funneled into a single chip (FIG. 24).

The overall consideration is that by using the 3D-Flow chip in the appropriate way to fit each application, one has the same advantages of programmability, flexibility, modularity, and short cable connection, thereby providing high-speed communication throughout the entire DAQ system. Such advantages include all benefits of easier maintainability of a single component, board development system, etc., with the possibility of optimizing the cost for each application.

5.8.2.2 Implementation of the asynchronous first-stage buffer with 3D-Flow

The asynchronous buffering mode at the first stage is exploited to store data coming from the very-low-occupancy detectors, where for each datum it is also possible to encode the address. To implement this buffer, more functionality of the processor is used. For implementation of the asynchronous buffer, the 3D-Flow chip operates in synchronous mode, as described in Section 5.3.4.2, and the program residing on each processor polls the input ports.

Each processor is connected through the "West" and "East" ports to the neighboring processors to form a linear array. The data memory will be organized in "banks." Data received from the "top," "West," and "East" ports with their respective addresses will be stored in the corresponding "bank." The "North" port of each processor is connected to the trigger accept/reject. In the case of a lot of interaction on a very-low-occupancy detector in a specific region, causing the generation of many hits in a small area, one 3D-Flow processor may run out of available "banks". In this case the program in each processor will forward the data to a neighboring processor with lower occupancy and with some free "banks." When a specific trigger is received from the "North" port, the processor will output data of the corresponding "bank." (See FIG. 23.)

5.8.2.3 Second-stage DAQ buffer (asynchronous with channel reduction)

The second buffer is also implemented with 3D-Flow processors. This makes better use of the high communication speed of the processor. Data from the previous two first-stage buffers are received as input to this asynchronous second-stage buffer. In this stage, besides reducing the number of channels, the 3D-Flow functionality provides the physicist with a tool to apply filters on the data, such as zero suppression. As an example of the performance of the 3D-Flow architecture, the simulation of 4096 channels with fragmented event data for a partial event builder scheme is described in the next section.

5.8.2.4 Simulation of a 4096-channel event builder scheme with 3D-Flow

The evolution of event builders in recent years has been from a simple, single-channel funneling to a computer to a group of parallel channels (each with its own funneling and output speed limitation) sending data to a group of computers. This change of scheme is due to the increase in the rate and size of accepted events, which has gone beyond what technology can offer in single-line speed transmission.

A 3D-Flow pyramid array tests the funneling of a large number of input channels to one 3D-Flow output chip. This scheme was then simulated for 4096 input channels or 3D-Flow input processors. A system reflecting the real communication connections and assembly requires one to consider that each 3D-Flow chip has four processors and that the suggested assembly for the most efficient interconnectivity is a stack of matrices with a diminishing number of processors and boards in each successive layer (see FIG. 15)

In summary, the DAQ application has the following characteristics:

- The first buffer (circular synchronous type that retains the history of the events) has a capacity of 4 Mbytes distributed on 4096 processors.
- The second buffer used to de-randomize the data has a capacity of 5.5 Mbytes to handle a high event rate at the input. This second buffer is asynchronous.
- The flow of the data is regulated by the data-driven principle, and the data-dependency on input and on output has shown in this simulation that no data was lost and that it took 3079 3D-Flow cycles to transfer 4096 parallel input 16-bit data in serial into one chip.
- The maximum throughput of a single 3D-Flow chip at the output "Bottom" port is 1.6 Gbyte/s for a 200-MHz chip. In more general terms, the delay of two cycles between boards and the program execution of the data routing in the pyramid require three cycles for each input data.

5.8.2.5 Performance consideration for large and small systems

The simulated module described above gives the results in number of 3D-Flow cycles. It is acknowledged that for what concerns the interconnection of chips, the layout of the entire system as proposed in report SSCL-445 and built for 1280 channels can easily sustain any version of the 3D-Flow chip up to 500 MHz without major problems. The performance of the system at different clock frequencies, provide the results of the simulation in Table 5-20.

TABLE 5-20

Simulation Results

| 3D-Flow chip clock | Input channels/ modules (1) | Input data rate | Output data rate of last 3D-Flow chip in the pyramid |
|---|---|---|---|
| 40 MHz | 16K ch | 3.2 KHz | 106 MByte/s |
| 40 MHz | 4K ch | 12.9 KHz | 106 MByte/s |
| 200 MHz | 16K ch | 16 KHz | 533 MByte/s |
| 200 MHz | 4K ch | 64 KHz | 533 MByte/s |

(1) channel = 16 bit, module = 4K or 16K channels.

Interpretation of the results obtained from the simulation shows that the 3D-Flow architecture may be applied to small as well as to large experiments. Table 5-20 demonstrates that for most of the experiments (from present to LHC-type) the output rate of the Level-1 trigger is in the range of 3–64 KHz (used as the input data rate to the funneling of a large number of parallel input channels to one 3D-Flow chip). The correct use of the 3D-Flow chip in order to obtain the best price/performance ratio is to find the right compromise for each application between the module input data rate desired and the use of the internal memory of the 3D-Flow chip as buffer.

5.9 Applications 5.9.1 PET/SPECT

Unlike Magnetic Resonance Imaging (MRI) and Computerized Tomography (CT), Positron Emission Tomography (PET) and Single Photon Emission Tomography (SPECT) measure and image functional, biological, and metabolic processes.

Because PET offers greater specificity than other imaging techniques, it can reduce or eliminate the need for additional tests or invasive procedures.

The fields of applications include:

Oncology

Tumor Metabolic Imaging: PET images primary tumors and metastatic disease. For example, auxiliary lymph node involvement in breast tumors, solitary pulmonary nodules, and other tumors may be quickly identified. Recurrent Tumor Imaging: PET imaging enables the user to distinguish between new tumor growth and scar tissue, allowing greater accuracy when follow-up imaging of colorectal or ovarian cancer is indicated. Monitoring Tumor Therapy: Researchers have shown PET imaging to be beneficial in determining therapy response.

Neurology

Epilepsy Detection: Identifying and localizing epileptic foci.

Alzheimer's, Dementia and motor disorders: The improved differential assessment of Alzheimer's from infarct dementia as well as other motor disorders such as Huntington's and Parkinson's disease offers the accuracy necessary for efficient and correct diagnosis.

Stroke assessment: The ability to provide data to assist in evaluating tissue viability in stroke patients empowers the user to prescribe specific treatments or therapy with confidence.

Cardiology

Coronary Artery disease (CAD) Detection: Early detection and therapeutic follow-up of CAD provides clinicians with superior accuracy in quantitative myocardial flow or perfusion imaging.

Myocardial Viability Assessment: Determination of myocardial viability enables appropriate and cost-effective decisions associated with therapeutic alternatives.

The transaction of PET/SPECT[36-37-38-39] from research to clinical setting presents new challenges. Consistent image quality, ease of use, patient throughput, reliability, and data management all affect the bottom line: clinical value.

5.9.1.1 Problem definition

To design an imaging PET/SPECT system that can work in PET mode and SPECT mode. The SPECT system has to distinguish between interactions that occur at a given short time interval and with given characteristics. The PET system has to detect two interactions in the detector, in a given short time, that had an origin in the body under investigation with emissions in opposed directions. The system should recognize scattering from primary interactions and should be suitable for different types of detectors (e.g., planar, cylindrical, etc.).

The above definition could be alternatively stated as "Given 512 signals acquired every 10 ns from phototubes, find the expected interaction in PET/SPECT mode that satisfies the algorithm criteria described in the specifications. (More than one algorithm should be satisfied. Apart from those presently available, the system should show flexibility to accommodate further changes in input data rate, algorithm, and maximum channel occupancy.) The system should be capable of sustaining an input data rate of 40 MHz and providing a channel reduction from thousands to four (or even one) and a data reduction of 10 to 100."

5.9.1.2 Analysis of bandwidth, data rates, channel occupancy, channel reduction, and data rejections at different algorithmic stages Several PET/SPECT systems commercially available have been analyzed. Different detector "design" approaches have the primary objective of cutting cost. Some of them have a rotating head that image 19 inches of the human body at scan time, while others have a static ring of phototubes that 6 inches of the human body at a time.

Most of the commercially available detectors can be expressed in terms of a small barrel of sensors (photomultipliers). This barrel, similar to the calorimeters used in high energy physics, could be reduced to a 2D representation (by unrolling the barrel) of sensor elements, as shown in FIG. 25. An electronic assembly similar to the layout of the PET detector elements is also possible, as shown in FIG. 9.

It is known from experiments and the Monte Carlo simulation that in the SPECT mode one will have one or two primary interactions (and a few secondary interactions) in the entire detector within a time window of approximately 10 ns, while in the PET mode one expects to have two contemporaneous interactions in opposite locations of the detector. Also in the latter case, not more than one or two pairs of interactions are expected every 10 ns.

The task to be accomplished by the front-end electronics for this experiment includes identifying the valid event in SPECT and PET mode at a rate of 40–100 MHz and reducing the data from thousands to one (or two in PET mode) primary interaction hit candidates along with the hits of the scattering. Not only must the data rate be reduced but also the channels, from thousands to one. This problem can be solved very efficiently by the 3D-Flow system. As seen in other high energy physics applications, a topology can be built such that in a stack of the 3D-Flow system the first array of the stack (see FIG. 25) receives information that is relative to a small area of the detector into each processor.

The processing relative to the pattern recognition and digital filtering of a single channel or among neighboring channels is accomplished by each of the 3D-Flow processors by means of its I/O ports in stack 1.

The correlation of hits far apart in space in the detector (e.g. typical in PET mode) are made in stack 2 at the exit of pyramid 1 among the data received with the same time stamp or ±1 time difference.

This front-end 3D-Flow system enables detection of particles with a programmable algorithm. It is suitable for each operation mode (PET, SPECT, etc.) and the valid interaction in real-time, which allows further calculation to make the back projection and to display in real-time the effect of the radiation injected into the patient to visualize functional, biological and metabolic processes.

The advantage of the 3D-Flow system over the present commercially available systems is that it can sustain and detect with zero dead-time the maximum photon emission. This provides better quality images. In addition, since all possible interactions are acquired, the radiation dose to the patient could be lowered, as very few of the emitted photons are lost.

An alternative to having on-line, real-time particle identification is to have a large memory where one can fill the acquired data and do the processing and filtering at a later time. The drawback of this approach is that the memory has a high cost. When the memory buffer is full, the system must introduce dead time (while the radiation in the patient continues and is lost) to move the data from the memory to hard drive data storage system. Furthermore, the physician is not able to monitor in real-time the functional, biological, and metabolic process and thus cannot intervene on the trigger of the system, which would allow him to select certain details of interest.

FIG. 25 shows the layout of the 3D-Flow system interfaced to a detector with the function of the different stages.

5.9.1.3 Design of 3D-Flow system based on results of analysis of problem

In the PET technology, an enclosure equipped with sensors into which a patient can be placed is provided. By injecting the patient with a radioactive material that emits positrons, the sensors can detect such emissions and provide corresponding signals to circuits that convert analog signals to digital signals. The digital signals are applied to a first layer of a processor stack. The energy sensors, which may range in number up to 1,000–8,000, can detect the emissions from the patient, and thus must be processed cyclically to determine if radiation is sensed and to determine the source of the radiation. Each sensor can carry its signal via an electrical or optical signal. Each electrical conductor or optical fiber of a sensor element is associated with a top input port of a processor in the first layer of a stack. Thus, the position of the sensor and of the processor with respect to a patient is unique for each sensor/processor combination.

In the example, a processor stack architecture can be advantageously utilized operating, for example, at 10 nanosecond clock cycles. In other words, every 10 nanosecond there is a "picture" captured of the entire sensor surface with regard to whether or not each sensor has sensed radiation from the patient. There may be a true detection of radiation one time for every 100 pictures, with the other detection being processed to determine that noise was the cause thereof. The algorithm programmed into the stack processors can process the data to eliminate noise, the remainder being true detection of radiation emissions from the patient. Because the algorithm for separating the noise from the true events is more likely to be longer than 10 nanosecond, certain data will be bypassed by the first layer of processors in the stack to be processed in the second or subsequent layers in the manner discussed above. Further, a base processor layer of a pyramid can receive the parallel-processed data and funnel such data to an apex processor. Thereafter, further processing can be carried out to determine the exact coordinates or spatial location of the sensor elements detecting radiation. The post processing of the data can include processing to determine if each individual radiation detection includes a corresponding radiation detection located about 180° from the source of emission. In other words, a source of emission will generate emissions in many directions that when sensed by the sensors can be processed to determine the exact source of the radiation. If there is a correlation between the many sensors indicating a source of emission, then such data is saved and the results further transferred for providing (after back projection calculation) a visual display, or the like. After a number of sources of radiation have been identified, the location thereof can be displayed so as to enable visual inspection of the same. In the example, if a radioactive material is injected into a patient's bloodstream, energy will radiate therefrom and be detected by the sensors surrounding the patient. By processing the location of the sensed radiation, the venal system of the patient can be visually displayed in real time. Further, emissions from cancer cells and the like, which provide unique emissions, can also be detected for providing a visual image of cancerous portions of a patient.

When using the SPECT technique, an enclosure with sensors can be utilized to sense light signals emitted from the patient. However, in this instance, the number of photon detection has to be correlated to ascertain whether a true photon path has been detected. In other words, a photon emitted from the patient hitting the sensor surface will be deflected (compton-scattered) based upon the angle of incidence, and will strike the detector surface at a second location to again be deflected, and so on. At each photon deflection, some energy is lost, and thus subsequent detection of the photon should result in reduced energies.

By processing the photon hits on the inside surface of the detector, correlation can be made to determine if the angle of deflections and the corresponding deflection reduction in energies result in the possibility of a single photon path so that primary interactions can be distinguished from scattered. As can be appreciated, each photon hit has to be processed with regard to other hits to determine the energy levels and the corresponding deflection angles to form an association between them. Again, in such an application the number of hits is not substantial; there may be 6–8 hits, of which 2–3 of result in true photon paths in a time interval of 10–20 ns. Once a photon path is identified, its origin can also be equated and thus the identity or location of the patient tissue determined.

From the foregoing, an extremely simplified and high-speed technique has been described for carrying out a first phase processing with a first processor stack and a second stage processing with a second processor stack. Use of a funneling pyramid between the stacks provides a significant advancement in the art. Moreover, and as noted above, both the processor stacks and the processor pyramids are easily constructed using the same type of processor, thereby economizing on hardware. Each processor in the various layers of the stacks employs the same algorithm, and algorithmic efficiency is also achieved in the pyramids, whereby the flexibility of the processing architecture is facilitated.

5.9.2 Iterative search algorithm 5.9.2.1 Problem definition

To recognize valid photon events using a morphological analysis of the signals of an intensified CCD in the photon counting mode. The analysis consists of calculating the coordinates of a matrix corresponding to the exact position of each incident photon on the channel plate. Several off-line calculations with efficiency studies to find the best algorithm for event reconstruction.

5.9.2.2 Description of the detector and read outsystem

This effort relates to the PHOCA (PHOton Counting Array) project for space- and ground-based scientific applications in the soft x-ray to UV spectral domains. The basic PHOCA component (see FIG. 26) is an intensified detector system consisting of a high-gain electron multiplier based on Micro Channel Plates (MCPs), a readout system based on a rapid-scanned CCD camera, and associated electronics for real-time event identification and recording.

The key features of the system are:

- a specialized design of the intensifier head to obtain very high spatial resolution and dynamic range;
- an "intelligent" CCD sequencer for fast windowed readout of the matrix, thus allowing high count rate operation;
- fast event identification and centroiding electronics based on programmable, real-time architectures providing a great flexibility in adapting the performance to higher and higher counting rates and allowing implementation of sophisticated centroiding algorithms;
- full modularity, to allow independent testing and modification of each subsystem. This presents a major advantage in developing further advances of the system;

Incident radiation, or particles, impinge on a photocathode material deposited directly onto the front MCP face; photoelectrons emitted into the channels (each channel acts as an independent, continuous-dynode photomultiplier) result in an electron cloud at the MCP output face. The electron cloud is accelerated across a proximity gap onto a phosphor screen coated with a thin conductive layer. The electrons penetrate the conductive layer and reach the phosphor, causing the emission of photons that are channeled out of the device by a fiber optic (FO) faceplate onto which the phosphor has been deposited. An FO coupler directs the light onto a CCD, which provides a digitized image of the detected signals spread over a rather well-defined pixel area. The digital electronic unit recognizes valid photon events by a morphological analysis of the whole CCD frame, determines individual centroids to sub-pixel accuracy, and stores them in a high-resolution memory. This process has to be accomplished in real time, according to the input rate determined by CCD pixel readout. Each photon event has approximately a Gaussian profile and covers an area of 5×5 pixels. Only those 5×5 CCD areas having the requested energy and the requested Gaussian distribution of pixels are to be recognized as good events. All the others, spurious or noise events, are to be rejected. Because of the strict temporal requirements and the need to cover even higher readout speed and/or larger CCD format, we designed an ad hoc computational system to be interfaced with the CCD readout system. In particular, to satisfy the requirements of fast and robust morphological analysis of signals, we chose neural networks that provide intrinsic parallelism well-suited to the specific problem being studied. The SIgnal REcognition Network (SIREN) is the feedback neural network we designed for this purpose. SIREN was proved to perform a more efficient event identification with respect to other methods. It is more efficient than, for instance, a best-fit algorithm, both in terms of result quality and real-time speed performance.[40]

In this section we present an implementation of SIREN on the 3D-Flow system. Such a system allows real time event recognition and centroid calculation as soon as the photons arrive at the MCP. Moreover, it is easily upgradeable and scalable to handle information in real-time, delivered by cameras up to 2000 frames/sec (or even higher when such devices become available).

Two systems for CCD cameras at different resolution and speeds are described, providing the user with an idea of how each of them will affect the size (and thus the cost) of the 3D-Flow system. The first system is for a CCD camera with a single output and with a resolution of 256×512 pixels (8-bit resolution) at the rate of 200 frames/sec. The other is for a CCD camera HDL512ZIF002[41] at the rate of 1000 frames/sec, a 16-video port, with a 512×512 pixel device organized in 16 cameras with 15×15 mm 64(H)×256(V) active pixels.

5.9.2.3 Algorithm description: Signal REcognition Network (SIREN) (Detail 1)

SIREN is the neural network designed for the morphological analysis of photon events.[40] Its features, relevant to the fulfillment of the PHOCA project requirements, are:

- Determinism of the acceptance/rejection process: the domains of accepted and rejected events are disjoint, i.e., no event may be both accepted and rejected;
- Quality of results: the percentage of identification error (bad event acceptance) and/or good event rejection, derived from simulation, is negligible, even in the case of very critical input patterns;
- Robustness: algorithms deal with all the possible signal configurations and show adequate treatment of both accepted and rejected signals. This prevents failures or anomalous conditions from halting system operation;
- Flexibility: by employing adequate learning algorithms, the network can be trained to recognize different kinds of signals;
- High performance: the system shows good capabilities of processing large amounts of data, due to its intrinsic parallelism;
- Real time: the number of operations performed, i.e., the acceptance (rejection) time, is independent of the event complexity. This makes it possible to fulfill the temporal constraints of the experiment. For the category of signals being considered, it has been experimentally determined that recognition can be achieved in seven cycles of dynamics.

The central idea of SIREN is that event recognition can be accomplished by applying selective criteria based on recursively refining the input signals around an optimal pattern. Signals closely resembling the optimal pattern are successively transformed to fit it. All other values are flattened to zero. The network is provided with adequate storage support (registers) to preserve the original event information, which is fundamental for later centroiding calculation. Thus, recognition can be accomplished first by filtering signals and then by delivering only those signals corresponding to non-flattened events.

SIREN is a feedback network whose neurons correspond to the pixels of the CCD frame; all neurons work at a time and their state (which coincides with the output) is both communicated to the connected neurons and fed back to the neurons themselves. The network is synchronous, meaning that neurons work simultaneously on stable input data. The neuron model adopted is based on integer 8-bit values mathematics with a sigmoidal function represented by a linear discrete function ranging from 0 to 255 (see 5.9.2.4). This approximation has proven adequate for the class of signal recognition problems considered.

SIREN is based on a regular scheme of inter-connections of 5×5 neurons, each neuron is viewed as the central pixel of a 5×5 area and is connected to the other 24 in the neighborhood and to itself (see FIG. 27). This is due to the confinement to a 5×5 pixel area of events to be recognized. This scheme can be repeated for all the pixels in the CCD frame. Due to intrinsic symmetries of the problem, the number of independent weights associated with each neuron reduces from 25 to 6. This greatly speeds up both the network learning phase and the recognition task, as the number of parameters, and thus the number of operations in the network dynamic equation, decreases by a factor of 4. For a more detailed description see the reference for SIREN[40], which is incorporated herein by reference.

The 3D-Flow system on which the SIREN topology has been implemented allows the retention of input signals corresponding to non-flattened events and output for further, off-line analysis, together with their filtered data. The specific topology and algorithm required by this application find their efficient implementation when mapped onto the 3D-Flow system. In such a system, all characteristics required by this application (high-speed communication between neighboring elements, feedback network and feedback to the same element, high-speed multiply-accumulate operations executed concurrently to the moving operation) are part of the intrinsic features of the 3D-Flow system as described in this report.

In most cases, when an algorithm designer has to translate a fast real-time algorithm into electronics and the performance involved is very high-speed, he is forced to select only one algorithm and to translate that into electronics to satisfy the requirements with the current technology. Thus the designer has to tailor a specific electronic device to a specific problem. The disadvantage is that if changes to the algorithm are needed, or the size, or the speed of the system, the entire circuit also require changes. In the present case, however, by mapping the SIREN algorithm and topology onto the 3D-Flow system, the designer has the flexibility to (1) change the algorithm in the future, (2) change the size and speed of the application, allowing straightforward expandability, and (3) use a device that is tailored to solve other problems as well, thus gaining the advantage of using common, less costly hardware. Furthermore, the programmability and scalability allow reuse of the hardware for other experiments.

5.9.2.4 Algorithm description (Detail 2)

The event recognition algorithm operates on a modular feedback neural network in which each elementary module is composed of, for example, 25 elements. A 3D-Flow processor in the 3D-Flow parallel-processing system has been associated with each neuron.

The operations performed simultaneously on each 5×5 pixel area in a frame are the following:

1.

$$\sum_{j=1}^{25} w_{ij} s_j(t),\ i = 1, 2, \ldots 25,$$

where $S_j(t)$ is the state of the i-th neuron at time t, and $W=[w_{ij}: 1 \leqq ij \leqq 25]$ is the weight vector of 25 elements, of which only 6 are independent. The sum of products is performed by fast integer operations in the domain of 16-bit maximum.

2. Sigmoidal function calculation. Given $$x = \sum_{j=1}^{25} w_{ij} s_j(t) - \theta,$$

where θ is the threshold, $y=\sigma_T(x)$, where T is the temperature, is defined by:

$y=0$ if $x/T \leftarrow 128$ $y=128+x/T$ if $-128 \leqq x/T \leqq 127$ $y=255$ if $x/T \geqq 128$ 3. Null check: if all pixels in the 5×5 area have been flattened to zero, the input signal is rejected. Otherwise the signal is accepted.

4. Centroid calculation. Given the central pixel C, centroid coordinates are calculated as follows:

$$x=(\mathbf{2}a+b-d-\mathbf{2}e)/(a+b+C+d+e)$$

$$y=(\mathbf{2}A+B-D-\mathbf{2}E)/(A+B+C+D+E),$$

where a, b, d, e, and A, B, D, E are the original input pixel values (in vertical and horizontal) surrounding pixel C.

There are no upper bounds to the size of the network, since its intrinsic parallelism makes operation independent of its size. The maximum hypothetical net considered is 512×512, this being the frames for most of the CCD camera. However all results set forth herein apply to networks of any size. This off-line algorithm can be accomplished in real time at the CCD input rate (up to 2000 frames/sec). The communication-intensive nature of the algorithm and of the topology of this application and the particular architecture of the 3D-Flow system lead to a very efficient implementation. A hardware simulator allows studies of the entire system before actual construction.

5.9.2.5 Interface between CCD camera and the 3D-Flow system

Since the execution time of the algorithm is much shorter than the time interval between two frames, the number of processors can be dramatically reduced with respect to the number of pixels. One possible solution is to acquire the full frame into a dual-port frame memory and sequentially process subsets of this frame memory data.

More economical than a real dual-port memory having two separate sets of lines for data and address on each chip (with the access arbitration to the memory at the cell level) is using the bank-switching technique. In this case, the arbitration of the access to the dual-port frame memory has to be solved at the bank size rather than to the single cell. Economical standard memories can be used to implement the dual-port memory using the switch technique. The technique consists of the following: a switch (multiplexer in term of components) connects the data lines of one bank to the CCD camera digitizer, while another bank of the memory has the data lines connected to the 3D-Flow processor array. Typically, the arbitration of the memory is done by the switch in such a way that the CCD camera is writing to a memory bank while the 3D-Flow processor array is reading another memory bank. At a later time the two devices are connected to different memory banks, and so on, thus providing the update of all memory banks by the CCD camera and also providing the processing of all subsets of the dual port frame memory by the 3D-Flow processor array. FIG. 28 shows the connections between the devices and the dual-port frame memory. A system implemented with this scheme of dual-port memories has an over-cost on the switches (implemented usually with multiplexers), but has the advantage of reducing the latency time between the signals received from the CCD camera, the processing and the visualization or feedback signal to an actuator, and reducing the memory cost.

Another solution, shown in FIG. 29, makes use of two memory banks: one for writing and one for reading the frame. Upon completion of this process, the connection of the two memories is swapped. In this case, the latency time between acquisition and processing is the time interval between two consecutive frames.

5.9.2.6 Mapping SIREN topology on 3D-Flow system

As mentioned earlier, the 3D-Flow system is programmable and modular, and it allows incremental upgrading suitable for different speeds and sizes of applications. Thus, in order to design a 3D-Flow system targeted to a specific problem, the user has to start from the requirements of the problem.

For the present application, considered are two cases using a 200 frames/sec, 256×512 CCD camera and a 1000 frames/sec, 512×512 CCD[41] camera.

The algorithm to be executed is the same in both cases, consisting of the following phases:

Step 1. Pixel values are read from the dual port frame memory loaded by the CCD camera.

Step 2. Each element exchanges (receives and sends) the pixel value to its surrounding area of 5×5 pixels.

Step 3. Each processing element executes 25 multiply/add, subtract, divide and compare operations, as described in Section 5.9.2.3, on its current value (either the one obtained from the CCD dual-port frame memory or the result of the previous calculation) and the surrounding 24 values.

Step 4. Each processing element exchanges (receives and sends) the result obtained from the calculation to its surrounding 5×5 area.

Step 5. Steps 3 and 4 are repeated seven times.

Step 6. The values that were received for the 5×5 pixel area, whose central pixel is not flattened to zero after seven iterations, are delivered as outputs.

Step 7. Centroid calculation is performed as previously described.

Simulation of the above algorithm requires 43×7 3D-Flow cycles for the seven cycles of dynamics and 19 cycles for the centroid calculation, for a total of 320 cycles. Each cycle is executed in parallel on the overall array. At a clock cycle of 12.5 ns, the execution of the entire algorithm will be ((43×7)+19)×12.5=4000 ns. This parameter now allows us to design the 3D-Flow system for different CCD cameras of different sizes and speeds. Two cases are considered below.

5.9.2.7 Mapping two different CCD cameras to 3D-Flow system

In the first case, a total of 144 processors will be required for the CCD camera with 200 frames/sec and 256×512 pixels resolution. This system would require 6×6 3D-Flow ASIC chips. (Each 3D-Flow ASIC has four 3D-Flow processors.) Thus the entire system of 36 3D-Flow ASICs could be accommodated on a single VME (size D) board.

The 4 μs execution time per algorithm allows us to execute up to 1250 algorithms sequentially in the 5000 μs time available between two frames. Since one pixel of each subset of the frame memory is mapped to one processor, and the CCD contains 131,072 pixels, 104 processors are required. Given the four processors per 3D-Flow chip and the need of border information, a system of 144 processors (36 chips) results. Thus the processor array (144 processors) receives and processes sequentially 1250 subsets of the frame memory between two consecutive frames. (See FIG. 30.)

Each subset of data received by the processor array also contains its relative position within the frame memory. For each centroid found, the relative address of its subset is added to reconstruct its absolute address in the frame memory, and thus in the absolute position in the CCD array.

In the second case, a total of 1150 3D-Flow processors will be required for a CCD camera[41] with 1000 frames/sec and 512×512 pixels resolution. This system will require 17×17 3D-Flow ASIC chips that could be assembled on different topologies, one of which could be that of a planar assembly,[42] using the 3D-Flow daughterboards and Mini-Racks assembly. In this case, only 250 algorithms could be executed sequentially in the 1000 μs time available.

The 262,144 pixels of the CCD require 1048 processors, rounded to 1156 for the border of the pixel array and packaging considerations. The processor array will receive and process sequentially 250 subsets of the frame memory between two consecutive frames. In both cases (for 6×6 3D-Flow ASICs for a CCD at 200 frames/sec rate, and for 17×17 3D-Flow ASICs for a CCD at 1000 frames/sec rate) the implementation can be carried out as shown in FIG. 28. In the first case, the multi-port frame memory is segmented into 1250 windows, and each window is transferred sequentially to the 3D-Flow processor array. In the second case, the dual-port frame memory is segmented into 250 windows, and each is transferred to a larger 3D-Flow processor array.

5.9.2.8 Conversion of algorithm into 3D-Flow code

Appendix C show the 3D-Flow software steps accomplished to verify the suitability and performance of the 3D-Flow system for this application. A few days are required to write all programs and to load all 1024 processors; and the remaining time is spent on the simulation of different input patterns. The outcome of the program for this algorithm is 44 strings of 96 bits, listed in Appendix C. A few changes to the listed program have been made for the processors situated at the border of the array to avoid a processor seeking data from or sending data to a non-existing neighbor. (Eight modifications of the basic program were prepared.)

TABLE 5-21

| Layout of the programs in the 3D-Flow array<br>Each letter corresponds to a different program | | | | | | | | | | | | |
|---|---|---|---|---|---|---|---|---|---|---|---|---|
| A | B | B | B | B | B | ... | B | B | B | B | B | C |
| D | E | E | E | E | E | ... | E | E | E | E | E | F |
| D | E | E | E | E | E | ... | E | E | E | E | E | F |
| D | E | E | E | E | E | ... | E | E | E | E | E | F |
| D | E | E | E | E | E | ... | E | E | E | E | E | F |
| D | E | E | E | E | E | ... | E | E | E | E | E | F |
| ... | ... | ... | ... | ... | ... | ... | ... | ... | ... | ... | ... | ... |
| D | E | E | E | E | E | ... | E | E | E | E | E | F |
| D | E | E | E | E | E | ... | E | E | E | E | E | F |
| D | E | E | E | E | E | ... | E | E | E | E | E | F |
| D | E | E | E | E | E | ... | E | E | E | E | E | F |
| D | E | E | E | E | E | ... | E | E | E | E | E | F |
| G | L | L | L | L | L | ... | L | L | L | L | L | P |

Raw image data can be loaded to the 3D-Flow processor system through the top port. This data can be generated from the CCD array or can be generated with a given pattern to easily test the proper functioning of the parallel-processing system and of the algorithms. When using the simulator in place of the real data from a CCD camera, the user can specify the clock cycle at which the signals are arriving and the processor cell to which they are sent. A zero value is loaded at cycle=1 into the top port of most of the cells of the 3D-Flow processor array.

Table 5-22 shows only the non-zero input values loaded into the cells (5×5) surrounding the processor with x,y,z,= 15,15,0 (in bold).

TABLE 5-22

| Input data values | | | | |
|---|---|---|---|---|
| 2 | 4 | 8 | 4 | 2 |
| 4 | 36 | 63 | 36 | 4 |
| 8 | 63 | 116 | 63 | 8 |
| 4 | 36 | 63 | 36 | 4 |
| 2 | 4 | 8 | 4 | 2 |

5.9.2.9 Results analysis

Table 5-23 illustrate the results of the simulation. Note that results for the first iteration on the neuron are available at cycle 46, the second set of results are provided at cycle 91, the third at 136, the fourth at 181, the fifth at 226, the sixth at 271, and the seventh at 316. This timing is independent of any input pattern configuration of the data. The programs are executed in parallel on all processors. The bold box indicates the central element to which results have been calculated using the algorithm of Section 5.9.2.4.

TABLE 5-23

| Results of seven cycles of dynamics | | | | |
|---|---|---|---|---|
| Results of the first cycle after 46 processor clocks. | | | | |
| 0 | 0 | 4 | 0 | 0 |
| 0 | 42 | 68 | 42 | 0 |
| 4 | 68 | 96 | 68 | 4 |
| 0 | 42 | 68 | 42 | 0 |
| 0 | 0 | 4 | 0 | 0 |
| Results of the second cycle after 91 processor clocks. | | | | |
| 0 | 0 | 6 | 0 | 0 |
| 0 | 40 | 65 | 40 | 0 |
| 6 | 65 | 102 | 65 | 6 |
| 0 | 40 | 65 | 40 | 0 |
| 0 | 0 | 6 | 0 | 0 |

TABLE 5-23-continued

| Results of seven cycles of dynamics | | | | |
|---|---|---|---|---|
| Results of the third cycle after 136 processor clocks. | | | | |
| 0 | 0 | 3 | 0 | 0 |
| 0 | 38 | 66 | 38 | 0 |
| 3 | 66 | 97 | 66 | 3 |
| 0 | 38 | 66 | 38 | 0 |
| 0 | 0 | 3 | 0 | 0 |
| Results of the fourth cycle after 181 processor clocks. | | | | |
| 0 | 0 | 4 | 0 | 0 |
| 0 | 39 | 60 | 39 | 0 |
| 4 | 60 | 99 | 60 | 4 |
| 0 | 39 | 60 | 39 | 0 |
| 0 | 0 | 4 | 0 | 0 |
| Results of the fifth cycle after 226 processor clocks. | | | | |
| 0 | 0 | 0 | 0 | 0 |
| 0 | 32 | 62 | 32 | 0 |
| 0 | 62 | 89 | 62 | 0 |
| 0 | 32 | 62 | 32 | 0 |
| 0 | 0 | 0 | 0 | 0 |
| Results of the sixth cycle after 271 processor clocks. | | | | |
| 0 | 0 | 2 | 0 | 0 |
| 0 | 35 | 48 | 35 | 0 |
| 2 | 48 | 91 | 48 | 2 |
| 0 | 35 | 48 | 35 | 0 |
| 0 | 0 | 2 | 0 | 0 |
| Results of the seventh cycle after 316 processor clocks. | | | | |
| 0 | 0 | 0 | 0 | 0 |
| 0 | 19 | 51 | 19 | 0 |
| 0 | 51 | 67 | 51 | 0 |
| 0 | 19 | 51 | 19 | 0 |
| 0 | 0 | 0 | 0 | 0 |

The architecture of the 3D-Flow system, with high-speed communication in six directions and high parallel execution units, is the most suitable platform for the most efficient implementation of SIREN. Its flexibility allows the user to adapt the system to CCD cameras of any resolution and speed. Its programmability allows the user to easily change the algorithm in the future. This platform enables the user to explore one of the most advanced solutions in real-time processing and also permits the exploration of other possible solutions, including the classical one based on Gaussian filtering. The quality of the implementation of SIREN on the 3-D Flow system has been proven by comparison, with the result presented in Reference 40, appended hereto.

5.9.3 LHC-B muon

The methodology described in Section 5.7 hereof has been applied to LHC-B muon detection and the analysis of the 1000 events generated from the Monte Carlo simulation has been used according to the algorithm description and signature setting reported in the LOI.

This application of the 3D-Flow processor system aims to solve the problem as stated in the LOI but is not limited to such problem.

Suggestions have been made on how to simplify the trigger described in the LOI. Acceptance of this simplification after a large number of physics events will also result in the simplification in the 3D-Flow hardware programmable system.

However, for purpose of consistency, the present 3D-Flow topology and solution aims to solve the problem based on the parameters defined in the LOI.

A different set of future requirements may lead to a completely different 3D-Flow topology, but it can utilize the same ASIC.

The following sections discusses a top-down design of the muon trigger technique including the detailed algorithm steps of signal interfacing and results generation.

The parameters that may necessitate a change in the 3D-Flow system topology include channel occupancy, bandwidth at different algorithm stages, and channel reduction.

5.9.3.1 Problem definition

To design a level-1 muon trigger that detects the presence of one or more muons that penetrate the EM, the hadron calorimeters, and the muon shield. For muons that satisfy the previous conditions, impose a $P_t$ cut where $P_t$ is the bending momentum applied to the particles by the magnet shown in the top left part of FIG. 48.

The above definition could be stated alternatively: given, the generation of 30,000 hit information every 25 ns from the five pad chambers, find the path of the particles passing through the five pad chambers that satisfies the muon trigger algorithm criteria described below. The system should be able to handle 30,000 pieces of information every 25 ns while providing a result of the accepted and rejected events based on the muon trigger algorithm criteria every 2 μs.

5.9.3.2 Description of the detector and the readout system

The following information is obtained from the detector (from left to right) illustrated in the top part of FIG. 44.

Five pad chambers μ1, μ2, μ4, μ5, and μ6 are positioned in a projective geometry. The distance between chambers 1 and 2 is 465 cm, between 2 and 4 is 400 cm, between 4 and 5 is 110 cm, and between 5 and 6 is 110 cm.

Each chamber has a pad structure of 6000 pads subdivided in five regions with different pad sizes. In order to have a higher resolution, the inner regions have a smaller pad size compared to the outer regions. For example, in the fourth chamber the inner pad size (in the innermost region) is 1×1 $cm^2$, the pad size in region 2 is 2×2 $cm^2$, region 3 has a pad size of 4×4 $cm^2$, region 4 pad size is 8×8 $cm^2$, and region 5 pad is 16×16 $cm^2$. In moving toward the outer region the size of the pad doubles, corresponding to each subsequent region change.

The 2D projective pad geometry determines the smaller size of pads in chambers 1 and 2, and larger size pads in chambers 4, 5 and 6. FIG. 41 shows the layout of the 3D Flow processors in order to maintain the same neighboring relation between processors as between the pads of a chamber.

5.9.3.3 Algorithm description to detect presence of one or more muons

The following description is shown graphically in FIG. 31.

For each hit pad in planes μ4, search for a triple coincidence in planes μ5 and μ6. The search windows centered on the index of the μ4 pad hit are opened in planes μ5 and μ6.

Once a triple coincidence of μ4, μ5, and μ6 has been found, based on the index of pad no. 4, search windows are opened in the x and y plane and are projected to μ1 and μ2.

If one or more hits are found in the μ1 and μ2 regions, then all possible m trajectories are formed from the combination of μ1 and μ2 hits. The cuts presently used against a spurious μ1*μ2 combination include the following requirements:

1) the μ1*μ2 combination points to the interaction point in the y projection (Δy=±1 cm).

2) the μ1*μ2 combination has an x-slope and a y-slope consistent with the slopes of the muon triple coincidence (as determined from μ4*μ5 combination) within ±100 and ±50 mrad, respectively.

3) the μ1*μ2 combination points to the hit pad in plane μ4 to within ±2 pads (Δx1=±2 pads, Δy1=±2 pads)

A value of $P_t$ is calculated for the combinations that survived all cuts under the assumption that they are due to the muon that originates at x=y=0.

This algorithm is described in detail in Appendix C 5.9.3.4 Analysis of bandwidth, data rates, channel occupancy, channel reduction, and data rejections at different algorithmic stages An analysis has been carried out on some Monte Carlo events. The result of the analysis shows that the first part of the algorithm is where most of the rejection takes place.

From the original 30,000 bits of information occurring every 25 ns, only 2.4 (on average) possible candidates show a hit on plane μ4 of the detector.

The first stage of the algorithm checks for a hit in plane μ4, i.e., the seed plane. Only the set of data associated with a hit in the seed plane is needed for further analysis to find tracks. Of the 1000 events analyzed, the highest occupancy for any pad in plane 4 was 24 hits (not consecutive). In other words, one of the pads in plane 4 received 24 hits in the 1000 events that were studied. Also, as shown in FIG. 34, the maximum number of hits in plane 4 for any single event is 11. (The first bar in the figure correspond to zero hits/event, and the last one represents 11 hits/event.)

If one analyzes the occupancy at the next stage of the algorithm, which is after the triple coincidence, one would see that the occupancy of a pad will be reduced by a small factor, from 24 to 22 hits.

Although one could design the 3D-Flow system to execute more than one algorithm stage, it is more economical to build a large array of 3D-Flow processors that are connected to the 30,000-pad detector elements and that execute the shortest part of the algorithm that gives the maximum data reduction.

In this case, the most logical 3D-Flow system design would be the use of:

1. A stack of 3D-Flow processors at the front end executing a very simple algorithm. In this case, the algorithm would check check if there was a hit on plane 4 or at most if there was a triple coincidence on planes 4, 5, and 6.
2. A pyramid-1 that routes all pad information needed for further calculation if the candidates are real tracks. This implies the transfer of information from 102 pads for each hit found in plane 4 to the next stack of 3D-Flow processors which will execute the remaining part of the algorithm.
3. A second stack of processors with 16 parallel inputs to sustain the expected 2 to 3 track candidates at this level of the algorithm.
4. A second pyramid that further reduces the channels from 16 to one and routes the track candidates that have passed all selection criteria of the second part of the algorithm executed on the second stack.

The above description leads to a 3D-Flow system as represented in FIG. 41.

The LHC-B muon detector consists of 30,000 pads arranged in a series of planes, labeled μ1, μ2, μ4, μ5 and μ6. Each plane is subdivided into five regions with pads of fine granularity at the center. The signal from the pads is a boolean value with 1 for a hit and 0 for no hit. Data for a set of pads can be arranged as a word in a manner that is optimal for identifying the tracks.

Simulated data for 1000 events was received from the University of Virginia, along with the algorithm and the list of tracks found. As explained in Section 5.9.3.3, the criteria for a valid track includes a triple coincidence in planes 4, 5 and 6 within a given window, and corresponding hits in planes 1 and 2 also within a window of a certain size. Further cuts, including the slope of the trajectory from plane 1 and 2, should not differ from the slope of the trajectory in planes 4, 5 and 6. The energy of the particle should also be within certain thresholds.

Statistics gathered for the activity in each plane for the 1000 event are shown in FIG. 32, FIG. 33, FIG. 34, FIG. 35, FIG. 36, and FIG. 37. The x-axis gives the number of hits in the plane for a single event, and the y-axis gives the frequency.

As expected, the event density is much smaller for planes 4, 5 and 6 when compared to planes 1 and 2. In order to find tracks, it is advantageous to use the information from plane $\mu$4 as the seed plane and to apply the algorithm to every hit found in the seed plane to determine if it is a track.

FIG. 37 shows the number of triple coincidences found in planes $\mu$4, $\mu$5 and $\mu$6. Out of the 1000 events, no triples was found for 220 events.

5.9.3.5 Design of 3D-Flow system based on results of analysis of problem

Based on the results of the analysis of the problem, an optimum 3D-Flow topology can be designed that fulfills the requirements, provides a large degree of flexibility for future changes, and optimizes cost by balancing the computer power with the routing necessity in the overall system. The bandwidth at different stages of the system can be checked to fulfill the worst-case condition.

It has been shown that for the coordinates of all valid tracks of 1000 events and for a seed on plane $\mu$4, the maximum window on $\mu$5 and $\mu$6 was ±2 in x and ±1 in y while in $\mu$2 it was ±3 in x and ±1 in y. In $\mu$1 it was ±8 in x and ±1 in y. Different results may lead to a different topology and 3D-flow system. FIG. 40 shows the pad information required by each processor in order to find all possible tracks (considering the maximum bending). The consequent topology to fulfill those requirements was the following:

- Each processor is selected to receive information from five pads from each plane ($\mu$1, $\mu$2, $\mu$4, $\mu$5, and $\mu$6) with the same x and y coordinates, except for plane $\mu$1, which sends the information of three additional pads on x to the right and to the left because of its larger search window of ±8. This requires a fan-out of two for certain pads.
- After acquisition of the event from the detector, each processor sends the pad information to the eight neighboring processors according to the scheme of FIG. 39.
- Each processor then receives the information from the eight neighboring processors according to the scheme in FIG. 40.
- Each processor checks if there is a hit in pads on plane $\mu$4. (Eventually it could also check if there is a triple coincidence on the window $\mu$5 and $\mu$6. Since the further cut of the triple coincidence is negligible with respect to the first cut, this step of the algorithm could be done in the second stage of processors.)

If a hit is found, all pad information of the Region of Interest (ROI) for that particular hit coordinate found on plane $\mu$4 (which allows finding the track with the maximum bending) is sent to the output and routed through the first pyramid to the second stack of processors, where the remaining part of the algorithm is calculated.

According to this example, 1200 3D-Flow processors are required in the first stage. Each processor receives signals from five pads from all planes, and there are 6000 pads per plane. This is therefore a solution to the problem for the requirements specified in the current LHC-B LOI.

5.9.3.6 Interface of detector (or input data source) to 3D-Flow system

FIG. 38 shows the general scheme of the manner in which the information is mapped from the detector into the first layer of the 3D-Flow system.

In FIG. 39, the dotted rectangle in the center shows the number of pads and from which plane they are received by each processor.

Each processor receives from the detector 31-bits of (in two words of 16-bit) information relative to 31 pads. This information corresponds to 5 pads from planes $\mu$2, $\mu$4, $\mu$5, $\mu$6, and 11 pads from $\mu$1.

The information is routed to/from neighboring processors as shown in FIG. 39 in order to allow track finding algorithms to detect bending tracks.

The 3D-Flow processor layers granularity shown in FIG. 41 will match the granularity of the pads on the detector planes.

Each processor layer has 5 regions as the detector planes. FIG. 42 shows the details of the communications between processors belonging to two different regions.

The interface between processors belonging to two different regions is very simple. The same data lines and strobe lines are connected from a processor in an outer region to two processors in the inner region. The handshake returning signal of FIFO FULL from the inner region processors needs an ‘OR’ function.

An ‘OR’ function is inserted for the data that is transmitted from two processors of an inner region to one processor of an outer region. The same FIFO FULL handshake signal is sent from the outer region processor to the two inner region processors.

Only one strobe from one of the inner region processors will be used to store the data in the outer region processor.

All steps in the first part of the program that is routing the data are identical, thus assuring synchronization. Short differences in timing due to cable length are solved by the presence of FIFO's at each 3D-Flow processor input.

5.9.4 LHC-B electron 5.9.4.1 Problem definition

One very crucial aspect of the design is the global multi-level trigger scheme, required to reduce the event rate from around 40 MHz (the LHC beam crossing rate) to the foreseen recording rate of a few kHz.

At Level-1, it is currently envisioned to implement high-$p_t$ electron, muon, and hadron triggers. The requirements for Level 1 are to accept, with zero dead-time, events at the 40 MHz rate, and to provide an answer within a couple of microseconds. The rejection rate for minimum bias events expected of Level-1 is of the order of 100.

The 3D-Flow system can implement the above requirements in real time with zero dead-time giving the user the flexibility to change the algorithm at later time, including more signals in the decision process, and to upgrade incrementally the system with changes in granularity and/or segmentation.

5.9.4.2 Introduction

The LHC-B collaboration group is designing a spectrometer optimized for the detection of Beauty particles at the LHC, with particular emphasis on B decay modes that can be used to investigate CP violation.

Even though the LHCBs are produced at a reasonable rate (roughly one B pair every 200 interactions), the requirement to identify and tag a sizable number of rare decay modes forces the system to run at a fairly high interaction rate (typically consistent with the bunch crossing rate of 40 MHz), and to implement powerful and sophisticated triggers.

The trigger scheme presently under study foresees at Level 1 the recognition of high-$p_t$ muons, electrons, and hadrons. The overall Level 1 rejection should be at least 100, and the trigger operation should be accomplished in a pipeline mode and in no more than about 3.2 μs. When discounting for signal transmission times, etc., only about 2.0 μs is available for the actual trigger algorithm execution.

5.9.4.3 Algorithm description to distinguish interesting events from noise (Detail-1)

The top-down approach starts from a simple description of the LHC-B electron algorithm in this section, to the more detailed description of 3D-Flow steps in FIG. 47, to a more detailed description of 3D-Flow reported in Appendix C (See Section 5.3 of 3D-Flow microcode summary for each operation accomplished by the 3D-Flow processor system.)

The current design for the LHC-B spectrometer is shown at the top of FIG. 44. The angular coverage, concentrated in the forward directions, results from the desire to minimize the overall cost of the detector while still accepting a reasonable fraction of B decays. Indeed, B acceptance per unit solid angle is maximized in the forward (or its backward symmetric) direction. The spectrometer, built around a single dipole magnet, features tracking and particle ID (RICH) coverage from 10 to 400 mrad, and calorimeter and muon coverage from 10 to 300 mrad.

The calorimeter assembly consists of three separate sections:

1. Pre-shower array, which is a lead plate sandwiched between two scintillator pads (PS1 and PS2) to provide electron/photon/hadron discrimination.
2. The electromagnetic calorimeter section (EMcal), several thousand blocks of Scintillator/Pb "shashliks," 25 radiation lengths thick.
3. The hadronic section, having as many modules as EMcal.

Another element employed by the electron trigger is a plane of pads (P1) positioned as the first chamber after the dipole magnet.

In the course of the trigger studies and simulations, electron and hadron triggers were developed independently, and a 3D-Flow simulation was implemented for the electron trigger alone. Later, a trigger scheme utilizing the same 3D-Flow system to execute concurrently both the electron and hadron trigger was devised. As discussed below, the flexibility of the 3D-Flow system shows how the original implementation could be readily expanded to accommodate the more complex situation.

The basic algorithm for the Level 1, high-$p_t$ electron trigger is rather general and could be applied readily to any other forward spectrometer. The steps required to recognize the presence of a high-$p_t$ electron candidate are shown in FIG. 47. They are:

In the calorimeter, detect clusters of energy deposition by finding local maxima, i.e., blocks having energy larger than a given threshold and larger than any of the eight neighbor elements. For each such cluster, compute the total energy (sum of 8+1 energy depositions), verify that it is larger than a given threshold and verify that the central block contains at least a given fraction of the total energy.

For each peak block, require that the corresponding pre-shower module exhibits the desired pattern, i.e., presence of a hit in PS1 and sizable energy deposition (corresponding to the onset of an electromagnetic shower) in PS2. It should be clear that the corresponding photon and hadron signatures are, respectively, (PS1=0, PS2 large) (PS1=min. ionizing, PS2=min. ionizing).

At this point, all electron candidates with energies above a given threshold have been identified, but further steps are necessary to perform a cut on the particle's transverse, rather than total, energy.

If the trigger were designed to recognize high-$p_t$ photons, the conversion from total to transverse energy would be straightforward, given the known location of the block. In the case of charged particles, which have undergone bending by the dipole magnet, the transformation is not only more complicated, but it also presents a twofold ambiguity caused by the unknown sign of the detected particle. It could be shown that for a magnet of strength $p_k$ (measured in GeV/c) the two solutions for the transverse momentum of particles of opposite sign differ by $$\Delta P_t = 2P_k(Z_c - Z_m)/Z_c,$$

where $Z_c$ and $Z_m$ are, respectively, the Z coordinates of the calorimeter and the magnet center, measured from the interaction point. In the typical situation of the magnet being halfway between the interaction point and the calorimeter, the wrong solution for the particle sign has an error equal to $P_k$, a serious drawback since typical values of $P_k$ (around 1–2 GeV/c) are of the same order as the optimal $P_t$ thresholds for selection of electrons from B decays. As discussed later, in the 3D-Flow implementation it is straightforward to resolve the ambiguity and recognize the sign of the candidate electron, and consequently to compute its proper transverse momentum.

The operations to execute are:

From the measured cluster energy, compute the expected (range of) positions at magnet exit corresponding to either sign of the particle, and also compute the corresponding values of $p_t$. Verify whether the pad plane P1 shows a hit for either of the computed (range of) positions, and verify whether the hit, if present, corresponds to a $P_t$ above threshold.

It should be noted that the execution of this step, in addition to resolving the sign ambiguity, provides further rejection against photons as well as hadrons, since it gives a first-order verification of consistency between the particle measured energy and its inferred momentum (the so-called "E/p" match).

Finally, in the last step one needs to transfer to the Level-1 trigger supervisor the address and $P_t$ value of the block(s) satisfying the required conditions.

5.9.4.4 Analysis of bandwidth, channel occupancy, rates, channel reduction, and data rejection at different algorithmic stages The analysis was made on 1000 events generated from a Monte Carlo simulation.

Given that the expected data reduction was high, it is feasible to implement the 3D-Flow pyramidal structure to route the few events that passed all electron algorithm trigger cuts to the exit point or apex of the pyramid.

Simulations carried out on the 3D-Flow system simulator verified that the maximum latency time for a valid event detected at the farthest location (comer of the 3D-Flow array) was acceptable. The simulation also checked whether there was congestion of data in a given area and whether buffering was necessary to prevent loss of data.

5.9.4.5 Design of 3D-Flow system based on result analysis of problem

For the purpose of implementing the LHC-B electron and hadron triggers, the most natural configuration is to install a 1-to-1 correspondence between each calorimeter trigger block and a processor cell. The calorimeter structure is then mapped to a planar array of 3D-Flow processors, as shown in FIG. 44. In view of the need to sustain a beam particle crossing rate of 40 MHz, and given the fact that in general the algorithm execution time will be longer than the 25 nanosecond particle bunch separation, several layers of microprocessors are needed to provide a zero dead-time operation (see center of FIG. 44). The number of layers is given by the ratio (algorithm execution time)/(bunch separation); and the routing of the data to the appropriate layer is realized automatically by exploiting the "bypass" capability, a built-in feature of the 3D-Flow processor. At each bunch crossing, the corresponding data (calorimeter+pad chamber information) will be accepted by the first non-busy processor in the base layer of the stack.

While for each event all the calorimeter information from the elements are processed in parallel, at the end of the computation any processor that found any potentially interesting cluster would transmit its results to a data concentration center. (This is particularly true in the case of the hadron trigger, where the acceptance condition requires the presence of more than a single high-$P_t$ cluster.) With this purpose in mind, the sequence of parallel processor layers is followed by a pyramidal processor structure to function for data transmission and reduction purposes. Each layer of the pyramid contains one fourth the number of processors as compared to the previous layer, and only the information relative to the few, if any, clusters above $p_t$ threshold is transmitted to the pyramid vertex or output, where the last vertex processor can perform the final accept/reject decision.

5.9.4.6 Interface of detector (or input data source) to 3D-Flow system

The interface between the detector compartments used to identify electrons and the 3D-Flow system is illustrated in FIG. 44. Only two 16-bit words are sent from the detector to the 3D-Flow system. One word contains the electromagnetic ADC (analog-to-digital counts) as bits 7-0, preshower PS1 as bits 14-8, and preshower PS2 as bit 15. The second word carries the information from the 'OR' of three rows of 16 pads (on the alignment between the interaction point and the electromagnetic element) in the detector plane P1.

5.9.4.7 Conversion of real-time algorithm into 3D-Flow code

Considered separately below is the pure electron trigger (with no Hcal information) and the combined electron+hadron triggers.

For the electron case, the input data consists of two 16-bit words, containing one byte from Emcal, 7 bits from PS1 and one bit from PS2, and a 16-bit pattern from the relevant region of the pad chamber P1. At each bunch crossing, several thousand two-word groups are sent in parallel to the first layer of the 3D-Flow processor, either to be accepted in it or to be passed on to the first free successive layer. Each processor stack executes the program shown in Table 1 and, as a result, outputs two words, the energy sum of the 3×3 array centered on the corresponding block (plus one bit signaling whether the cluster satisfied the electron condition) and the time stamp of the event.

The first stage of the pyramid, consisting of as many processors as each individual layer, will select flagged clusters and add the ID of the channel for further transmission subsequent the pyramid layers.

The listing of the 3D-Flow code written to execute the electron algorithm is given in Appendix C, and is illustrated in FIG. 47. The listing is self-explanatory, and it demonstrates the power of executing multiple operations per cycle. See, for example Line 1, where in a single clock cycle the first data word is fetched and its low byte is used as the address for a lookup operation as well as the factor to initiate a multiplication. Or see Line 4, where two input, two output, and two arithmetic operations are executed concurrently.

Examination of the software listing indicates the following advantages:

Because of the capability of executing fast lookup or multiply operations, block-to-block gain differences can be accounted for, since the quantities that are transferred among neighboring blocks are actual energy values, not ADC counts or analog signals.

Even though a given block communicates directly with four neighbors only, the program shows how communication to and from diagonal neighbors can take place in a straightforward manner. It is also worthwhile noting that, if one were to decide even at a stage as late as running time that a better definition of clusters would be given by a set of 5 blocks rather than 9 blocks, it would be a trivial matter to modify the program to accommodate the alternate cluster definition.

The resolution of the sign ambiguity and the check of the energy/momentum consistency, which is a sophisticated operation, can be performed in a very simple set of instructions. Moreover, the operations themselves (Lines 13, 15 and 21) are embedded in the rest of the program in such a way that they do not affect the overall program execution time.

The total number of clock cycles to execute the complete algorithm is 28. (Even though the program consists of 27 lines, the final branch instruction requires two cycles.) It is contemplated that the 3D-Flow processor will run at 80 MHz, but it is reasonable to assume that when approaching the LHC era, advances in technology will allow an upgrade to 200 MHz. Under this assumption, the total execution time is an extremely fast 140 ns. Knowledge of this allows the number of layers required to keep up with the 40 MHz bunch crossing rate fixed at six.

5.9.4.8 Design of pyramid for channel reduction

For either electron or electron/hadron configurations, execution of the algorithm is followed by a transfer of data along the pyramid.

The pyramid has been design as described in detail in Section 5.8.1.5 using the same 3D-Flow code programs described in detail in Appendix B. Simulations have been performed with events generating clusters at the opposite comers of the pyramid's base. This, in essence, evaluates the worst-case scenario, i.e. the longest path taken by a cluster to reach the exit point at the pyramid's apex. For typical events containing a few accepted clusters, a 64×64 channel system yielded transmission times of around 1.3 $\mu$s. When added to the algorithm execution time (<200 ns) it appears that the 3D-Flow solution can meet the 2 $\mu$s limit by a very comfortable margin.

5.9.4.9 Analysis of the results

The program was simulated on a stack having 5 layers, each with 24×24 processors, followed by a pyramid. The results are seen graphically on a window of the 3D-Flow simulator for the electron plus hadron algorithm, or the results are illustrated in the text file created by the 3D-Flow simulator as shown in the first three column of Table 5-24.

TABLE 5-24

Format of the results of a simulation provided by the 3D-Flow simulator. At each line it is indicated which bottom-port processor of the entire array has generated the output, at which clock cycle it was generated, and the 16-bit value sent out (represented in hexadecimal code).

| Processor ID | Clock | Sequence of ID, Energy, Time stamp. | Comments |
| --- | --- | --- | --- |
| Processor: 22,22,8 | Clock: 146 | Result = 70d | ID = col:07; row:13 |
| Processor: 22,22,8 | Clock: 147 | Result = fd | Energy = 253 |
| Processor: 22,22,8 | Clock: 148 | Result = c | Time = 12th event |
| Processor: 22,22,8 | Clock: 170 | Result = 603 | ID = col:06; row:03 |
| Processor: 22,22,8 | Clock: 171 | Result = lbd | Energy = 445 |
| Processor: 22,22,8 | Clock: 172 | Result = d | Time = 13th event |
| Processor: 23,22,8 | Clock: 176 | Result = 1401 | ID = col:14; row:01 |
| Processor: 23,22,8 | Clock: 177 | Result = 162 | Energy = 229 |
| Processor: 23,22,8 | Clock: 178 | Result = c | Time = 12th event |
| Processor: 22,22,8 | Clock: 179 | Result = 505 | ID = col:05; row:05 |
| Processor: 22,22,8 | Clock: 180 | Result = e5 | Energy = 210 |
| Processor: 22,22,8 | Clock: 181 | Result = d | Time = 13th event |

The fourth column of comments of Table 5-24 describes the type of result obtained (in decimal value) from the simulator for the specific application of the electron trigger.

In the first column of Table 5-24 is listed the processor ID (column, row, layer) which has generated the result. The same set of programs were loaded in each group of 16 processors in the first layer of the pyramid as shown in FIG. 17 and other programs were loaded in each group of 16 processors in the second and all subsequent layers of the pyramid as shown in FIG. 18.

The result of the loading identical programs in the group of 16 processors, generates a pyramidal structure with the apex of the pyramid at the 3D-Flow ASIC having the four processors with ID=22, 22, 8; ID=22, 23, 8; ID=23,22, 8; and ID=23, 23, 8.

An optimized pyramidal structure for routing results using the shortest paths in a 24×24 base processor array would have been that of having the apex exit point of the pyramid at the center of the base at the processor with ID=11, 11, 8. This would have required some minor modifications to the routing programs in the pyramid with column and row ID greater than 11. Instead of simulating a 48×48 processor pyramid array with the apex at the center thereof to find the longest routing path from an array comer to the apex, it was found to be substantially easier to simulate a 24×24 processor pyramid array with an apex at the comer thereof. In the latter case, the longest routing path is the same as in the 48×48 array, but the simulation is much easier because all set of 16 routing programs in the 24×24 array are all the same.

The analysis of the result of Table 5-24 leads to the following considerations:

1. The number of accepted electron candidates which passed the level-1 trigger criteria are of the order of two to three electrons per event.
2. The first set of results (ID, Energy value, and Time stamp) relative to the first electron candidate is generated after 146 3D-Flow clock cycles. This includes the initialization time of the 3D-Flow system and the filling of the pipeline. After this initialization phase, the time required to generate another set of results can be as low as three clock cycles (if candidate electrons were found at that rate e. g. clock=179 minus clock=176)
3. The system can detect very fast and in a programmable manner patterns which passed the pattern recognition criteria in locations of the detector far apart. In this case two electron candidates were found, one at clock cycle=146, at ID=col:7; row:13, and at clock cycle=176, at ID=col:14; row:1, for the event number 12. This feature of the system allows one to correlate after a very short time from the generation of the data of the event, information from any location in the detector, even those located far apart. The use of this feature is extremely important in applications such as on Positron Emission Tomography where is necessary to identify hits that occurred during the same event in opposite locations of the detector array.
4. The precise time require for routing results to a single exit point can only be calculated precisely by the simulation of each application and of each set of results provided by the stack. However, the best way to estimate the maximum time to route results from an array to a single exit point is the following: (1) the longest routing path is calculated by subtracting the destination ID (column with column and row with row) minus the processor source ID where the result become available, (2) considering that each layer requires 5 steps to route information from four ASICs to one ASIC and an additional step to forward the message to the next layer, the total time would be 6 clock cycles times the number of layers to go through. For example, in the previous pyramidal topology, a result present at ID=col:6, row:3, will require 6×4=24 clock cycles. This would be the case when there are no other data in its path to the exit to slow down the transfer. In the case of the presence of other results along the path, only the simulation gives the exact timing.

It can be appreciated that the routing in this system is flexible, does not have overhead protocols, thus, its total transfer time is shorter than any existing routing mechanism with the same degree of flexibility It can be seen that triggering at the LHC-B will require a high performance, flexible system. The 3D-Flow system offers a solution that satisfies all the needs of this very demanding environment. The discussion of the electron and electron/hadron trigger implementations set forth herein shows how a system of reasonable size, fully modular, expandable and programmable, can execute a sophisticated trigger algorithm and transfer the full information on candidate triggering clusters in the order of 1.5 $\mu$s.

5.9.5 LHC-B electron and hadron 5.9.5.1 Problem definition

The problem definition is similar to that described in LHC-B electron, but accompanied with additional information from the hadronic compartment for the Level-1 trigger decision.

Even if there are changes to both the algorithm and the number of words to be transferred from the particle detector to the 3D-Flow system for each event, it is nevertheless possible to solve the problem by adding only two additional layers of processors to the system.

5.9.5.2 Algorithm description to distinguish interesting events from noise (Detail-1)

In the course of the trigger studies and simulations, electron and hadron triggers were developed independently, and a 3D-Flow simulation was implemented for the electron trigger alone. Later, a trigger scheme utilizing the same 3D-Flow system was devised to concurrently execute both the electron and hadron trigger. As discussed below, the flexibility of the 3D-Flow system was demonstrated by showing how the original implementation could be readily expanded to accommodate the more complex situation.

The algorithm contemplated for the high $p_t$ hadron trigger is similar, but with some important differences. Clusters of energy deposition are identified by looking at local maxima in the EMcal+Hcal energy sums. The pre-shower is required to satisfy the hadron signature (minimum ionizing in both PS1 and PS2), but, because of the much poorer energy resolution typical of hadron calorimetry, the pad plane condition is not utilized, and the value of $p_t$ is estimated from the geometric position of the cluster center. The hadron trigger design is optimized to recognize two-body B decays of the type $B^o \rightarrow \pi^+\pi^-$, therefore the actual trigger will require the presence of at least two high-$p_t$ showers.

A list of the steps of the LHC-B Level-1 trigger algorithm is described in Appendix C.

5.9.5.3 Analysis of bandwidth, channel occupancy, rates, channel reduction, and data rejection at different algorithmic stages Analysis of the example which includes information from the hadronic compartment of the calorimeter for the Level-1 trigger decision, did not introduce substantial changes in bandwidth, channel occupancy, rates, channel reduction, or data rejection.

The data reduction factor obtained by using the trigger algorithm criteria described herein gives the parameters reported on the right side of FIG. 44, in the column 'Event Rate.'

5.9.5.4 Design of 3D-Flow system based on result analysis of problem

The design of the 3D-flow system for this example is similar to the previous case. The main difference is an increase in number of 3D-Flow layers from five to seven due to the increased complexity of the trigger algorithm. The other modification is the input multiplexer, which now needs to multiplex three groups of input data (as shown in FIG. 48).

5.9.5.5 Interface detector (or input data source) to 3D-Flow system

FIG. 48 show the interface between the LHC-B detector and the 3D-Flow system.

Three 16-bit words are sent from the detector to each 3D-Flow processor every 25 ns. One word carries the information of the ADC counts as bits 7-0 for the hadronic compartment. The high byte of word 1 (bits 15-8) carries the information of the ADC counts from the electromagnetic compartment. The low byte of the second word carry the information of the ADC count of preshower PS2, and the high byte carries the information of the ADC count of the preshower PS1. Word 3 carries the information from the relevant region of pad chamber P1.

5.9.5.6 Conversion of algorithm into 3D-Flow code (Detail-3)

The 3D-Flow code for the LHC-B electron and hadron trigger algorithm is listed in Appendix C.

FIG. 49 and FIG. 50 illustrate the instructions with regard to an algorithm useful in detecting either an electron or a hadron during execution of the same processing algorithm. The operations carried out in clock cycles 1–7 are substantially the same as that described above in the 3×3 data exchange algorithm, illustrated in FIG. 11 and coded in Appendix B. In other words, the center processor in a matrix of nine receives the three words from its top input port and transmits that data to its neighbors, and receives data directly from its north, east, south and west neighbors as well as from the corner processors indirectly via the same north, east, south and west neighbors. A few modifications of the input/output instructions have been made for the processors located at the edge (or side) and at the comer of the array. The algorithm for those processors are the same, with the exception that there is no input/output from/to a neighboring processor which does not exist.

In clock cycle 7, the center processor adds the electromagnetic energy and the hadron energy of the specific sensor pads, as input from the top input port. The sum ETi is sent to all eight neighbor processor, according to clock cycle 8. In clock cycle 9, the pedestal noise is subtracted from the signal output by the analog-to-digital converter associated with the PSI sensor element signal.

In clock cycles 10–14, the energy of a total matrix of nine electromagnetic sensor elements and nine hadronic sensor pads is calculated. In clock cycles 15–21, the sum of the electronic and hadronic energy of the center sensor element is compared with the summed electromagnetic and hadronic energies of the respective eight neighbors to determine if the summed energies of the center sensor pad is greater than that of the respective energy summations of the neighbors. If the summed energy of the center sensor element is greater, then this is a candidate for the detection of a hadron and electron. In clock cycles 22–26, various comparisons are made. For example, if the center sensor element of PSI is less than a predefined threshold, or if the center PSI pad is greater than a second threshold, the event is rejected as failing to detect either an electron or a hadron. In clock cycles 25 and 26, further comparisons are made to the effect that if the center pad of the PS sensor is less than a predefined threshold (threshold five), then the program branches to the "check for hadron" instruction of clock cycle 27.

Clock cycles 27-32 relate to the determination of the detection of an electron. For example, if the center sensor pad of the hadron sensor is greater than a predefined threshold (threshold six), then the event is rejected as failing to detect a hadron. If the electromagnetic energy of the center sensor pad is less than 60% of the electromagnetic energies summed for the nine sensor pads, or if the polarity of the particle, as determined from the Word 3 input to the processor, is negative, then the program branches to the negative instructions of clock cycles 33 and 34. Clock cycles 33 and 34 determine whether a negative polarity exists, and if so, signifies that the electron has been found by producing an output result data having an energy level, a sign, and an identification.

With regard to the "check for hadron" instructions of clock cycles 27–29, which is carried out concurrently with the "check for electron" instructions of the same clock cycles, the processor determines whether the signal of the PS2 center sensor pad is less than a predefined threshold (threshold 3); if the signal of the center element of PS2 is greater than a fourth threshold, the event is rejected as failing to find a hadron. Also, if the summation of the nine electromagnetic and hadronic sensor elements is less than a seventh predefined threshold, the event is again rejected as failing to find a hadron. However, if the various processing steps of the energy data and polarity show that a hadron was indeed found, the processor produces output data, including a hadron energy, a time stamp, and an ID. It should be understood that only 34 clock cycles are required in order to determine whether an electron, a hadron, or both are found, according to the algorithm of FIG. 49 and FIG. 50 listed in 3D-Flow code in Appendix C. In carrying out the foregoing algorithm, again, a multi-layer pyramid can be advantageously employed to funnel the data from the processor stack to provide a single result output identifying electron energies, hadron energies, and position (in a detector plane) identification information associated therewith.

5.9.5.7 Multi-program execution on 3D-Flow simulator

Description of the first screen.

The execution of the 'electron+hadron' algorithm on the simulator is explained, along with the screen dump at different clock cycles. The various views and the parameters displayed in the first screen are described in the following paragraphs. For the screens of all the other clocks, reference should be made to the 3D-Flow code listing in Appendix C and find the difference from the previous screen.

Referring to the first screen, the status bar at the bottom of the screen shows the state of execution of the system (stopped) and the current clock (105). Shown are seven windows of six different types in this screen.

The Map view in the upper-left-hand comer displays the location of the Layer view (showing a part of one layer. The top center of the screen shows the processor blocks with a stop icon in the middle) and the Vertical Pipelined view (PV 0) with respect to the entire system. The arrows indicate the direction in which a window of a given type provides a snapshot of the system.

The values from the input data file are received by the top port of layer 1, and the output of the last layer after the algorithm is applied is sent to the result log file. These values can be visualized at any clock-cycle as a color-coded matrix in the Event Frame view and Result Frame view respectively. The color indicates the magnitude of the value present. These values are stored in memory, and the user can examine the state of the inputs and outputs at any previous clock cycle. It is also possible to apply a mask on the input and the output values to enhance the pattern. The two windows to the right of the screen show the Event view, and the one in the center shows the Results view. The three values on the top-left are the minimum, the delay, and the current processor ID respectively. The delay indicates the number of clocks from the current clock cycle for which the input data is being displayed. The three values in the top-right comer are the maximum value (after applying the mask), the mask, and the currently selected value, respectively. The scale for the colors is shown in the strip at the top of the picture. The results window is blank since there is no result available at this clock.

The Layer view shows a part of one layer from processor 1,3 to 3,5 of layer 0 in this case. The notation "1,3" is a coordinate location of a processor, with 1=x (column), 3=y (row). The processor ID is given at the top of each processor block. The STOP icon indicates that the processors are currently blocked due to a data dependency. (They are programmed to execute in the data driven mode.) The lower-left comer of each processor gives the value in the output register; the program counter is shown in the right comer. The arrows represent the FIFOs that interconnect the processors. Each processor is linked to the four neighbors in its layer as well as to the two in the previous and next layers. Data exchange takes place through these FIFOs. The depth of the FIFO is 8 words, and the number of data items currently in the queue is displayed by green shading. The FIFO is shown in red if it is full.

The Vertical Pipelined view (PV 0) is similar to the Layer view except that it shows the processors from a different view. In this case, the processors from 0, 0 to 0, 1 are shown for layers 0 through 6. The top FIFO of each processor is shown connected to the bottom port of the processor in the previous layer. The data exchange between layers can take place through the bottom port of the processor to the top FIFO of a subsequent layer processor, or from the bottom port to the output register of the next layer directly, depending on the bypass switch setting. In the latter case a yellow line is used to indicate the connection. The color of the processors in a layer indicates the bypass switch mode. Blue indicates bypass mode, and green indicates input-output mode (input through the top FIFO). The three numbers indicate the processor ID, output register contents, and the program counter, respectively.

The internal state of processor 2, 4, 0 is shown in the internal view of the processor (between the map view and the layer view). The values at each register and bus are shown. The abbreviated labels are for the following:

I: Instruction (in binary)

LN: Line number

EV: Event number

A1, A2, A3: The input operands and the value at the output register of the ALUs.A3 is the MAC.

ByIn, ByR: The input and output bypass counters

IN, RES: The input and result counters

C: Result of the comparator

E: Result of the encoder

CS: The condition code status register

M1, M2: The contents of the memory banks DM1 and DM2 pointed to by the memory address register MAR.

IO: The Input/Output status register

TI, NI, EI, WI, SI: The next value at the top, north, east, west, and south FIFO BO, NO, EO, WO, SO: The value at the top, north, east, west, and south port OF: The last value inserted into the Output FIFO RA, AB, RC: The values on the ring buses A, B, and C CA, CB, CC, CD: The values at core buses A, B, C and D The user can double click on the areas shaded in green to view the details of the registers and FIFOs.

While the preferred and other embodiments of the invention have been disclosed with references to specific processors, equipment, algorithms and the like, it is understood that many changes in detail may be made as a matter of engineering choices without departing from the spirit and scope of the invention, as defined by the appended claims.

From the foregoing, an extremely simplified and high-speed technique has been disclosed for carrying out a first phrase processing with a first processor stack and a second stage processing with a second processor stack, and utilizing a funneling pyramid there between providing a significant advancement in the art. Moreover, and as noted above, both the processor stacks and the processor pyramids are easily constructed using the same type of processor, thereby economizing on hardware. Each processor in the various layers of the stacks employ the same algorithm, and algorithmic efficiency is also achieved in the pyramids, whereby the flexibility of the processing architecture is facilitated.

Appendix A - DETAILS OF ASIC INTERNAL ARCHITECTURE

Microcode description of each unit in a 3D-Flow Cell

The 3D-Flow processor executes instructions stored in instruction memory. Basically, this instruction is the microcode, and it is separated into 13 sections. The instruction sections described below are in order of most significant to least significant bit. The total instruction is 96 bits long. The operations of each unit are referred to core buses A, B, C, and D. Any input operand to the units or output results from the units can thus be from/to any unit attached to the core bus specified in the instruction mnemonic. For example, the input instruction ST_A3_AC means: "store into the multiply accumulator register "A3" (32-bit), the value that is available on core bus C (bits 15-0). The unit that is placing the data on the core buses A and C will depend on the code of the other units (bits 51-48 and bits 43-40) of the instruction word) that determines the path of the data to those core buses (The path could be established from input ports, from data memories, from the output of ALU1, ALU2, MACC, Encoder, COMPARATOR, etc.)

CNTL/FMT (bits 95-93)

The CNTL/FMT field controls the branching of the instruction sequencer. The instruction sequencer comprises the state machine shown in Figure 62. The branch address is contained in the numeric section of the instruction. Detailed descriptions of all CNTL/FMT instructions are listed in Table A-1

Table A-1. Branching control of the instruction sequence.

| Mnemonic | Operations | Binary Patt. (bits 95-93) | Description |
|---|---|---|---|
| nop | nop | 000 | No- Operation. |
| BRA offset | PC<-PC+offset | 001 | Branch Always absolute to offset. (Offset is 2's complement) |
| BRccSET offset,#bit1,#bit2 | PC<=PC+offset if bit1-2 = 1 | 010 | Branch to PC+offset if #bit1, OR #bit 2 of the "ccsts" is set. |
| BRccCLR offset,#bit1,#bit2 | PC<=PC+offset if bit 1-2 = 0 | 011 | Branch to PC+offset if #bit1, AND #bit 2 of the "ccsts" register is clear |
| SETccsts B | ccsts<= ccsts OR B | 100 | Set bits of "ccsts" register specified on bus B to 1. |
| CLRccsts B | ccsts<= ccsts AND B | 101 | Clear bits of "ccsts" register specified on bus B to 1. |
| CLRFIFO B | iosts(5-0)<= iosts(5-0) OR B(5-0) | 110 | Clear FIFO's as specified on BUS B, 1=clear. (bit-5)=T, (bit-4)=N, (bit-3)=E, (bit-2)=W, (bit-1)=S, (bit-0)=OUT. |
| WR_Timer_D | Timer <= D | 111 | Write Timer with value from bus D. |

MAC or DIV (bits 92-88)

This microcode field is assigned to the Multiply/Accumulate unit and to the Divide unit. A more detailed diagram of MAC/DIV unit is shown in Figure 63, and Figure 87. The Multiply Accumulate unit (MAC) or Divide unit (DIV) has a five-bit instruction field and contains the information required by the MAC (or DIV) to perform its operation. The Register of the MAC, where the result is updated after each instruction of multiply and accumulate (or divide), is called A3. Reading the register A3 through core Buses "A" and "C" is covered in the core Bus Control Section. Detailed descriptions of all operations performed by the MAC (or DIV) are listed in Table A-2. The Carry and Overflow bits are set and cleared as follows: for "unsigned" arithmetic operations Overflow = Carry. For signed operations, overflow is set when the Carry IN to bit-31 of the result differs from the "Carry OUT" of bit-31 (bit-32). If "Carry IN" = "Carry OUT", then Overflow bit is cleared

Table A-2. Multiplier, Accumulator, and Divider operations.

| Mnemonic | Operations | Binary Code | Description |
| --- | --- | --- | --- |
| nop | nop | 00000 | No Operation. Does not change the value of the accumulator. |
| MPYU_u | A3 <= a*b<br>(a, b=8-bit or 16-bit)<br>unsigned | 00001 | 16-bit * 16-bit unsigned Multiply.<br>Multiply two unsigned operands from the specified core_buses and store the 32-bit result after 4 cycles on A3.<br>Affected ccsts: OV_A3, C_A3. (all cleared) |
| MPYS_u | A3<= a*b<br>(a, b=<br>8-bit-extended or 16-bit)<br>signed | 00010 | 16-bit * 16-bit signed Multiply.<br>Multiply two signed operands from the specified core_buses. If 8-bit operands are selected, they will be automatically signed extended before operation. A signed 32-bit result is stored after 4 cycles on A3.<br>Affected ccsts: OV_A3, C_A3. (all cleared) |
| MACU_u | A3<=<br>A3+a*b<br>(a, b=8-bit or 16-bit)unsigned | 00011 | 32-bit+ (16-bit * 16-bit) unsigned Multiply/Accumulate.<br>Accumulate to A3 the result of the multiplication between two unsigned operands from the specified core_buses. An unsigned 32-bit result is stored after 4 cycles on A3.<br>Affected ccsts: OV_A3, C_A3. |
| MACS_u | A3<=A3+a*b<br>(a, b=<br>8-bit-extended or 16-bit)<br>signed | 00100 | 32-bit+ (16-bit x 16-bit) signed Multiply/Accumulate.<br>Accumulate to A3 the result of the multiplication between two signed operands from the specified core_buses. If 8-bit operands are selected, they will be automatically signed extended before operation. A signed 32-bit result is stored after 4 cycles on A3.<br>Affected ccsts: OV_A3, C_A3. |
| MPYMU_z | A3<=A3*a<br>(A3=16-bit<br>a =8-bit or 16-bit)<br>unsigned | 00101<br>(bit-15=0) | 16-bit * 16-bit unsigned Multiply (A3 * a).<br>This instruction is useful to perform a series of multiplication. An unsigned operand (8-bit or 16-bit) specified on a core_bus, is multiplied with an unsigned value on A3 (16-bit). The 32-bit result is stored after 4 cycles on A3.<br>Affected ccsts: OV_A3, C_A3 |
| MPYMDU_z | A3<=A3*a<br>(A3=32-bit;<br>a =8-bit or 16-bit)<br>unsigned<br><br>(2 cycles) | 00101<br>(bit-15=0)<br><br>in sequence<br><br>00101<br>(bit-15=1) | 32-bit * 16-bit unsigned Multiply. (A3 * a).<br>This instruction is useful to perform a series of multiplications. An unsigned operand (8-bit or 16-bit) specified on a core_bus, is multiplied with an unsigned value on A3 (32-bit). The 32-bit result is stored after 5 cycles on A3.<br>To obtain 32-bit precision, the instruction must be issued twice (in sequence) with the same input operand "a" but with a different bit-15 value in the numeric field. At the 4th cycle after the first instruction was issued, A3 will contain the result of the multiplication between lower 16-bits of A3 and operand "a". At the 5th cycle after the first instruction was issued, A3 will contain the result of the multiplication between 32-bit of A3 and operand "a".<br>Affected ccsts: OV_A3, C_A3 |
| MPYMS_z | A3<=A3*a<br>(A3=16-bit<br>a =8-bit extend or 16-bit)<br>signed | 00110<br>(bit-15=0) | 16-bit * 16-bit signed Multiply (A3 * a).<br>This instruction is useful to perform a series of multiplications. If 8-bit operands are selected, they will be automatically signed extended before operation. The signed operand (8-bit or 16-bit) specified on a core_bus, is multiplied with the signed value on A3 (16-bit). The 32-bit result is stored after 4 cycles on A3.<br>Affected ccsts: OV_A3, C_A3 |

| | | | |
|---|---|---|---|
| MPYMDS z | A3<=A3*a (A3=32-bit a =8-bit extend or 16-bit) signed<br><br>(two cycles) | 00110 (bit-15=0)<br><br>in sequence<br><br>00110 (bit-15=1) | 32-bit * 16-bit unsigned Multiply. (A3 * a).<br>This instruction is useful to perform a series of multiplications. If 8-bit operands are selected, they will be automatically signed extended before operation. The signed operand (8-bit or 16-bit) specified on a core_bus, is multiplied with the signed value on A3 (32-bit). The 32-bit result is stored after 5 cycle on A3.<br>To obtain 32-bit precision, the instruction must be issued twice (in sequence) with the same input operand "a" but with a different bit-15 value in the numeric field. At the 4th cycle after the first instruction was issued, A3 will contain the result of the multiplication between lower 16-bit of A3 and operand "a". At the 5th cycle after the first instruction was issued, A3 will contain the result of the multiplication between 32-bit of A3 and operand "a".<br>Affected ccsts: OV_A3, C_A3 |
| DIVU_v | A3<= a/b (a, b=8-bit or 16-bit) unsigned<br><br>(N cycles) | 00111 | 16-bit / 16-bit unsigned Division.<br>Divide two unsigned operands from the specified core_buses. The user can define the precision of the result that will determine the number of iterations (maximum precision = 16-bit) An unsigned 32-bit result is stored after the selected number of cycles on A3. (Lower 16-bit= quotient, upper 16-bit=remainder)<br>Affected ccsts: OV_A3, C_A3. |
| DIVS_v | A3<= a/b (a, b= 8-bit-extended or 16-bit) signed<br><br>(N cycles) | 01000 | 16-bit / 16-bit signed Division.<br>Divide two signed operands from the specified core buses. If 8-bit operands are selected, they will be automatically signed extended before operation. The user can define the precision of the result that will determine the number of iterations (maximum precision = 16-bit) The signed 32-bit result is stored after the selected number of cycles on A3. (Lower 16-bit= quotient, upper 16-bit=remainder)<br>Affected ccsts: OV_A3, C_A3. |
| ACCU A3 x | A3<=A3+a (a=8-bit or 16-bit or 32-bit) unsigned | 01001 | 32-bit + 32-bit Accumulate among A3 and an unsigned input operand.<br>Accumulate to A3 (32-bit) an unsigned input operand. The operand "a" from core_bus can be an 8-bit, or 16-bit, or 32-bit value, either from a single core_bus or as a result of the concatenation of two different core_buses as defined in the numeric field bits 10-14). For "a"= a single 8-bit, the upper 24-bis are set to 0. For "a"= a single 16-bit input operand, the upper 16-bit are set to 0. For "a"= two 8-bit input operands, the upper 8-bit of each operand are set to "0", then added to A3 and the result is stored into A3.<br>Affected ccsts: OV_A3, C_A3 |
| ACCS A3 _x | A3<=A3+a (a=8-bit extend or 16-bit ext. or 32-bit) signed | 01010 | 32-bit + 32-bit Accumulate among A3 and an input signed operand.<br>Accumulate to A3 (32-bit) a signed input operand. The operand "a" from core_bus can be an 8-bit, or 16-bit, or 32-bit value, either from a single core_bus or as a result of the concatenation of two different core_buses as defined in the numeric field bits 10-14). For "a"= a single 8-bit, the upper 24-bis are sign extended. For "a"= a single 16-bit input operand, the upper 16-bit are sign extended. For "a"= two 8-bit input operands, the upper 8-bit of each operand are sign extended, then added to A3 and the result is stored into A3<br>Affected ccsts: OV_A3, C_A3 |
| ST_A3_y | A3<= a (a=8-bit) (a=16-bit) (a=32-bit) | 01011 | Store A3 (32-bit) with an input operand from core_bus.<br>The operand "a" from core_bus can be an 8-bit, or 16-bit, or 32-bit value, either from a single core_bus or as a result of the concatenation of two different core_buses as defined in the numeric field bits 10-14). For "a"= a single 8-bit, the upper 24-bits are set to 0. For "a"= a single 16-bit input operand, the upper 16-bits are set to 0. For "a"= two 8-bit input operands, the upper 8-bit of each operand are set to "0", then stored into A3.<br>Affected ccsts: OV_A3, C_A3. (all cleared) |

| | | | |
|---|---|---|---|
| AND_A3_y | A3<= A3 AND a (a=8-bit) (a=16-bit) (a=32-bit) | 01100 | AND A3 (32-bit) with an operand from core_bus. The operand "a" from core_bus can be an 8-bit, or 16-bit, or 32-bit value, either from a single core_bus or as a result of the concatenation of two different core_buses as defined in the numeric field bits 10-14). For "a"= a single 8-bit, the upper 24-bis are set to 0. For "a"= a single 16-bit input operand, the upper 16-bit are set to 0. For "a"= two 8-bit input operands, the upper 8-bit of each operand are set to "0". The result of the AND operation is stored in A3 Affected ccsts: OV_A3. (cleared) |
| OR_A3_y | A3<= A3 OR a (a=8-bit) (a=16-bit) (a-32-bit) | 01101 | OR A3 (32-bit) with an operand from core_bus. The operand "a" from core_bus can be an 8-bit, or 16-bit, or 32-bit value, either from a single core_bus or as a result of the concatenation of two different core_buses as defined in the numeric field bits 10-14). For "a"= a single 8-bit, the upper 24-bits are set to 0. For "a"= a single 16-bit input operand, the upper 16-bit are set to 0. For "a"= two 8-bit input operands, the upper 8-bit of each operand are set to "0". The result of the OR operation is stored in A3 Affected ccsts: OV_A3. (cleared) |
| EXOR_A3_y | A3<= A3 EXOR a (a=8-bit) (a=16-bit) (a=32-bit) | 01110 | EXOR A3 (32-bit) with an operand from core_bus. The operand "a" from core_bus can be an 8-bit, or 16-bit, or 32-bit value, either from a single core_bus or as a result of the concatenation of two different core_buses as defined in the numeric field bits 10-14). For "a"= a single 8-bit, the upper 24-bits are set to 0. For "a"= a single 16-bit input operand, the upper 16-bit are set to 0. For "a"= two 8-bit input operands, the upper 8-bit of each operand are set to "0". The result of the EXOR operation is stored in A3 Affected ccsts: OV_A3. (cleared) |
| NEG_A3 | A3<=0-A3 | 01111 | NEGATE A3 (32-bit). The content of the accumulator A3 is subtracted from 0, the result of the subtraction is stored into A3. Affected ccsts: OV_A3, C_A3. |
| EXTB_A3 | A3(32-bit) <=A3(8-bit extend) | 10000 | 8-bit sign extend to 32-bit into A3. Affected ccsts: OV_A3 (cleared) |
| EXTW_A3 | A3(32-bit) <=A3(16-bit extend) | 10001 | 16-bit sign extend to 32-bit into A3 Affected ccsts: OV_A3 (cleared) |
| ASR_A3 # bits | A3<=A3-> (bit0 =>Carry) (bit15=>bit14) | 10010 (bits 10-14 = number of bits to shift) | Arithmetic shift Right of # bit positions A3 Shift Arithmetically A3 with the specified number of bits N (up to 31) to the right. The carry bit receives the last LSB shifted out, it is cleared for a shift count of zero. N copies of the MSB of A3 are shifted into the N MSBs of A3. The result is stored into A3. Affected ccsts: C_A3 Cleared ccsts: OV_A3 |
| ASL_A3 # bits | A3<=A3<- (bit31=>Carry) (0=>bit0) | 10011 (bits 10-14 = number of bits to shift) | Arithmetic shift Left of # bit positions A3 Shift Arithmetically A3 with the specified number of bits N (up to 31) to the left. The carry bit receives the last MSB shifted out, it is cleared for a shift count of zero. N zeros are shifted into the N LSBs of the result. The result is stored into A3. Affected ccsts: C_A3 Cleared ccsts: OV_A3 |

| | | | |
|---|---|---|---|
| LSR_A3 # bits | A3<=A3-> (bit0=>Carry) (0=>bit31) | 10100 (bits 10-14 = number of bits to shift) | Logical shift Right of # bit positions A3<br>Shift Logically A3 with the specified number of bits N (up to 31) to the right. The carry bit receives the last LSB shifted out, it is cleared for a shift count of zero. N zeros are shifted into the N MSBs of A3. The result is stored into A3.<br>Affected ccsts: C_A3<br>Cleared ccsts: OV_A3 |
| LSL_A3 # bits | A3<=A3<- (bit31=>Carry) (0=>bit0) | 10101 (bits 10-14 = number of bits to shift) | Logical shift Left of # bit positions A3<br>Shift Logically A3 with the specified number of bits N (up to 31) to the left. The carry bit receives the last MSB shifted out, it is cleared for a shift count of zero. N zeros are shifted into the LSBs of the result. The result is stored into A3.<br>Affected ccsts: C_A3<br>Cleared ccsts: OV_A3 |
| ROR_A3 # bits | A3<=A3-> (bit0=>Carry) (Carry=>bit31) | 10110 (bits 10-14 = number of bits to shift) | Rotate A3 Right of # bit positions.<br>Rotate A3 with the specified number of bits N (up to 31) to the right. The carry bit receives the previous value of bit 0 of A3. The previous value of the carry bit is shifted into bit 31 of the result. This operation is done for the number of specified bits N. The result is stored into A3. The carry contains the last LSB shifted out<br>Affected ccsts: C_A3<br>Cleared ccsts: OV_A3 |
| ROL_A3 #bits | A3<=A3<- (bit31=>Carry) (Carry=>bit0) | 10111 (bits 10-14 = number of bits to shift) | Rotate A3 Left of # bit positions.<br>Rotate A3 with the specified number of bits N (up to 31) to the left. The carry bit receives the previous value of bit 31 of A3. The previous value of the carry bit is shifted into bit 0 of the result. This operation is done for the number of specified bits N. The result is stored into A3. The carry contains the last MSB shifted out<br>Affected ccsts: C_A3<br>Cleared ccsts: OV_A3 |
| CLR_A3 | A3<=0 | 11000 | The 32-bit of accumulator A3 are cleared to zero.<br>Affected ccsts: none<br>Cleared ccsts: OV_A3 |
| CLR24_A3 | A3(16-31)<=0 | 11001 | Bits 8-31 of accumulator A3 are cleared to zero<br>Affected ccsts: none<br>Cleared ccsts: OV_A3 |
| ABS_A3_y | A3<= \|a\| (a=8-bit ext.) (a=16-bit ext.) (a=32-bit) | 11010 | Absolute value of an operand from core_bus.<br>Checks the sign bit of the operand. If it is negative, the 2's complement is stored into A3. The operand may be 8-bit, 16-bit or 32-bit. In the first two cases sign extend to 32-bit is performed automatically before the 2's complement operation.<br>Affected ccsts: OV_A3 |
| ABS_A3 | A3<= \|A3\| | 11011 | Absolute value of an operand from A3.<br>Checks the sign bit of A3. If it is negative the 2's complement is stored into A3. If A3 does not contain a 32-bit value, sign extension must be performed manually.<br>Affected ccsts: OV_A3 |
| DEC_A3 | A3<=A3-1 | 11100 | Decrement by one accumulator A3<br>The result is stored into accumulator A3<br>Affected ccsts: OV_A3, C_A3 |
| INC_A3 | A3<=A3+1 | 11101 | Increment by one accumulator A3<br>The result is stored into accumulator A3<br>Affected ccsts: OV_A3, C_A3 |

| | | | |
|---|---|---|---|
| ACCC A3 _x | A3<=A3+a+ C (a=8-bit extend or 16-bit ext.) signed | 11110 | 32-bit + 32-bit+C Accumulate with Carry among A3 and an input signed operand. Accumulate to A3 (32-bit) a signed input operand. The operand "a" from core_bus can be an 8-bit, or 16-bit, or 32-bit value, either from a single core_bus or as a result of the concatenation of two different core_buses as defined in the numeric field bits 10-14). For "a"= a single 8-bit, the upper 24-bits are sign extended. For "a"= a single 16-bit input operand, the upper 16-bit are sign extended. For "a"= two 8-bit input operands, the upper 8-bit of each operand are sign extended, then added to A3+Carry and the result is stored into A3 .Affected ccsts: OV_A3, C_A3 |
| NOT_A3 | A3<= NOT A3 | 11111 | Logical Complement of the accumulator A3. The one's complement of A3 is calculated. The result is stored into A3. Affected ccsts: none Cleared ccsts: OV_A3 |

ALU1 and ALU2 Units (bits 87-83 and 82-78)

The arithmetic logic units (ALU1 20 and ALU2 22) have an instruction field of five bits wide and control the operation of the ALU1 and ALU2. A detailed diagram of ALU1 and ALU2 is shown in Figure 88. The registers of the ALU1 and ALU2 are 32 bits wide and are called A1 and A2, respectively. Reading A1 and A2 registers is covered in the section describing the core Bus Control. To increase parallel operations, A1 can be read through core Buses "A" and "C", while A2 can be read by core Buses "B" and "D". Detailed description of all operations performed by the Arithmetic Logic Units are listed in. The same operations listed on Table A-3 can be applied to ALU2 or ALU1 by replacing A2 or A1 for each A? encountered. The Carry and Overflow bits are set and cleared as follows: for "unsigned" arithmetic operations Overflow = Carry. For signed operations, overflow is set when the "Carry IN" to bit-31 of the result differs from the "Carry OUT" of bit-31 (bit-32). If "Carry IN" = "Carry OUT", then Overflow bit is cleared.

Table A-3 ALU1 Operations

| Mnemonic | Operations | Binary Code | Description |
|---|---|---|---|
| | nop | 00000 | No Operation. |
| ADDU_A?_x<br><br>ACCU_A?_x | A?<= a+b<br>(a, b=8-bit or 16-bit)<br>unsigned<br>or<br><br>A?<=A?+a<br>(a=8-bit<br>or 16-bit)<br>unsigned | 00001 | 16-bit + 16-bit Addition of two input unsigned operand.<br>32-bit + 16-bit Accumulate among A? and an input unsigned operand.<br>Depending on the value in the numeric field bits 0-9, the user can perform either the addition between two input operands or accumulate A? with an input operand.<br>In the first case it performs the addition of two unsigned operands (8-bit, or 16-bit) from the specified core_buses and stores the 32-bit result on A? For "a" and "b" = two 8-bit input operands, the upper 8-bits of each operand are set to zero.<br>In the second case it accumulates with A? (32-bit) an unsigned input operand. The operand "a" from core_bus can be an 8-bit, or 16-bit value from a single core_bus. For "a"= a single 8-bit, the upper 8-bits are set to zero, then added to A? and the result is stored into A?.<br>Affected ccsts: OV_A?, C_A?, P_A?, Z_A?<br>Cleared ccsts :N_A? |
| ADDS_A?_x<br>ACCS_A?_x | A?<=A?+a | 00010 | 16-bit + 16-bit Addition between two input signed operands.<br>32-bit + 16-bit Accumulate among A? and an input signed operand.<br>Depending on the value in the numeric field bits 0-9, the user can perform either the addition between two input operands or accumulate A? with an input operand.<br>In the first case it performs the addition of two signed operands (8-bit, or 16-bit) from the specified core_buses and stores the 32-bit result on A? For "a" and "b" = two 8-bit input operand, they are signed extended before performing the addition.<br>In the second case it accumulates with A? (32-bit) a signed input operand. The operand "a" from core_bus can be an 8-bit, or 16-bit value from a single core_bus. For "a"= a single 8-bit operand, it is sign extended, then added to A? and the result is stored into A?.<br>Affected ccsts: OV_A?, C_A?, P_A?, Z_A?, N_A? |
| ACCC_A?_x | A?<=A?+a+C<br>(a, b=8-bit or 16-bit or 32-bit)<br>signed | 00011 | 32-bit + 16-bit + Carry Accumulate among A? and only one input signed operand.<br>Accumulate with A? + Carry (32-bit) a signed input operand. The operand "a" from core_bus (see bits 0-9) can be an 8-bit, or 16-bit or 32-bit value from a single core_bus. For "a"= a single 8-bit or 16-bit it is sign extended, then added to A? + Carry, and the result is stored into A?<br>Affected ccsts: OV_A?, C_A?, P_A?, Z_A?, N_A3 |

| | | | |
|---|---|---|---|
| ADDI_A?_B | A?<= A?+B<br>signed | 00100 | 32-bit + 16-bit Accumulate among A? and an input signed operand.<br>Accumulate to A? (32-bit) a signed input operand. This instruction, different from ADDS, allows to add a constant through core_bus B in one cycle. Note that the other units cannot have input operands while executing this instruction. The operand from core_bus B must be a 16-bit signed value.<br>Affected ccsts: OV_A?, C_A?, P_A?, Z_A?, N_A? |
| ADDI_A?_D | A?<= A?+D<br>signed | 00101 | 32-bit + 16-bit Accumulate among A? and an input signed operand.<br>Accumulate to A? (32-bit) an signed input operand. This instruction, different from ADDS, allows to add a constant through core_bus D in one cycle. Note that the other units cannot have input operands while executing this instruction. The operand from core_bus D must be a 16-bit signed value.<br>Affected ccsts: OV_A?, C_A?, P_A?, Z_A?, N_A? |
| SUBU_A?_y | A?<= a-b<br>or<br>A?<=A?-a<br>(a, b=8-bit or 16-bit or 32-bit)<br>unsigned | 00110 | 16-bit - 16-bit Subtraction between two input unsigned operands.<br>32-bit - 16-bit Accumulate among A? and only one input unsigned operand.<br>Depending on the value in the numeric field bits 0-9, the user can perform either the subtraction between two input operands or subtract an input operand from A?<br>In the first case it performs the subtraction of two unsigned operands (8-bit, or 16-bit) from the specified core_buses and stores the 32-bit result on A? For "a" and "b" = two 8-bit input operand, the upper 8-bits of each operand are set to zero<br>In the second case it subtracts an unsigned input operand from A? (32-bit). The operand "a" from core_bus can be an 8-bit, or 16-bit or 32-bit value from a single core_bus. For "a"= a single 8-bit or 16-bit, it is sign extended then subtracted from A? and the result is stored into A?<br>Affected ccsts: OV_A?, C_A?, P_A?, Z_A?<br>Cleared ccsts: N_A? |
| SUBS_A? y | A?<= a-b<br>or<br>A?<=A?-a<br>(a, b=8-bit or 16-bit)<br>signed | 00111 | 16-bit - 16-bit Subtraction between two input signed operands.<br>32-bit - 16-bit Subtraction among A? and an input signed operand.<br>Depending on the value in the numeric field bits 0-9, the user can perform either the subtraction between two input operand or subtract an input operand from A?<br>In the first case it performs the subtraction of two signed operands (8-bit, or 16-bit) from the specified core_buses and stores the 32-bit result in A? For "a" and "b" = two 8-bit input operands, they are signed extended before performing the subtraction.<br>In the second case it subtracts a signed input operand from A? (32-bit). The operand "a" from core_bus can be an 8-bit, or 16-bit value from a single core_bus. For "a"= a single 8-bit, it is sign extended, then subtracted from A? and the result is stored into A?.<br>Affected ccsts: OV_A?, C_A?, P_A?, Z_A?, N_A? |

| | | | |
|---|---|---|---|
| SUBC_A?_y | A?<= a-b-C<br>or<br>A?<=A?-a-C<br>(a, b=8-bit or 16-bit)<br>signed | 01000 | 32-bit - 16-bit - Carry Subtraction among A? and an input signed operand.<br>Subtract a signed input operand from A? + Carry (32-bit). The operand "a" from core_bus (see bits 0-9) can be an 8-bit, or 16-bit value from a single core_bus. For "a"= a single 8-bit it is sign extended, then subtracted from A? + Carry and the result is stored into A?.<br>Affected ccsts: OV_A?, C_A?, P_A?, Z_A?, N_A? |
| SUBI_A?_B | A?<= A?-B<br>signed | 01001 | 32-bit - 16-bit Subtraction among A? and an input signed operand.<br>Subtract from A? (32-bit) a signed input operand. This instruction, different from ADDS, allows to subtract a constant through core_bus B in one cycle. Note that the other units cannot have input operands. The operand from core_bus B must be a 16-bit signed value.<br>Affected ccsts: OV_A?, C_A?, P_A?, Z_A?, N_A? |
| SUBI_A?_D | A?<= A?-D<br>signed | 01010 | 32-bit - 16-bit Subtraction among A? and an input signed operand.<br>Subtract from A? (32-bit) a signed input operand. This instruction, different from ADDS, allows to subtract a constant through core_bus D in one cycle. Note that the other units cannot have input operands. The operand from core_bus D must be a 16-bit signed value.<br>Affected ccsts: OV_A?, C_A?, P_A?, Z_A?, N_A? |
| ST_A?_y | A?<= a<br>(a=8-bit)<br>(a=16-bit)<br>(a=32-bit) | 01011 | Store A? (32-bit) with an input operand from core_bus.<br>The operand "a" from core_bus can be an 8-bit, or 16-bit, or 32-bit value, either from a single core_bus or as a result of the concatenation of two different core_buses (as defined in the numeric field bits 0-9). For "a"= a single 8-bit, the upper 24-bits are set to 0. For "a"= a single 16-bit input operand, the upper 16-bit are set to 0. For "a"= two 8-bit input operands, the upper 8-bits of each operand are set to "0", then stored in A3.<br>Affected ccsts: P_A?, Z_A?, N_A?.<br>Cleared ccsts: OV_A?, C_A? |
| AND_A?_y | A?<=<br>A? AND a<br>(a=8-bit)<br>(a=16-bit)<br>(a=32-bit) | 01100 | AND A? (32-bit) with an operand from core_bus.<br>The operand "a" from core_bus can be an 8-bit, or 16-bit, or 32-bit value, either from a single core_bus or as a result of the concatenation of two different core_buses as defined in the numeric field bits 0-9). For "a"= a single 8-bit, the upper 24-bits are set to 0. For "a"= a single 16-bit input operand, the upper 16-bits are set to 0. For "a"= two 8-bit input operands, the upper 8-bits of each operand are set to "0". The result of the AND operation is stored in A?<br>Affected ccsts: P_A?, Z_A?, N_A?.<br>Cleared ccsts: OV_A? |

| | | | |
|---|---|---|---|
| OR A3 y | A3<=<br>A3 OR a<br>(a=8-bit)<br>(a=16-bit)<br>(a=32-bit) | 01101 | OR A? (32-bit) with an operand from core_bus.<br>The operand "a" from core_bus can be an 8-bit, or 16-bit, or 32-bit value, either from a single core_bus or as a result of the concatenation of two different core_buses (as defined in the numeric field bits 0-9). For "a"= a single 8-bit, the upper 24-bits are set to 0. For "a"= a single 16-bit input operand, the upper 16-bits are set to 0. For "a"= two 8-bit input operands, the upper 8-bits of each operand are set to "0". The result of the OR operation is stored in A?<br>Affected ccsts: P_A?, Z_A?, N_A?.<br>Cleared ccsts: OV_A? |
| EXOR_A?_y | A?<-<br>A? EXOR a<br>(a=8-bit)<br>(a=16-bit)<br>(a=32-bit) | 01110 | EXOR A? (32-bit) with an operand from core_bus.<br>The operand "a" from core_bus can be an 8-bit, or 16-bit, or 32-bit value, either from a single core_bus or as a result of the concatenation of two different core_buses (as defined in the numeric field bits 0-9). For "a"= a single 8-bit, the upper 24-bits are set to 0. For "a"= a single 16-bit input operand, the upper 16-bits are set to 0. For "a"= two 8-bit input operands, the upper 8-bits of each operand are set to "0". The result of the EXOR operation is stored in A?<br>Affected ccsts: P_A?, Z_A?, N_A?.<br>Cleared ccsts: OV_A? |
| NEG_A? | A?<=<br>0-A?<br>(user must take care of extending 8-bit, 16-bit) | 01111 | NEGATE A? (32-bit).<br>The content of the accumulator A? is subtracted from 0, the result of the subtraction is stored into A?.<br>Affected ccsts: OV_A?, C_A?, P_A?, Z_A?, N_A? |
| EXTB_A? | A?(32-bit)<br><=A?(8-bit extend) | 10000 | 8-bit sign extend to 32-bit into A?.<br>Affected ccsts: P_A?, Z_A?, N_A?<br>Cleared ccsts: OV_A? |
| EXTW_A? | A?(32-bit)<br><=A?(16-bit extend) | 10001 | 16-bit sign extend to 32-bit into A?<br>Affected ccsts: P_A?, Z_A?, N_A?<br>Cleared ccsts: OV_A? |
| ASR_A? #bits | A?<=A?-><br>(bit0 =>Carry)<br>(bit15=>bit14) | 10010<br>(bits 10-14<br>= number of bits to shift) | Arithmetic Barrel shift Right of #bit positions A3<br>Shift Arithmetically A? with the specified number of bits N (up to 31) to the right. The carry bit receives the last LSB shifted out, it is cleared for a shift count of zero. N copies of the MSB of A? are shifted into the N MSBs of A?. The result is stored into A?.<br>Affected ccsts: C_A?, P_A?, Z_A?, N_A?<br>Cleared ccsts: OV_A? |
| ASL_A? #bits | A?<-A?<-<br>(bit31=>Carry)<br>(0=>bit0) | 10011<br>(bits 10-14<br>= number of bits to shift) | Arithmetic Barrel shift Left of #bit positions A?<br>Shift Arithmetically A? with the specified number of bits N (up to 31) to the left. The carry bit receives the last MSB shifted out, it is cleared for a shift count of zero. N zeros are shifted into the N LSBs of the result. The result is stored into A?.<br>Affected ccsts: C_A?, P_A?, Z_A?, N_A?<br>Cleared ccsts: OV_A? |
| LSR_A? #bits | A?<=A?-><br>(bit0=>Carry)<br>(0=>bit31) | 10100<br>(bits 10-14<br>= number of bits to shift) | Logical Barrel shift Right of #bit positions A?<br>Shift Logically A? with the specified number of bits N (up to 31) to the right. The carry bit receives the last LSB shifted out, it is cleared for a shift count of zero. N zeros are shifted into the N MSBs of A3. The result is stored into A?.<br>Affected ccsts: C_A?, P_A?, Z_A?, N_A?<br>Cleared ccsts: OV_A? |

| | | | |
|---|---|---|---|
| LSL_A? #bits | A?<=A?<-<br>(bit31=>Carry)<br>(0=>bit0) | 10101<br>(bits 10-14<br>= number of bits to shift) | Logical Barrel shift Left of #bit positions A?<br>Shift Logically A? with the specified number of bits N (up to 31) to the left. The carry bit receives the last MSB shifted out, it is cleared for a shift count of zero. N zeros are shifted into the LSBs of the result. The result is stored into A?.<br>Affected ccsts: C_A?, P_A?, Z_A?, N_A?<br>Cleared ccsts: OV_A? |
| ROR_A? #bits | A?<=A?-><br>(bit0=>Carry)<br>(Carry=>bit31) | 10110<br>(bits 10-14<br>= number of bits to shift) | Rotate A? Right of #bit positions.<br>Rotate A? with the specified number of bits N (up to 31) to the right. The carry bit receives the previous value of bit 0 of A?. The previous value of the carry bit is shifted into bit 31 of the result. This operation is done for the number of specified bits N. The result is stored into A?. The carry contains the last LSB shifted out<br>Affected ccsts: C_A?, P_A?, Z_A?, N_A?<br>Cleared ccsts: OV_A? |
| ROL_A? #bits | A?<=A?<-<br>(bit31=>Carry)<br>(Carry=>bit0) | 10111<br>(bits 10-14<br>= number of bits to shift) | Rotate A? Left of #bit positions.<br>Rotate A? with the specified number of bits N (up to 31) to the left. The carry bit receives the previous value of bit 31 of A?. The previous value of the carry bit is shifted into bit 0 of the result. This operation is done for the number of specified bits N. The result is stored into A?. The carry contains the last MSB shifted out<br>Affected ccsts: C_A?, P_A?, Z_A?, N_A?<br>Cleared ccsts: OV_A? |
| CLR_A? | A?<=0 | 11000 | The 32-bit of accumulator A? are cleared to zero. |
| CLR24_A? | A?(16-31)<=0 | 11001 | Bits 8-31 of accumulator A? are cleared to zero |
| ABS_A?_y | A?<= \|a<br>(a=8-bit ext.)<br>(a=16-bit ext.)<br>(a=32-bit) | 11010 | Absolute value of an operand from core_bus.<br>Checks the sign bit of the operand. If it is negative, it calculate the 2's complement and store it into A?. The operand may be 8-bit, 16-bit or 32-bit. In the first two cases sign extend to 32-bit is performed automatically before the 2's complement operation.<br>Affected ccsts: OV_A?, P_A?, Z_A?, N_A? |
| ABS_A? | A?<= \|A?\| | 11011 | Absolute value of an operand from A?.<br>Checks the sign bit of A?. If it is negative, it calculate the 2's complement and store it into A?. If A? does not contain a 32-bit value, sign extension must be performed manually.<br>Affected ccsts: OV_A?, P_A?, Z_A?, N_A? |
| DEC_A? | A?<=A?-1 | 11100 | Decrement by one accumulator A?<br>The result is stored into accumulator A?<br>Affected ccsts: OV_A?, C_A?, P_A?, Z_A?, N_A? |
| INC_A? | A?<=A?+1 | 11101 | Increment by one accumulator A?<br>The result is stored into accumulator A?<br>Affected ccsts: OV_A?, C_A?, P_A?, Z_A?, N_A? |
| TST_A? #bit | ccsts Z_A?<= #bit | 11110 | BIT test on A?<br>A user specified #bit of the accumulator A? is copied into the ccsts flag Z_A? The content of the accumulator A? remains unchanged.<br>Affected ccsts: Z_A?.<br>Cleared ccsts: OV_ccsts |

| | | | |
|---|---|---|---|
| NOT A? | A?<= NOT A? | 11111 | Logical Complement of the accumulator A?. The one's complement of A? is calculated. The result is stored into A?. Affected ccsts: P_A?, Z_A?, N_A? Cleared ccsts: OV_A? |

Register File Unit (bits 77-64)

The Register File contains 32 registers, each 16 bits wide. Two registers can be written into at the same time through register file buses AR and BR. One value can be written into one of the registers 0 through 15, while another value can be written into one of the registers 16 through 31. According to the register file design, four registers can be read at the same time. Reading of the registers is covered in the Core Bus Control section. In order to have the complete data path set for a write operation one must establish the connection first from the selected core bus where the input data originated, to the register file bus AR or BR (Table A-4 and). Furthermore the connection between one of the two register file buses must be connected to a specific register (Table A-6, Table A-7).

Table A-4. Datapath from core Bus "x" to register file "AR".

| Mnemonic | Operations | Binary Code (bits in longword) | Description |
|---|---|---|---|
| | nop | 000 | No Operation |
| | A to AR | 001 | Data on Bus A to Register file AR |
| | B to AR | 010 | Data on Bus B to Register file AR |
| | C to AR | 011 | Data on Bus D to Register file AR |
| | D to AR | 100 | Data on Bus D to Register file AR |
| | nop | 101 | No Operation |
| | nop | 110 | No Operation |
| | nop | 111 | No Operation |

Table A-5 Datapath from core Bus "x" to register file "BR"

| Mnemonic | Operations | Binary Code (bits in longword) | Description |
|---|---|---|---|
| | nop | 000 | No Operation |
| | A to BR | 001 | Data on Bus A to Register file BR |
| | B to BR | 010 | Data on Bus B to Register file BR |
| | C to BR | 011 | Data on Bus D to Register file BR |
| | D to BR | 100 | Data on Bus D to Register file BR |
| | nop | 101 | No Operation |
| | nop | 110 | No Operation |
| | nop | 111 | No Operation |

Table A-6 Datapath from register file "AR" to register "x"

| Mnemonic | Operations | Binary Code (bits in longword) | Description |
|---|---|---|---|
| | AR to R0 | 0000 | Data from the Register file AR to Register R0 |
| | AR to R1 | 0001 | Data from the Register file AR to Register R1 |
| | AR to R2 | 0010 | Data from the Register file AR to Register R2 |
| | AR to R3 | 0011 | Data from the Register file AR to Register R3 |
| | AR to R4 | 0100 | Data from the Register file AR to Register R4 |
| | AR to R5 | 0101 | Data from the Register file AR to Register R5 |
| | AR to R6 | 0110 | Data from the Register file AR to Register R6 |
| | AR to R7 | 0111 | Data from the Register file AR to Register R7 |
| | AR to R8 | 1000 | Data from the Register file AR to Register R8 |
| | AR to R9 | 1001 | Data from the Register file AR to Register R9 |
| | AR to R10 | 1010 | Data from the Register file AR to Register R10 |
| | AR to R11 | 1011 | Data from the Register file AR to Register R11 |
| | AR to R12 | 1100 | Data from the Register file AR to Register R12 |
| | AR to R13 | 1101 | Data from the Register file AR to Register R13 |
| | AR to R14 | 1110 | Data from the Register file AR to Register R14 |
| | AR to R15 | 1111 | Data from the Register file AR to Register R15 |

Table A-7 Datapath from register file "BR" to register "x"

| Mnemonic | Operations | Binary Code (bits in longword) | Description |
|---|---|---|---|
| | BR to R16 | 0000 | Data from the Register file BR to Register R16 |
| | BR to R17 | 0001 | Data from the Register file BR to Register R17 |
| | BR to R18 | 0010 | Data from the Register file BR to Register R18 |
| | BR to R19 | 0011 | Data from the Register file BR to Register R19 |
| | BR to R20 | 0100 | Data from the Register file BR to Register R20 |
| | BR to R21 | 0101 | Data from the Register file BR to Register R21 |
| | BR to R22 | 0110 | Data from the Register file BR to Register R22 |
| | BR to R23 | 0111 | Data from the Register file BR to Register R23 |
| | BR to R24 | 1000 | Data from the Register file BR to Register R24 |
| | BR to R25 | 1001 | Data from the Register file BR to Register R25 |
| | BR to R26 | 1010 | Data from the Register file BR to Register R26 |
| | BR to R27 | 1011 | Data from the Register file BR to Register R27 |
| | BR to R28 | 1100 | Data from the Register file BR to Register R28 |
| | BR to R29 | 1101 | Data from the Register file BR to Register R29 |
| | BR to R30 | 1110 | Data from the Register file BR to Register R30 |
| | BR to R31 | 1111 | Data from the Register file BR to Register R31 |

Comparator Unit (bits 63-60)

The comparator unit of Figure 91 contains 32 registers, each 16-bits wide, connected to 32 comparators of the same width. The 32 registers/comparators are grouped in four blocks, each having one input of the comparators connected to each core bus A, B, C, and D. Values are preloaded into the registers during initialization from RS232 port. When this instruction is issued, all comparisons are made in one cycle against the values on the four core buses, and only the code selected in the instruction word relative to this field, as described, will affect the 3D-Flow processor condition code.

In order to execute this instruction that will set the comparator condition flag according to the result of the comparison performed with the selected threshold register and to have the encoding values of all ranges of thresholds against the values on the four core buses, the user has to select the bank of eight thresholds out of four possible connected to the four core buses and the threshold within the selected bank. This requires two instructions: first the user will select the bank (see line 1 to 5 in Table A-8), and second instruction, the user will select one of the eight thresholds values within that register bank (see line 6 to line 13 of Table A-8) against which the input value from the specified core bus has to be compared. Subsequent comparison with threshold registers belonging to the same bank will require only one instruction, the one selecting a different register within that bank

Table A-8 Comparator

| **Mnemonic** | **Operations** | **Binary bits(63-60)** | **Description** |
|---|---|---|---|
| No operation | No operation | 0000 | No operation |
| CMP_A | TR0-7 <> A | 0001 | Set Flags Using Bank A. Use Bank A to set the Comparator status flags |
| CMP_B | TR8-15 <> B | 0010 | Set Flags Using Bank B. Use Bank B to set the Comparator status flags |
| CMP_C | TR16-23 <> C | 0011 | Set Flags Using Bank C. Use Bank C to set the Comparator status flags |
| CMP_D | TR24-31 <> D | 0100 | Set Flags Using Bank D. Use Bank D to set the Comparator status flags |
| CMP_TRx0 | TRx0 <> CBUS | 0101 | Set Flags Using Threshold Value 0. Compare the input data to Threshold Register 0 within the selected Bank. Set flags and output word. |
| CMP_TRx1 | TRx1 <> CBUS | 0110 | Set Flags Using Threshold Value 1. Compare the input data to Threshold Register 1 within the selected Bank. Set flags and output word. |
| CMP_TRx2 | TRx2 <> CBUS | 0111 | Set Flags Using Threshold Value 2. Compare the input data to Threshold Register 2 within the selected Bank. Set flags and output word. |
| CMP_TRx3 | TRx3 <> CBUS | 1000 | Set Flags Using Threshold Value 3. Compare the input data to Threshold Register 3 within the selected Bank. Set flags and output word. |
| CMP_TRx4 | TRx4 <> CBUS | 1001 | Set Flags Using Threshold Value 4. Compare the input data to Threshold Register 4 within the selected Bank. Set flags and output word. |
| CMP_TRx5 | TRx5 <> CBUS | 1010 | Set Flags Using Threshold Value 5. Compare the input data to Threshold Register 5 within the selected Bank. Set flags and output word. |
| CMP_TRx6 | TRx6 <> CBUS | 1011 | Set Flags Using Threshold Value 6. Compare the input data to Threshold Register 6 within the selected Bank. Set flags and output word. |
| CMP_TRx7 | TRx7 <> CBUS | 1100 | Set Flags Using Threshold Value 7. Compare the input data to Threshold Register 7 within the selected Bank. Set flags and output word. |
| CMPU_BC | B<>C | 1101 | Compare the data on core bus B with data on core bus C |
| CMPU_BD | B<>D | 1110 | Compare the data on core bus B with data on core bus D |
| CMPU_AD | A<>D | 1111 | Compare the data on core bus A with data on core bus D |

Multi-hit encoder unit (bits 59-58)

The multi-hit encoder encodes all rising edges (from logic zero to logic one) in a 16-bit input word and its relative length of bits set to one after the rising edge. The maximum number of edges in a 16-bit word is thus eight. The format of the encoded information that is written in sequence into the data memory is of the type: (1) number of hits; (2) position in the word (counting from the most significant bit); (3) length of the bits set to one after the rising edge. A Detailed description of all operations performed by the Multi-hit encoder unit is listed in Table A-9 below.

Data memories (bits 57-55 and 54-52)

The two data memories have 256 memory locations, each with 16 bits, to store data. Address of the two data memory banks 8-bit each can be generated by the processor by selecting the appropriate path bymeans of the microcode and placed either on core bus B or core bus D, or the addresses can be defined in the numeric part of the user program in as an immediate address to be loaded. See the description below concerning numeric. The data memory to be written or read at a specified memory location can be coupled to any unit through the core buses A or B, or D for data memory and through the buses B or C, or D for data memory.

Details of the operations that can be performed on the two data memory banks are described in Table A-10 and Table A-11. The data path connection to the core Bus is specified in the next section, core Bus Control. See Section 5.3.4 for more details and for explanation of Figure 89.

Table A-9 Detailed Description of Operations Performed by Multi-Hit Encoder

| Mnemonic | Operations | Binary Code | Description |
|---|---|---|---|
| ENC_A | Shift+Next-Load A | 10 | Shift 16-bit position to the right, fetch next 16-bit from bus A, and encode the previous 16-bits to the right. |
| ENCINI_CA | Load-Init A-C | 01 | Encode first data fetched from buses C, A (bus A is also fetched to check the boundary hits) |
| ENC_RD_x | READ B-D | 11 | Place the Next data word onto Bus |

Table A-10. Data Memory 1.

| Mnemonic | Operations | Binary | Description |
|---|---|---|---|
| no mnemonic | nop | 000 | No operation |
| RD_DM1_Blo_x | RD DM1; Blo=Addr (Data A-B-D) | 001 | Read Data Memory 1 at Address specified by value on core Bus Blo. Data will be available on either core Buses A or B or D |
| RD_DM1_Bhi_x | RD DM1; Bhi=Addr; (Data A-B-D) | 010 | Read Data Memory 1 at Address specified by value on core Bus Bhi. Data will be available on either core Buses A or B or D) |
| RD_DM1_Dlo_x | RD DM1; Dlo=Addr; (Data A-B-D) | 011 | Read Data Memory 1 at Address specified by value on core Bus Dlo. Data will be available on either core Buses A or B or D) |
| RD_DM1_Dhi_x | RD DM1; Dhi=Addr; (Data A-B-D) | 100 | Read Data Memory 1 at Address specified by value on core Bus Dhi. Data will be available on either core Buses A or B or D) |
| WR_DM1_B_A | WR DM1; D=Addr; A=data | 101 | Write Data Memory 1 at Address specified by value on core Bus B. Data to be written is available on core Bus A |
| WR_DM1_B_D | WR DM1; B=Addr; D=data | 110 | Write Data Memory 1 at Address specified by value on core Bus B. Data to be written is available on core Bus D |
| WR_DM1_D_B | WR DM1; D=Addr; B=Data; | 111 | Write Data Memory 1 at Address specified by the value on core Bus D. Data to be written is available on core Bus B. |
| no mnemonic | | | |

Table A-11. Data Memory 2.

| Mnemonic | Operations | Binary | Description |
|---|---|---|---|
| no mnemonic | nop | 000 | No operation |
| RD_DM2_Blo_x | RD DM2; Blo=Addr (Data A-B-D) | 001 | Read Data Memory 2 at Address specified by value on core Bus Blo. Data will be available on either core Buses A or B or D |
| RD_DM2_Bhi_x | RD DM2; Bhi=Addr; (Data A-B-D) | 010 | Read Data Memory 2 at Address specified by value on core Bus Bhi. Data will be available on either core Buses A or B or D) |
| RD DM2 Dlo_x | RD DM2; Dlo=Addr; (Data A-B-D) | 011 | Read Data Memory 2 at Address specified by value on core Bus Dlo. Data will be available on either core Buses A or B or D) |
| RD_DM2_Dhi_x | RD DM2; Dhi=Addr; (Data A-B-D) | 100 | Read Data Memory 2 at Address specified by value on core Bus Dhi. Data will be available on either core Buses A or B or D) |
| WR_DM1_B_C | WR DM1; B=Addr; C=data | 101 | Write Data Memory 1 at Address specified by value on core Bus B. Data to be written is available on core Bus C |
| WR_DM1 B_D | WR DM1; B=Addr; D=data | 110 | Write Data Memory 1 at Address specified by value on core Bus B. Data to be written is available on core Bus D |
| WR_DM1_D_B | WR DM1; D=Addr; B=Data; | 111 | Write Data Memory 1 at Address specified by the value on core Bus D. Data to be written is available on core Bus B. |

Core Bus Control (bits 51-36)

The processor architecture provides four internal16-bit wide buses (A, B, C, and D) that interconnect all the internal units (or devices). Another set of 3-ring buses provides the interface between the processor and external devices (input/output ports) and the internal units (core buses and ALUs, MAC, register. Files, etc.). The microcode field relative to the core Bus control unit establishes the connection between the different units through a specific path. The setup of the path is according to the requirements that have to be performed by the specific unit that is carrying out the operation. (Refer to the previously described units in order to select the data path.) The processor architecture is constructed in such a way that the programmer can attach to core Bus A, or B, or C, or D a different device, as specified in Table A-12.

Table A-13, Table A-14 and Table A-15 respectively. A "device" can be one of the following: Reg., A1, A2, A3, DM1, DM2, RS232, Ring Bus, Constant, Comparator output Reg., or Encoder output, Timer, Input / Output, status register, condition code status register.

Table A-12. Datapath from device "x" to core bus A.

| Mnemonic | Operations | Binary Code | Description |
|---|---|---|---|
| no mnemonic | R0 to A | 0000 | core Bus A is connected to Reg. 0 |
| | R1 to A | 0001 | core Bus A is connected to Reg. 1 |
| | R2 to A | 0010 | core Bus A is connected to Reg. 2 |
| | R3 to A | 0011 | core Bus A is connected to Reg. 3 |
| | R4 to A | 0100 | core Bus A is connected to Reg. 4 |
| | R5 to A | 0101 | core Bus A is connected to Reg. 5 |
| | R6 to A | 0110 | core Bus A is connected to Reg. 6 |
| | R7 to A | 0111 | core Bus A is connected to Reg. 7 |
| | A1hi to A | 1000 | core Bus A is connected to A1hi |
| | A1lo to A | 1001 | core Bus A is connected to A1lo |
| | A3hi to A | 1010 | core Bus A is connected to A3hi |
| | A3lo to A | 1011 | core Bus A is connected to A3lo |
| | DM1-data to A | 1100 | core Bus A is connected to DM1-data |
| | Ring A to A | 1101 | core Bus A is connected to Ring A Bus |
| | Out-Comp to A | 1110 | core Bus A is connected to the out-Comparator |
| | ENC. to A. | 1111 | core Bus A is connected to the out-Encoder |

Table A-13 Datapath from device "x" to core bus B

| Mnemonic | Operations | Binary Code | Description |
|---|---|---|---|
| | R8 to B | 0000 | core Bus B is connected to Reg. 8 |
| | R9 to B | 0001 | core Bus B is connected to Reg. 9 |
| | R10 to B | 0010 | core Bus B is connected to Reg. 10 |
| | R11 to B | 0011 | core Bus B is connected to Reg. 11 |
| | R12 to B | 0100 | core Bus B is connected to Reg. 12 |
| | R13 to B | 0101 | core Bus B is connected to Reg. 13 |
| | R14 to B | 0110 | core Bus B is connected to Reg. 14 |
| | R15 to B | 0111 | core Bus B is connected to Reg. 15 |
| | A2hi to B | 1000 | core Bus B is connected to A2hi |
| | A2lo to B | 1001 | core Bus B is connected to A2lo |
| | iosts to B | 1010 | core Bus B is connected to the "iosts" register |
| | Constant to B | 1011 | core Bus B has the value of the Constant defined in the numeric field (bits 0-15). |
| | DM1 to B | 1100 | core Bus B is connected to DM1-data |
| | Ring B to B | 1101 | core Bus B is connected to Ring Bus B |
| | ccsts to B | 1110 | core Bus B is connected to the "ccsts" register |
| | DM2 to B | 1111 | core Bus B is connected to DM2 Data |

Table A-14. Datapath from device "x" to core bus C.

| Mnemonic | Operations | Binary Code | Description |
|---|---|---|---|
| | R16 to C | 0000 | core Bus C is connected to Reg. 16 |
| | R17 to C | 0001 | core Bus C is connected to Reg. 17 |
| | R18 to C | 0010 | core Bus C is connected to Reg. 18 |
| | R19 to C | 0011 | core Bus C is connected to Reg. 19 |
| | R20 to C | 0100 | core Bus C is connected to Reg. 20 |
| | R21 to C | 0101 | core Bus C is connected to Reg. 21 |
| | R22 to C | 0110 | core Bus C is connected to Reg. 22 |
| | R23 to C | 0111 | core Bus C is connected to Reg. 23 |
| | A1hi to C | 1000 | core Bus C is connected to A1hi |
| | A1lo to C | 1001 | core Bus C is connected to A1lo |
| | A3hi to C | 1010 | core Bus C is connected to A3hi |
| | A3lo to C | 1011 | core Bus C is connected to A3lo |
| | DM2-data to C | 1100 | core Bus C is connected to DM2-data |
| | Ring A to C | 1101 | core Bus C is connected to Ring A Bus |
| | Out-Comp to C | 1110 | core Bus C is connected to the Out-Comparator |
| | iosts. to C | 1111 | iosts input/output status register to C |

Table A-15. Datapath from Device "x" to core Bus D.

| Mnemonic | Operations | Binary Code | Description |
|---|---|---|---|
| | R24 to D | 0000 | core Bus D is connected to Reg. 0 |
| | R25 to D | 0001 | core Bus D is connected to Reg. 1 |
| | R26 to D | 0010 | core Bus D is connected to Reg. 2 |
| | R27 to D | 0011 | core Bus D is connected to Reg. 3 |
| | R28 to D | 0100 | core Bus D is connected to Reg. 4 |
| | R29 to D | 0101 | core Bus D is connected to Reg. 5 |
| | R30 to D | 0110 | core Bus D is connected to Reg. 6 |
| | R31 to D | 0111 | core Bus D is connected to Reg. 7 |
| | A2hi to D | 1000 | core Bus D is connected to A2hi |
| | A2lo to D | 1001 | core Bus D is connected to A2lo |
| | Ring C to D | 1010 | core Bus D is connected to the Ring C bus |

| | | | |
|---|---|---|---|
| | Constant to D | 1011 | core Bus D has the value of the constant defined in NUMERIC field (bits 0-15). |
| | DM2-data to D | 1110 | core Bus D is connected to DM2-data |
| | Ring B to D | 1101 | core Bus D is connected to Ring D |
| | Timer to D | 1110 | core Bus D is connected to the Timer |
| | DM1 to D | 1111 | core Bus D is connected to DM1-data |

Ring Bus Control (bits 35-27)

Selection of the input data from the input ports top, North, East, West, and South is accomplished by means of the path selection with the microcode of, Table A-16, Table A-17, Table A-18 and Table A-19. The 3D-Flow processor has 3 buses (Ring bus A, B, and C) that provide the connection between the external devices and the processor (input/output ports). The coupling of the ring A, B buses to the input port circuit, and the link C bus to the output port circuits is shown in more detail in Figure 92. The internal units of the processor are linked through the four core buses A, B, C, and D. The presence of the three ring buses A, B, and C, separated through buffers from the four core buses A, B, C, and D, allows 1) the simultaneous data movement between I/O ports and units of the processors and 2) operations to take place in the internal units (ALU, MAC, registers, Comparator, data memories, etc.) and 3) operands to be exchanged through the internal core buses.

The microcode field relative to the ring bus control unit establishes the connection between I/O units and internal units through a specific path. The setup of the path is according to the requirements to be performed by the specific port or unit carrying out the operation. Reference should be made to the previously described units in order to select the data path. The processor architecture is constructed in such a manner that the programmer can attach to a Ring bus A, or B, or C, a different device as specified in Table E-16, Table A-17, and Table A-18 respectively. A "device" can be one of the following: 3D-Flow processor internal unit, or I/O ports.

Table A-16 Datapath from Ring Bus A to device "x"

| Mnemonic | Operations | Binary Code (bits 35-33) | Description |
|---|---|---|---|
| | T dir to Ring A | 000 | Ring Bus A is connected directly to the top input port |
| | T to Ring A | 001 | Ring Bus A is connected to the top FIFO input port |
| | N to Ring A | 010 | Ring Bus A is connected to the North FIFO input port |
| | E to Ring A | 011 | Ring Bus A is connected to the East FIFO input port |
| | W to Ring A | 100 | Ring Bus A is connected to the West FIFO input port |
| | S to Ring A | 101 | Ring Bus A is connected to the South FIFO input port |
| | A to Ring A | 110 | Ring Bus A is connected to core Bus A |
| | C to Ring A | 111 | Ring Bus A is connected to core Bus C |

Table A-17 Datapath From Ring Bus B to device "x"

| Mnemonic | Operations | Binary Code (bits 32-30) | Description |
|---|---|---|---|
| | T dir to Ring B | 000 | Ring Bus B is connected directly to the top input port |
| | T to Ring B | 001 | Ring Bus B is connected to the top FIFO input port |
| | N to Ring B | 010 | Ring Bus B is connected to the North FIFO input port |
| | E to Ring B | 011 | Ring Bus B is connected to the East FIFO input port |
| | W to Ring B | 100 | Ring Bus B is connected to the West FIFO input port |
| | S to Ring B | 101 | Ring Bus B is connected to the South FIFO input port |
| | B to Ring B | 110 | Ring Bus B is connected to core Bus B |
| | D to Ring B | 111 | Ring Bus B is connected to core Bus D |

Table A-18 Datapath for Ring Bus C to device "x"

| Mnemonic | Operations | Binary Code (bits 29-27) | Description |
|---|---|---|---|
| | T dir to Ring C | 000 | Ring Bus C is connected directly to the top input port |
| | A to Ring C | 001 | Ring Bus C is connected to core Bus A |
| | B to Ring C | 010 | Ring Bus C is connected to core bus B |
| | C to Ring C | 011 | Ring Bus C is connected to core bus C |
| | D to Ring C | 100 | Ring Bus C is connected to core bus D |
| | OutFIFO to Ring C | 101 | Ring Bus C is connected to the output from the OutFIFO |
| | no sel. | 110 | no select |
| | no sel. | 111 | no select |

Output Port Control (bits 26-17)

Processor has 5 output parallel ports (16-bit wide) identified as North, East, West, South and Bottom (NEWSB). Several units of this processor can send data to the North, East, West, South and Bottom output ports. The microcode field described in Table A-19, Table A-20, Table A-21, Table A-22, and Table A-23 shows all possible interconnections to the output ports

Table A-19. Datapath from device "x" to the output port "Bottom".

| Mnemonic | Operations | Binary Code (bits 26, 25) | Description |
|---|---|---|---|
| | disabled | 00 | disabled |
| | Ring A to B | 01 | Data from Ring A is connected to the Bottom port |
| | Ring B to B | 10 | Data from Ring B is connected to the Bottom port |
| | Ring C ro B | 11 | Data from Ring C is connected to the Bottom port |

Table A-20 Datapath from device "x" to the output port "North"

| Mnemonic | Operations | Binary Code (bits 24, 23) | Description |
|---|---|---|---|
| | disabled | 00 | disabled |
| | Ring A to N | 01 | Data from Ring A is connected to the North port |
| | Ring B to N | 10 | Data from Ring B is connected to the North port |
| | Ring C to N | 11 | Data from Ring C is connected to the North port |

Table A-21 Datapath from device "x" to the output port "East"

| Mnemonic | Operations | Binary Code (bits 22, 21) | Description |
|---|---|---|---|
| | disabled | 00 | Disabled |
| | Ring A to East | 01 | Data from Ring A is connected to the East port |
| | Ring B to East | 10 | Data from Ring B is connected to the East port |
| | Ring C to East | 11 | Data from Ring C is connected to the East port |

Table A-22. Datapath from device "x" to the output port "West".

| Mnemonic | Options | Binary Code (bits 20, 19) | Description |
|---|---|---|---|
| | disabled | 00 | Disabled |
| | Ring B to West | 01 | Data from Ring A is connected to the West port |
| | Ring B to West | 10 | Data from Ring B is connected to the West port |
| | Ring C to W | 11 | Data from Ring C is connected to the West port |

Table A-23. Data path from device "x" to the output port "South".

| Mnemonic | Operations | Binary Code (bits 18, 17) | Description |
|---|---|---|---|
| | disabled | 00 | Disabled |
| | Ring A to South | 01 | Data from Ring A is connected to the South port |
| | Ring B to South | 10 | Data from Ring B is connected to the South port |
| | Ring C to South | 11 | Data from Ring C is connected to the South port |

Enable/Disable Output FIFO (bit 16)

The output FIFO (see bottom center of Figure 56) is provided to store partial results from the algorithms carried out by the processor. In principle, any partial results directed to any output ports can be stored. In practice, the most convenient use of this output FIFO is to store partial results of the execution of the algorithm in the processor and then discharge all the results through the bottom port while the processor is doing other calculations. At any time the data from any core buses going to ring bus C can be captured and stored in output FIFO by enabling the field of the microcode (bit 16) described in
Table A-24.

Table A-24. Capturing results into the OutFIFO.

| Mnemonic | Operations | Binary Code | Description |
|---|---|---|---|
| | **disabled** | **0** | **Disable capture of data from Core_Bus to Ring_Bus into the outFIFO** |
| | **enable** | **1** | **Enable capture data from Core_Bus to Ring_Bus into the outFIFO** |

Numeric (15-0)

The numeric field of the microcode instruction has four different meanings, corresponding to five different options, depending on the selection of the fields described above. Option 1 allows one to specify a constant, or the address of Data Memory or an offset where the next program counter should branch. Option 2 allows selection of the input operands of the ALU, and Multiply/Divide units. Option 3 allows one to specify the number of positions to shift the content of accumulators A1, A2, and A3. Option 4 allows one to specify the offset and the "ccsts" bit test register of the branch instruction coded on bits 93-94-95 (see Figure 55 which describe the condition code status register). Option 5 allows one to select the bit to test from the instruction TST_A? show in connections with ALU1 and ALU2., The mnemonic and the microcode field are shown in

Table A-25. Microcode Numeric Option 1 for bits 15-0.

| Mnemonic | Operations | Binary Code | Description |
|---|---|---|---|
| Const/Addr Data Mem1 (2) | Constant to B or Constant to D | 0000000000000000 | 16-bit of microcode used for Constants, or Data Memory 1 (2) address. |

Table A-26. Microcode Numeric Option 2 for bits 15-0.

| MAC/DIV iter/oper 15 | NUMERIC 2nd option MAC op. sel. oper.=Bus 14, 13, 12, 11,10 | ALU1 op. sel. oper.=Bus 9, 8, 7, 6, 5 | ALU2 op. sel. oper.=Bus 4, 3, 2, 1, 0 |
|---|---|---|---|
| 0=operand | 00000=A (z,x,y) | 00000=A (z,x,y) | 00000=A (z,x,y) |
| 1=iteration | 00001=B (z,x,y) | 00001=B (z,x,y) | 00001=B (z,x,y) |
| | 00010=C (z,x,y) | 00010=C (z,x,y) | 00010=C (z,x,y) |
| | 00011=D (z,x,y) | 00011=D (z,x,y) | 00011=D (z,x,y) |
| | 00100=Alo (z,x,y) | 00100=Alo (z,x,y) | 00100=Alo (z,x,y) |
| | 00101=Blo (z,x,y) | 00101=Blo (z,x,y) | 00101=Blo (z,x,y) |
| | 00110=Clo (z,x,y) | 00110=Clo (z,x,y) | 00110=Clo (z,x,y) |
| | 00111=Dlo (z,x,y) | 00111=Dlo (z,x,y) | 00111=Dlo (z,x,y) |
| | 01000=Ahi (z,x,y) | 01000=Ahi (z,x,y) | 01000=Ahi (z,x,y) |
| | 01001=Bhi (z,x,y) | 01001=Bhi (z,x,y) | 01001=Bhi (z,x,y) |
| | 01010=Chi (z,x,y) | 01010=Chi (z,x,y) | 01010=Chi (z,x,y) |
| | 01011=Dhi (z,x,y) | 01011=Dhi (z,x,y) | 01011=Dhi (z,x,y) |
| | 01100=Alo Clo (x,y,u,v) | 01100=Alo Clo (x,y,u,v) | 01100=Alo Clo (x,y,u,v) |
| | 01101=Alo Dlo (x,y,u,v) | 01101=Alo Dlo (x,y,u,v) | 01101=Alo Dlo (x,y,u,v) |
| | 01110=Blo Clo (x,y,u,v) | 01110=Blo Clo (x,y,u,v) | 01110=Blo Clo (x,y,u,v) |
| | 01111=Blo Dlo (x,y,u,v) | 01111=Blo Dlo (x,y,u,v) | 01111=Blo Dlo (x,y,u,v) |
| | 10000=Ahi Dlo (x,y,u,v) | 10000=Ahi Dlo (x,y,u,v) | 10000=Ahi Dlo (x,y,u,v) |
| | 10001=Bhi Clo (x,y,u,v) | 10001=Bhi Clo (x,y,u,v) | 10001=Bhi Clo (x,y,u,v) |
| | 10010=Dhi Alo (x,y,u,v) | 10010=Dhi Alo (x,y,u,v) | 10010=Dhi Alo (x,y,u,v) |
| | 10011=Chi Blo (x,y,u,v) | 10011=Chi Blo (x,y,u,v) | 10011=Chi Blo (x,y,u,v) |
| | 10100=A C (x,y,u,v) | 10100=A C (x,y,u,v) | 10100=A C (x,y,u,v) |
| | 10101=A D (x,y,u,v) | 10101=A D (x,y,u,v) | 10101=A D (x,y,u,v) |
| | 10110=B C (x,y,u,v) | 10110=B C (x,y,u,v) | 10110=B C (x,y,u,v) |
| | 10111=B D (x,y,u,v) | 10111=B D (x,y,u,v) | 10111=B D (x,y,u,v) |
| | 11000=Clo Alo (y,v) | 11000=Clo Alo (y,v) | 11000=Clo Alo (y,v) |
| | 11001=Dlo Alo (y,v) | 11001=Dlo Alo (y,v) | 11001=Dlo Alo (y,v) |
| | 11010=Clo Blo (y,v) | 11010=Clo Blo (y,v) | 11010=Clo Blo (y,v) |
| | 11011=Dlo Blo (y,v) | 11011=Dlo Blo (y,v) | 11011=Dlo Blo (y,v) |
| | 11100=C A (y,v) | 11100=C A (y,v) | 11100=C A (y,v) |
| | 11101=D A (y,v) | 11101=D A (y,v) | 11101=D A (y,v) |
| | 11110=C B (y,v) | 11110=C B (y,v) | 11110=C B (y,v) |
| | 11111=D B (y,v) | 11111=D B (y,v) | 11111=D B (y,v) |

The Shift instruction field of Table A-27 is used in conjunction with the MAC, ALU1, and ALU2 instructions. This 5-bit field contains the number of bits the A3, A2, or the A1 will shift left or right Table A-27 shows the codes corresponding to different left/right shift positions

Table A-27 Microcode Numeric Option 3 for bits 15-0

| NUMERIC 3rd option | | |
|---|---|---|
| MAC | ALU1 | ALU2 |
| Shift A3 #pos. | Shift A2 # pos. | Shift A1 #pos. |
| 14, 13, 12 | 9, 8, 7, 6, 5 | 4, 3, 2, 1, 0 |
| 11, 10 | | |
| 00000=no shift | 00000=no shift | 00000=no shift |
| 00001=SH_A3_1 | 00001=SH_A2_1 | 00001=SH_A1_1 |
| 00010=SH_A3_2 | 00010=SH_A2_2 | 00010=SH_A1_2 |
| 00011=SH_A3_3 | 00011=SH_A2_3 | 00011=SH_A1_3 |
| 00100=SH_A3_4 | 00100=SH_A2_4 | 00100=SH_A1_4 |
| 00101=SH_A3_5 | 00101=SH_A2_5 | 00101=SH_A1_5 |
| 00110=SH_A3_6 | 00110=SH_A2_6 | 00110=SH_A1_6 |
| 00111=SH_A3_7 | 00111=SH_A2_7 | 00111=SH_A1_7 |
| 01000=SH_A3_8 | 01000=SH_A2_8 | 01000=SH_A1_8 |
| 01001=SH_A3_9 | 01001=SH_A2_9 | 01001=SH_A1_9 |
| 01010=SH_A3_10 | 01010=SH_A2_10 | 01010=SH_A1_10 |
| 01011=SH_A3_11 | 01011=SH_A2_11 | 01011=SH_A1_11 |
| 01100=SH_A3_12 | 01100=SH_A2_12 | 01100=SH_A1_12 |
| 01101=SH_A3_13 | 01101=SH_A2_13 | 01101=SH_A1_13 |
| 01110=SH_A3_14 | 01110=SH_A2_14 | 01110=SH_A1_14 |
| 01111=SH_A3_15 | 01111=SH_A2_15 | 01111=SH_A1_15 |
| 10000=SH_A3_16 | 10000=SH_A2_16 | 10000=SH_A1_16 |
| 10001=SH_A3_17 | 10001=SH_A2_17 | 10001=SH_A1_17 |
| 10010=SH_A3_18 | 10010=SH_A2_18 | 10010=SH_A1_18 |
| 10011=SH_A3_19 | 10011=SH_A2_19 | 10011=SH_A1_19 |
| 10100=SH_A3_20 | 10100=SH_A2_20 | 10100=SH_A1_20 |
| 10101=SH_A3_21 | 10101=SH_A2_21 | 10101=SH_A1_21 |
| 10110=SH_A3_22 | 10110=SH_A2_22 | 10110=SH_A1_22 |
| 10111=SH_A3_23 | 10111=SH_A2_23 | 10111=SH_A1_23 |
| 11000=SH_A3_24 | 11000=SH_A2_24 | 11000=SH_A1_24 |
| 11001=SH_A3_25 | 11001=SH_A2_25 | 11001=SH_A1_25 |
| 11010=SH_A3_26 | 11010=SH_A2_26 | 11010=SH_A1_26 |
| 11011=SH_A3_27 | 11011=SH_A2_27 | 11011=SH_A1_27 |
| 11100=SH_A3_28 | 11100=SH_A2_28 | 11100=SH_A1_28 |
| 11101=SH_A3_29 | 11101=SH_A2_29 | 11101=SH_A1_29 |
| 11110=SH_A3_30 | 11110=SH_A2_30 | 11110=SH_A1_30 |
| 11111=SH_A3_31 | 11111=SH_A2_31 | 11111=SH_A1_31 |

Table A-28 Microcode Numeric Option 4 for bits 15-0

| | | |
|---|---|---|
| Numeric 4th option | | |
| test ccsts | test ccsts | BRA |
| #bit_1 | #bit_2 | offset |
| 15, 14, 13, 12 | 11, 10, 9, 8 | 7, 6, 5, 4, |
| | | 3, 2, 1, 0 |
| 0000=ccsts bit 0 | 0000=ccsts bit 0 | 00000000 |
| 0001=ccsts bit 1 | 0001=ccsts bit 1 | offset= |
| 0010=ccsts bit 2 | 0010=ccsts bit 2 | from -64 |
| 0011=ccsts bit 3 | 0011=ccsts bit 3 | to +64 |
| 0100=ccsts bit 4 | 0100=ccsts bit 4 | |
| 0101=ccsts bit 5 | 0101=ccsts bit 5 | |
| 0110=ccsts bit 6 | 0110=ccsts bit 6 | |
| 0111=ccsts bit 7 | 0111=ccsts bit 7 | |
| 1000=ccsts bit 8 | 1000=ccsts bit 8 | |
| 1001=ccsts bit 9 | 1001=ccsts bit 9 | |
| 1010=ccsts bit 10 | 1010=ccsts bit 10 | |
| 1011=ccsts bit 11 | 1011=ccsts bit 11 | |
| 1100=ccsts bit 12 | 1100=ccsts bit 12 | |
| 1101=ccsts bit 13 | 1101=ccsts bit 13 | |
| 1110=ccsts bit 14 | 1110=ccsts bit 14 | |
| 1111=ccsts bit 15 | 1111=ccsts bit 15 | |

Table A-29. Microcode Numeric Option 5.

| | | |
|---|---|---|
| NUMERIC 5th option | | |
| MAC op. sel. | ALU1 | ALU2 |
| oper.=Bus | Bit test | Bit test |
| 14, 13, 12 | 8, 7, 6, 5 | 3, 2, 1, 0 |
| 11, 10 | | |
| 00000=A (z,x,y) | 0000=test bit 0 | 0000=test bit 0 |
| 00001=B (z,x,y) | 0001=test bit 1 | 0001=test bit 1 |
| 00010=C (z,x,y) | 0010=test bit 2 | 0010=test bit 2 |
| 00011=D (z,x,y) | 0011=test bit 3 | 0011=test bit 3 |
| 00100=Alo (z,x,y) | 0100=test bit 4 | 0100=test bit 4 |
| 00101=Blo (z,x,y) | 0101=test bit 5 | 0101=test bit 5 |
| 00110=Clo (z,x,y) | 0110=test bit 6 | 0110=test bit 6 |
| 00111=Dlo (z,x,y) | 0111=test bit 7 | 0111=test bit 7 |
| 01000=Ahi (z,x,y) | 1000=test bit 8 | 1000=test bit 8 |
| 01001=Bhi (z,x,y) | 1001=test bit 9 | 1001=test bit 9 |
| 01010=Chi (z,x,y) | 1010=test bit 10 | 1010=test bit 10 |
| 01011=Dhi (z,x,y) | 1011=test bit 11 | 1011=test bit 11 |
| 01100=Alo Clo (x,y,u,v) | 1100=test bit 12 | 1100=test bit 12 |
| 01101=Alo Dlo (x,y,u,v) | 1101=test bit 13 | 1101=test bit 13 |
| 01110=Blo Clo (x,y,u,v) | 1110=test bit 14 | 1110=test bit 14 |
| 01111=Blo Dlo (x,y,u,v) | 1111=test bit 15 | 1111=test bit 15 |
| 10000=Ahi Dlo (x,y,u,v) | | |
| 10001=Bhi Clo (x,y,u,v) | | |
| 10010=Dhi Alo (x,y,u,v) | | |
| 10011=Chi Blo (x,y,u,v) | | |
| 10100=A C (x,y,u,v) | | |
| 10101=A D (x,y,u,v) | | |
| 10110=B C (x,y,u,v) | | |
| 10111=B D (x,y,u,v) | | |
| 11000=Clo Alo (y,v) | | |
| 11001=Dlo Alo (y,v) | | |
| 11010=Clo Blo (y,v) | | |
| 11011=Dlo Blo (y,v) | | |
| 11100=C A (y,v) | | |
| 11101=D A (y,v) | | |
| 11110=C B (y,v) | | |
| 11111=D B (y,v) | | |

Processor interface signals

Table A-30. 3D-Flow processor top port signals description.

| Signal Name | Parameter | Description |
|---|---|---|
| Top In(0:15) | | Top Input Data Bus. 16-bit bus contains the data that will be transferred from Bottom Port of the processor of the adjacent layer. |
| | Input: | Always |
| | Active State: | |
| | Signal Type: | CMOS |
| | Transaction: | |
| Top Load | | Load data into the Top Port. Data valid signal for the Bott In data bus. Received from the Top Load Signal from the Bottom Port processor of the adjacent layer. |
| | Input: | Always |
| | Active State: | High |
| | Signal Type: | CMOS |
| | Transaction: | When asserted, the Top port will shift the data on the Top_In bus into the FIFO on the next rising edge of the clock. |
| Top_Full | | |
| | Output: | Always |
| | Active State: | High |
| | Signal type: | CMOS |
| | Transaction: | When asserted, the Bottom port from the processor of the adjacent layer will not assert any more data. |

Table A-31. 3D-Flow processor bottom port signal description.

| Signal Name | Parameter | Description |
|---|---|---|
| Bott_Out(0:15) | | Bottom Output Data Bus. 16-bit bus that is attached to the Top port of the processor of the adjacent layer. |
| | Output: | Always |
| | Active State: | High |
| | Signal Type: | CMOS |
| | Transaction: | |
| Bott_Load | | Generate Bott_Load signal. Signal sent to the Top_Load Input of the processor of the adjacent layer. |
| | Output: | Always |
| | Active State: | High |
| | Signal Type: | CMOS |
| | Transaction: | The Bottom Port asserts this signal during the same clock cycle the data on Bott_Out has been asserted and is valid. The Top Port of the processor of the adjacent layer will latch the data on Bott Out into its input FIFO on the next clock edge. |
| | | |
| Ext_TFull | | External Top Full. The adjacent top port (connected to this bottom port) is full and cannot accept more data. |
| | Input: | Always |
| | Active State: | High |
| | Signal Type: | CMOS |
| | Transaction: | When this signal is asserted, AND the processor is attempting to write to this port, the instruction sequencer will halt operation of the processor until the signal is deasserted. |

Table A-32. 3D-Flow processor North port signal description.

| Signal Name | Parameter | Description |
|---|---|---|
| North Data(0:15) | | North Input Data Bus. 16-bit bus contains the data that will be transferred from the South Port of the adjacent processor. |
| | Input: | Always |
| | Active State: | High |
| | Signal Type: | CMOS |
| | Transaction: | |
| North Load | | Load data into the North Port. Data valid signal for the North_Data bus. Received from the Out_load S_Signal from the South Port of the adjacent processor. |
| | Input: | Always |
| | Active State: | High |
| | Signal Type: | CMOS |
| | Transaction: | When asserted, the North port will shift the data on the North_Data bus into the FIFO on the next rising edge of the clock. |
| North_Full | | North input FIFO full. |
| | Output: | Always |
| | Active State: | High |
| | Signal Type: | CMOS |
| | Transaction: | When asserted, the South port from the adjacent processor will not assert any more data. |
| OutportN(0:15) | | North Output Bus. 16-bit bus that is attached to the adjacent South Input port. |
| | Output: | Always |
| | Active State: | High |
| | Signal Type: | CMOS |
| | Transaction: | |
| Out_loadN | | Generate North_Load Signal. Signal sent to the South_Load Input of the adjacent processor. |
| | Output: | Always |
| | Active State: | High |
| | Signal Type: | CMOS |
| | Transaction: | The North Port asserts this signal during the same clock cycle the data on OutportN has been asserted and is valid. The South Port of the adjacent processor will latch the data on OutportN into its input FIFO on the next clock edge. |
| Ext SFull | | External South Full. The adjacent South port (connected to this North port) is full and cannot accept more data. |
| | Input: | Always |
| | Active State: | High |
| | Signal Type: | CMOS |
| | Transaction: | When this signal is asserted, AND the processor is attempting to write to this port, the instruction sequencer will halt operation of the processor until the signal is deasserted. |

Table A-33. 3D-Flow processor East port signals description.

| Signal Name | Parameter | Description |
|---|---|---|
| East_Data(0:15) | | East Input Data Bus. 16-bit bus contains the data that will be transferred from the West Port of the adjacent processor. |
| | Input: | Always |
| | Active State: | High |
| | Signal Type: | CMOS |
| | Transaction: | |
| East_Load | | Load data into the East Port. Data valid signal for the East_Data bus. Received from the Out_loadW Signal from the West Port of the adjacent processor. |
| | Input: | Always |
| | Active State: | High |
| | Signal Type: | CMOS |
| | Transaction: | When asserted, the East port will shift the data on the East_Data bus into the FIFO on the next rising edge of the clock. |
| East_Full | | East input FIFO full. |
| | Output: | Always |
| | Active State: | High |
| | Signal Type: | CMOS |
| | Transaction: | When asserted, the West port from the adjacent processor will not assert any more data. |
| OutportE(0:15) | | East Output Bus. 16-bit bus that is attached to the adjacent West Input port. |
| | Output: | Always |
| | Active State: | High |
| | Signal Type: | CMOS |
| | Transaction: | |
| Out_loadE | | Generate East_Load Signal. Signal sent to the West_Load Input of the adjacent processor. |
| | Output: | Always |
| | Active State: | High |
| | Signal Type: | CMOS |
| | Transaction: | The East Port asserts this signal during the same clock cycle the data on OutportE has been asserted and is valid. The West Port of the adjacent processor will latch the data on OutportE into its input FIFO on the next clock edge. |
| Ext_WFull | | External West Full. The adjacent West port (connected to this East port) is full and cannot accept more data. |
| | Input: | Always |
| | Active State: | High |
| | Signal Type: | CMOS |
| | Transaction: | When this signal is asserted, AND the processor is attempting to write to this port, the instruction sequencer will halt operation of the processor until the signal is deasserted. |

Table A-34 3D-Flow processor West port signals description.

| Signal Name | Parameter | Description |
|---|---|---|
| West_Data(0:15) | | West Input Data Bus. 16-bit bus contains the data that will be transferred from the East Port of the adjacent processor. |
| | Input: | Always |
| | Active State: | High |
| | Signal Type: | CMOS |
| | Transaction: | |
| West_Load | | Load data into the West Port. Data valid signal for the West_Data bus. Received from the Out_loadE Signal from the East Port of the adjacent processor. |
| | Input: | Always |
| | Active State: | High |
| | Signal Type: | CMOS |
| | Transaction: | When asserted, the West port will shift the data on the West_Data bus into the FIFO on the next rising edge of the clock |
| West_Full | | West input FIFO full. |
| | Output: | Always |
| | Active State: | High |
| | Signal Type: | CMOS |
| | Transaction: | When asserted, the East port from the adjacent processor will not assert any more data. |
| OutportW(0:15) | | West Output Bus. 16-bit bus that is attached to the adjacent East Input port. |
| | Output: | Always |
| | Active State: | High |
| | Signal Type: | CMOS |
| | Transaction: | |
| Out_loadW | | Generate West Load Signal. Signal sent to the East_Load Input of the adjacent processor. |
| | Output: | Always |
| | Active State: | High |
| | Signal Type: | CMOS |
| | Transaction: | The West Port asserts this signal during the same clock cycle the data on OutportW has been asserted and is valid. The East Port of the adjacent processor will latch the data on OutportW into its input FIFO on the next clock edge. |
| Ext_EFull | | External EastFull. The adjacent East port (connected to this West port) is full and cannot accept more data. |
| | Input: | Always |
| | Active State: | High |
| | Signal Type: | CMOS |
| | Transaction: | When this signal is asserted, AND the processor is attempting to write to this port, the instruction sequencer will halt operation of the processor until the signal is deasserted |

Table A-35. 3D-Flow processor South port signals description.

| Signal Name | Parameter | Description |
|---|---|---|
| South_Data(0:15) | | South Input Data Bus. 16-bit bus contains the data that will be transferred from the North Port of the adjacent processor. |
| | Input: | Always |
| | Active State: | High |
| | Signal Type: | CMOS |
| | Transaction: | |
| South_Load | | Load data into the South Port. Data valid signal for the South_Data bus. Received from the Out_loadN Signal from the North Port of the adjacent processor. |
| | Input: | Always |
| | Active State: | High |
| | Signal Type: | CMOS |
| | Transaction: | When asserted, the South port will shift the data on the South_Data bus into the FIFO on the next rising edge of the clock |
| South_Full | | |
| | Output: | Always |
| | Active State: | High |
| | Signal Type: | CMOS |
| | Transaction: | When asserted, the North port from the adjacent processor will not assert any more data. |
| OutportS(0:15) | | South Output Bus. 16-bit bus that is attached to the adjacent North Input port. |
| | Output: | Always |
| | Active State: | High |
| | Signal Type: | CMOS |
| | Transaction: | |
| Out_loadS | | Generate South_Load Signal. Signal sent to the North_Load Input of the adjacent processor. |
| | Output: | Always |
| | Active State: | High |
| | Signal Type: | CMOS |
| | Transaction: | The South Port asserts this signal during the same clock cycle the data on OutportS has been asserted and is valid. The North Port of the adjacent processor will latch the data on OutportS into its input FIFO on the next clock edge. |
| Ext_NFull | | External North Full. The adjacent North port (connected to this South port) is full and cannot accept more data. |
| | Input: | Always |
| | Active State: | High |
| | Signal Type: | CMOS |
| | Transaction: | When this signal is asserted, AND the processor is attempting to write to this port, the instruction sequencer will halt operation of the processor until the signal is deasserted |

Table A-36. 3D-Flow processor RS232C signals description.

| Signal Name | Parameter | Description |
|---|---|---|
| RS232_INT | | RS232C interrupt. The RS232C chip interface has received data for this 3D-Flow processor. |
| | Input: | Always |
| | Active State: | High |
| | Signal Type: | CMOS |
| | Transaction: | Synchronously resets the instruction sequencer. Release all buses that become available to the RS232C chip interface. |
| RS232C_ACK | | The RS232C chip interface receives an acknowledge from the processor. |
| | Output: | Always |
| | Active State: | High |
| | Signal Type: | CMOS |
| | Transaction: | After RS232C chip interface receives this signal, it then starts data transfer to program memory, or data memories, or threshold registers, or counters, etc. |
| RS232C_PM | | RS232C program memory select. |
| | Input: | Always |
| | Active State: | High |
| | Signal Type: | CMOS |
| | Transaction: | Sets program memory to write mode when RS232C chip interface has RS232C_INT and RS232C_ACK signals active |
| RS232_DM1 | | RS232C data memory 1 select. |
| | Input: | Always |
| | Active State: | High |
| | Signal Type: | CMOS |
| | Transaction: | Sets data memory 1 to write mode when RS232_INT and RS232_ACK are active. |
| RS232_DM2 | | RS232C data memory 2 select. |
| | Input: | Always |
| | Active State: | High |
| | Signal Type: | CMOS |
| | Transaction: | Sets data memory 2 to write mode when RS232_INT and RS232_ACK are active. |
| RS232C_WEN | | RS232C write enable. |
| | Input: | Always |
| | Active State: | High |
| | Signal Type: | CMOS |
| | Transaction: | When a unit is selected, an active state on this signal will cause the DATA from the RS232C chip interface to be written into the location pointed to by the ADDRESS received from RS232 |
| RS232_ADDR(0-15) | | Address from RS232C chip interface. Used in conjunction with the individual select lines to control the destination of the data coming through the RS232C |
| | Input: | Always |
| | Active State: | High |
| | Signal Type: | CMOS |
| | Transaction: | Controls the destination of RS232C data. Address is handled differently from unit to unit. |
| RS232_DATA(0-15) | | Data from RS232C chip interface. These data (or a subset of it) is loaded into the selected unit. |
| | Input: | Always |
| | Active State: | High |
| | Signal Type: | CMOS |
| | Transaction: | |

| | | |
|---|---|---|
| RS232C_TR H | | RS232C threshold register select. |
| | Input: | Always |
| | Active State: | High |
| | Signal Type: | CMOS |
| | Transaction: | Selects the comparator to accept data from RS232C interface |
| RS232_CNT | | Counters are selected from RS232C interface. |
| | Input: | Always |
| | Active State: | High |
| | Signal Type: | CMOS |
| | Transaction: | The internal counter is selected to receive data from RS232C. Address selects the individual counter |

Table A-37. 3D-Flow processor miscellaneous signals description.

| Signal Name | Parameter | Description |
|---|---|---|
| SIMD_CMD (0-95) | | SIMD command (data). 96-bit microcode instruction to the 3D-Flow processor. |
| | Input: | Always |
| | Active State: | High |
| | Signal Type: | CMOS |
| | Transaction: | |
| SIMD_load | | Strobe of the SIMD command. Data valid signal for the SIMD command. Received from the Controller at each new instruction. |
| | Input: | Always |
| | Active State: | High |
| | Signal Type: | CMOS |
| | Transaction: | When asserted, the 96-bit microcode instruction (or command) is sent to the processor instruction decoder. |
| MIMD/SIM D | | SIMD select. When active, the processing element is in SIMD mode and will use SIMD_CMD input data as the next instruction to be executed. |
| | Input: | Always |
| | Active State: | High |
| | Signal Type: | CMOS |
| | Transaction: | Place the processing element into SIMD mode. |
| SYNC/DDrv | | Synchronous mode select. During normal operation, at state=0, the processor acts according to the "data-driven" principle of operation. When active, the processing element is in the synchronous mode. The processing element will assume the data is available at the input FIFOs when it is needed. |
| | Input: | Always |
| | Active State: | High |
| | Signal Type: | CMOS |
| | Transaction: | Place the processing element in synchronous mode. |
| Timer_up | | |
| | Output: | Always |
| | Active State: | High |
| | Signal Type: | CMOS |
| | Transaction: | |
| Timer_reset | | |
| | Input: | Always |
| | Active State: | High |
| | Signal Type: | CMOS |
| | Transaction: | |

| Signal Name | Parameter | Description |
|---|---|---|
| JTAG SDI N | | JTAG Serial data_in. From the chip-level JTAG interface, is the input to the scan path. All registers in the processing element are in a single scan path. |
| | Input: | Always |
| | Active State: | High |
| | Signal Type: | CMOS |
| | Transaction: | |
| JTAG_SE | | JTAG Serial scan enable, from the chip-level JTAG interface, places all scan registers in the processing element into scan mode. |
| | Input: | Always |
| | Active State: | High |
| | Signal Type: | CMOS |
| | Transaction: | Places all scan registers into scan mode. All real-time processing is halted. |
| JTAG_SDO UT | | JTAG serial data out. The output of the processing element scan path. |
| | Output: | Always |
| | Active State: | High |
| | Signal Type: | CMOS |
| | Transaction: | |
| RESET | | Asynchronous master RESET |
| | Input: | Always |
| | Active State: | High |
| | Signal Type: | CMOS |
| | Transaction: | Reset all registers and FIFOs in the 3D-Flow processor. Sets the instruction sequencer back to power-on-reset. |
| CLOCK | | Master processor Clock |
| | Input: | Always |
| | Active State: | High |
| | Signal Type: | CMOS |
| | Transaction: | |

IEEE 1149.1 JTAG 3D-Flow chip Interface.

The IEEE 1149.1 interface implements all mandatory features specified in the standard. In addition the JTAG interface implements the optional RUNBIST instruction, as well as several user-defined instructions related to internal scan-path and memory testing.

The JTAG 1149.1 IEEE Standard evolved from groups in Europe and the United States who were working on ways to facilitate testing of Integrated Circuits and Circuit boards. The approach behind the specification is to have test circuitry that is separate from the functional circuitry. In this way the test circuitry can work without affecting the functional circuitry.

The JTAG standard specifies a serial test bus along with protocols and control procedures for using it. When the specification is followed one can do the following things:

- 100% test of interconnect between ICs
- Internal logic testing
- External logic testing Test ReSeT will asynchronously reset the test logic on the IC. This signal is tied to the master reset in the 3D-Flow ASIC.

Test Access Ports can be configured in different ways. Normally the TDI of one is connected serially to TDO of anther, creating a long scan chain. The TMS and TCK signals are all the same. Other configurations are possible.

The memory instructions are used to exhaustively test imbedded memory in the ASIC. The are two memory instructions, one for the two Data Memories, and one for the Program Memory. When a memory instruction is the current instruction, a test controller initiates the memory test by placing the TAP controller into the RUN-Test/IDLE state. The test controller must hold the TAP controller in this state for a fixed number of CLK cycles to allow the memory test sequence to run to completion. The capture input to the instruction register is examined to determine when all BIST tests are completed. The contents instruction capture register may be examined by traversing the Capture-IR state and scanning out the captured data in the Shift-IR state. The pattern of the contents of the Capture register are given below.

The 36-bit memory test results register is placed between the tdi and tdo pins whenever a memory test instruction is selected. The GO/NoGo results of the test may be examined by traversing the Capture-DR state and scanning out the captured data in the Shift-DR state. The pattern of the contents of the Results Register are given below.

Test Data Registers are scan registers placed between TDI and TDO. The selection of which test data register is placed between TDI and TDO is dependent on the instruction selected. In the case of the 3D-Flow ASIC, there are a total of 5 internal scan paths (one for each PE and one for the UART), a signature register, the memory results register and the BIST seed register.

| **Bit 3** | **Bit 2** | **Bit 1** | **Bit 0** |
|---|---|---|---|
| Data Memory Test Done | Program Memory Test Done | 0 | 1 |

Table A-38 Test Data Register

| | | | | **Bit 11** | **Bit 10** | **Bit 9** | **Bit 8** |
|---|---|---|---|---|---|---|---|
| | | | | PE 0 Data Mem 2 Go/NoGo | PE 1 Data Mem 2 Go/NoGo | PE 2 Data Mem 2 Go/NoGo | PE 3 Data Mem 2 Go/NoGo |
| PE 0 Data Mem 2 Go/NoGo | PE 1 Data Mem 2 Go/NoGo | PE 2 Data Mem 2 Go/NoGo | PE 3 Data Mem 2 Go/NoGo | PE 0 Program Memory Go/NoGo | PE 1 Program Memory Go/NoGo | PE 2 Program Memory Go/NoGo | PE 3 Program Memory Go/NoGo |

Table A-39. JTAG Instruction Encoding.

| **OpCode** | **Instruction** |
|---|---|
| 0000 | Extest |
| 0001 | Sample/Preload |
| 0010 | Runbist |
| 0011 | Internal Scan - path 1 (RS232) |
| 0100 | Internal Scan - path 2 (PE 0) |
| 0101 | Internal Scan - path 3 (PE 1) |
| 0110 | Internal Scan - path 4 (PE 2) |
| 0111 | Internal Scan - path 5 (PE 3) |
| 1000 | Halt/Single-Step |
| 1001 | Memory Test - Data Memories |
| 1010 | Memory Test - Program Memory |
| 1011 | Bypass |
| 1100 | BIST Seed Register |
| 1101 | Clamp I/O |
| 1110 | TBD |
| 1111 | Bypass |

The Bypass Register is a single register placed between TDI and TDO when the Bypass instruction is selected. This allows the external test controller to shift data through the IC without going through the test logic.

The boundary scan Register is a serial shift register that is connected to all the IC I/O. The boundary scan registers for all primary outputs and output stages of bi-directional signals includes the mandatory capture and update registers. Boundary scan registers for primary inputs, however, include only capture registers. Since all primary inputs are registered, Intest is not supported.

ASIC signal description.

Table A-40 3D-Flow chip Top ports signal description

| Signal Name | Parameter | Description |
|---|---|---|
| Top_In0(0:7) | | Top Input Data Bus. 8-bit bus contains the data that will be transferred from the adjacent Bottom Port |
| | Input: | Always |
| | Active State: | |
| | Signal Type: | CMOS |
| | Transaction: | |
| Top_Load0 | | Top Load. Signal from the adjacent Bottom port that asserts the data on the bus is valid. |
| | Input: | Always |
| | Active State: | High |
| | Signal Type: | CMOS |
| | Transaction: | When asserted, the Top port will shift the data on the Top_Data bus into the FIFO on the next rising edge of the clock. |
| Top_Full0 | | |
| | Output: | Always |
| | Active State: | High |
| | Signal Type: | CMOS |
| | Transaction: | When asserted, the adjacent Bottom port will not assert any more data. |
| Top_In1(0:7) | | Top Input Data Bus. 8-bit bus contains the data that will be transferred from the adjacent Bottom Port |
| | Input: | Always |
| | Active State: | |
| | Signal Type: | CMOS |
| | Transaction: | |
| Top_Load1 | | Top Load. Signal from the adjacent Bottom port that asserts the data on the bus is valid. |
| | Input: | Always |
| | Active State: | High |
| | Signal Type: | CMOS |
| | Transaction: | When asserted, the Top port will shift the data on the Top_Data bus into the FIFO on the next rising edge of the clock. |
| Top_Full1 | | |
| | Output: | Always |
| | Active State: | High |
| | Signal Type: | CMOS |
| | Transaction: | When asserted, the adjacent Bottom port will not assert any more data. |
| | | |

| Signal Name | Parameter | Description |
|---|---|---|
| Top In2(0:7) | | Top Input Data Bus. 8-bit bus contains the data that will be transferred from the adjacent Bottom Port |
| | Input: | Always |
| | Active State: | |
| | Signal Type: | CMOS |
| | Transaction: | |
| Top_Load2 | | Top Load. Signal from the adjacent Bottom port that asserts the data on the bus is valid. |
| | Input: | Always |
| | Active State: | High |
| | Signal Type: | CMOS |
| | Transaction: | When asserted, the Top port will shift the data on the Top_Data bus into the FIFO on the next rising edge of the clock. |
| Top_Full2 | | |
| | Output: | Always |
| | Active State: | High |
| | Signal Type: | CMOS |
| | Transaction: | When asserted, the adjacent Bottom port will not assert any more data. |
| Top_In3(0:7) | | Top Input Data Bus. 8-bit bus contains the data that will be transferred from the adjacent Bottom Port |
| | Input: | Always |
| | Active State: | |
| | Signal Type: | CMOS |
| | Transaction: | |
| Top_Load3 | | Top Load. Signal from the adjacent Bottom port that asserts the data on the bus is valid. |
| | Input: | Always |
| | Active State: | High |
| | Signal Type: | CMOS |
| | Transaction: | When asserted, the Top port will shift the data on the Top_Data bus into the FIFO on the next rising edge of the clock. |
| Top_Full3 | | |
| | Output: | Always |
| | Active State: | High |
| | Signal Type: | CMOS |
| | Transaction: | When asserted, the adjacent Bottom port will not assert any more data. |
| | | |

Table A-41 3D-Flow chip Bottom ports signal description

| Signal Name | Parameter | Description |
|---|---|---|
| Bott_Out0(0:7) | | Bottom Output Bus. 8-bit bus that is attached to the adjacent Top port. |
| | Output: | Always |
| | Active State: | High |
| | Signal Type: | CMOS |
| | Transaction: | |
| Bott_Load0 | | Bottom Load. Attached to the adjacent Top_Load Input. |
| | Output: | Always |
| | Active State: | High |
| | Signal Type: | CMOS |
| | Transaction: | The Bottom Port asserts this signal during the same clock cycle the data on Bott_Out has been asserted and is valid. The adjacent Top Port will latch the data on Bott_Out into its input FIFO on the next clock edge. |
| Ext_Top_Full0 | | External Top Full. The adjacent top port (connected to this bottom port) is full and cannot accept more data. |
| | Input: | Always |
| | Active State: | High |
| | Signal Type: | CMOS |
| | Transaction: | When this signal is asserted, AND the processor is attempting to write to this port, the instruction sequencer will halt operation of the processor until the signal is deasserted. |
| Bott_Out1(0:7) | | Bottom Output Bus. 8-bit bus that is attached to the adjacent Top port. |
| | Output: | Always |
| | Active State: | High |
| | Signal Type: | CMOS |
| | Transaction: | |
| Bott_Load1 | | Bottom Load. Attached to the adjacent Top_Load Input. |
| | Output: | Always |
| | Active State: | High |
| | Signal Type: | CMOS |
| | Transaction: | The Bottom Port asserts this signal during the same clock cycle the data on Bott_Out has been asserted and is valid. The adjacent Top Port will latch the data on Bott_Out into its input FIFO on the next clock edge. |
| Ext_Top_Full1 | | External Top Full. The adjacent top port (connected to this bottom port) is full and cannot accept more data. |
| | Input: | Always |
| | Active State: | High |
| | Signal Type: | CMOS |
| | Transaction: | When this signal is asserted, AND the processor is attempting to write to this port, the instruction sequencer will halt operation of the processor until the signal is deasserted. |

151

| Signal Name | Parameter | Description |
|---|---|---|
| Bott_Out2(0:7) | | Bottom Output Bus. 8-bit bus that is attached to the adjacent Top port. |
| | Output: | Always |
| | Active State: | High |
| | Signal Type: | CMOS |
| | Transaction: | |
| Bott_Load2 | | Bottom Load. Attached to the adjacent Top_Load Input. |
| | Output: | Always |
| | Active State: | High |
| | Signal Type: | CMOS |
| | Transaction: | The Bottom Port asserts this signal during the same clock cycle the data on Bott_Out has been asserted and is valid. The adjacent Top Port will latch the data on Bott_Out into its input FIFO on the next clock edge. |
| Ext_Top_Full2 | | External Top Full. The adjacent top port (connected to this bottom port) is full and cannot accept more data. |
| | Input: | Always |
| | Active State: | High |
| | Signal Type: | CMOS |
| | Transaction: | When this signal is asserted, AND the processor is attempting to write to this port, the instruction sequencer will halt operation of the processor until the signal is deasserted. |
| Bott_Out3(0:7) | | Bottom Output Bus. 8-bit bus that is attached to the adjacent Top port. |
| | Output: | Always |
| | Active State: | High |
| | Signal Type: | CMOS |
| | Transaction: | |
| Bott_Load3 | | Bottom Load. Attached to the adjacent Top_Load Input. |
| | Output: | Always |
| | Active State: | High |
| | Signal Type: | CMOS |
| | Transaction: | The Bottom Port asserts this signal during the same clock cycle the data on Bott_Out has been asserted and is valid. The adjacent Top Port will latch the data on Bott_Out into its input FIFO on the next clock edge. |
| Ext_Top_Full3 | | External Top Full. The adjacent top port (connected to this bottom port) is full and cannot accept more data. |
| | Input: | Always |
| | Active State: | High |
| | Signal Type: | CMOS |
| | Transaction: | When this signal is asserted, AND the processor is attempting to write to this port, the instruction sequencer will halt operation of the processor until the signal is deasserted. |

Table A-42 3D-Flow chip North ports signals description

| Signal Name | Parameter | Description |
|---|---|---|
| North_Data0(0:7) | | North Input Data Bus. 8-bit bus contains the data that will be transferred from the adjacent South Port |
| | Input: | |
| | Active State: | High |
| | Signal Type: | CMOS |
| | Transaction: | |
| North_Load0 | | North Load. Signal from the adjacent South port that the data on the bus is valid. |
| | Input: | Always |
| | Active State: | High |
| | Signal Type: | CMOS |
| | Transaction: | When asserted, the North port will shift the data on the North_Data bus into the FIFO on the next rising edge of the clock. |
| | | |
| North_Full0 | | North input FIFO full. |
| | Output: | Always |
| | Active State: | High |
| | Signal Type: | CMOS |
| | Transaction: | When asserted, the adjacent South port will not assert any more data. |
| OutportN0(0:7) | | North Output Bus. 8-bit bus that is attached to the adjacent South Input port. |
| | Output: | Always |
| | Active State: | High |
| | Signal Type: | CMOS |
| | Transaction: | |
| OutloadN0 | | North Load. Attached to the adjacent South South_Load signal. |
| | Output: | Always |
| | Active State: | High |
| | Signal Type: | CMOS |
| | Transaction: | The North Port asserts this signal during the same clock cycle the data on OutportN has been asserted and is valid. The adjacent South Port will latch the data on OutportN into its input FIFO on the next clock edge. |
| Ext_SFull2 | | External South Full. The adjacent South port (connected to this North port) is full and cannot accept more data. |
| | Input: | Always |
| | Active State: | High |
| | Signal Type: | CMOS |
| | Transaction: | When this signal is asserted, AND the processor is attempting to write to this port, the instruction sequencer will halt operation of the processor until the signal is deasserted. |

153

| Signal Name | Parameter | Description |
|---|---|---|
| North_Data1(0:7) | | North Input Data Bus. 8-bit bus contains the data that will be transferred from the adjacent South Port |
| | Input: | |
| | Active State: | High |
| | Signal Type: | CMOS |
| | Transaction: | |
| | | |
| North_Load1 | | North Load. Signal from the adjacent South port that the data on the bus is valid. |
| | Input: | Always |
| | Active State: | High |
| | Signal Type: | CMOS |
| | Transaction: | When asserted, the North port will shift the data on the North_Data bus into the FIFO on the next rising edge of the clock. |
| North_Full1 | | North input FIFO full. |
| | Output: | Always |
| | Active State: | High |
| | Signal Type: | CMOS |
| | Transaction: | When asserted, the adjacent South port will not assert any more data. |
| OutportN1(0:7) | | North Output Bus. 8-bit bus that is attached to the adjacent South Input port. |
| | Output: | Always |
| | Active State: | High |
| | Signal Type: | CMOS |
| | Transaction: | |
| OutloadN1 | | North Load. Attached to the adjacent South South_Load signal. |
| | Output: | Always |
| | Active State: | High |
| | Signal Type: | CMOS |
| | Transaction: | The North Port asserts this signal during the same clock cycle the data on OutportN has been asserted and is valid. The adjacent South Port will latch the data on OutportN into its input FIFO on the next clock edge. |
| Ext_SFull3 | | External South Full. The adjacent South port (connected to this North port) is full and cannot accept more data. |
| | Input: | Always |
| | Active State: | High |
| | Signal Type: | CMOS |
| | Transaction: | When this signal is asserted, AND the processor is attempting to write to this port, the instruction sequencer will halt operation of the processor until the signal is deasserted. |

Table A-43 3D-Flow chip East ports signals description

| Signal Name | Parameter | Description |
|---|---|---|
| East_Data1(0:7) | | EastInput Data Bus. 8-bit bus contains the data that will be transferred from the adjacent West Port |
| | Input: | Always |
| | Active State: | High |
| | Signal Type: | CMOS |
| | Transaction: | |
| East_Load1 | | East Load. Signal from the adjacent West port that the data on the bus is valid. |
| | Input: | Always |
| | Active State: | High |
| | Signal Type: | CMOS |
| | Transaction: | When asserted, the East port will shift the data on the East_Data bus into the FIFO on the next rising edge of the clock. |
| | | |
| East_Full1 | | East input FIFO full. |
| | Output: | Always |
| | Active State: | High |
| | Signal Type: | CMOS |
| | Transaction: | When asserted, the adjacent West port will not assert any more data |
| OutportE1(0:7) | | East Output Bus. 8-bit bus that is attached to the adjacent West Input port. |
| | Output: | Always |
| | Active State: | High |
| | Signal Type: | CMOS |
| | Transaction: | |
| OutloadE1 | | East Load. Attached to the adjacent West_Load signal. |
| | Output: | Always |
| | Active State: | High |
| | Signal Type: | CMOS |
| | Transaction: | The East Port asserts this signal during the same clock cycle the data on OutportE has been asserted and is valid. The adjacent West Port will latch the data on OutportE into its input FIFO on the next clock edge |
| | | |
| Ext_WFull0 | | External West Full. The adjacent West port (connected to this East port) is full and cannot accept more data. |
| | Input: | Always |
| | Active State: | High |
| | Signal Type: | CMOS |
| | Transaction: | When this signal is asserted, AND the processor is attempting to write to this port, the instruction sequencer will halt operation of the processor until the signal is deasserted |

155

| Signal Name | Parameter | Description |
|---|---|---|
| East_Data3(0:7) | | East Input Data Bus. 8-bit bus contains the data that will be transferred from the adjacent West Port |
| | Input: | Always |
| | Active State: | High |
| | Signal Type: | CMOS |
| | Transaction: | |
| East_Load3 | | East Load. Signal from the adjacent West port that the data on the bus is valid. |
| | Input: | Always |
| | Active State: | High |
| | Signal Type: | CMOS |
| | Transaction: | When asserted, the East port will shift the data on the East_Data bus into the FIFO on the next rising edge of the clock. |
| East_Full3 | | East input FIFO full. |
| | Output: | Always |
| | Active State: | High |
| | Signal Type: | CMOS |
| | Transaction: | When asserted, the adjacent West port will not assert any more data |
| OutportE3(0:7) | | East Output Bus. 8-bit bus that is attached to the adjacent West Input port. |
| | Output: | Always |
| | Active State: | High |
| | Signal Type: | CMOS |
| | Transaction: | |
| OutloadE3 | | East Load. Attached to the adjacent West_Load signal. |
| | Output: | Always |
| | Active State: | High |
| | Signal Type: | CMOS |
| | Transaction: | The East Port asserts this signal during the same clock cycle the data on OutportE has been asserted and is valid. The adjacent West Port will latch the data on OutportE into its input FIFO on the next clock edge |
| Ext WFull2 | | External West Full. The adjacent West port (connected to this East port) is full and cannot accept more data. |
| | Input: | Always |
| | Active State: | High |
| | Signal Type: | CMOS |
| | Transaction: | When this signal is asserted, AND the processor is attempting to write to this port, the instruction sequencer will halt operation of the processor until the signal is deasserted |

Table A-44 3D-Flow chip West ports signals description

| Signal Name | Parameter | Description |
|---|---|---|
| West_Data0(0:7) | | West Input Data Bus. 8-bit bus contains the data that will be transferred from the adjacent East Port |
| | Input: | Always |
| | Active State: | High |
| | Signal Type: | CMOS |
| | Transaction: | |
| West_Load0 | | West Load. Signal from the adjacent East port that the data on the bus is valid. |
| | Input: | Always |
| | Active State: | High |
| | Signal Type: | CMOS |
| | Transaction: | When asserted, the West port will shift the data on the West_Data bus into the FIFO on the next rising edge of the clock |
| West_Full0 | | West input FIFO full. |
| | Output: | Always |
| | Active State: | High |
| | Signal Type: | CMOS |
| | Transaction: | When asserted, the adjacent East port will not assert any more data |
| OutportW0(0:7) | | West Output Bus. 8-bit bus that is attached to the adjacent East Input port. |
| | Output: | Always |
| | Active State: | High |
| | Signal Type: | CMOS |
| | Transaction: | |
| OutloadW0 | | West Load. Attached to the adjacent East_Load signal. |
| | Output: | Always |
| | Active State: | High |
| | Signal Type: | CMOS |
| | Transaction: | The West Port asserts this signal during the same clock cycle the data on OutportW has been asserted and is valid. The adjacent East Port will latch the data on OutportW into its input FIFO on the next clock edge |
| Ext_EFull1 | | External EastFull. The adjacent East port (connected to this West port) is full and cannot accept more data. |
| | Input: | Always |
| | Active State: | High |
| | Signal Type: | CMOS |
| | Transaction: | When this signal is asserted, AND the processor is attempting to write to this port, the instruction sequencer will halt operation of the processor until the signal is deasserted |

| Signal Name | Parameter | Description |
|---|---|---|
| West_Data2(0:7) | | West Input Data Bus. 8-bit bus contains the data that will be transferred from the adjacent East Port |
| | Input: | Always |
| | Active State: | High |
| | Signal Type: | CMOS |
| | Transaction: | |
| West_Load2 | | West Load. Signal from the adjacent East port that the data on the bus is valid. |
| | Input: | Always |
| | Active State: | High |
| | Signal Type: | CMOS |
| | Transaction: | When asserted, the West port will shift the data on the West_Data bus into the FIFO on the next rising edge of the clock |
| West_Full2 | | West input FIFO full. |
| | Output: | Always |
| | Active State: | High |
| | Signal Type: | CMOS |
| | Transaction: | When asserted, the adjacent East port will not assert any more data |
| OutportW2(0:7) | | West Output Bus. 8-bit bus that is attached to the adjacent East Input port. |
| | Output: | Always |
| | Active State: | High |
| | Signal Type: | CMOS |
| | Transaction: | |
| OutloadW2 | | West Load. Attached to the adjacent East_Load signal. |
| | Output: | Always |
| | Active State: | High |
| | Signal Type: | CMOS |
| | Transaction: | The West Port asserts this signal during the same clock cycle the data on OutportW has been asserted and is valid. The adjacent East Port will latch the data on OutportW into its input FIFO on the next clock edge |
| Ext_EFull3 | | External EastFull. The adjacent East port (connected to this West port) is full and cannot accept more data. |
| | Input: | Always |
| | Active State: | High |
| | Signal Type: | CMOS |
| | Transaction: | When this signal is asserted, AND the processor is attempting to write to this port, the instruction sequencer will halt operation of the processor until the signal is deasserted |

Table A-45 3D-Flow chip South ports signals description

| Signal Name | Parameter | Description |
|---|---|---|
| South_Data2(0:7) | | South Input Data Bus. 8-bit bus contains the data that will be transferred from the adjacent North Port |
| | Input: | Always |
| | Active State: | High |
| | Signal Type: | CMOS |
| | Transaction: | |
| South_Load2 | | South Load. Signal from the adjacent North port that the data on the bus is valid. |
| | Input: | Always |
| | Active State: | High |
| | Signal Type: | CMOS |
| | Transaction: | When asserted, the South port will shift the data on the South Data bus into the FIFO on the next rising edge of the clock |
| South_Full2 | | |
| | Output: | Always |
| | Active State: | High |
| | Signal Type: | CMOS |
| | Transaction: | When asserted, the adjacent North port will not assert any more data |
| OutportS2(0:7) | | South Output Bus. 8-bit bus that is attached to the adjacent North Input port. |
| | Output: | Always |
| | Active State: | High |
| | Signal Type: | CMOS |
| | Transaction: | |
| OutloadS2 | | South Load. Attached to the adjacent North_Load signal. |
| | Output: | Always |
| | Active State: | High |
| | Signal Type: | CMOS |
| | Transaction: | The South Port asserts this signal during the same clock cycle the data on OutportS has been asserted and is valid. The adjacent North Port will latch the data on OutportS into its input FIFO on the next clock edge |
| Ext_NFull0 | | External North Full. The adjacent North port (connected to this South port) is full and cannot accept more data. |
| | Input: | Always |
| | Active State: | High |
| | Signal Type: | CMOS |
| | Transaction: | When this signal is asserted, AND the processor is attempting to write to this port, the instruction sequencer will halt operation of the processor until the signal is deasserted |

| Signal Name | Parameter | Description |
|---|---|---|
| South_Data3(0:7) | | South Input Data Bus. 8-bit bus contains the data that will be transferred from the adjacent North Port |
| | Input: | Always |
| | Active State: | High |
| | Signal Type: | CMOS |
| | Transaction: | |
| | | |
| South_Load3 | | South Load. Signal from the adjacent North port that the data on the bus is valid. |
| | Input: | Always |
| | Active State: | High |
| | Signal Type: | CMOS |
| | Transaction: | When asserted, the South port will shift the data on the South_Data bus into the FIFO on the next rising edge of the clock |
| | | |
| South_Full3 | | |
| | Output: | Alwasy |
| | Active State: | High |
| | Signal Type: | CMOS |
| | Transaction: | When asserted, the adjacent North port will not assert any more data |
| OutportS3(0:7) | | South Output Bus. 8-bit bus that is attached to the adjacent North Input port. |
| | Output: | Always |
| | Active State: | High |
| | Signal Type: | CMOS |
| | Transaction: | |
| OutloadS3 | | South Load. Attached to the adjacent North_Load signal. |
| | Output: | Always |
| | Active State: | High |
| | Signal Type: | CMOS |
| | Transaction: | The South Port asserts this signal during the same clock cycle the data on OutportS has been asserted and is valid. The adjacent North Port will latch the data on OutportS into its input FIFO on the next clock edge |
| Ext_NFull1 | | External North Full. The adjacent North port (connected to this South port) is full and cannot accept more data. |
| | Input: | Always |
| | Active State: | High |
| | Signal Type: | CMOS |
| | Transaction: | When this signal is asserted, AND the processor is attempting to write to this port, the instruction sequencer will halt operation of the processor until the signal is deasserted |

Table A-46 3D-Flow chip RS232C signal description

| Signal Name | Parameter | Description |
|---|---|---|
| CHIP_ID (0-5) | | Hard-wired chip identification |
| | Input: | Always |
| | Active State: | High |
| | Signal Type: | CMOS |
| | Transaction: | This value is compared to the incoming chip_id over the RS232C interface. |
| RS232_RxD | | UART Receive Data |
| | Input: | Always |
| | Active State: | High |
| | Signal Type: | CMOS |
| | Transaction: | |
| | | |
| RS232_TxD | | UART Transmit Data |
| | Output: | Always |
| | Active State: | High |
| | Signal Type: | CMOS |
| | Transaction: | |
| | | |
| RS232_CTS | | UART Clear To Send |
| | Output: | |
| | Active State: | High |
| | Signal Type: | CMOS |
| | Transaction: | UART asserts CTS when it is ready to accept data. |
| RS232_RTS | | UART Request to Send |
| | Input: | Always |
| | Active State: | High |
| | Signal Type: | CMOS |
| | Transaction: | External Device asserts RTS when it is ready to send a packet of data to the UART. UART responds by asserting CTS. |
| | | |
| RS232_CLK | | UART CLock |
| | Input: | Always |
| | Active State: | High |
| | Signal Type: | CMOS |
| | Transaction | |
| VDD | | N 3.3 V input power pins |
| | Input: | Always |
| | | |
| | Signal Type: | Power |
| GND | | N Ground pins |
| | Input: | Always |
| | Signal Type | Ground |

Table A-47 3D-Flow chip JTAG signal description

| Signal Name | Parameter | Description |
|---|---|---|
| JTAG_TCK | | JTAG Test Clock |
| | Input: | Always |
| | Active State: | High |
| | Signal Type: | CMOS |
| | Transaction: | |
| JTAG_TRST | | JTAG Test Reset |
| | Input: | Always |
| | Active State: | Low |
| | Signal Type: | CMOS |
| | Transaction: | When asserted, the test logic is reset, including the JTAG, BIST, and Scan logic. |
| | | |
| JTAG_TMS | | JTAG Test Mode Select |
| | Input: | Always |
| | Active State: | High |
| | Signal Type: | CMOS |
| | Transaction: | Controls the TAP controller per the 1149.1 specification. |
| | | |
| JTAG_TDI | | JTAG Test Data Input |
| | Input: | Always |
| | Active State: | High |
| | Signal Type: | CMOS |
| | Transaction: | |
| JTAG_TDO | | JTAG Test Data Output |
| | Output: | Always |
| | Active State: | High |
| | Signal Type: | CMOS |
| | Transaction: | |
| | | |

Table A-48 3D-Flow chip miscellaneous signal description

| Signal Name | Parameter | Description |
|---|---|---|
| SIMD_CMD(0-47) | | SIMD instruction command signals |
| | Input: | Always |
| | Active State: | High |
| | Signal Type: | CMOS |
| | Transaction | |
| SIMD_load | | SIMD instruction command strobe signals |
| | Input: | Always |
| | Active State: | High |
| | Signal Type: | CMOS |
| | Transaction: | |
| MIMD/SIMD | | Mode control for MIMD/SIMD operation. |
| | Input: | Always |
| | Active State: | Low |
| | Signal Type: | CMOS |
| | Transaction: | |
| | | |
| SYNC/DDrv | | Mode control for synchronous operation or Data Driven mode of operation. |
| | Input: | Always |
| | Active State: | High |
| | Signal Type: | CMOS |
| | Transaction: | |
| | | |
| Timer_up | | Timer count_up clock |
| | Input: | Always |
| | Active State: | High |
| | Signal Type: | CMOS |
| | Transaction: | |
| Timer_reset | | Reset only the timer counter. |
| | Output: | Always |
| | Active State: | High |
| | Signal Type: | CMOS |
| | Transaction: | |
| RESET | | Master Reset |
| | Input: | Always |
| | Active State: | Low |
| | Signal Type: | CMOS |
| | Transaction: | When Asserted, the chip logic is reset. All registers in the chip will be set to a known state. |
| CLOCK | | Master Clock |
| | Input: | Always |
| | Active State: | |
| | Signal Type: | CMOS |
| | Transaction: | Master Clock. All registers in the chip are run off the positive edge of the clock. |
| | | |

Appendix B DETAILS OF THE KEY FEATURES OF THE SYSTEM

- Example of data exchange (3x3 area)

Table B-49. 3D-Flow code to route 3x3 information to each processor (see Section 5.8.1.1).

| /* | | Operations | Comments | | | | | | Register File | | | | Comparator | ENC | Data Memory | |
|---|---|---|---|---|---|---|---|---|---|---|---|---|---|---|---|---|
| /* | | | INITIALIZE VARIABLES | Strobe | CNTL | MAC | ALU1 | ALU2 | x=Bus | x=Bus | x=Reg. | x=Reg. | ThReg CC | | DM1 | DM2 |
| /* | | | | | /FMT | | | | x to AR | x to BR | AR to x | BR to x | x=enab CC | | | |
| /* Bit | field | instruction | word | | 95-93 | 92-88 | 87-83 | 82-78 | 77-75 | 74-72 | 71-68 | 67-64 | 63-60 | 59-58 | 57-55 | 54-52 |
| | | | | 1 | 000 | 00000 | 00000 | 00111 | 000 | 000 | 0000 | 0000 | 0000 | 00 | 000 | 001 |
| /* Line 14 | DATA: | r23=N=E=W=S=DM2 P <- Tlo, SUB A2 Thi-r22, B=outFIFO | Get word1 (ADC1i, ADC2i). Convert ADCi to Energy (Ei). Subtract Pedestal from ADC2i. | | | | | SUBS | | | | | | | | Blo=ADDr |
| /* Step 1 | | | Send Time_stamp to the Bottom Port | | | | | | | | | | | | | |
| | | | | 1 | 111 | 00000 | 01011 | 00111 | 010 | 011 | 1010 | 0111 | 0000 | 00 | 000 | 000 |
| /* Line 15 | | SUBS_A2 Thi-r5, B=outFIFO, Timer T, r10=A2lo, ST A1 r23 | Get Word2 (ADC3i, ADC4i). Increment Time_Stamp. Subtract Pedestal from ADC3i. | | Write D | | ST | SUBS | B to AR | C to BR | AR to r10 | BR to R23 | | | | |
| /* Step 2 | | [N=E=W=S=r23] | Send Ei to North, East, West and South (NEWS) neighbors. Sum1=EMi. [r10=(ADC2i-Ped_2)] | | to Timer | | | | | | | | | | | |
| | | | | 1 | 000 | 00010 | 00000 | 11000 | 001 | 100 | 0100 | 0101 | 0000 | 00 | 000 | 000 |
| /* Line 16 | | MPYS r10 * r20, r4 T, CLR A2, r21 A2lo | Get word3 (P1). Calculate Energy HADi = (HADi * Const 2). Sum2=0. | | | MPYS | | CLR | A to AR | D to BR | AR to R4 | BR to | | | | |
| /* Step 3 | | | [r21 (ADC3i-Ped_3)] [r4 P1] | | | | | | | | | r21 | | | | |
| | | | | 1 | 000 | 00000 | 00010 | 00010 | 100 | 000 | 0111 | 0000 | 0000 | 00 | 000 | 000 |
| /* Line 17 | | E=N, W=S, ACCS A1 N, ACCS_A2 W, r7=Timer | Get Energy En and Es from North and South neighbors and send to East | | | | ACCS | ACCS | D to AR | | AR to | | | | | |
| /* Step 4 | | | and West. Sum1 = Sum1 + En, Sum2 = Sum2 + Es. [r7=Timer] | | | | | | | | r7 | | | | | |
| | | | | 1 | 000 | 00000 | 00010 | 00010 | 000 | 000 | 0000 | 0000 | 0000 | 00 | 000 | 000 |
| /* Line 18 | | N=W, S=E, ACCS_A1_W, ACCS_A2_E | Get Energy Ew and Ee from West and East neighbors and send to | | | | ACCS | ACCS | | | | | | | | |
| /* Step 5 | | | North and South. Sum1 = Sum1 + Ew, Sum2 = Sum2 + Ee | | | | | | | | | | | | | |
| | | | | 1 | 000 | 10010 | 00010 | 00010 | 000 | 011 | 0000 | 1100 | 0000 | 00 | 000 | 000 |
| /* Line 19 | | ACCS_A1_W, ACCS_A2_E, ASR_A3_8 | Get Energy Ewn and Ees from West_North and East_South | | | ASR | ACCS | ACCS | | C to BR | | BR to | | | | |
| /* Step 6 | | | neighbors. Sum1 = Sum1 + Ewn, Sum2 = Sum2 + Ees | | | | | | | | | r28 | | | | |
| | | | | 1 | 000 | 01010 | 00010 | 00010 | 011 | 000 | 1111 | 0000 | 0000 | 00 | 000 | 000 |
| /* Line 20 | | ADDS A1 N, ACCS A2 S, ADDS_A3 r23, r15=A3lo | Get Energy Ene and Esw from North_East and South West. ETi=(EMi+HADi) | | | ADDS | ACCS | ACCS | C to AR | | AR to r15 | | | | | |
| /* Step 7 | | | neighbors. Sum1 = Sum1 + Ene, Sum2 = Sum2 + Esw. [Normalize A3] | | | | | | | | | | | | | |

164

| /* | Core BUS Control | | | | Ring BUS Control | | | OutputPort Control | | | | | Buffer/Out | NUMERIC |
|---|---|---|---|---|---|---|---|---|---|---|---|---|---|---|
| /* | x to | x to | x to | x to | x to | x to | x to | x to | x to | x to | x to | x to | En/Dis | Constant/BRAddr |
| /* | Bus A | Bus B | Bus C | Bus D | Ring A | Ring B | Ring C | Bottom | North | East | West | South | OutFIFO | Memadd1/Memadd 2 |
| /* Bit | 51-48 | 47-44 | 43-40 | 39-36 | 35-33 | 32-30 | 29-27 | 26-25 | 24-23 | 22-21 | 20-19 | 18-17 | 16 | 15-0 |
| | 1001 | 1101 | 0110 | 0000 | 000 | 001 | 001 | 11 | 00 | 00 | 00 | 00 | 0 | 0000000000010010 |
| /* Line 14 | A1lo | Ring B | r22 | | | Top to | A | Ring C | | | | | | A2_Bhi_Clo, A2_Bhi, A1_AC |
| /* Step 1 | to A | to B | to C | | | Ring B | Ring C | to Bottom | | | | | | |
| | 0101 | 1001 | 1100 | 1101 | 111 | 001 | 001 | 11 | 01 | 01 | 01 | 01 | 0 | 0000000001110011 |
| /* Line 15 | r5 | A2lo | DM2 | Ring B | C to | Top to | A to | Ring C | Ring A | Ring A | Ring A | Ring A | | A2_Dhi_Alo, A1_C |
| /* Step 2 | to A | to B | to C | to D | ring A | Ring B | to Ring C | to Bottom | to North | to East | to West | to South | | |
| | 1101 | 0010 | 0100 | 1001 | 001 | 000 | 000 | 00 | 00 | 00 | 00 | 00 | 0 | 0101100001100000 |
| /* Line 16 | Ring A | r10 | r20 | A2lo | Top to | | | | | | | | | A3_BC, A1_C |
| /* Step 3 | to A | to B | to C | to D | Ring A | | | | | | | | | |
| | 1101 | 1101 | 0000 | 1110 | 010 | 101 | 000 | 00 | 00 | 01 | 10 | 00 | 0 | 0000000000100010 |
| /* Line 17 | Ring A | Ring B | | Timer | North to | South to | | | | Ring A | Ring B | | | A1_A, A2_B |
| /* Step 4 | to A | to B | | to D | Ring A | Ring B | | | | to East | to West | | | |
| | 1101 | 1101 | 0000 | 0000 | 100 | 011 | 000 | 00 | 01 | 00 | 00 | 10 | 0 | 0000000000100010 |
| /* Line 18 | Ring A | Ring B | | | West to | East to | | | Ring A | | | Ring B | | A1_A, A2_B |
| /* Step 5 | to A | to B | | | Ring A | Ring B | | | to North | | | to South | | |
| | 1101 | 1101 | 0111 | 0000 | 100 | 011 | 000 | 00 | 00 | 00 | 00 | 00 | 0 | 0010000000100010 |
| /* Line 19 | Ring A | Ring B | r23 | | West to | East to | | | | | | | | A1_A, A2_B, A3_SH8 |
| /* Step 6 | to A | to B | to C | | Ring A | Ring B | | | | | | | | |
| | 1101 | 1101 | 1011 | 0100 | 010 | 101 | 000 | 00 | 00 | 00 | 00 | 00 | 0 | 0001000000100010 |
| /* Line 20 | Ring A | Ring B | A3lo | r28 | North to | South to | | | | | | | | A1_A, A2_B, A3_D |
| /* Step 7 | to A | to B | to C | to D | Ring A | Ring B | | | | | | | | |

The detail of the program shown in Section 5.8.1.5 coded in 3D-Flow assembler is shown in Table B-50

Table B-50. 3D-Flow code that implements the program described in the flow chart of Figure 20 (bits 95-52)

| /* | | Operations | Comments | | | | | | Register File | | | | Comparator | ENC | Data Memory | |
|---|---|---|---|---|---|---|---|---|---|---|---|---|---|---|---|---|
| /* | | | INITIALIZE VARIABLES | Strobe | CNTL | MAC | ALU1 | ALU2 | x=Bus | x=Bus | x=Reg. | x=Reg. | ThRegCC | | DM1 | DM2 |
| /* | | | | | /FMT | | | | x to AR | x to BR | AR to x | BR to x | x=enab CC | | | |
| /* Bit | field | instruction | word | | 95-93 | 92-88 | 87-83 | 82-78 | 77-75 | 74-72 | 71-68 | 67-64 | 63-60 | 59-58 | 57-55 | 54-52 |
| | | | | 1 | 000 | 00000 | 01011 | 00000 | 000 | 000 | 0000 | 0000 | 0000 | 00 | 000 | 000 |
| /* Line 40 | DATA: | ST_AT_T | Check if input data from Top is not zeros | | | | ST_AT | | | | | | | | | |
| /* Step 1 | | | | | | | | | | | | | | | | |
| | | | | 1 | 010 | 00000 | 00000 | 00000 | 000 | 000 | 0000 | 0000 | 0000 | 00 | 000 | 000 |
| /* Line 41 | | BRccSET #1 #1 DATA | If there are no data from Top, fetch next values. | | BRccSET | | | | | | | | | | | |
| /* Step 2 | | | ELSE | | | | | | | | | | | | | |
| | | | | 1 | 000 | 00000 | 00000 | 00000 | 000 | 000 | 0000 | 0000 | 0000 | 00 | 000 | 000 |
| /* Line 42 | | S=r12 | Send ID to South port | | | | | | | | | | | | | |
| /* Step 3 | | | | | | | | | | | | | | | | |
| | | | | 1 | 000 | 00000 | 00000 | 00000 | 000 | 000 | 0000 | 0000 | 0000 | 00 | 000 | 000 |
| /* Line 43 | | S=T | Send Timer value to South port | | | | | | | | | | | | | |
| /* Step 4 | | | | | | | | | | | | | | | | |
| | | | | 1 | 001 | 00000 | 00000 | 00000 | 000 | 000 | 0000 | 0000 | 0000 | 00 | 000 | 000 |
| /* Line 44 | | BRA DATA, S=ATlo | Send to South port the value received from Top port | | BRA | | | | | | | | | | | |
| /* Step 5 | | | Then fetch next values | | | | | | | | | | | | | |

Continuation of 3D_flow code of Table B-50 for bits 51-0

| /* | Core BUS Control | | | | Ring BUS Control | | | Output Port Control | | | | | Buffer/Out | NUMERIC |
|---|---|---|---|---|---|---|---|---|---|---|---|---|---|---|
| /* | x to | x to | x to | x to | x to | x to | x to | x to | x to | x to | x to | x to | En/Dis | Constant/BRAddr |
| /* | Bus A | Bus B | Bus C | Bus D | Ring A | Ring B | Ring C | Bottom | North | East | West | South | OutFIFO | Memadd1/Memadd2 |
| /* Bit | 51-48 | 47-44 | 43-40 | 39-36 | 35-33 | 32-30 | 29-27 | 26-25 | 24-23 | 22-21 | 20-19 | 18-17 | 16 | 15-0 |
| | | 0000 | 0000 | 0000 | 001 | 000 | 000 | 00 | 00 | 00 | 00 | 00 | 0 | 0000000000100000 |
| /* Line 40 | Ring A | | | | Top to | | | | | | | | | A1_A |
| /* Step 1 | to A | | | | Ring A | | | | | | | | | |
| | 0000 | 0000 | 0000 | 0000 | 000 | 000 | 000 | 00 | 00 | 00 | 00 | 00 | 0 | 0001000101111111 |
| /* Line 41 | | | | | | | | | | | | | | offset = -1, bit 1, bit 1 |
| /* Step 2 | | | | | | | | | | | | | | |
| | 0000 | 0100 | 0000 | 0000 | 000 | 000 | 010 | 00 | 00 | 00 | 00 | 11 | 0 | 0000000000000000 |
| /* Line 42 | | R12 | | | | | B to | | | | | Ring C | | |
| /* Step 3 | | to B | | | | | Ring C | | | | | to South | | |
| | 1101 | 0000 | 0000 | 0000 | 001 | 000 | 001 | 00 | 00 | 00 | 00 | 11 | 0 | 0000000000000000 |
| /* Line 43 | Ring A | | | | Top to | | A to | | | | | Ring C | | |
| /* Step 4 | to A | | | | Ring A | | Ring C | | | | | to South | | |
| | 1001 | 0000 | 0000 | 0000 | 000 | 000 | 001 | 00 | 00 | 00 | 00 | 11 | 0 | 0000000001111100 |
| /* Line 44 | A1lo to A | | | | | | A to | | | | | Ring C | | offset = -4 |
| /* Step 5 | | | | | | | Ring C | | | | | to South | | |

- Example of reduction from *n* to one channel (reduction by a factor of 4 each layer)

The overall task of the processes in the pyramid is to look for the presence of two data (result and time-stamp) received from the previous stack of processors executing the algorithm. The first layer of the pyramid receives the first of these two data and adds the ID of the processor. These three are part of the output. The other layers of the pyramid route this data from the input to the output. The first two flow charts refer to the programs in the first layer of the pyramid. The other flow charts refer to the programs in the subsequent layers of the pyramid. TableC-2 lists the detailed 3D-Flow program for the above flow chart. In order to understand the details of the operations of 3D-Flow processor in the pyramid, one has to refer to (Section 5.3) describing the ASIC and the bit field for each micro instruction. The easiest way to start reading and understanding the program in Table C-2 is that of reading the bit-field of the 4$^{th}$ row. The instruction word for the 3D-Flow processor is 96 bits wide. The first column gives the line number in the program and the step in the routine. The next columns list the labels, operations and comments. The functions of the instructions are grouped in 26 columns. Due to its width, the table has been divided into two parts.

To fully understand the data flow and operation on a single processor, the reader must also refer to Figure 55, and Figure 56 and the microcode summary tables of Section 5.3.2. The understanding of the dataflow in a large system of processors aimed to execute a task is described later in this document.

Instruction at line 40: The program in Table C-2 starts at line 40, step 1. The previous 39 lines are used for initialization. The operation is ST_A1_T (store the input value from the top port into the accumulator A1). In the second section of Table C-2 at bit field 35-33, the code is 001. By checking the meaning of this code in the microcode table and by looking at the Figure 56, one can see that this code is establishing a path connection between the Top FIFO and ring A. The microcode 1101 at bit fields 51-48 reported in the second part of the table, establishes the path connection from ring A bus to core bus A. ( see Figure 56). The microcode 01011 at bit fields 87-83 reported in first part of the table, loads the value received from the top port through ring A and A bus into the accumulator A1.

Instruction at line 41: The second line of the program checks the condition code status register for bit 1 corresponding to zero flag of the accumulator A1.( see bit field 15-8 for line 41 in the second part of Table C-2, the microcode summary in Table 6-5 and the ccsts bit assignment.) The bit field 95-93 indicates which type of branch operation has to be performed according to the status of those two flag bits. In this case it must branch to the previous instruction if the content of the accumulator is zero. The offset of the branch is given in bit field 6-0.

Instruction at line 42: In line 42, the code 0100 in the bit field 47-44, places the value of ID of that particular processor (stored previously in register R12) into core bus B. Bit field 29-27 connects the data path from core bus B to ring C. Bit field 17-18 in the second part of the Table C-2 establishes the path and sends to the south output port, the value from register 12.

Instruction at line 43: The instruction takes the data received from the top port and sends it to the south port (bypass). (This value is the time stamp for most of the applications described in this document, but it can be any other value. Several of these instructions can be used to transfer more than one value) Bit field 35-33 with code 001 in the second part of the Table C-2 establishes the path from the top port to ring A. Bit field 51-48 with code 1101 establishes the path between ring A. Bit field 51-48 with code 1101 establishes the path between ring A and core bus A. Bit field 29-27 with code 001 establishes the path between core bus A and ring C. Bit field 18-17 with code 11 establishes the path and sends the value received from the top port to the south output port.

Instruction at line 44: The data which was stored in A1 at the beginning of this loop is sent to the south outport and the program counter is set to the point to the instruction at line 40 to repeat the program. Bit field 51-48 with code 1001 places the value of A1 into core bus A. Bit field 23-27 with code 001 establishes the path between core bus A. Bit field 23-27 with code 001 establishes the path between core bus A and ring C, while bit field 18-17 establishes the path between ring C on the south output port and sends the data out. Bit field 95-93 with code 001 initializes the program counter for the next operation to a new instruction whose offset is given in bit field 7-0. In the present case, since it has to go back to line 40, the offset is -4.

Table B-51. 3D-Flow code that implements the program described in the flow chart of Figure 19 (bits 95-52).

| /* | | Operations | Comments | | | | | | Register File | | | | Compar | ENC | Data Memory | |
|---|---|---|---|---|---|---|---|---|---|---|---|---|---|---|---|---|
| /* | | | INITIALIZE VARIABLES | Strobe | CNTL | MAC | ALU1 | ALU2 | x=Bus | x=Bus | x=Reg. | x=Reg. | ThReg CC | | DM1 | DM2 |
| /* | | | | | /FMT | | | | x to AR | x to BR | AR to x | BR to x | x=enab CC | | | |
| /* Bit | field | instruction | word | | 95-93 | 92-88 | 87-83 | 82-78 | 77-75 | 74-72 | 71-68 | 67-64 | 63-60 | 59-58 | 57-55 | 54-52 |
| | | | | 1 | 000 | 00000 | 01011 | 01011 | 000 | 000 | 0000 | 0000 | 0000 | 00 | 000 | 000 |
| /* Line 8 | DATA: | ST A1 T. ST_A2_W | Check if input data from Top. or W. are not zeros | | | | ST A1 | ST_A2 | | | | | | | | |
| /* Step 1 | | | | | | | | | | | | | | | | |
| | | | | 1 | 011 | 00000 | 00000 | 00000 | 000 | 000 | 0000 | 0000 | 0000 | 00 | 000 | 000 |
| /* Line 9 | | BRccSET #9 #9 NOZERO | If data from West is present, | | BRccCLR | | | | | | | | | | | |
| /* Step 2 | | | than goto NOZERO, ELSE | | | | | | | | | | | | | |
| | | | | 1 | 010 | 00000 | 00000 | 00000 | 000 | 000 | 0000 | 0000 | 0000 | 00 | 000 | 000 |
| /* Line 10 | | BRccSET #1 #1 DATA | If there are no data from Top, fetch next values. | | BRccSET | | | | | | | | | | | |
| /* Step 3 | | | ELSE | | | | | | | | | | | | | |
| | | | | 1 | 000 | 00000 | 00000 | 00000 | 000 | 000 | 0000 | 0000 | 0000 | 00 | 000 | 000 |
| /* Line 11 | | E=r12 | Send ID to East port. | | | | | | | | | | | | | |
| /* Step 4 | | | | | | | | | | | | | | | | |
| | | | | 1 | 000 | 00000 | 00000 | 00000 | 000 | 000 | 0000 | 0000 | 0000 | 00 | 000 | 000 |
| /* Line 12 | | E=T | Send Timer value to East | | | | | | | | | | | | | |
| /* Step 5 | | | | | | | | | | | | | | | | |
| | | | | 1 | 001 | 00000 | 00000 | 00000 | 000 | 000 | 0000 | 0000 | 0000 | 00 | 000 | 000 |
| /* Line 13 | | BRA DATA, E A1lo | Send to East port the value received from Top | | BRA | | | | | | | | | | | |
| /* Step 6 | | | Then fetch next values. | | | | | | | | | | | | | |
| | | | | 1 | 000 | 00000 | 00000 | 00000 | 000 | 000 | 0000 | 0000 | 0000 | 00 | 000 | 000 |
| /* Line 14 | NoZero: | E=A2lo | Bypass received data from West port to East port | | | | | | | | | | | | | |
| /* Step 3 | | | | | | | | | | | | | | | | |
| | | | | 1 | 000 | 00000 | 00000 | 00000 | 000 | 000 | 0000 | 0000 | 0000 | 00 | 000 | 000 |
| /* Line 15 | | E=W | Bypass data from West port to East port. | | | | | | | | | | | | | |
| /* Step 4 | | | | | | | | | | | | | | | | |
| | | | | 1 | 010 | 00000 | 00000 | 00000 | 000 | 000 | 0000 | 0000 | 0000 | 00 | 000 | 000 |
| /* Line 16 | | BRccSET #1 #1 off, E=W | Bypass data from West port to East port. | | BRccSET | | | | | | | | | | | |
| /* Step 5 | | | | | | | | | | | | | | | | |
| | | | | 1 | 000 | 00000 | 00000 | 00000 | 000 | 000 | 0000 | 0000 | 0000 | 00 | 000 | 000 |
| /* Line 17 | | E=r12 | Send ID to East port. | | | | | | | | | | | | | |
| /* Step 6 | | | | | | | | | | | | | | | | |
| | | | | 1 | 000 | 00000 | 00000 | 00000 | 000 | 000 | 0000 | 0000 | 0000 | 00 | 000 | 000 |
| /* Line 18 | | E=T | Send Timer value to East | | | | | | | | | | | | | |
| /* Step 7 | | | | | | | | | | | | | | | | |
| | | | | 1 | 001 | 00000 | 00000 | 00000 | 000 | 000 | 0000 | 0000 | 0000 | 00 | 000 | 000 |
| /* Line 19 | | BRA DATA, E A1lo | Send to East port the value received from Top | | BRA | | | | | | | | | | | |

Continuation of the 3D-Flow code of Table B-51for bits 51-0

| /* | Core BUS Control | | | | Ring BUS Control | | | Output Port Control | | | | | Buffer/Out | NUMERIC |
|---|---|---|---|---|---|---|---|---|---|---|---|---|---|---|
| /* | x to | x to | x to | x to | x to | x to | x to | x to | x to | x to | x to | x to | En/Dis | Constant/BRAddr |
| /* | Bus A | Bus B | Bus C | Bus D | Ring A | Ring B | Ring C | Bottom | North | East | West | South | OutFIFO | Memadd1/Memadd2 |
| /* Bit | 51-48 | 47-44 | 43-40 | 39-36 | 35-33 | 32-30 | 29-27 | 26-25 | 24-23 | 22-21 | 20-19 | 18-17 | 16 | 15-0 |
| | 1101 | 0000 | 0000 | 1101 | 001 | 100 | 000 | 00 | 00 | 00 | 00 | 00 | 0 | 0000000000100100 |
| /* Line 8 | Ring A | | | Ring B | Top to | West to | | | | | | | | A1_A, A2_D |
| /* Step 1 | to A | | | to D | Ring A | Ring B | | | | | | | | |
| | 0000 | 0000 | 0000 | 0000 | 000 | 000 | 000 | 00 | 00 | 00 | 00 | 00 | 0 | 1001100100000101 |
| /* Line 9 | | | | | | | | | | | | | | offset 5, bit 9, bit 9 |
| /* Step 2 | | | | | | | | | | | | | | |
| | 0000 | 0000 | 0000 | 0000 | 000 | 000 | 000 | 00 | 00 | 00 | 00 | 00 | 0 | 0001000101111110 |
| /* Line 10 | | | | | | | | | | | | | | offset = -2, bit 1, bit 1 |
| /* Step 3 | | | | | | | | | | | | | | |
| | 0000 | 0100 | 0000 | 0000 | 000 | 000 | 010 | 00 | 00 | 11 | 00 | 00 | 0 | 0000000000000000 |
| /* Line 11 | | R12 | | | | | B to | | | Ring C | | | | |
| /* Step 4 | | to B | | | | | Ring C | | | to East | | | | |
| | 1101 | 0000 | 0000 | 0000 | 001 | 000 | 001 | 00 | 00 | 11 | 00 | 00 | 0 | 0000000000000000 |
| /* Line 12 | Ring A | | | | Top to | | A to | | | Ring C | | | | |
| /* Step 5 | to A | | | | Ring A | | Ring C | | | to East | | | | |
| | 1001 | 0000 | 0000 | 0000 | 000 | 000 | 001 | 00 | 00 | 11 | 00 | 00 | 0 | 0000000001111011 |
| /* Line 13 | A1lo to A | | | | | | A to | | | Ring C | | | | offset = - 5 |
| /* Step 6 | | | | | | | Ring C | | | to East | | | | |
| | 0000 | 0000 | 0000 | 1001 | 000 | 000 | 100 | 00 | 00 | 11 | 00 | 00 | 0 | 0000000000000000 |
| /* Line 14 | | | | A2lo to D | | | D to | | | Ring C | | | | |
| /* Step 3 | | | | | | | Ring C | | | to East | | | | |
| | 1101 | 0000 | 0000 | 0000 | 100 | 000 | 001 | 00 | 00 | 11 | 00 | 00 | 0 | 0000000000000000 |
| * Line 15 | Ring A | | | | West to | | A to | | | Ring C | | | | |
| /* Step 4 | to A | | | | Ring A | | Ring C | | | to East | | | | |
| | 1101 | 0000 | 0000 | 0000 | 100 | 000 | 001 | 00 | 00 | 11 | 00 | 00 | 0 | 0001000101111000 |
| /* Line 16 | Ring A | | | | West to | | A to | | | Ring C | | | | offset = -8, bit1, bit1 |
| /* Step 5 | to A | | | | Ring A | | Ring C | | | to East | | | | |
| | 0000 | 0100 | 0000 | 0000 | 000 | 000 | 010 | 00 | 00 | 11 | 00 | 00 | 0 | 0000000000000000 |
| /* Line 17 | | R12 | | | | | B to | | | Ring C | | | | |
| /* Step 6 | | to B | | | | | Ring C | | | to East | | | | |
| | 1101 | 0000 | 0000 | 0000 | 001 | 000 | 001 | 00 | 00 | 11 | 00 | 00 | 0 | 0000000000000000 |
| /* Line 18 | Ring A | | | | Top to | | A to | | | Ring C | | | | |
| /* Step 7 | to A | | | | Ring A | | Ring C | | | to East | | | | |
| | 1001 | 0000 | 0000 | 0000 | 000 | 000 | 001 | 00 | 00 | 11 | 00 | 00 | 0 | 0000000001110101 |
| /* Line 19 | A1lo to A | | | | | | A to | | | Ring C | | | | offset = - 11 |
| /* Step 8 | | | | | | | Ring C | | | to East | | | | |

Table B-52. 3D-Flow code that implements the program described in the flowchart of Figure 21 (bits 95-52)

| /* | | Operations | Comments | | | | | | Register File | | | | Comparator | ENC | Data Memory | |
|---|---|---|---|---|---|---|---|---|---|---|---|---|---|---|---|---|
| /* | | | INITIALIZE VARIABLES | Strobe | CNTL | MAC | ALU 1 | ALU 2 | x=Bus | x=Bus | x=Reg. | x=Reg. | ThRegCC | | DM1 | DM2 |
| /* | | | | | /FMT | | | | x to AR | x to BR | AR to x | BR to x | x=enab CC | | | |
| **/* Bit** | **field** | **instruction** | **word** | | **95-93** | **92-88** | **87-83** | **82-78** | **77-75** | **74-72** | **71-68** | **67-64** | **63-60** | **59-58** | **57-55** | **54-52** |
| | | | | 1 | 000 | 00000 | 01011 | 00000 | 000 | 000 | 0000 | 0000 | 0000 | 00 | 000 | 000 |
| /* Line 8 | DATA: | ST_A1_T | Check if input data from | | | | ST_A1 | | | | | | | | | |
| /* Step 1 | | | from Top port is not zero | | | | | | | | | | | | | |
| | | | | 1 | 010 | 00000 | 00000 | 00000 | 000 | 000 | 0000 | 0000 | 0000 | 00 | 000 | 000 |
| /* Line 9 | | BRccSET #1 #1 DATA | If there are no data from Top. | | BRccSET | | | | | | | | | | | |
| /* Step 2 | | | fetch next value. ELSE | | | | | | | | | | | | | |
| | | | | 1 | 000 | 00000 | 00000 | 00000 | 000 | 000 | 0000 | 0000 | 0000 | 00 | 000 | 000 |
| /* Line 10 | | S=A1lo | Bypass received data from | | | | | | | | | | | | | |
| /* Step 3 | | | Top port to South port | | | | | | | | | | | | | |
| | | | | 1 | 000 | 00000 | 00000 | 00000 | 000 | 000 | 0000 | 0000 | 0000 | 00 | 000 | 000 |
| /* Line 11 | | S_T | Bypass received data from | | | | | | | | | | | | | |
| /* Step 4 | | | Top port to South port | | | | | | | | | | | | | |
| | | | | 1 | 001 | 00000 | 00000 | 00000 | 000 | 000 | 0000 | 0000 | 0000 | 00 | 000 | 000 |
| /* Line 11 | | BRA DATA, S=T | Bypass received data from | | BRA | | | | | | | | | | | |
| /* Step 5 | | | Top port to South port | | | | | | | | | | | | | |

Continuation of the 3D-Flow code of Table B-52 for bits 51-0

| /* | Core BUS Control | | | | Ring BUS Control | | | Output Port Control | | | | | Buffer/Out | NUMERIC |
|---|---|---|---|---|---|---|---|---|---|---|---|---|---|---|
| /* | x to | x to | x to | x to | x to | x to | x to | x to | x to | x to | x to | x to | En/Dis | Constant/BRAddr |
| /* | Bus A | Bus B | Bus C | Bus D | Ring A | Ring B | Ring C | Bottom | North | East | West | South | OutFIFO | Memadd1/Memadd2 |
| /* Bit | 51-48 | 47-44 | 43-40 | 39-36 | 35-33 | 32-30 | 29-27 | 26-25 | 24-23 | 22-21 | 20-19 | 18-17 | 16 | 15-0 |
| | 1101 | 0000 | 0000 | 0000 | 001 | 000 | 000 | 00 | 00 | 00 | 00 | 00 | 0 | 0000000000100000 |
| /* Line 8 | Ring A | | | | Top to | | | | | | | | | A1_A |
| /* Step 1 | to A | | | | Ring A | | | | | | | | | |
| | 0000 | 0000 | 0000 | 0000 | 000 | 000 | 000 | 00 | 00 | 00 | 00 | 00 | 0 | 0001000101111111 |
| /* Line 9 | | | | | | | | | | | | | | offset = -1, bit 1, bit 1 |
| /* Step 2 | | | | | | | | | | | | | | |
| | 1001 | 0000 | 0000 | 0000 | 000 | 000 | 001 | 00 | 00 | 00 | 00 | 11 | 0 | 0000000000000000 |
| /* Line 10 | A1lo to A | | | | | | A to | | | | | Ring C | | |
| /* Step 3 | | | | | | | Ring C | | | | | to South | | |
| | 1101 | 0000 | 0000 | 0000 | 001 | 000 | 001 | 00 | 00 | 00 | 00 | 11 | 0 | 0000000000000000 |
| /* Line 11 | Ring A | | | | Top to | | A to | | | | | Ring C | | |
| /* Step 4 | to A | | | | Ring A | | Ring C | | | | | to South | | |
| | 1101 | 0000 | 0000 | 0000 | 001 | 000 | 001 | 00 | 00 | 00 | 00 | 11 | 0 | 0000000001111100 |
| /* Line 11 | Ring A | | | | Top to | | A to | | | | | Ring C | | offset = - 4 |
| /* Step 5 | to A | | | | Ring A | | Ring C | | | | | to South | | |

Table B-53. 3D-Flow code that implements the program described in the flowchart of Figure 22 (bits95-52).

| /* | | Operations | Comments | | | | | | Register File | | | | Comparator | ENC | Data Memory | |
|---|---|---|---|---|---|---|---|---|---|---|---|---|---|---|---|---|
| /* | | | INITIALIZE VARIABLES | Strobe | CNTL | MAC | ALU 1 | ALU2 | x=Bus | x=Bus | x=Reg. | x=Reg. | ThRegCC | | DM1 | DM2 |
| /* | | | | | /FMT | | | | x to AR | x to BR | AR to x | BR to x | x=enab CC | | | |
| /* Bit | field | instruction | word | | 95-93 | 92-88 | 87-83 | 82-78 | 77-75 | 74-72 | 71-68 | 67-64 | 63-60 | 59-58 | 57-55 | 54-52 |
| | | | | 1 | 000 | 00000 | 01011 | 01011 | 000 | 000 | 0000 | 0000 | 0000 | 00 | 000 | 000 |
| /* Line 8 | DATA: | ST_A1_T, ST_A2_W | Check if input data from Top port | | | | ST_A 1 | ST_A2 | | | | | | | | |
| /* Step 1 | | | or from West are not zero | | | | | | | | | | | | | |
| | | | | 1 | 011 | 00000 | 00000 | 00000 | 000 | 000 | 0000 | 0000 | 0000 | 00 | 000 | 000 |
| /* Line 9 | | BRccCLR #9 #9 NOZERO | If data from West port is not zero | | BRccCL R | | | | | | | | | | | |
| /* Step 2 | | | than goto NOZERO, ELSE | | | | | | | | | | | | | |
| | | | | 1 | 010 | 00000 | 00000 | 00000 | 000 | 000 | 0000 | 0000 | 0000 | 00 | 000 | 000 |
| /* Line 10 | | BRccSET #1 #1 DATA | If there are no data from Top port | | BRccSET | | | | | | | | | | | |
| /* Step 3 | | | fetch next value, ELSE | | | | | | | | | | | | | |
| | | | | 1 | 000 | 00000 | 00000 | 00000 | 000 | 000 | 0000 | 0000 | 0000 | 00 | 000 | 000 |
| /* Line 11 | | E=A1lo | Bypass received data from | | | | | | | | | | | | | |
| /* Step 4 | | | Top port to East port | | | | | | | | | | | | | |
| | | | | 1 | 000 | 00000 | 00000 | 00000 | 000 | 000 | 0000 | 0000 | 0000 | 00 | 000 | 000 |
| /* Line 12 | | E=T | Bypass data from | | | | | | | | | | | | | |
| /* Step 5 | | | Top port to East port | | | | | | | | | | | | | |
| | | | | 1 | 001 | 00000 | 00000 | 00000 | 000 | 000 | 0000 | 0000 | 0000 | 00 | 000 | 000 |
| /* Line 13 | | BRA DATA, | Bypass data from | | BRA | | | | | | | | | | | |
| /* Step 6 | | | Top port to East port, fetch next value | | | | | | | | | | | | | |
| | | | | 1 | 000 | 00000 | 00000 | 00000 | 000 | 000 | 0000 | 0000 | 0000 | 00 | 000 | 000 |
| /* Line 14 | NOZERO | E=A2lo | Bypass received data from | | | | | | | | | | | | | |
| /* Step 3 | | | West port to East port | | | | | | | | | | | | | |
| | | | | 1 | 000 | 00000 | 00000 | 00000 | 000 | 000 | 0000 | 0000 | 0000 | 00 | 000 | 000 |
| /* Line 15 | | E=W | Bypass data from | | | | | | | | | | | | | |
| /* Step 4 | | | West port to East port | | | | | | | | | | | | | |
| | | | | 1 | 010 | 00000 | 00000 | 00000 | 000 | 000 | 0000 | 0000 | 0000 | 00 | 000 | 000 |
| /* Line 16 | | BRccSET #1 #1 DATA, E=W | Bypass data from West port to | | BRccSET | | | | | | | | | | | |
| /* Step 5 | | | East port. If no data from Top, fetch next data | | | | | | | | | | | | | |
| | | | | 1 | 000 | 00000 | 00000 | 00000 | 000 | 000 | 0000 | 0000 | 0000 | 00 | 000 | 000 |
| /* Line 17 | EAST: | E=A1lo | ELSE, Bypass received data from Top port | | | | | | | | | | | | | |
| /* Step 6 | | | to East port | | | | | | | | | | | | | |
| | | | | 1 | 000 | 00000 | 00000 | 00000 | 000 | 000 | 0000 | 0000 | 0000 | 00 | 000 | 000 |
| /* Line 18 | | E=W | Bypass data from | | | | | | | | | | | | | |
| /* Step 7 | | | Top port to East port | | | | | | | | | | | | | |
| | | | | 1 | 001 | 00000 | 00000 | 00000 | 000 | 000 | 0000 | 0000 | 0000 | 00 | 000 | 000 |
| /* Line 19 | | BRA DATA, E=W | Bypass data from, fetch next data, | | BRA | | | | | | | | | | | |
| /* Step 8 | | | Top port to East port | | | | | | | | | | | | | |

Continuation of the 3D-Flow code of Table B-53 for bits 51-0

| /* | Core BUS Control | | | | Ring BUS Control | | | Output Port Control | | | | | Buffer/Out | NUMERIC |
|---|---|---|---|---|---|---|---|---|---|---|---|---|---|---|
| /* | x to | x to | x to | x to | x to | x to | x to | x to | x to | x to | x to | x to | En/Dis | Constant/BRAddr |
| /* | Bus A | Bus B | Bus C | Bus D | Ring A | Ring B | Ring C | Bottom | North | East | West | South | OutFIFO | Memadd1/Memadd2 |
| /* Bit | 51-48 | 47-44 | 43-40 | 39-36 | 35-33 | 32-30 | 29-27 | 26-25 | 24-23 | 22-21 | 20-19 | 18-17 | 16 | 15-0 |
| | 1101 | 0000 | 0000 | 1011 | 000 | 000 | 000 | 00 | 00 | 00 | 00 | 00 | 0 | 0000000000000000 |
| /* Line 8 | Ring A | | | Constant | | | | | | | | | | Constant – 0 |
| /* Step 1 | to A | | | to D | | | | | | | | | | |
| | 0000 | 0000 | 0000 | 1101 | 001 | 100 | 000 | 00 | 00 | 00 | 00 | 00 | 0 | 0000000000100100 |
| /* Line 9 | | | | Ring B | Top to | West to | | | | | | | | A1_A, A2 D |
| /* Step 2 | | | | to D | Ring A | Ring B | | | | | | | | |
| | 0000 | 0000 | 0000 | 0000 | 000 | 000 | 000 | 00 | 00 | 00 | 00 | 00 | 0 | 1001100100000101 |
| /* Line 10 | | | | | | | | | | | | | | offset = 5, bit 9, bit 9 |
| /* Step 3 | | | | | | | | | | | | | | |
| | 1001 | 0000 | 0000 | 0000 | 000 | 000 | 000 | 00 | 00 | 00 | 00 | 00 | 0 | 0001000101111110 |
| /* Line 11 | A1lo to A | | | | | | | | | | | | | offset – -2, bit 1, bit 1 |
| /* Step 4 | | | | | | | | | | | | | | |
| | 1101 | 0000 | 0000 | 0000 | 000 | 000 | 001 | 00 | 00 | 11 | 00 | 00 | 0 | 0000000000000000 |
| /* Line 12 | Ring A | | | | | | A to | | | Ring C | | | | |
| /* Step 5 | to A | | | | | | Ring C | | | to East | | | | |
| | 1101 | 0000 | 0000 | 0000 | 001 | 000 | 001 | 00 | 00 | 11 | 00 | 00 | 0 | 0000000000000000 |
| /* Line 13 | Ring A | | | | Top to | | A to | | | Ring C | | | | |
| /* Step 6 | to A | | | | Ring A | | Ring C | | | to East | | | | |
| | 0000 | 0000 | 0000 | 0000 | 001 | 000 | 001 | 00 | 00 | 11 | 00 | 00 | 0 | 0000000001111011 |
| /* Line 14 | | | | | Top to | | A to | | | Ring C | | | | offset = - 5 |
| /* Step 3 | | | | | Ring A | | Ring C | | | to East | | | | |
| | 1101 | 0000 | 0000 | 1001 | 000 | 000 | 100 | 00 | 00 | 11 | 00 | 00 | 0 | 0000000000000000 |
| /* Line 15 | Ring A | | | A2lo to D | | | D to | | | Ring C | | | | |
| /* Step 4 | to A | | | | | | Ring C | | | to East | | | | |
| | 1101 | 0000 | 0000 | 0000 | 100 | 000 | 001 | 00 | 00 | 11 | 00 | 00 | 0 | 0000000000000000 |
| /* Line 16 | Ring A | | | | West to | | A to | | | Ring C | | | | |
| /* Step 5 | to A | | | | Ring A | | Ring C | | | to East | | | | |
| | 1001 | 0000 | 0000 | 0000 | 100 | 000 | 001 | 00 | 00 | 11 | 00 | 00 | 0 | 0001000101111000 |
| /* Line 17 | A1lo to A | | | | West to | | A to | | | Ring C | | | | offset – - 8, bit 1, bit 1 |
| /* Step 6 | | | | | Ring A | | Ring C | | | to East | | | | |
| | 1101 | 0000 | 0000 | 0000 | 000 | 000 | 001 | 00 | 00 | 11 | 00 | 00 | 0 | 0000000000000000 |
| /* Line 18 | Ring A | | | | | | A to | | | Ring C | | | | |
| /* Step 7 | to A | | | | | | Ring C | | | to East | | | | |
| | 1101 | 0000 | 0000 | 0000 | 100 | 000 | 001 | 00 | 00 | 11 | 00 | 00 | 0 | 0000000000000000 |
| /* Line 9 | Ring A | | | | West to | | A to | | | Ring C | | | | |
| /* Step 8 | to A | | | | Ring A | | Ring C | | | to East | | | | |
| | | | 0000 | 0000 | 100 | 000 | 001 | 00 | 00 | 11 | 00 | 00 | 0 | 0000000001110101 |
| | | | | | West to | | A to | | | Ring C | | | | offset = -11 |
| | | | | | Ring A | | Ring C | | | to East | | | | |

174

Appendix C APPLICATION DETAILS

Iterative search algorithm: program listing and simulation

This appendix reports the 3D-Flow program listing that is one of the objectives of the Phase I proposal.

In order to better understand the context of this section, the reader will find useful information in the following section of this document: "Key Features of the 3D-Flow system," "4.1.3. Example of data exchange (5x5 area)," and "Application-Case Study 2 (iterative search algorithm)." To better understand the following table it is advisable to read first the five lines of program example of Table C-1, its description and to refer to the section "Microcode Summary" in Section 5.3.2.

It is useful to read the 3D-Flow code program (note that an assembler of the type listed in Section 5.3.3 is proposed for development under Phase II), especially the comment in the fourth column of the table, to understand the mnemonic 3D-Flow operations listed in the second column, to check the different fields that apply to the operations, and to look for the code in the "microcode summary" table and its detailed description in Appendix E-1.

3D-Flow code for the iterative search algorithm

The 3D-Flow code consists of 96-bit instruction words. The listing of 15 instructions has been subdivided in two tables: Table C-1 reports the code for bits 95-58, and Table C-2 reports the code for bits 57-0. Each instruction is made of three lines: one for the binary code and two for comments to the operation performed by the code field on the line above.

Table C-1 3D-Flow code that implements the iterative search algorithm. (Mnemonics, comments and microcode bits 95-58).

| /* cell type E | | | | | | | | | | | | | | |
|---|---|---|---|---|---|---|---|---|---|---|---|---|---|---|
| /* | | Operations | Comments | | | | | | Register File | | | | Comparator | ENC |
| /* | | | INITIALIZE VARIABLES | Strobe | CNTL | MAC | ALU1 | ALU2 | x=Bus | x=Bus | x=Reg. | x=Reg. | ThRegCC | |
| /* | | | | | /FMT | | | | x to AR | x to BR | AR to x | BR to x | x=enab CC | |
| | | | | 1 | 000 | 00000 | 00000 | 11101 | 000 | 000 | 0000 | 0000 | 0000 | 00 |
| /* Line 1 | LOOP 7: | N=E=W=S=r15, DM1P=A2lo, DM2P=A2lo, INC_A2 | Send Register 15 contents to North, East, West and South (NEWS) neighbors.. Initialize DM1, DM2 pointers | | | | | INC | | | | | | |
| /* Step 2 | | | | | | | | | | | | | | |
| | | | | 1 | 000 | 00100 | 00000 | 11101 | 000 | 000 | 0000 | 0000 | 0000 | 00 |
| /* Line 2 | | MACS r15*DM2, DM1=r15, DM1P=A2lo, DMP2=A2lo, INC_A2 | Multiply r15 and DM2, store r15 in DM1 Increment A2 | | | MACS | | INC | | | | | | |
| /* Step 3 | | | | | | | | | | | | | | |
| | | | | 1 | 000 | 00100 | 00000 | 11101 | 001 | 010 | 1100 | 0000 | 0000 | 00 |
| /* Line 3 | | r12=S=E=N, r16=N=W=S, MACS r16*DM2, DM1=r16, DM1P=A2lo, DMP2=A2lo, INC_A2 | Fetch from North FIFO, store in r15, and send to South and East neighbor Fetch from | | | MACS | | INC | A to AR | B to BR | AR to R12 | BR to r16 | | |
| /* Step 4 | | | South, store in r16, send to North and West. | | | | | | | | | | | |
| | | | | 1 | 000 | 00100 | 00000 | 11101 | 001 | 010 | 0001 | 0001 | 0000 | 00 |
| /* Line 4 | | r1=E=N=W, r17=W=S=E, MACS r17*DM2, DM1=r17, DM1P=A2lo, DM2P=A2lo, INC_A2 | Fetch from West, store in r1, send to East and North. Fetch from East, store in r16, | | | MACS | | INC | A to AR | B to BR | AR to r1 | BR to r17 | | |
| /* Step 5 | | | send to North and West. | | | | | | | | | | | |
| | | | | 1 | 000 | 00100 | 00000 | 11101 | 001 | 010 | 0010 | 0010 | 0000 | 00 |
| /* Line 5 | | r2=S=E=W, r18=N=W=E, MACS r18*DM2, DM1=r17, DM1P=A2lo, DM2P=A2lo, INC_A2 | Fetch from West, store in r2, send to East and South. Fetch from East, store in r18, | | | MACS | | INC | A to AR | B to BR | AR to r2 | BR to r18 | | |
| /* Step 6 | | | send to North and West. | | | | | | | | | | | |
| | | | | 1 | 000 | 00100 | 00000 | 11101 | 001 | 010 | 0011 | 0011 | 0000 | 00 |
| /* Line 6 | | r3=N, r19=S, MACS r19*DM2, DM1=r19, DM1P=A2lo, DM2P=A2lo, INC_A2 | Fetch from North, store in r3. Fetch from South store in r19 | | | MACS | | INC | A to AR | B to BR | AR to r3 | BR to r19 | | |
| /* Step 7 | | | | | | | | | | | | | | |
| | | | | 1 | 000 | 00100 | 00000 | 11101 | 001 | 010 | 0100 | 0100 | 0000 | 00 |
| /* Line 7 | | r4=W=S=N, r20=E=N=S, MACS r20*DM2, DM1=r20, DM1P=A2lo, DM2P=A2lo, INC_A2 | Fetch from North, store in r4, send to West and South. Fetch from South, store in r20, | | | MACS | | INC | A to AR | B to BR | AR to r4 | BR to r20 | | |
| /* Step 8 | | | send to East and North. | | | | | | | | | | | |
| | | | | 1 | 000 | 00100 | 00000 | 11101 | 001 | 010 | 0101 | 0101 | 1010 | 00 |
| /* Line 8 | | r5=W, r21=E, MACS r21*DM2, DM1=r21, DM1P=A2lo, DM2P=A2lo, INC_A2 | Fetch from West, store in r5. Fetch from East, store in r21. | | | MACS | | INC | A to AR | B to BR | AR to r5 | BR to r21 | CMP TRx 5 | |
| /* Step 9 | | | | | | | | | | | | | | |
| | | | | 1 | 000 | 00100 | 00000 | 11101 | 001 | 010 | 0110 | 0110 | 0000 | 00 |
| /* Line 9 | | r6=W, r22=E, MACS r22*DM2, DM1=r22, DM1P=A2lo, DM2P=A2lo, INC_A2 | Fetch from West, store in r6. Fetch from East, store in r22 | | | MACS | | INC | A to AR | B to BR | AR to r6 | BR to r22 | | |
| /* Step 10 | | | | | | | | | | | | | | |
| | | | | 1 | 000 | 00100 | 00000 | 11101 | 001 | 010 | 0111 | 0111 | 1010 | 00 |
| /* Line 10 | | r7=N=W, r23=S=E, MACS r23*DM2, DM1=r23, DM1P=A2lo, DM2P=A2lo, | Fetch from West, store in r7, send to North. Fetch from East, store in r23, send | | | MACS | | INC | A to AR | B to BR | AR to r7 | BR to r23 | CMP TRx 5 | |

| | | | | | | | | | | | | | | |
|---|---|---|---|---|---|---|---|---|---|---|---|---|---|---|
| | | INC A2 | to South | | | | | | | | | | | |
| /* Step 11 | | | | | | | | | | | | | | |
| | | | | 1 | 000 | 00100 | 00000 | 11101 | 001 | 010 | 1000 | 1000 | 0001 | 00 |
| /* Line 11 | | r8-E-N, r24-W-S, MACS_r24*DM2, DM1 r24, DM1P A2lo, DM2P A2lo, INC A2 | Fetch from North, store in r8, send to East. Fetch from South, store in r24, send to West | | | MACS | | INC | A to AR | B to BR | AR to r8 | BR to r24 | SETcmp A | |
| /* Step 12 | | | | | | | | | | | | | | |
| | | | | 1 | 000 | 00100 | 00000 | 11101 | 001 | 010 | 1001 | 1001 | 0000 | 00 |
| /* Line 12 | | r9-S, r25 N, MACS_r25*DM2, DM1=r25, DM1P=A2lo, DM2P=A2lo, INC_A2 | Fetch from South, store in r9. Fetch from North, store in r25. | | | MACS | | INC | A to AR | B to BR | AR to r9 | BR to r25 | | |
| /* Step 13 | | | | | | | | | | | | | | |
| | | | | 1 | 000 | 00100 | 00000 | 11101 | 001 | 010 | 1010 | 1010 | 0000 | 00 |
| /* Line 13 | | r10-S, r26 N, MACS_r26*DM2, DM1 r26, DM1P-A2lo, DM2P A2lo, INC A2 | Fetch from South, store in r10. Fetch from North, store in r26. | | | MACS | | INC | A to AR | B to BR | AR to r10 | BR to r26 | | |
| /* Step 14 | | | | | | | | | | | | | | |
| | | | | 1 | 000 | 00100 | 00000 | 11101 | 001 | 010 | 1011 | 1011 | 0000 | 00 |
| /* Line 14 | | r11=W, r27=E, MACS_r27*DM2, DM1=r27, DM1P=A2lo, DM2P=A2lo, INC_A2 | Fetch from West, store in r11. Fetch from East, store in r27. | | | MACS | | INC | A to AR | B to BR | AR to r11 | BR to r27 | | |
| /* Step 15 | | | | | | | | | | | | | | |

Table C-2 3D-Flow code that implements the iterative search algorithm. (Mnemonics, comments and microcode bits 57-0).

| /* | Data Memory | | Core BUS Control | | | | Ring BUS Control | | | Output Port Control | | | | | Buffer Out | NUMERIC |
|---|---|---|---|---|---|---|---|---|---|---|---|---|---|---|---|---|
| /* .* | DM1 | DM2 | x to Bus A | x to Bus B | x to Bus C | x to Bus D | x to Ring A | x to Ring B | x to Ring C | x to Bottom | x to North | x to East | x to West | x to South | En/Dis OutFIFO | Constant/BRAddr Memadd1/Memadd2 |
| | 000 | 011 | 0000 | 0111 | 0000 | 1001 | 000 | 000 | 010 | 00 | 11 | 11 | 11 | 11 | 0 | 0000000000000000 |
| /* Line 1 | | Dlo=Addr | | R15 | | A2lo to D | | | B to | | Ring C | Ring C | Ring C | Ring C | | |
| /* Step 2 | | Read | | to B | | | | | Ring C | | to North | to East | to West | to South | | |
| | 111 | 011 | 0000 | 0111 | 1100 | 1001 | 000 | 000 | 000 | 00 | 00 | 00 | 00 | 00 | 0 | 0101100000000000 |
| /* Line 2 | Dlo=Addr | Dlo=Addr | | R15 | DM2 | A2lo to D | | | | | | | | | | A3_BC |
| /* Step 3 | Write | Read | | to B | to C | | | | | | | | | | | |
| | 111 | 011 | 1101 | 1101 | 1100 | 1001 | 010 | 101 | 000 | 00 | 10 | 01 | 10 | 01 | 0 | 0101100000000000 |
| /* Line 3 | Dlo=Addr | Dlo=Addr | Ring A | Ring B | DM2 | A2lo to D | North to | South to | | | Ring B | Ring A | Ring B | Ring A | | A3_BC |
| /* Step 4 | Write | Read | to A | to B | to C | | Ring A | Ring B | | | to North | to East | to West | to South | | |
| | 111 | 011 | 1101 | 1101 | 1100 | 1001 | 100 | 011 | 000 | 00 | 01 | 01 | 10 | 10 | 0 | 0101100000000000 |
| /* Line 4 | Dlo=Addr | Dlo=Addr | Ring A | Ring B | DM2 | A2lo to D | West to | East to | | | Ring A | Ring A | Ring B | Ring B | | A3_BC |
| /* Step 5 | Write | Read | to A | to B | to C | | Ring A | Ring B | | | to North | to East | to West | to South | | |
| | 111 | 011 | 1101 | 1101 | 1100 | 1001 | 100 | 011 | 000 | 00 | 10 | 01 | 10 | 01 | 0 | 0101100000000000 |
| /* Line 5 | Dlo=Addr | Dlo=Addr | Ring A | Ring B | DM2 | A2lo to D | West to | East to | | | Ring B | Ring A | Ring B | Ring A | | A3_BC |
| /* Step 6 | Write | Read | to A | to B | to C | | Ring A | Ring B | | | to North | to East | to West | to South | | |
| | 111 | 011 | 1101 | 1101 | 1100 | 1001 | 010 | 101 | 000 | 00 | 00 | 00 | 00 | 00 | 0 | 0101100000000000 |
| /* Line 6 | Dlo=Addr | Dlo=Addr | Ring A | Ring B | DM2 | A2lo to D | North to | South to | | | | | | | | A3_BC |
| /* Step 7 | Write | Read | to A | to B | to C | | Ring A | Ring B | | | | | | | | |
| | 111 | 011 | 1101 | 1101 | 1100 | 1001 | 010 | 101 | 000 | 00 | 10 | 10 | 01 | 01 | 0 | 0101100000000000 |
| /* Line 7 | Dlo=Addr | Dlo=Addr | Ring A | Ring B | DM2 | A2lo to D | North to | South to | | | Ring B | Ring B | Ring A | Ring A | | A3_BC |
| /* Step 8 | Write | Read | to A | to B | to C | | Ring A | Ring B | | | to North | to East | to West | to South | | |
| | 111 | 011 | 1101 | 1101 | 1100 | 1001 | 100 | 011 | 000 | 00 | 00 | 00 | 00 | 00 | 0 | 0101100000000000 |
| /* Line 8 | Dlo=Addr | Dlo=Addr | Ring A | Ring B | DM2 | A2lo to D | West to | East to | | | | | | | | A3_BC |
| /* Step 9 | Write | Read | to A | to B | to C | | Ring A | Ring B | | | | | | | | |
| | 111 | 011 | 1101 | 1101 | 1100 | 1001 | 100 | 011 | 000 | 00 | 00 | 00 | 00 | 00 | 0 | 0101100000000000 |
| /* Line 9 | Dlo=Addr | Dlo=Addr | Ring A | Ring B | DM2 | A2lo to D | West to | East to | | | | | | | | A3_BC |
| /* Step 10 | Write | Read | to A | to B | to C | | Ring A | Ring B | | | | | | | | |
| | 111 | 011 | 1101 | 1101 | 1100 | 1001 | 100 | 011 | 000 | 00 | 01 | 00 | 00 | 10 | 0 | 0101100000000000 |
| /* Line 10 | Dlo=Addr | Dlo=Addr | Ring A | Ring B | DM2 | A2lo to D | West to | East to | | | Ring A | | | Ring B | | A3_BC |
| /* Step 11 | Write | Read | to A | to B | to C | | Ring A | Ring B | | | to North | | | to South | | |
| | 111 | 011 | 1101 | 1101 | 1100 | 1001 | 010 | 101 | 000 | 00 | 00 | 01 | 10 | 00 | 0 | 0101100000000000 |
| /* Line 11 | Dlo=Addr | Dlo=Addr | Ring A | Ring B | DM2 | A2lo to D | North to | South to | | | | Ring A | Ring B | | | A3_BC |
| /* Step 12 | Write | Read | to A | to B | to C | | Ring A | Ring B | | | | to East | to West | | | |
| | 111 | 011 | 1101 | 1101 | 1100 | 1001 | 101 | 010 | 000 | 00 | 00 | 00 | 00 | 00 | 0 | 0101100000000000 |
| /* Line 12 | Dlo=Addr | Dlo=Addr | Ring A | Ring B | DM2 | A2lo to D | South to | North to | | | | | | | | A3_BC |
| /* Step 13 | Write | Read | to A | to B | to C | | Ring A | Ring B | | | | | | | | |
| | 111 | 011 | 1101 | 1101 | 1100 | 1001 | 101 | 010 | 000 | 00 | 00 | 00 | 00 | 00 | 0 | 0101100000000000 |
| /* Line 13 | Dlo=Addr | Dlo=Addr | Ring A | Ring B | DM2 | A2lo to D | South to | North to | | | | | | | | A3_BC |
| /* Step 14 | Write | Read | to A | to B | to C | | Ring A | Ring B | | | | | | | | |
| | 111 | 011 | 1101 | 1101 | 1100 | 1001 | 100 | 011 | 000 | 00 | 00 | 00 | 00 | 00 | 0 | 0101100000000000 |
| /* Line 14 | Dlo=Addr | Dlo=Addr | Ring A | Ring B | DM2 | A2lo to D | West to | East to | | | | | | | | A3_BC |
| /* Step 15 | Write | Read | to A | to B | to C | | Ring A | Ring B | | | | | | | | |

Multi-program execution of iterative search programs on the 3D-Flow simulator In most parallel-processing algorithms some form of data exchange between neighboring processors is required. In the PHOCHA algorithm each processor requires the data of its neighbors in a 5x5 area. The cell is shown in Figure 13. The data routing model that was designed has been implemented on the 3D-Flow processor, and each processor requires 15 steps to gather data from its 24 neighbors. The exact sequence of steps is given in Figure 14.

In order to understand the exact sequence of steps, the routing of data into the shaded processor in the center of Figure 13 will be explained. This processor is identified as processor (15, 15, 0) in the screen dump. It should be noted that exactly the same steps are executed in all the processors simultaneously. Hence, at the end of step 15, all processors will have the data of all their neighbors in a 5x5 cell at which they are centered.

Each screen dump shows four different windows. The one at the right labeled 'Layer-0' shows the processors in the 5x5 cell and the interconnections between them. Each of the processors is identified by its coordinates in the layer. This view shows 25 processors from (13, 13, 0) to (17, 17, 0). The approximate location of this cell in the layer is given in the 'Map' view at the extreme left. Within this cell, the details of each register, FIFO, and port in processor (15, 15, 0) is given in the window labeled '15, 15, 0'. 'Events' window shows the input values read by each processor in a color-coded matrix.

Before starting the simulation on a large array by the 3D-Flow simulator, other files must be downloaded for the 3D-Flow system initialization. A routing file that reflects the interconnection between processors in the same manner as will be implemented in the hardware is shown in Table C-3. The first column identifies the processor under consideration, and the other six columns have the ID of the neighboring processors to which its six ports (Top, North, East, West, South, and Bottom) are connected.

Table C-3 3D-Flow array routing table.

| Xx,yy | Top | North | East | West | South | Bottom |
|---|---|---|---|---|---|---|
| 00 | In | nc | 10 | nc | 01 | Out |
| 10 | In | nc | 20 | 00 | 11 | Out |
| 20 | In | nc | 30 | 10 | 21 | Out |
| 30 | In | nc | 40 | 20 | 31 | Out |
| 40 | In | nc | 50 | 30 | 41 | Out |
| ... | ... | ... | ... | ... | ... | ... |
| .. | ... | ... | ... | ... | ... | ... |
| 22.31 | In | 22.30 | 23,31 | 21,31 | nc | Out |
| 23,31 | In | 23.30 | 24,31 | 22.31 | nc | Out |
| 24,31 | In | 24.30 | 25.31 | 23.31 | nc | Out |
| 25.31 | In | 25.30 | 26.31 | 24.31 | nc | Out |
| 26,31 | In | 26,30 | 27,31 | 25,31 | nc | Out |
| 27,31 | In | 27.30 | 28,31 | 26,31 | nc | Out |
| 28.31 | In | 28.30 | 29.31 | 27,31 | nc | Out |
| 29.31 | In | 29.30 | 30,31 | 28,31 | nc | Out |
| 30.31 | In | 30,30 | 31,31 | 29.31 | nc | Out |
| 31,31 | In | 31.30 | nc | 30,31 | nc | Out |

Two data memories are present in the 3D-Flow processor. In this application one data memory bank is used for the coefficients (see Table C-4) by which each neuron is multiplied. It also has the temperature and threshold values. (In the present example 83 was used for the temperature value and 26,500 for the threshold.)

Table C-4 Coefficients used in the current example.

| | | | | |
|---|---|---|---|---|
| -10 | 20 | -20 | 20 | -10 |
| 20 | 10 | 70 | 10 | 20 |
| -20 | 70 | **20** | 70 | -20 |
| 20 | 10 | 70 | 10 | 20 |
| -10 | 20 | -20 | 20 | -10 |

The other data memory bank of each processor is used to retain the input data of the pixel and the values of its surrounding area of 5x5, and all the intermediate results of each calculation of the seven loops. These input values, or intermediate results, can be made available to the user at any time at the bottom output port of each processor.

In step 2, each processor broadcasts its data to the four immediate neighbors to which it is directly connected. These values can be seen in step 3. They are shown as the value 'Dh' in the North, East, West and South output ports labeled NO, EO, WO and SO in the processor's internal view. Hence, the data received by processor (15, 15, 0) from its neighbors is shown in its North, East West and South FIFOs, labeled as NI, EI, WI and SI. Since it takes two cycles to exchange data between processors, they can be accessed by the processor in step 4.

In step 4, data from processors 'n' and 's' are read from the North and South input FIFOs to Ring Bus A and B. This can be seen as values 8h and 12h in RA and RB in the internal view.
In step 5, data from processors 'w' and 'e' are read from the West and East input FIFOs to Ring Bus A and B. This can be seen as values Ch and Eh in RA and RB in the internal view.

In step 6, data from processors 'nw' and 'se' are read from the West and East input FIFOs to Ring Bus A and B. This can be seen as values 7h and 13h in RA and RB in the internal view. These data have been routed through processors 'w' and 'e'.
In step 7, data from processors 'nn' and 'ss' are read from the North and South input FIFOs to Ring Bus A and B. This can be seen as values 3h and 17h in RA and RB in the internal view. These data have been routed through processors 'n' and 's'.

In step 8, data from processors 'ne' and 'sw' are read from the North and South input FIFOs to Ring Bus A and B. This can be seen as values 9h and 11h in RA and RB in the internal view. These data have been routed through processors 'n' and 's'.
In step 9, data from processors 'ww' and 'ee' are read from the West and East input FIFOs to Ring Bus A and B. This can be seen as values Bh and Fh in RA and RB in the internal view. These data have been routed through processors 'w' and 'e'.

In step 10, data from processors 'nww' and 'see' are read from the West and East input FIFOs to Ring Bus A and B. This can be seen as values 6h and 14h in RA and RB in the internal view. These data have been routed through processors 'nw', 'w' and 'se', 'e' respectively.

In step 11, data from processors 'sww' and 'nee' are read from the West and East input FIFOs to the Ring Bus A and B. This can be seen as values 10h and Ah in RA and RB in the internal view. These data have been routed through processors 'sw', 'w' and 'ne', 'e', respectively.

In step 12, data from processors 'nnw' and 'sse' are read from the North and South input FIFOs to Ring Bus A and B. This can be seen as values 2h and 18h in RA and RB in the internal view. These data have been routed through processors 'nn', 'n' and 'ss', 's', respectively.

In step 13, data from processors 'nne' and 'ssw' are read from the North and South input FIFOs to Ring Bus B and A. This can be seen as values 4h and 16h in RB and RA in the internal view. These data have been routed through processors 'nn', 'n' and 'ss', 's', respectively.

In step 14, data from processors 'nnee' and 'ssww' are read from the North and South input FIFOs to Ring Bus B and A. This can be seen as values 5h and 15h in RB and RA in the internal view. These data have been routed through processors 'nne', 'ne', 'n' and 'ssw', 'sw', 's', respectively.

In step 15, data from processors 'nnww' and 'ssee' are read from the West and East input FIFOs to Ring Bus A and B. This can be seen as values 1h and 19h in RA and RB in the internal view. These data have been routed through processors 'nnw', 'nw', 'n' and 'sse', 'se', 's', respectively. At this point, data from all the processors in the 5x5 cell has been received by processor (15, 15, 0). The same is true for every other processor in the layer, which would have all the data from its respective cell.

LHC-B muon

Algorithm description (Detail-2)

As part of the analysis of the problem, this section describes in more detail the study that has been carried out.

The algorithm described in Section 5.9.3 has been broken-down into 20 steps in this section.

Design of 3D-Flow system based on the results of the analysis of problem. (Detail 2)

As part of analysis of the problem, this section describes in greater detail the study that has been carried out. The reader should refer to Section 5.9.3 for descriptions of the approached solution.

This section provides some complementary figures which will help the reader to understand the above mentioned sections.

Figure 81, and Figure 82 show how data are received by each processor from the detector; the following figures are magnifications of Figure 39, and Figure 40.

LHC-B electron

Conversion of the algorithm into 3D-Flow code (Detail-4)

As part of the description of the solution provided for the LHC-B level-1 trigger, this section reports in detail the listing of the 3D-Flow program that executes the electron trigger. algorithm described in Section 5.9.4 (see Table C-5 and Table C-7).

Table C-5 3D-Flow code that implements the LHC-B level-1 electron trigger (bits 95-64, steps 1 to 11).

| | | | | | | | | | | | | |
|---|---|---|---|---|---|---|---|---|---|---|---|---|
| /* Type F | | | | | | | | | | | | |
| /* | | Operations | Comments | | | | | | Register File | | | |
| /* | | | INITIALIZE VARIABLES | Strobe | CNTL | MAC | ALU1 | ALU2 | x=Bus | x=Bus | x=Reg. | x=Reg. |
| /* | | | | | /FMT | | | | x to AR | x to BR | AR to x | BR to x |
| | | | | 1 | 000 | 00010 | 00010 | 01011 | 010 | 000 | 1011 | 0000 |
| /* Line 9 | DATA: | r23=N=E=W=S=DM2P <- Tlo, MPYS Tlo r28, r11=T, ST_A2_Thi, ADDS_A1 r7 r21, B=outFIFO | Get ADC1i, ADC2i, and P2 from the detector. Convert ADC1i to Energy (Ei). Calculate (Ei * Const_1) | | | MPYS | ADDS | ST_A2 | B to AR | | AR to | |
| /* Step 1 | | | | | | | | | | | R11 | |
| | | | | 1 | 000 | 00000 | 01011 | 01100 | 001 | 100 | 1000 | 0111 |
| /* Line 10 | | AND_A2_13, r8=A1lo, ST_A1 r23, B=outFIFO | Sum1 - Ei. Increment Time_Stamp for the next event. Send Ei to North, East, West | | | | ST_A1 | AND | A to AR | D to BR | AR to R8 | BR to R23 |
| /* Step 2 | | [N=E=W=S=r23] | and South (NEWS) neighbors | | | | | | | | | |
| | | | | 1 | 000 | 00000 | 00000 | 11000 | 001 | 100 | 0100 | 0100 |
| /* Line 11 | | CMP r11 r22, r4=T, r20=A2lo, CLR_A2 | Calculate (P2 - Threshold_2), Sum2=0. Get P1 value from detector. | | | | | CLR | A to AR | D to BR | AR to R4 | BR to |
| /* Step 3 | | | Extract PSi from ADC2i. | | | | | | | | | R20 |
| | | | | 1 | 000 | 00000 | 00010 | 00010 | 001 | 010 | 0000 | 0000 |
| /* Line 12 | | r0=E=N, r16=W=S, ACCS_A1 r0, ACCS_A2 r16 | Get Energy En and Es from North and South neighbors and send to East and West. | | | | ACCS | ACCS | A to AR | B to BR | AR to r0 | BR to r16 |
| /* Step 4 | | | Sum1 = Sum1 + En, Sum2 = Sum2 + Es. | | | | | | | | | |
| | | | | 1 | 000 | 00000 | 00010 | 00010 | 001 | 010 | 0001 | 0001 |
| /* Line 13 | | r1=N=W, r17=S=E, ACCS_A1 r1, ACCS_A2 r17 | Get Energy Ew and Ee from West and East neighbors and send to North and South. | | | | ACCS | ACCS | A to AR | B to BR | AR to r1 | BR to r17 |
| /* Step 5 | | | Sum1 = Sum1 + Ew, Sum2 = Sum2 + Ee | | | | | | | | | |
| | | | | 1 | 000 | 00000 | 00010 | 00010 | 001 | 010 | 0010 | 0010 |
| /* Line 14 | | r2=W, r18=E, r23 ACCS_A1_r2, ACCS_A2 r18 | Get Energy Ewn and Ees from NorthWest and SouthEast neighbors | | | | ACCS | ACCS | A to AR | B to BR | AR to r2 | BR to r18 |
| /* Step 6 | | | . Sum1 = Sum1 + Ewn, Sum2 = Sum2 + Ees | | | | | | | | | |
| | | | | 1 | 000 | 00000 | 00010 | 00010 | 001 | 010 | 0011 | 0011 |
| /* Line 15 | | r3=N, r19=S, ADDS A1 r3, ACCS_A2_r19 | Get Energy Ene and Esw from NorthEast and SouthWest neighbors. | | | | ACCS | ACCS | A to AR | B to BR | AR to r3 | BR to r19 |
| /* Step 7 | | | Sum1 = Sum1 + Ene, Sum2 = Sum2 + Esw | | | | | | | | | |
| | | | | 1 | 000 | 00000 | 00010 | 00111 | 000 | 001 | 0000 | 1011 |
| /* Line 16 | | r29=r10=ACCS_A1_A2lo, SUBS_A2 r20 r14, r27=r1 | E9_sum = Sum1 + Sum2. Calculate (PSi - Threshold_1) | | | | ACCS | SUBS | | A to BR | | BR to R27 |
| /* Step 8 | | | | | | | | | | | | |
| | | | | 1 | 010 | 00000 | 00000 | 00000 | 001 | 001 | 1010 | 1101 |
| /* Line 17 | | BRccSET #5 #8 REJECT | IF (P2 - Threshold_2) < 0 OR (PSi - Threshold_1) < 0 THEN REJECT EVENT | | | | | | A to AR | A to BR | AR to | BR to |
| /* Step 9 | | | | | | | | | | | R10 | R29 |
| | | | | 1 | 000 | 01011 | 00111 | 00111 | 011 | 011 | 1011 | 1000 |
| /* Line 18 | | SUBS_A1 r29-A3lo, SUBS_A2 r23-r9, ST_A3 r29, r11 r24 r23 | Calculate [(Ei * Const_1) - E9_sum] and (Ei - Ei_min) | | | ST_A3 | SUBS | SUBS | C to AR | C to BR | AR to | BR to |
| /* Step 10 | | | | | | | | | | | R11 | R24 |
| | | | | 1 | 010 | 00000 | 00000 | 00000 | 000 | 001 | 0000 | 1010 |
| /* Line 19 | | BRccSET #0 #8 REJECT | IF [(Ei * Const_1) - E9_sum] < 0 and (Ei - Ei_min) < 0 THEN REJECT EVENT | | | | | | | A to BR | | BR to |
| /* Step 11 | | | | | | | | | | | | R26 |

Table C-6 3D-Flow code that implements the LHC-B level-1 electron trigger (bits 95-64, steps 12 to 24).

| /* | | Operations | Comments | | | | | | Register File | | | |
|---|---|---|---|---|---|---|---|---|---|---|---|---|
| /* | | | INITIALIZE VARIABLES | Str. | CNTL | MAC | ALU1 | ALU2 | x Bus | x Bus | x=Reg. | x=Reg. |
| /* | | | | | /FMT | | | | x to AR | x to BR | AR to x | BR to x |
| | | | | 1 | 000 | 10010 | 00111 | 00111 | 000 | 000 | 0000 | 0000 |
| /* Line 20 | | SUBS A1 r24-r0, SUBS A2 r11-r16, ASR_A3 2 | Calculate (Ei - En) and (Ei - Es) | | | ASR | SUBS | SUBS | | | | |
| /* Step 12 | | | | | | | | | | | | |
| | | | | 1 | 010 | 00000 | 00000 | 00000 | 000 | 000 | 0000 | 0000 |
| /* Line 21 | | BRccSET #0 #8 REJECT, DM1P <- A3lo | IF (Ei - En) < 0 OR (Ei - Es) < 0 THEN REJECT EVENT | | | | | | | | | |
| /* Step 13 | | | | | | | | | | | | |
| | | | | 1 | 000 | 01011 | 00111 | 00111 | 000 | 000 | 0000 | 0000 |
| /* Line 22 | | SUBS A1 r11-r27, SUBS A2 r11-r17, ST A3 r4 | Calculate (Ei - Ee) and (Ei - Ew) | | | ST A3 | SUBS | SUBS | | | | |
| /* Step 14 | | | | | | | | | | | | |
| | | | | 1 | 010 | 00000 | 00000 | 00000 | 000 | 000 | 0000 | 0000 |
| /* Line 23 | | BRccSET #0 #8 REJECT | IF (Ei - Fe) < 0 OR (Ei - Ew) < 0 THEN REJECT EVENT | | | | | | | | | |
| /* Step 15 | | | | | | | | | | | | |
| | | | | 1 | 000 | 01100 | 00111 | 00111 | 000 | 000 | 0000 | 0000 |
| /* Line 24 | | SUBS_A1 r11-r26, SUBS_A2 r11-r18, AND A3 DM1 | Calculate (Ei - Ewn) and (Ei - Ees) | | | AND | SUBS | SUBS | | | | |
| /* Step 16 | | | | | | | | | | | | |
| | | | | 1 | 010 | 00000 | 00000 | 00000 | 000 | 000 | 0000 | 0000 |
| /* Line 25 | | BRccSET #0 #8 REJECT, CMP_A3lo r25 | IF (Ei - Ewn) < 0 OR (Ei - Ees) < 0 THEN REJECT EVENT | | | | | | | | | |
| /* Step 17 | | | | | | | | | | | | |
| | | | | 1 | 000 | 00000 | 00111 | 00111 | 000 | 000 | 0000 | 0000 |
| /* Line 26 | | SUBS_A1 r24-r3, SUBS_A2 r11-r19 | Calculate (Ei - Fne) and (Ei - Esw) | | | | SUBS | SUBS | | | | |
| /* Step 18 | | | | | | | | | | | | |
| | | | | 1 | 010 | 00000 | 00000 | 00000 | 000 | 000 | 0000 | 0000 |
| /* Line 27 | | BRccSET #0 #8 REJECT | IF (Ei - Fne) < 0 OR (Ei - Esw) < 0 THEN REJECT EVENT | | | | | | | | | |
| /* Step 19 | | | | | | | | | | | | |
| | | | | 1 | 010 | 00000 | 00000 | 00000 | 000 | 000 | 0000 | 0000 |
| /* Line 28 | | BRccSET #6 #6 REJECT | IF no positive or negative particle found in PI, THEN REJECT EVENT | | | | | | | | | |
| /* Step 20 | | | | | | | | | | | | |
| | | | | 1 | 000 | 00000 | 00000 | 00000 | 010 | 000 | 0111 | 0000 |
| /* Line 29 | | outFIFO=r7, r7=r8 | Send out to the Bottom port theTime Stamp and update Time_Stamp for next event. | | | | | | B to AR | | AR to | |
| /* Step 21 | | | | | | | | | | | R7 | |
| | | | | 1 | 001 | 00000 | 00000 | 00000 | 000 | 000 | 0000 | 0000 |
| /* Line 30 | | BRA DATA, outFIFO=r10 | Send out to the Bottom port the E9 sum and fetch set of data of next event. | | | | | | | | | |
| /* Step 22 | | | | | | | | | | | | |
| | | | | 1 | 000 | 00000 | 00000 | 00000 | 010 | 000 | 0111 | 0000 |
| /* Line 31 | REJECT | outFIFO=r25, r7=r8 | Send out to the Bottom "REJECT EVENT" and update Time_Stamp for next event. | | | | | | B to AR | | AR to | |
| /* Step 23 | | | | | | | | | | | R7 | |
| | | | | 1 | 001 | 00000 | 00000 | 00000 | 000 | 000 | 0000 | 0000 |

Table C-7 3D-Flow code that implements the LHC-B level-1 electron trigger (bits 63-0, steps 1 to 13).

| /* Type E | | | | | | | | | | | | | | | | | | |
|---|---|---|---|---|---|---|---|---|---|---|---|---|---|---|---|---|---|---|
| /* | Comparator | ENC | Data Memory | | Core BUS Control | | | | Ring BUS Control | | | Output Port Control | | | | | Buffer/Out | NUMERIC |
| /* | ThReg CC | | DM1 | DM2 | x to | x to | x to | x to | x to | x to | x to | x to | x to | x to | x to | x to | En/Dis | Constant/BRAddr |
| /* | x-enab CC | | | | Bus A | Bus B | Bus C | Bus D | Ring A | Ring B | Ring C | Bottom | North | East | West | South | OutFIFO | Memadd1/Memadd2 |
| | 0000 | 00 | 000 | 001 | 0111 | 1101 | 0101 | 0100 | 000 | 001 | 101 | 11 | 00 | 00 | 00 | 00 | 0 | 0100001010001010 |
| /* Line 9 | | | | Blo ADDr | R7 to A | Ring B | R21 to C | R28 to D | | Top to | outFIFO to | Ring C | | | | | | A3_Blo Dlo, A2 Bhi, A1_AC |
| /* Step 1 | | | | | | to B | | | | Ring B | Ring C | to Bottom | | | | | | |
| | 0000 | 00 | 000 | 000 | 1001 | 0101 | 0000 | 1100 | 000 | 111 | 101 | 11 | 10 | 10 | 10 | 10 | 0 | 0000000010000010 |
| /* Line 10 | | | | | A1lo | R13 | | DM2 data | | D to | outFIFO | Ring C | Ring B | Ring B | Ring B | Ring B | | A1 D, A2 B |
| /* Step 2 | | | | | to A | to B | | to D | | Ring B | to Ring C | to Bottom | to North | to East | to West | to South | | |
| | 1101 | 00 | 000 | 000 | 1101 | 0011 | 0110 | 1001 | 001 | 000 | 000 | 00 | 00 | 00 | 00 | 00 | 0 | 0000000000000000 |
| /* Line 11 | CMP_BC | | | | Ring A | R11 | R22 to C | A2lo to D | Top to | | | | | | | | | |
| /* Step 3 | | | | | to A | to B | | | Ring A | | | | | | | | | |
| | 0000 | 00 | 000 | 000 | 1101 | 1101 | 0000 | 0000 | 010 | 101 | 000 | 00 | 00 | 01 | 10 | 00 | 0 | 0000000000100010 |
| /* Line 12 | | | | | Ring A | Ring B | | | North to | South to | | | | Ring A | Ring B | | | A1_A, A2_B |
| /* Step 4 | | | | | to A | to B | | | Ring A | Ring B | | | | to East | to W | | | |
| | 0000 | 00 | 000 | 000 | 1101 | 1101 | 0000 | 0000 | 100 | 011 | 000 | 00 | 01 | 00 | 00 | 10 | 0 | 0000000000100010 |
| /* Line 13 | | | | | Ring A | Ring B | | | West to | East to | | | Ring A | | | Ring B | | A1_A, A2_B |
| /* Step 5 | | | | | to A | to B | | | Ring A | Ring B | | | to North | | | to South | | |
| | 0000 | 00 | 000 | 000 | 1101 | 1101 | 0000 | 0000 | 100 | 011 | 000 | 00 | 00 | 00 | 00 | 00 | 0 | 0000000000100010 |
| /* Line 14 | | | | | Ring A | Ring B | | | West to | East to | | | | | | | | A1_A, A2 B |
| /* Step 6 | | | | | to A | to B | | | Ring A | Ring B | | | | | | | | |
| | 0000 | 00 | 000 | 000 | 1101 | 1101 | 0000 | 0000 | 010 | 101 | 000 | 00 | 00 | 00 | 00 | 00 | 0 | 0000000000100010 |
| /* Line 15 | | | | | Ring A | Ring B | | | N to | S to | | | | | | | | A1_A, A2_B |
| /* Step 7 | | | | | to A | to B | | | Ring A | Ring B | | | | | | | | |
| | 0000 | 00 | 000 | 000 | 0001 | 0110 | 0100 | 1001 | 000 | 000 | 000 | 00 | 00 | 00 | 00 | 00 | 0 | 0000000010011110 |
| /* Line 16 | | | | | R1 to A | R14 | R20 to C | A2lo | | | | | | | | | | A1_D, A2 CB |
| /* Step 8 | | | | | | to B | | to D | | | | | | | | | | |
| | 0000 | 00 | 000 | 000 | 1001 | 0000 | 0000 | 0000 | 000 | 000 | 000 | 00 | 00 | 00 | 00 | 00 | 0 | 1000010100001110 |
| /* Line 17 | | | | | A1lo | | | | | | | | | | | | | Offset 14, bit5, bit8 |
| /* Step 9 | | | | | to A | | | | | | | | | | | | | |
| | 0000 | 00 | 000 | 000 | 1011 | 0001 | 0111 | 0101 | 000 | 000 | 000 | 00 | 00 | 00 | 00 | 00 | 0 | 0001001010111110 |
| /* Line 18 | | | | | A3lo | R9 | R23 | R29 | | | | | | | | | | A1_AD, A2_CB, A3_D |
| /* Step 10 | | | | | to A | to B | to C | to D | | | | | | | | | | |
| | 0000 | 00 | 000 | 000 | 0010 | 0000 | 0000 | 0000 | 000 | 000 | 000 | 00 | 00 | 00 | 00 | 00 | 0 | 1000000000001100 |
| /* Line 19 | | | | | R2 to A | | | | | | | | | | | | | Offset = 12, bit0, bit8 |
| /* Step 11 | | | | | | | | | | | | | | | | | | |
| | 0000 | 00 | 000 | 000 | 0000 | 0011 | 0000 | 0000 | 000 | 000 | 000 | 00 | 00 | 00 | 00 | 00 | 0 | 0000101110110110 |
| /* Line 20 | | | | | R0 | R11 | R16 | R24 | | | | | | | | | | A1_DA A2_BC A3=ASR 2 |
| /* Step 12 | | | | | to A | to B | to C | to D | | | | | | | | | | |
| | 0000 | 00 | 011 | 000 | 1011 | 0000 | 0000 | 1010 | 000 | 000 | 001 | 00 | 00 | 00 | 00 | 00 | 0 | 1000000000001010 |
| /* Line 21 | | | Dlo to | | A3lo to A | | | Ring C | | | A to | | | | | | | Offset = 10, bit0, bit8 |
| /* Step 13 | | | Addr | | | | | to D | | | Ring C | | | | | | | |

Table C-8 3D-Flow code that implements the LHC-B level-1 electron trigger (bits 63-0, steps 14 to 24)

| /* | Compar ator | ENC | Data Memory | | Core BUS Control | | | | Ring BUS Control | | | Output Port Control | | | | | Buffer/ Out | NUMERIC |
|---|---|---|---|---|---|---|---|---|---|---|---|---|---|---|---|---|---|---|
| /* | ThReg CC | | DM1 | DM2 | x to | x to | x to | x to | x to | x to | x to | x to | x to | x to | x to | x to | En/Dis | Constant/BRAddr |
| /* | x-enab CC | | | | Bus A | Bus B | Bus C | Bus D | Ring A | Ring B | Ring C | Bottom | North | East | West | South | OutFIFO | Memadd1/Memadd2 |
| | 0000 | 00 | 000 | 000 | 0100 | 0011 | 0001 | 0011 | 000 | 000 | 000 | 00 | 00 | 00 | 00 | 00 | 0 | 0000011011110110 |
| /* Line 22 | | | | | R4 | R11 | R17 | R27 | | | | | | | | | | A1_BD, A2_BC, A3_A |
| /* Step 14 | | | | | to A | to B | to C | to D | | | | | | | | | | |
| | 0000 | 00 | 000 | 000 | 0000 | 0000 | 0000 | 0000 | 000 | 000 | 000 | 00 | 00 | 00 | 00 | 00 | 0 | 1000000000001000 |
| /* Line 23 | | | | | | | | | | | | | | | | | | Offset = 8, bit0, bit8 |
| /* Step 15 | | | | | | | | | | | | | | | | | | |
| | 0000 | 00 | 000 | 000 | 1100 | 0011 | 0010 | 0010 | 000 | 000 | 000 | 00 | 00 | 00 | 00 | 00 | 0 | 0000011011110110 |
| /* Line 24 | | | | | DM1 | R11 | R18 | R26 | | | | | | | | | | A1_DA, A2_BC |
| /* Step 16 | | | | | to A | to B | to C | to D | | | | | | | | | | |
| | 1111 | 00 | 000 | 000 | 1011 | 0000 | 0000 | 0001 | 000 | 000 | 000 | 00 | 00 | 00 | 00 | 00 | 0 | 1000000000000110 |
| /* Line 25 | CMP AD | | | | A3to | | | R25 to D | | | | | | | | | | Offset = 6, bit0, bit8 |
| /* Step 17 | | | | | to A | | | | | | | | | | | | | |
| | 0000 | 00 | 000 | 000 | 0011 | 0011 | 0011 | 0000 | 000 | 000 | 000 | 00 | 00 | 00 | 00 | 00 | 0 | 0000001110110110 |
| /* Line 26 | | | | | R3 | R11 | R19 | R24 | | | | | | | | | | A1_DA, A2_BC |
| /* Step 18 | | | | | to A | to B | to C | to D | | | | | | | | | | |
| | 0000 | 00 | 000 | 000 | 0000 | 0000 | 0000 | 0000 | 000 | 000 | 000 | 00 | 00 | 00 | 00 | 00 | 0 | 1000000000000100 |
| /* Line 27 | | | | | | | | | | | | | | | | | | Offset = 4, bit0, bit8 |
| /* Step 19 | | | | | | | | | | | | | | | | | | |
| | 0000 | 00 | 000 | 000 | 0000 | 0000 | 0000 | 0000 | 000 | 000 | 000 | 00 | 00 | 00 | 00 | 00 | 0 | 0110011000000011 |
| /* Line 28 | | | | | | | | | | | | | | | | | | Offset = 3, bit6, bit6 |
| /* Step 20 | | | | | | | | | | | | | | | | | | |
| | 0000 | 00 | 000 | 000 | 0111 | 0000 | 0000 | 0000 | 000 | 000 | 001 | 00 | 00 | 00 | 00 | 00 | 1 | 0000000000000000 |
| /* Line 29 | | | | | R7 to A | R8 to B | | | | | A to | | | | | | | |
| /* Step 21 | | | | | | | | | | | Ring C | | | | | | | |
| | 0000 | 00 | 000 | 000 | 0000 | 0010 | 0000 | 0000 | 000 | 000 | 010 | 00 | 00 | 00 | 00 | 00 | 1 | 0000000001101011 |
| /* Line 30 | | | | | | R10 to B | | | | | B to | | | | | | | Offset = -21 |
| /* Step 22 | | | | | | | | | | | Ring C | | | | | | | |
| | 0000 | 00 | 000 | 000 | 0000 | 0000 | 0000 | 0001 | 000 | 000 | 100 | 00 | 00 | 00 | 00 | 00 | 1 | 0000000000000000 |
| /* Line 33 | | | | | | R8 to B | | R25 to D | | | D to | | | | | | | |
| /* Step 21 | | | | | | | | | | | Ring C | | | | | | | |
| | 0000 | 00 | 000 | 000 | 0000 | 0000 | 0000 | 0001 | 000 | 000 | 100 | 00 | 00 | 00 | 00 | 00 | 1 | 0000000001101001 |
| /* Line 34 | | | | | | | | R25 to D | | | D to | | | | | | | Offset = -23 |
| /* Step 22 | | | | | | | | | | | Ring C | | | | | | | |

185

LHC-B electron and hadron

Conversion of the algorithm into 3D-Flow code (Detail-4)

As part of the description of the solution provided for the LHC-B level-1 trigger, this section report in detail the listing of the 3D-Flow program that executes the electron and hadron trigger algorithm described in Section 5.5. (See Table C-9 to Table C-12.)

Table C-9. 3D-Flow code that implements the LHC-B level-1 electron and hadron trigger (bits 95-58, steps 1 to 12).

| /* Type F | | | | | | | | | | | | | | |
|---|---|---|---|---|---|---|---|---|---|---|---|---|---|---|
| /* | | Operations | Comments | | | | | | Register File | | | | Comparator | ENC |
| /* | | | INITIALIZE VARIABLES | Strobe | CNTL | MAC | ALU 1 | ALU 2 | x-Bus | x-Bus | x=Reg. | x=Reg. | ThRegCC | |
| /* | | | | | /FMT | | | | x to AR | x to BR | AR to x | BR to x | x=enab CC | |
| | | | | 1 | 000 | 00000 | 00000 | 00111 | 000 | 000 | 0000 | 0000 | 0000 | 00 |
| /* Line 14 | DATA: | r23 N E W S DM2P <- Flo, SUB_A2 Thi-r22, B=outFIFO | Get word1 (ADC1i, ADC2i). Convert ADCi to Energy (Ei). Subtract Pedestal from ADC2i. | | | | | SUBS | | | | | | |
| /* Step 1 | | | Send Time stamp to the Bottom Port | | | | | | | | | | | |
| | | | | 1 | 111 | 00000 | 01011 | 00111 | 010 | 011 | 1010 | 0111 | 0000 | 00 |
| /* Line 15 | | SUBS_A2 Thi-r5, B-outFIFO, Timer-T, r10-A2lo, ST_A1 r23 | Get Word2 (ADC3i, ADC4i). Increment Time Stamp Subtract Pedestal from ADC3i. | | Write D | | ST | SUBS | B to AR | C to BR | AR to r10 | BR to R23 | | |
| /* Step 2 | | [N=E=W=S=r23] | Send Ei to North, East, West and South (NEWS) neighbors. Sum1=EMi. [r10 (ADC2i-Ped 2)] | | to Timer | | | | | | | | | |
| | | | | 1 | 000 | 00010 | 00000 | 11000 | 001 | 100 | 0100 | 0101 | 0000 | 00 |
| /* Line 16 | | MPYS r10 * r20, r4-T, CLR_A2, r21-A2lo | Get word3 (P1). Calculate Energy HADi - (HADi * Const_2). Sum2-0. | | | MPYS | | CLR | A to AR | D to BR | AR to R4 | BR to | | |
| /* Step 3 | | | [r21-(ADC3i-Ped 3)] [r4--P1] | | | | | | | | | r21 | | |
| | | | | 1 | 000 | 00000 | 00010 | 00010 | 100 | 000 | 0111 | 0000 | 0000 | 00 |
| /* Line 17 | | E- N, W S, ACCS A1 N, ACCS A2 W, r7-Timer | Get Energy En and Es from North and South neighbors and send to East | | | | ACCS | ACCS | D to AR | | AR to | | | |
| /* Step 4 | | | and West. Sum1 = Sum1 - En, Sum2 = Sum2 + Es. [r7=Timer] | | | | | | | | r7 | | | |
| | | | | 1 | 000 | 00000 | 00010 | 00010 | 000 | 000 | 0000 | 0000 | 0000 | 00 |
| /* Line 18 | | N=W, S=E, ACCS_A1_W, ACCS A2 F | Get Energy Ew and Ee from West and East neighbors and send to | | | | ACCS | ACCS. | | | | | | |
| /* Step 5 | | | North and South. Sum1 = Sum1 + Ew, Sum2 = Sum2 + Ee | | | | | | | | | | | |
| | | | | 1 | 000 | 10010 | 00010 | 00010 | 000 | 011 | 0000 | 1100 | 0000 | 00 |
| /* Line 19 | | ACCS A1 W, ACCS A2 E, ASR_A3_8 | Get Energy Ewn and Ees from West_North and East_South | | | ASR | ACCS | ACCS | | C to BR | | BR to | | |
| /* Step 6 | | | neighbors. Sum1 = Sum1 + Ewn, Sum2 = Sum2 - Ees | | | | | | | | | r28 | | |
| | | | | 1 | 000 | 01010 | 00010 | 00010 | 011 | 000 | 1111 | 0000 | 0000 | 00 |
| /* Line 20 | | ADDS A1 N, ACCS A2 S, ADDS A3 r23, r15=A3lo | Get Energy Ene and Esw from North_East and South_West. ETi=(EMi+HADi) | | | ADDS | ACCS | ACCS | C to AR | | AR to r15 | | | |
| /* Step 7 | | | neighbors. Sum1 = Sum1 - Ene, Sum2 = Sum2 + Esw. [Normalize A3] | | | | | | | | | | | |
| | | | | 1 | 000 | 01010 | 01011 | 00000 | 000 | 001 | 0000 | 1000 | 0000 | 00 |

186

| | | | | | | | | | | | | | | |
|---|---|---|---|---|---|---|---|---|---|---|---|---|---|---|
| /* Line 21 | | ACCS A3 A2lo A1lo, ST A1 r24, NEWS r24 A3lo | EM(3x3) = Sum1 + Sum2. Sum1 - ETi. Send ETi to North. East, West and South (NEWS). | | | ADD S | ST | | | A to BR | | BR to | | |
| /* Step 8 | | | [r15 - HADi]. | | | | | | | | | r24 | | |
| | | | | 1 | 000 | 00000 | 00000 | 00111 | 000 | 001 | 0000 | 1101 | 0000 | 00 |
| /* Line 22 | | SUBS A2 r7lo-r30lo. r29=A3lo | Subtract Pedestal from ADC4i | | | | | SUBS | | A to BR | | BR to | | |
| /* Step 9 | | | [r29=EM(3x3)] | | | | | | | | | r29 | | |
| | | | | 1 | 111 | 00000 | 00010 | 01011 | 001 | 010 | 0000 | 0000 | 0000 | 00 |
| /* Line 23 | | r0=E=N, r16=W=S, ACCS A1 r0, ST A2 r16, Timer=A2lo | Get Energy En and Es from North and South neighbors and send to East | | Write D | | ACC S | ST | A to AR | B to BR | AR to r0 | BR to r16 | | |
| /* Step 10 | | [Timer=A2lo] | and West. Sum1 = Sum1 + En, Sum2 = Es. [Timer=ADC4i-Ped_4)] | | to Timer | | | | | | | | | |
| | | | | 1 | 000 | 00010 | 00010 | 00010 | 001 | 100 | 0001 | 0001 | 0000 | 00 |
| /* Line 24 | | r1 N W, r17=S=E, ACCS A1 r1, ACCS A2 r17, MPYS r12 * r21 | Get Energy Ew and Ee from West and East neighbors and send to | | | MPY S | ACC S | ACC S | A to AR | D to BR | AR to r1 | BR to r17 | | |
| /* Step 11 | | | North and South. Sum1 = Sum1 + Ew, Sum2 = Sum2 + Ee. PS1i=ADC3i * Const_3 | | | | | | | | | | | |
| | | | | 1 | 000 | 00000 | 00010 | 00010 | 001 | 100 | 0010 | 0010 | 0000 | 00 |
| /* Line 25 | | r2=W, r18=E, r23=ACCS_A1 r2, ACCS_A2_r18 | Get Energy Ewn and Ees from West North and East_South | | | | ACC S | ACC S | A to AR | D to BR | AR to r2 | BR to r18 | | |
| /* Step 12 | | | neighbors. Sum1 = Sum1 + Ewn, Sum2 = Sum2 + Ees | | | | | | | | | | | |

Table C-10 3D-Flow code that implements the LHC-B level-1 electron and hadron trigger (bits 95-58, steps 13 to 25).

| /* | | Operations | Comments | | | | | | Register File | | | | Comparator | ENC | |
|---|---|---|---|---|---|---|---|---|---|---|---|---|---|---|---|
| /* | | | INITIALIZE VARIABLES | Strobe | CNTL | MAC | ALU1 | ALU2 | x-Bus | x-Bus | x=Reg. | x-Reg. | ThRegCC | | |
| /* | | | | | /FMT | | | | x to AR | x to BR | AR to x | BR to x | x=enab CC | | |
| | | | | 1 | 000 | 00010 | 00010 | 00010 | 001 | 100 | 0011 | 0011 | 0000 | 00 | |
| /* Line 26 | | r3- N, r19-S, ADDS A1 r3, ACCS A2 r19, MPYS r23 * r14 | Get Energy Ene and Esw from North East and South West | | | MPYS | ACCS | ACCS | A to AR | D to BR | AR to r3 | BR to r19 | | | |
| /* Step 13 | | | neighbors. Sum1 = Sum1 + Ene, Sum2 = Sum2 + Esw. EM9T=EM1 * Const_5 | | | | | | | | | | | | |
| | | | | 1 | 000 | 10010 | 00010 | 00000 | 011 | 000 | 1001 | 0000 | 0000 | 00 | |
| /* Line 27 | | ACCS A1 A2lo, ASR_A3_8, r9=r16 | ET(3x3) = Sum1 + Sum2. [Normalize A3] | | | ASR | ACCS | | C to | | AR to R9 | | | | |
| /* Step 14 | | | | | | | | | AR | | | | | | |
| | | | | 1 | 000 | 00000 | 00000 | 00000 | 011 | 001 | 0100 | 0000 | 0000 | 00 | |
| /* Line 28 | | MPYS (Timer * r11), r16=r4 | PS2i=ADC4i * Const 4 | | | | | | C to AR | A to BR | AR to R4 | BR | | | |
| /* Step 15 | | [r4=A3lo] | [r4 PS1i] | | | | | | | | | to R16 | | | |
| | | | | 1 | 000 | 10010 | 00111 | 00111 | 000 | 011 | 0000 | 1001 | 0000 | 00 | |
| /* Line 30 | | SUBS_A1 r24-r0, SUBS_A2 r24-r9, ASR_A3_8 | Calculate (Ei - En) and (Ei - Es) | | | ASR | SUBS | SUBS | | C to BR | | BR | | | |
| /* Step 16 | | [r25=A1lo] | [Normalize A3] [r25=ET(3X3)] | | | | | | | | | to R25 | | | |
| | | | | 1 | 010 | 00000 | 00000 | 00000 | 011 | 001 | 1001 | 0001 | 0000 | 00 | |
| /* Line 31 | | BRccSET #0 #8 REJECT, DMIP <- r29, r17=A3lo, r9=r17 | IF (Ei - En) < 0 OR (Ei - Es) < 0 THEN REJECT EVENT | | | | | | C to AR | A to BR | AR to R9 | BR | | | |
| /* Step 17 | | | [r17=EM9T] Select Lookup Mask corresponding to EM(3x3) | | | | | | | | | T0 R17 | | | |
| | | | | 1 | 000 | 10010 | 00111 | 00111 | 000 | 000 | 0000 | 0000 | 0000 | 00 | |
| /* Line 32 | | SUBS_A1 r24-r1, SUBS_A2 r24-r9, ASR_A3_8 | Calculate (Ei - Ee) and (Ei - Ew). | | | ASR | SUBS | SUBS | | | | | | | |
| /* Step 18 | | | | | | | | | | | | | | | |
| | | | | 1 | 010 | 00000 | 00000 | 00000 | 011 | 001 | 1001 | 0010 | 0000 | 00 | |
| /* Line 33 | | BRccSET #0 #8 REJECT, r9=r18, r18=A3lo | IF (Ei-Ee) < 0 OR (Ei-Ew) < 0 THEN REJECT EVENT | | | | | | C to AR | A to BR | AR to R9 | BR to r18 | | | |
| /* Step 19 | | | [r18=PS2i] | | | | | | | | | | | | |
| | | | | 1 | 000 | 01011 | 00111 | 00111 | 000 | 100 | 0000 | 0000 | 0011 | 00 | |
| /* Line 34 | | SUBS_A1 r24-r2, SUBS_A2 r24-r9, ST A3 r16, r16=r24 | Calculate (Ei - Ewn) and (Ei - Ees). Select value from P1 Pads. | | | ST | SUBS | SUBS | | D to BR | | BR to r16 | Set Comp C | | |
| /* Step 20 | | | | | | | | | | | | | | | |
| | | | | 1 | 010 | 00000 | 00000 | 00000 | 011 | 000 | 1001 | 0000 | 0110 | 00 | |
| /* Line 35 | | BRccSET #0 #8 REJECT, CMP (r4, r15, r18, r25) - TH16 | IF (Ei - Ewn) < 0 OR (Ei - Ees) < 0 THEN REJECT EVENT | | | | | | C to AR | | AR to R9 | | TH16 | | |
| /* Step 21 | | | Compare[PS1i, HADi, PS2i, ET(3X3)] [PS2i <> T5] | | | | | | | | | | | | |
| | | | | 1 | 000 | 01100 | 00111 | 00111 | 000 | 000 | 0000 | 0000 | 0000 | 00 | |
| /* Line 36 | | SUBS A1 r24-r3, | Calculate (Ei - Ene) and (Ei - Esw) | | | AND | SUBS | SUBS | | | | | | | |

188

| | | | | | | | | | | | | | | |
|---|---|---|---|---|---|---|---|---|---|---|---|---|---|---|
| | | SUBS A2 rr24-r9, AND_A3 DM1 | | | | | | | | | | | | |
| /* Step 22 | | | | | | | | | | | | | | |
| | | | | 1 | 010 | 00000 | 00000 | 00000 | 011 | 000 | 1001 | 0000 | 0000 | 00 |
| /* Line 37 | | BRccSET #0 #8 REJECT, r9 OUTComp | IF (Ei - Enc) < 0 OR (Ei - Esw) < 0 THEN REJECT EVENT | | | | | | C to AR | | AR to R9 | | | |
| /* Step 23 | | | | | | | | | | | | | | |
| | | | | 1 | 100 | 00000 | 00000 | 01011 | 000 | 000 | 0000 | 0000 | 0000 | 00 |
| /* Line 38 | | Set ccSTS ~r9, ST_A2 r29 | Load results of comparisons into the Condition Code Status Register | | SetccSTS | | | ST | | | | | | |
| /* Step 24 | | | | | | | | | | | | | | |
| | | | | 1 | 011 | 00000 | 00000 | 00000 | 000 | 000 | 0000 | 0000 | 0000 | 00 |
| /* Line 39 | | BRccCLR #0 #2 REJECT | IF (T1>PS1i>T2) THEN REJECT | | BRccCLR | | | | | | | | | |
| /* Step 25 | | | | | | | | | | | | | | |

Table C-11 3D-Flow code that implements the LHC-B level-1 electron and hadron trigger (bits 95-58, steps 26 to 34).

| /* | | Operations | Comments | | | | | | Register File | | | Comparator | ENC | |
|---|---|---|---|---|---|---|---|---|---|---|---|---|---|---|
| /* | | | INITIALIZE VARIABLES | Strobe | CNTL | MAC | ALU1 | ALU2 | x-Bus | x=Bus | x-Reg. | x-Reg. | ThRegCC | |
| /* | | | | | /FMT | | | | x to AR | x to BR | AR to x | BR to x | x=enabCC | |
| | | | | 1 | 011 | 00000 | 00000 | 00000 | 000 | 000 | 0000 | 0000 | 0000 | 00 |
| /* Line 40 | | BRccCLR #9 #9 HADRON | IF (PS2i < T5) GOTO HADRON | | BRccCLR | | | | | | | | | |
| /* Step 26 | | | | | | | | | | | | | | |
| | | | | 1 | 010 | 00000 | 00000 | 00000 | 011 | 000 | 1001 | 0000 | 1111 | 00 |
| /* Line 40 | | BRccSET #5 #5 REJECT, r9=r17 CMP A3lo r28 | IF (HADi > T6) THEN REJECT EVENT | | BRccSET | | | | C to | | AR to | | CMP_AD | |
| /* Step 27 | | | [r9=EM9T] | | | | | | AR | | R9 | | | |
| | | | | 1 | 000 | 00000 | 00111 | 00111 | 000 | 000 | 0000 | 0000 | 0000 | 00 |
| /* Line 40 | | SUBS_A1 r23-r9, SUBS_A2 A3lo[hi] r28 | Calculate (EMi - EM9T). Check mask on P1 for Positive or Negative Particle | | | | SUBS | SUBS | | | | | | |
| /* Step 28 | | | | | | | | | | | | | | |
| | | | | 1 | 010 | 00000 | 00000 | 00000 | 000 | 000 | 0000 | 0000 | 0000 | 00 |
| /* Line 41 | | BRccSET #0 #6 REJECT, CMP A3lo r28 | IF EMi < 60% EM(3x3) OR Veto on P1, no Positive or Negative particle found | | BRccSET | | | | | | | | | |
| /* Step 29 | | | REJECT EVENT | | | | | | | | | | | |
| | | | | 1 | 000 | 00000 | 01011 | 00000 | 000 | 000 | 0000 | 0000 | 0000 | 00 |
| /* Line 42 | | ST_A1 r29 | Initialize "Result" with EM(3x3) | | | | ST | | | | | | | |
| /* Step 30 | | | | | | | | | | | | | | |
| | | | | 1 | 010 | 00000 | 00000 | 00000 | 000 | 100 | 0000 | 0101 | 0000 | 00 |
| /* Line 43 | | BRccSET #9 #9 NEG, CMP A3lo r28 | IF Positive particle not found, GOTO NEGATIVE | | BRccSET | | | | | D to BR | | BR to r21 | | |
| /* Step 31 | | | | | | | | | | | | | | |
| | | | | 1 | 000 | 00000 | 01101 | 00000 | 000 | 000 | 0000 | 0000 | 0000 | 00 |
| /* Line 44 | | OR A1 r27, SUBS_A2 A3lo[lo] r28 | Set Positive particle in "Result" | | | | OR | | | | | | | |
| /* Step 32 | | | | | | | | | | | | | | |
| | | | | 1 | 010 | 00000 | 00000 | 00000 | 000 | 000 | 0000 | 0000 | 0000 | 00 |
| /* Line 45 | | BRccSET #9 #9 START | IF Negative particle not found, fetch next data. | | BRccSET | | | | | | | | | |
| /* Step 33 | | | | | | | | | | | | | | |
| | | | | 1 | 000 | 00000 | 01101 | 00000 | 000 | 000 | 0000 | 0000 | 0000 | 00 |
| /* Line 46 | NEG: | OR A1 r26 | Set Negative particle in "Result." Fetch next data. | | | | OR | | | | | | | |
| /* Step 34 | | | | | | | | | | | | | | |
| | | | | 1 | 001 | 00000 | 00000 | 00000 | 000 | 000 | 0000 | 0000 | 0000 | 00 |
| /* Line 46 | | BRA START | Fetch next set of data | | BRA | | | | | | | | | |
| /* Step 34 | | | | | | | | | | | | | | |
| | | | | 1 | 010 | 00000 | 00000 | 00000 | 000 | 000 | 0000 | 0000 | 0000 | 00 |
| /* Line 47 | HADRON | BRccSET #12 #12 REJECT | IF (ET(3x3) < T6) THEN REJECT | | BRccSET | | | | | | | | | |
| /* Step 27 | | | | | | | | | | | | | | |
| | | | | 1 | 011 | 00000 | 00000 | 00000 | 000 | 000 | 0000 | 0000 | 0000 | 00 |
| /* Line 48 | | BRccCLR #8 #9 REJECT | IF (T3>PS2i>T4) THEN REJECT | | BRccCLR | | | | | | | | | |

190

| | | | | | | | | | | | | | | |
|---|---|---|---|---|---|---|---|---|---|---|---|---|---|---|
| /* Step 28 | | | | | | | | | | | | | | |
| | | | | 1 | 001 | 00000 | 00000 | 00000 | 000 | 000 | 0000 | 0000 | 0000 | 00 |
| /* Line 48 | | BRA START. output result | IF (T3>PS2i>T4) THEN REJECT | | BRA | | | | | | | | | |
| /* Step 29 | | | | | | | | | | | | | | |
| | | | | 1 | 001 | 00000 | 00000 | 00000 | 000 | 000 | 0000 | 0000 | 0000 | 00 |
| /* Line 50 | REJEC1: | outFIFO←r25. r7←r8 | Send out to the Bottom port "REJECT EVENT" and update Time Stamp for next event. | | BRA | | | | | | | | | |
| /* Step 30 | | | | | | | | | | | | | | |

191

Table C-12. 3D-Flow code that implements the LHC-B level-1 electron trigger (bits 57-0, steps 1 to 12)

| /* Type E | | | | | | | | | | | | | | | | |
|---|---|---|---|---|---|---|---|---|---|---|---|---|---|---|---|---|
| /* | Data Memory | | Core BUS Control | | | | Ring BUS Control | | | Output Port Control | | | | | Buffer/Out | NUMERIC |
| /* | DM1 | DM2 | x to | x to | x to | x to | x to | x to | x to | x to | x to | x to | x to | x to | En/Dis | Constant/BRAddr |
| /* | | | Bus A | Bus B | Bus C | Bus D | Ring A | Ring B | Ring C | Bottom | North | East | West | South | OutFIFO | Memadd1/Memadd2 |
| | 000 | 001 | 1001 | 1101 | 0110 | 0000 | 000 | 001 | 001 | 11 | 00 | 00 | 00 | 00 | 0 | 0000000000010010 |
| /* Line 14 | | Blo=ADDr | A1lo | Ring B | r22 | | | Top to | A | Ring C | | | | | | A2_Bhi_Clo, A2_Bhi, A1_AC |
| /* Step 1 | | | to A | to B | to C | | | Ring B | Ring C | to Bottom | | | | | | |
| | 000 | 000 | 0101 | 1001 | 1100 | 1101 | 111 | 001 | 001 | 11 | 01 | 01 | 01 | 01 | 0 | 0000000001110011 |
| /* Line 15 | | | r5 | A2lo | DM2 | Ring B | C to | Top to | A to | Ring C | Ring A | Ring A | Ring A | Ring A | | A2_Dhi_Alo, A1_C |
| /* Step 2 | | | to A | to B | to C | to D | ring A | Ring B | to Ring C | to Bottom | to North | to East | to West | to South | | |
| | 000 | 000 | 1101 | 0010 | 0100 | 1001 | 001 | 000 | 000 | 00 | 00 | 00 | 00 | 00 | 0 | 0101100001100000 |
| /* Line 16 | | | Ring A | r10 | r20 | A2lo | Top to | | | | | | | | | A3_BC, A1_C |
| /* Step 3 | | | to A | to B | to C | to D | Ring A | | | | | | | | | |
| | 000 | 000 | 1101 | 1101 | 0000 | 1110 | 010 | 101 | 000 | 00 | 00 | 01 | 10 | 00 | 0 | 0000000000100010 |
| /* Line 17 | | | Ring A | Ring B | | Timer | North to | South to | | | | Ring A | Ring B | | | A1_A, A2_B |
| /* Step 4 | | | to A | to B | | to D | Ring A | Ring B | | | | to East | to West | | | |
| | 000 | 000 | 1101 | 1101 | 0000 | 0000 | 100 | 011 | 000 | 00 | 01 | 00 | 00 | 10 | 0 | 0000000000100010 |
| /* Line 18 | | | Ring A | Ring B | | | West to | East to | | | Ring A | | | Ring B | | A1_A, A2_B |
| /* Step 5 | | | to A | to B | | | Ring A | Ring B | | | to North | | | to South | | |
| | 000 | 000 | 1101 | 1101 | 0111 | 0000 | 100 | 011 | 000 | 00 | 00 | 00 | 00 | 00 | 0 | 0010000000100010 |
| /* Line 19 | | | Ring A | Ring B | r23 | | West to | East to | | | | | | | | A1_A, A2_B, A3_SH8 |
| /* Step 6 | | | to A | to B | to C | | Ring A | Ring B | | | | | | | | |
| | 000 | 000 | 1101 | 1101 | 1011 | 0100 | 010 | 101 | 000 | 00 | 00 | 00 | 00 | 00 | 0 | 0001000000100010 |
| /* Line 20 | | | Ring A | Ring B | A3lo | r28 | North to | South to | | | | | | | | A1_A, A2_B, A3_D |
| /* Step 7 | | | to A | to B | to C | to D | Ring A | Ring B | | | | | | | | |
| | 000 | 000 | 1011 | 1001 | 1001 | 0000 | 000 | 000 | 001 | 00 | 11 | 11 | 11 | 11 | 0 | 0101100000100000 |
| /* Line 21 | | | A3lo | A2lo | A1lo | | | | A to | | Ring C | Ring C | Ring C | Ring C | | A1_A, A3_BC |
| /* Step 8 | | | to A | to B | to C | | | | Ring C | | to North | to East | to West | to South | | |
| | 000 | 000 | 0111 | 0000 | 1011 | 0110 | 000 | 000 | 000 | 00 | 00 | 00 | 00 | 00 | 0 | 0000000000001110 |
| /* Line 22 | | | r7 t | | A3lo | R30 | | | | | | | | | | A2_Alo_Dlo |
| /* Step 9 | | | to A | | to C | to D | | | | | | | | | | |
| | 000 | 000 | 1101 | 1101 | 0000 | 1001 | 010 | 101 | 000 | 00 | 00 | 01 | 10 | 00 | 0 | 0000000000100010 |
| /* Line 23 | | | Ring A | Ring B | | A2lo | North to | South to | | | | Ring A | Ring B | | | A1_A, A2_B |
| /* Step 10 | | | to A | to B | | to D | Ring A | Ring B | | | | to East | to West | | | |
| | 000 | 000 | 1101 | 0100 | 0101 | 1101 | 100 | 011 | 000 | 00 | 01 | 00 | 00 | 10 | 0 | 0101100000100100 |
| /* Line 24 | | | Ring A | r12 | r21 | Ring B | West to | East to | | | Ring A | | | Ring B | | A1_A, A2_D, A3_BC |
| /* Step 11 | | | to A | to B | to C | to D | Ring A | Ring B | | | to North | | | to South | | |
| | 000 | 000 | 1101 | 0100 | 0101 | 1101 | 100 | 011 | 000 | 00 | 00 | 00 | 00 | 00 | 0 | 0000000000100100 |
| /* Line 25 | | | Ring A | r12 | r21 | Ring B | West to | East to | | | | | | | | A1_A, A2_D |
| /* Step 12 | | | to A | to B | to C | to D | Ring A | Ring B | | | | | | | | |

Table C-13 3D-Flow code that implements the LHC-B level-1 electron trigger (bits 57-0, steps 13 to 25)

| /* | Data Memory | | Core BUS Control | | | | Ring BUS Control | | | Output Port Control | | | | | Buffer/Out | NUMERIC |
|---|---|---|---|---|---|---|---|---|---|---|---|---|---|---|---|---|
| /* | DM1 | DM2 | x to | x to | x to | x to | x to | x to | x to | x to | x to | x to | x to | x to | En/Dis | Constant/BRAddr |
| /* | | | Bus A | Bus B | Bus C | Bus D | Ring A | Ring B | Ring C | Bottom | North | East | West | South | OutFIFO | Memadd1/Memadd2 |
| | 000 | 000 | 1101 | 0110 | 0111 | 1101 | 010 | 101 | 000 | 00 | 00 | 00 | 00 | 00 | 0 | 0101100000100100 |
| /* Line 26 | | | Ring A | r14 | r23 | Ring B | North to | South to | | | | | | | | A1_A, A2_D, A3_BC |
| /* Step 13 | | | to A | to B | toC | to D | Ring A | Ring B | | | | | | | | |
| | 000 | 000 | 0000 | 1001 | 0000 | 0000 | 000 | 000 | 000 | 00 | 00 | 00 | 00 | 00 | 0 | 0010000001000000 |
| /* Line 27 | | | | A2lo | R16 to C | | | | | | | | | | | A1_B, A3_SH8 |
| /* Step 14 | | | | to B | | | | | | | | | | | | |
| | 000 | 000 | 0100 | 0011 | 1011 | 1110 | 000 | 000 | 000 | 00 | 00 | 00 | 00 | 00 | 0 | 0101110000000000 |
| /* Line 28 | | | R4 to A | r11 | A3lo | Timer | | | | | | | | | | A3_BD |
| /* Step 15 | | | | to B | to C | to D | | | | | | | | | | |
| | 000 | 000 | 0000 | 0001 | 1001 | 0000 | 000 | 000 | 000 | 00 | 00 | 00 | 00 | 00 | 0 | 0010001110111111 |
| /* Line 30 | | | R0 | R9 | A1lo | R24 | | | | | | | | | | A1_DA, A2_DB, A3=ASR_8 |
| /* Step 16 | | | to A | to B | to C | to D | | | | | | | | | | |
| | 011 | 000 | 1011 | 0000 | 0001 | 0101 | 000 | 000 | 000 | 00 | 00 | 00 | 00 | 00 | 0 | 1000000000001010 |
| /* Line 31 | Dlo to | | A3lo to A | | R17 to C | R29 | | | | | | | | | | Offset = 10, bit0, bit8 |
| /* Step 17 | Addr | | | | | to D | | | | | | | | | | |
| | 000 | 000 | 0001 | 0001 | 0000 | 0000 | 000 | 000 | 000 | 00 | 00 | 00 | 00 | 00 | 0 | 0010001110111111 |
| /* Line 32 | | | r1 | R9 | | R24 | | | | | | | | | | A1_DA, A2_DB, A3_SH8 |
| /* Step 18 | | | to A | to B | | to D | | | | | | | | | | |
| | 000 | 000 | 1011 | 0000 | 0010 | 0000 | 000 | 000 | 000 | 00 | 00 | 00 | 00 | 00 | 0 | 1000000000001000 |
| /* Line 33 | | | A3lo | | R18 to C | | | | | | | | | | | Offset = 8, bit0, bit8 |
| /* Step 19 | | | to A | | | | | | | | | | | | | |
| | 000 | 000 | 0010 | 0001 | 0000 | 0000 | 000 | 000 | 000 | 00 | 00 | 00 | 00 | 00 | 0 | 0000111110111111 |
| /* Line 34 | | | r2 | R9 | R16 | r24 | | | | | | | | | | A1_DA, A2_DB |
| /* Step 20 | | | to A | to B | to C | to D | | | | | | | | | | |
| | 000 | 000 | 0100 | 0111 | 0010 | 0001 | 000 | 000 | 000 | 00 | 00 | 00 | 00 | 00 | 0 | 1000000000000110 |
| /* Line 35 | | | R4 | R15 | r18 | r25 | | | | | | | | | | Offset = 6, bit0, bit8 |
| /* Step 21 | | | to A | to B | to C | to D | | | | | | | | | | |
| | 000 | 000 | 0011 | 0001 | 0000 | 1111 | 000 | 000 | 000 | 00 | 00 | 00 | 00 | 00 | 0 | 0001001110011110 |
| /* Line 36 | | | r3 | R9 | | DM1 | | | | | | | | | | A1_CA, A2_CB, A3_D |
| /* Step 22 | | | to A | to B | | to D | | | | | | | | | | |
| | 000 | 000 | 0000 | 0000 | 1110 | 0000 | 000 | 000 | 000 | 00 | 00 | 00 | 00 | 00 | 0 | 1000000000000100 |
| /* Line 37 | | | | | OUTComp | | | | | | | | | | | Offset = 4, bit0, bit8 |
| /* Step 23 | | | | | to C | | | | | | | | | | | |
| | 000 | 000 | 0000 | 0000 | 0000 | 0101 | 000 | 000 | 000 | 00 | 00 | 00 | 00 | 00 | 0 | 0000000000000100 |
| /* Line 38 | | | | | | r29 | | | | | | | | | | A2_D |
| /* Step 24 | | | | | | to D | | | | | | | | | | |
| | 000 | 000 | 0000 | 0000 | 0000 | 0000 | 000 | 000 | 000 | 00 | 00 | 00 | 00 | 00 | 0 | 0010000000001101 |
| /* Line 39 | | | | | | | | | | | | | | | | offset = 13 |
| /* Step 25 | | | | | | | | | | | | | | | | |

Table C-14 3D-Flow code that implements the LHC-B level-1 electron trigger (bits 57-0, steps 26 to 34)

| /* | Data Memory | | Core BUS Control | | | | Ring BUS Control | | | Output Port Control | | | | | Buffer/Out | NUMERIC |
|---|---|---|---|---|---|---|---|---|---|---|---|---|---|---|---|---|
| /* | DM1 | DM2 | x to | x to | x to | x to | x to | x to | x to | x to | x to | x to | x to | x to | En/Dis | Constant/BRAddr |
| /* | | | Bus A | Bus B | Bus C | Bus D | Ring A | Ring B | Ring C | Bottom | North | East | West | South | OutFIFO | Memadd1/Memadd2 |
| | 000 | 000 | 0000 | 0000 | 0000 | 0000 | 000 | 000 | 000 | 00 | 00 | 00 | 00 | 00 | 0 | 1001100100001001 |
| /* Line 40 | | | | | | | | | | | | | | | | Offset = 9 |
| /* Step 26 | | | | | | | | | | | | | | | | |
| | 000 | 000 | 1011 | 0000 | 0001 | 0100 | 000 | 000 | 000 | 00 | 00 | 00 | 00 | 00 | 0 | 0101010100001011 |
| /* Line 40 | | | A3lo | | R17 | R28 | | | | | | | | | | Offset · 11 |
| /* Step 27 | | | to A | | to C | to D | | | | | | | | | | |
| | 000 | 000 | 1011 | 0001 | 0111 | 0100 | 000 | 000 | 000 | 00 | 00 | 00 | 00 | 00 | 0 | 0000001111010001 |
| /* Line 40 | | | A3lo | R9 | R23 | r28 | | | | | | | | | | A1 CB, A2_Ahi_Dlo |
| /* Step 28 | | | to A | to B | to C | to D | | | | | | | | | | |
| | 000 | 000 | 0000 | 0000 | 0000 | 0000 | 000 | 000 | 000 | 00 | 00 | 00 | 00 | 00 | 0 | 0110000000001001 |
| /* Line 41 | | | | | | | | | | | | | | | | offset = 9 |
| /* Step 29 | | | | | | | | | | | | | | | | |
| | 000 | 000 | 0000 | 0000 | 0000 | 0101 | 000 | 000 | 000 | 00 | 00 | 00 | 00 | 00 | 0 | 0000000010000000 |
| /* Line 42 | | | | | | r29 | | | | | | | | | | A1 D |
| /* Step 30 | | | | | | to D | | | | | | | | | | |
| | 000 | 000 | 0000 | 0000 | 0000 | 0100 | 000 | 000 | 000 | 00 | 00 | 00 | 00 | 00 | 0 | 1001100100000100 |
| /* Line 43 | | | | | | r28 | | | | | | | | | | Offset = 4 |
| /* Step 31 | | | | | | to D | | | | | | | | | | |
| | 000 | 000 | 1011 | 0000 | 0101 | 0011 | 000 | 000 | 000 | 00 | 00 | 00 | 00 | 00 | 0 | 0000000010001101 |
| /* Line 44 | | | A3lo | | r21 | r27 | | | | | | | | | | A1_D, A2 Alo Clo |
| /* Step 32 | | | to A | | to C | to D | | | | | | | | | | |
| | 000 | 000 | 0000 | 0000 | 0000 | 0000 | 000 | 000 | 000 | 00 | 00 | 00 | 00 | 00 | 0 | 0000000001011110 |
| /* Line 45 | | | | | | | | | | | | | | | | Offset · -33 |
| /* Step 33 | | | | | | | | | | | | | | | | |
| | 000 | 000 | 0000 | 0000 | 0010 | 0000 | 000 | 000 | 000 | 00 | 00 | 00 | 00 | 00 | 0 | 0000000010000000 |
| /* Line 46 | | | | | r26 to D | | | | | | | | | | | A1_D |
| /* Step 34 | | | | | | | | | | | | | | | | |
| | 000 | 000 | 0000 | 0000 | 0000 | 0000 | 000 | 000 | 000 | 00 | 00 | 00 | 00 | 00 | 0 | 0000000001011100 |
| /* Line 46 | | | | | | | | | | | | | | | | offset = - 35 |
| /* Step 34 | | | | | | | | | | | | | | | | |
| | 000 | 000 | 0000 | 0000 | 0000 | 0000 | 000 | 000 | 000 | 00 | 00 | 00 | 00 | 00 | 0 | 1100110000000011 |
| /* Line 47 | | | | | | | | | | | | | | | | Offset = 3 |
| /* Step 27 | | | | | | | | | | | | | | | | |
| | 000 | 000 | 0000 | 0000 | 0000 | 0000 | 000 | 000 | 000 | 00 | 00 | 00 | 00 | 00 | 0 | 1001100000000010 |
| /* Line 48 | | | | | | | | | | | | | | | | Offset = 2 |
| /* Step 28 | | | | | | | | | | | | | | | | |
| | 000 | 000 | 0000 | 0000 | 0000 | 0000 | 000 | 000 | 000 | 00 | 00 | 00 | 00 | 00 | 0 | 0000000001111001 |
| /* Line 48 | | | | | | | | | | | | | | | | Offset = -38 |
| /* Step 29 | | | | | | | | | | | | | | | | |
| | 000 | 000 | 0000 | 0000 | 0000 | 0000 | 000 | 000 | 000 | 00 | 00 | 00 | 00 | 00 | 0 | 0000000001111000 |
| /* Line 50 | | | | | | | | | | | | | | | | Offset = -39 |
| /* Step 30 | | | | | | | | | | | | | | | | |

What is claimed is:

1. A processor complex for processing data from at least one input, comprising:

at least a first and second processor, each having a data input and a data output, a data input of the second processor receiving data from the data output of the first processor;

each processor being programmed with a respective algorithm for processing data received from a respective data input;

said first processor being configured to receive raw data and process the raw data according to the respective algorithm programmed therein, and configured to receive other raw data and pass said other raw data to said second processor; and said second processor being configured to receive said other raw data passed from said first processor and process the other raw data according to the algorithm programmed in said second processor, and said second processor is configured to receive processed data from said first processor and pass the processed data from the data input to the data output of said second processor.

2. The processor complex of claim 1, wherein each said processor is constructed substantially identically so as to be physically interchangeable.

3. The processor complex of claim 1, wherein each said processor includes four I/O ports, each said I/O port connected to a different neighbor processor for transferring data therebetween.

4. The processor complex of claim 3, wherein each said I/O port is structured to simultaneously transfer data from a neighbor processor and to the same neighbor processor.

5. The processor complex of claim 1, further including a switching circuit in each processor for transferring data from said data input to said data output without changing the data.

6. The processor complex of claim 1, wherein each said processor is programmable so that a desired number of data bits can be input and processed, and another desired number of raw data bits can be passed to a subsequent processor.

7. The processor complex of claim 1, further including a timing circuit for controlling each said processor to operate together synchronously to poll the availability of data at the input ports of the processors.

8. The processor complex of claim 1, wherein each said processor is programmable with a unique identification tag, and programmable to append the identification tag to data received from the respective data input thereof.

9. The processor complex of claim 1, wherein each said processor includes a timer for counting time, and wherein each said processor is programmable to append a time tag to data received from the respective data input thereof.

10. The processor complex of claim 1, further including a plurality of said processors, each having a data input, and at least less than half of said processors are programmed to transfer data to a respective data output.

11. The processor complex of claim 1, further including a plurality of said first processors, said plurality of said first processors comprising a base layer of a processor pyramid and further including a second layer of said second processors, each processor of said second layer having a data input receiving data from a data output of a processor in said base layer, and wherein said base layer of processors comprises an array of MxN processors and said second layer comprises an array of OxP second processors, wherein O is less than M and P is less than N.

12. The processor complex of claim 1, further including in combination a processor stack comprising a plurality of said first processors, each having a data input receiving data from a different sensor of a plurality of sensors, each sensor for detecting a response to the occurrence of an event, and each processor of said stack being programmable so as to be data driven as a function of the receipt of the data from said sensor.

13. The processor complex of claim 12, wherein said plurality of processors in said stack comprise a first stage, and further including a second stage of similar processors, each processor in said first stage having a bottom data output connected to a top data input of a respective processor in said second stage.

14. The processor complex of claim 13, further including a plurality of stages of processors comprising a multi-stage stack, and wherein a number of processor stages of said multi-stage stack is a function of a number of clock cycles required to carry out a data processing algorithm programmed in the processors of the stack.

15. The processor complex of claim 14, wherein each processor of the stack includes substantially the same algorithm for processing data to produce a data result.

16. The processor complex of claim 12, further including in combination an array of said sensors, each sensor operating independently of the other said sensors, and each said sensor having an output and a circuit for converting the output to a corresponding digital signal output, and the digital signal output associated with each sensor being connected to a different data input of a processor of the plurality of processors in said stack.

17. A method for processing and funneling data from an event sensor array having a plurality of sensor outputs, comprising the steps of:

providing at least one array stack of data processors, each said data processor stack comprising at least one layer of processors and each processor having a data input receiving data that is output from a respective said sensor, each said data processor being programmed to process the sensor data input thereto according to an algorithm, and each said data processor having a data output for providing processed data therefrom; and providing a pyramid of processors, a base layer thereof having a routing processor with a data input coupled to a data output of a processor in the array stack, and ones of routing processors providing an output to other routing processors, and a fewer number of said routing processors by a reduction factor of four to one providing output data which comprises all of the processed data input to the pyramid, whereby funneling of processed data is carried out, the reduction factor from one layer of said pyramid to a subsequent layer allows logical and arithmetic operations on the data to be routed and carried out in less than about twenty clock cycles.

18. The method of claim 17, further including programming each said stack processor so as to be data driven, and programming each said pyramid processor so as to be synchronously driven to poll the availability of data at a data input thereof.

19. The method of claim 17, further including appending a tag representative of a time parameter to the sensor data that is input to the stack processors.

20. The method of claim 17, further including appending a tag representative of a position parameter to the processed data that is input to the pyramid processors from the stack processors.

21. The method of claim 17, further including providing a specified number of arrays to the stack corresponding to the execution time of the programmed algorithm divided by the clock cycle of the processors.

22. The method of claim 17, further including programming ones of the processors of the pyramid with the same algorithm for transferring data to a neighbor processor of the pyramid.

23. The method of claim 17, wherein each said processor of the stack and the pyramid are substantially identical in structure.

24. The method of claim 23, wherein each said processor has a top data input for receiving data, a bottom data output for transferring data, and four I/O ports for exchanging data with a respective neighbor processor.

25. In a medical environment, a method of processing data generated by a multi-element sensor detecting emissions from a patient, comprising the steps of:

producing a data output from said sensor at a rate of about 50 MHz;

converting the data generated by the sensor elements to corresponding digital signals and producing a plurality of parallel digital output signals;

inputting the parallel digital output signals to a plurality of data processors;

processing the digital output signals in parallel with the data processors to produce a plurality of processed data outputs; and funneling the processed data to a pyramid of processors from four processors to one processor without exceeding twenty clock cycles for each reduction of four to one in proceeding in one of the pyramid layers to a subsequent layer by applying the parallel processed data to a plurality of processors of the pyramid and transferring the processed data to multi-ported neighbor processors so that an output of the pyramid provides serialized processed data corresponding to the parallel data input to the pyramid.

26. The method of claim 25, further including displaying the serialized processed data on a display to illustrate physical features of a patient.

27. In a high energy particle detector, a method of processing data generated by a multi-element sensor detecting particles, comprising the steps of:

producing a data output from said sensor at a rate of about 50 MHz;

converting the data generated by the sensor elements to corresponding digital signals, and producing a plurality of parallel digital output signals;

inputting the parallel digital signals to a plurality of data processors;

processing the digital signals in parallel with the data processors to produce a plurality of processed data outputs; and funneling the processed data to a pyramid of processors from four processors to one processor without exceeding twenty clock cycles for each reduction of four to one in proceeding in one layer of the pyramid to a subsequent layer by applying the parallel processed data to a plurality of processors of the pyramid and transferring the processed data to multi-ported neighbor processors so that an output of the pyramid provides serialized processed data corresponding to the parallel data input to the pyramid.

28. The method of claim 27, further including coupling respective inputs of the parallel data processors to respective outputs of a calorimeter.

29. A method for processing parallel raw data provided at an input data rate on the order of hundreds of megahertz, comprising the steps of:

coupling the parallel raw data to a respective number of parallel data processors;

transferring the raw data received by each processor to a neighbor processor, and receiving by each processor transferred raw data from a neighbor processor within a maximum of two clock cycles;

processing by each processor according to a programmable algorithm the coupled raw data and the transferred raw data according to an algorithm; and while one or more of said processors are carrying out the data processing algorithm, switching new coupled raw data by a busy processor to an idle processor for processing the switched raw data.

30. The method of claim 29, further including transferring raw data from a plurality of ports of a processor to neighbor processors in a single processor cycle.

31. The method of claim 29, further including arranging said processors in an x-y array for coupling thereto the raw data, and further including exchanging raw data with at least eight neighbor processors.

32. The method of claim 29, further including switching new coupled raw data by a busy processor to an idle processor during execution of a data processing algorithm by the busy processor.

33. The method of claim 32, further including switching the new coupled raw data to the idle processor via an intermediate busy processor.

34. A method of processing parallel raw data, comprising the steps of:

arranging a plurality of data processors in an x-y array so as to define a stage;

arranging a plurality of said stages so as to define a stack of processors;

applying the parallel raw data to processors of a first processor stage;

exchanging the raw data received by each processor in a stage with neighbor processors and processing by each processor in the stage the applied parallel raw data with the exchanged raw data according to a data processing algorithm, and passing data results to a processor in a second stage;

receiving by a processor in said second stage the data results and receiving the parallel raw data by processors in the second stage and exchanging the parallel raw data with neighbor processors in said second stage and switching the data results received from the first stage by said processors in said second stage to an output of the stack of processors; and configuring each said processor in a programmable manner so as to be able to input data thereto and process the data or to switch the data input thereto through the processor without processing.

35. The method of claim 34, where in each processor in said first processor stage is programmed to receive parallel raw data, and process said parallel raw data with exchanged raw data from neighbor processors, and configured to pass parallel raw data therethrough to a processor in said second stage.

36. The method of claim 34, wherein each processor in said second stage is programmed to receive parallel raw data passed thereto from a processor in said first stage, process the passed raw data with passed raw data exchanged between neighbor processors in the second stage, and transfer results data resulting from the processing of the raw data in the second stage to a processor in a third stage of the stack, and pass through the processor in the second stage parallel raw data passed thereto through a processor in the first stage to a processor in the third stage.

37. The method of claim 36, further including passing parallel data results from a last processor stage in said stack to a processor pyramid for funneling the parallel data results to a serial stream of data results.

38. The method of claim 37, further including funneling the data results in the processor pyramid by routing the data results through multiple layers of processors in said pyramid, where plural data results received by a corresponding plurality of processors in each pyramid layer is routed to a single processor in the layer, and where the single processor outputs the plural data results in a serial stream to a processor in a subsequent pyramid layer.

39. The method of claim 34, wherein each said processor is programmable by a user for processing data according to a desired algorithm.

* * * * *